US012561925B2

(12) United States Patent
Josephson et al.

(10) Patent No.: US 12,561,925 B2
(45) Date of Patent: Feb. 24, 2026

(54) MOTION BASED SYSTEMS, APPARATUSES AND METHODS FOR ESTABLISHING 3 AXIS COORDINATE SYSTEMS FOR MOBILE DEVICES AND WRITING WITH VIRTUAL KEYBOARDS

(71) Applicant: Quantum Interface, LLC, Austin, TX (US)

(72) Inventors: Jonathan Josephson, Austin, TX (US); Jessica Christine Collins, Austin, TX (US); Scott Alexander Strozier, Houston, TX (US)

(73) Assignee: Quantum Inteface LLC, Austin, TX (US)

( * ) Notice: Subject to any disclaimer, the term of this patent is extended or adjusted under 35 U.S.C. 154(b) by 362 days.

(21) Appl. No.: 15/781,057

(22) PCT Filed: Dec. 1, 2016

(86) PCT No.: PCT/US2016/064503
§ 371 (c)(1),
(2) Date: Jul. 5, 2021

(87) PCT Pub. No.: WO2017/096096
PCT Pub. Date: Jun. 8, 2017

(65) Prior Publication Data
US 2025/0046036 A1 Feb. 6, 2025

(51) Int. Cl.
*G06T 19/20* (2011.01)
*G06F 3/01* (2006.01)
(Continued)

(52) U.S. Cl.
CPC .............. *G06T 19/20* (2013.01); *G06F 3/012* (2013.01); *G06F 3/013* (2013.01);
(Continued)

(58) Field of Classification Search
CPC ................... G06T 19/20; G06T 19/006; G06T 2219/2004; G06F 3/012; G06F 3/013;
(Continued)

(56) References Cited

U.S. PATENT DOCUMENTS 7,831,392 B2 11/2010 Josephson et al.
7,861,188 B2 12/2010 Josephson et al.
(Continued)

FOREIGN PATENT DOCUMENTS

JP 2010019643 A 1/2010
JP 2012068854 A 4/2012
(Continued)

OTHER PUBLICATIONS

Apr. 20, 2017—PCT Written Opinion and International Search Report.
Jun. 14, 2018—PCT International Preliminary Examination Report.

*Primary Examiner* — Chong Wu
(74) *Attorney, Agent, or Firm* — Robert W. Strozier

(57) ABSTRACT

Systems, interfaces, and methods for implementing the systems and interfaces include a dynamic environment generation subsystem that changes objects and subobjects based on locations of the motion sensors and/or the nature, time and/or location of sensed motion and include selection attractive movement as the selection protocol, where a selection object is used to discriminate between selectable objects and attract a target object toward the selection objects, where the direction and speed of the motion controls, discriminates, attracts, and activates the selected objects.

20 Claims, 167 Drawing Sheets

(51) Int. Cl.
    *G06F 3/04886*     (2022.01)
    *G06T 19/00*     (2011.01)

(52) U.S. Cl.
    CPC ........ *G06F 3/04886* (2013.01); *G06T 19/006*
        (2013.01); *G06T 2219/2004* (2013.01)

(58) Field of Classification Search
    CPC .... G06F 3/04886; G06F 1/1694; G06F 3/011;
        G06F 3/017; G06F 3/0304; G06F 3/038;
        G06F 3/04815; G06F 3/04817; G06F
        3/0482; G06F 3/04842; G06F 3/04883;
                    G06F 3/0488
    See application file for complete search history.

(56)           References Cited

U.S. PATENT DOCUMENTS

| | | | |
|---|---|---|---|
| 8,316,319 B1 | 11/2012 | Patel et al. | |
| 8,788,966 B2 | 7/2014 | Josephson et al. | |
| 9,262,075 B1 * | 2/2016 | Bi | G06F 3/0233 |
| 9,703,388 B2 | 7/2017 | Josephson et al. | |
| 9,746,935 B2 | 8/2017 | Josephson et al. | |
| 9,971,492 B2 | 5/2018 | Chandler et al. | |
| 2002/0122072 A1 | 9/2002 | Selker | |
| 2008/0034331 A1 | 2/2008 | Josephson et al. | |
| 2010/0134425 A1 | 6/2010 | Storrusten | |
| 2010/0333030 A1 | 12/2010 | Johns | |
| 2011/0043443 A1 | 2/2011 | Kawano et al. | |
| 2011/0055773 A1 | 3/2011 | Agarawala et al. | |
| 2011/0066981 A1 | 3/2011 | Chmielewski et al. | |
| 2011/0221974 A1 | 9/2011 | Stern et al. | |
| 2011/0289456 A1 | 11/2011 | Reville et al. | |
| 2011/0316888 A1 | 12/2011 | Sachs et al. | |
| 2012/0019662 A1 | 1/2012 | Maltz | |
| 2012/0050157 A1 | 3/2012 | Latta et al. | |
| 2012/0078614 A1 | 3/2012 | Galor et al. | |
| 2012/0216143 A1 | 8/2012 | Shiplacoff et al. | |
| 2012/0249310 A1 | 10/2012 | Hotaling | |
| 2012/0326961 A1 | 12/2012 | Bromer | |
| 2013/0104079 A1 | 4/2013 | Yasui et al. | |
| 2013/0135194 A1 | 5/2013 | Josephson | |
| 2013/0135195 A1 | 5/2013 | Josephson et al. | |
| 2015/0135132 A1 | 5/2015 | Josephson et al. | |
| 2015/0177981 A1 | 6/2015 | Starner et al. | |
| 2016/0320860 A1 | 11/2016 | Josephson et al. | |
| 2017/0139556 A1 | 5/2017 | Josephson et al. | |
| 2017/0168711 A1 * | 6/2017 | Temple | G06F 3/0233 |
| 2017/0180336 A1 | 6/2017 | Josephson et al. | |
| 2017/0269705 A1 | 9/2017 | Josephson et al. | |

FOREIGN PATENT DOCUMENTS

| | | |
|---|---|---|
| JP | 2012108842 A | 6/2012 |
| WO | 2007128035 A1 | 11/2007 |
| WO | 2013049864 A1 | 4/2013 |
| WO | 2013095677 A1 | 6/2013 |

\* cited by examiner

Activate by Motion within Sensor Zone

102

Activate by Motion within Sensor Zone

Activate by Motion within Sensor Zone

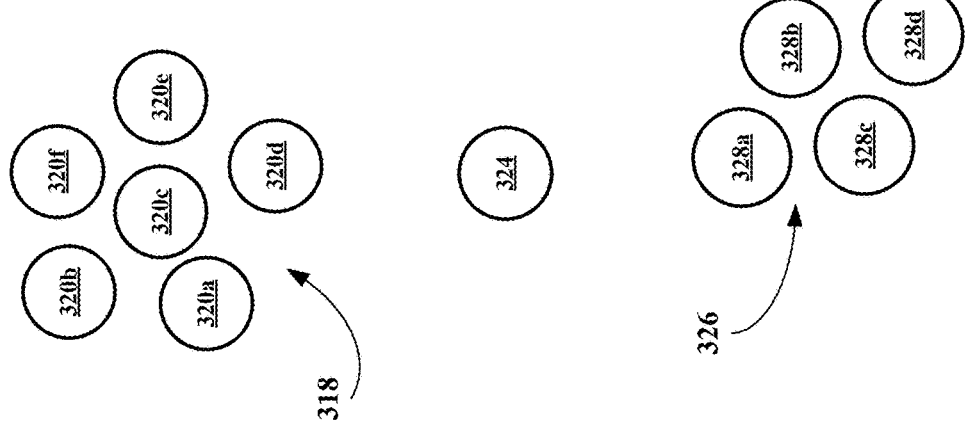
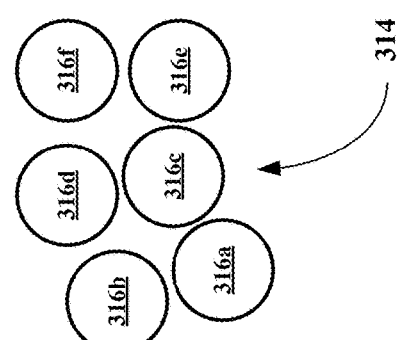
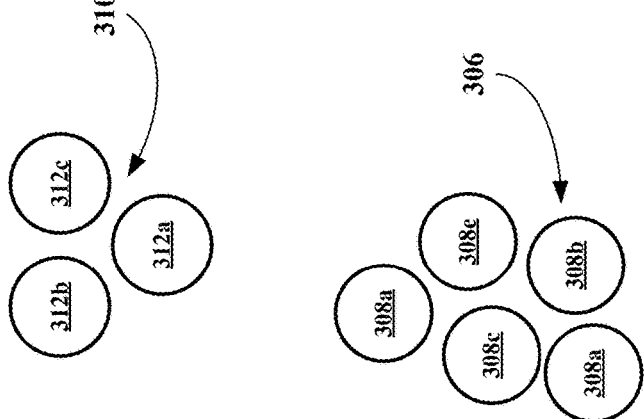
FIG. 3C

Activate by Motion within Sensor Zone

502

396-0

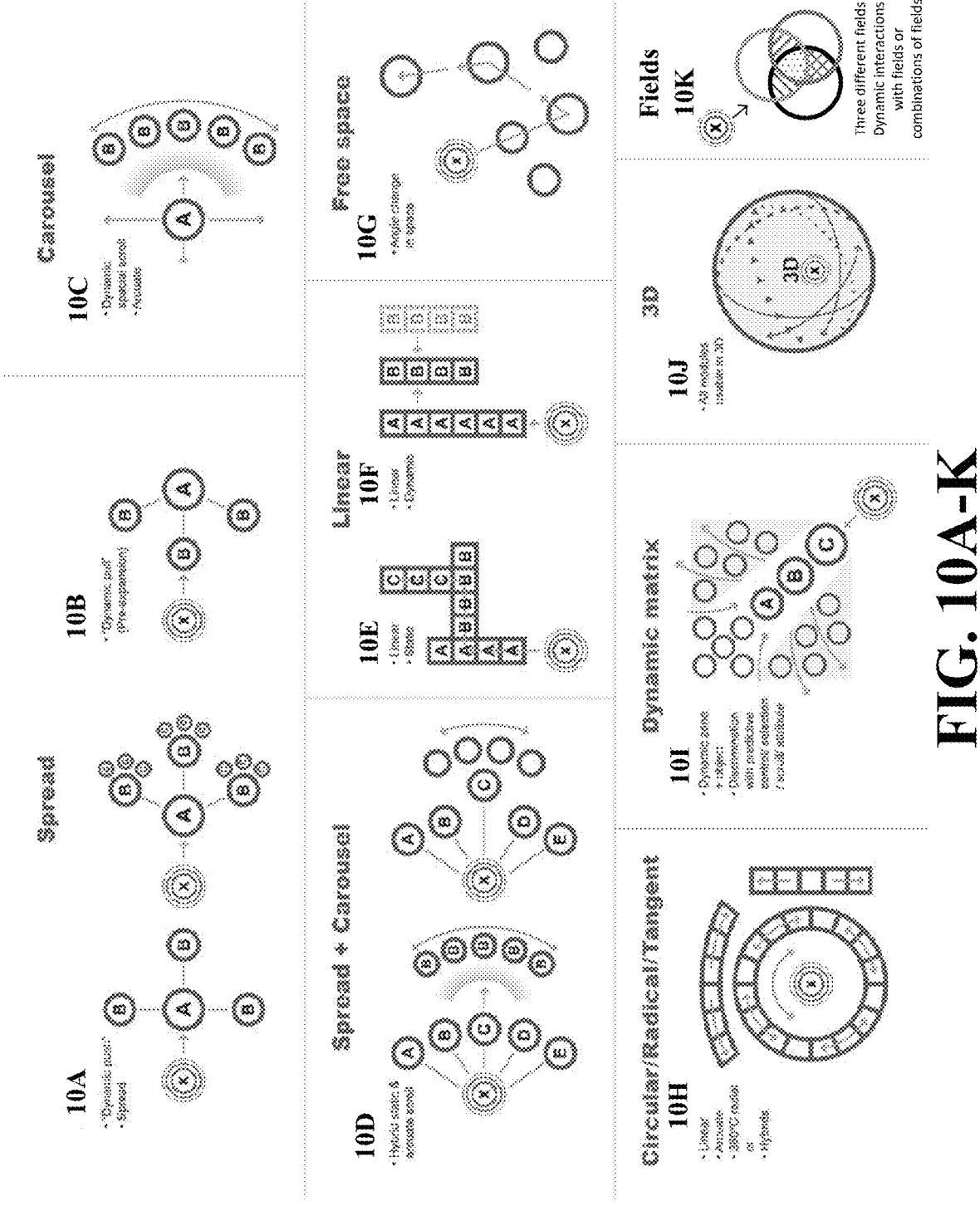
FIG. 10A-K

1500

1500

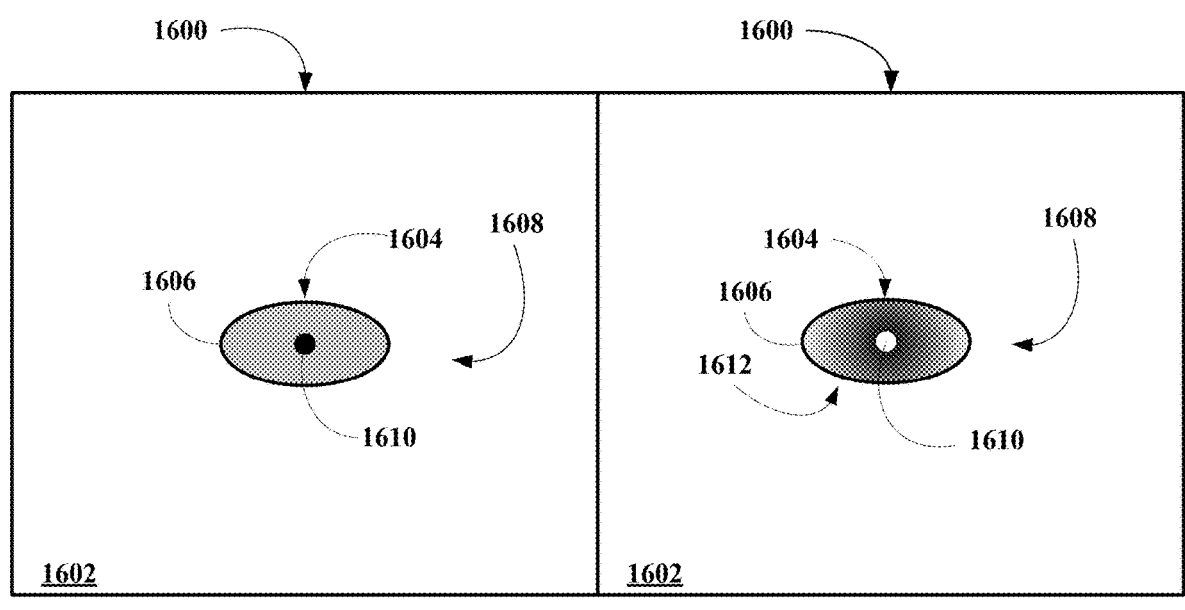
FIG. 16A          FIG. 16B
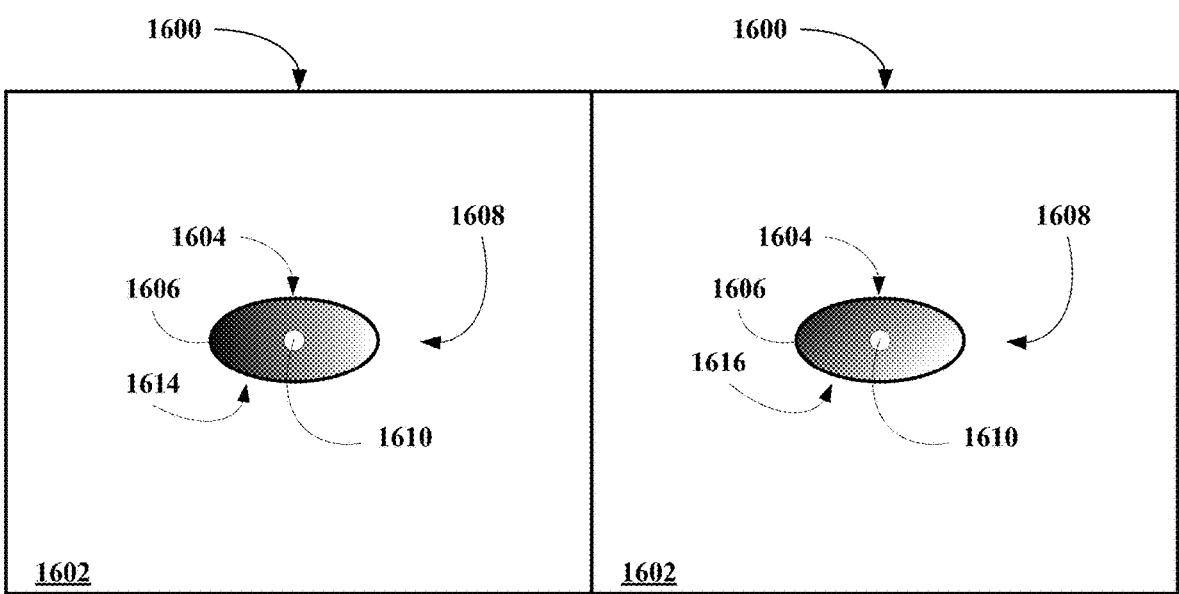
FIG. 16C          FIG. 16D

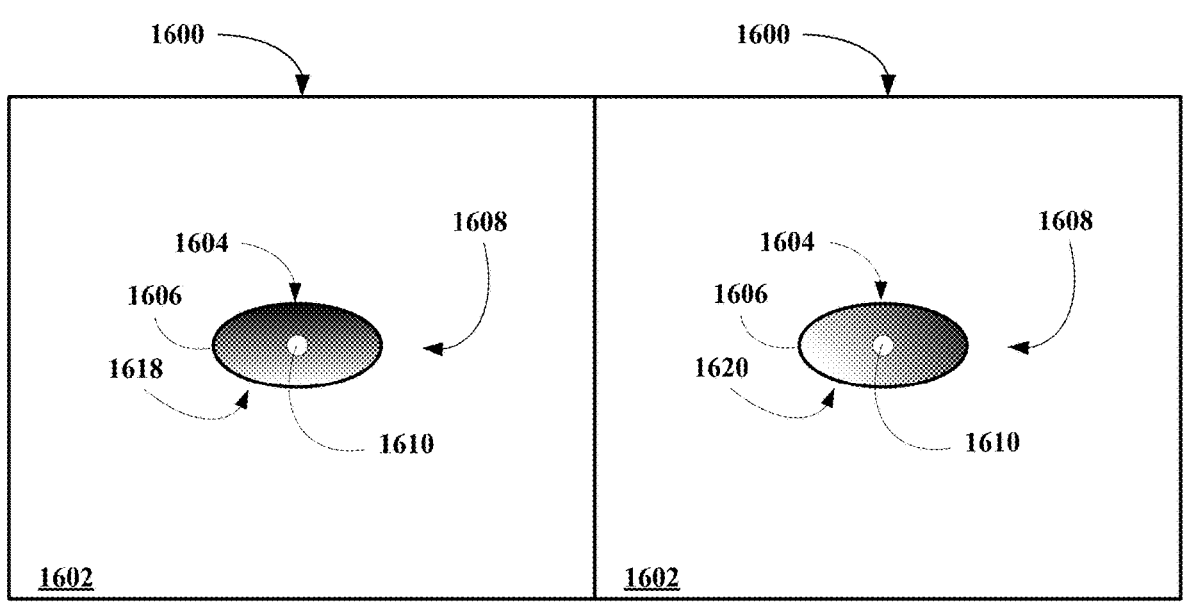
FIG. 16E           FIG. 16F
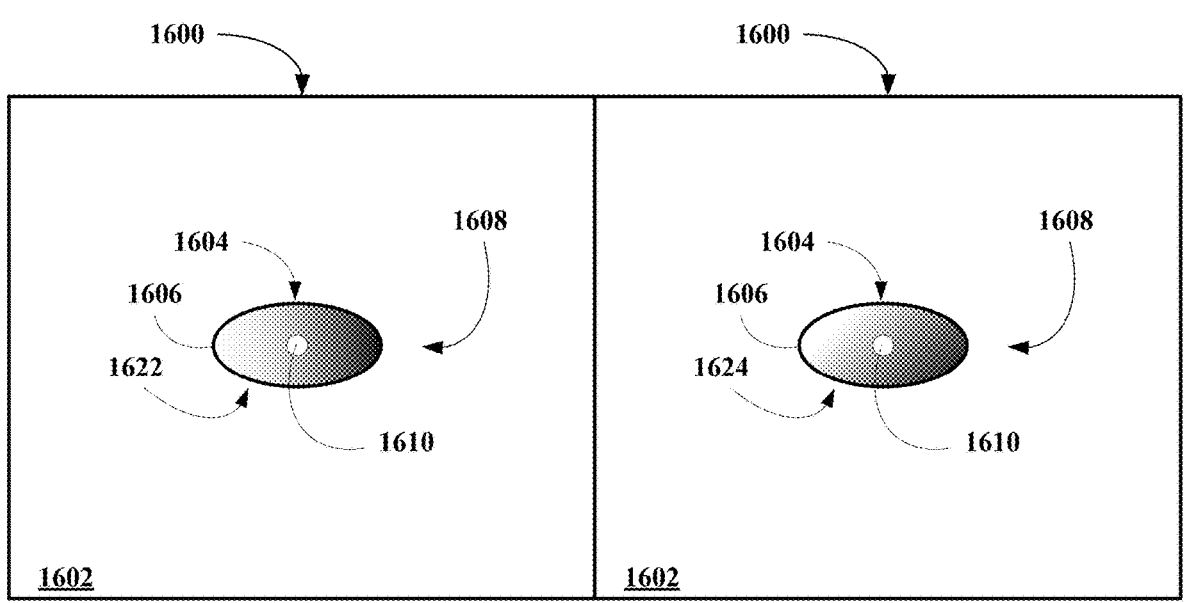
FIG. 16G           FIG. 16H

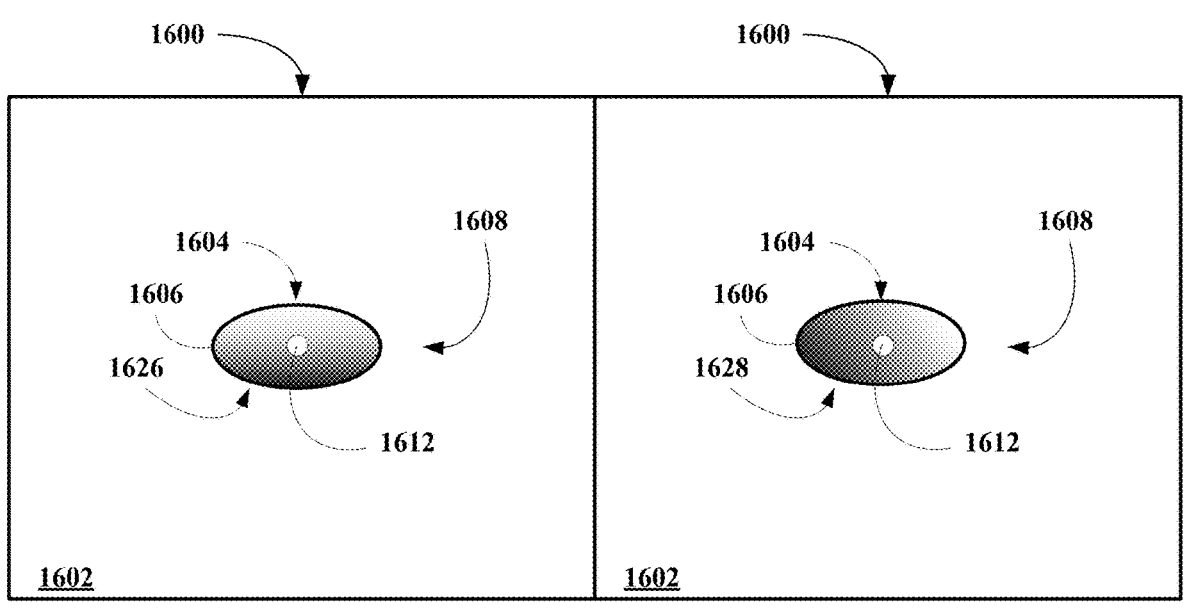
FIG. 16I　　　　　　　FIG. 16J
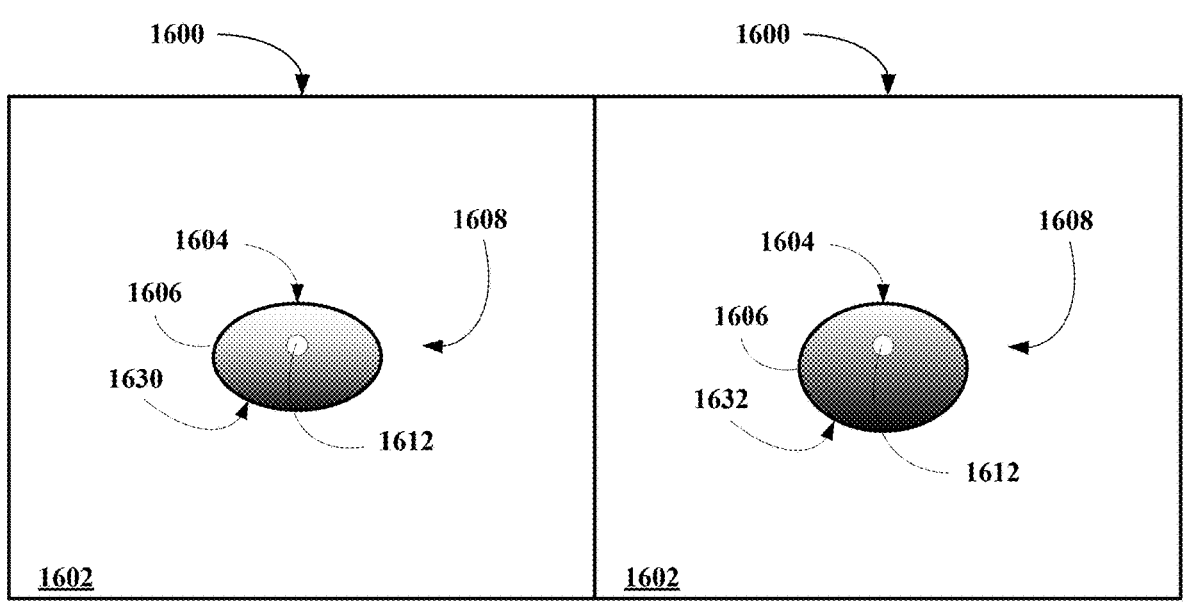
FIG. 16K　　　　　　　FIG. 16L

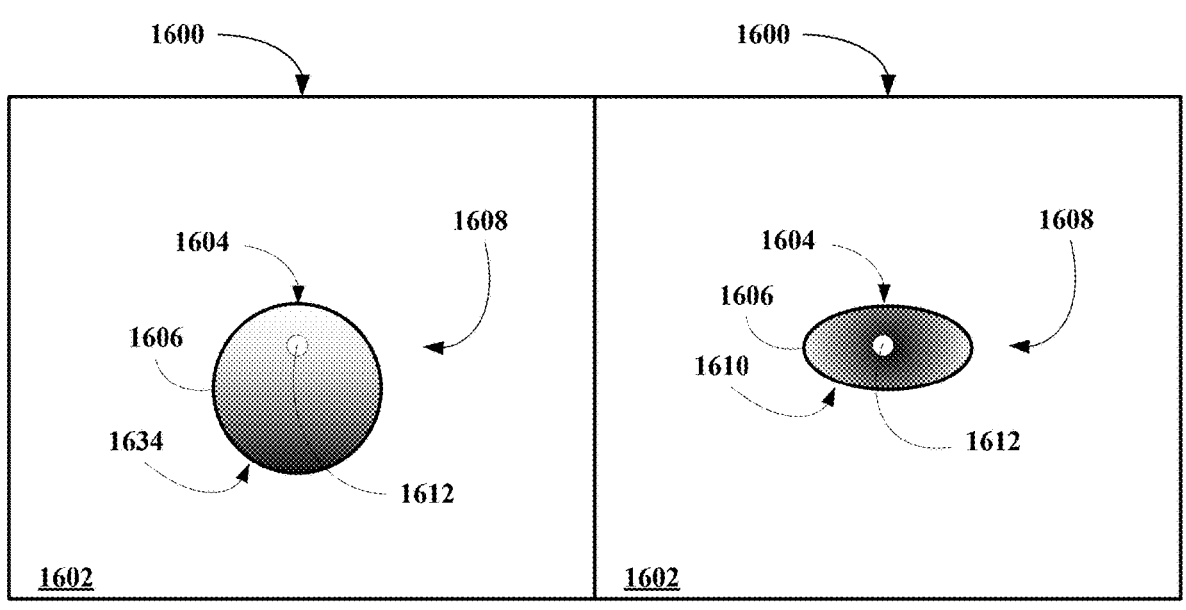
FIG. 16M　　　　FIG. 16N
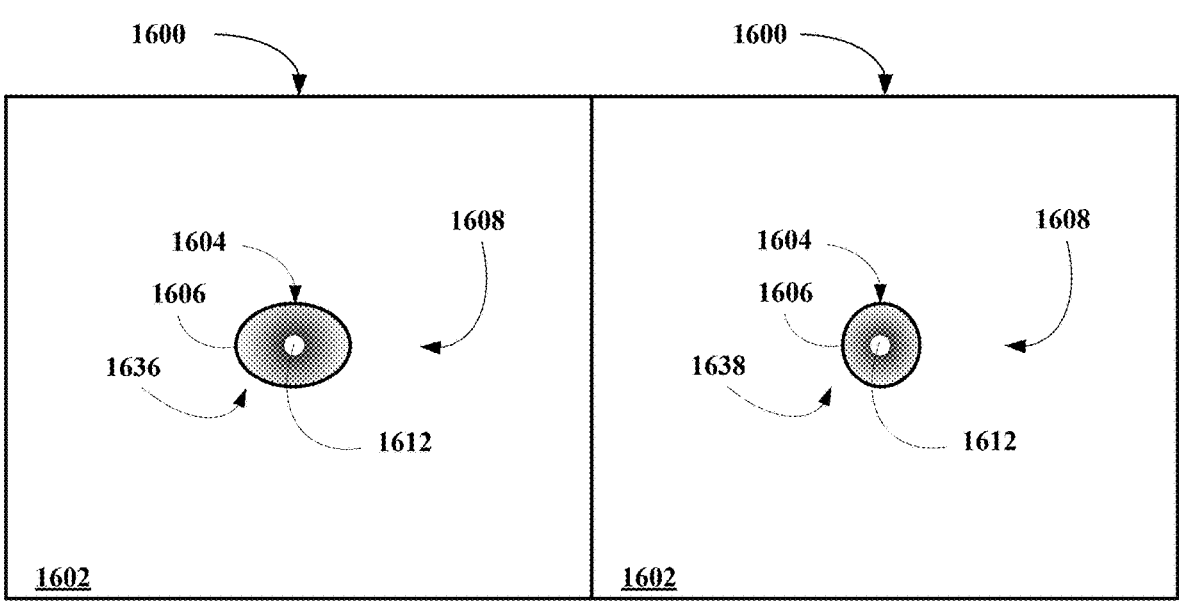
FIG. 16O　　　　FIG. 16P and and the

1708 there thus therefore they their talk talked trade more

1712

1704

1710

1706

1702 and the beat goes on.

1708 goes "goes on" got gained more

1712

1704

1710

1706

1702 and, therefore, we're going to work

1708 going "going home" "going to work" "going shopping" more

1712

1702

1706

1710

MOTION BASED SYSTEMS, APPARATUSES AND METHODS FOR ESTABLISHING 3 AXIS COORDINATE SYSTEMS FOR MOBILE DEVICES AND WRITING WITH VIRTUAL KEYBOARDS

RELATED APPLICATIONS

This application is a 35 U.S.C. § 371 National Phase Application of PCT/US16/064503 filed Dec. 1, 2016 published as WO2017096096 on Jun. 8, 2017, which claims the benefit of and provisional priority of U.S. Provisional Patent Application Ser. Nos. 62/261,803 filed Dec. 1, 2015 (1 Dec. 2015), 62/261,805 filed Dec. 1, 2015 (1 Dec. 2015), 62/268, 332 Dec. 16, 2015 (16 Dec. 2015), 62/261,807 filed Dec. 1, 2015 (1 Dec. 2015), 62/311,883 filed Mar. 22, 2016 (22 Mar. 2016), and 62/382,189 filed Aug. 31, 2016 (31 Aug. 2016). U.S. application Ser. No. 15/255,107 filed Sep. 1, 2016 (1 Sep. 2016), Ser. No. 15/210,832 filed Jul. 14, 2016 (14 Jul. 2016), Ser. No. 14/731,335 filed Jun. 4, 2015 (4 Jun. 2015), Ser. No. 14/504,393 filed Oct. 1, 2014 (1 Oct. 2014), Ser. No. 14/504,391 filed Jan. 1, 2014 (1 Oct. 2014), Ser. No. 13/677,642 filed Nov. 15, 2012 (15 Nov. 2012), and Ser. No. 13/677,627 filed Nov. 15, 2012 (15 Nov. 2012). This application is also related to U.S. patent application Ser. No. 12/978,690 filed Dec. 27, 2010 (27 Dec. 2010), now U.S. Pat. No. 8,788,966 issued Jul. 22, 2014 (22 Jul. 2014), Ser. No. 11/891,322 filed Aug. 9, 2007 (9 Aug. 2007), now U.S. Pat. No. 7,861,188 issued Dec. 28, 2010 (28 Dec. 2010), and Ser. No. 10/384,195 filed Mar. 7, 2003 (7 Mar. 2003), now U.S. Pat. No. 7,831,932 issued Nov. 9, 2010 (9 Nov. 2010) are incorporated by reference by operation of the closing paragraph.

BACKGROUND OF THE INVENTION

Embodiments of this disclosure relate to systems, apparatuses, interfaces, and or interactive interfaces, and methods for implementing them, where the systems, apparatuses, interfaces, and/or interactive interfaces include at least one processing unit, at least one motion sensor, and at least one user interface and are capable of motion based object control and manipulation.

More particularly, embodiments of this disclosure relate to systems, apparatuses, interfaces, and or interactive interfaces, and methods for implementing them, where the systems, apparatuses, interfaces, and or interactive interfaces are capable of controlling real objects and or environments and or associated attributes, virtual reality (VR) objects and or environments and or associated attributes or augmented reality (AR) objects, attribute objects, and or environments and or associated attributes using: (a) sensed movement or motion and/or movement or motion properties including, without limitation, direction, angle, distance/displacement, duration, speed, velocity, acceleration, changes in direction, angle, distance/displacement, duration, speed, velocity, and/ or acceleration, and/or mixtures and combinations thereof, (b) attractive or repulsive effects to enhance object discrimination based on sense movement and/or (c) object cognizable differentiating attributes to differentiate objects based on one or a plurality of pre-defined, pre-determined and/or dynamically assigned criteria. Also, embodiments of this disclosure relate to systems, apparatuses, interfaces, and/or interactive interfaces, and methods for implementing them, where the systems, apparatuses, interfaces, and/or interactive interfaces utilize a fixed point, area, or volume or substantially fixed point, area or volume to established a three axis coordinate system associated with devices so that xy and rotation movement of the devices may be coupled with movement towards or away from the fixed point, area, or volume for z movement.

Embodiments of this disclosure relate to systems, apparatuses, and/or interfaces and methods for implementing them utilizing blob data from sensors to control real and/or virtual objects.

More particularly, embodiments of this disclosure relate to systems, apparatuses, and/or interfaces and methods for implementing them utilizing blob data from sensors to control real and/or virtual objects, where systems, apparatuses, and/or interfaces capture blob data from at least one sensor and use the blob data and changes in the blob data as movement to generate outputs and to convert the outputs into function for controlling a real and/or virtual object or a plurality of real and/or virtual objects.

DESCRIPTION OF THE RELATED ART

Selection interfaces are ubiquitous throughout computer software and user interface software. Most of these interfaces require motion and selection operations controlled by hard selection protocols such as tapping, clicking, double tapping, double clicking, keys strokes, or other so-called hard selection protocols.

In previous applications, the inventor and inventors have described motion based systems and interfaces that utilize motion and changes in motion direction to invoke command functions such as scrolling and simultaneously selection and activation commands. See for example U.S. Pat. Nos. 7,831, 932 and 7,861,188, incorporated herein by operation of the closing paragraph of the specification.

More recently, the inventor and inventors have described motion based systems and interfaces that utilize velocity and/or acceleration as well as motion direction to invoke command functions such as scrolling and simultaneously selection and activation commands. See for example U.S. Provisional Patent Application Ser. No. 61/885,453 filed Oct. 1, 2013 (1 Oct. 2013).

While there are many systems and interfaces for permitting users to select and activate a target object(s) from lists and/or sublists of target object(s) using movement properties, where the movement properties act to discriminate and attract or manipulate or influence the target object(s) or attributes of target object(s). Multiple layers of objects may have attributes changes, where the attribute of one layer may be different or to a different degree than other layers, but they are all affected and relational in some way.

Many interfaces have been constructed to interact with, control, and/or manipulate objects and attributes associated therewith so that a user is better able to view, select and activate objects and/or attributes.

Recently, motion based interfaces have been disclosed. These interfaces use motion as the mechanism for viewing, selecting, differentiating, and activating virtual and/or real objects and/or attributes. However, there is still in need in the art for improved motion based interfaces that present dynamic environments for viewing, selecting, differentiating, and activating virtual and/or real objects and/or attributes based on object and/or attribute properties, user preferences, user recent interface interactions, user long term interface interactions, or mixtures and combinations thereof.

SUMMARY OF THE INVENTION

Dynamic Environments

Embodiments of this invention provide systems, apparatuses, and/or interfaces and methods implementing them on or in a computer, where the systems, apparatuses, and/or interfaces include at least one processing unit, at least one motion sensor having at least one active zone (area and/or volume), and at least one user interface capable of creating, controlling, and manipulating dynamic environments including creating, controlling, manipulating, and/or interacting with one or a plurality of objects (real and/or virtual), one or a plurality of object associated subobjects and/or attributes, and/or one or a plurality of object associated adjustable attributes using one or a plurality of functions including scrolling, selecting, activating, and/or adjusting attributes and/or attributes values and/or simultaneous functions comprising two or more of scrolling, selecting, activating, and/or adjusting attributes and/or attribute values performed simultaneously based partially or solely on movement or motion sensed by the at least one motion sensor. In certain embodiments, the systems, apparatuses, and/or interfaces dynamically highlight and/or differentiate objects, where the highlighting or differentiating may evidence a priority or priorities, directionality, content, context, type, activation procedure, an activation parameter or parameters, a control feature or features, or other properties that are associated with the objects and/or attributes. Then, motion sensed by the motion sensors in communication with the processing units permits manipulation and/or interaction with the objects or elements of the dynamic environment either causing the environment to change in response to the sensed motion or causing object and/or attribution selection, activation, and/or attribute value adjustment.

Establishing Three Axis Coordinate System for Mobile Devices

Embodiments of this invention provide systems, apparatuses, and/or interfaces and methods implementing them on or in a computer, device, or user interface, where the systems, apparatuses, and/or interfaces include a mobile device, a wearable device, or any other device comprising one or a plurality of processing units, one or a plurality of motion sensors having at least one active zone (area and/or volume), and one or a plurality of position sensors. The systems and apparatuses may also include one or a plurality of interfaces including one or a plurality of human and/or animal discernible output devices. The systems, apparatuses, interfaces, and/or methods use at least one stationary point, area, and/or volume or relatively stationary point, area, and/or volume detectable by one or a plurality of positions sensors (e.g., a point viewable by a camera) from which z-motion may be assessed so that three axes may be associated with the mobile device. The systems, apparatuses, and/or interfaces using this three axis configuration are capable of sensing movement (linear, non-linear, co-linear, or any combination thereof) in an x-direction, a y-direction, a z-direction, or any combination thereof, i.e., motion having two direction component (e.g., xy, xz, or yz) or all three components (xyz). The non-linear motion may be a titling motion along any axis or rotational motion around any axis or combination thereof. A stationary point, area, and/or volume or relatively stationary point, area, and/or volume is any point, area, and/or volume detectable by a position or motion sensor that is either not moving (stationary) or moving at a rate that is sufficiently slow that movement toward or away from the point, area, and/or volume will allow the position sensors and/or processing units to assess and determine a different movement, such as z-movement. It should be recognized that the position sensors and the motion sensors may be the same physical device, the output of which is used for multiple purposes.

General Systems, Apparatuses, Interfaces, and Methods

Embodiments of this invention relate to systems, apparatuses, interfaces, and methods of this invention for implementing the systems, apparatuses, and/or interfaces are based on attractive or manipulative selection invoked solely and partially by motion sensed by motion sensors associated with the systems, apparatuses, and/or interfaces. The manipulative selection actions may be attractive, repulsive, or a relative affect due to other objects being moved in an attractive manner, a repulsive manner, an influencing manner, or a combination thereof, or based upon an angle or proximity to a desired object or objects. The systems, apparatuses, and/or interfaces account for the manipulative effects based upon proximity, direction, angle, distance/displacement, duration, velocity and/or acceleration of at least one selection object toward a desired object or set of objects. The objects may comprise real or virtual objects, real world devices, software, software components, attributes, active areas of sensors, and/or fields of EMF or other waveforms or any controllable thing and may be remotely controlled. The motion of the selection object or objects may be a machine, an animal or a body part or parts thereof, a human or a body part or parts thereof, or a real world item, a field, matter, or a waveform under the control of a human, a machine, an animal, or a software program or a software system.

General Apparatuses and Systems

Embodiments of this invention provide systems, apparatuses, and/or interfaces for selecting and activating virtual and/or real objects and/or subobject and/or attributes associated therewith. The apparatuses include at least one user interface. The interfaces include at least one (one or a plurality of) user feedback unit (feedback units may be devices, systems or feedback methods), at least one motion sensor having active sensing zones or active view fields, and at least one processing unit in communication with the user feedback units, and the motion sensors. The interfaces may also include at least one power supply, at least one battery backup, and communications software and hardware for remote control and/or remote monitoring. The motion sensors detect motion or movement within their active sensing zones, generate sensor output signals, and send or forward the output signals to the processing units. The processing units convert the output signals into command and control outputs. Of course, these components, user interfaces, user feedback units, motion sensors, and processing units, may all be combined in whole or part. The apparatuses may also include at least one object, real or virtual (i.e., the object may be an physical or virtual (software) attribute as well, or a combination thereof), under the control of the apparatus via the processing units. The command and control outputs may include start commands, which activate the user interface, the user feedback units and may generate a user discernible selection or cursor object. By user discernible the inventor means that the selection or cursor object is capable of being sensed by one of the five senses of an animal or a human, e.g., visual, audio, audiovisual, tactile or touch, hot or cold, smell or odor, taste or flavor, neurological, or any combination thereof. However, the selection or cursor object may also be invisible and/or non-discernible-just a virtual element used internally in applying the sensed motion or movement, and may also be an area or volumetric zone or representation of a zone.

Once activated, the user interfaces via the user feedback units may also display at least one selectable object, groups of objects or zones. Alternatively, once activated, movement of the selection object will cause a selectable object or a group of selectable objects or a pre-selected selectable object or a group of pre-selected selectable objects or zone to appear, to move toward the selection object, or to move at an angle to the selection object, or away from the selection object for the purpose of eventually choosing a particular selectable object or a particular group of selectable objects or selectable subobjects and/or attributes associated with particular object(s) or controllable attributes associate with particular object(s). The pre-selected selectable object or the group of pre-selected selectable objects are the displayed object(s) that are most closely aligned with the movement and/or movement properties of the selection object or the movement and/or movement properties without visible a selection object. For examples, if the sensed initial motion or movement was in the ty direction, then the user interface may cause the user feedback unit(s) to evidence those selectable objects that are associated with the ty direction and attract those in the specific direction toward the selection object. The selection object may be visualized on a display, or indicated in any other means or may be invisible tied to the movement such as by sound in a 2D, 3D, a virtual reality (VR) environment or augmented reality (AR), or not be represented as an object at all—the user may see the effect of the movement on the objects and be able to infer the affected area based on the movement.

Methods

Embodiments of this invention provide methods for implementing the selection protocol using the user interfaces of this invention. The methods include selecting and activating selectable objects, selecting and activating members of a selectable list of virtual and/or real objects, selecting and activating selectable attributes associated with the objects, selecting and activating and adjusting selectable attributes, zones, areas, or combinations thereof, where the interfaces include at least one display or other user feedback unit, at least one motion sensor (or data received therefrom), and at least one processing unit in communication with the user feedback units and the motion sensors or motion sensor data. The interfaces also may include power supplies, battery backups, and communications software and hardware for remote control and/or remote monitoring. The methods include sensing motion or movement sensed by the motion sensor(s), generating an output signal and sending the output signal to the processing unit. The methods also include converting the output signal into a command output via the processing unit. The command output may be a start command, which activates the feedback unit or activates the feedback unit and generates at least one selection or cursor object or activates the feedback unit and generates at least one selectable object or activates the feedback unit and generates at least one selection or cursor object and at least one selectable object. The selection object may be discernible or not (displayed or not). The motion may be generated by an animal or body part or parts, a human or body part or parts, a machine, or a real world object under control of an animal, a human, or a robot or robotic system, especially when the motion being sensed is within a 3D active sensing volume or zone. Once activated, the methods monitor sensed motion or movement within the active zone(s) of the motion sensor(s), which is used to move the selection object on or within the user feedback unit in accord with the motion properties (direction, angle, distance/displacement, duration, velocity, acceleration, and changes of one or more of these properties) toward a selectable object or a group of selectable objects or a pre-selected object or a group of pre-selected objects, zones or areas. At the same time, the methods either move the non-selected objects away from the selection object(s), cause the non-selected object to fade, disappear or other change other properties of the non-selected objects, or combinations thereof. The pre-selected object or the group of pre-selected objects are the selectable object(s) that are most closely aligned with the direction of motion of the selection object.

Blob Data

Embodiments of this disclosure provide systems, apparatuses, and/or interfaces and methods for implementing them, where the systems, apparatuses, and/or interfaces include at least one sensor, at least one processing unit, at least one user cognizable feedback unit, and one or a plurality of real and/or virtual objects controllable by the at least one processing unit, where the at least one sensor senses blob (unfiltered or partially filtered) data associated with touch and/or movement on or within an active zone of the at least one sensor and generates an output and/or a plurality of outputs representing the blob data, and where the at least one processing unit converts that blob data outputs into a function or plurality of functions for controlling the real and/or virtual object and/or objects.

Embodiments of this disclosure provide methods for implementing systems, apparatuses, and/or interfaces including the steps of sensing blob data associated with touch and/or movement on or within an active zone of the at least one sensor, generating an output and/or a plurality of outputs representing the blob data, converting that blob data outputs or outputs into a function or plurality of functions via the at least one processing unit, and controlling a real and/or virtual object and/or a plurality of real and/or virtual objects via the processing unit executing the function and/or functions. Blob data may be used in comparison or combination with centroid, or center of mass data (filtered blob data reducing the blob data to an averaged point or small zone average of blob data).

BRIEF DESCRIPTION OF THE DRAWINGS

The invention can be better understood with reference to the following detailed description together with the appended illustrative drawings in which like elements are numbered the same:

FIG. 3A-I depict another motion-based selection sequence using an attractive interface of this invention: (A) depicts a display prior to activation by motion of a motion sensor in communication with the; (B) depicts the display after activation to display a top level of selectable object clusters distributed about a centroid in the display area; (C) depicts the objects within each cluster; (D) depicts the display showing a direction of motion detected by a motion sensor sensed by motion of a body or body part within an active zone of the motion sensor; (E) depicts the display showing prediction of the most probable cluster aligned with the direction of motion sensed by the motion sensor and the display of the cluster objects associated with the predicted cluster; (F) depicts the display showing a dispersal of the cluster objects for enhanced discrimination and showing an augmented direction of motion detected by the motion sensor sensed by motion of a body part within the active zone of the motion sensor; (G) depicts the display showing an attraction of the object discriminated by the last portion displayed in a more spaced apart configuration; (H) depicts the display showing a further augmentation of the direction of motion detected by a motion sensor sensed by motion of a body or body part within the active zone of the motion sensor permitting full discrimination of the cluster objects; and (I) depicts the display showing the centering of the selected and activation of the selected cluster object.

FIGS. 6B-K depict the selection of a phone number from the display via motion of the active object from one phone number object to the next without any selection process save movement.

FIGS. 6L-R depict the used of the backspace object and the delete object to correct the selected phone number display after the selection object is moved toward a selectable object causing it to move toward the selection objects and causing subobjects associated with the attracted object.

FIGS. 10A-K depict embodiments of different configurations of the interfaces of this invention.

FIGS. 16A-P depict another embodiment of systems, apparatuses, and/or interfaces of this disclosure using blob data to control a real and/or virtual object and/or objects.

DEFINITIONS USED IN THE INVENTION

Figure 1A:
FIGS. 1A-M depict a motion-based selection sequence using an attractive interface of this invention: (A) shows a display prior to activation by motion of a motion sensor in communication with the display; (B) depicts the display after activation to display a selection object and a plurality of selectable objects; (C) depicts the display after the selection object is moved toward a group of selectable objects; (D) depicts the display after the group of selectable objects are pulled toward the selection object; (E) depicts the display showing further movement of the selection object causing a discrimination between the objects of the group, where the selection object touches one of the group members; (F) depicts the display showing the touched member and the selection object with the non-touched objects returned to their previous location; (G) depicts the display showing a merger of the selected object and the selection object repositioned to the center of the display; (H) depicts the display showing the selected object and the selection object and the elements associated with the selected object; (I) depicts the display after the selection object is moved toward a group of selectable subobjects, which have moved toward the selection object and increased in size; (J) depicts the display after the selection object is moved in a different direction directly toward another selectable subobject, which has moved toward the selection object and increased in size; (K) depicts the display after further motion of the selection object touches the selectable subobject; (L) depicts the display after merger of the selection object and the selected subobject, which is executed upon selection; and (M) depicts this display after merger and activation of the selected member of FIG. 1G.

The term "at least one" means one or more or one or a plurality, additionally, these three terms may be used interchangeably within this application. For example, at least one device means one or more devices or one device and a plurality of devices.

The term "one or a plurality" means one item or a plurality of items.

The term "about" means that a value of a given quantity is within ±20% of the stated value. In other embodiments, the value is within ±15% of the stated value. In other embodiments, the value is within ±10% of the stated value. In other embodiments, the value is within ±5% of the stated value. In other embodiments, the value is within ±2.5% of the stated value. In other embodiments, the value is within ±1% of the stated value.

The term "substantially" means that a value of a given quantity is within ±5% of the stated value. In other embodiments, the value is within ±2.5% of the stated value. In other embodiments, the value is within ±2% of the stated value. In other embodiments, the value is within ±1% of the stated value. In other embodiments, the value is within ±0.1% of the stated value.

The term "motion" and "movement" are often used interchangeably and mean motion or movement that is capable of being detected by a motion sensor within an active zone of the sensor. Thus, if the sensor is a forward viewing sensor and is capable of sensing motion within a forward extending conical active zone, then movement of anything within that active zone that meets certain threshold detection criteria, will result in a motion sensor output, where the output may include at least direction, angle, distance/displacement, duration, velocity, and/or acceleration. Moreover, if the sensor is a touch screen or multitouch screen sensor and is capable of sensing motion on its sensing surface, then movement of anything on that active zone that meets certain threshold detection criteria, will result in a motion sensor output, where the output may include at least direction, angle, distance/displacement, duration, velocity, and/or acceleration. Of course, the sensors do not need to have threshold detection criteria, but may simply generate output anytime motion or any kind is detected. The processing units can then determine whether the motion is an actionable motion or movement and a non-actionable motion or movement.

The term "motion sensor" or "motion sensing component" means any sensor or component capable of sensing motion of any kind by anything with an active zone-area or volume, regardless of whether the sensor's or component's primary function is motion sensing. Of course, the same is true of sensor arrays regardless of the types of sensors in the arrays or for any combination of sensors and sensor arrays.

The term "real object" or "real world object" means any real world device, attribute, or article that is capable of being controlled by a processing unit. Real objects include objects or articles that have real world presence including physical, mechanical, electro-mechanical, magnetic, electro-magnetic, electrical, or electronic devices or any other real world device that can be controlled by a processing unit.

The term "virtual object" means any construct generated in or attribute associated with a virtual world or by a computer and displayed by a display device and that are capable of being controlled by a processing unit. Virtual objects include objects that have no real world presence, but are still controllable by a processing unit. These objects include elements within a software system, product or program such as icons, list elements, menu elements, applications, files, folders, archives, generated graphic objects, 1D, 2D, 3D, and/or nD graphic images or objects, generated real world objects such as generated people, generated animals, generated devices, generated plants, generated landscapes and landscape objects, generate seascapes and seascape objects, generated skyscapes or skyscape objects, 1D, 2D, 3D, and/or nD zones, 2D, 3D, and/or nD areas, 1D, 2D, 3D, and/or nD groups of zones, 2D, 3D, and/or nD groups or areas, volumes, attributes such as quantity, shape, zonal, field, affecting influence changes or the like, or any other generated real world or imaginary objects or attributes. Augmented reality is a combination of real and virtual objects and attributes.

The term "entity" means a human or an animal or robot or robotic system (autonomous or non-autonomous.

The term "entity object" means a human or a part of a human (fingers, hands, toes, feet, arms, legs, eyes, head, body, etc.), an animal or a port of an animal (fingers, hands, toes, feet, arms, legs, eyes, head, body, etc.), or a real world object under the control of a human or an animal or a robot and include such articles as pointers, sticks, or any other real world object that can be directly or indirectly controlled by a human or animal or a robot.

The term "mixtures" mean different data or data types are mixed together.

The term "combinations" mean different data or data types are in packets or bundles, but separate.

The term "sensor data" mean data derived from at least one sensor including user data, motion data, environment data, temporal data, contextual data, historical data, or mixtures and combinations thereof.

The term "user data" mean user attributes, attributes of entities under the control of the user, attributes of members under the control of the user, information or contextual information associated with the user, or mixtures and combinations thereof.

The terms "user features", "entity features", and "member features" means features including: overall user, entity, or member shape, texture, proportions, information, matter, energy, state, layer, size, surface, zone, area, any other overall feature, and mixtures or combinations thereof; specific user, entity, or member part shape, texture, proportions, any other part feature, and mixtures or combinations thereof; and particular user, entity, or member dynamic shape, texture, proportions, any other part feature, and mixtures or combinations thereof; and mixtures or combinations thereof.

The term "motion data or movement data" mean one or a plurality of motion or movement properties detectable by motion sensor or sensors capable of sensing movement.

The term "motion or movement properties" mean properties associated with the motion data including motion/movement direction (linear, curvilinear, circular, elliptical, etc.), motion/movement distance/displacement, motion/movement duration, motion/movement velocity (linear, angular, etc.), motion/movement acceleration (linear, angular, etc.), motion signature-manner of motion/movement (motion/movement properties associated with the user, users, objects, areas, zones, or combinations of thereof), dynamic motion properties such as motion in a given situation, motion learned by the systems based on user interaction with the systems, motion characteristics based on the dynamics of the environment, influences or affectations, changes in any of these attributes, and mixtures or combinations thereof. Motion or movement based data is not restricted to the movement of a single body, body part, and/or member under the control of an entity, but may include movement of one or any combination of movements. Additionally, the actual body, body part and/or member's identity is also considered a movement attribute. Thus, the systems/apparatuses, and/or interfaces of this disclosure may use the identity of the body, body part and/or member to select between different set of objects that have been pre-defined or determined base on environment, context, and/or temporal data.

The term "gesture" means a predefined movement or posture preformed in a particular manner such as closing a first lifting a finger that is captured compared to a set of predefined movements that are tied via a lookup table to a single function and if and only if, the movement is one of the predefined movements does a gesture based system actually go to the lookup and invoke the predefined function.

The term "environment data" mean data associated with the user's surrounding or environment such as location (GPS, etc.), type of location (home, office, store, highway, road, etc.), extent of the location, context, frequency of use or reference, and mixtures or combinations thereof.

The term "temporal data" mean data associated with time of day, day of month, month of year, any other temporal data, and mixtures or combinations thereof.

The term "contextual data" mean data associated with user activities, environment activities, environmental states, frequency of use or association, orientation of objects, devices or users, association with other devices and systems, temporal activities, and mixtures or combinations thereof.

The term "historical data" means data associated with past events and characteristics of the user, the objects, the environment and the context, or any combinations thereof.

The term "simultaneous" or "simultaneously" means that an action occurs either at the same time or within a small period of time. Thus, a sequence of events are considered to be simultaneous if they occur concurrently or at the same time or occur in rapid succession over a short period of time, where the short period of time ranges from about 1 nanosecond to 5 second. In other embodiments, the period range from about 1 nanosecond to 1 second. In other embodiments, the period range from about 1 nanosecond to 0.5 seconds. In other embodiments, the period range from about 1 nanosecond to 0.1 seconds. In other embodiments, the period range from about 1 nanosecond to 1 millisecond. In other embodiments, the period range from about 1 nanosecond to 1 microsecond.

The term "and/or" means mixtures or combinations thereof so that whether an and/or connectors is used, the and/or in the phrase or clause or sentence may end with "and mixtures or combinations thereof".

The term "spaced apart" means that objects displayed in a window of a display device are separated one from another in a manner that improves an ability for the systems, apparatuses, and/or interfaces to discriminate between object based on movement sensed by motion sensors associated with the systems, apparatuses, and/or interfaces.

The term "maximally spaced apart" means that objects displayed in a window of a display device are separated one from another in a manner that maximized a separation between the object to improve an ability for the systems, apparatuses, and/or interfaces to discriminate between object based on movement sensed by motion sensors associated with the systems, apparatuses, and/or interfaces.

DETAILED DESCRIPTION OF THE INVENTION

Attractive/Repulsive/Manipulative Apparatuses, Systems, and/or Interfaces

The inventor has found that selection attractive or manipulative apparatuses, systems, and/or interfaces may be constructed that use motion or movement within an active sensor zone of a motion sensor translated to motion or movement of a selection object on or within a user feedback device: 1) to discriminate between selectable objects based on the motion, 2) to attract target selectable objects towards the selection object based on properties of the sensed motion including direction, angle, distance/displacement, duration, speed, acceleration, or changes thereof, and 3) to select and simultaneously activate a particular or target selectable object or a specific group of selectable objects or controllable area or an attribute or attributes upon "contact" of the selection object with the target selectable object(s), where contact means that: 1) the selection object actually touches or moves inside the target selectable object, 2) touches or moves inside an active zone (area or volume) surrounding the target selectable object, 3) the selection object and the target selectable object merge, 4) a triggering event occurs based on a close approach to the target selectable object or its associated active zone or 5) a triggering event based on a predicted selection meeting a threshold certainty. The touch, merge, or triggering event causes the processing unit to select and activate the object, select and active object attribute lists, select, activate and adjustments of an adjustable attribute. The objects may represent real and/or virtual objects including: 1) real world devices under the control of the apparatuses, systems, or interfaces, 2) real world device attributes and real world device controllable attributes, 3) software including software products, software systems, software components, software objects, software attributes, active areas of sensors, 4) generated EMF fields, RF fields, microwave fields, or other generated fields, 5) electromagnetic waveforms, sonic waveforms, ultrasonic waveforms, and/or 6) mixture and combinations thereof. The apparatuses, systems and interfaces of this invention may also include remote control units in wired or wireless communication therewith. The inventor has also found that a velocity (speed and direction), distance/displacement and/or duration of motion or movement can be used by the apparatuses, systems, or interfaces to pull or attract one or a group of selectable objects toward a selection object and increasing speed may be used to increase a rate of the attraction of the objects, while decreasing motion speed may be used to slower a rate of attraction of the objects. The inventors have also found that as the attracted object move toward the selection object, they may be augmented in some way such as changed size, changed color, changed shape, changed line thickness of the form of the object, highlighted, changed to blinking, or combinations thereof. Simultaneously, synchronously or asynchronously, submenus or subobjects may also move or change in relation to the movements or changes of the selected objects. Simultaneously, synchronously or asynchronously, the non-selected objects may move away from the selection object(s). It should be noted that whenever a word object is used, it also includes the meaning of objects, and these objects may be simultaneously performing separate, simultaneous, and/or combined command functions or used by the processing units to issue combinational functions.

In certain embodiments, as the selection object moves toward a target object, the target object will get bigger as it moves toward the selection object. It is important to conceptualize the effect we are looking for. The effect may be analogized to the effects of gravity on objects in space. Two objects in space are attracted to each other by gravity proportional to the product of their masses and inversely proportional to the square of the distance between the objects. As the objects move toward each other, the gravitational force increases pulling them toward each other faster and faster. The rate of attraction increases as the distance decreases, and they become larger as they get closer. Contrarily, if the objects are close and one is moved away, the gravitational force decreases and the objects get smaller. In the present invention, motion of the selection object away from a selectable object may act as a rest, returning the display back to the original selection screen or back to the last selection screen much like a "back" or "undo" event. Thus, if the user feedback unit (e.g., display) is one level down from the top display, then movement away from any selectable object, would restore the display back to the main level. If the display was at some sublevel, then movement away from selectable objects in this sublevel would move up a sublevel. Thus, motion away from selectable objects acts to drill up, while motion toward selectable objects that have sublevels results in a drill down operation. Of course, if the selectable object is directly activatable, then motion toward it selects and activates it. Thus, if the object is an executable routine such as taking a picture, then contact with the selection object, contact with its active area, or triggered by a predictive threshold certainty selection selects and simultaneously activates the object. Once the interface is activated, the selection object and a default menu of items may be activated on or within the user feedback unit. If the direction of motion towards the selectable object or proximity to the active area around the selectable object is such that the probability of selection is increased, the default menu of items may appear or move into a selectable position, or take the place of the initial object before the object is actually selected such that by moving into the active area or by moving in a direction such that a commit to the object occurs, and simultaneously causes the subobjects or submenus to move into a position ready to be selected by just moving in their direction to cause selection or activation or both, or by moving in their direction until reaching an active area in proximity to the objects such that selection, activation or a combination of the two occurs. The selection object and the selectable objects (menu objects) are each assigned a mass equivalent or gravitational value of 1. The difference between what happens as the selection object moves in the display area towards a selectable object in the present interface, as opposed to real life, is that the selectable objects only feel the gravitation effect from the selection object and not from the other selectable objects. Thus, in the present invention, the selectable object is an attractor, while the selectable objects are non-interactive, or possibly even repulsive to each other. So as the selection object is moved in response to motion by a user within the motion sensors active zone—such as motion of a finger in the active zone—the processing unit maps the motion and generates corresponding movement or motion of the selection object towards selectable objects in the general direction of the motion. The processing unit then determines the projected direction of motion and based on the projected direction of motion, allows the gravitational field or attractive force of the selection object to be felt by the predicted selectable object or objects that are most closely aligned with the direction of motion. These objects may also include submenus or subobjects that move in relation to the movement of the selected object(s). This effect would be much like a field moving and expanding or fields interacting with fields, where the objects inside the field(s) would spread apart and move such that unique angles from the selection object become present so movement towards a selectable object or group of objects can be discerned from movement towards a different object or group of objects, or continued motion in the direction of the second or more of objects in a line would cause the objects to not be selected that had been touched or had close proximity, but rather the selection would be made when the motion stops, or the last object in the direction of motion is reached, and it would be selected. The processing unit causes the display to move those object toward the selectable object. The manner in which the selectable object moves may be to move at a constant velocity towards a selection object or to accelerate toward the selection object with the magnitude of the acceleration increasing as the movement focuses in on the selectable object. The distance moved by the person and the speed or acceleration may further compound the rate of attraction or movement of the selectable object towards the selection object. In certain situations, a negative attractive force or gravitational effect may be used when it is more desired that the selected objects move away from the user. Such motion of the objects would be opposite of that described above as attractive. As motion continues, the processing unit is able to better discriminate between competing selectable objects and the one or ones more closely aligned are pulled closer and separated, while others recede back to their original positions or are removed or fade. If the motion is directly toward a particular selectable object with a certainty above a threshold value, which has a certainty of greater than 50%, then the selection and selectable objects merge and the selectable object is simultaneously selected and activated. Alternatively, the selectable object may be selected prior to merging with the selection object if the direction, angle, distance/displacement, duration, speed and/or acceleration of the selection object is such that the probability of the selectable object is enough to cause selection, or if the movement is such that proximity to the activation area surrounding the selectable object is such that the threshold for selection, activation or both occurs. Motion continues until the processing unit is able to determine that a selectable object has a selection threshold of greater than 50%, meaning that it more likely than not the correct target object has been selected. In certain embodiments, the selection threshold will be at least 60%. In other embodiments, the selection threshold will be at least 70%. In other embodiments, the selection threshold will be at least 80%. In yet other embodiments, the selection threshold will be at least 90%.

in certain embodiments, the selection object may actually appear on the display screen, while in other embodiments, the selection object may exist only virtually in the processor software. For example, for motion sensors that require physical contact for activation such as touch screens, the selection object may be displayed and/or virtual, with motion on the screen used to determine which selectable objects from a default collection of selectable objects will be moved toward a perceived or predefined location of a virtual section object or toward the selection object in the case of a displayed selection object, while a virtual object simply exists in software such as at a center of the display or a default position to which selectable object are attracted, when the motion aligns with their locations on the default selection. In the case of motion sensors that have active zones such as cameras, IR sensors, sonic sensors, or other sensors capable of detecting motion within an active zone and creating an output representing that motion to a processing unit that is capable of determining direction, angle, distance/displacement, duration, speed and/or acceleration properties of the sensed or detected motion, the selection object is generally virtual and motion of one or more body parts of a user is used to attract a selectable object or a group of selectable objects to the location of the selection object and predictive software is used to narrow the group of selectable objects and zero in on a particular selectable object, objects, objects and attributes, and/or attributes. In certain embodiments, the interface is activated from a sleep condition by movement of a user or user body part in to the active zone of the motion sensor or sensors associated with the interface. Once activated, the feedback unit such as a display associated with the interface displays or evidences in a user discernible manner a default set of selectable objects or a top level set of selectable objects. The selectable objects may be clustered in related groups of similar objects or evenly distributed about a centroid of attraction if no selection object is generated on the display or in or on another type of feedback unit. If one motion sensor is sensitive to eye motion, then motion of the eyes will be used to attract and discriminate between potential target objects on the feedback unit such as a display screen. If the interface is an eye only interface, then eye motion is used to attract and discriminate selectable objects to the centroid, with selection and activation occurring when a selection threshold is exceeded-greater than 50% confidence that one selectable object is more closely aligned with the direction of motion than all other objects. The speed and/or acceleration of the motion along with the direction are further used to enhance discrimination by pulling potential target objects toward the centroid quicker and increasing their size and/or increasing their relative separation. Proximity to the selectable object may also be used to confirm the selection. Alternatively, if the interface is an eye and other body part interface, then eye motion will act as the primary motion driver, with motion of the other body part acting as a confirmation of eye movement selections. Thus, if eye motion has narrowed the selectable objects to a group, which may or may not dynamically change the perspective of the user (zoom in/out, pan, tilt, roll, or any combination of changes) motion of the other body part may be used by the processing unit to further discriminate and/or select/activate a particular object or if a particular object meets the threshold and is merging with the centroid, then motion of the object body part may be used to confirm or reject the selection regardless of the threshold confidence. In other embodiments, the motion sensor and processing unit may have a set of predetermined actions that are invoked by a given structure of a body part or a given combined motion of two or more body parts. For example, upon activation, if the motion sensor is capable of analyzing images, a hand holding up different number of figures from zero, a fist, to five, an open hand may cause the processing unit to display different base menus. For example, a first may cause the processing unit to display the top level menu, while a single finger may cause the processing unit to display a particular submenu. Once a particular set of selectable objects is displayed, then motion attracts the target object, which is simultaneously selected and activated. In other embodiments, confirmation may include a noised generated by the uses such as a word, a vocal noise, a predefined vocal noise, a clap, a snap, or other audio controlled sound generated by the user; in other embodiments, confirmation may be visual, audio or haptic effects or a combination of such effects. In certain embodiments, the confirmation may be dynamic, a variable sound, color, shape, feel, temperature, distortion, or any other effect or combination of thereof.

Scroll Wheels

In other embodiments, the methods for implementing the apparatuses, systems, and/or interfaces include the steps of sensing circular movement via a motion sensor, where the circular movement is sufficient to activate a scroll wheel for scrolling through a list associated with the scroll wheel, where movement close to a center of a display zone (area or volume) causes a faster scroll, while movement further from the center causes a slower scroll and simultaneously faster circular movement causes a faster scroll while slower circular movement causes slower scroll. When the user stops or pauses the circular motion, even for a very brief period of time-less than or equal to a second, or changes direction such that the systems, apparatuses, and/or interfaces may discern that the movement is no longer circular such as moving in a linear direction, e.g., moving in an x-direction, a y-direction, a z-direction axis, a linear direction in an the xy plane or a linear direction in an xyz volume) the objects or list members becomes static so that the user may move to a particular object or member, hold over a particular object or member, or change motion direction at or near a particular object or member. The whole wheel or a partial amount or portion of the wheel may be displayed or just an arc may be displayed, where scrolling moves along the arc so that movement in one direction along the arc scroll up or left and movement in the other direction along the arc scrolls down or right. These actions cause the processing unit to select the particular object or member, to simultaneously select and activate the particular object or member, or to simultaneously select, activate, and control an attribute of the object or member. By beginning the circular motion again, anywhere on the screen, scrolling recommences immediately. Of course, scrolling could be through a list of values, or actually be controlling values as well, and all motions may be in 2D, 3D, or nD environments as well.

Spaced Apart Selectable Object Selection Formats

In other embodiments, the methods for implementing the apparatuses, systems, and/or interfaces include the steps of displaying a spaced apart layout or format of selectable objects on a display field, sensing movement toward a particular selectable object pulling the object toward a user location, a movement location, the user, the movement, or a center based on a direction, a distance/displacement, a duration, a velocity and/or an acceleration of the movement, as the selected object moves toward user, movement or the center, subobjects appear distributed in a spaced apart form or configuration about the selected object. The apparatus, system, and/or interface and methods implementing them may repeat the sensing and displaying operations. In all cases, singular or multiple subobjects or submenus may be displayed between the user and the primary object, behind, below, or anywhere else as desired for the interaction effect. The space apart layout, format, arrangement or configuration may be an arcuate arrangement, a linear arrangement, a grid arrangement, or any other spaced apart arrangement of selectable objects.

In other embodiments, the methods for implementing the apparatuses, systems, and/or interfaces include the steps of predicting an object's selection based on the properties of the sensed movement, where the properties includes direction, angle, distance/displacement, duration, velocity (speed and direction), acceleration (magnitude and direction), changes to one, some or all of these, or combinations thereof. For example, a faster velocity may increase predictability, while slower velocity may decrease predictability or vis-a-versa. Alternatively, moving averages may be used to extrapolate the object to be selected. These averages may include direction averages, distance/displacement averages, duration averages, velocity averages, acceleration averages, linear movement averages, non-linear movement averages, angular averages, and/or any other movement averages. The averaging procedures may include filters or may include averaging outputs form multiple sensors. Additionally, the systems, apparatuses, and/or interfaces may couple "gravitational", "electric" and/or "magnetic" attractive or repulsive effects to attract or repel selectable objects towards or away from the user, the movement or the selection object that are most aligned with the movement and/or the movement properties, where the degree of attraction or repulsion may be proportional to the magnitude of the velocity and/or the acceleration. Additionally, the effected object or objects may be highlighted in some way such as an increase in a size, a change in visual properties, a change in sound properties, a change in audiovisual properties, and/or a change in any other display or output properties associated with the object or objects. This may also occur by the user beginning movement towards a particular selectable object, the particular selectable object begins to accelerate towards the user or the selection object, and the user and the selection object stops moving, but the particular selectable object continues to accelerate towards the user or selection object. In the certain embodiments, the opposite effect occurs as the user or selection objects moves away-starting close to each other, the particular selectable object moves away quickly, but slows down its rate of repulsion as distance is increased, making a very smooth look. Thus, a magnitude of the attraction and/or repulsion effect may decrease or increase in proportion of the distance between the selection object, where the proportion may be similar to gravity decreasing as the square of the distance, may be compound being very strong with the distance is small such as the strong force attraction and then weaker like the electromagnetic force when the distance is greater, or any other proportionality. In different uses, the particular selectable object may accelerate away or return immediately to its original or predetermined position. In any of these circumstances, a dynamic interaction is occurring between the user or selection object and the particular selectable object(s), where selecting and controlling, and deselecting and controlling may occur, including selecting and controlling or deselecting and controlling associated submenus or subobjects and/or associated attributes, adjustable or invocable.

User Identification Using User Bio-Metric, Kinetic, and/or Bio-Kinetic Characteristics In other embodiments, the methods for implementing the apparatuses, systems, and/or interfaces include the steps of detecting at least one bio-kinetic characteristic of a user such as a fingerprint, fingerprints, a palm print, retinal print, size, shape, and texture of fingers, palm, eye(s), hand(s), face, etc. or at least one EMF, acoustic, thermal or optical characteristic detectable by sonic sensors, thermal sensors, optical sensors, capacitive sensors, resistive sensors, or other sensor capable of detecting EMF fields, other dynamic waveforms, or other characteristics, or combinations thereof emanating from or associated with a user, including specific movements and measurements of movements of body parts such as fingers or eyes that provide unique markers for each individual, determining an identity of the user from the bio-kinetic characteristics, and sensing movement as set forth herein once the user identity has been verified. User identification may be used by the apparatuses, systems, and/or interfaces adapt the apparatuses, systems, and/or interfaces to the particular user, where each user having access to a given apparatuses, systems, and/or interfaces may have preference characteristics associated with their use of the apparatuses, systems, and/or interfaces. In this way, the existing sensors for motion may also recognize the user uniquely, as well as the motion event associated with the user. This recognition may be further enhanced by using two or more body parts, two or more user bio-metric character-istics, two or more user kinetic characteristics, and/or two or bio-kinetic characteristics (e.g., two fingers), and even fur-ther by having the user performing a particular body part(s) task such as squeezing fingers or fingers and the thumb together, when the user enters in an active sensor zone. Other bio-kinetic, kinetic and/or biometric characteristics may also be used for unique user identification such as skin charac-teristics and ratio to joint length and spacing. Further examples include the relationship between the finger(s), hands or other body parts and the wave, acoustic, magnetic, EMF, or other interference pattern created by the body parts creates a unique constant and may be used as a unique digital signature. For instance, a finger in a 3D acoustic or EMF field would create unique null and peak points or a unique null and peak pattern, so the "noise" of interacting with a field may actually help to create unique identifiers. This may be further discriminated by moving a certain distance, where the motion may be uniquely identified by small tremors, variations, or the like, further magnified by interference patterns in the noise. This type of unique identification maybe used in touch and touchless applications, but may be most apparent when using a touchless sensor or an array of touchless sensors, where interference patterns (for example using acoustic sensors) may be present due to the size and shape of the hands or fingers, or the like. Further uniqueness may be determined by including motion as another unique variable, which may help in security verification. Further-more, by establishing a base user's bio-kinetic signature or authorization, slight variations per bio-kinetic transaction or event may be used to uniquely identify each event as well, so a user would be positively and uniquely identified to authorize a merchant transaction, but the unique speed, angles, and variations, even at a wave form and/or wave form noise level could be used to uniquely identify one transaction as compared to another.

In other embodiments, the methods for implementing the apparatuses, systems, and/or interfaces include the steps of sensing movement of a first body part such as an eye, etc., tracking the first body part movement until is stops, pauses or holds on an object, within an active zone of an object, or sufficient close to the active zone of the object to insure select certainty to a threshold degree of certainty, prelimi-narily selecting the object, sensing movement of a second body part such as finger, hand, foot, etc., confirming the preliminary selection and selecting the object. The selection may then cause the processing unit to invoke one of the command and control functions including issuing a scroll function, a simultaneous select and scroll function, a simul-taneous select and activate function, a simultaneous select, activate, and attribute adjustment function, or a combination thereof, and controlling attributes by further movement of the first or second body parts or activating the objects if the object is subject to direct activation. These procedures may be include tracking eye movement to initiate a scrolling function through a list by moving toward the list or over the list and tracking movement of another body part to select a particular member of the list. Thus, the requisite movement to scroll and select or select and confirm may involve movement of two or more body parts, which are used to invoke one of the command and control functions of this disclosure-selection and activation, selection and attribute adjustment, selection and submenu or object scrolling, or combination thereof. In certain embodiments, if the object configuration is predetermined such that an object is in the middle of several other objects, then once scrolling begins, the systems, apparatuses, and/or interfaces may release the eyes so that the eyes may move somewhere else for per-forming other actions, while hand motion continues to scroll, select and/or control attributes or combinations thereof, independent of eye movement. Thus, the systems, apparatuses, and/or interfaces may use hand and eye move-ment (movement of two or more body parts) in a cooperative manner, in a coupled manner, or in an independent manner to cause the systems, apparatuses, and/or interfaces to con-trol controllable object in different ways. The movements may be independent, coupled, compound, sequential, simul-taneous or concurrent, and/or complex, i.e., combining one or more of independent, coupled, compound, sequential, or simultaneous or concurrent movements.

In other embodiments, the methods for implementing the apparatuses, systems, and/or interfaces include the steps of capturing a movement of a user during a selection procedure or a plurality of selection procedures to produce a raw user movement dataset. The methods also include the step of reducing the raw user movement dataset to produce a refined user movement dataset, where the refinement may include reducing the movement to a plurality of linked vectors, to a fit curve, to a spline fit curve, to any other curve fitting format having reduced storage size, a reduced data point collection, or to any other fitting format. The methods also include the step of storing the raw user movement dataset or the refined user movement dataset in an appropriate database for storage, retrieval, and/or use by the systems, apparatuses, interfaces, and/or methods of this disclosure. The methods also include the step of analyzing the refined user movement dataset and/or refined user movement dataset to produce a predictive tools for improving the prediction of a user's selection procedure using the motion based systems, appa-ratuses, and/or interfaces to produce a forensic tool for identifying the past behavior of the user or to produce a training tool for training the user interface to improve user interaction.

In other embodiments, the methods for implementing the apparatuses, systems, and/or interfaces include the steps of sensing movement of a plurality of body parts simultane-ously or substantially simultaneously and converting the sensed movement into control functions for simultaneously controlling an object or a plurality of objects. The methods and systems also include controlling an attribute or a plu-rality of attributes, or activating an object or a plurality of objects, or any combination thereof. For example, placing a hand on a top of a domed surface for controlling a UAV, sensing movement of the hand on the dome, where a direction of movement correlates with a direction of flight, sensing changes in the movement on the top of the domed surface, where the changes correlate with changes in direc-tion, angle, distance/displacement, duration, speed, or accel-eration of functions, and simultaneously sensing movement of one or more fingers, where movement of the fingers may control other features of the UAV such as pitch, yaw, roll, camera focusing, missile firing, etc. with an independent finger(s) movement, while the hand, palm or other designated area of the hand is controlling the UAV, either through remaining stationary (continuing last known command) or while the hand is moving, accelerating, or changing distance, displacement (in 2D or 3D or in a flexible or deformable medium), or direction of acceleration. In certain embodiments where the display device is flexible device such as a flexible screen or flexible dome, the movement may also include deforming the surface of the flexible device, changing a pressure on the surface, inside the volume of the dome, or similar surface and/or volumetric deformations. These deformations may be used in conjunction with the other motions.

In other embodiments, the methods for implementing the apparatuses, systems, and/or interfaces include the steps of populating a display field with displayed primary objects and hidden secondary objects, where the primary objects include menus, programs, applications, attributes, devices, etc. and secondary objects include submenus, attributes, preferences, etc. The methods and systems also include sensing movement, highlighting one or more primary objects most closely aligned with a direction of the movement, predicting a primary object based on the movement, and simultaneously: (a) selecting the primary object, (b) displaying secondary objects most closely aligned with the direction of motion in a spaced apart configuration, (c) pulling the primary and secondary objects toward a center of the display field or to a pre-determined area of the display field, and/or (d) removing, fading, or making inactive the unselected primary and secondary objects until making active again.

Alternately, zones in between primary and/or secondary objects may act as activating areas or subroutines that would act the same as the objects. For instance, if someone were to move in between two objects in 2D (a watch or mobile device), 3D space (virtual reality environments and altered reality environments), nD space (n-dimensional space such as x, y, z, t space represented in VR or AR environments) objects in the background may be rotated to the front and the front objects may be rotated towards the back, or to a different level.

In other embodiments, the methods for implementing the apparatuses, systems, and/or interfaces include the steps of populating a display field with displayed primary objects and offset active fields associated with the displayed primary objects, where the primary objects include menus, object lists, alphabetic characters, numeric characters, symbol characters, other text based characters. The methods and systems also include sensing movement, highlighting one or more primary objects most closely aligned with a direction of the movement, predicting a primary object based on the movement, context, and/or movement and context, and simultaneously: (a) selecting the primary object, (b) displaying secondary (tertiary or deeper) objects most closely aligned with the direction of motion in a spaced apart configuration, (c) pulling the primary and secondary or deeper objects toward a center of the display field or to a pre-determined area of the display field, and/or (d) removing, making inactive, or fading or otherwise indicating non-selection status of the unselected primary, secondary, and deeper level objects.

In other embodiments, the methods for implementing the apparatuses, systems, and/or interfaces include the steps of sensing movement of an eye and simultaneously moving elements of a list within a fixed window or viewing pane of a display field or a display or an active object hidden or visible through elements arranged in a 2D, 3D, and/or nD matrix within the display field, where eye movement anywhere, in any direction in a display field regardless of the arrangement of elements such as icons moves through the set of selectable objects. Of course the window may be moved with the movement of the eye to accomplish the same scrolling through a set of lists or objects, or a different result may occur by the use of both eye position in relation to a display or volume (perspective), as other motions occur, simultaneously or sequentially. Thus, scrolling does not have to be in a linear fashion, the intent is to select an object and/or attribute and/or other selectable items regardless of the manner of motion-linear, arcuate, angular, circular, spiral, random, or the like. Once an object of interest is to be selected, then selection is accomplished either by movement of the eye in a different direction, holding the eye in place for a period of time over an object, movement of a different body part, or any other movement or movement type that affects the selection of an object, attribute, audio event, facial posture, and/or biometric or bio-kinetic event. These same steps may be used with body only or a combination of multiple body parts and eye or head gaze or movement.

In other embodiments, the methods for implementing the apparatuses, systems, and/or interfaces include the steps of sensing movement of an eye, selecting an object, an object attribute or both by moving the eye in a pre-described change of direction such that the change of direction would be known and be different than a random eye movement, or a movement associated with the scroll (scroll being defined by moving the eye all over the screen or volume of objects with the intent to choose). Of course the eye may be replaced by any body part or object under the control of a body part.

In other embodiments, the methods for implementing the apparatuses, systems, and/or interfaces include the steps of sensing eye movement via a motion sensor, selecting an object displayed in a display field when the eye pauses at an object for a dwell time sufficient for the motion sensor to detect the pause and simultaneously activating the selected object, repeating the sensing and selecting until the object is either activatable or an attribute capable of direct control. In certain embodiments, the methods also comprise predicting the object to be selected from characteristics of the movement and/or characteristics of the manner in which the user moves. In other embodiments, eye tracking-using gaze instead of motion for selection/control via eye focusing (dwell time or gaze time) on an object and a body motion (finger, hand, etc.) scrolls through an associated attribute list associated with the object, or selects a submenu associated with the object. Eye gaze selects a submenu object and body motion confirms selection (selection does not occur without body motion), so body motion actually affects object selection.

In other embodiments, eye tracking-using motion for selection/control-eye movement is used to select a first word in a sentence of a word document. Selection is confirmed by body motion of a finger (e.g., right finger) which holds the position. Eye movement is then tracked to the last word in the sentence and another finger (e.g., the left finger) confirms selection. Selected sentence is highlighted due to second motion defining the boundary of selection. The same effect may be had by moving the same finger towards the second eye position (the end of the sentence or word). Movement of one of the fingers towards the side of the monitor (movement is in different direction than the confirmation move) sends a command to delete the sentence. Alternatively, movement of eye to a different location, followed by both fingers moving generally towards that location results in the sentence being copied to the location at which the eyes stopped. This may also be used in combination with a gesture or with combinations of motions and gestures such as eye movement and other body movements concurrently-multiple inputs at once such as UAV controls described below.

Other embodiments of this disclosure relate to methods and systems for implementing the methods comprising the steps of: controlling a helicopter with one hand on a domed interface, where several fingers and a hand all move together or move separately. In this way, the whole movement of the hand controls the movement of the helicopter in altitude, direction, yaw, pitch, and roll, while the fingers may also move simultaneously to control cameras, artillery, or other controls or attributes, or both. Thus, the systems, apparatuses and interfaces may process multiple movement outputs from one or a plurality of motion sensors simultaneously, congruently, or sequentially, where the movements may be dependent, partially dependent, partially coupled, fully coupled, partially independent or fully independently. The term dependent means that one movement is dominant and all other movements are dependent on the dominant movement. For examples, in control of a UAV or traversing a VR/AR environment, the set of controllables may including altitude, direction, angle, distance/displacement, duration, speed, velocity, acceleration, yaw, pitch, roll, etc., where in certain circumstances, altitude may be the dominate controllable and all other are dependent on the altitude being so that all other controllables are performed at a designated altitude. The term partially dependent means that a set of movement outputs include a dominate output and the other member of the set are dependent on the dominant movement. For example considering the same set of controllables, velocity and altitude may be independent and other sets tied to each one of them. The term partially coupled means that some of the movement outputs are coupled to each other so that they act in a pre-defined or predetermine manner, while other are independent. For example considering the same controllables, altitude, direction, angle, distance/displacement, duration, velocity and acceleration may be coupled as the UAV is traveling a predefined path, while the other controllables are independently controllable. The term fully coupled means that all of the movement outputs are coupled to each other so that they act in a pre-defined or predetermine manner. For example, all of the UAV sensors may all be coupled so that all of the sensors are tracking one specific target. The term partially independent means that some of the movement outputs are independent, while some are either dependent or coupled. For example, all of the sensor may be tracking one specific target, while the UAV positioning controls may all be independently controlled. The term fully independent means that each movement output is processed independently of the other outputs.

In other embodiments, looking at the center of picture or article and then moving one finger away from center of picture or center of body enlarges the picture or article (zoom in). Moving finger towards center of picture makes picture smaller (zoom out). What is important to understand here is that an eye gaze point, a direction of gaze, or a motion of the eye provides a reference point for body motion and location to be compared. For instance, moving a body part (say a finger) a certain distance away from the center of a picture in a touch or touchless, 2D or 3D environment (area or volume as well), may provide a different view. For example, if the eye(s) were looking at a central point in an area, one view would appear, while if the eye(s) were looking at an edge point in an area, a different view would appear. The relative distance or angle of the motion would change, and the relative direction or angle may change as well, and even a dynamic change involving both eye(s) and finger, could provide yet another change of motion. For example, by looking at the end of a stick and using the finger to move the other end of it, the pivot point would be the end the eyes were looking at. By looking at the middle of the stick, then using the finger to rotate the end, the stick would pivot around the middle. Each of these movement may be used to control different attributes of a picture, screen, display, window, or volume of a 3D projection, etc. What now takes two fingers may be replaced by one due to the eye(s) acting as the missing finger.

These concepts are useable to manipulate the view of pictures, images, 3D data or higher dimensional data, 3D renderings, 3D building renderings, 3D plant and facility renderings, or any other type of 3D or higher dimensional (nD) pictures, images, or renderings. These manipulations of displays, pictures, screens, etc. may also be performed without the coincidental use of the eye, but rather by using the motion of a finger or object under the control or a user, such as by moving from one lower corner of a bezel, screen, or frame (virtual or real) diagonally to the opposite upper corner to control one attribute, such as zooming in, while moving from one upper corner diagonally to the other lower corner would perform a different function, for example zooming out. This motion may be performed as a gesture, where the attribute change might occur in at predefined levels, or may be controlled variably so the zoom in/out function may be a function of time, space, and/or distance. By moving from one side or edge to another, the same predefined level of change, or variable change may occur on the display, picture, frame, or the like. For example, a TV screen displaying a picture and zoom-in may be performed by moving from a bottom left corner of the frame or bezel, or an identifiable region (even off the screen) to an upper right portion. As the user moves, the picture is magnified (zoom-in). By starting in an upper right corner and moving toward a lower left, the system causes the picture to be reduced in size (zoom-out) in a relational manner to the distance or speed the user moves. If the user makes a quick diagonally downward movement from one upper corner to the other lower corner, the picture may be reduced by 50% (for example). This eliminates the need for using two fingers that is currently popular as a pinch/zoom function.

By the user moving from a right side of the frame or bezel or predefined location towards a left side, an aspect ratio of the picture may be changed so as to make the picture tall and skinny. By moving from a top edge toward a bottom edge, the picture may cause the picture to appear short and wide. By moving two fingers from one upper corner diagonally towards a lower corner, or from side to side, a "cropping" function may be used to select certain aspects of the picture.

By taking one finger and placing it near the edge of a picture, frame, or bezel, but not so near as to be identified as desiring to use a size or crop control, and moving in a rotational or circular direction, the picture could be rotated variably, or if done in a quick gestural motion, the picture might rotate a predefined amount, for instance 90 degrees left or right, depending on the direction or angle of the motion.

By moving within a central area of a picture, the picture may be moved "panned" variably by a desired amount or panned a preset amount, say 50% of the frame, by making a gestural or dynamic motion in the direction of desired panning. Likewise, these same motions may be used in a 3D environment for simple manipulation of object attributes. These are not specific motions using predefined pivot points as is currently used in CAD programs, but is rather a way of using the body (eyes or fingers for example) in broad areas. These same motions may be applied to any display, projected display or other similar device. In a mobile device, where many icons (objects) exist on one screen, where the icons include folders of "nested" objects, by moving from one lower corner of the device or screen diagonally toward an upper corner, the display may zoom in, meaning the objects would appear magnified, but fewer would be displayed. By moving from an upper right corner diagonally downward, the icons would become smaller, and more could be seen on the same display. Moving in a circular motion near an edge of the display may cause rotation of the icons, providing scrolling through lists and pages of icons. Moving from one edge to an opposite edge would change the aspect ratio of the displayed objects, making the screen of icons appear shorter and wider, or taller and skinny, based on the direction moved.

In other embodiments, looking at a menu object then moving a finger away from object or center of body opens up sub menus. If the object represents a software program such as excel, moving away opens up spreadsheet fully or variably depending on how much movement is made (expanding spreadsheet window).

In other embodiments, instead of being a program accessed through an icon, the program may occupy part of a 3D space that the user interacts with or a field coupled to the program acting as a sensor for the program through which the user to interacts with the program. In other embodiments, if object represents a software program such as Excel and several (say 4) spreadsheets are open at once, movement away from the object shows 4 spread sheet icons. The effect is much like pulling curtain away from a window to reveal the software programs that are opened. The software programs might be represented as "dynamic fields", each program with its own color, say red for excel, blue for word, etc. The objects or aspects or attributes of each field may be manipulated by using motion. For instance, if a center of the field is considered to be an origin of a volumetric space about the objects or value, moving at an exterior of the field cause a compound effect on the volume as a whole due to having a greater x value, a greater y value, or a great z value—say the maximum value of the field is 5 (x, y, or z), moving at a 5 point would be a multiplier effect of 5 compared to moving at a value of 1 (x, y, or z) providing a gradient of values to interact with. The inverse may also be used, where moving at a greater distance from the origin may provide less of an effect on part or the whole of the field and corresponding values. Changes in color, shape, size, density, audio characteristics, or any combination of these and other forms of representation of values could occur, which may also help the user or users to understand the effects of motion on the fields. These may be preview panes of the spreadsheets or any other icons representing these. Moving back through each icon or moving the finger through each icon or preview pane, then moving away from the icon or center of the body selects the open programs and expands them equally on the desktop, or layers them on top of each other, etc. These actions may be combined, i.e., in AR/VR environments, where motion of the eyes and finger and another hand (or body) may be each or in combination have a predetermined axis or axes to display menus and control attributes or choices that may be stationary or dynamic, and may interact with each other, so different combinations of eye, body and hand may provide the same results (redundantly), or different results based on the combination or sequence of motions and holds, gazes, and even pose or posture in combination with these. Thus, motion in multiple axes may move in compound ways to provide redundant or different effects, selection and attribute controls.

In other embodiments, four word documents (or any program or web pages) are open at once. Movement from bottom right of the screen to top left reveals the document at bottom right of page, effect looks like pulling curtain back. Moving from top right to bottom left reveals a different document. Moving from across the top, and circling back across the bottom opens all, each in its quadrant, then moving through the desired documents and creating circle through the objects links them all together and merges the documents into one document. As another example, the user opens three spreadsheets and dynamically combines or separates the spreadsheets merely via motions or movements, variably per amount and direction, angle, distance/displacement, and/or duration of the motion or movement. Again, the software or virtual objects are dynamic fields, where moving in one area of the field may have a different result than moving in another area, and the combining or moving through the fields causes a combining of the software programs, and may be done dynamically. Furthermore, using the eyes to help identify specific points in the fields (2D or 3D) would aid in defining the appropriate layer or area of the software program (field) to be manipulated or interacted with. Dynamic layers within these fields may be represented and interacted with spatially in this manner. Some or all the objects may be affected proportionately or in some manner by the movement of one or more other objects in or near the field. Of course, the eyes may work in the same manner as a body part or in combination with other objects or body parts. In all cases, contextual, environmental, prioritized, and weighted averages or densities and probabilities my affect the interaction and aspect view of the field and the data or objects associated with the field(s). For instance, creating a graphic representation of values and data points containing RNA, DNA, family historical data, food consumption, exercise, etc., would interact differently if the user began interacting closer to the RNA zone than to the food consumption zone, and the filed would react differently in part or throughout as the user moved some elements closer to others or in a different sequence from one are to another. This dynamic interaction and visualization would be expressive of weighted values or combinations of elements to reveal different outcomes.

In other embodiments, the eye selects (acts like a cursor hovering over an object and object may or may not respond, such as changing color to identify it has been selected), then a motion or gesture of eye or a different body part confirms and disengages the eyes for further processing.

In other embodiments, the eye selects or tracks and a motion or movement or gesture of second body part causes a change in an attribute of the tracked object-such as popping or destroying the object, zooming, changing the color of the object, etc. finger is still in control of the object.

In other embodiments, eye selects, and when body motion and eye motion are used, working simultaneously or sequentially, a different result occurs compared to when eye motion is independent of body motion, e.g., eye(s) tracks a bubble, finger moves to zoom, movement of the finger selects the bubble and now eye movement will rotate the bubble based upon the point of gaze or change an attribute of the bubble, or the eye may gaze and select and/or control a different object while the finger continues selection and/or control of the first objector a sequential combination could occur, such as first pointing with the finger, then gazing at a section of the bubble may produce a different result than looking first and then moving a finger; again a further difference may occur by using eyes, then a finger, then two fingers than would occur by using the same body parts in a different order.

In other embodiments, the methods for implementing the apparatuses, systems, and/or interfaces include the steps of: controlling helicopter with one hand on a domed interface, where several fingers and hand all move together and move separately. In this way, the whole movement of the hand controls the movement of the helicopter in yaw, pitch and roll, while the fingers may also move simultaneously to control cameras, artillery, or other controls or attributes, or both. This is movement of multiple inputs simultaneously congruently or independently.

In certain embodiments, the perspective of the user as gravitational effects and object selections are made in 3D space. For instance, as we move in 3D space towards subobjects, using our previously submitted gravitational and predictive effects, each selection may change the entire perspective of the user so the next choices are in the center of view or in the best perspective. This may include rotational aspects of perspective, the goal being to keep the required movement of the user small and as centered as possible in the interface real estate. This is really showing the aspect, viewpoint or perspective of the user, and is relative. Since we are saying the objects and fields may be moved, or saying the user may move around the field, it is really a relative.

In other embodiments, the methods for implementing the apparatuses, systems, and/or interfaces include the steps of sensing movement of a button or knob with motion controls associated therewith, either on top of or in 3D, 3 space, on sides (whatever the shape), predicting which gestures are called by direction, distance/displacement, angle, duration, and/or speed of motion (maybe amendment to gravitational/ predictive application). By definition, a gesture has a pose-movement-pose then lookup table, then command if values equal values in lookup table. We can start with a pose, and predict the gesture by beginning to move in the direction of the final pose. As we continue to move, we would be scrolling through a list of predicted gestures until we can find the most probable desired gesture, causing the command of the gesture to be triggered before the gesture is completed. Predicted gestures could be dynamically shown in a list of choices and represented by objects or text or colors or by some other means in a display. As we continue to move, predicted end results of gestures would be dynamically displayed and located in such a place that once the correct one appears, movement towards that object, representing the correct gesture, would select and activate the gestural command. In this way, a gesture could be predicted and executed before the totality of the gesture is completed, increasing speed and providing more variables for the user.

For example, in a keyboard application, current software use shapes of gestures to predict words. Google uses zones of letters (a group of letters), and combinations of zones (gestures) to predict words. We would use the same gesture-based system, except we be able to predict which zone the user is moving towards based upon one or more movement properties, meaning we would not have to actually move into the zone to finish the gesture, but moving towards the zone would select or bring up choice bubbles, and moving towards the bubble would select that bubble. Once a word is chosen, a menu of expanding option could show, so one could create a sentence by moving through a sentence "tree".

In another example, instead of using a gesture such as "a pinch" gesture to select something in a touchless environment, movement towards making that gesture would actually trigger the same command. So instead of having to actually touch the finger to the thumb, just moving the finger towards the thumb would cause the same effect to occur. Most helpful in combination gestures where a finger pointing gesture is followed by a pinching gesture to then move a virtual object. By predicting the gesture, after the point gesture, the beginning movement of the pinch gesture would be faster than having to finalize the pinching motion.

In other embodiments, the methods for implementing the apparatuses, systems, and/or interfaces include the steps of: sensing movement via a motion sensor within a display field displaying a list of letters from an alphabet, predicting a letter or a group of letters based on the motion, if movement is aligned with a single letter, simultaneously select the letter or simultaneously moving the group of letter forward until a discrimination between letters in the group is predictively certain and simultaneously select the letter, sensing a change in one or more movement properties, predicting a second letter or a second group of letter based on the motion, if movement is aligned with a single letter, simultaneously select the letter or simultaneously moving the group of letter forward until a discrimination between letters in the group is predictively certain and simultaneously select the letter, either after the first letter selection or the second letter selection or both, display a list of potential words beginning with either the first letter or the second letter, selecting a word from the word list by movement of a second body part simultaneously selected the word and resetting the original letter display, and repeating the steps until a message is completed.

Thus, the current design selects a letter simply by changing one or more motion properties at or near a letter. A faster process would be to use movement toward a letter, then changing one or more movement properties before reaching the letter and moving towards a next letter and changing one or more movement properties again before getting to the next letter would better predict words, and might change the first letter selection. Selection bubbles would appear and be changing while moving, so one or more movement properties may be used to predict the word, not necessarily having to move over the exact letter or very close to it, though moving over the exact letter would be a positive selection of that letter and this effect could be better verified by a slight pausing or slowing down of movement. (Of course, this could be combined with current button like actions or lift-off events (touch-up events), and more than one finger or hand may be used, both simultaneously or sequentially to provide the spelling and typing actions.) This is most effective in a touchless environment where relative motion can be leveraged to predict words on a keyboard rather than the actual distance required to move from key to key. The distance from a projected keyboard and movement of finger uses angles of motion to predict letters. Predictive word bubbles can be selected with a Z movement. B) Move below the letters of a keyboard to select, or shape the letter buttons in such a way that they extend downward (like a tear drop) so actual letters can be seen while selecting instead of covering the letters (the touch or active zones are offset from the actual keys. This can also be used with predictive motions to create a very fast keyboard where relative motions are used to predict keys and words while more easily being able to see the key letters. Bubbles could also appear above or besides the keys, or around them, including in an arcuate or radial fashion to further select predicted results by moving towards the suggested words.

In other embodiments, the methods for implementing the apparatuses, systems, and/or interfaces include the steps of: maintaining all software applications in an instant on configuration—on, but inactive, resident, but not active, so that once selected the application which is merely dormant, is fully activate instantaneously (or may be described as a different focus of the object), sensing movement via a motion sensor with a display field including application objects distributed on the display in a spaced apart configuration, preferably, in a maximally spaced apart configuration so that the movement results in a fast predict selection of an application object, pulling an application object or a group of application objects toward a center of the display field, if movement is aligned with a single application, simultaneously select and instant on the application, or continue monitoring the movement until a discrimination between application objects is predictively certain and simultaneously selecting and activating the application object.

Thus, the industry must begin to start looking at everything as always on and what is on is always interactive, and may have different levels of interactivity. For instance, software should be an interactive field. Excel and word should be interactive fields where motion through them can combine or select areas, which correspond to cells and texts being intertwined with the motion. Excel sheets should be part of the same 3D field, not separate pages, and should have depth so their aspects can be combined in volume. The software desktop experience needs a depth where the desktop is the cover of a volume, and rolling back the desktop from different corners reveals different programs that are active and have different colors, such as word being revealed when moving from bottom right to top left and being a blue field, excel being revealed when moving from top left to bottom right and being red; moving right to left lifts desktop cover and reveals all applications in volume, each application with its own field and color in 3D space.

In other embodiments, the apparatuses, systems, and/or interfaces include an active screen area including a delete or backspace region. When the user moves the active object (cursor) toward the delete or backspace region, then the selected objects will be released one at a time or in groups or completely depending on attributes of movement toward the delete of backspace region. Thus, if the movement is slow and steady, then the selected objects are released one at a time. If the movement is fast, then multiple selected objects are released. Thus, the delete or backspace region is variable. For example, if the active display region represents a cell phone dialing pad (with the number distributed in any desired configuration from a traditional grid configuration to a arcuate configuration about the active object, or in any other desirable configuration), when by moving the active object toward the delete or backspace region, numbers will be removed from the number, which may be displayed in a number display region of the display. Alternatively, touching the backspace region would back up one letter; moving from right to left in the backspace region would delete (backspace) a corresponding amount of letters based on the distance (and/or speed) of the movement, The deletion could occur when the motion is stopped, paused, or a lift off event is detected. Alternatively, a swiping motion (jerk, or fast acceleration) could result in the deletion (backspace) the entire word. All these may or may not require a lift off event, but the motion dictates the amount deleted or released objects such as letters, numbers, or other types of objects. The same is true with the delete key, except the direction would be forward instead of backwards. Lastly, the same may be true in a radial menu (or linear or spatial), where the initial motion towards an object or on an object, or in a zone associated with an object, that has a variable attribute. The motion associated with or towards that object would provide immediate control.

In other embodiments, the apparatuses, systems, and/or interfaces use eye movement is used to select and body part movement is used to confirm or activate the selection. Thus, eye movement is used as the selective movement, while the object remains in the selected state, then the body part movement confirms the selection and activates the selected object. Thus, specifically stated the eye or eyes look in a different direction or area, and the last selected object would remain selected until a different object is selected by motion of the eyes or body, or until a time-out deselects the object. An object may be also selected by an eye gaze, and this selection would continue even when the eye or eyes are no longer looking at the object. The object would remain selected unless a different selectable object is looked at, or unless a timeout deselects the object occurs.

In all of the embodiments set forth above, the motion or movement may also comprise lift off events, where a finger or other body part or parts are in direct contract with a touch sensitive feedback device such as a touch screen, then the acceptable forms of motion or movement will comprise touching the screen, moving on or across the screen, lifting off from the screen (lift off events), holding still on the screen at a particular location, holding still after first contact, holding still after scroll commencement, holding still after attribute adjustment to continue an particular adjustment, holding still for different periods of time, moving fast or slow, moving fast or slow or different periods of time, accelerating or decelerating, accelerating or decelerating for different periods of time, changing direction, changing speed, changing velocity, changing acceleration, changing direction for different periods of time, changing speed for different periods of time, changing velocity for different periods of time, changing acceleration for different periods of time, changing angle, distance/displacement and time or any combinations of these motions may be used by the systems and methods to invoke command and control over real world or virtual world controllable objects using on the motion only. Lift off or other events could "freeze" the state of menu, object or attribute selection, or combination of these, until another event occurs to move to a different event or state, or a time-out function resets the system or application to a preconfigured state or location. A virtual lift off could accomplish the same effect in a VR, AR or real environment, by moving in a different direction or designated direction with no physical lift off event, or by using changes in distance/displacement, speed and acceleration and time. Of course, if certain objects that are invoked by the motion sensitive processing of the systems and methods of this invention require hard select protocols-mouse clicks, finger touches, etc., the invoked object's internal function will not be augmented by the systems or methods of this invention unless the invoked object permits or supports system integration. In place of physical or virtual lift offs or confirmations could be sounds, colors or contextual or environmental triggers.

The systems and methods are disclosed herein where command functions for selection and/or control of real and/or virtual objects may be generated based on a change in velocity at constant direction, a change in direction at constant velocity, a change in both direction and velocity, a change in a rate of velocity, or a change in a rate of acceleration or a change in distance/displacement and time. Once detected by a detector or sensor, these changes may be used by a processing unit to issue commands for controlling real and/or virtual objects. A selection or combination scroll, selection, and attribute selection may occur upon the first movement. Such motion may be associated with doors opening and closing in any direction, golf swings, virtual or real world games, light moving ahead of a runner, but staying with a walker, or any other motion having compound properties such as direction, angle, distance/displacement, duration, velocity, acceleration, and changes in any one or all of these primary properties; thus, direction, angle, distance/displacement, duration, velocity, and acceleration may be considered primary motion properties, while changes in these primary properties may be considered secondary motion properties. The system may then be capable of differentially handling of primary and secondary motion properties. Thus, the primary properties may cause primary functions to be issued, while secondary properties may cause primary function to be issued, but may also cause the modification of primary function and/or secondary functions to be issued. For example, if a primary function comprises a predetermined selection format, the secondary motion properties may expand or contract the selection format.

In another example of this primary/secondary format for causing the system to generate command functions may involve an object display. Thus, by moving the object in a direction or using changes in angle, distance/displacement, velocity, acceration and time away from the user's eyes, the state of the display may change, such as from a graphic to a combination graphic and text, to a text display only, while moving side to side or moving a finger or eyes from side to side could scroll the displayed objects or change the font or graphic size, while moving the head to a different position in space might reveal or control attributes or submenus of the object. Thus, these changes in motions may be discrete, compounded, or include changes in velocity, acceleration and rates of these changes to provide different results for the user. These examples illustrate two concepts: 1) the ability to have compound motions which provide different results that the motions separately or sequentially, and (2) the ability to change states or attributes, such as graphics to text solely or in combination with single or compound motions, or with multiple inputs, such as verbal, touch, facial expressions, or bio-kinetically, all working together to give different results, or to provide the same results in different ways.

It must be recognized that the present invention while based on the use of sensed velocity, acceleration, and changes and rates of changes in these properties to effect control of real world objects and/or virtual objects, the present invention may also use other properties of the sensed motion in combination with sensed velocity, acceleration, and changes in these properties to effect control of real world and/or virtual objects, where the other properties include direction, angle, distance/displacement, duration and change in direction, angle, distance/displacement, duration of motion, where the motion has a constant velocity. For example, if the motion sensor(s) senses velocity, acceleration, changes in velocity, changes in acceleration, and/or combinations thereof that is used for primary control of the objects via motion of a primary sensed human, animal, part thereof, real world object under the control of a human or animal, or robots under control of the human or animal, then sensing motion of a second body part may be used to confirm primary selection protocols or may be used to fine tune the selected command and control function. Thus, if the selection is for a group of objects, then the secondary motion properties may be used to differentially control object attributes to achieve a desired final state of the objects.

For example, suppose the apparatuses of this invention control lighting in a building. There are banks of lights on or in all four walls (recessed or mounted) and on or in the ceiling (recessed or mounted). The user has already selected and activated lights from a selection menu using motion to activate the apparatus and motion to select and activate the lights from a list of selectable menu items such as sound system, lights, cameras, video system, etc. Now that lights has been selected from the menu, movement to the right would select and activate the lights on the right wall. Movement straight down would turn all of the lights of the right wall down—dim the lights. Movement straight up would turn all of the lights on the right wall up—brighten. The velocity of the movement down or up would control the rate that the lights were dimmed or brighten. Stopping movement would stop the adjustment or removing the body, body part or object under the user control within the motion sensing area would stop the adjustment.

For even more sophisticated control using motion properties, the user may move within the motion sensor active area to map out a downward concave arc, which would cause the lights on the right wall to dim proportionally to the arc distance from the lights. Thus, the right lights would be more dimmed in the center of the wall and less dimmed toward the ends of the wall.

Alternatively, if the movement was convex downward, then the light would dim with the center being dimmed the least and the ends the most. Concave up and convex up would cause differential brightening of the lights in accord with the nature of the curve.

Now, the apparatus may also use the velocity of the movement of the mapping out the concave or convex movement to further change the dimming or brightening of the lights. Using velocity, starting off slowly and increasing speed in a downward motion would cause the lights on the wall to be dimmed more as the motion moved down. Thus, the lights at one end of the wall would be dimmed less than the lights at the other end of the wall.

Now, suppose that the motion is a S-shape, then the light would be dimmed or brightened in a S-shaped configuration. Again, velocity may be used to change the amount of dimming or brightening in different lights simply by changing the velocity of movement. Thus, by slowing the movement, those lights would be dimmed or brightened less than when the movement is speed up. By changing the rate of velocity-acceleration-further refinements of the lighting configuration may be obtained.

Now suppose that all the lights in the room have been selected, then circular or spiral motion would permit the user to adjust all of the lights, with direction, angle, distance/displacement, duration, velocity and acceleration properties being used to dim and/or brighten all the lights in accord with the movement relative to the lights in the room. For the ceiling lights, the circular motion may move up or down in the z direction to affect the luminosity of the ceiling lights. Thus, through the sensing of motion or movement within an active sensor zone-area and especially volume, a user can use simple or complex motion to differentially control large numbers of devices simultaneously. By scrolling through the area (pointing the finger at each light) and stopping motion at each light desired, it would be selected, then moving in a different movement would allow for attribute of only the selected lights. The same would hold for virtual objects in a 2D or 3D (VR/AR) environment. Thus, a user is able to select groups of objects that may represent real or virtual objects and once the group is selected, movement of the user may adjust all object and/or device attribute collectively.

This feature is especially useful when the interface is associated with a large number of object, subobjects, and/or devices and the user wants to selected groups of these objects, subobjects, and/or devices so that they may be controlled collectively. Thus, the user may navigate through the objects, subobjects and/or devices and select any number of them by moving to each object pausing so that the system recognizes to add the object to the group. Once the group is defined, the user would be able to save the group as a predefined group or just leave it as a temporary group. Regardless, the group would not act as a single object for the remainder of the session. The group may be deselected by moving outside of the active field of sensor, sensors, and/or sensor arrays.

This differential control through the use of sensed complex motion permits a user to nearly instantaneously change lighting configurations, sound configurations, TV configurations, or any configuration of systems having a plurality of devices being simultaneously controlled or of a single system having a plurality of objects or attributes capable of simultaneous control. For examples, in a computer game including large numbers of virtual objects such as troops, tanks, airplanes, etc., sensed complex motion would permit the user to quickly deploy, redeploy, rearrangement, manipulated and generally quickly reconfigure all controllable objects and/or attributes by simply conforming the movement of the objects to the movement of the user sensed by the motion detector. This same differential device and/or object control would find utility in military and law enforcement, where command personnel by motion or movement within a sensing zone of a motion sensor quickly deploy, redeploy, rearrangement, manipulated and generally quickly reconfigure all assets to address a rapidly changing situation.

In certain embodiments, the systems, apparatuses, and/o interfaces of this disclosure include a motion sensor or sensor array, where each sensor includes an active zone and where each sensor senses movement, movement direction, movement angle, movement distance/displacement, movement duration, movement velocity, and/or movement acceleration, and/or changes in movement direction, changes in movement angle, changes in movement distance/displacement, changes in movement duration, changes in movement velocity, and/or changes in movement acceleration, and/or changes in a rate of a change in direction, angle, distance/displacement, and/or duration, changes in a rate of a change in velocity and/or changes in a rate of a change in acceleration within the active zone by one or a plurality of body parts or objects and produces an output signal. The systems also include at least one processing unit including communication software and hardware, where the processing units convert the output signal or signals from the motion sensor or sensors into command and control functions, and one or a plurality of real objects and/or virtual objects in communication with the processing units. The command and control functions comprise at least (1) a scroll function or a plurality of scroll functions, (2) a select function or a plurality of select functions, (3) an attribute function or plurality of attribute functions, (4) an attribute control function or a plurality of attribute control functions, or (5) a simultaneous control function. The simultaneous control function includes (a) a select function or a plurality of select functions and a scroll function or a plurality of scroll functions, (b) a select function or a plurality of select functions and an activate function or a plurality of activate functions, and (c) a select function or a plurality of select functions and an attribute control function or a plurality of attribute control functions. The processing unit or units (1)

processes a scroll function or a plurality of scroll functions, (2) selects and processes a scroll function or a plurality of scroll functions, (3) selects and activates an object or a plurality of objects in communication with the processing unit, or (4) selects and activates an attribute or a plurality of attributes associated with an object or a plurality of objects in communication with the processing unit or units, or any combination thereof. The objects comprise electrical devices, electrical systems, sensors, hardware devices, hardware systems, environmental devices and systems, energy and energy distribution devices and systems, software systems, software programs, software objects, or combinations thereof. The attributes comprise adjustable attributes associated with the devices, systems, programs and/or objects. In certain embodiments, the sensor(s) is (are) capable of discerning a change in movement, velocity and/or acceleration of ±5%. In other embodiments, the sensor(s) is (are) capable of discerning a change in movement, velocity and/or acceleration of ±10°. In other embodiments, the system further comprising a remote control unit or remote control system in communication with the processing unit to provide remote control of the processing unit and all real and/or virtual objects under the control of the processing unit. In other embodiments, the motion sensor is selected from the group consisting of digital cameras, optical scanners, optical roller ball devices, touch pads, inductive pads, capacitive pads, holographic devices, laser tracking devices, thermal devices, touch or touchless sensors, acoustic devices, any other device capable of sensing motion, fields, waveforms, or changes thereof, arrays of such devices, and mixtures and combinations thereof. In other embodiments, the objects include environmental controls, lighting devices, cameras, ovens, dishwashers, stoves, sound systems, display systems, alarm systems, control systems, virtual reality systems, augmented reality systems, medical devices, robots, robotic control systems, virtual reality systems, augmented reality systems, hot and cold water supply devices, air conditioning systems, heating systems, ventilation systems, air handling systems, computers and computer systems, chemical or manufacturing plant control systems, computer operating systems and other software systems, remote control systems, mobile devices, electrical systems, sensors, hardware devices, hardware systems, environmental devices and systems, energy and energy distribution devices and systems, software programs or objects or mixtures and combinations thereof.

In other embodiments, the methods for implementing the apparatuses, systems, and/or interfaces include the step of sensing movement, movement direction, movement angle, movement distance/displacement, movement duration, movement velocity, and/or movement acceleration, and/or changes in movement direction, changes in movement angle, changes in movement distance/displacement, changes in movement duration, changes in movement velocity, and/or changes in movement acceleration, and/or changes in a rate of a change in direction, changes in a rate of a change in angle, changes in a rate of a change in distance/displacement, changes in a rate of a change in duration, changes in a rate of a change in velocity and/or changes in a rate of a change in acceleration within the active zone by one or a plurality of body parts or objects within an active sensing zone of a motion sensor or within active sensing zones of an array of motion sensors. The methods also include the step of producing an output signal or a plurality of output signals from the sensor or sensors and converting the output signal or signals into a command function or a plurality of command functions. The command and control functions comprise at least (1) a scroll function or a plurality of scroll functions, (2) a select function or a plurality of select functions, (3) an attribute function or plurality of attribute functions, (4) an attribute control function or a plurality of attribute control functions, or (5) a simultaneous control function. The simultaneous control function includes (a) a select function or a plurality of select functions and a scroll function or a plurality of scroll functions, (b) a select function or a plurality of select functions and an activate function or a plurality of activate functions, and (c) a select function or a plurality of select functions and an attribute control function or a plurality of attribute control functions. In certain embodiments, the objects comprise electrical devices, electrical systems, sensors, hardware devices, hardware systems, environmental devices and systems, energy and energy distribution devices and systems, software systems, software programs, software objects, or combinations thereof. In other embodiments, the attributes comprise adjustable attributes associated with the devices, systems, programs and/or objects. In other embodiments, the timed hold is brief or the brief cessation of movement causing the attribute to be adjusted to a preset level, causing a selection to be made, causing a scroll function to be implemented, or a combination thereof. In other embodiments, the timed hold is continued causing the attribute to undergo a high value/ low value cycle that ends when the hold is removed. In other embodiments, the timed hold causes an attribute value to change so that (1) if the attribute is at its maximum value, the timed hold causes the attribute value to decrease at a predetermined rate, until the timed hold is removed, (2) if the attribute value is at its minimum value, then the timed hold causes the attribute value to increase at a predetermined rate, until the timed hold is removed, (3) if the attribute value is not the maximum or minimum value, then the timed hold causes randomly selects the rate and direction of attribute value change or changes the attribute to allow maximum control, or (4) the timed hold causes a continuous change in the attribute value or scroll function in a direction or angle of the initial motion until the timed hold is removed. In other embodiments, the motion sensor is selected from the group consisting of sensors of any kind including digital cameras, optical scanners, optical roller ball devices, touch pads, inductive pads, capacitive pads, holographic devices, laser tracking devices, thermal devices, touch or touchless sensors, acoustic devices, and any other device capable of sensing motion or changes in any waveform due to motion or arrays of such devices, and mixtures and combinations thereof. In other embodiments, the objects include lighting devices, cameras, ovens, dishwashers, stoves, sound systems, display systems, alarm systems, virtual reality systems, augmented reality systems, control systems, virtual reality systems, augmented reality systems, medical devices, robots, robotic control systems, hot and cold water supply devices, air conditioning systems, heating systems, ventilation systems, air handling systems, computers and computer systems, chemical plant control systems, computer operating systems and other software systems, remote control systems, sensors, or mixtures and combinations thereof.

The all of these scenarios set forth above are designed to illustrate the control of a large number of devices using properties and/or characteristics of the sensed motion including, without limitation, relative distance of the motion for each object (real like a person in a room using his/her hand as the object for which motion is being sensed or virtual representations of the objects in a virtual or rendered room on a display apparatus), direction of motion, angle of motion, distance/displacement of motion, duration of motion, speed of motion, acceleration of motion, changes an any of these properties, rates of changes in any of these properties, or mixtures and combinations thereof to control a single controllable attribute of the object such as lights. However, the systems, apparatuses, and methods of this invention are also capable of using motion properties and/or characteristics to control two, three, or more attributes of an object. Additionally, the systems, apparatuses, and methods of this invention are also capable of using motion properties and/or characteristics from a plurality of moving objects within a motion sensing zone to control different attributes of a collection of objects. For example, if the lights in the above figures are capable of color as well as brighten, then the motion properties and/or characteristic may be used to simultaneously change color and intensity of the lights or one sensed motion could control intensity, while another sensed motion could control color. For example, if an artist wanted to paint a picture on a computer generated canvas, then motion properties and/or characteristic would allow the artist to control the pixel properties of each pixel on the display using the properties of the sensed motion from one, two, three, etc. sensed motions. Thus, the systems, apparatuses, and methods of this invention are capable of converting the motion properties associated with each and every object being controlled based on the instantaneous properties values as the motion traverse the object in real space or virtual space.

In other embodiments, the methods for implementing the apparatuses, systems, and/or interfaces include the steps of activating the apparatuses, systems, and/or interfaces upon movement sensed by one or more motion sensors and using the movement and its properties to activate a selection object and a plurality of selectable objects. Once activated, the initial movement and/or movement properties and continued movement and its properties may cause the selection object to move accordingly, which may result in a pre-selection of a particular selectable object or a group of selectable objects, in moving the pre-selected object or the group of objects toward the selection object, where the pre-selected object or the group of objects are the selectable object(s) that are most closely aligned with the movement and its properties such as the direction, angle, distance/displacement, duration, speed, etc. The activities within the systems, apparatuses, and/or interfaces may be evidenced by a user feedback unit or units by corresponding movement of the selection object on the feedback unit or units. Another aspect of the systems, apparatuses, and/or interfaces of this disclosure is that the faster the selection object moves toward the pre-selected object or the group of objects, the faster the pre-selected object or the group of objects move toward the selection object. Another aspect of the systems, apparatuses, and/or interfaces of this disclosure is that as the pre-selected object or the group of objects move toward the selection object, the pre-selected object or the group of objects may increase undergo a change in visual properties, audio properties, audiovisual properties, any other cognizable property or combinations thereof. Another aspect of the systems, apparatuses, and/or interfaces of this disclosure is that movement away from the objects or groups of objects may result in the objects moving away at a greater or accelerated speed from the selection object(s). Another aspect of the systems, apparatuses, and/or interfaces of this disclosure is that as movement continues, the movement may will start to discriminate between members of the pre-selected group of objects until the movement results in the selection of a single selectable object or a coupled group of selectable objects. Once the selection object and the target selectable object or coupled group of selectable objects touch, active areas surrounding the objection touch, a threshold distance between the selection object and the target selectable object(s) is achieved, or a probability of selection exceeds an activation threshold, then the target object is or object are selected and non-selected objects are removed from the display, undergo a change one or more cognizable properties, fade away or undergo some other change so that selected object or objects may be differentiated from the non-selected objects. The apparatuses, systems, and/or interfaces of this disclosure may also center the selected object or objects in a center of the user feedback unit or center the selected object at or near a location where the movement was first sensed. The selected object or objects may be in a corner of a display, on a side of the thumb of display associated with a phone, and the next level menu is displayed slightly further away from the selected object, possibly arcuately, so the next movement is close to the first, usually working the user back and forth in the general area of the center of the display. If the object is an executable object such as taking a photo, turning on a device, etc, then the execution is simultaneous with selection. If the object is a submenu, sublist or list of attributes associated with the selected object, then the submenu members, sublist members or attributes are displayed on the screen in a spaced apart format. The same procedure used to select the selected object is then used to select a member of the submenu, sublist or attribute list. Thus, the interfaces have a gravity like or anti-gravity like action on display objects. As the selection object(s) moves, it attracts an object or objects in alignment with the direction or angle of the selection object's motion pulling those object(s) toward it and may simultaneously or sequentially repel non-selected items away or indicate non-selection in any other manner so as to discriminate between selected and non-selected objects As motion continues, the pull increases on the object most aligned with the direction or angle of motion, further accelerating the object toward the selection object until they touch or merge or reach a threshold distance determined as an activation threshold. The touch or merge or threshold value being reached causes the processing unit to select and activate the object(s). Additionally, the sensed motion may be one or more motions detected by one or more movements within the active zones of the motion sensor(s) giving rise to multiple sensed motions and multiple command function that may be invoked simultaneously or sequentially. The sensors may be arrayed to form sensor arrays. If the object is an executable object such as taking a photo, turning on a device, etc., then the execution is simultaneous with selection. If the object is a submenu, sublist or list of attributes associated with the selected object, then the submenu members, sublist members or attributes are displayed on the screen in a spaced apart format. The same procedure used to select the selected object is then used to select a member of the submenu, sublist or attribute list. Thus, the interfaces have a gravity like action on display objects. As the selection object moves, it attracts an object or objects in alignment with the direction of the selection object's motion pulling those object toward it. As movement continues, the pull increases on the object most aligned with the direction, angle, distance/displacement, and/or duration of movement, further accelerating the object toward the selection object until they touch or merge or reach a threshold distance determined as an activation threshold to make a selection. The touch, merge or threshold event causes the processing unit to select and activate the object.

The sensed motion may result not only in activation of the systems, apparatuses, and/or interfaces of this disclosure, but may result in select, attribute control, activation, actuation, scroll or combination thereof.

In other embodiments, the systems, apparatuses, and/or interfaces may utilize different unit feedback formats including haptic or tactile outputs, audio outputs, any other cognizable feedback formats to indicate or evident user interaction with the systems, apparatuses, and/or interfaces. For example, if the user moving through radial zones, different objects may produce different buzzes or sounds, and the intensity or pitch may change while moving in that zone to indicate whether the object is in front of or behind the user.

Compound movement may also be used so as to provide different control functions than the movement made separately or sequentially. This includes combination attributes and changes of both state and attribute, such as tilting the device to see graphics, graphics and text or text, along with changing scale based on the state of the objects, while providing other controls simultaneously or independently, such as scrolling, zooming in/out, or selecting while changing state. These features may also be used to control chemicals being added to a vessel, while simultaneously controlling the amount. These features may also be used to change between Windows 8 and Windows 7 with a tilt while moving icons or scrolling through programs at the same time.

Audible or other communication medium may be used to confirm object selection or in conjunction with motion so as to provide desired commands (multimodal) or to provide the same control commands in different ways.

The present systems, apparatuses, and/or interfaces and the methods implementing them may also include artificial intelligence components that learn from a user's interaction with the systems, apparatuses, and/or interfaces including movement characteristics, environmental characteristics (e.g., motion sensor types, processing unit types, or other environment properties), controllable object environmental characteristics, etc. to improve the performance of the systems, apparatuses, and/or interfaces and to improve prediction capability of the systems, apparatuses, and/or interfaces to anticipate user activities.

In other embodiments, the apparatuses, systems, and/or interfaces selecting and activating virtual or real objects and their controllable attributes include at least one motion sensor having an active sensing zone, at least one processing unit, at least one power supply unit, and one object or a plurality of objects under the control of the processing units. The sensors, processing units, and power supply units are in electrical communication with each other. The motion sensors sense motion including motion properties within the active zones, generate at least one output signal, and send the output signals to the processing units. The processing units convert the output signals into at least one command function. The command functions include (1) a start function, (2) a scroll function, (3) a select function, (4) an attribute function, (5) an attribute control function, (6) a simultaneous control function including: (a) a select and scroll function, (b) a select, scroll and activate function, (c) a select, scroll, activate, and attribute control function, (d) a select and activate function, (c) a select and attribute control function, (f) a select, active, and attribute control function, or (g) combinations thereof, or (7) combinations thereof. The start functions activate at least one selection or cursor object and a plurality of selectable objects upon first sensing motion by the motion sensors and selectable objects aligned with the motion direction or angle move toward the selection object or become differentiated from non-aligned selectable objects and motion continues until a target selectable object or a plurality of target selectable objects are discriminated from non-target selectable objects resulting in activation of the target object or objects. The motion properties include a touch, a lift off, a direction, an angle, a distance/displacement, a duration, a velocity, an acceleration, a change in direction, a change in angle, a change in distance/displacement, a change in duration, a change in velocity, a change in acceleration, a rate of change of direction, a rate of change of angle, a rate of change of distance/displacement, a rate of change of duration, a rate of change of velocity, a rate of change of acceleration, stops, holds, timed holds, or mixtures and combinations thereof. The objects comprise real world objects, virtual objects and mixtures or combinations thereof, where the real world objects include physical, mechanical, electro-mechanical, magnetic, electro-magnetic, electrical, or electronic devices or any other real world device that can be controlled by a processing unit and the virtual objects include any construct generated in a virtual world or by a computer and displayed by a display device and that are capable of being controlled by a processing unit. The attributes comprise activatable, executable and/or adjustable attributes associated with the objects. The changes in motion properties are changes discernible by the motion sensors sensor outputs, and/or the processing units.

In certain embodiments, the start functions further activate the user feedback units and the selection objects and the selectable objects are discernible via the motion sensors in response to movement of an animal, human, robot, robotic system, part or parts thereof, or combinations thereof within the motion sensor active zones. In other embodiments, the system further includes at least on user feedback unit, at least one battery backup unit, communication hardware and software, at least one remote control unit, or mixtures and combinations thereof, where the sensors, processing units, power supply units, the user feedback units, the battery backup units, the remote control units are in electrical communication with each other. In other embodiments, faster motion causes a faster movement of the target object or objects toward the selection object or causes a greater differentiation of the target object or object from the non-target object or objects. In other embodiments, if the activated objects or objects have subobjects and/or attributes associated therewith, then as the objects move toward the selection object, the subobjects and/or attributes appear and become more discernible as object selection becomes more certain. In other embodiments, once the target object or objects have been selected, then further motion within the active zones of the motion sensors causes selectable subobjects or selectable attributes aligned with the motion direction or other motions property or properties to move towards the selection object(s) or become differentiated from non-aligned selectable subobjects or selectable attributes and motion continues until a target selectable subobject or attribute or a plurality of target selectable objects and/or attributes are discriminated from non-target selectable subobjects and/or attributes resulting in activation of the target subobject, attribute, subobjects, or attributes. In other embodiments, the motion sensor is selected from the group consisting of digital cameras, optical scanners, optical roller ball devices, touch pads, inductive pads, capacitive pads, holographic devices, laser tracking devices, thermal devices, acoustic devices, any other device capable of sensing motion, arrays of motion sensors, and mixtures or combinations thereof. In other embodiments, the objects include lighting devices, cameras, ovens, dishwashers, stoves, sound systems, display systems, alarm systems, control systems, medical devices, robots, robotic control systems, hot and cold water supply devices, air conditioning systems, heating systems, ventilation systems, air handling systems, computers and computer systems, chemical plant control systems, computer operating systems, virtual reality systems, augmented reality systems, graphics systems, business software systems, word processor systems, internet browsers, accounting systems, military systems, control systems, other software systems, programs, routines, objects and/or elements, remote control systems, or mixtures and combinations thereof. In other embodiments, if the timed hold is brief, then the processing unit causes an attribute to be adjusted to a preset level. In other embodiments, if the timed hold is continued, then the processing unit causes an attribute to undergo a high value/low value cycle that ends when the hold is removed. In other embodiments, the timed hold causes an attribute value to change so that (1) if the attribute is at its maximum value, the timed hold causes the attribute value to decrease at a predetermined rate, until the timed hold is removed, (2) if the attribute value is at its minimum value, then the timed hold causes the attribute value to increase at a predetermined rate, until the timed hold is removed, (3) if the attribute value is not the maximum or minimum value, then the timed hold causes randomly selects the rate, angle, and direction of attribute value change or changes the attribute to allow maximum control, or (4) the timed hold causes a continuous change in the attribute value in a direction or angle of the initial motion until the timed hold is removed. In other embodiments, the motion sensors sense a second motion including second motion properties within the active zones, generate at least one output signal, and send the output signals to the processing units, and the processing units convert the output signals into a confirmation command confirming the selection or at least one second command function for controlling different objects or different object attributes. In other embodiments, the motion sensors sense motions including motion properties of two or more animals, humans, robots, or parts thereof, or objects under the control of humans, animals, and/or robots within the active zones, generate output signals corresponding to the motions, and send the output signals to the processing units, and the processing units convert the output signals into command function or confirmation commands or combinations thereof implemented simultaneously or sequentially, where the start functions activate a plurality of selection or cursor objects and a plurality of selectable objects upon first sensing motion by the motion sensor and selectable objects aligned with the motion directions move toward the selection objects or become differentiated from non-aligned selectable objects and the motions continue until target selectable objects or pluralities of target selectable objects are discriminated from non-target selectable objects resulting in activation of the target objects and the confirmation commands confirm the selections.

In other embodiments, the methods for implementing the apparatuses, systems, and/or interfaces include the steps of sensing motion including motion properties within an active sensing zone of at least one motion sensor, where the motion properties include a direction, an angle, a distance/displacement, a duration, a velocity, an acceleration, a change in direction, a change in angle, a change in distance/displacement, a change in duration, a change in velocity, a change in acceleration, a rate of change of direction, a rate of change of angle, a rate of change of distance/displacement, a rate of change of duration, a rate of change of velocity, a rate of change of acceleration, stops, holds, timed holds, or mixtures and combinations thereof and producing an output signal or a plurality of output signals corresponding to the sensed motion. The methods also include converting the output signal or signals via a processing unit in communication with the motion sensors into a command function or a plurality of command functions. The command functions include (1) a start function, (2) a scroll function, (3) a select function, (4) an attribute function, (5) an attribute control function, (6) a simultaneous control function including: (a) a select and scroll function, (b) a select, scroll and activate function, (c) a select, scroll, activate, and attribute control function, (d) a select and activate function, (c) a select and attribute control function, (f) a select, active, and attribute control function, or (g) combinations thereof, or (7) combinations thereof. The methods also include processing the command function or the command functions simultaneously or sequentially, where the start functions activate at least one selection or cursor object and a plurality of selectable objects upon first sensing motion by the motion sensor and selectable objects aligned with the motion direction move toward the selection object or become differentiated from non-aligned selectable objects and motion continues until a target selectable object or a plurality of target selectable objects are discriminated from non-target selectable objects resulting in activation of the target object or objects, where the motion properties include a touch, a lift off, a direction, an angle, a distance/displacement, a duration, a velocity, an acceleration, a change in direction, a change in angle, a change in distance/displacement, a change in duration, a change in velocity, a change in acceleration, a rate of change of direction, a rate of change of angle, a rate of change of distance/displacement, a rate of change of duration, a rate of change of velocity, a rate of change of acceleration, stops, holds, timed holds, or mixtures and combinations thereof. The objects comprise real world objects, virtual objects or mixtures and combinations thereof, where the real world objects include physical, mechanical, electro-mechanical, magnetic, electro-magnetic, electrical, or electronic devices or any other real world device that can be controlled by a processing unit and the virtual objects include any construct generated in a virtual world or by a computer and displayed by a display device and that are capable of being controlled by a processing unit. The attributes comprise activatable, executable and/or adjustable attributes associated with the objects. The changes in motion properties are changes discernible by the motion sensors and/or the processing units.

In certain embodiments, the motion sensor is selected from the group consisting of digital cameras, optical scanners, optical roller ball devices, touch pads, inductive pads, capacitive pads, holographic devices, laser tracking devices, thermal devices, acoustic devices, any other device capable of sensing motion, fields, waveforms, changes thereof, arrays of motion sensors, and mixtures or combinations thereof. In other embodiments, the objects include lighting devices, cameras, ovens, dishwashers, stoves, sound systems, display systems, alarm systems, control systems, medical devices, robots, robotic control systems, hot and cold water supply devices, air conditioning systems, heating systems, ventilation systems, air handling systems, computers and computer systems, chemical plant control systems, computer operating systems, systems, graphics systems, business software systems, word processor systems, internet browsers, accounting systems, military systems, control systems, other software systems, programs, routines, objects and/or elements, remote control systems, or mixtures and combinations thereof. In other embodiments, if the timed hold is brief, then the processing unit causes an attribute to be adjusted to a preset level. In other embodiments, if the timed hold is continued, then the processing unit causes an attribute to undergo a high value/low value cycle that ends when the hold is removed. In other embodiments, the timed hold causes an attribute value to change so that (1) if the attribute is at its maximum value, the timed hold causes the attribute value to decrease at a predetermined rate, until the timed hold is removed, (2) if the attribute value is at its minimum value, then the timed hold causes the attribute value to increase at a predetermined rate, until the timed hold is removed, (3) if the attribute value is not the maximum or minimum value, then the timed hold causes randomly selects the rate, angle and direction of attribute value change or changes the attribute to allow maximum control, or (4) the timed hold causes a continuous change in the attribute value in a direction or angle of the initial motion until the timed hold is removed. In other embodiments, the methods include sensing second motion including second motion properties within the active sensing zone of the motion sensors, producing a second output signal or a plurality of second output signals corresponding to the second sensed motion, converting the second output signal or signals via the processing units in communication with the motion sensors into a second command function or a plurality of second command functions, and confirming the selection based on the second output signals, or processing the second command function or the second command functions and moving selectable objects aligned with the second motion direction or angle toward the selection object or become differentiated from non-aligned selectable objects and motion continues until a second target selectable object or a plurality of second target selectable objects are discriminated from non-target second selectable objects resulting in activation of the second target object or objects, where the motion properties include a touch, a lift off, a direction, an angle, a distance/displacement, a duration, a velocity, an acceleration, a change in direction, a change in angle, a change in distance/displacement, a change in duration, a change in velocity, a change in acceleration, a rate of change of direction, a rate of change of angle, a rate of change of distance/displacement, a rate of change of duration, a rate of change of velocity, a rate of change of acceleration, stops, holds, timed holds, or mixtures and combinations thereof. In other embodiments, the methods include sensing motions including motion properties of two or more animals, humans, robots, or parts thereof within the active zones of the motion sensors, producing output signals corresponding to the motions, converting the output signals into command function or confirmation commands or combinations thereof, where the start functions activate a plurality of selection or cursor objects and a plurality of selectable objects and/or attributes upon first sensing motion by the motion sensor and selectable objects aligned with the motion directions or angles move toward the selection objects or become differentiated from non-aligned selectable objects and the motions continue until target selectable objects or pluralities of target selectable objects are discriminated from non-target selectable objects resulting in activation of the target objects and the confirmation commands confirm the selections.

The inventors have also found that the methods for implementing the apparatuses, systems, and/or interfaces on a computer may be constructed to permit creation of dynamic environments for object and/or attribute display, manipulation, differentiation, and/or interaction, where the apparatuses, systems, and/or interfaces include one processing unit or a plurality of processing units, one motion sensor or a plurality of motion sensors, one user interface or a plurality of user interfaces and dynamic environment software for generating, displaying, and manipulating the dynamic environments and the objects and/or attributes included therein. The dynamic environments are produced via user interaction with the sensor(s), which are in electronic communication with the processing unit(s), and comprise a set of objects and associated attributes displayed on the user interface(s) so that the objects and/or attributes are differentiated one from the other. The differentiation may evidence priority, directionality, content, type, activation procedures, activation parameters, control features, other properties that are associated with the objects and/or attributes or combinations thereof. The differentiation and distribution of the objects and/or attributes may change based on user interaction with the motion sensors and/or locations of the motion sensors, where at least one motion sensor or sensor output is associated with a mobile or stationary device or where at least one motion sensor or sensor output is associated with a mobile device and at least one motion sensor or sensor output is associated with a stationary device, and mixtures or combinations thereof. Of course, these same procedures may be used with objects and/or attributes at any level of drill down.

In certain embodiments, the apparatuses, systems, and/or interfaces and methods implementing them cause a plurality of selectable objects to be displayed on a display device of a user interface associated with the apparatuses, systems, and/or interfaces. The selectable objects may be represent: (1) objects that may directly invoked, (2) objects that have a single attribute, (3) objects that have a plurality of attributes, (4) objects that are lists or menus that may include sublists or submenus, (5) any other selectable item, or (6) mixtures and combinations thereof. The objects may represent virtual or real objects. Virtual objects may be any object that represents an internal software component. Real object may be executable programs or software application or may be real world devices that may be controlled by the systems and/or methods. The displayed selectable objects may be a default set of selectable objects, pre-defined set of selectable objects, or a dynamically generated set of selectable objects, generated based on locations of the sensors associated with mobile devices and the motion sensors associated with stationary devices. The systems and methods permit the selectable objects to interact with the user dynamically so that object motion within the environments better correlates with the user ability to interact with the objects. The user interactions include, but are not limited to: (a) object discrimination based on sensed motion, (b) object selection base on sensed motion, (c) menu drill down based on sensed motion, (d) menu drill up based on sensed motion, (e) object selection and activation based on sensed motion and on the nature of the selectable object, (f) scroll/selection/activation based on sensed motion and on the nature of the selectable object, and (g) any combination of the afore listed interactions associated with a collection of linked objects, where the linking may be pre-defined, based on user gained interaction knowledge, or dynamically generated based on the user, sensor locations, and the nature of the sensed motion. The systems and methods may also associate one or a plurality of object differentiation properties with the displayed selectable objects, where the nature of the differentiation for each object may be predefined, defined based on user gained interaction knowledge, or dynamically generated based on the user, sensor locations, and/or the nature of the sensed motion. The differentiation properties include, but are not limited to: color; color shading; spectral attributes associated with the shading; highlighting; flashing; rate of flashing; flickering; rate of flickering; shape; size; movement of the objects such as oscillation, side to side motion, up and down motion, in and out motion, circular motion, elliptical motion, zooming in and out, etc.; rate of motion; pulsating; rate of pulsating; visual texture; touch texture; sounds such as tones, squeals, beeps, chirps, music, etc.; changes of the sounds; changes in biometrics, matter or energy, rate of changes in the sounds; any user discernible object differentiation properties, or any mixture and combination thereof. The differentiation may signify to the user a sense of direction, object priority, object sensitivity, etc., all helpful to the user for dynamic differentiation of selectable objects displayed on the display derived from the user, sensed motion, and/or the location of the mobile and stationary sensors.

For example, one displayed object may pulsate (slight zooming in and out, or expanding and contracting) at a first rate, while another displayed object may pulsate a second rate, where the first and second rates may be the same or different, and a faster pulsation rate may be associated with a sense of urgency relative to objects having a slower rate of pulsation. These rates may change in a pre-defined manner, a manner based on knowledge of the user, or dynamically based on the user, sensor locations, and/or the nature of the sensed motion.

In another example, a set of objects may slightly move to the right faster than they move back to the left, indicating that the user should approach the objects from the right, instead from another direction.

In certain embodiments, a main object may have one or a plurality of sub-objects moving (constant or variable rate, density, and/or direction) around or near the main object, indicating the nature of the sub-objects. In this case, sub-objects revolving around the main object may represent that they need to be interacted with in a dynamic, motion-based way, whereas the main object may be interacted with in a static manner such as a vocal command, hitting a button, clicking, or by any other non-dynamic or static interaction.

In other embodiments, a main object may have a certain color, such as blue, and its associated sub-objects have shades of blue, especially where the sub-objects dynamically transition from blue to off-blue or blue-green or other related colors, displaying they come from the primary blue object, whereas a red Object next to the blue one might have sub-objects that transition to orange, while a sub-object that transitions to purple might represent it is a sub-set of blue and red and can be accessed through either.

In other embodiments, the objects or sub-objects may fade in or out, representing changes of state based on a time period that the user interacts with them. By fading out, the systems may be notifying the user that the program or application (e.g., water flow in a building) will be entering a sleep or interruption state. The rate of the fade out may indicate how quickly the program or application transitions into a sleep state and how quickly they reactivate. A fade-in might relay the information that the object will automatically initiate over a given time automatically vs. manually.

In other embodiments, an array of objects, such as the screen of applications on a mobile device, the objects pulsing might represent programs that are active, whereas the objects that are static might represent programs that are inactive. Programs that are pulsing at a slower rate might represent programs running occasionally in the background. Of course, other dynamic indicators, such as changes in color, intensity, translucency, size, shape, or any recognizable attribute, may be used to relay information to the user.

Another example of the operation of the systems and methods of this invention may be in a medical context. In such a case, the objects displayed on the user interface may be an array of sensors active in an operating room including, but not limited to, oxygen sensors, blood flow sensors, pulse rate sensors, heart beat rate, blood pressure sensors, brain activity sensors, etc. The different dynamic changes in color, shape, size, sound, and/or movement of the objects may represent data associated with the sensors, providing multiple points of information in a simple, compounded way to the user. If color represented oxygen level, size represented pressure, and dynamic movement of the object represented heartbeat, one object could represent a great deal of information to the user.

The characteristics of associated sub-objects seen simultaneously (or sequentially after the primary objects are selected) could likewise provide much more information than just letting the user know more information exists—in this case, the primary object would be labeled with the corresponding body position and the sub-object representing oxygen level past and current data might be pulsing or intensifying dynamically in color, while the blood pressure sub-object might be slightly growing larger or smaller with each heartbeat, representing minimal change in blood pressure, and the heartbeat might be represented by the object rotating CW, then CCW with each heartbeat.

In another example, one object (or word in a word document) swapping places with another might represent the need to change the word to provide better grammar for a sentence. Spelling changes might be represented by pulsing words, and words that are acceptable, but have a better common spelling might be represented by words that pulse at a slower rate. Dynamic changes of color might also be associated with the words or other characteristics to draw attention to the user and give secondary information at the same time, such as which words that might be too high or too low of a grade level for the reader in school books.

Thus, any combination of dynamic characteristics may be used to provide more information to the user than a static form of information, and may be used in conjunction with the static information characteristic.

In certain embodiments, objects (such as application icons) may have several possible states and display states. An object may be in an unselected state, a present state (available for selection but with no probability of being selected yet), a pre-selected (now probable, but not meeting a threshold criteria for being selected), a selected state (selected but not opened or having an execute command yet issued), or an actuated state (selected and having an attribute executed (i.e., on (vs. off), variable control ready to change based on moving up or down, or a submenu is displayed and ready to be selected). If the object is in a group of objects, as the user moves towards that group, the zone and/or the group of objects may display or present a different characteristic that represents they are ready to be selected; this may be identified as a pre-selected state. In each state, the objects may display different characteristics to convey information to the user, such as change of shape, density, energy, size, color, sound, smell, feel, pulse rate, different dynamic directional animations, etc. For instance, before a user touches a mobile device (one with a touch sensor), the objects may be in an unselected state, displaying no attribute other than the common static display currently employed. Once a user touches the screen or reaches a threshold value, the items that need attention might change in color (present, but no different probability of being selected than any others). As the user begins to move in the direction of an object desired, the more likely objects may begin to display differently, such as increasing in size, or begin pulsing, and as the probability increases, the pulse rate may increase, but objects in more urgent need of attention may pulse differently or even faster than others in the same group or zone-pre-selected. Once the correct object(s) is selected, it may show and even different state, such as displaying subobjects, changing color, or making a sound, but it still may not be open or actuated yet. If the attribute is volume control, it may be selected, but would not control volume until it is actuated by moving up or down or in a circular direction, adjusting the volume. Of course, objects in an unselected state may show dynamic characteristics (pulsing for example) as well to convey information to the user, such as activity or priority. In this way, it may have a dynamic characteristic while in a static state.

In another example, for applications in the corner of a mobile device, when, head or eye gaze is directed towards that zone or objects, they may be in an unselected, preselected, or selected but not actuated state, and they may demonstrate dynamic indicators/attributes to convey intent, attributes, sub-attributes, or mixed or combination content or attributes with changing environments. They may display differently at any state, or only at one particular state (such as selected), and this may be a preset value, or something dynamic, such as contextual or environmental factors. An example of this last dynamic characteristic indicator would be in a vehicle or virtual reality display where the song playlist would cause a pulsing effect on preferred songs, but different songs would pulse differently when another occupant or player enters the environment, indicating the suggested objects would change due a combination of user preferences, and the dynamic display characteristics of all or some of the objects would change to indicate a combination preferential selections).

The dynamic environment systems of this invention may also be used in virtual reality systems and/or augmented reality systems so that players or users of these virtual reality systems and/or augmented reality systems through motion and motion properties are able to select, target, and/or deselect features, menus, objects, constructs, constructions, user attributes, weapons, personal attributes, personal features, any other selectable or user definable features or attributes of the virtual space or augmented reality space. Thus, as a user enters first enters a virtual reality space or augment reality space, all of the selectable or definable features and/or attributes of the space would be displayed about the user in any desired form-2D, 3D and/or nD semicircular or hemispherical array with user at center, 2D, 3D and/or nD circular or spherical array with user at center, 2D, 3D and/or nD matrix array with user at center or off-center, any other 2D, 3D and/or nD display of features and attributes, or mixtures and combinations thereof. As the user moves a body part associated with the motion detectors used to interface with the space (visual—eye tracking sensors, hand part sensors—gloves or the like, body sensors—body suits, or other sensors), the sensed motions and motion properties such as direction, angle, distance/displacement, duration, speed, acceleration, and/or changes in any of these motion properties cause features and/or attributes to display differently based on state and information to display to the user, and may move toward the user based on the motion and motion properties of the object and/or the user, while the other features and/or attributes stay static or move away from the user. An example of this is to move towards a particular tree in a group of trees in a game. As the user looks toward a particular tree, the tree might shake while the others sway gently, as the user moves toward the tree, the tree may begin to move towards the user at a faster rate, if it has a special prize associated with it, or at a slower rate in no prize. If the special prize is a one of a kind attribute, the tree may change color or size at it moves towards the user and the user is moving towards the tree. Once the tree is selected via a threshold event, it may change shape into the prize it held, and then the start to act like that prize when it is selected by the user moving the hand towards a designated area of the object enough to actuate. These different attributes or characteristics are part of a dynamic environment where the speed, direction, angle, distance/displacement, duration, state, display characteristics and attributes are affected by motion of the user and object, or any combination of these. In another example, where it is desired to choose one object, as the motion or motion properties of user(s), object(s) or both continue, the features and/or attributes are further of user, objects or both are discriminated, and the target features and/or attributes may move closer. Once the target is fully differentiated, then all subfeatures and/or subobjects may become visible. As motion continues, features and/or attributes and/or subfeatures and/or subobjects are selected and the user gains the characteristics or features the user desires in the space. All of the displayed features and/or attributes and/or subfeatures and/or subobjects may also include highlighting features such as sound (chirping, beeping, singing, etc.), vibration, back and forth movement, up and down movement, circular movement, etc.

Embodiments of this invention relate broadly to computing devices, comprising at least one sensor or sensor output configured to capture data including user data, motion data, environment data, temporal data, contextual data, or mixtures and combinations thereof. The computing device also includes at least one processing unit configured, based on the captured data, to generate at least one command function. The command functions comprise: (1) a single control function including (a) a start function, (b) a scroll function, (c) a select function, (d) an attribute function, (e) an activate function, or (f) mixtures and combinations thereof. The command functions also comprise: (2) a simultaneous control function including (a) a combination of two or more of the functions (1a-1e), (b) a combination of three or more of the functions (1a-1e), (c) a combination of four or more of the functions (1a-1e), (d) mixtures and combinations thereof. The command functions may also comprise (3) mixtures and combinations of any of the above functions. In certain embodiments, the at least one sensor comprises touch pads, touchless pads, inductive sensors, capacitive sensors, optical sensors, acoustic sensors, thermal sensors, optoacoustic sensors, electromagnetic field (EMF) sensors, wave or waveform sensors, strain gauges, accelerometers, any other sensor that senses movement or changes in movement, or mixtures and combinations thereof. In other embodiments, a first control function is a single control function. In other embodiments, a first control function is a single control function and a second function is a simultaneous control function. In other embodiments, a first control function is a simultaneous control function. In other embodiments, a first control function is a simultaneous control function and a second function is a simultaneous control function. In other embodiments, a plurality of single and simultaneous control functions are actuated by user determined motion.

Embodiments of this invention relate broadly to computer implemented methods, comprising under the control of a processing unit configured with executable instructions, receiving data from at least one sensor configured to capture the data, where the captured data includes user data, motion data, environment data, temporal data, contextual data, or mixtures and combinations thereof. The methods also comprise processing the captured data to determine a type or types of the captured data; analyzing the type or types of the captured data; and invoking a control function corresponding to the analyzed data. The control functions comprise: (1) a single control function including: (a) a start function, (b) a scroll function, (c) a select function, (d) an attribute function, (e) an activate function, or (f) mixtures and combinations thereof, or (2) a simultaneous control function including: (a) a combination of two or more of the functions (1a-1e), (b) a combination of three or more of the functions (1a-1e), (c) a combination of four or more of the functions (1a-1e), (d) mixtures and combinations thereof, or (3) mixtures and combinations thereof. In certain embodiments, the at least one sensor comprises touch pads, touchless pads, inductive sensors, capacitive sensors, optical sensors, acoustic sensors, thermal sensors, optoacoustic sensors, electromagnetic field (EMF) sensors, strain gauges, accelerometers, any other sensor that senses movement or changes in movement, or mixtures and combinations thereof. In other embodiments, a first control function is a single control function. In other embodiments, a first control function is a single control function and a second function is a simultaneous control function. In other embodiments, a first control function is a simultaneous control function. In other embodiments, a first control function is a simultaneous control function and a second function is a simultaneous control function. In other embodiments, a plurality of single and simultaneous control functions are actuated by user determined motion.

Embodiments of this invention relate broadly to non-transitory computer readable storage media storing one or more sequences of instructions that, when executed by one or more processing units, cause a computing system to: (a) receive data from at least one sensor configured to capture the data, where the captured data includes user data, motion data, environment data, temporal data, contextual data, or mixtures and combinations thereof; (b) process the captured data to determine a type or types of the captured data; (c) analyze the type or types of the captured data; and (d) invoke a control function corresponding to the analyzed data. The control functions comprise (1) a single control function including: (a) a start function, (b) a scroll function, (c) a select function, (d) an attribute function, (c) an activate function, or (f) mixtures and combinations thereof, or (2) a simultaneous control function including: (a) a combination of two or more of the functions (1a-1e), (b) a combination of three or more of the functions (1a-1e), (c) a combination of four or more of the functions (1a-1e), (d) mixtures and combinations thereof, or (3) mixtures and combinations thereof. In certain embodiments, the at least one sensor comprises touch pads, touchless pads, inductive sensors, capacitive sensors, optical sensors, acoustic sensors, thermal sensors, optoacoustic sensors, electromagnetic field (EMF) sensors, strain gauges, accelerometers, any other sensor that senses movement or changes in movement, or mixtures and combinations thereof. In other embodiments, a first control function is a single control function. In other embodiments, a first control function is a single control function and a second function is a simultaneous control function. In other embodiments, a first control function is a simultaneous control function. In other embodiments, a first control function is a simultaneous control function and a second function is a simultaneous control function. In other embodiments, a plurality of single and simultaneous control functions are actuated by user determined motion.

Embodiments of this invention relate broadly to computer-implemented systems comprising a digital processing device comprising at least one processor, an operating system configured to perform executable instructions, and a memory; a computer program including instructions executable by the digital processing device to create a gesture-based navigation environment. The environment comprises a software module configured to receive input data from a motion sensor, the input data representing navigational gestures of a user; a software module configured to present one or more primary menu items; and a software module configured to present a plurality of secondary menu items in response to receipt of input data representing a navigational gesture of the user indicating selection of a primary menu item, the secondary menu items arranged in a curvilinear orientation about the selected primary menu item. The environment operates such that in response to receipt of input data representing a navigational gesture of the user comprising motion substantially parallel to the curvilinear orientation, the plurality of secondary menu items scrolls about the curvilinear orientation; in response to receipt of input data representing a navigational gesture of the user substantially perpendicular to the curvilinear orientation, an intended secondary menu item in line with the direction of the navigational gesture or movement is scaled and moved opposite to the direction of the navigational gesture or movement to facilitate user access. In certain embodiments, the processing device or unit is a smart watch and the motion sensor is a touchscreen display.

Embodiments of this invention relate broadly to non-transitory computer-readable storage media encoded with a computer program including instructions executable by a processor to create a gesture-based or motion-based navigation environment comprising: a software module configured to receive input data from a motion sensor, the input data representing navigational movement of a user; a software module configured to present one or more primary menu items; and a software module configured to present a plurality of secondary menu items in response to receipt of input data representing a navigational gesture or movement of the user indicating selection of a primary menu item, the secondary menu items arranged in a curvilinear orientation about the selected primary menu item. The environment operates such that in response to receipt of input data representing a navigational gesture or movement of the user comprising motion substantially parallel to the curvilinear orientation, the plurality of secondary menu items scrolls about the curvilinear orientation; and in response to receipt of input data representing a navigational gesture or movement of the user substantially perpendicular to the curvilinear orientation, an intended secondary menu item in line with the direction of the navigational gesture or movement is scaled and moved opposite to the direction of the navigational gesture or movement to facilitate user access. In certain embodiments, the processor is a smart watch and the motion sensor is a touchscreen display.

Embodiments of this invention relate broadly to systems for selecting and activating virtual or real objects and their controllable attributes comprising: at least one motion sensor having an active sensing zone, at least one processing unit, at least one power supply unit, one object or a plurality of objects under the control of the processing units. The sensors, processing units, and power supply units are in electrical communication with each other. The motion sensors sense motion including motion properties within the active zones, generate at least one output signal, and send the output signals to the processing units. The processing units convert the output signals into at least one command function. The command functions comprise: (7) a start function, (8) a scroll function, (9) a select function, (10) an attribute function, (11) an attribute control function, (12) a simultaneous control function. The simultaneous control functions include: (g) a select and scroll function, (h) a select, scroll and activate function, (i) a select, scroll, activate, and attribute control function, (j) a select and activate function, (k) a select and attribute control function, (l) a select, active, and attribute control function, or (m) combinations thereof. The control functions may also include (13) combinations thereof. The start functions activate at least one selection or cursor object and a plurality of selectable objects upon first sensing motion by the motion sensors and selectable objects aligned with the motion direction move toward the selection object or become differentiated from non-aligned selectable objects and motion continues until a target selectable object or a plurality of target selectable objects are discriminated from non-target selectable objects resulting in activation of the target object or objects. The motion properties include a touch, a lift off, a direction, an angle, a distance/displacement, a duration, a velocity, an acceleration, a change in direction, a change in angle, a change in distance/displacement, a change in duration, a change in velocity, a change in acceleration, a rate of change of direction, a rate of change of angle, a rate of change of distance/displacement, a rate of change of duration, a rate of change of velocity, a rate of change of acceleration, stops, holds, timed holds, or mixtures and combinations thereof. The objects comprise real world objects, virtual objects, attributes, and mixtures or combinations thereof, where the real world objects include physical, mechanical, electro-mechanical, magnetic, electro-magnetic, electrical, or electronic devices or any other real world device that can be controlled by a processing unit and the virtual objects include any construct generated in a virtual world or by a computer and displayed by a display device and that are capable of being controlled by a processing unit. The attributes comprise selectable, activatable, executable and/or adjustable attributes associated with the objects. The changes in motion properties are changes discernible by the motion sensors and/or the processing units. In certain embodiments, the start functions further activate the user feedback units and the selection objects and the selectable objects are discernible via the motion sensors in response to movement of an animal, human, robot, robotic system, part or parts thereof, or combinations thereof within the motion sensor active zones. In other embodiments, the systems further comprise: at least on user feedback unit, at least one battery backup unit, communication hardware and software, at least one remote control unit, or mixtures and combinations thereof. The sensors, processing units, power supply units, the user feedback units, the battery backup units, the remote control units are in electrical communication with each other. In other embodiments, the systems further comprise: at least one battery backup unit, where the battery backup units are in electrical communication with the other hardware and units. In other embodiments, faster motion causes a faster movement of the target object or objects toward the selection object or objects or causes a greater differentiation of the target object or objects from non-target object or objects. In other embodiments, the non-target object or objects move away from the selection object as the target object or objects move toward the selection object or objects to aid in object differentiation. In other embodiments, the target objects and/or the non-target objects are displayed in list, group, or array forms and are either partially or wholly visible or partially or wholly invisible. In other embodiments, if the activated object or objects have subobjects and/or attributes associated therewith, then as the object or objects move toward the selection object, the subobjects and/or attributes appear and become more discernible as the target object or objects becomes more certain. In other embodiments, the target subobjects and/or the non-target subobjects are displayed in list, group, or array forms and are either partially or wholly visible or partially or wholly invisible. In other embodiments, once the target object or objects have been selected, then further motion within the active zones of the motion sensors causes selectable subobjects or selectable attributes aligned with the motion direction to move towards, away and/or at an angle to the selection object(s) or become differentiated from non-aligned selectable subobjects or selectable attributes and motion continues until a target selectable subobject or attribute or a plurality of target selectable objects and/or attributes are discriminated from non-target selectable subobjects and/or attributes resulting in activation of the target subobject, attribute, subobjects, or attributes. In other embodiments, the motion sensor is selected from the group consisting of digital cameras, optical scanners, optical roller ball devices, touch pads, inductive pads, capacitive pads, holographic devices, laser tracking devices, thermal devices, acoustic devices, any other device capable of sensing motion, arrays of motion sensors, waveform sensors or sensing devices, and mixtures or combinations thereof. In other embodiments, the objects include lighting devices, cameras, ovens, dishwashers, stoves, sound systems, display systems, alarm systems, control systems, medical devices, robots, robotic control systems, hot and cold water supply devices, air conditioning systems, heating systems, ventilation systems, air handling systems, computers and computer systems, chemical plant control systems, computer operating systems, systems, software elements, graphics systems, business software systems, word processor systems, internet browsers, accounting systems, military systems, virtual reality systems, augmented reality systems, biometric and neurological systems and controls, drone controls, augmented and virtual reality environments and systems, control systems, other software systems, programs, routines, objects and/or elements, remote control systems, or mixtures and combinations thereof. In other embodiments, if the timed hold is brief, then the processing unit causes an attribute to be adjusted to a preset level. In other embodiments, if the timed hold is continued, then the processing unit causes an attribute to undergo a high value/low value cycle that ends when the hold is removed. In other embodiments, the timed hold causes an attribute value to change so that (1) if the attribute is at its maximum value, the timed hold causes the attribute value to decrease at a predetermined rate, until the timed hold is removed, (2) if the attribute value is at its minimum value, then the timed hold causes the attribute value to increase at a predetermined rate, until the timed hold is removed, (3) if the attribute value is not the maximum or minimum value, then the timed hold causes randomly selects the rate and direction of attribute value change or changes the attribute to allow maximum control, or (4) the timed hold causes a continuous change in the attribute value in a direction of the initial motion until the timed hold is removed. In other embodiments, the motion sensors sense a second motion including second motion properties within the active zones, generate at least one output signal, and send the output signals to the processing units, and the processing units convert the output signals into a confirmation command confirming the selection or at least one second command function for controlling different objects or different object attributes. In other embodiments, the motion sensors sense motions including motion properties of two or more animals, humans, robots, or parts thereof, or objects under the control of humans, animals, and/or robots within the active zones, generate output signals corresponding to the motions, and send the output signals to the processing units, and the processing units convert the output signals into command function or confirmation commands or combinations thereof implemented simultaneously or sequentially, where the start functions activate a plurality of selection or cursor objects and a plurality of selectable objects upon first sensing motion by the motion sensor and selectable objects aligned (co-linear with or at the same angle) with the motion directions move toward the selection objects or become differentiated from non-aligned selectable objects and the motions continue until target selectable objects or pluralities of target selectable objects are discriminated from non-target selectable objects resulting in activation of the target objects and the confirmation commands confirm the selections.

Embodiments of this invention relate broadly to methods for controlling objects comprising: sensing motion including motion properties within an active sensing zone of at least one motion sensor, where the motion properties include a direction, an angle, a distance/displacement, a duration, a velocity, an acceleration, a change in direction, a change in angle, a change in distance/displacement, a change in duration, a change in velocity, a change in acceleration, a rate of change of direction, a rate of change of angle, a rate of change of distance/displacement, a rate of change of duration, a rate of change of velocity, a rate of change of acceleration, stops, holds, timed holds, or mixtures and combinations thereof, producing an output signal or a plurality of output signals corresponding to the sensed motion, converting the output signal or signals via a processing unit in communication with the motion sensors into a command function or a plurality of command functions. The command functions comprise: (1) a start function, (2) a scroll function, (3) a select function, (4) an attribute function, (5) an attribute control function, (6) a simultaneous control function including: (g) a select and scroll function, (h) a select, scroll and activate function, (i) a select, scroll, activate, and attribute control function, (j) a select and activate function, (k) a select and attribute control function, (l) a select, active, and attribute control function, or (m) combinations thereof, or (7) combinations thereof. The methods also include processing the command function or the command functions simultaneously or sequentially, where the start functions activate at least one selection or cursor object and a plurality of selectable objects upon first sensing motion by the motion sensor and selectable objects aligned with the motion direction move toward the selection object or become differentiated from non-aligned selectable objects and motion continues until a target selectable object or a plurality of target selectable objects are discriminated from non-target selectable objects resulting in activation of the target object or objects, where the motion properties include a touch, a lift off, a direction, an angle, a distance/displacement, a duration, a velocity, an acceleration, a change in direction, a change in angle, a change in distance/displacement, a change in duration, a change in velocity, a change in acceleration, a rate of change of direction, a rate of change of angle, a rate of change of distance/displacement, a rate of change of duration, a rate of change of velocity, a rate of change of acceleration, stops, holds, timed holds, or mixtures and combinations thereof. The objects comprise real world objects, virtual objects, attributes, or mixtures and combinations thereof, where the real world objects include physical, mechanical, electro-mechanical, magnetic, electro-magnetic, electrical, or electronic devices or any other real world device that can be controlled by a processing unit and the virtual objects include any construct generated in a virtual world or by a computer and displayed by a display device and that are capable of being controlled by a processing unit. The attributes comprise activatable, executable and/or adjustable attributes associated with the objects. The changes in motion properties are changes discernible by the motion sensors and/or the processing units. In certain embodiments, the motion sensor is selected from the group consisting of digital cameras, optical scanners, optical roller ball devices, touch pads, inductive pads, capacitive pads, holographic devices, laser tracking devices, thermal devices, acoustic devices, any other device capable of sensing motion, arrays of motion sensors, and mixtures or combinations thereof. In other embodiments, the objects include lighting devices, cameras, ovens, dishwashers, stoves, sound systems, display systems, alarm systems, control systems, medical devices, robots, robotic control systems, hot and cold water supply devices, air conditioning systems, heating systems, ventilation systems, air handling systems, computers and computer systems, chemical plant control systems, computer operating systems, systems, graphics systems, business software systems, word processor systems, internet browsers, accounting systems, military systems, virtual reality systems, augmented reality systems, control systems, other software systems, programs, routines, objects and/or elements, remote control systems, or mixtures and combinations thereof. In other embodiments, if the timed hold is brief, then the processing unit causes an attribute to be adjusted to a preset level. In other embodiments, if the timed hold is continued, then the processing unit causes an attribute to undergo a high value/low value cycle that ends when the hold is removed. In other embodiments, the timed hold causes an attribute value to change so that (1) if the attribute is at its maximum value, the timed hold causes the attribute value to decrease at a predetermined rate, until the timed hold is removed, (2) if the attribute value is at its minimum value, then the timed hold causes the attribute value to increase at a predetermined rate, until the timed hold is removed, (3) if the attribute value is not the maximum or minimum value, then the timed hold causes randomly selects the rate and direction of attribute value change or changes the attribute to allow maximum control, or (4) the timed hold causes a continuous change in the attribute value in a direction of the initial motion until the timed hold is removed. In other embodiments, the methods further comprise: sensing second motion including second motion properties within the active sensing zone of the motion sensors, producing a second output signal or a plurality of second output signals corresponding to the second sensed motion, converting the second output signal or signals via the processing units in communication with the motion sensors into a second command function or a plurality of second command functions, and confirming the selection based on the second output signals, or processing the second command function or the second command functions and moving selectable objects aligned with the second motion direction toward the selection object or become differentiated from non-aligned selectable objects and motion continues until a second target selectable object or a plurality of second target selectable objects are discriminated from non-target second selectable objects resulting in activation of the second target object or objects, where the motion properties include a touch, a lift off, a direction, an angle, a distance/displacement, a duration, a velocity, an acceleration, a change in direction, a change in angle, a change in distance/displacement, a change in duration, a change in velocity, a change in acceleration, a rate of change of direction, a rate of change of angle, a rate of change of distance/displacement, a rate of change of duration, a rate of change of velocity, a rate of change of acceleration, stops, holds, timed holds, or mixtures and combinations thereof. In certain embodiments, sensing motions including motion properties of two or more animals, humans, robots, or parts thereof within the active zones of the motion sensors, producing output signals corresponding to the motions, converting the output signals into command function or confirmation commands or combinations thereof, where the start functions activate a plurality of selection or cursor objects and a plurality of selectable objects or attributes upon first sensing motion by the motion sensor and selectable objects or attributes aligned with the motion directions move toward the selection objects or become differentiated from non-aligned selectable objects and the motions continue until target selectable objects or pluralities of target selectable objects are discriminated from non-target selectable objects resulting in activation of the target objects and the confirmation commands confirm the selections.

Systems and Methods Using Bread Crumb Procedures

In certain embodiments, the systems and methods of this invention include using "bread crumbs" or "habits" to determine direction of movement in an active zone or field of a sensor, of a plurality of sensors, and/or of a sensor array. When a user moves towards a desired location on a screen of a phone, especially across the screen to make a touch event, the sensor(s) will begin to "see" data associated with the user's movement, but not necessarily in a continuous manner. Instead, the sensor(s) will see a series of points, with increasing frequency, intensity, and/or coverage area, and will begin to be sensed as the user movement comes closer to "contact" with a desired screen location. This data may be used to determine speed and direction, which in turn may be used to predict or anticipate user intent, which objects or attributes are active for choosing attributes rather than objects first is another application that you have filed. This provides a verification aspect so the objects and/or attributes may be selected before a physical confirmation occurs (a touch event), or to cause objects and/or attributes to begin to respond (with color changes, sounds, tactile feedback, shape, animations, etc.) before a confirmatory touch or action occurs. In this way, movement and then a touch may represent a unique signature or identifier as well. It should be recognized that the bread crumbs or habits may be positive attributes and/or reactions or negative attributes and/or reactions.

In certain embodiments, the systems and methods of this invention include a user performing a movement or gesture then verbally identifying or confirming what attribute, command, or function to associate with the movement or gesture. This may be simultaneously or sequentially performed. Again, in the context of this invention, simultaneous means events that occur concurrently or event that occur in rapid succession within in a "short" time frame (e.g., a short time frame is between about 1 ps and about 1 s), while sequentially means that the actions occur sequentially over a "long" time frame (e.g., a long time frame is between about 1 s and about 10 s). For example, a user moving in an upward direction, while saying "volume up" results in controlling and increasing a volume of a sound. A user may instead say "base" or "base up", and a base intensity increases instead of the volume.

In certain embodiments, the above describe aspect may be used as a security identifier, where a movement and a voice command may be used to unlock a locked menu, object, and/or attribute or act as a unique identifier for activating a menu, object, and/or attribute. By moving with a right finger or thumb from left to right, and saying "open", a locked phone may be unlocked, or any other command or function may occur. Both aspects may provide for biometric identification as well. Another example is facial recognition plus a specific gesture or dynamic motion event. These changes may be sequential changes collected over a long time frame and/or simultaneous changes collected over a short time frame allowing further refinement of user identification, verification and/or authentication. This may also include multiple touches or sensed points, multiple words or commands, or any combination of these. Instead of words, sounds, notes, or any audible or other kind of wave form may be used. Touching a zone or location on a screen, while saying a desired attribute, command, or any other desired choice is another way this may be used. Another benefit of this is the ability to quickly associate commands or attributes (scrolls, selections, actuations, or attributes), training a system or interface in an easy way. In this way, controls can easily be customized to the user preferences.

Another example of this methodology is to use an area of a touch on the screen. By touching the upper right quadrant of the screen (or moving in that direction) and saying "travel", the system may be trained or programmed so that this touch may display a travel menu of objects or other attributes. By touching or moving in (or towards) the bottom right quadrant and saying "food", a menu of restaurants may be displayed. From that point on, touching or moving towards the associated location or area may provide a different menu, selection or attribute than moving towards or touching a different area. In another example, saying "lights" may invoke a display of controllable lights on a mobile device or in a virtual or augmented environment. By aligning a finger or gaze with the "lights" object, the user may say "hallway" and the hallway light would move under the user's finger or gaze, just as if it had been selected by moving towards it (as described in other applications). A color wheel may display and the user move into the color wheel to select a color, or the user may say "warm" and a sliding scale of yellow-based colors would move or appear under the user's finger, which the user could then move to select the desired hue. By having a motion-based architecture already established, any motion may be replaced by a voice command, and any voice command may be replaced by a motion, or a combination of the two. As the User moves towards the bedroom light icon and says "warm", the sliding scale would show under the user's finger (or gaze) and immediate attribute control would be possible. This is also true in 3D environments such as an augmented or virtual reality environment, where gestures or movement may be associated with controls, selections, menu items or attributes by performing the desired gesture or motion and saying (simultaneously or sequentially) what the associated attribute and/or selection is. This may be performed in virtual space or on real displays, so that areas or volumes or locations in 2D and 3D space may operate in the same way.

In certain embodiments, the systems and methods of this invention include locating an object at a point where it may have been before, or a 3D camera in a structure so it is the optimal distance from walls or other objects in a space. One way of doing this is to take a phone (or any device with sensors) and touch a wall or come close enough to be considered a threshold event (for example) with the phone and a trigger of some kind (touching a control object on the phone or saying "start" or other kind of triggering command, and begin to walk towards a perceived location in the middle of a room. The phone displays a visual "chord" or vector from where the wall was touched to your location. This may be done by using the compass, magnetometer, gyroscope, accelerometer, or any other sensor of the phone and the steps as measure by other sensors of the phone (such as changes in the accelerometer data of the phone). Repeating this with each wall, or at least one or two points, and as the user moves, the intersection of these vectors can be determined and seen on a screen. By running spatial algorithms, the central part of the room can be determined. This can then be repeated later using different wall points to locate the center at a later point. By also using the distance from each wall or using corners or a wall at a specific height, accuracy is greatly enhanced. This ability to "drag" a set of vectors makes it easy for a user to move and locate the point they wish to recreate or find by using a display, processor and sensor combination. A central point or center of area can be determined as well as a previous point. In this way, a camera may be set at the same point over time to get sequential pictures from the same location.

The zoom level may also be set by a hold or other event, such as a touch, a "bounce" or "jerk" movement or gesture (of any kind), or verbal command, or any combination of these in motion based processing systems and methods described herein.

Zoom levels may be set by common parameters that are sensed, i.e., a distance from the face (most people will have a preferred distance to read, and this may be preset, or set at some point), and then holding the device at that point (within a range) triggers the capability.

Certain real content (real-world objects or images seen through a camera or sensed by other sensors in real time, sounds heard in real time by a microphone or other sensor), imaged content (web pages, images, videos, any other content shown on a device, or any kind of content not being seen as real content), virtual content (animated or extra image content that is associated with imaged or real content—i.e., when looking at a picture of a shirt either through the camera of a device, or while looking at an image of a shirt from a web site may trigger an animated 3D person wearing the shirt and walking on a sidewalk to provide further content to a user), or any data (commonly called metadata) associated with any content-any of these, or combination of these, may trigger a set point or to cause the systems to activate with a certain preset zoom and/or pan level.

Multi-User Combinational Controls

Embodiments of this invention also relate to systems and methods that include motion based sensor subsystems that support a plurality of users interacting with the sensor subsystem so that the systems are methods change the attributes of the displayed object(s), attribute(s), and/or environment(s) by combining the user interactions resulting in a combinationally changed object(s), attribute(s), and/or environment(s). For example, if the display is a hologram or picture, the sensor subsystems will sense movement by each user as each user interacts with a motion based processing subsystem of this invention. The systems and methods of this invention then combines the user interactions to change the picture or hologram to reflect a combination of the individual system interactions. For example, if the multiple users are interacting with a hologram and each select a color for the hologram, then the color actually displayed will constitute a color that is an addition of the colors selected by the users. If one user selected blue and another selects red, then the resulting color will be purple. The actual color may also be based on a "strength" of the selection or a "manner" of selection or a "timing of the selection". Thus, if the blue user is first to select, then the resulting color may be a bluer purple, while if the red user is first to select, then the resulting color may be a redder purple. If the blue user, make a more the blue selection immediately, while the red user took longer to select, then the resulting color may be a bluer purple. In virtual or augmented reality environments, interactions by multiple users within the environments may result in objects, features and/or attributes of the environments changing in a combinational manner based on a synthesis of the individual user interactions. For example, if the environment represents a game played by multiple users, then the systems and methods of this invention would change the objects, features, and/or attributes of the gaming environment based on a synthesis of the user interactions. Such combinational interactions may be used to alter the gaming environment as the game is being played in a manner wholly unexpected by the users. The same type of synthetic changes may be used in other type of systems including image processing, website design, data processing, financial processing, tread analyses, etc., where the system integrates all user interactions to display a combinational analysis of the processing results. In other embodiments, the systems and methods will capture sensor data relating to the size, proportions, other physical attributes of the users, objects, entities, etc. that are moving within the active zone or zones of the sensor or sensors or sensor array or sensor arrays.

Eye, Facial, and/or Body Expression/Language Used in Motion Based Processing

Embodiments of this invention also relate to systems and methods that include capturing eye, facial, and/or body language/expression and using the information in aspects of motion based processing herein. As previously states, eye, facial and body (in whole or in part) movement is used either for direct control of the functioning of the interfaces of this invention or a confirmatory movement for function selection and activation. However, this data does not capture the full range of data that may be used in motion based processing. There are a number of physiological changes that occur when people interact with people or things. Iris dilation and constriction, eyes fix, flutter or move, eye lids blink, facial expressions change, facial flushing, sweating, temperature changes, moisture content of tissue, body parts move or pose, for scent sensors odor, changes in odor, changes in breathing and gas output, chemical and neurological changes occur, etc. All of these changes evidence likes, dislikes, fascination, excitement, pleasure, anger, rage, and/or any other human emotion. These attributes of body part changes due to interactions with information content may be used to assist in the motion based function selection and processing and in improving prediction of motion based function selection and processing and in tailoring the motion based interfaces for the particular user based on these changes in body part movements and poses. For example, as an interface of this invention is activated and a scrolling function is invoked causing a list or menu to scroll across the display or other human cognizable output device, a change in iris dilation or constriction may be used to cluster desired content from less desired content or for activation of the object that corresponds to the highest amount of dilation or constriction. These same changes may be used to confirm a preliminary selection or to reject a preliminary selection. As the user interacts with the system over time, the system learns from these changes and structures the objects or content to conform with these changes. These changes may also be used in the construction of unique identifiers for new programs accessed by the user and color coding system or acoustic system may be used allowing "highlight" (color, sound, shape, pulsating, etc.) one or more objects to attract the attention of the user. The particular highlighting may be determined from general preference-how people in general respond to different stimuli or may be particularized based on the systems or methods learning what a particular highlighting a particular user responds best to. Of course, negative responses may be used to de-emphasize objects by invoking negative highlighting-highlighting that the user would not be attracted to. As this information is kinetic, the information may be combined with the biometric and other movement properties in the creation of unique identifiers. Thus, the systems of this invention may improve identifier uniqueness not only by capturing data associated with the manner of interaction with the interface, but also by using physiological responses and changes in physiological responses of a body and/or body part (e.g., physiological responses and changes in response of eyes, cars, face, mouth, lips, finger, hands, arms, shoulders, head, iris, sweat, or any other detectable change in physiological responses of bodies or body parts) to further enhance user identification. Thus, the systems of this invention may simply observe the user until the systems have accumulated sufficient user specific biometric, kinetic, and/or biokinetic data to construct unique identifiers so that when user activates a new application that requires a user name and password, the systems generate unique user names and passwords that are established without the user having to remember anything. The systems would simply observe the user and then all applications user names and passwords established using the systems of this invention would be automatically established when a particular application is activated.

Ereaders

In certain embodiments, where the systems and methods of this invention are adapted to work with e-readers, the systems and methods would be able to follow the eye movement of the user and when the user came to the end of a page eye movement away from the page would cause the systems and methods to advance the page one page forward. The systems and methods could also be customized to each user so that when the user eye gets to the bottom of the page, the top part of the page would be begin to fade into the next page with final part of page fading to the new page as the user eye tracks up. In other embodiments, the systems and methods may learn the readers reading speed so that page changing or page fading may be timed to the users reading speed.

Encryption Systems and Methods

Embodiments of this invention also relate to methods for encrypting data between users. The methods involve establishing a biokinetic identifier for each user using motion and biometric sensors to construct a unique biokinetic identifier for the sender and receiver. The identifiers are then embedded in files to be sent during encryption and act as the keys for locking an opening the file after transmission and receipt. Thus, the sender is able to open the file for any purpose and the receiver is able to open the file for any purpose.

While the biokinetic identifiers may be preconstructed by the users using the interfaces and systems of this invention, the identifiers may be made even more unique by constructing the biokinetic signature at the time of encryption. Thus, the systems capture sufficient biometric and kinetic data from the sender and receiver to construct on the fly unique identifiers. The receiver biokinetic identifier, whether premade or on the fly, is transmitted to the sender system. The sender system then uses the sender identifier, whether premade or on the fly, and the receiver identifier, whether premade or on the fly, as the lock and key for encrypting the file. The file can then be sent from the sender system to the receiver system.

Security Systems and Methods

Embodiments of this invention also relate to computer security systems utilizing the unique biokinetic identifiers. Once the computer security system software of this invention is installed on a computer, the system utilizes the motion and biometric sensors to construct a security identifier to reduce or prevent security breaches into the computer. When the user opens the computer, the system using the security identifier to unlock the computer before it can be used.

For computer networks including a plurality of computers, the computer security systems are installed on all of the computers. Once installed, the systems are used to construct a plurality of authorized security identifiers. These authorized security identifiers, which are each biokinetic identifiers unique for each authorized personnel, are then uploaded to each computer in the computer network. The set of authorized personnel may be updated or modified by a subset of the authorized personnel that have the authority to add, delete, update or modify user security levels, where the security levels provide the systems with information on the scope of activities each authorized person can undertake in changing or modifying elements of the computer systems from added new computers, to deleting old computers, to updating user information on each computer, to locking computer systems when motion sensor or biometric sensors fail or the software becomes corrupted. Once the computer security systems have been installed across the network to all connected and authorized computers and the authorized security identifiers have been uploaded to all the connected and authorized computers, each time a user activates the computer assigned to the user, the systems captures biometric and motion data via the biometric and motion sensors, which of course may be the same or different, until a unique biokinetic identifier is capable of being constructed. Once constructed, the identifier is uploaded to an identifier database and the computer is locked by the identifier so that each time the user comes to the assigned computer, the systems will capture biometric and motion data sufficient to determine that the user is then one assigned to this computer. Of course, each computer may be assessable by one or more users, provided that the identifier of each user is resident on the user computers. Please note that each identifier of this invention is designed to have a security quotient of greater than about 80%, greater than about 85%, greater than about 90, greater than about 95%, or greater than about 99%.

Deliberate Movement Differentiated from Spontaneous or Non-Deliberate Movement

In certain embodiments, the systems, apparatuses, and/or interfaces of this disclosure and the methods implementing them include sensing deliberate or intentional, generally predefined, movements, outputting the sensed movement as an output, and converting the output into a command and control function including, without limitation, a select function, an activate function, a scroll function, an attribute control function, and/or combination thereof. The deliberate or intentional movements may be associated with eye tracking or head tracking motion sensors or with any other motion sensor or deliberate or intentional movements associated with a specific body part or member under the control of an entity. The deliberate or intentional movements may be to move an eye or the eyes across a displayed selectable object, then to change a speed a predetermined amount so a desire function is invoked. For example, for the systems, apparatuses, and/or interfaces including a display and an eye-tracking sensor, when the user looks across a particular object or a set of objects or stares at a particular object or set of objects, then a particular function may be invoked such as a select function, a select and activate function or a select, activate and adjust attribute value function, but if the user looks across a face of the object at a preset speed, then a particular function may be invokes such as a select and activate function. It should be recognized that in the case of eye movement, the deliberate or intentional movements including its movement properties must be discernibly distinct from normal eye movement. In certain embodiments, the systems, apparatuses, and/or interfaces sense motion from one or more motion sensors and monitor the movement until the movement meets one or more criterion sufficient to distinguish the movement from normal eye movement-threshold criteria are satisfied. For example, the deliberate or intentional movement may be a slow but continuous movement, a pause at a corner and a look quickly towards another corner (diagonally), or some other change of rate of speed or acceleration that is distinguishable from normal eye movement.

Another example of deliberate or intentional movements may involve differentiating normal viewing behavior from viewing behavior that is deliberate. Users typically do not look directly at a middle of a displayed object, but rather look at the whole object or just below a center, i.e., the users focus is not on the center of the object. Thus, a deliberate movement may be just to stare at a center of an object or to stare at some other location in an object; provided, however, that the movement is sufficient for the systems, apparatuses, and/or interfaces to distinguish the movement from normal eye movement. A person may look at an object, and when it is determined by a sensor that an object is generally being looked at, a center or centroid of the object may be displayed differently (or just be active without appearing differently), such as a square or circle showing the centroid area so that the systems, apparatuses, and/or interfaces may use the motion sensor output associated with looking into the area or volume or moving through this area or volume and converting the output into a command and control function. Of course, the triggering area or volume may not be the center, but may be another location within the object. Therefore, looking at or towards an object may cause the systems, apparatuses, and/or interfaces to pre-select the object, but only when the user moves the gaze into the active area/volume (generally predefined) does the systems, apparatuses, and/or interfaces invoke a particular command and control function. Alternatively, the deliberate movements may involve moving across a predefined area, where speed of the motion does not matter, only that a traversal to a certain threshold is reached. Additionally, other movement properties (e.g., speed, velocity, and/or acceleration or changes of these) may be used as part of the predefined movement to invoke a particular function or functions. This same technique may be applied to users that have certain type of maladies that prevent them from smooth movement, the systems, apparatuses, and/or interfaces may be tailored to determine difference(s) between normal user movement and deliberate user movement even though the difference(s) may be subtle.

Constructs with Continuous Properties

In certain embodiments, the systems, apparatuses, and/or interfaces of this disclosure and the methods implementing them may utilize constructs having continuous properties (e.g., continuous values-analog-instead of discrete values-digital). In such environments (all objects are waveforms that are capable of interacting), the movement may navigate through the continuous properties with a change in movement or a deliberate movement may result in the selection of a particular value of a continuous property or a set of continuous properties. Thus, waveform and waveform interactions may be manipulated, adjusted, altered, etc. and viewed. Additionally, given interaction patterns may cause the systems, apparatuses, and/or interfaces to invoke a particular function or set of functions. Attribute may be a subset or other attribute of an object, but may also be associated with a change in a waveform, that is different from scrolling, in that scrolling must have integer values (or stops along a path). It like a guitar, where scrolling would be moving through frets, but sliding the string sideways (bending) the string produces frequency changes with no preset integer values, where systems, apparatuses, and/or interfaces may use both outputs to invoke a different function or set of functions, which may be predefined or determined from context on the fly.

Real-Time Prediction of User Intent

People move typically in a straighter line, and faster when they know what they want or are choosing something. In certain embodiments, the systems, apparatuses, and/or interfaces may be used to predict to a certain probability, what a particular user choice may be based on how fast and/or straight the user moves towards a particular selectable object. In some cases, such as movement of the thumb, where the movement comprises rotating about a thumb joint, the motion may be arcuate, and moving in a non-arcuate manner may be seen as more intentional, thus providing a higher probability. Other things that may affect the confidence of making a selection (or the probability), include proximity (closer to one object than another), slowing down as approaching a particular object (changes in direction, distance, duration, speed, velocity, acceleration, etc.) such as decelerating when moving towards a particular letter on a keyboard, then moving away at an increased acceleration (after choosing a letter on a keyboard and moving to the next). The systems, apparatuses and/or interfaces may improve real-time confidence determinates by using artificial intelligence (AI) routines based on confidence data including historical, environmental, or contextual data stored in libraries and/or databases and may be coupled with the the above movement properties to enhance predictive confidence.

Self-Centering User Interface (SCUI)

In certain embodiments, the systems, apparatuses, and/or interfaces of this disclosure and the methods implementing them relate to novel self-centering interface (SCUI) for controlling objects (software, hardware, attributes, waveforms or any other selectable, scrollable, activatable, scrollable or otherwise controllable thing) such as controlling drones through head motions using head motion sensors. For example, picture a compass rose with a hole in its middle and divided into 4 quarters: NE, NW, SW and SE. As the user moves leftward in the SW quadrant, the systems, apparatuses, and/or interfaces may cause the drone to move to the left and a distance of the movement to the left controls the speed of the drone's movement to the left. Thus, the further the user moves to the left within the SW quadrant the faster the drone moves to the left. Similarly, as the user moves rightward in the SE quadrant, the systems, apparatuses, and/or interfaces may cause the drone to move to the right and a distance of the movement to the right controls the speed of the drone's movement to the right. Thus, the further the user moves to the right within the SE quadrant the faster the drone moves to the right. In this way, the user may use a pair of glasses (such as AR/VR/MR glasses, etc.) and see the drone, and move the drone while using a semi-transparent UI design, when using an intentional speed of head movement, i.e., deliberate head movement. So, by moving quickly, the UI may not cause the drone to move as the systems, apparatuses, and/or interfaces may determine that such movement does not represent a deliberate movement sufficient for drone control. Thus, if the movement is determined by the systems, apparatuses, and/or interfaces to be a deliberate movement, then the UI may cause the drone to undergo are corresponding movement. By moving in a specific deliberate manner, a menu may be activated, the view centered along the focus or gaze direction (self-centering) and the menu objects or elements arranged in a spaced apart configuration (e.g., concentrically) about a center of the user head or eye position, i.e., arranged about the gaze point. In this donut compass rose example, when the gaze is in the center, or donut hole area, the systems, apparatuses, and/or interfaces cause the drone to transition into a stationary state, which may be a hover state or a state of constant motion based on the last set of head/eye movements. The systems, apparatuses, and/or interfaces may discriminate between a hover state and a constant motion state base on the duration of the gaze (duration of a timed hold), on where in the center area the gaze is fixed. Moving left and right (x-axis) moves the drone left and right. Moving up and down (y axis) move the drone up and down. Moving in a combination of x and y movement, moves the drone similarly. Additionally, other movement within different quadrants such as the movement within NW or NE quadrants may control rotation of the drone on its axis, left or right, respectively, or may control pitch, yaw, roll, or other motions.

In other embodiments, the systems, apparatuses, and/or interfaces of this disclosure and the methods implementing them relate to novel user interfaces comprising three different control object formats: screen locked, world locked absolute, and world lock relative. Screen locked means that an object, a plurality of objects, an attribute, and/or a plurality of attributes remain in the user field of view at all times regardless of where in the "world" the user view is. World locked absolute means that an object, a plurality of objects, an attribute, and/or a plurality of attributes may become associated with or transitioned to a specific world view object or a specif world view location remain fixed to that object or location and do not move. Therefore, if the user movement moves that view so that the object or location moves outside of the current view, then the control objects and/or attributes associated with the object or location will be no longer visible. World locked relative means that an object, a plurality of objects, an attribute, and/or a plurality of attributes may be associated with or transitioned to the world view, but the object, the objects, the attribute, and/or the attributes may follow the user gaze, but lag behind so that they may not be accessible until the movement stops or stops for a specific period of time. For drone controls, certain drone controls may be screen located, while other drone controls may be world locked absolute, while other may be world locked relative. For example, a target and/or target attributes may be world locked absolute, a drone position controls for moving the drone along a path to the target may be world locked relative, and camera controls or weapon controls may be screen locked. Of course, the user may change the objects and attributes that are screen locked, world locked absolute, or world locked relative.

Putting these concepts together, sensing a deliberate movement causes the systems, apparatuses, and/or interfaces to activate the UI or to begin user interaction with the UI and causes an image of the drone to appear in the world view. The UI comprises the three locked formats. Then, sensing movement to the left within the SW quadrant, the systems, apparatuses, and/or interfaces causes the drone to move left, where the speed of drone movement to the left is controlled by the distance the sensed movement of the user to the left within the SW quadrant. As the drone moves, the screen locked object, objects, attribute, and/or attributes move with the users; the world locked absolute object, objects, attribute, and/or attributes remain fixed to an object in the world or a location in the world; and the world locked relative object, objects, attribute, and/or attributes track the movement of the drone. The tracking may be appear as it the object, objects, attribute, and/or attributes are screen locked-they move in direct correlation to the drone, or they are move at a slower rate or they move so that only after user movement stop that they move back into the user view. Optionally, the world locked relative object, objects, attribute, and/or attributes may move in front of the drone so that the has a preview of the drones course and may adjust it accordingly. When the user head or eye movement stops at a gaze point (user gaze at a fixed location in the world view), then the drone movement will either stop or the drone continues to move in accord with the movement at the time the user movement stops, where a type of gaze-duration, gaze center, etc., determines whether the gaze cause the drone to hover in place or continue to move in accord with the last movement properties. In certain embodiment, once a fixed gaze is detected, then the world locked relative object, objects, attribute, and/or attributes, which have been following the user movement, catches up to the gaze point, and become centered about the gaze point. Because the UI is controlling the drone, the drone now centers itself in alignment with the UI, which is centered around the gaze point. In one embodiments, the UI lags slightly behind the gaze point, and the drone lagging slightly behind the UI.

This same UI may also be used to control z-axis motions by either using 3D sensor data (from head motion sensor or other motion sensors), or by using a unique 2D construct that provides 3D controls. An example of this is the same compass rose (or circular/radial UI menu/controller) with a donut hole, but now adding a designated z-axis area as described herein. In one embodiment, the UI is in the shape of a funnel as set forth herein, providing a slim, pure z-axis control wedge zone centered within the z-control wedge. Moving towards or away from the center of this z-zone moves the drone along the z-axis. The UI is divided into two parts, with a dead zone. The center area provides 3D x/y/z axis controls, while the outer part of the funnel is 2D and provides only x/y control (as described above). In the 3D area, if the user moves out of the Z-zone, but remains in the inner section, then the motion represents a combination of x, y and z. If the user moves into the outer zone, only x/y controls are provided.

Automotive Display System

In certain embodiments, the systems, apparatuses, and/or interfaces may be configured to display traffic information, traffic signs, and traffic notices projected onto the windshield. Billboards and regulatory signs and other traffic related notices are common when driving a vehicle on roads, highways, freeways and tollways throughout the world. The systems, apparatuses, and/or interfaces may be configured to display on the windshield (e.g., HUDs) or on the interior surface of visor of a helmet representing a new method for providing information to drivers or occupants. One specific example is where a driver is traveling along a highway approaching a location that is designated as an information or regulatory sign area or sensors on the vehicle "sees" an information or regulatory sign, a virtual representation of the sign may be displayed in a center of the windshield, appearing smaller and with a perspective of appearing far away. As the driver continues moving toward the sign, this virtual sign grows larger and moves across the windshield just as if it was a real sign and the driver was passing it by. Being a virtual sign, the image and information may be "frozen" or recalled at any time, replayed, or may be magnified or scrolled through using motions as has been described herein. In addition, the systems, apparatuses, and/or interfaces may use voice commands or a combination of motion and voice commands to recalled at any time, replayed, or may be magnified or scrolled through viewed signs. Being able to interact with motion on a steering wheel (touchpad, optical sensor, etc.), with eye tracking, HUD, or any other ways may provide the driver the ability to review missed information. It may also provide the ability to have changes updated according to the vehicle or occupants (speed of vehicle, notifications from family members, etc.) in real time or according to scheduled times. The systems, apparatuses, and/or interfaces may also be linked to a phone or other system, and this information may be displayed as one of these virtual signs as well, whether connected to a location or not. With regard to speed, the systems, apparatuses, and/or interfaces may also display vehicle speed above or below certain differences from regulations, providing flashing or other animated graphics, or even multiple layers at once to show differences over time of messages.

Analytics Using the Same Motions That Control Things

In certain embodiments, the systems, apparatuses, and/or interfaces may use historical data to predict user intent and cause actions (such as selections) to happen faster without have to move to an object. Thus, by analyzing past user behavior and movement characteristics, the systems, apparatuses, and/or interfaces may be able to more quickly, which object aligned with a particular movement is more likely the target. The same vectors that change with speed and direction (and these changes provide controls) also tell us many things about the user. For instance, scrolling back and forth (say x-axis movement) between two out of five items, then moving towards a particular object (say y axis movement), selects and activates that object. But knowing the other objects lets the systems, apparatuses, and/or interfaces classify alternate choices, that may be ranked based on historical data. The use of analytics may find particular application in advertising or training methods using the motion based systems, apparatuses, and/or interfaces of this disclosure.

In other embodiments, systems, apparatuses, and/or interfaces may use these predictive methodologies that cause objects to move towards the user or a selection object to predict zones for foveated rendering. In VR or other mixed reality environments, graphics rendering is extremely time consuming. To compensate for this, graphics rendering at the highest resolution is generally restricted to an area or areas associated with a center of vision. By restricting the high resolution rendering to these areas provides the user with a good experience. Thus, the high resolution graphics rendering doesn't need to be performed on zones, areas, or volumes not being looked at. In this way, prediction of where the user will be looking may assist in foveated rendering, so that part of the display may be rendering the predicted zones, so the user sees no apparent delay in rendering.

In other embodiments, the systems, apparatuses, and/or interfaces of this disclosure and the methods implementing them, where the systems, apparatuses, and/or interfaces include at least one eye and/or head tracking sensor, at least one processing unit, and at least one user feedback unit. The systems, apparatuses, and/or interfaces permit two different pinning modes. The first pinning mode is that the tracking sensor includes information about objects displayed in a tracking based manner viewable at a left and right edge of the viewing plane. These object may be selected by moving the head and/or eyes toward the tracking pinned objects causing them to appear in the center of the field so that they can be controlled by further head and/or eye movement. As the user views a real world object in a real world environment, an object in a AR environment or an object in a VR environment, the user may transition the selection format from a tracking pinned format to a world pinned format. In the tracking pinned format, the selection and control function for the object under the control of the systems, apparatuses, and/or interfaces remain with the tracking sensor and may be accessed at any time, but once the user sees an object pauses at the object or moves in a predetermined manner toward that object, the systems, apparatuses, and/or interfaces pins the object control functions to the object. The pinning may be permanent or relative. Permanent pinning ties the control functions to the object so that you may return to the object to be able to control its attributes. Relative pinning means that the object control function travel with the world view either directly or with a lag as it follows the eye and/or head movement.

The inventor has found that movement based systems, apparatuses, and/or interfaces and methods implement them, where the systems, apparatuses, and/or interfaces include at least one sensor, at least one processing unit, at least one user cognizable feedback unit, and one real and one real or virtual object or a plurality of real and/or virtual objects controllable by the at least one processing unit, where the at least one sensor senses blob data associated with touch and/or movement on or within an active zone of the at least one sensor and generates an output and/or a plurality of outputs representing the blob data, and where the at least one processing unit converts that blob data outputs into a function or plurality of functions for controlling the real and/or virtual object and/or objects.

Triggers

In certain embodiments, the systems, apparatuses, and/or interfaces of this disclosure and methods implementing them use a marker or an image/character recognition feature to trigger a menu or metadata that may then be used with menuing systems of this disclosure or any other menuing system. These markers or features are similar to a 2D or 3D barcode, emoticons, or any object or feature that may be recognized as a trigger. The trigger may be used to unlock certain locked menus or lists for special access. The triggers may also be used for tailoring triggers to cause the systems, apparatuses, and/or interfaces to invoke specific and pre-defined menus, objects, programs, devices, or other specific or pre-defined items under the control of the systems, apparatuses, and/or interfaces.

Systems, Apparatuses, And/or Interfaces and Methods Using Blob Data

In certain embodiments, the systems, apparatuses, and/or interfaces of this disclosure and methods implementing them include using blob data as a source of movement data for analyzing, determining, and predicting movement and movement properties, where movement is understood to mean sensing movement meeting a threshold measure of motion by a motion sensor, a plurality of motion sensors or an array of motion sensor for use in motion based object control, manipulation, activation and/or adjustment. Blob data comprises raw motion sensor data representing sensor elements that have been activated by presence and/or movement within an active area, volume or zone of the proximity and/or motion sensor(s). In the case of a touch screen including a large plurality of touch elements, touching the screen produces raw output data corresponding to all touch elements activated by the area of contact with the screen and comprise the blob data for touch screen or other pressure sensors or field density sensor or sensor including activatable pixels or any other sensor that include elements that are activated when a threshold value associated with the element is exceeded (pressure, intensity, color, field strength, weight, etc.). The term activate as it relates to touch elements means that touch elements within the contact area produce touch element outputs above a threshold level set either by the manufacturer or set by the user. For other types of sensors, movement within an active sensing zone of the sensors (e.g., areas for 2D devices, volumes for 3D devices) will activate an area and/or a volume within the zone. These areas and volumes represent the "blob" data for each type of device and comprises elements having a value exceeding some threshold value for activating the elements. For image based sensors, the activate elements will generally comprise pixels having a threshold value of pixel values. For capacitive sensors or inductive sensors or electromagnetic field (EMF) sensors, the blob data will relate to areas or volumes corresponding to sensor elements that meet a threshold output for the sensors.

The blob data (activate element area or volume) will change with changes in contact, pressure, and/or movement of any kind. The blob data represents an additional type of data to control, manipulate, analyze, determine, and predict movement and movement properties. The blob data may be used to identify a particular finger, to differentiate between different fingers, to determine finger orientations, to determine differences in pressure distributions, to determine tilt orientations, and/or to determine any other type of change in the blob data.

In the biokinetic applications, the blob data with or without the addition of filtered data (center of contact, center of pressure, or other types of centroid data) may be used to create a proportionate and/or unique user identifier. Not only may blob and centroid data be biometric identifiers, but the relationship between the two is a more unique biometric, or electro-biometric identifier. The systems, apparatuses, and/or interfaces of this disclosure may also include sensing, determining, and analyzing the blob data and determining and analyzing filtered data or centroid data for use in analyzing, determining, and predicting movement and movement properties for use in motion based object control, manipulation, activation and/or adjustment of this disclosure. For example, a user places a thumb on a phone touch screen. In doing so, the blob data may be used to identify which thumb is being used or to confirm that the thumb belongs to a particular user. If the touch screen also may include temperature sensors, then the blob data may not only be used to differentiate and identify particular thumbs (or fingers, irises, retinas, palms, etc.) alone or in conjunction with other movement data based on a shape of the blob data or output signal and a direction to which the blob data or blob data and centroid data may be pointing or oriented. This technique may be used to directly turn a knob using a pivoting movement versus using movement of a centroid, where the thumb is represented as a point and movement of the centroid from one point to another is used to determine direction. Using blob data allows the user to select zones, control attributes, and/or select, scroll, activate, and/or any combination of these, the systems and methods of this disclosure simply by pivoting the thumb. Then moving the thumb in a direction may be used to activate different commands, where the blob data movements may be used to accentuate, to confirm, to enhance, and/or to leverage centroid data. For examples, pivoting the thumb while in contact with the touch screen results in blob data that may be used to determine finger orientation and/or tilt, allowing the user to select between groups or fields of objects (for example), or through pages of data or objects. Once the user scrolls and selects a particular group or field, further movement results in a different set of set of controls, instructions, commands, attributes, etc. The systems and methods may use the blob data to "see" or anticipate movement attributes (direction, pressure distribution, temperature distribution, speed (linear and angular), velocity (linear and angular), acceleration (linear and angular), etc. The systems and methods may use the blob data, the centroid data or a combination of the two types of data to analyze, determine and/or predict or anticipate user movement. The transition from blob data to centroid data may also be used to see or anticipate user intent. For example, as a user twists or pivots the thumb, then begins to move towards an object, zone or location, the thumb may begin to roll in a lifting motion, rolling up towards the tip of the thumb, providing less of a pattern and more of a typical centroid touch pattern on the screen. This transition may also provide user intent through not only movement in an x/y plane, but also providing shape distinctions that may be used for commands and other functions. The rocking of the thumb or finger (rocking from a flat orientation to a tip orientation) may also provide z-axis attributes or functions. This may also be combined with movement while rocking. In 3D environments, the blob and/or centroid data (along with other movement attributes such as direction, pressure distribution, temperatures distribution, etc.) maybe used, but instead of blob data, pixilation in 3D in any environment, or volumetric differences (sensed in any way) along axes (plural) may be used in the same way as blob and/or centroid data to analyze, determine, anticipate, and/or predict user intent. These aspects may also be seen or used as a "field" of influence determinative. In these embodiments, temperature may be used for a number of different purposes. First, the temperature data may be used to ensure that the motion sensor is detecting a living person. Second, the temperature data may be used as data to insure that the user sensed within the active zones of the sensor or sensors is indeed the user that has access to the systems and methods on the particular device. Of course, temperature data is not the only data that the sensors may determine. The sensors may also capture other user specific data.

In certain embodiments, the systems and methods of this disclosure include controlling a hologram remotely or by interacting with it. Pivoting the hand in parallel with a field may provide one control, while changing an angle of the hand may be perceived as a "blob" data change, a transition to centroid data, or a combination thereof. This transition may also be represented on a display as going from a blob to a point, and the transition may be shown as a line or vector with or without gradient attributes. Putting these into the hologram example, changing from blob data to centroid data, and seeing a vector and a gradient of change of volume or area along the vector may be used to change the display in the hologram of a shoe (for example) so the shoe may change size and direction according to the movement of the user. This methodology may be performed in any conceivable predetermined or dynamically controllable way, where attributes may be any single or combination of intent, attribute, selection, object, command or design. These movements and/or movement attributes may be simultaneously or sequentially used in any environment, and in whole or part, and include gradients of attributes based on changes of perceived mass, pressures, temperature, volume, area, and/or influence. These changes may be sensed and defined by any sensor or software reproduction ability (software may be used to replicate movement or the effects of movement). This also allows for a 2D sensor to provide 3D controls. All this may also be used to determine unique BioKinetic identifiers as well and in combination with these attributes.

In certain embodiments, the systems and methods of this disclosure include using blob data to orient a menu appropriately, where the blob data comprises raw sensor output data based on a number of sensing elements being activated above the threshold activation. For example, in the case of a touch screen, when a user touches the screen with a finger tip or other part of a finger, the sensor generates a blob of data comprising all sensing elements activated (based on some threshold activation value). The data is generally used to determine a centroid of the contact and that value is then used in further processing. However, the blob data may be used not only to differentiate different users, but may also be used to predict or anticipate user movement and ascertain movement and changes in movement. By knowing which thumb or finger is located at what area of the screen, the displayed menu upon a touch or entry into a sensor area may be positioned to provide a best heuristics or positioning based on the touch area and or user movement. For instance, touching the right thumb on a right side of a phone screen in a lower quadrant may signal the systems or methods to display a menu along a radius just above the thumb, while an angle of the thumb when touching a middle of the screen may result in displaying a radial menu just below the thumb if the thumb was pointing upwards towards an opposite corner, or above the thumb if the thumb was pointing towards a bottom left corner.

In certain embodiments, the systems and methods of this disclosure include one menu appearing when touching an upper part of the screen and a different menu appearing when touching a different part of the screen such as a lower part of the screen. If the finger is flat and not angled when touching the screen, different menus may be activated. So the position of the finger, finger angle, finger direction, finger pressures distribution, and/or combinations thereof may result in different menu sets, object sets, attribute sets, command sets, etc., and/or mixtures of combinations thereof for further processing based on movement data. Of course, all of these concepts may be equally applied to 2D, 3D, 4D, or other multi-dimensional environments both real, augments and/or virtual.

Systems and Methods Using Bread Crumb Procedures

In certain embodiments, the systems and methods of this disclosure include using "bread crumbs" or "habits" to determine direction of movement in an active zone or field of a sensor, of a plurality of sensors, and/or of a sensor array. When a user moves towards a desired location on a screen of a phone, especially across the screen to make a touch event, the sensor(s) will begin to "see" data associated with the user's movement, but not necessarily in a continuous manner. Instead, the sensor(s) will see a series of points, with increasing frequency, intensity, and/or coverage area, and will begin to be sensed as the user movement comes closer to "contact" with a desired screen location. This data may be used to determine speed and direction, which in turn may be used to predict or anticipate user intent, which objects or attributes are active for choosing attributes rather than objects first is another application that you have filed. This provides a verification aspect so the objects and/or attributes may be selected before a physical confirmation occurs (a touch event), or to cause objects and/or attributes to begin to respond (with color changes, sounds, tactile feedback, shape, animations, etc.) before a confirmatory touch or action occurs. In this way, movement and then a touch may represent a unique signature or identifier as well. It should be recognized that the bread crumbs or habits may be positive attributes and/or reactions or negative attributes and/or reactions.

In certain embodiments, the systems and methods of this disclosure include a user performing a movement or gesture then verbally identifying or confirming what attribute, command, or function to associate with the movement or gesture. This may be simultaneously or sequentially performed. Again, in the context of this disclosure, simultaneous means events that occur concurrently or event that occur in rapid succession within in a "short" time frame (e.g., a short time frame is between about 1 ps and about 1 s), while sequentially means that the actions occur sequentially over a "long" time frame (e.g., a long time frame is between about 1 s and about 10 s). For example, a user moving in an upward direction, while saying "volume up" results in controlling and increasing a volume of a sound. A user may instead say "base" or "base up", and a base intensity increases instead of the volume.

In certain embodiments, the above describe aspect may be used as a security identifier, where a movement and a voice command may be used to unlock a locked menu, object, and/or attribute or act as a unique identifier for activating a menu, object, and/or attribute. By moving with a right finger from left to right, and saying "open", a locked phone may be unlocked, or any other command or function may occur. These changes may be sequential changes collected over a long time frame and/or simultaneous changes collected over a short time frame allowing further refinement of user identification, verification and/or authentication. This may also include multiple touches or sensed points, multiple words or commands, or any combination of these. Instead of words, sounds, notes, or any audible or other kind of wave form may be used. Touching a zone or location on a screen, while saying a desired attribute, command, or any other desired choice is another way this may be used. Another benefit of this is the ability to quickly associate commands or attributes (scrolls, selections, actuations, or attributes), training a system or interface in an easy way.

Another example of this methodology is to use an area of a touch on the screen. By touching the upper right quadrant of the screen (or moving in that direction) and saying "travel", the system may be trained or programmed so that this touch may display a travel menu of objects or other attributes. By touching or moving in (or towards) the bottom right quadrant and saying "food", a menu of restaurants may be displayed. From that point on, touching or moving towards the associated location or area may provide a different menu, selection or attribute than moving towards or touching a different area. This is also true in 3D environments such as an augmented or virtual reality environment, where gestures or movement may be associated with controls, selections, menu items or attributes by performing the desired gesture or motion and saying (simultaneously or sequentially) what the associated attribute and/or selection is.

In certain embodiments, the systems and methods of this disclosure include locating an object at a point where it may have been before, or a 3D camera in a structure so it is the optimal distance from walls or other objects in a space. One way of doing this is to take a phone (or any device with sensors) and touch a wall or come close enough to be considered a threshold event (for example) with the phone and a trigger of some kind (touching a control object on the phone or saying "start" or other kind of triggering command, and begin to walk towards a perceived location in the middle of a room. The phone displays a visual "chord" or vector from where the wall was touched to your location. This can be done by using the compass sensor of the phone and the steps as measure by other sensors of the phone (such as changes in the accelerometer data of the phone). Repeating this with each wall, and as the user moves, the intersection of these vectors can be determined and seen on a screen. By running spatial algorithms, the central part of the room can be determined. This can then be repeated later using different wall points to locate the center at a later point. By also using the distance from each wall or using corners or a wall at a specific height, accuracy is greatly enhanced. This ability to "drag" a set of vectors makes it easy for a user to move and locate the point they wish to recreate or find by using a display, processor and sensor combination. A central point or center of area can be determined as well as a previous point.

Suitable Components for Use in the Invention

Motion Sensors

Suitable motion sensors include, without limitation, optical sensors, acoustic sensors, thermal sensors, optoacoustic sensors, wave form sensors, pixel differentiators, or any other sensor or combination of sensors that are capable of sensing movement or changes in movement, or mixtures and combinations thereof. Suitable motion sensing apparatus include, without limitation, motion sensors of any form such as digital cameras, optical scanners, optical roller ball devices, touch pads, inductive pads, capacitive pads, holographic devices, laser tracking devices, thermal devices, electromagnetic field (EMF) sensors, wave form sensors, any other device capable of sensing motion, changes in EMF, changes in wave form, or the like or arrays of such devices or mixtures or combinations thereof. The sensors may be digital, analog, or a combination of digital and analog. The motion sensors may be touch pads, touchless pads, touch sensors, touchless sensors, inductive sensors, capacitive sensors, optical sensors, acoustic sensors, thermal sensors, optoacoustic sensors, electromagnetic field (EMF) sensors, strain gauges, accelerometers, pulse or waveform sensor, any other sensor that senses movement or changes in movement, or mixtures and combinations thereof. The sensors may be digital, analog, or a combination of digital and analog or any other type. For camera systems, the systems may sense motion within a zone, area, or volume in front of the lens or a plurality of lens. Optical sensors include any sensor using electromagnetic waves to detect movement or motion within in active zone. The optical sensors may operate in any region of the electromagnetic spectrum including, without limitation, radio frequency (RF), microwave, near infrared (IR), IR, far IR, visible, ultra violet (UV), or mixtures and combinations thereof. Exemplary optical sensors include, without limitation, camera systems, the systems may sense motion within a zone, area or volume in front of the lens. Acoustic sensor may operate over the entire sonic range which includes the human audio range, animal audio ranges, other ranges capable of being sensed by devices, or mixtures and combinations thereof. EMF sensors may be used and operate in any frequency range of the electromagnetic spectrum or any waveform or field sensing device that are capable of discerning motion with a given electromagnetic field (EMF), any other field, or combination thereof. Moreover, LCD screen(s), other screens and/or displays may be incorporated to identify which devices are chosen or the temperature setting, etc. Moreover, the interface may project a virtual control surface and sense motion within the projected image and invoke actions based on the sensed motion. The motion sensor associated with the interfaces of this invention can also be acoustic motion sensor using any acceptable region of the sound spectrum. A volume of a liquid or gas, where a user's body part or object under the control of a user may be immersed, may be used, where sensors associated with the liquid or gas can discern motion. Any sensor being able to discern differences in transverse, longitudinal, pulse, compression or any other waveform could be used to discern motion and any sensor measuring gravitational, magnetic, electro-magnetic, or electrical changes relating to motion or contact while moving (resistive and capacitive screens) could be used. Of course, the interfaces can include mixtures or combinations of any known or yet to be invented motion sensors. The motion sensors may be used in conjunction with displays, keyboards, touch pads, touchless pads, sensors of any type, or other devices associated with a computer, a notebook computer or a drawing tablet or any mobile or stationary device.

Suitable motion sensing apparatus include, without limitation, motion sensors of any form such as digital cameras, optical scanners, optical roller ball devices, touch pads, inductive pads, capacitive pads, holographic devices, laser tracking devices, thermal devices, EMF sensors, wave form sensors, MEMS sensors, any other device capable of sensing motion, changes in EMF, changes in wave form, or the like or arrays of such devices or mixtures or combinations thereof. Other motion sensors that sense changes in pressure, in stress and strain (strain gauges), changes in surface coverage measured by sensors that measure surface area or changes in surface are coverage, change in acceleration measured by accelerometers, or any other sensor that measures changes in force, pressure, velocity, volume, gravity, acceleration, any other force sensor or mixtures and combinations thereof.

Controllable Objects

Suitable physical mechanical, electro-mechanical, magnetic, electro-magnetic, electrical, or electronic devices, hardware devices, appliances, biometric devices, automotive devices, VR objects, AR objects, MR objects, and/or any other real world device that can be controlled by a processing unit include, without limitation, any electrical and/or hardware device or appliance having attributes which can be controlled by a switch, a joy stick, a stick controller, or similar type controller, or software program or object. Exemplary examples of such attributes include, without limitation, ON, OFF, intensity and/or amplitude, impedance, capacitance, inductance, software attributes, lists or sub-menus of software programs or objects, haptics, or any other controllable electrical and/or electro-mechanical function and/or attribute of the device. Exemplary examples of devices include, without limitation, environmental controls, building systems and controls, lighting devices such as indoor and/or outdoor lights or light fixtures, cameras, ovens (conventional, convection, microwave, and/or etc.), dishwashers, stoves, sound systems, mobile devices, display systems (TVs, VCRs, DVDs, cable boxes, satellite boxes, and/or etc.), alarm systems, control systems, air conditioning systems (air conditions and heaters), energy management systems, medical devices, vehicles, robots, robotic control systems, UAV, equipment and machinery control systems, hot and cold water supply devices, air conditioning system, heating systems, fuel delivery systems, energy management systems, product delivery systems, ventilation systems, air handling systems, computers and computer systems, chemical plant control systems, manufacturing plant control systems, computer operating systems and other software systems, programs, routines, objects, and/or elements, remote control systems, or the like virtual and augmented reality systems, holograms, or mixtures or combinations thereof.

Software Systems

Suitable software systems, software products, and/or software objects that are amenable to control by the interface of this invention include, without limitation, any analog or digital processing unit or units having single or a plurality of software products installed thereon and where each software product has one or more adjustable attributes associated therewith, or singular software programs or systems with one or more adjustable attributes, menus, lists or other functions or display outputs. Exemplary examples of such software products include, without limitation, operating systems, graphics systems, business software systems, word processor systems, business systems, online merchandising, online merchandising systems, purchasing and business transaction systems, databases, software programs and applications, internet browsers, accounting systems, military systems, control systems, or the like, or mixtures or combinations thereof. Software objects generally refer to all components within a software system or product that are controllable by at least one processing unit.

Processing Units

Suitable processing units for use in the present invention include, without limitation, digital processing units (DPUs), analog processing units (APUs), any other technology that can receive motion sensor output and generate command and/or control functions for objects under the control of the processing unit, or mixtures and combinations thereof.

Suitable digital processing units (DPUs) include, without limitation, any digital processing unit capable of accepting input from a plurality of devices and converting at least some of the input into output designed to select and/or control attributes of one or more of the devices. Exemplary examples of such DPUs include, without limitation, microprocessor, microcontrollers, or the like manufactured by Intel, Motorola, Ericsson, HP, Samsung, Hitachi, NRC, Applied Materials, AMD, Cyrix, Sun Microsystem, Philips, National Semiconductor, Qualcomm, or any other manufacture of microprocessors or microcontrollers.

Suitable analog processing units (APUs) include, without limitation, any analog processing unit capable of accepting input from a plurality of devices and converting at least some of the input into output designed to control attributes of one or more of the devices. Such analog devices are available from manufacturers such as Analog Devices Inc.

User Feedback Units

Suitable user feedback units include, without limitation, cathode ray tubes, liquid crystal displays, light emitting diode displays, organic light emitting diode displays, plasma displays, touch screens, touch sensitive input/output devices, audio input/output devices, audio-visual input/output devices, keyboard input devices, mouse input devices, any other input and/or output device that permits a user to receive computer generated output signals and create computer input signals.

DETAILED DESCRIPTION OF THE DRAWINGS

First Method and System Embodiments

Referring now to FIG. 1A, a display, generally 100, is shown to include a display area 102. The display area 102 is in a dormant state or a sleep state or an inactivate state. This state is changed only by movement of any body part within an active zone of a motion sensor or sensors. For motion sensors that are not touch activated such as camera, IR sensors, ultra sonic sensors, or any other type of motion sensor that is capable of detecting motion with in an active zone, motion may be any movement within the active zone of a user, a given user body part or a combination of user body parts or an object acting on behalf of or under the user's control. In the case of a touch screen, motion will be contact with and motion on the touch screen, i.e, touching, sliding, etc. or other active area of a device or object.

Figure 1B:
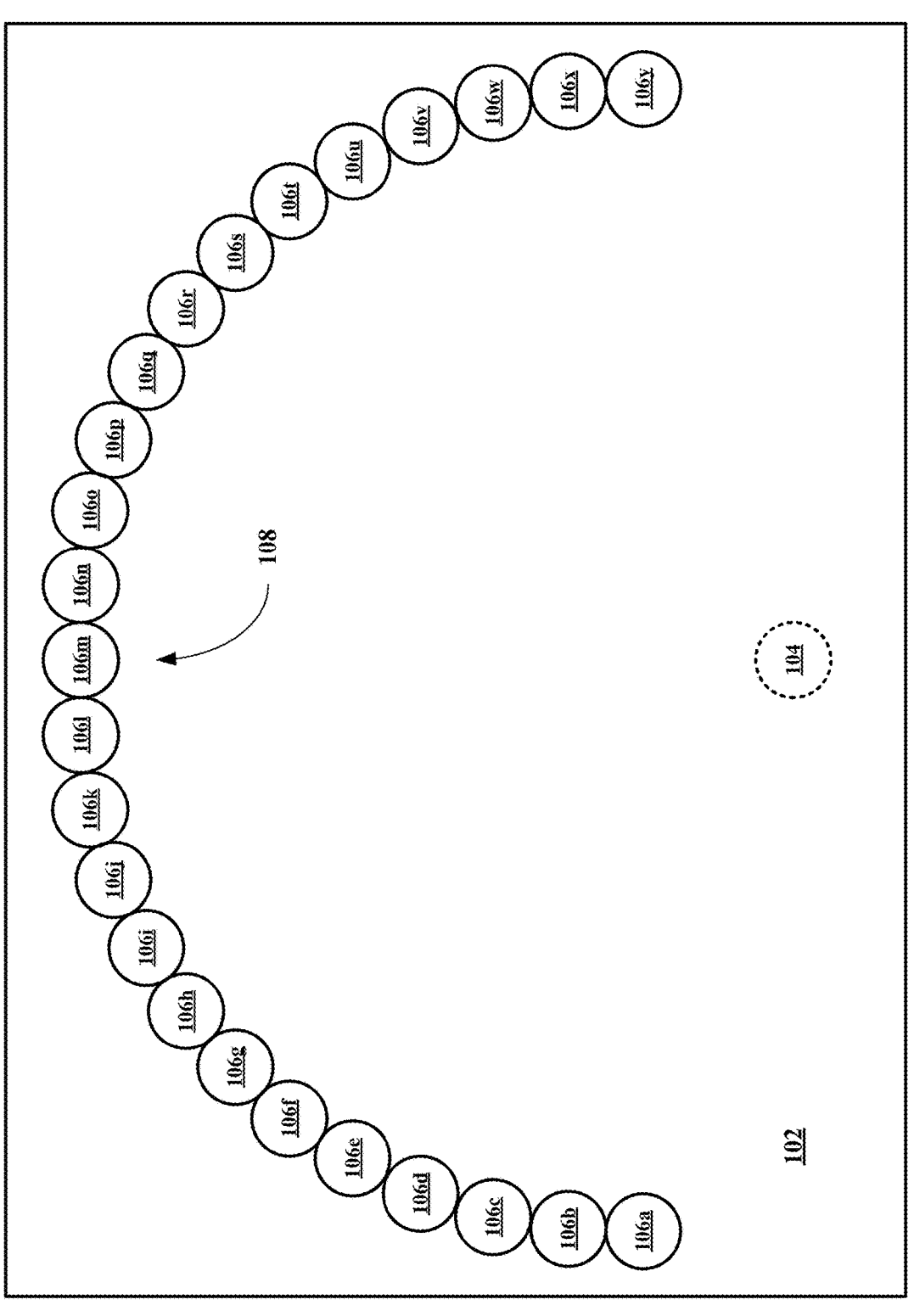
Figure 1C:
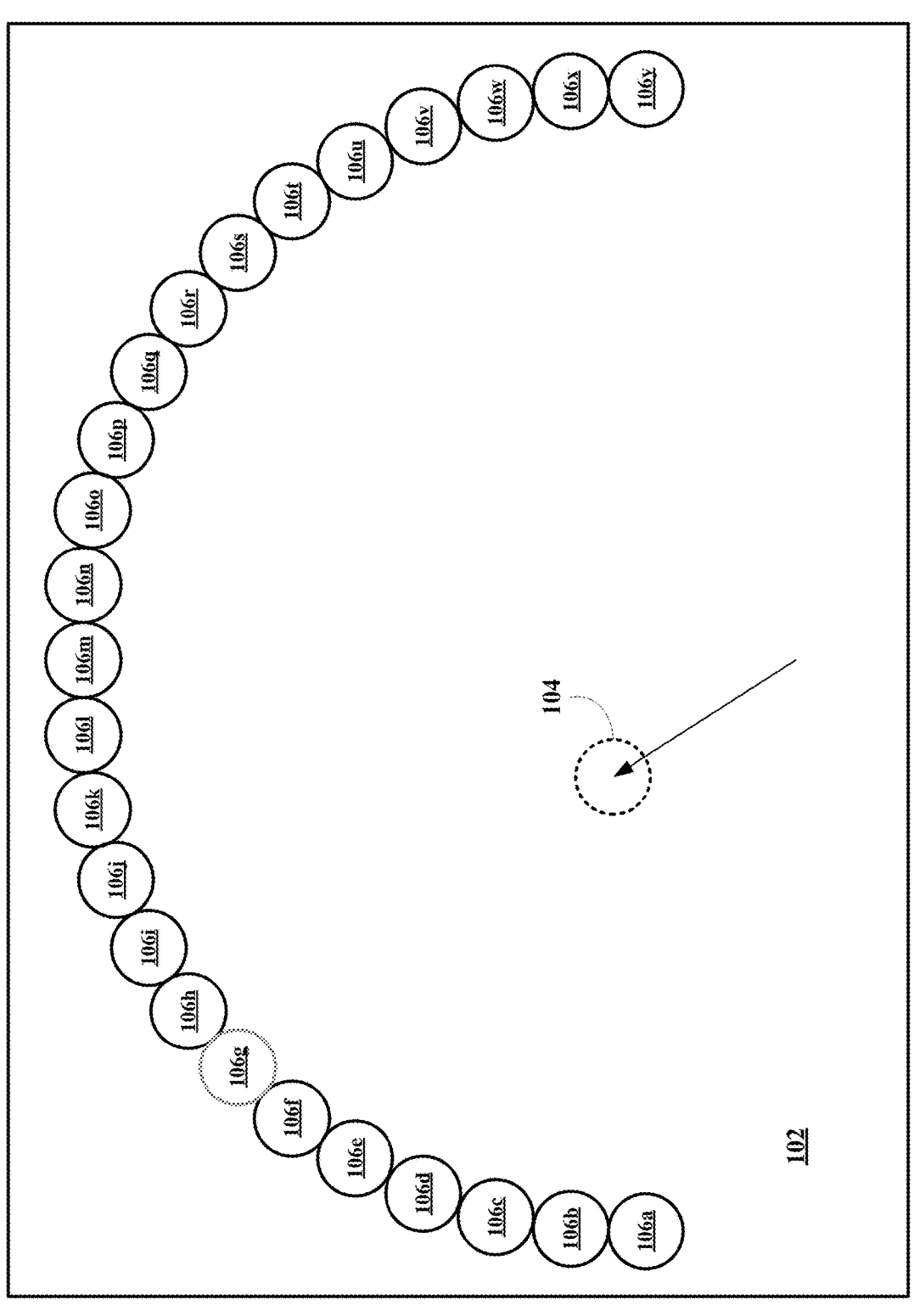
Figure 1D:
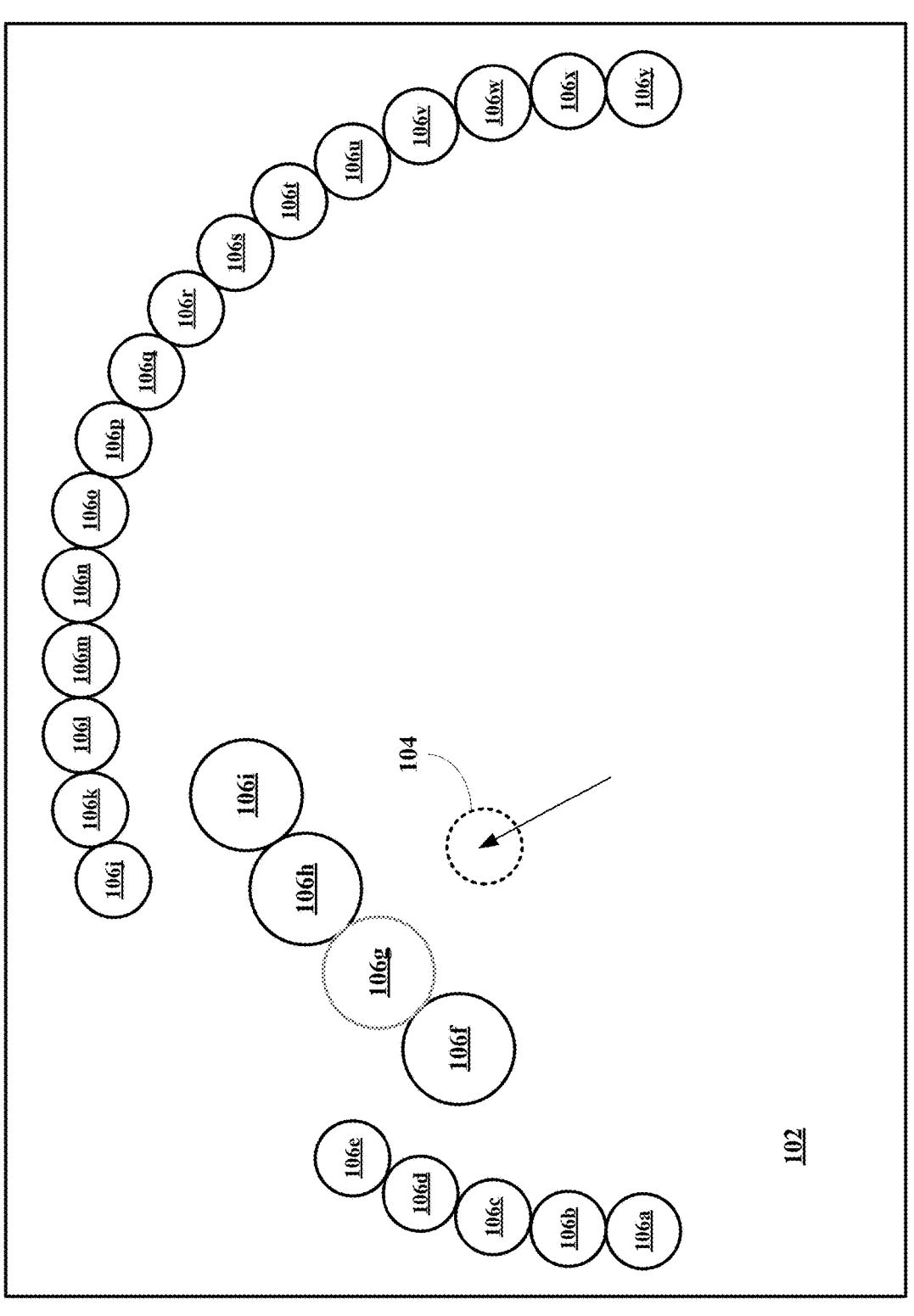
Figure 1E:
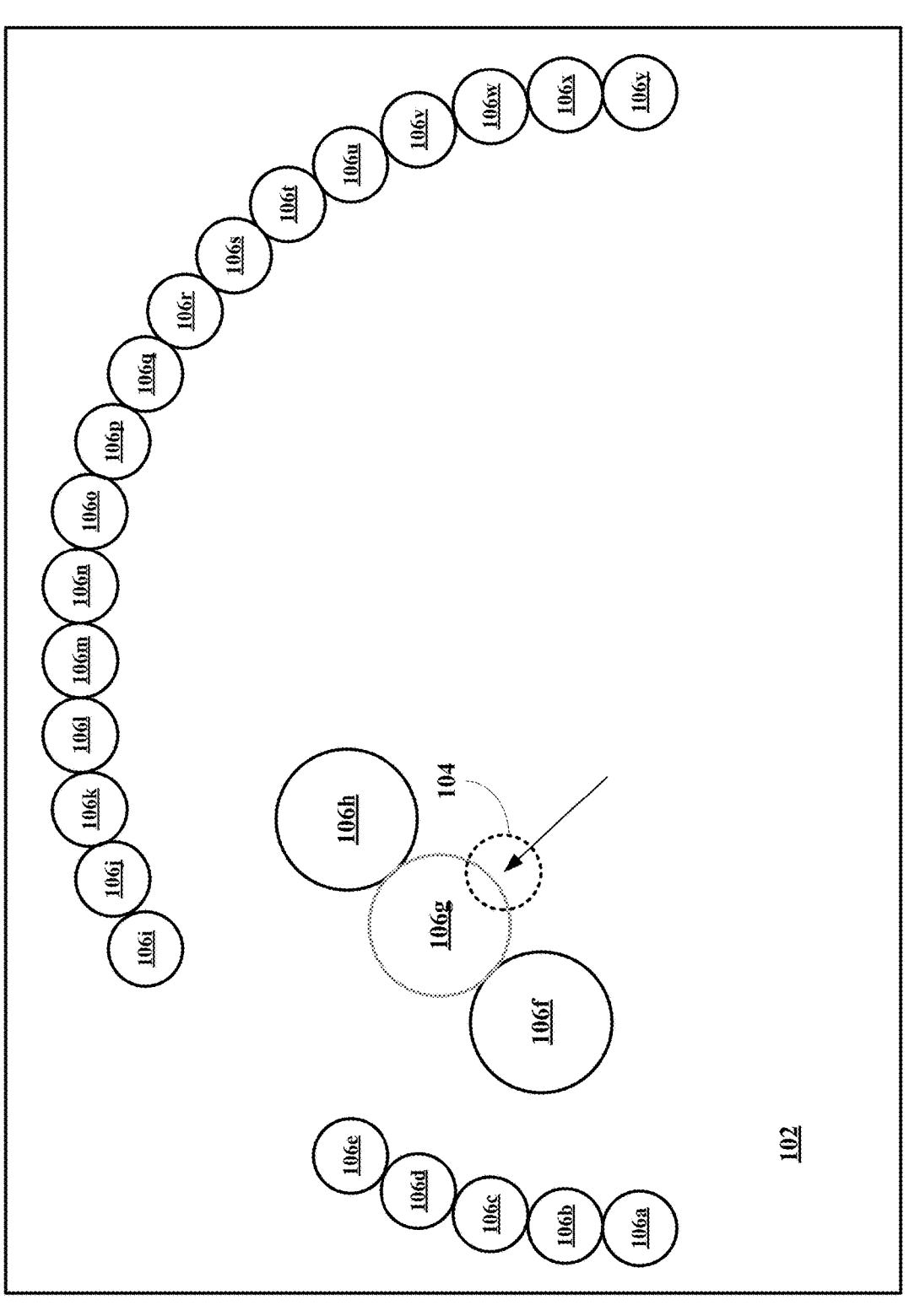
Figure 1F:
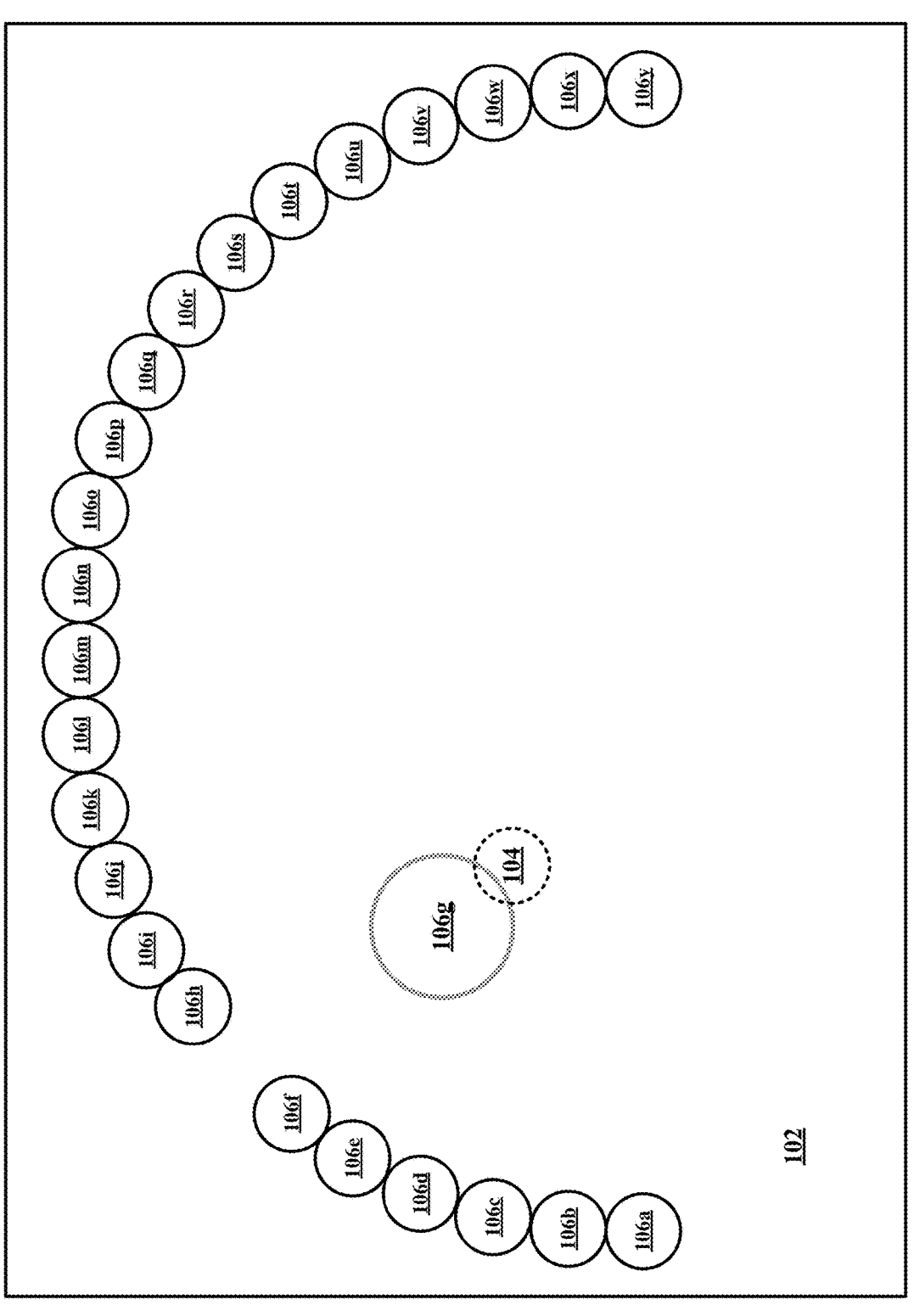
Figure 1G:
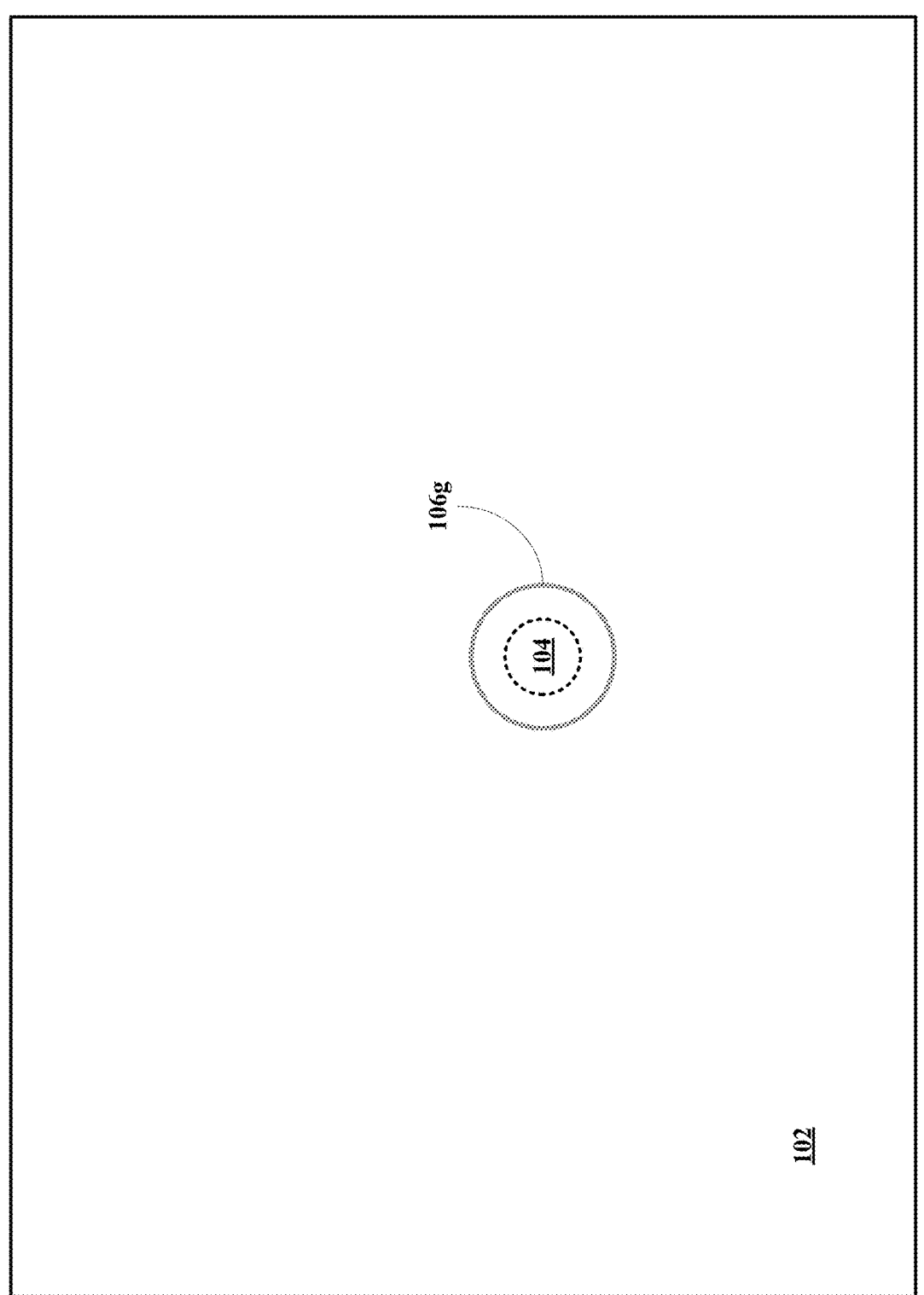
Figure 1H:
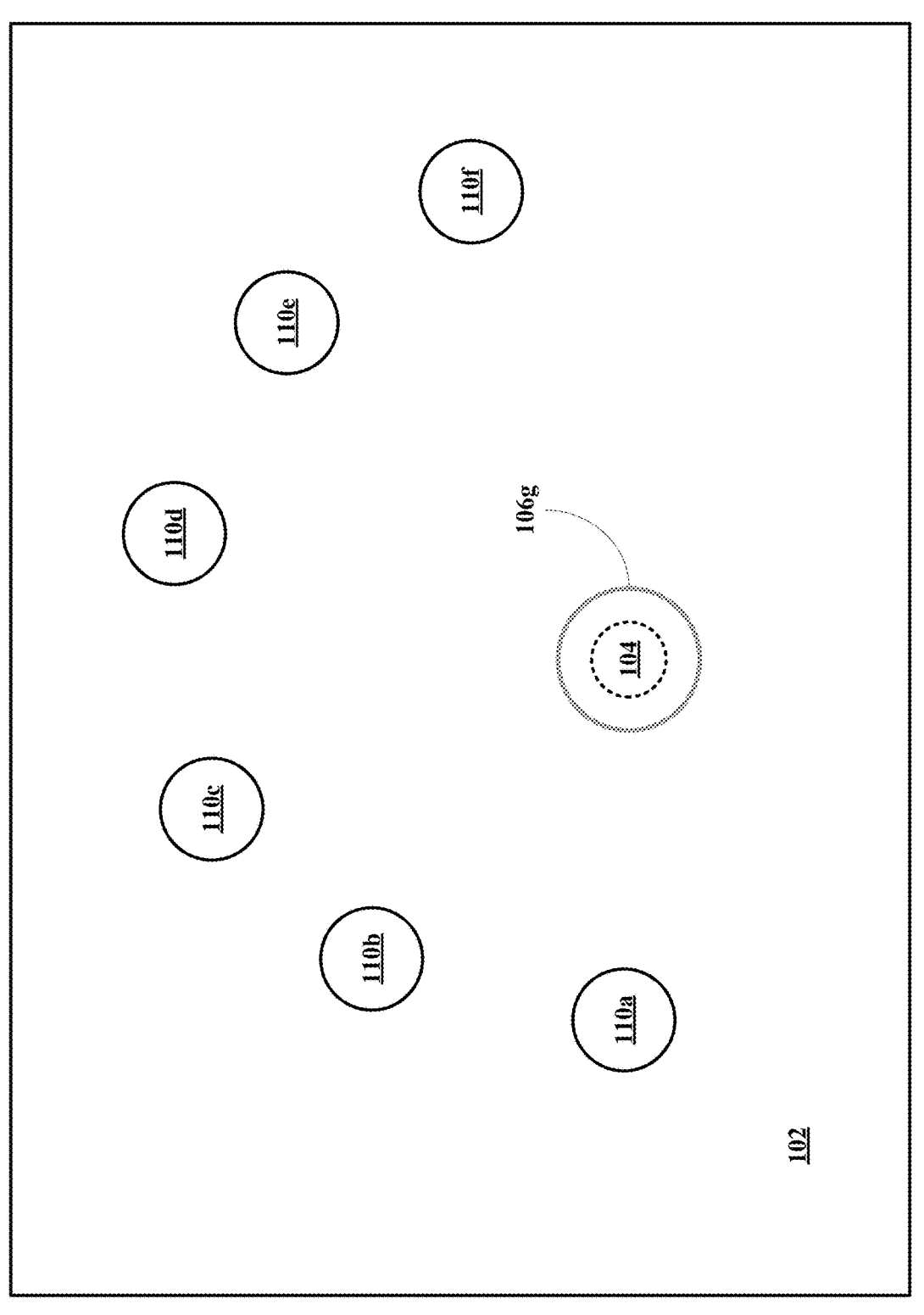

Referring now to FIG. 1B, once activated, the display area 102 displays a selection object 104 and a plurality of selectable objects 106a-y distributed about the selection object in an arc 108. Looking at FIG. 1C, the selection object 104 is moved upward and to the left. This motion will cause selectable objects 106 most aligned with the direction of motion to be drawn towards the selection object. Looking at FIG. 1D, four potential selection objects 106f-i move toward the selection object and increase in size. The faster the motion toward the potential selection object, the faster they may move toward the selection object and the faster they may increase in size. The motion presently is directed in a direction that is not conducive to determining the exact object to be selected. Looking at FIG. 1E, as motion continues, the possible selectable objects are resolved and objects such as object 106i is returned to its previous position. By moving the selection object 104 toward the selectable object 106g and bringing the selection object 104 into contact or into a threshold event with the selectable object 106g, the other objects 106f and 106h return to their original positions and 106g is highlighted in some way here shown in thicker lines as shown in FIG. 1F. Once the selection object 104 comes in contact or into a threshold event with the selectable object 106g, the selection object 104 merges into the selectable object 106g, all other selectable objects 106 are removed from the display area 102 and the merged selection object 104 and selected object 106g may be centered in the display area 102 as shown in FIG. 1G. If the selected object 106g includes subobjects, then the display area 102 will simultaneously center the selected object 106g and display the subobjects 110a-f distributed about the merged selection object 104 and selected object 106g as shown in FIG. 1H.

Figure 1I:
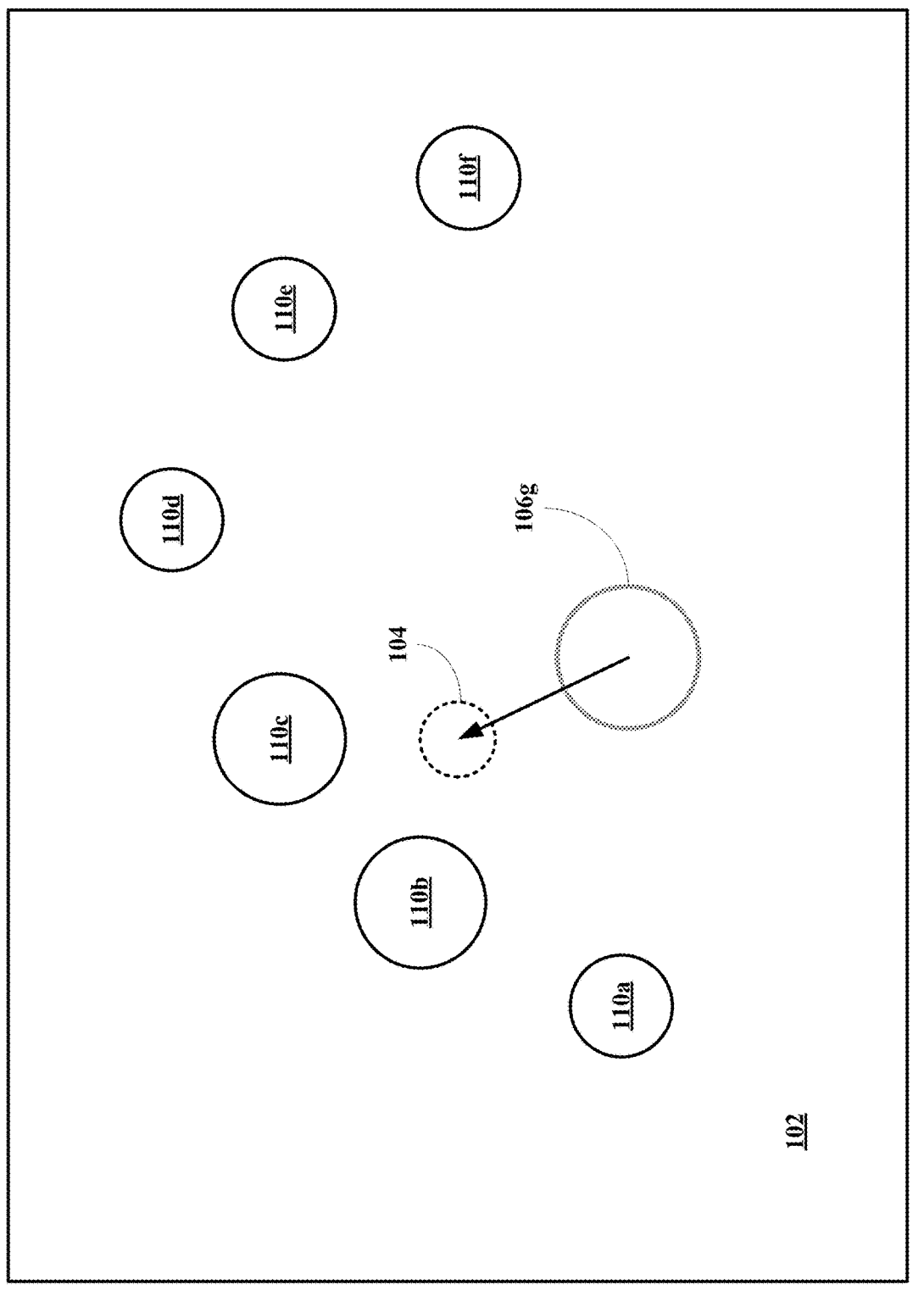
Figure 1J:
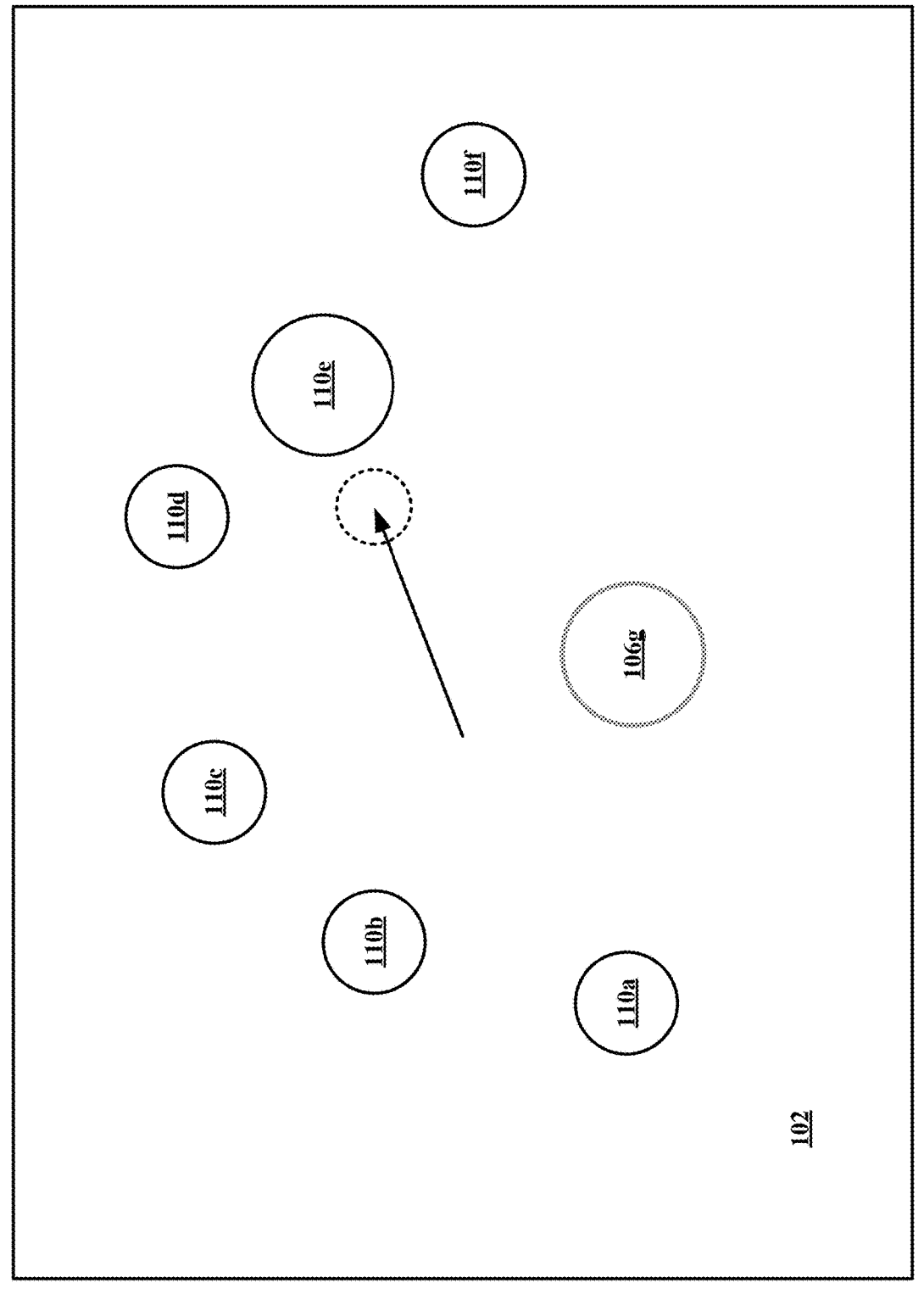
Figure 1K:
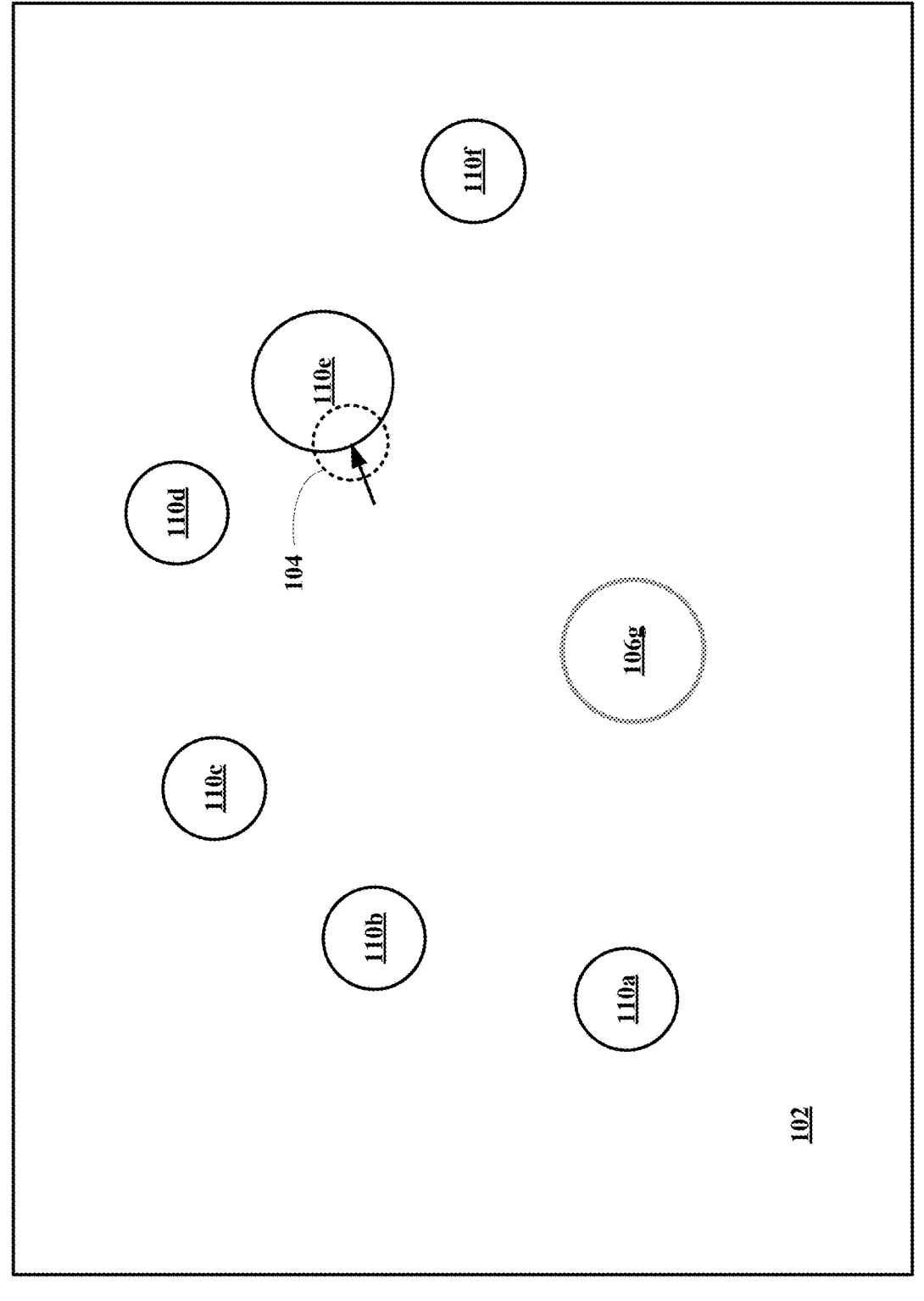
Figure 1L:
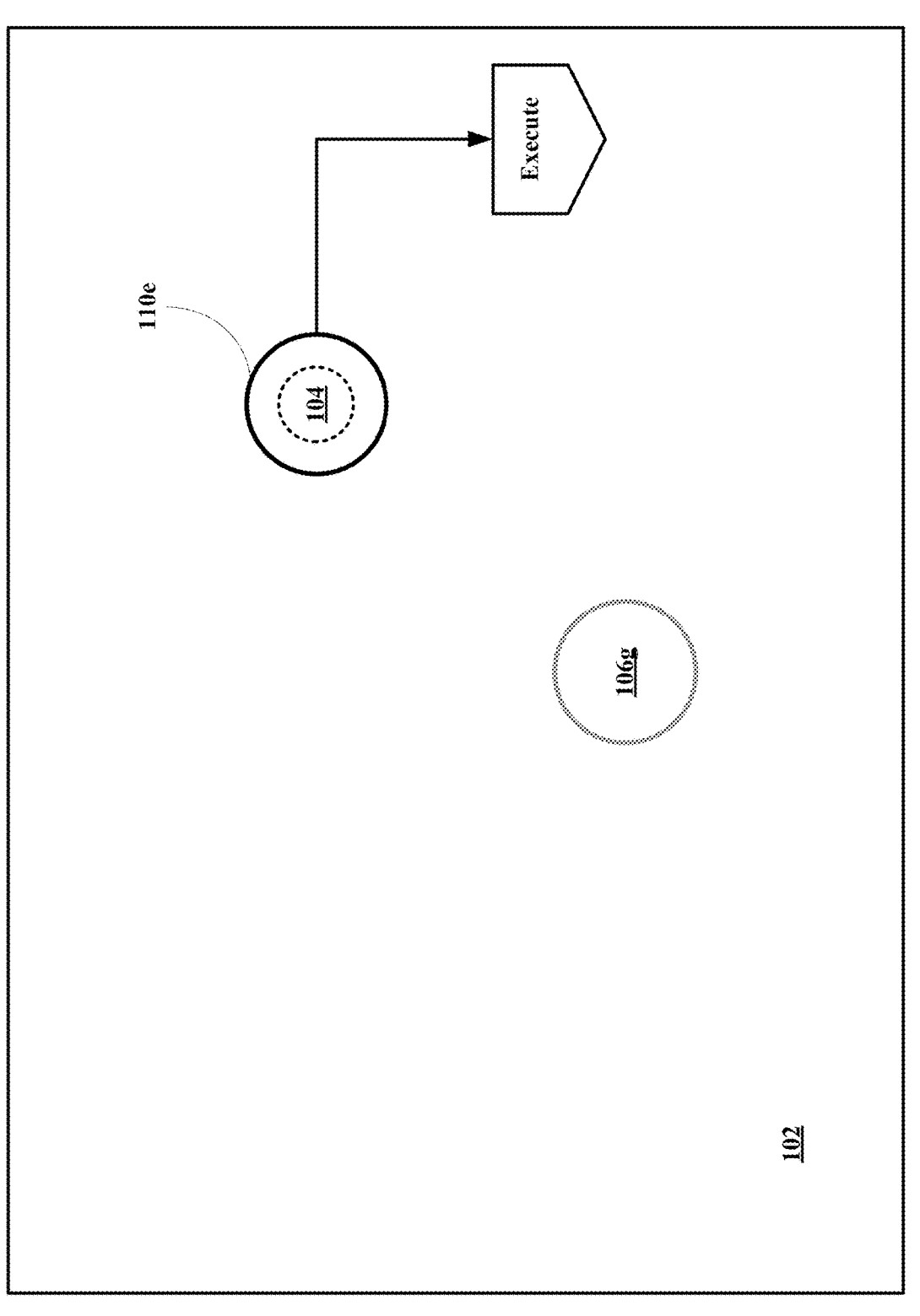

Referring now to FIG. 1I, the selection object 104 is moved out from the selected object 106g in a direction towards two possible subobjects 110b-c, which move toward the selection object 104 and may increase in size. Looking at FIG. 1J, the selection object 104 is moved away from the subobjects 110b-c toward the object 110e. Looking at FIG. 1K, the selection object 104 is moved into contact with the subobject 110e, which selects by merging the object 104 into the selected subobject 110e and activates the subobject 110e as shown in FIG. 1L. The subobject may also move into the position of the object if 104 moves and stops, allowing the subobject to do the rest of the motion.

Figure 1M:
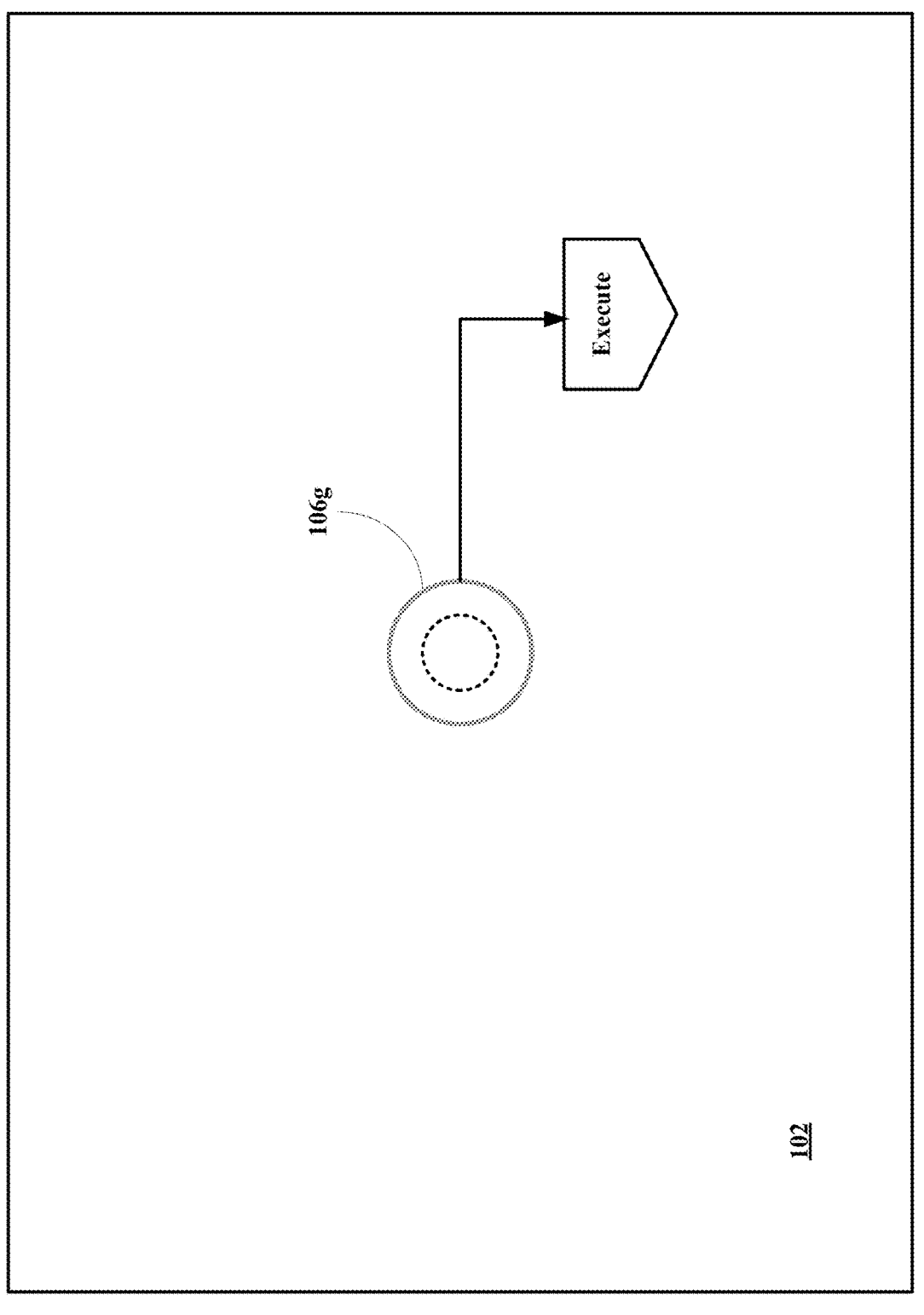

Referring now to FIG. 1M, if the selected object 106g is directly activatable, then selection of the selectable object 106g simultaneously activates the object 106g.

Second Method and System Embodiments

Figure 2A:
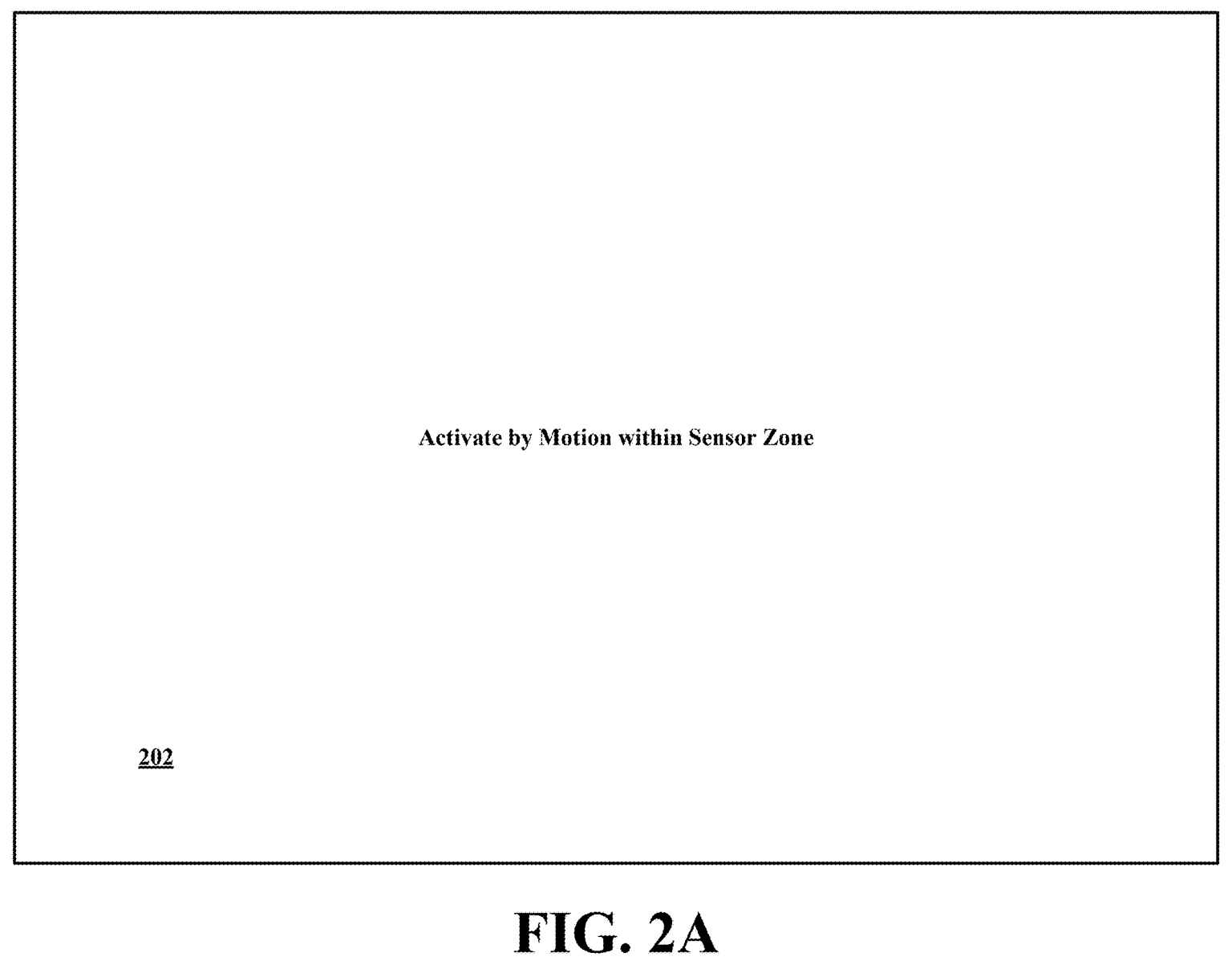
Figure 2B:
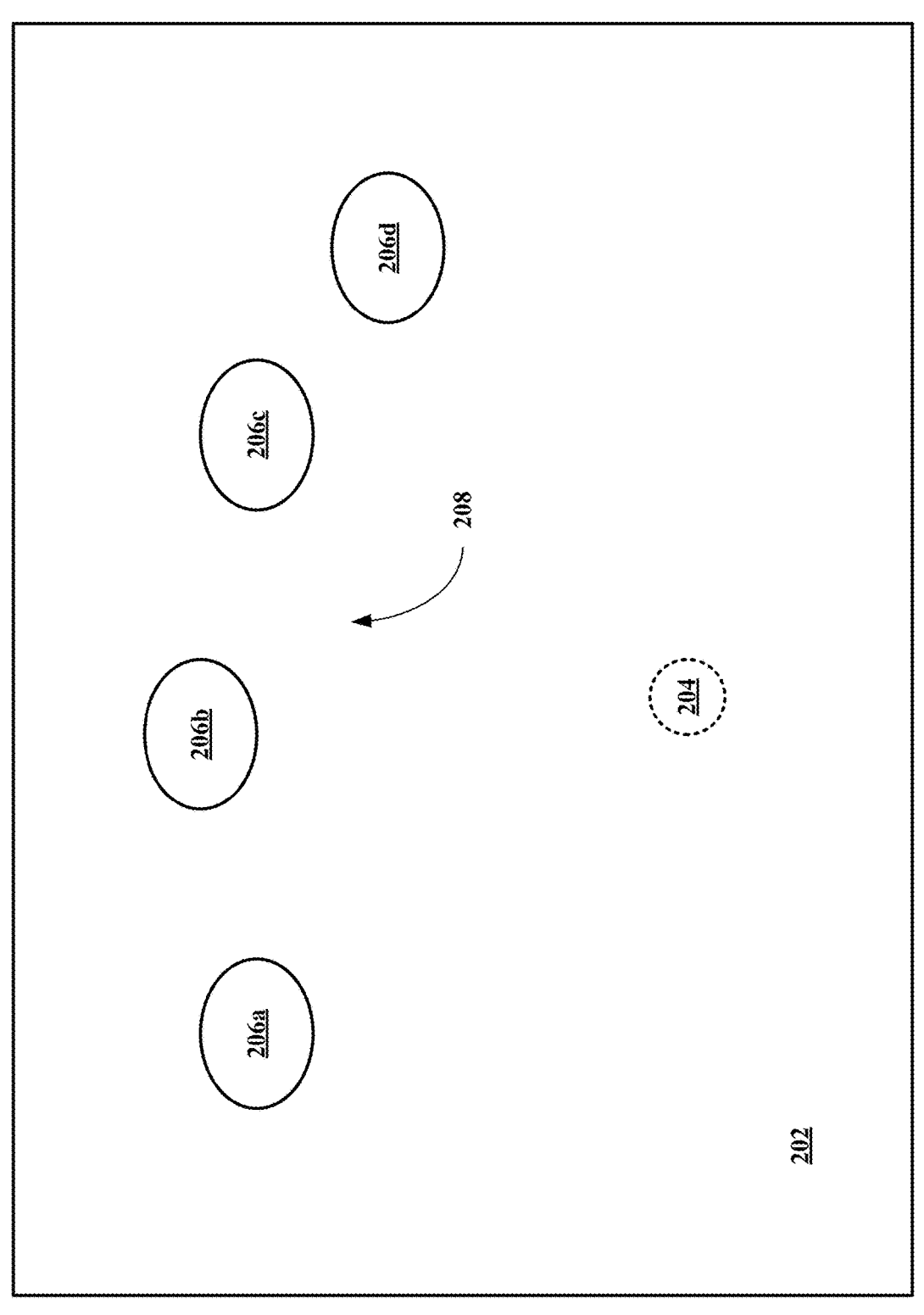
FIG. 2A-W depict another motion-based selection sequence using an attractive interface of this invention: (A) depicts a display prior to activation by motion of a motion sensor in communication with the display; (B) depicts the display after activation to display a selection object and a plurality of selectable objects; (C) depicts the display after the selection object is moved toward a selectable object causing it to move toward the selection objects and causing subobjects associated with the attracted object; (D) depicts the display showing further movement of the selection object toward the attracted object; (E) depicts the display showing the selection object touched or reaching a threshold value or probability acting as a selection by the selection object; (F) depicts the display showing the selection object merged with the selected object and recentered in the display; (G) depicts the display after the selection object is moved toward a first selectable subobject; (H) depicts the display merged with a selected subobject and simultaneous activation of the subobject; (I) depicts the display after the selection object is moved toward the other selectable sub-object; (J) depicts the display merged with a selected sub-object and simultaneous activation of the other subobject; (K) depicts the display with motion of the selection object away from the selected object and away from any subob-jects; (L) depicts the display after moving away causing the original selection display to reappear; (M) depicts the dis-play after the selection object is moved toward a second selectable subobject causing the second object to move toward and increase in size and simultaneously display associated subobjects; (N) depicts the display after move-ment of the selection object into contact with the second selectable object; (O) depicts the display after selection of the second selectable object now merged and centered with the subobjects distributed about the selected second object; (P) depicts the display after the selection object is moved toward a desired subobject; (Q) depicts the display after merger with the subobject simultaneously activating the subobject; (R) depicts the display after the selection object is moved toward a second selectable subobject causing the third object to move toward and increase in size and simul-taneously display associated subobjects; (S) depicts the display after movement of the selection object into contact with the third selectable object; (T) depicts the display after selection of the third selectable object now merged and centered with the subobjects distributed about the selected third selectable object; (U) depicts the display after the selection object is moved toward a fourth selectable subob-ject causing the fourth object to move toward the selection object and increase in size; (V) depicts the display after movement of the selection object into contact with the fourth selectable object; and (W) depicts the display after selection of the fourth selectable object now merged and centered and the object activated.

Referring now to FIG. 2A, a display, generally 200, is shown to include a display area 202. The display area 202 is in a dormant state or a sleep state or an unactivated state. This state is changed only by motion within an active zone of a motion sensor. Motion may be any movement within the active zone. In the case of a touch screen, motion may be contact such as touching, sliding, etc. Looking at FIG. 2B, once activated, the display area 202 displays a selection object 204 and a plurality of selectable objects 206a-d distributed about the selection object in an arc 208.

Figure 2C:
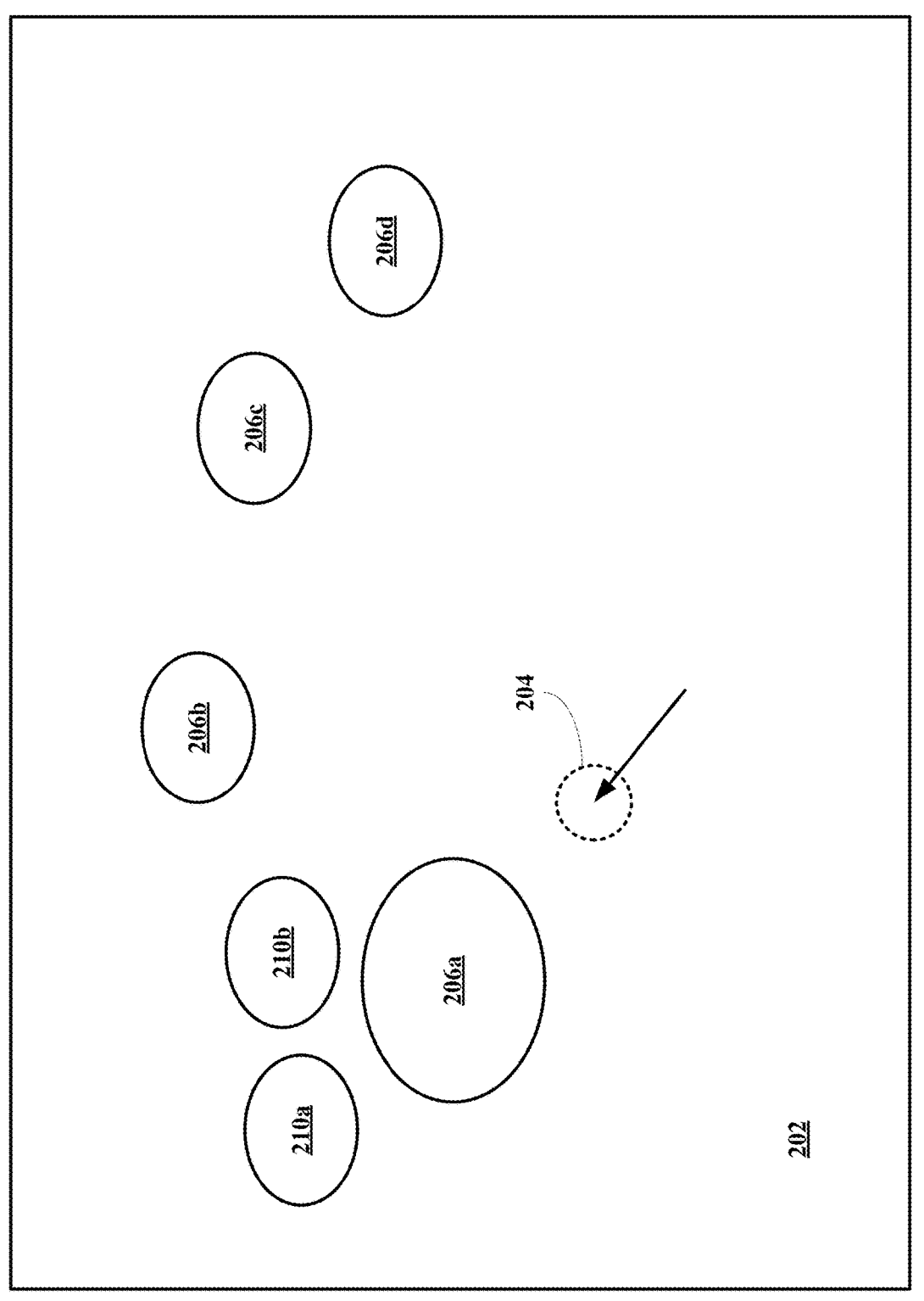
Figure 2D:
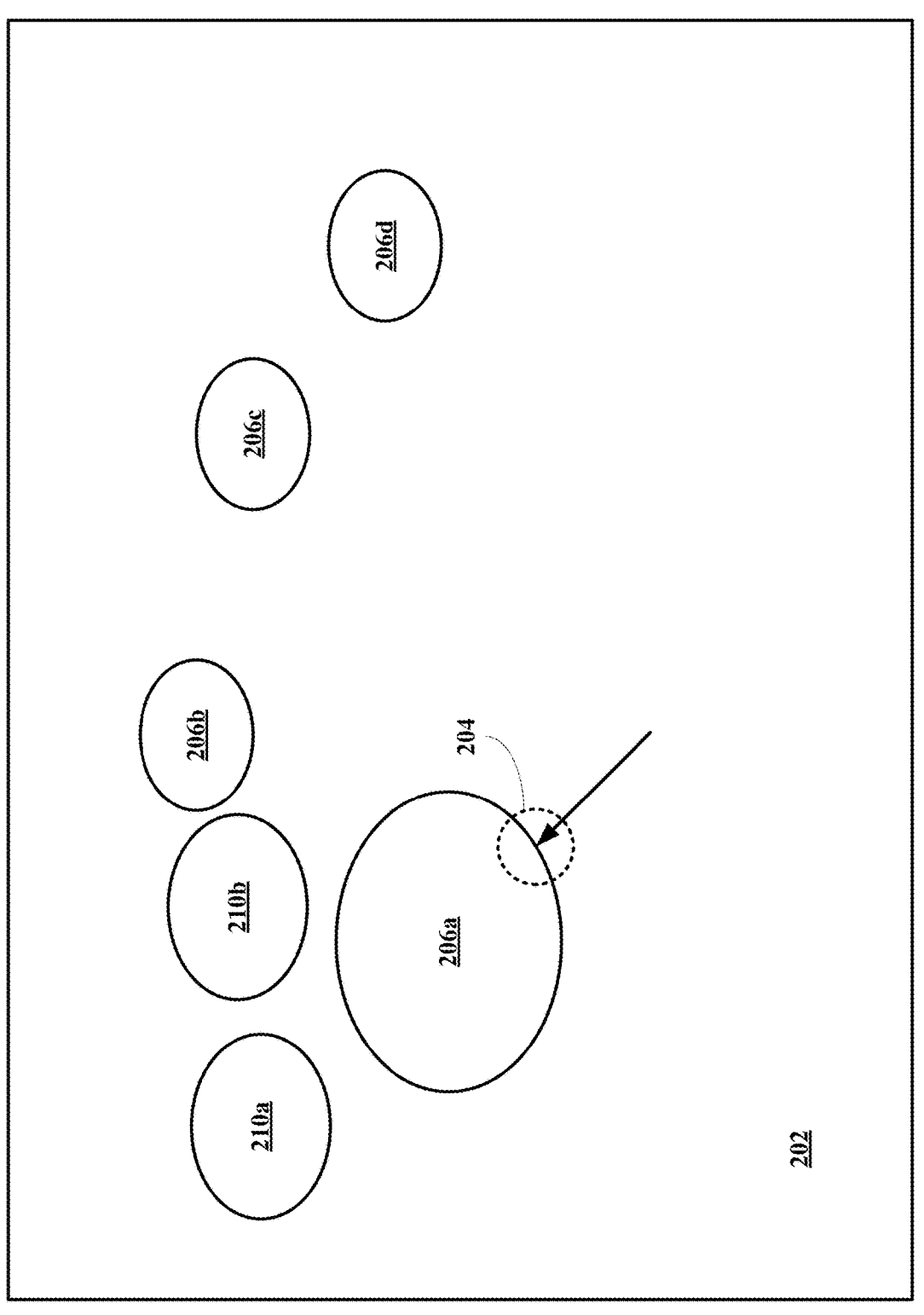
Figure 2E:
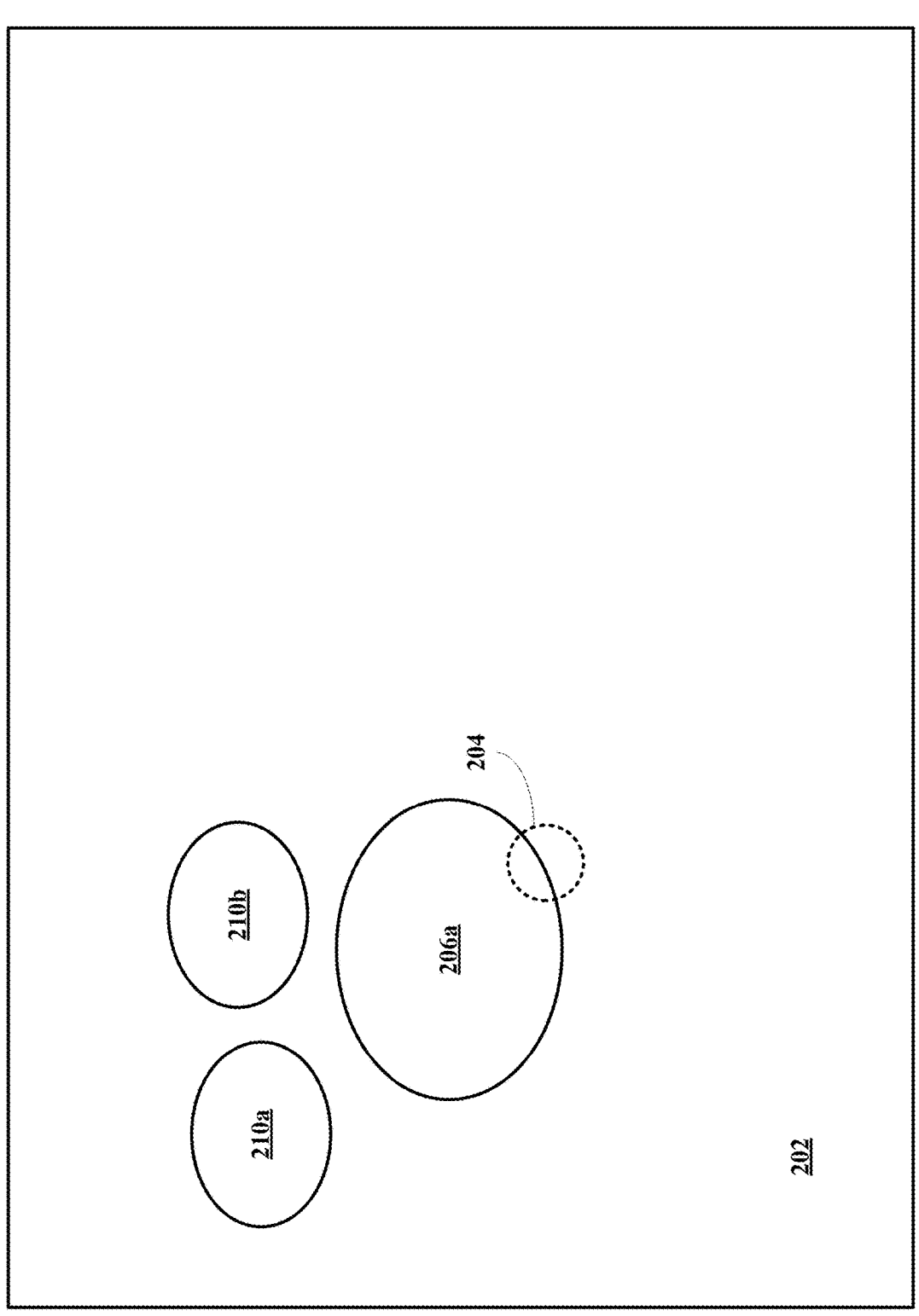
Figure 2F:
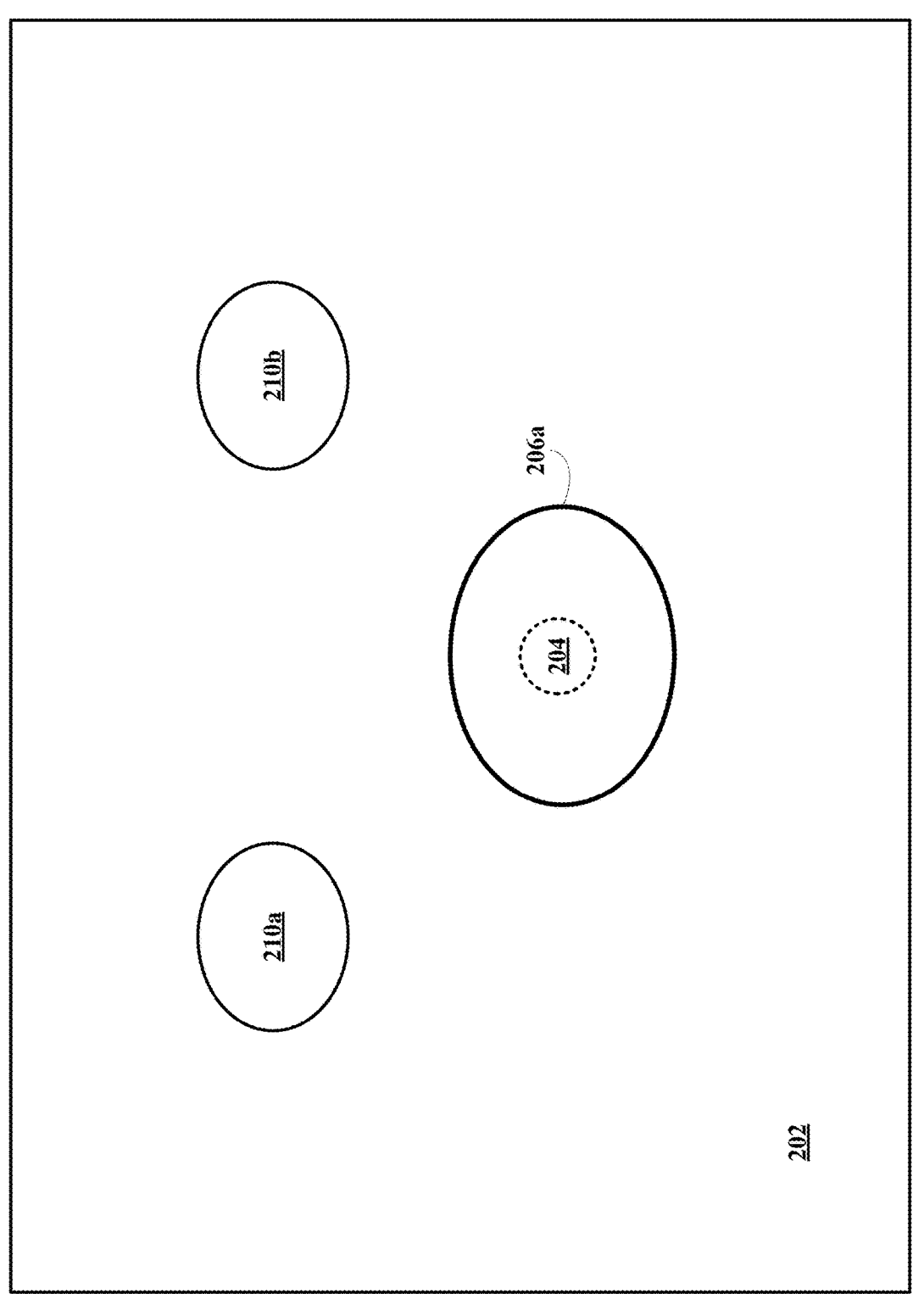

Looking at FIG. 2C, the section object 204 is moved toward the selectable object 206a, which may move toward the selection object 204 increasing its size and simultaneously displaying associated subobjects 210a&b. For example, if the object 206a is a camera and the subobjects 210a&b are commands to take a photograph and record a video sequence. As the selection object 202 is moved further toward and contacts or enters into a threshold event with the selectable object 206a, the selectable object 206a may move closer and get larger along with its subobjects 210a&b as shown in FIG. 2D. Looking at FIG. 2E, the selection object 204 is in contact with the selectable object 206a and the other objects 206b-d are removed or fade away and the selected object 206a and its associated subobjects 210a&b center and the subobjects distribute away so that the subobjects may be more easily selected as shown in FIG. 2F. This may or may not be centered in the display area.

Figure 2G:
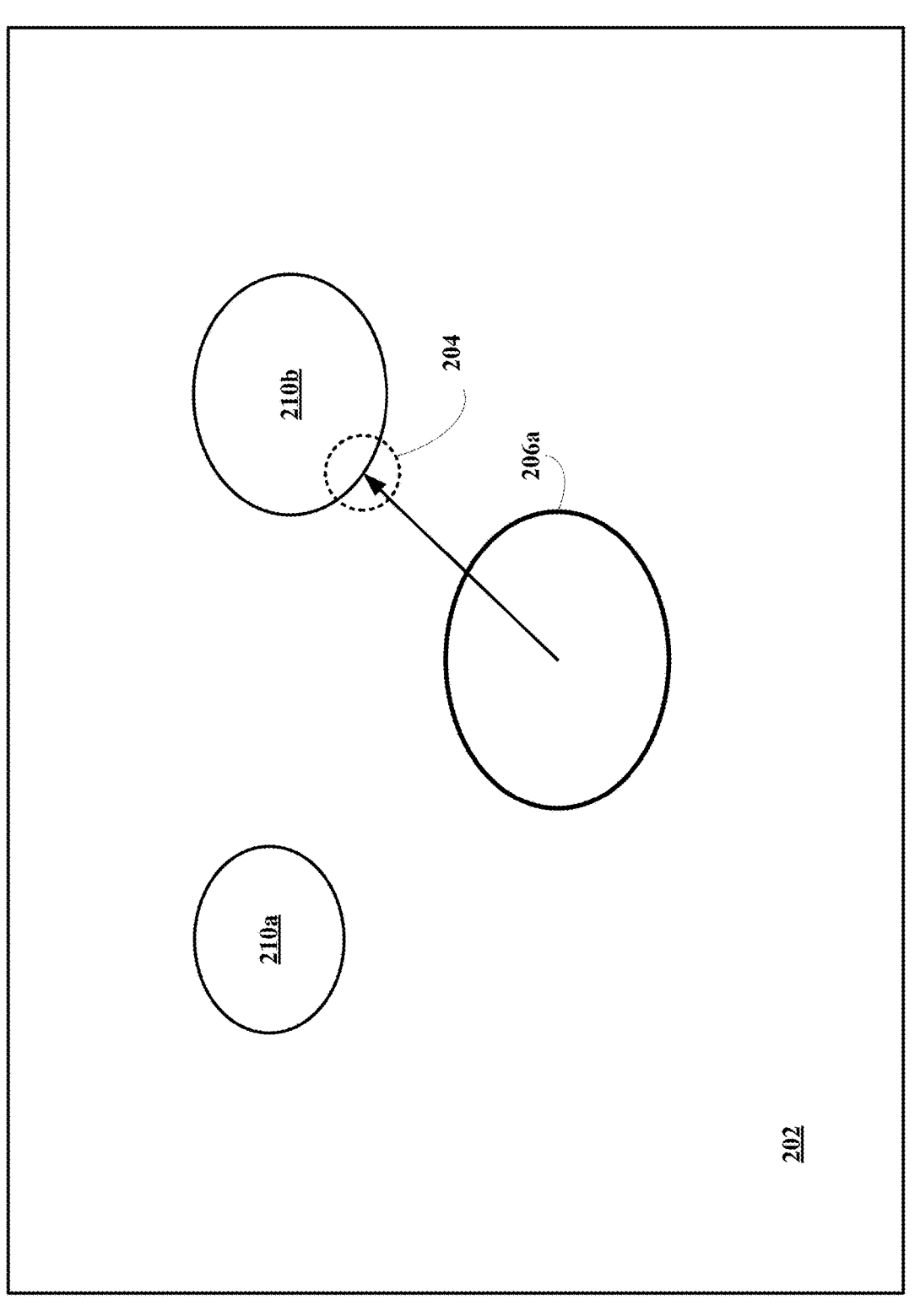
Figure 2H:
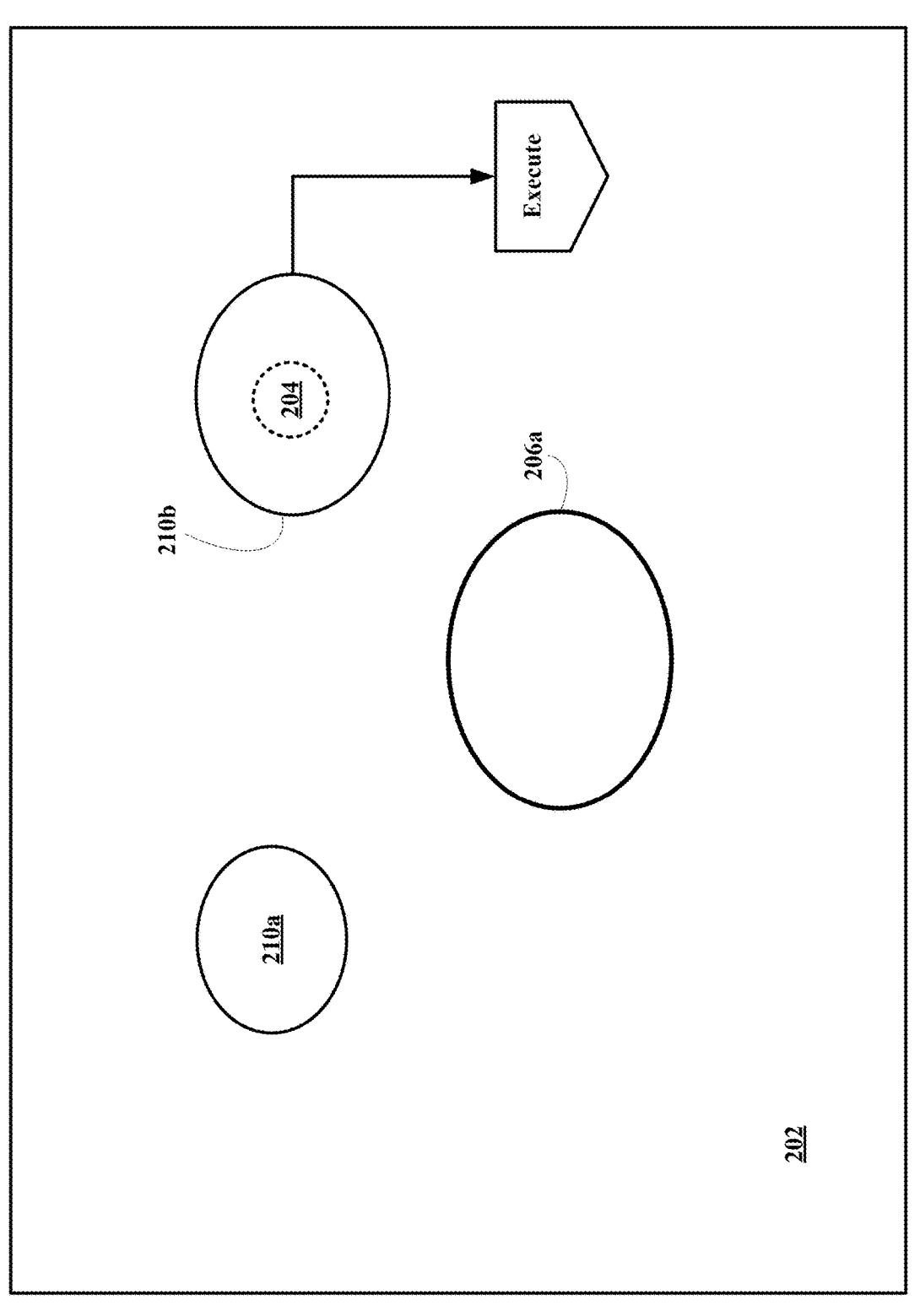

Referring now to FIG. 2G, the selection object 204 is moved from its merged state toward the subobject 210b coming in contact or entering into a threshold event with the subobject 210b, which is attracted to the selection object 204 and increase in size. Looking at FIG. 2H, the subobject 210b is selected as evidenced by the merging of the selection object 204 with the subobject 210b and simultaneously activates the subobject 210b.

Figure 2I:
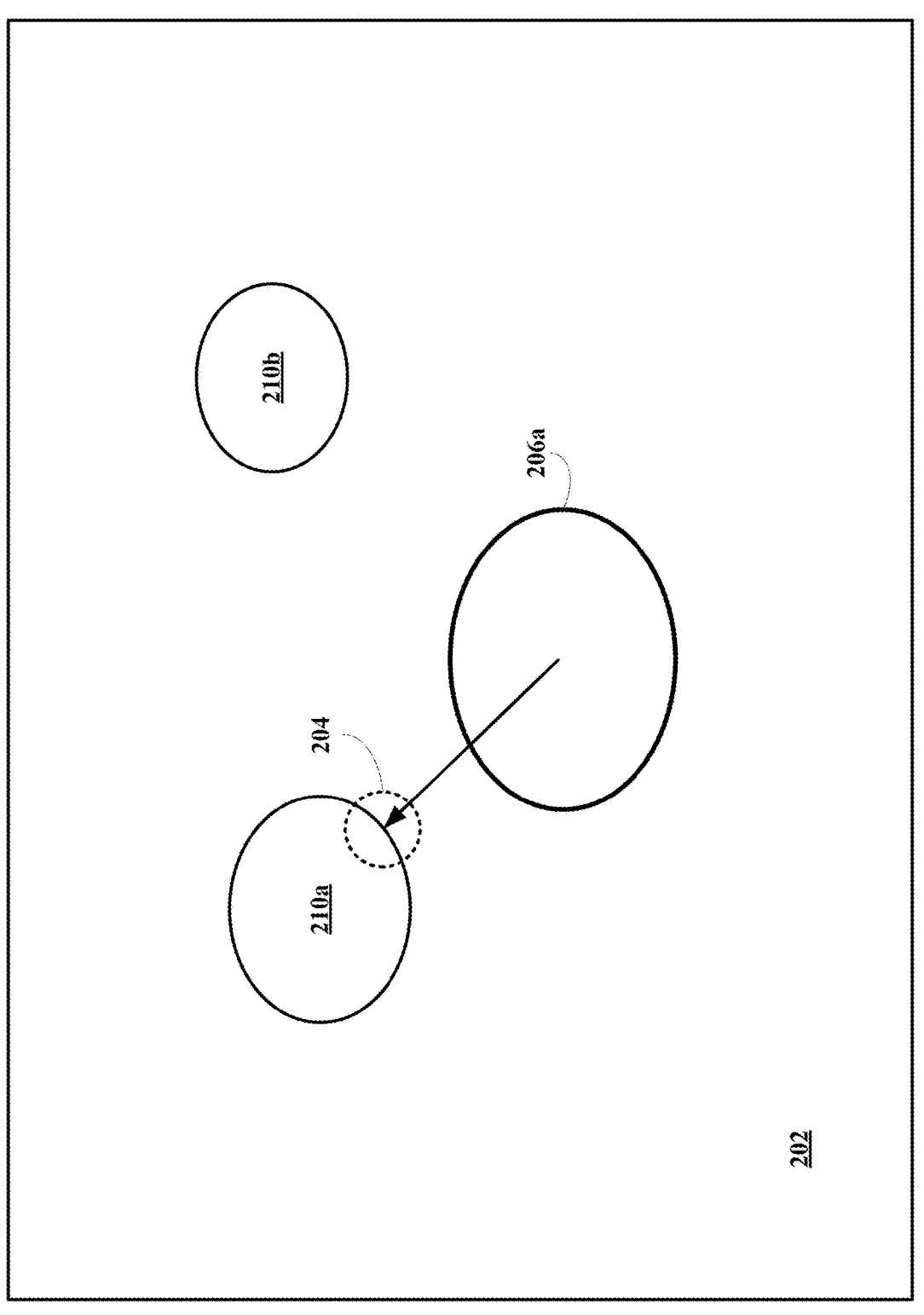
Figure 2J:
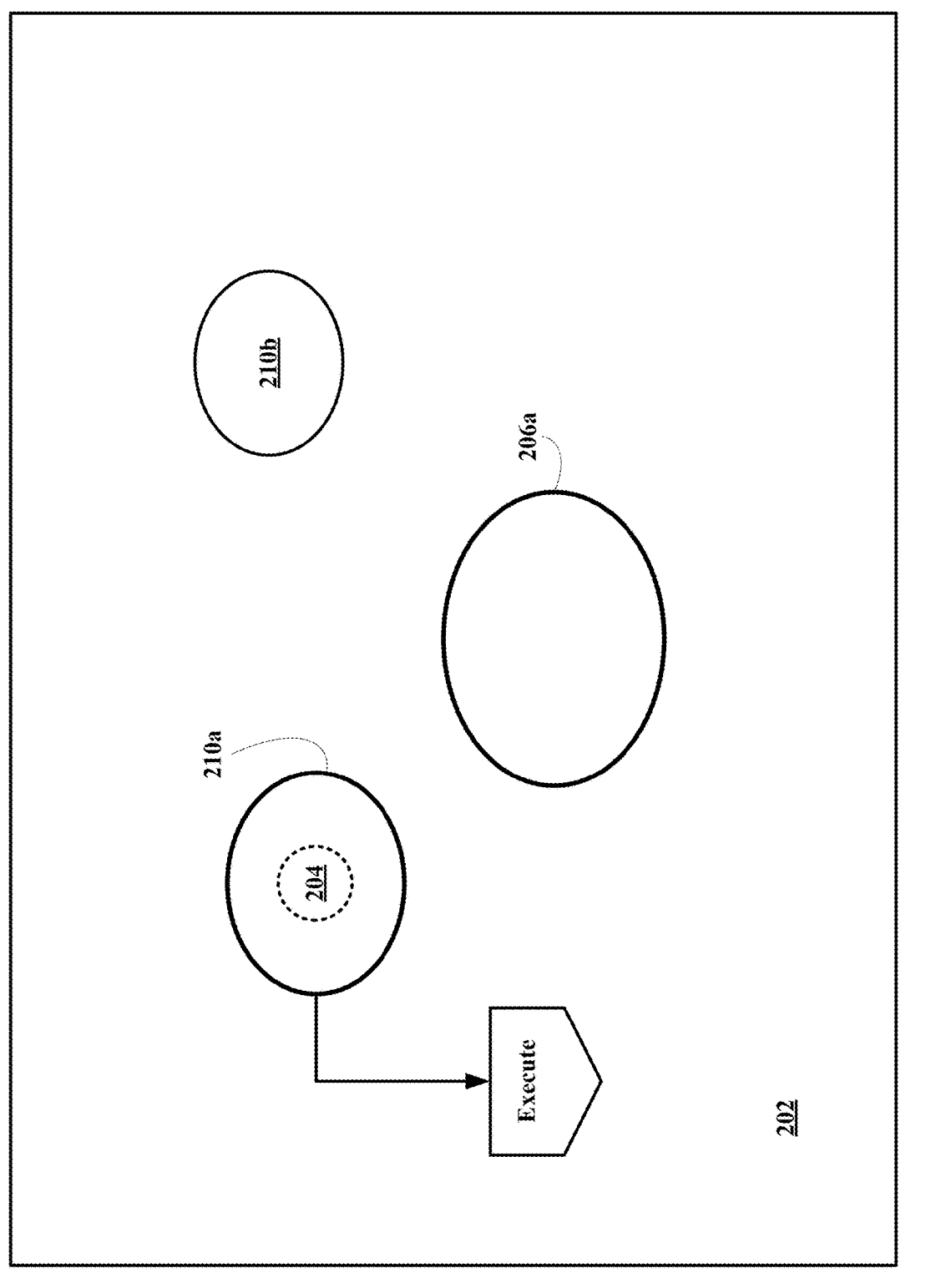

Referring now to FIG. 2I, the selection object 204 is moved from its merged state toward the subobject 210a coming in contact or entering into a threshold event with the subobject 210a, which is attracted to the selection object 204 and increase in size. Looking at FIG. 2J, the subobject 210a is selected as evidenced by the merging of the selection object 204 with the subobject 210a and simultaneously activates the subobject 210a.

Figure 2K:
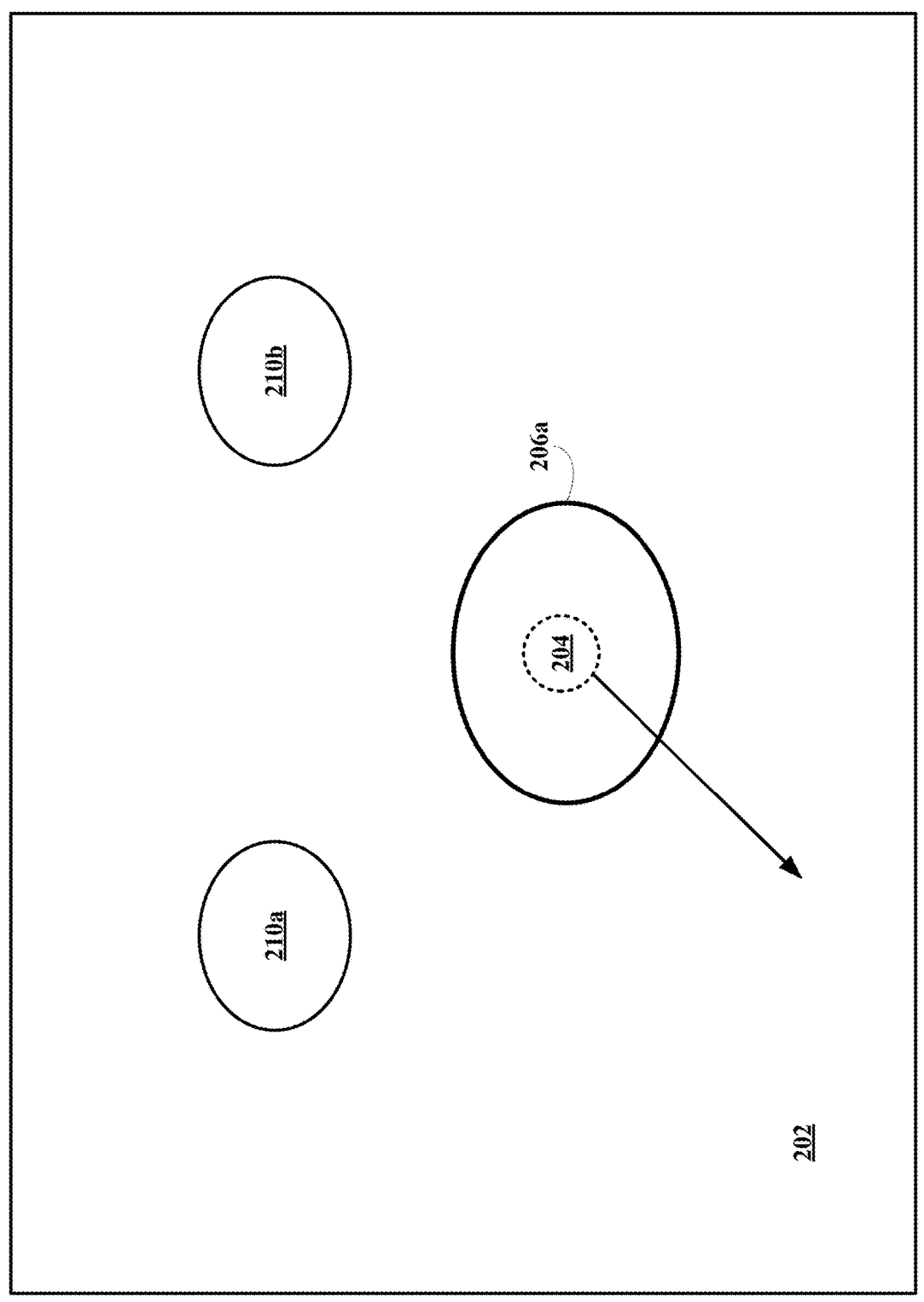
Figure 2L:
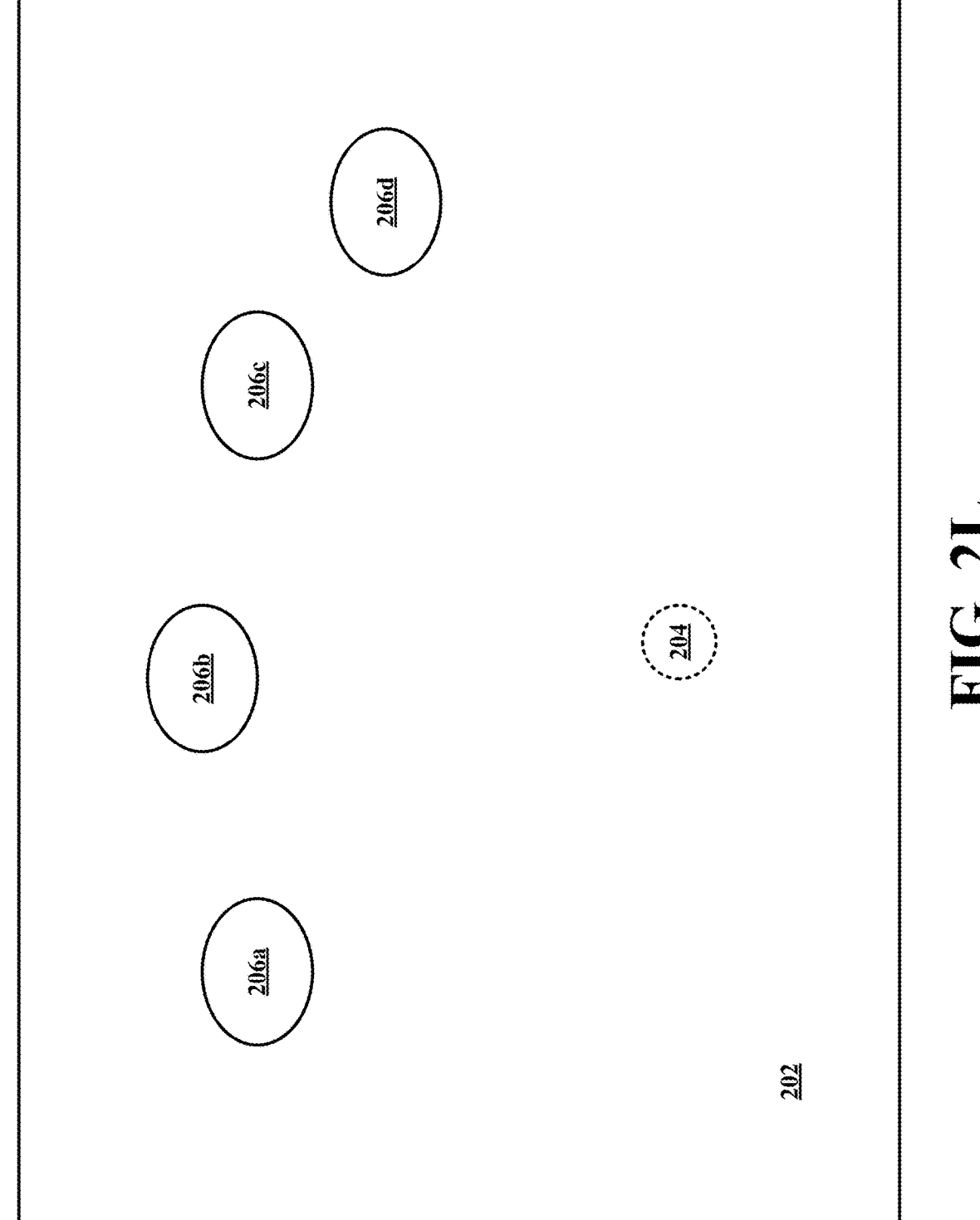

Referring now to FIG. 2K, after selecting the selectable object 206a, the user decides to discontinue this selection and move the selection object 204 from its merged state in a direction away from any other object resulting in the resetting of the display 202 back to the display configuration of FIG. 2B as shown in FIG. 2L.

Figure 2M:
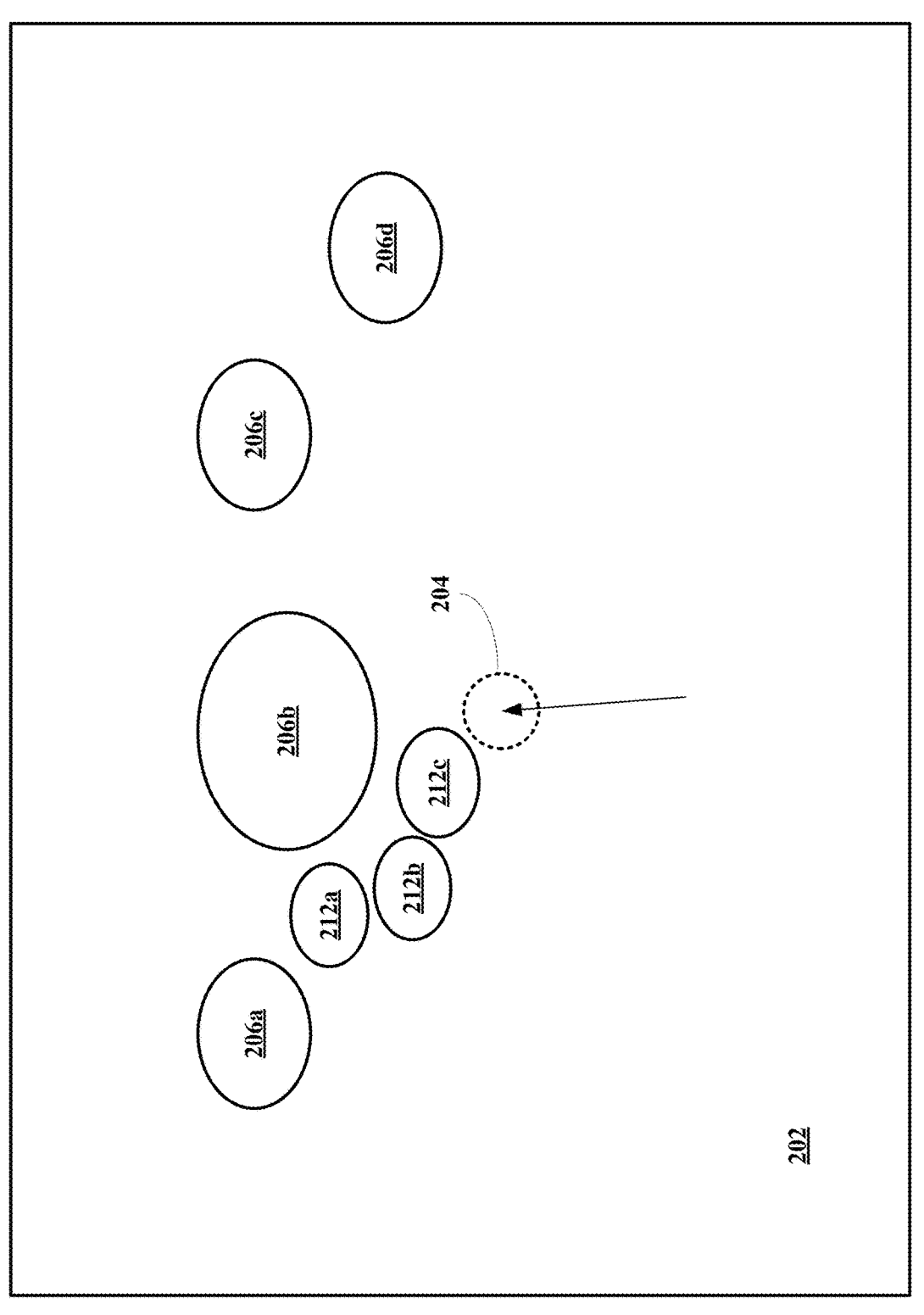
Figure 2N:
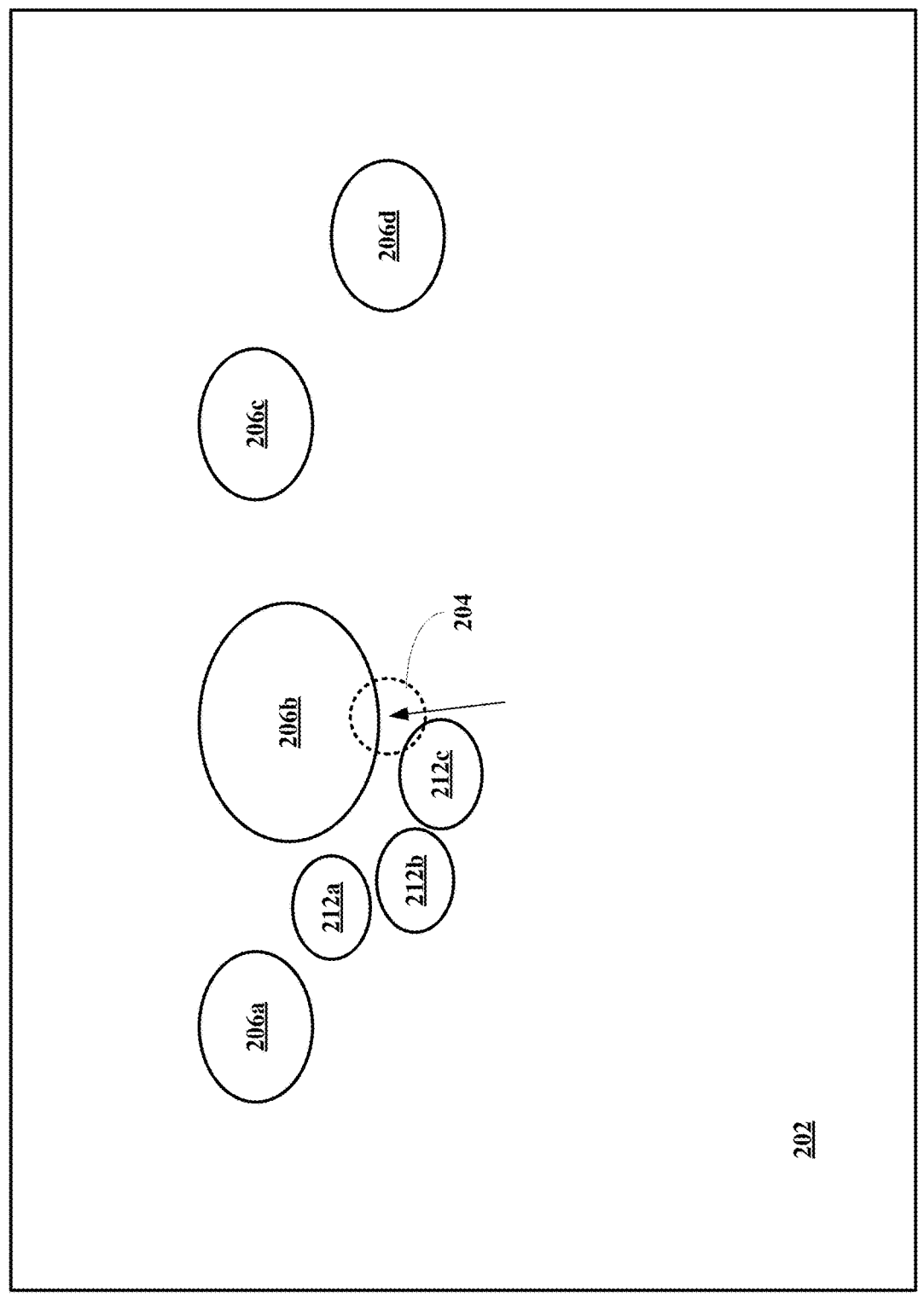
Figure 20:
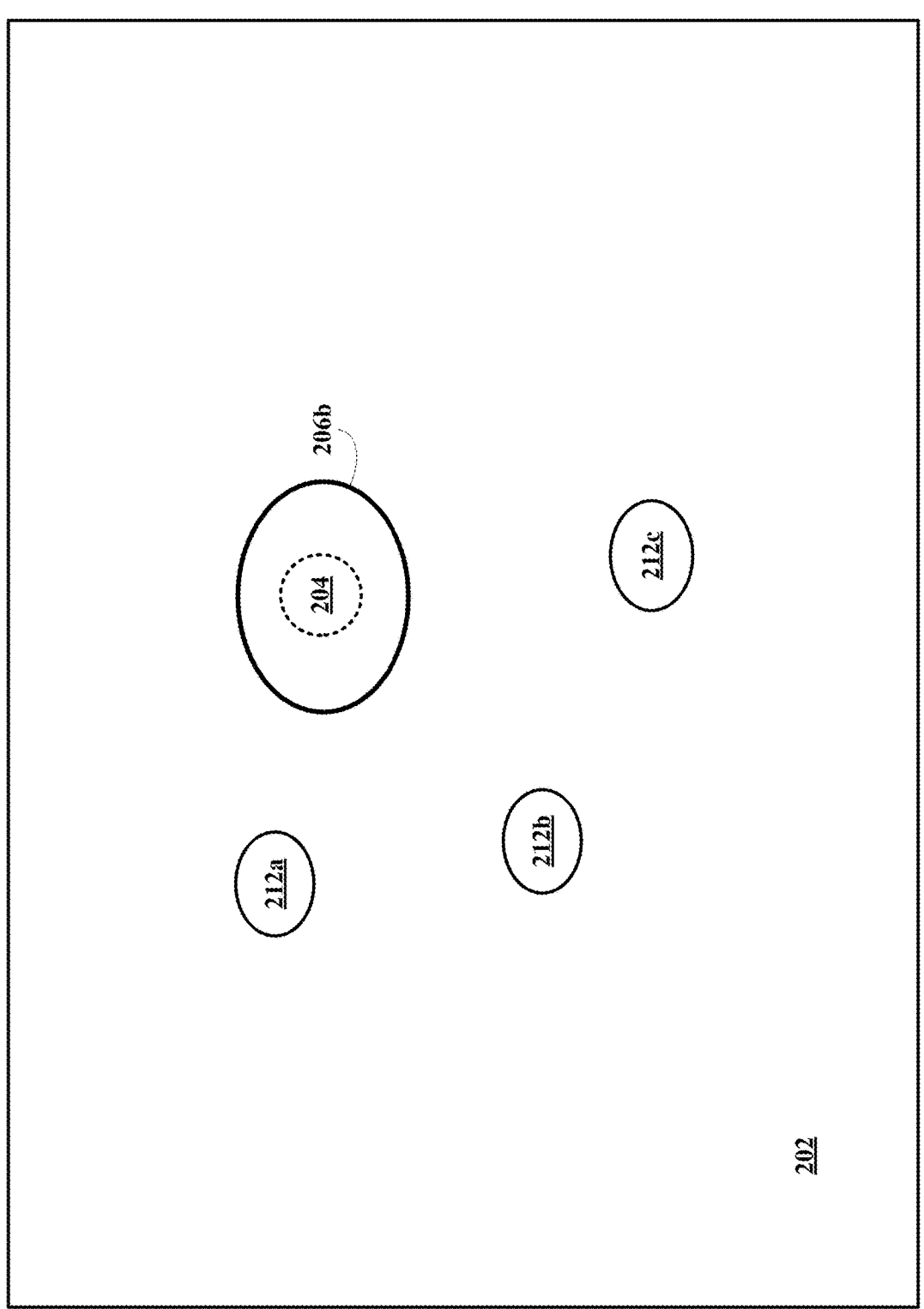
FIGS. 20A-C depict another embodiment of systems, apparatuses, and/or interfaces of this disclosure using another embodiment of a virtual keyboard for text processing.

Referring now to FIG. 2M, the section object 204 is moved toward the selectable object 206b, which move toward the selection object 204 increasing its size and simultaneously displaying associated subobjects 212a-c. For example, if the object 206b is a phone and the subobjects 210a-c are activate voicemail, open contacts, and opening phone dialing pad. As the selection object 204 is moved further toward and contacts the selectable object 206b, the selectable object 206b move closer and get larger along with its subobjects 212a-c as shown in FIG. 2N. The selection object 204 is in contact with the selectable object 206b and the other objects 206b-d are removed or fade away and the selected object 206b and its associated subobjects 212a-c center and the subobjects distribute away so that the subobjects may be more easily selected as shown in FIG. 2O.

Figure 2P:
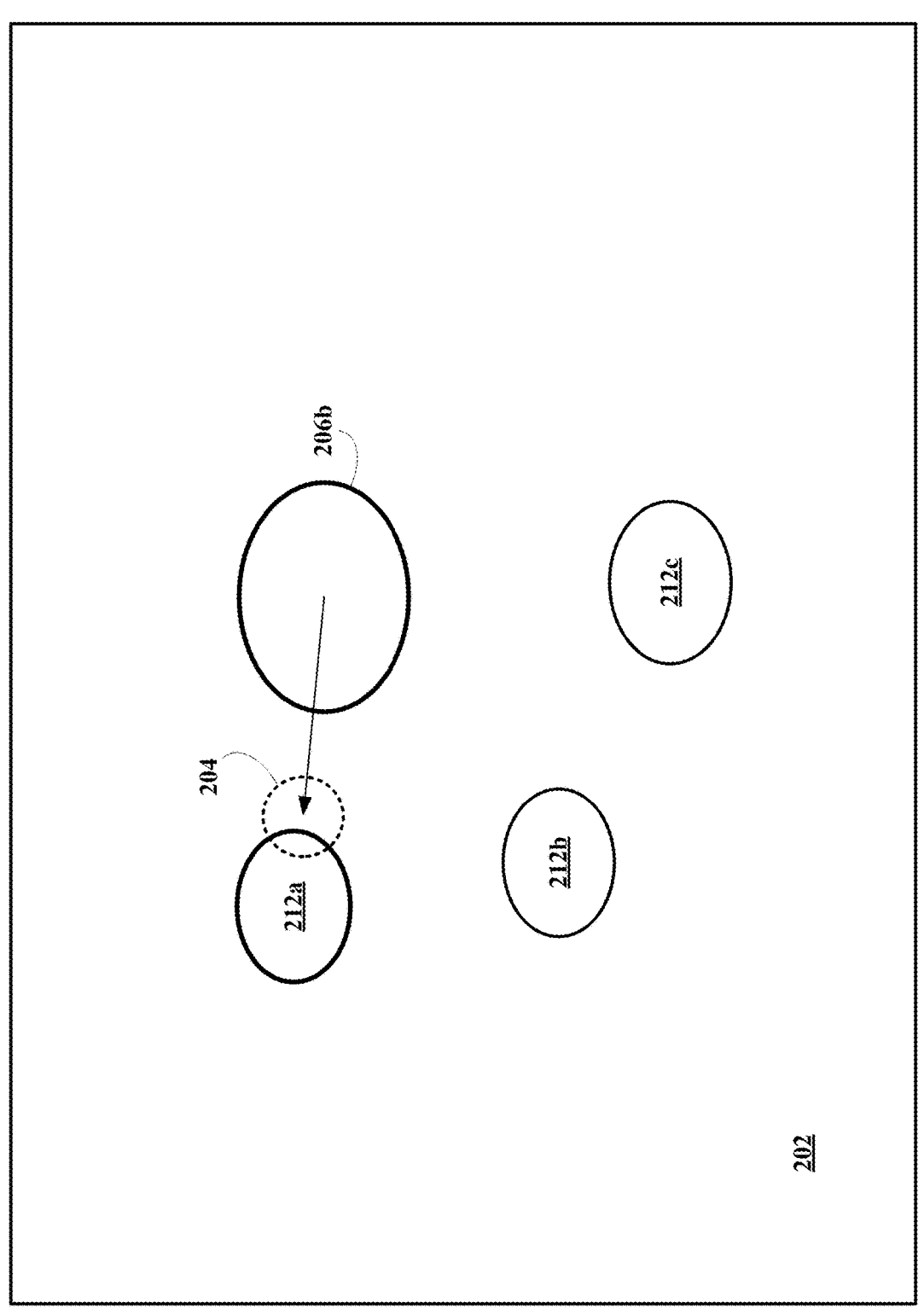
Figure 2Q:
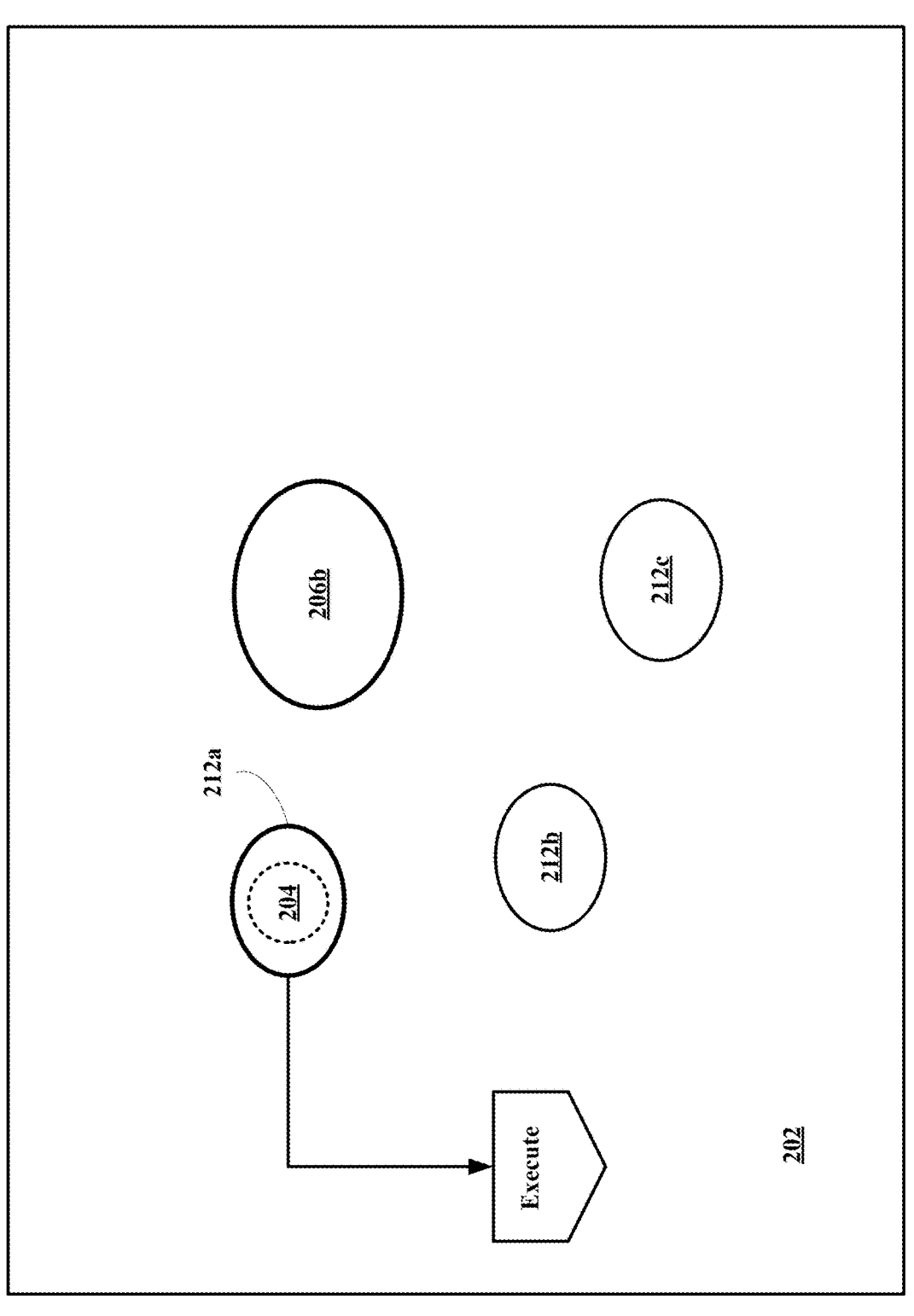

Referring now to FIG. 2P, the selection object 204 is moved from its merged state toward the subobject 212a coming in contact with the subobject 212a, which is attracted to the selection object 204 and increase in size and its line width is increased. Looking at FIG. 2Q, the subobject 212a is selected as evidenced by the merging of the selection object 204 with the subobject 212a and simultaneously activates the subobject 212a.

Figure 2R:
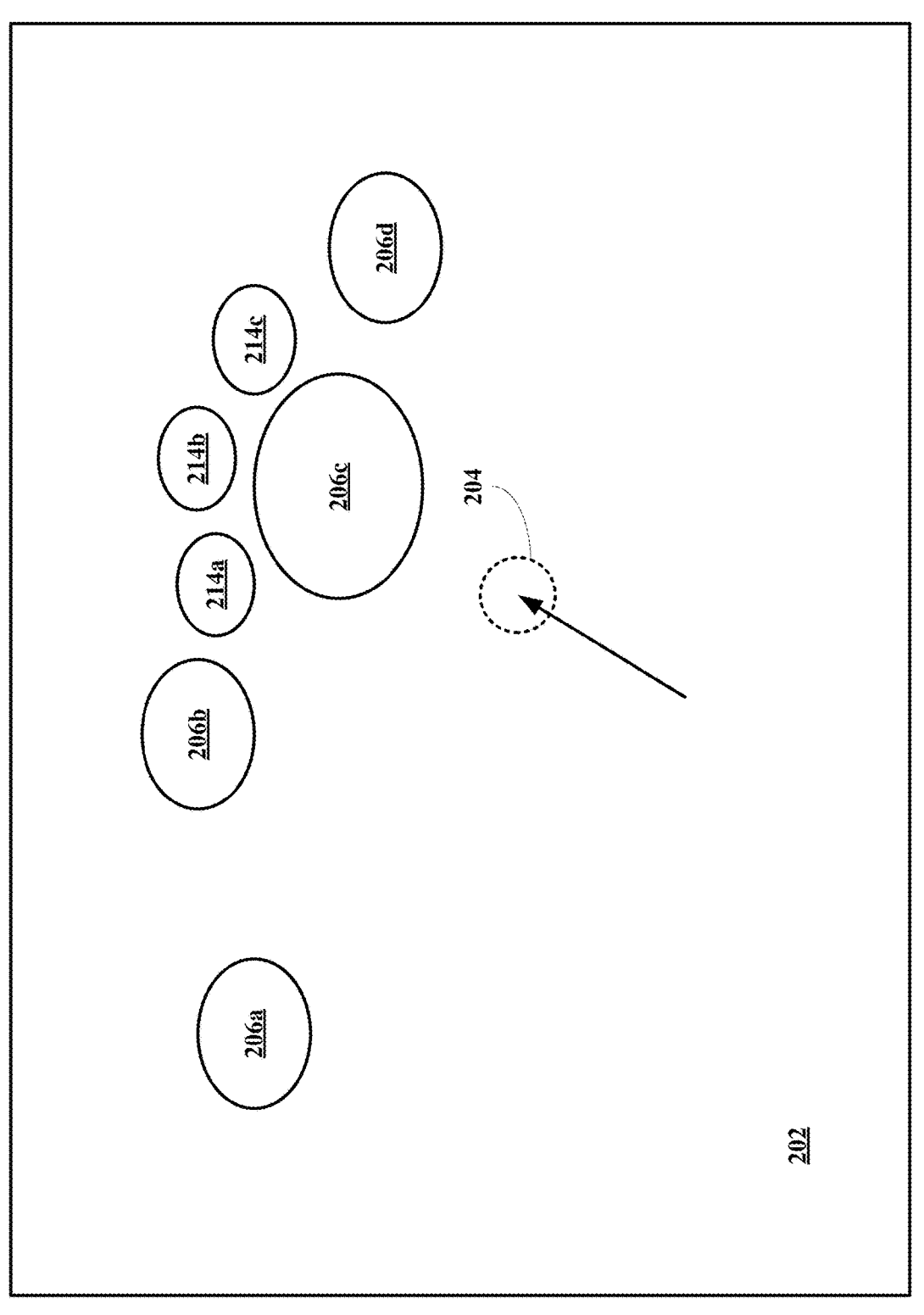
Figure 2S:
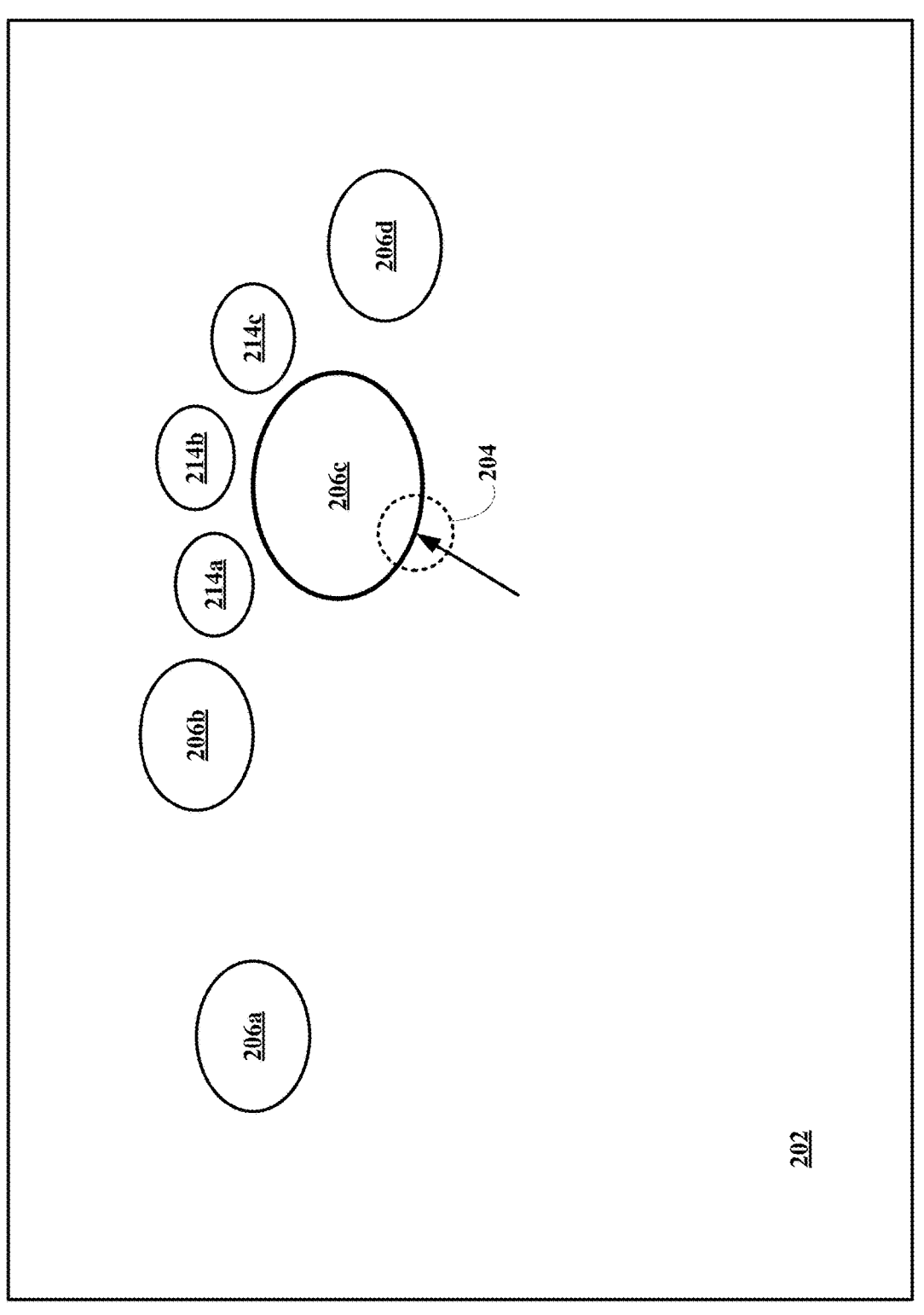
Figure 2T:
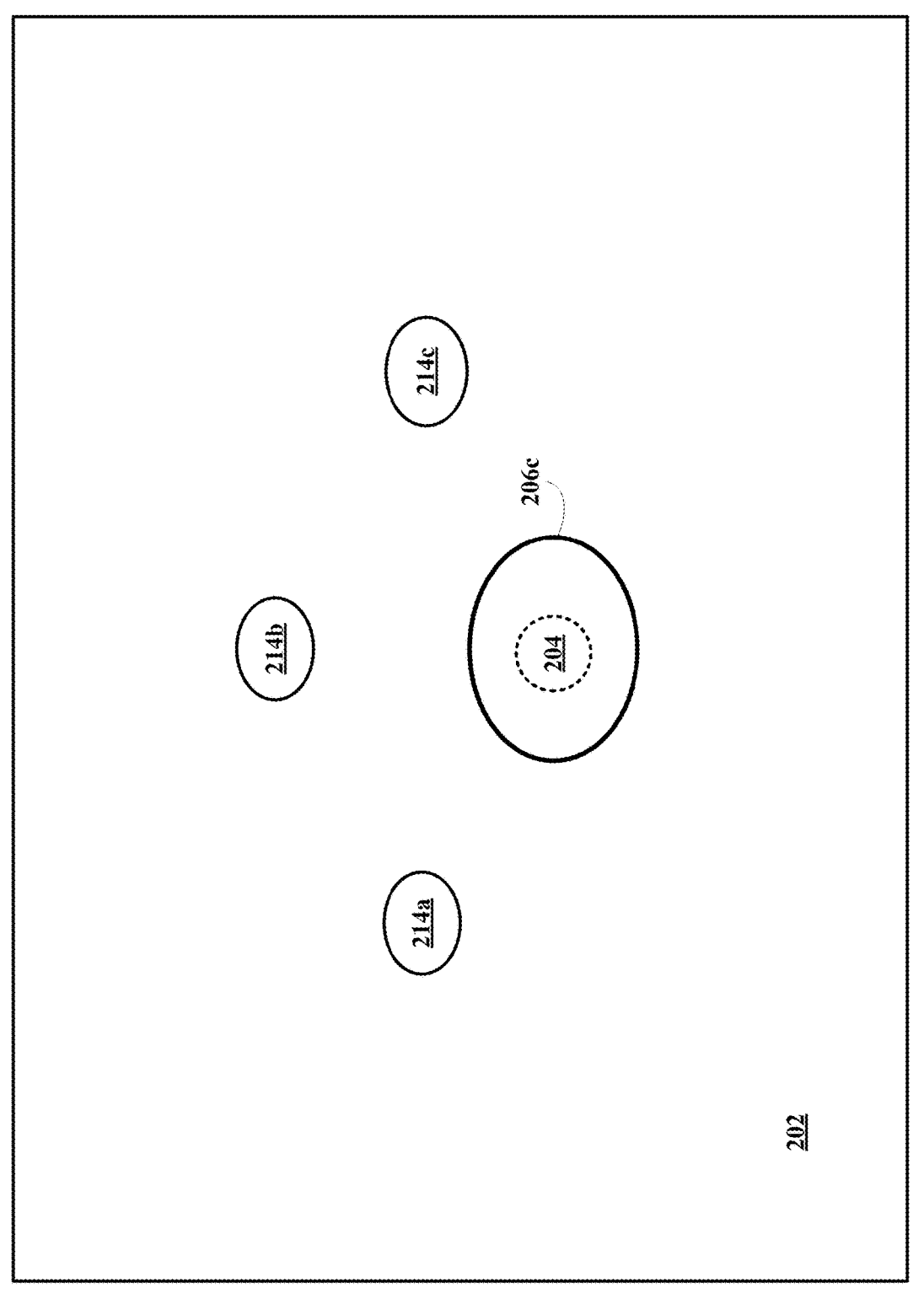

Referring now to FIG. 2R, the section object 204 is moved toward the selectable object 206c, which move toward the section object 204 increasing its size and simultaneously displaying associated subobjects 214a-c. For example, if the object 206c is the world wide web and the subobjects 210a-c are open favorites, open recent sites, and open frequently visited sites. As the selection object 204 is moved further toward and contacts or entering into a threshold event the selectable object 206c, the selectable object 206c move closer and get larger along with its subobjects 214a-c as shown in FIG. 2S. The selection object 204 is in contact with the selectable object 206c and the other objects 206b-d are removed or fade away and the selected object 206c and its associated subobjects 214a-c center and the subobjects distribute away so that the subobjects may be more easily selected as shown in FIG. 2T.

Figure 2U:
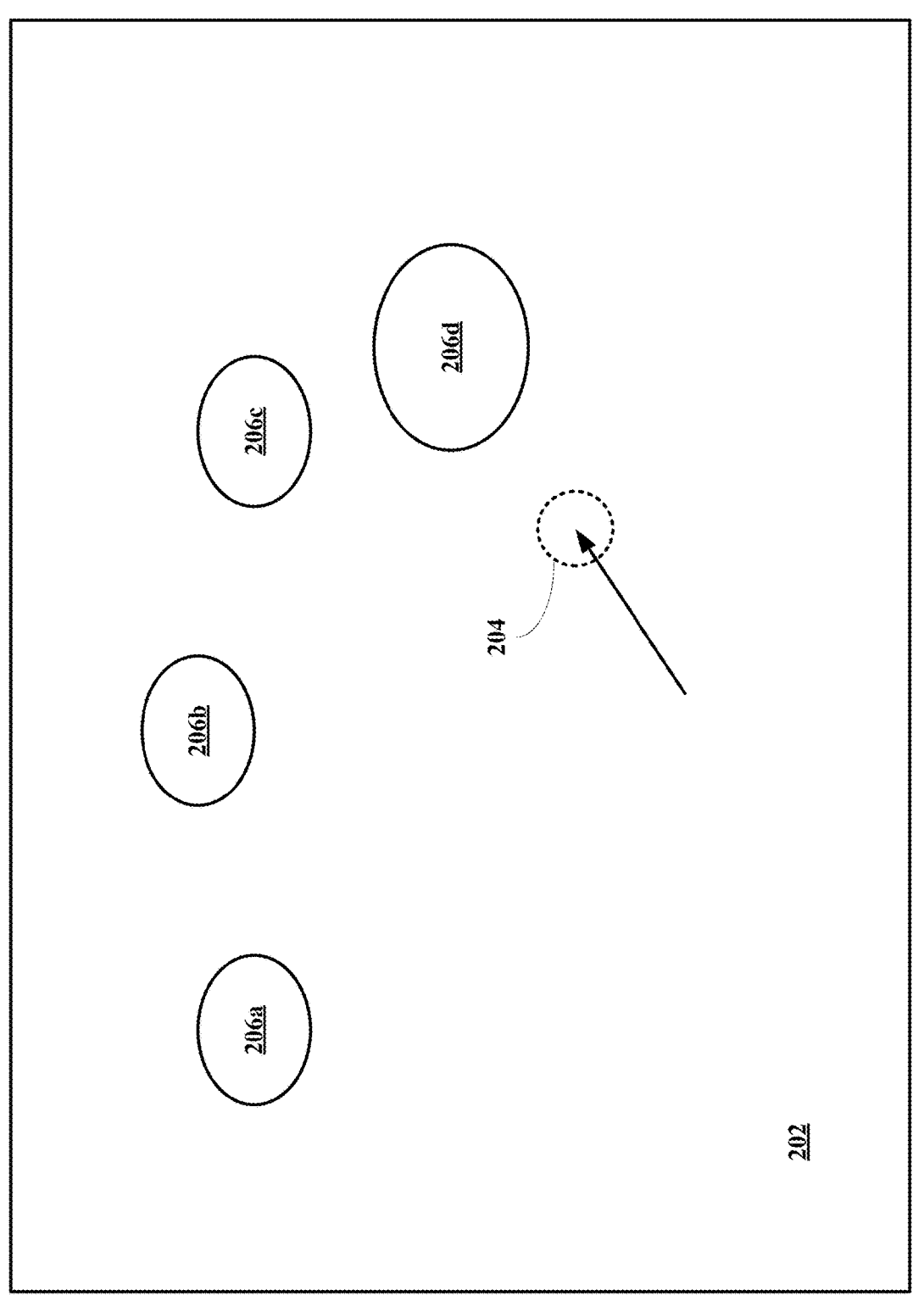
Figure 2V:
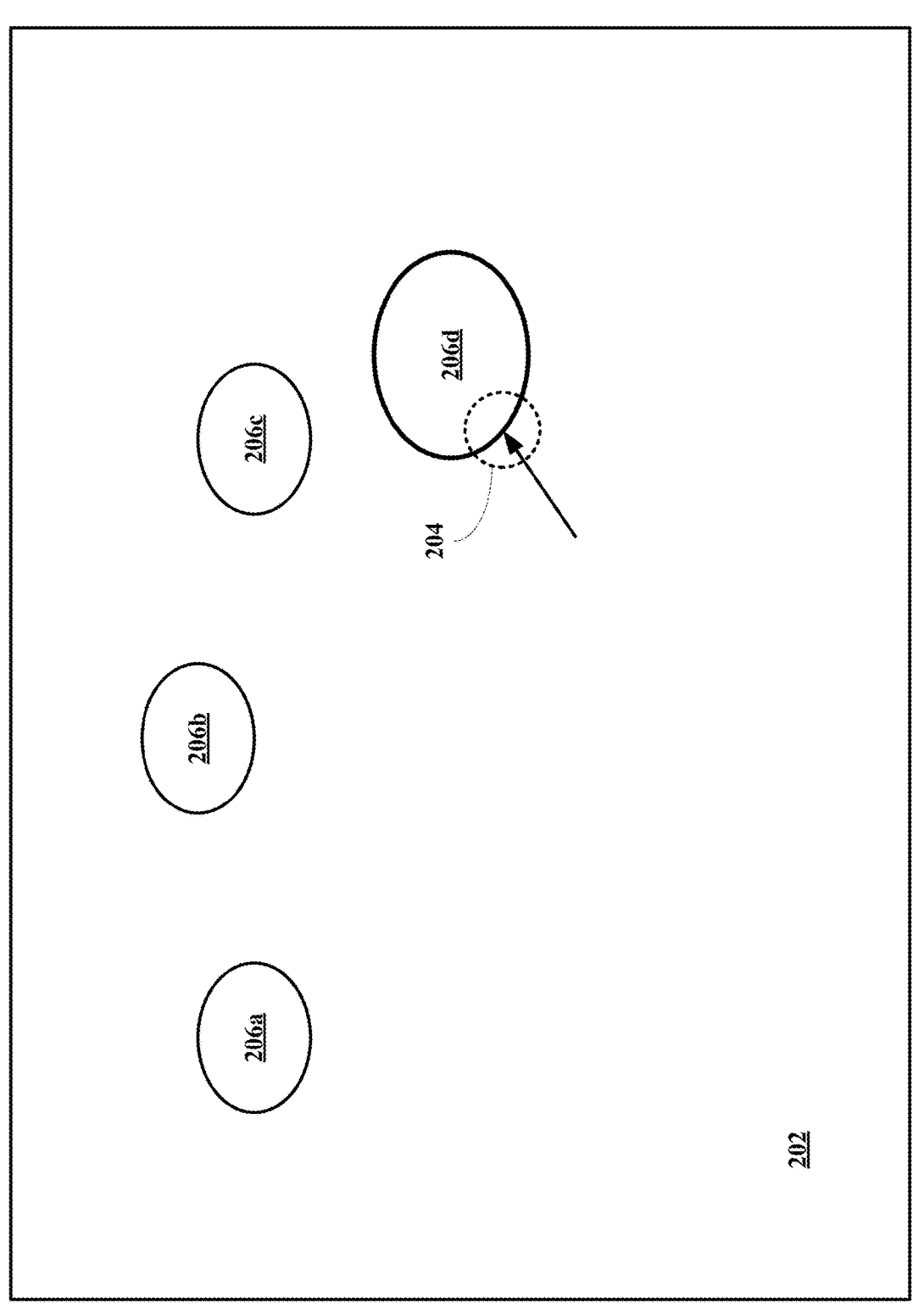
Figure 2W:
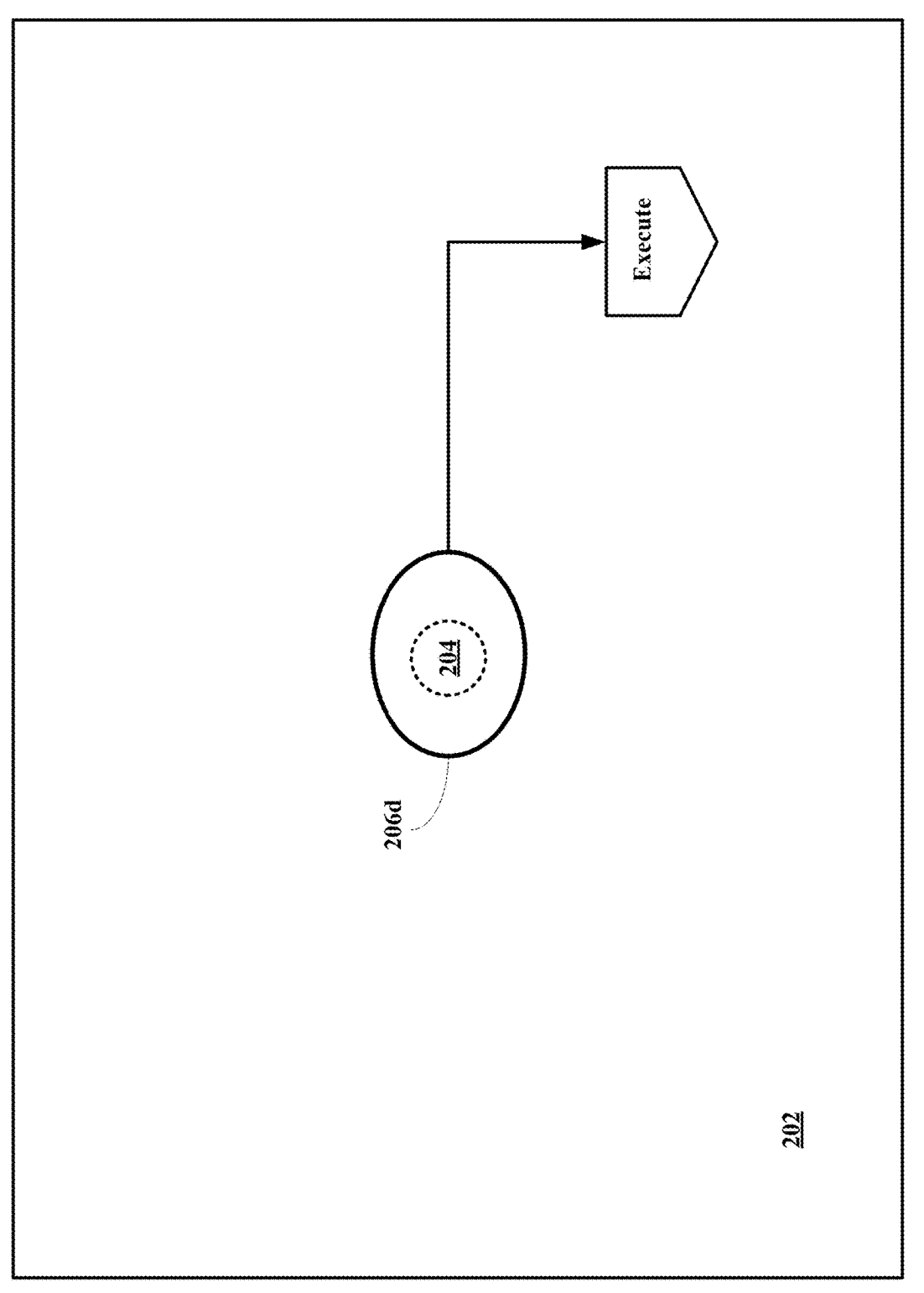

Referring now to FIG. 2U, the section object 204 is moved toward the selectable object 206d, which move toward the section object 204 increasing its size. For example, if the object 206d is twitter, then twitter is opened, i.e., the object is activated. As the selection object 204 is moved further toward and contacts or entering into a threshold event the selectable object 206d, the selectable object 206d move closer and get larger as shown in FIG. 2V. The selection object 204 is in contact with the selectable object 206d are removed or fade away and the selected object 206d is activated as shown in FIG. 2T.

Third Method and System Embodiments

Figure 3A:
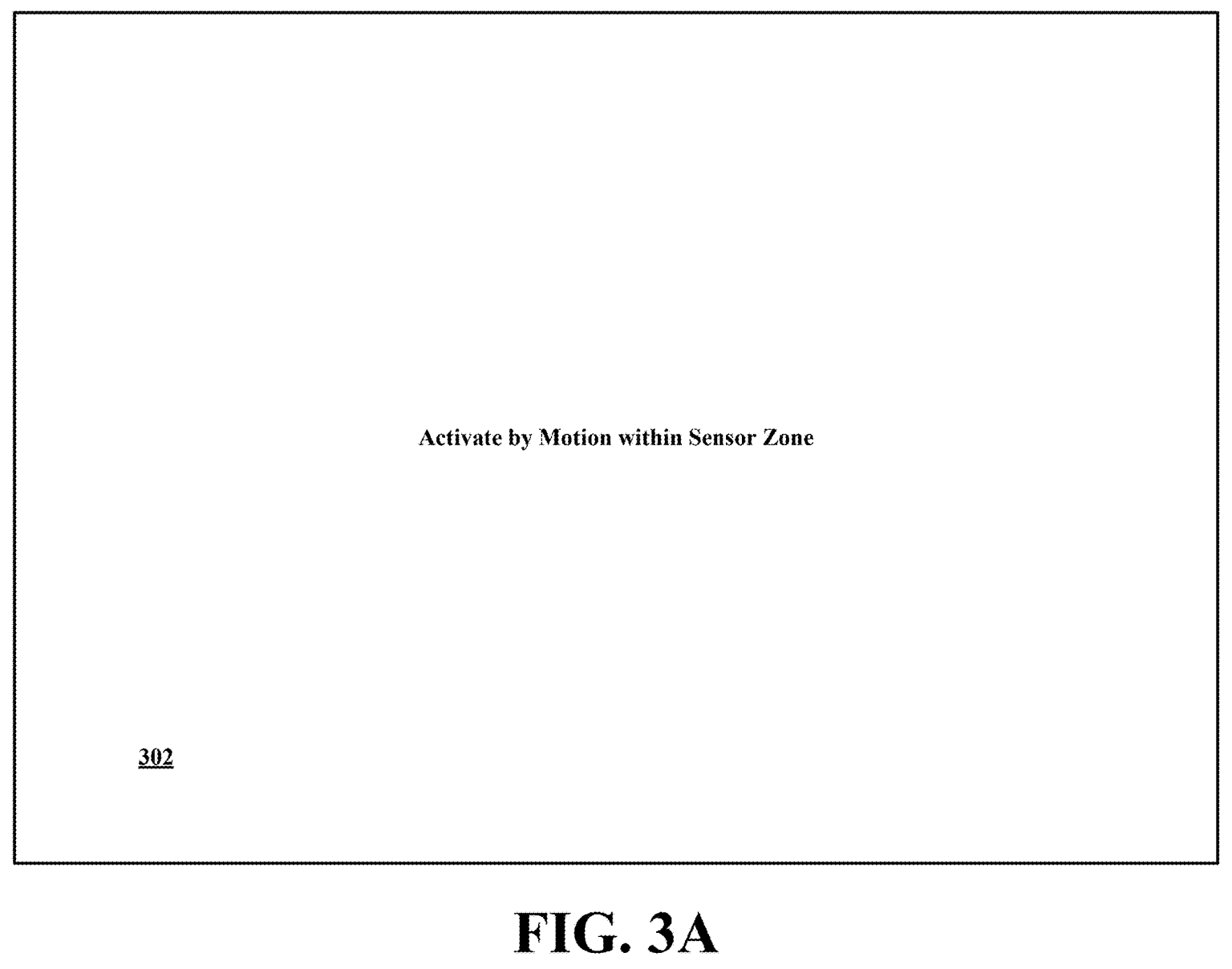
Figure 3B:
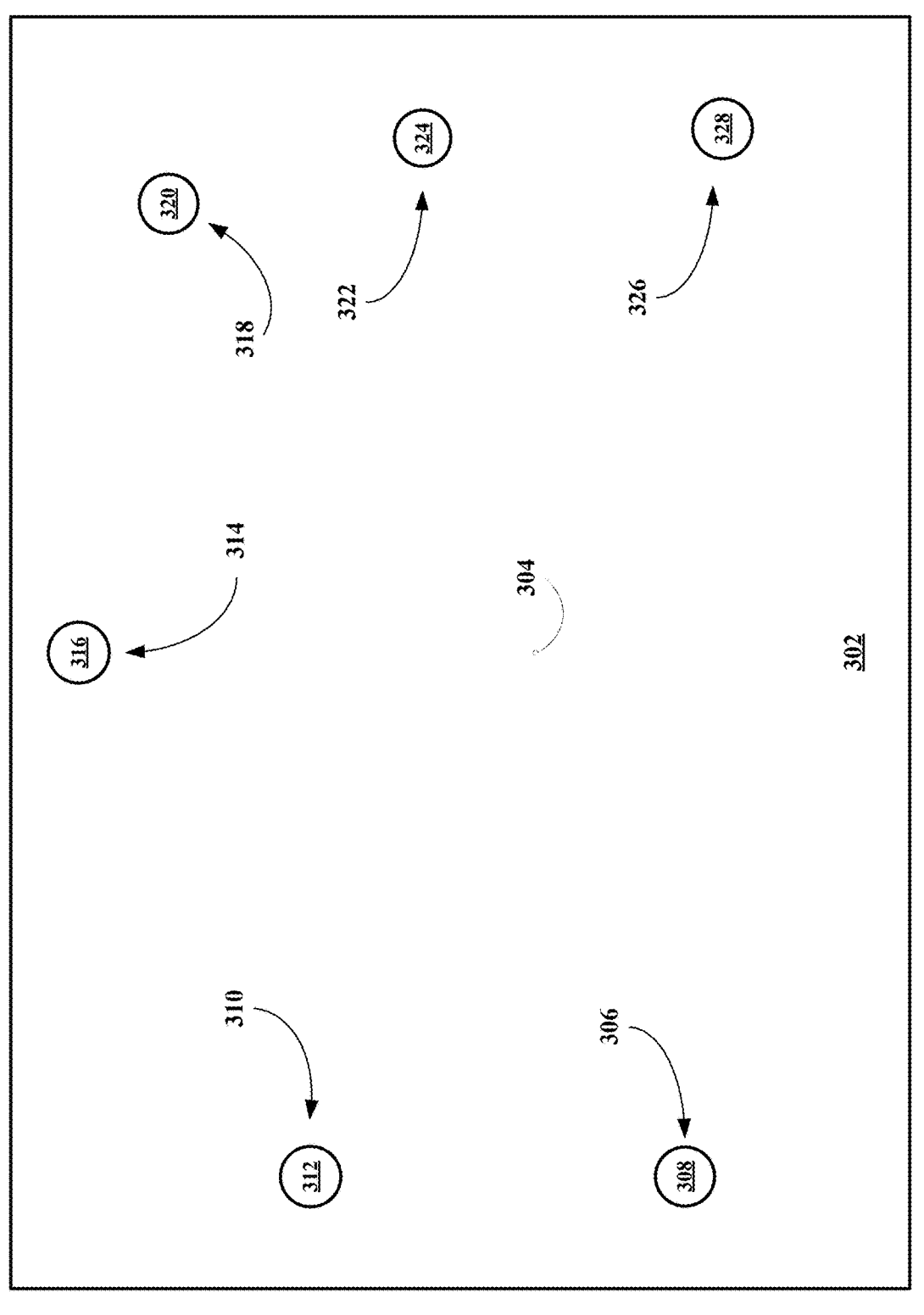

Referring now to FIG. 3A, a display, generally 300, is shown to include a display area 302. The display area 302 is in a dormant state or a sleep state or an unactivated state. This state is changed only by motion within an active zone of a motion sensor. Motion may be any movement within the active zone. In the case of a touch screen, motion may be contact such as touching, sliding, etc. Looking at FIG. 3B, motion within an active zone of a motion sensor associated with an interface activates the system and the display area 302 includes a virtual centroid 304 (the centroid is an object in the processing software and does not appear on the display, but all subsequent motion is defined relative to this centroid). In the display area, a plurality of selectable object clusters 306, 310, 314, 318, 322, and 326 are distributed about the virtual centroid 304. The selectable object clusters 306, 310, 314, 318, 322, and 326 include selectable cluster objects 308, 312, 316, 320, 324, and 328, respectively. Looking at FIG. 3C, the cluster 308 includes objects 308a-e; the cluster object 312 includes objects 312a-c; the cluster 316 includes 316a-f; the cluster 320 includes 320a-f; the cluster 324 is a selectable object; and the cluster 328 includes 328a-d.

Figure 3D:
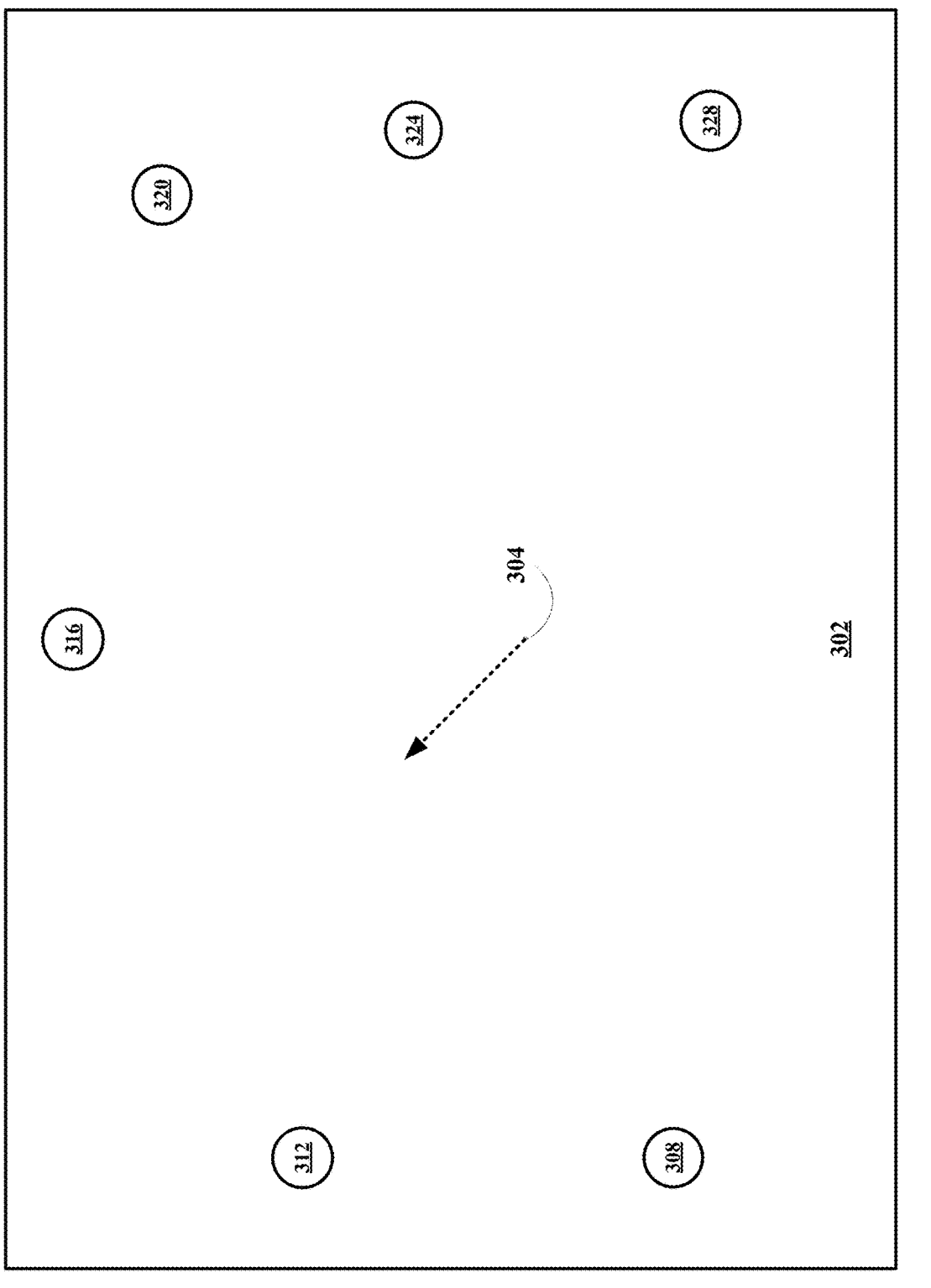
Figure 3E:
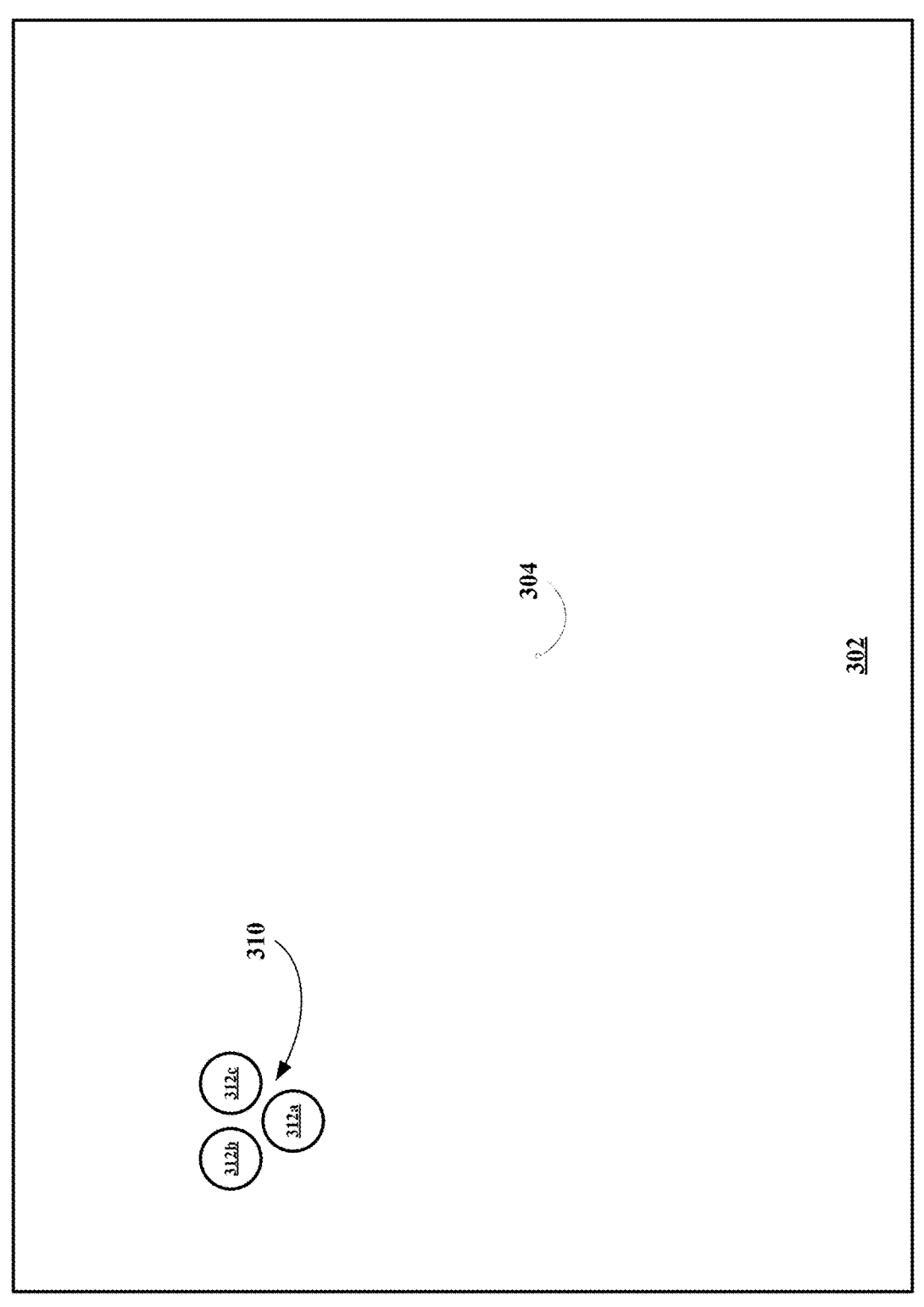
Figure 3F:
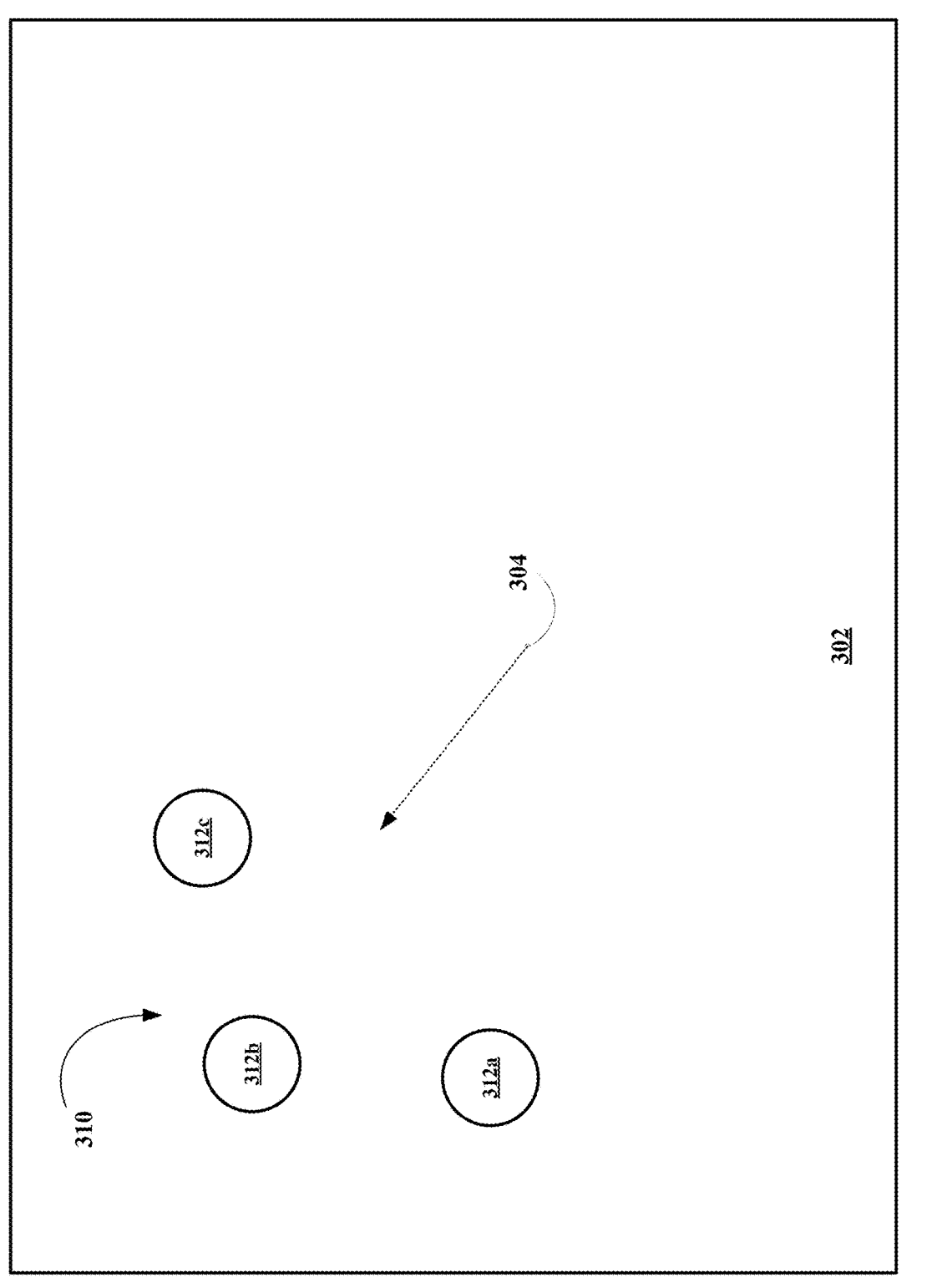
Figure 3G:
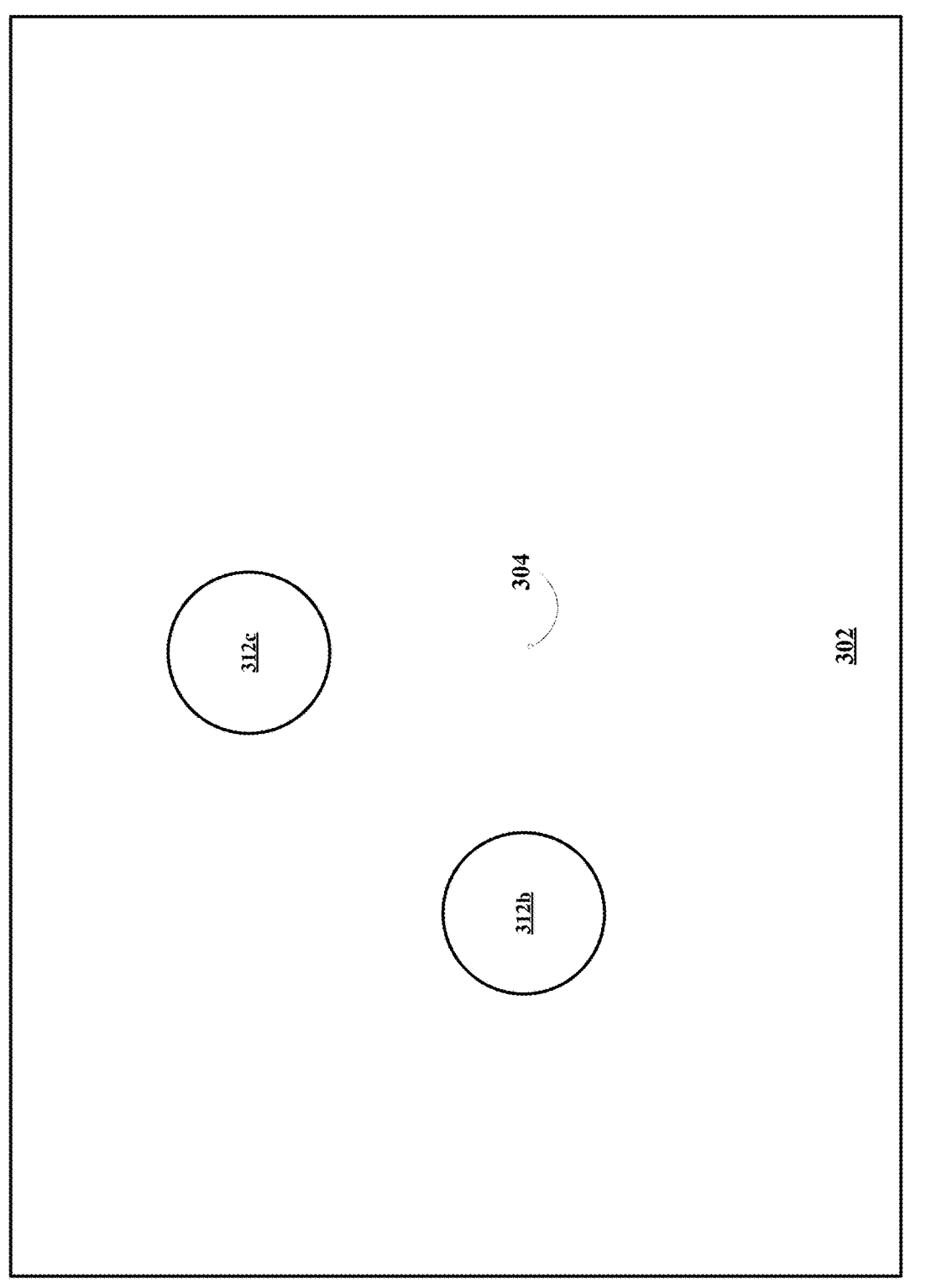

Referring now to FIG. 3D, motion of a body part such as a user's eye, hand, foot, etc. within in the active zone of the motion sensor associated with the interface is displayed as a virtual directed line segment in the display area, but the directed line segment is not actually displayed. The sensed motion is analyzed and the interface predicts the object most aligned with the motion characteristic such as direction, speed of motion and/or acceleration of the motion. Looking at FIG. 3E, the predict portion of the software of the interface determines and cluster 310 is the most likely cluster that is to be selected and its associated selectable cluster object 312a-c are also displayed. The interface then causes the objects 312a-c to be drawn to the centroid 304 (or towards the relative location of the user's eye(s) or body part(s) acting as the selection object) and increased in size as shown in FIG. 3F. FIG. 3F also shows continued motion sensed by the motion sensor in an augmented direction. Looking at FIG. 3G, the augmented direction permits additional discrimination so that now only objects 312b and 312c are displayed, attracted and spaced apart for better discrimination.

Figure 3H:
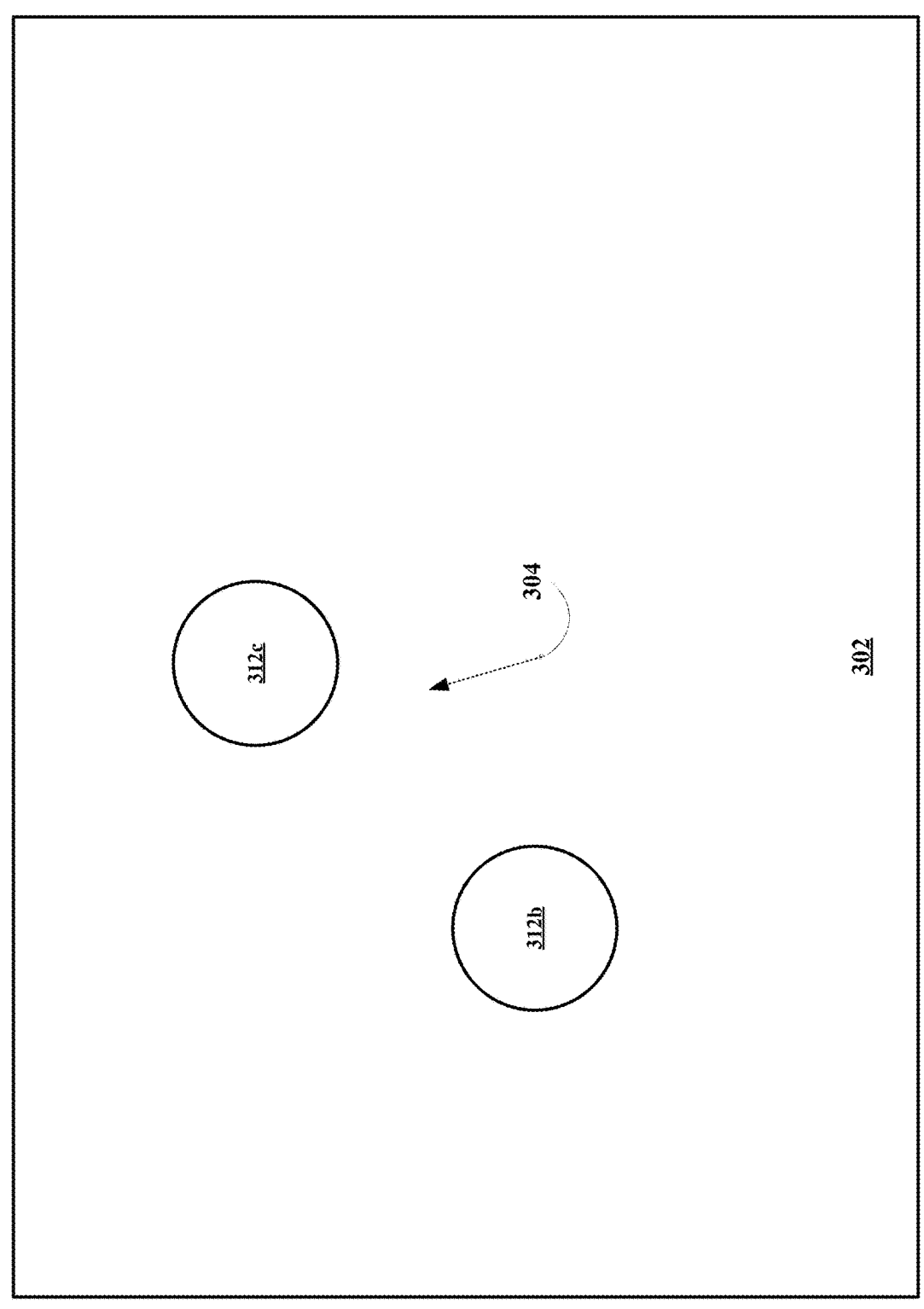
Figure 3I:
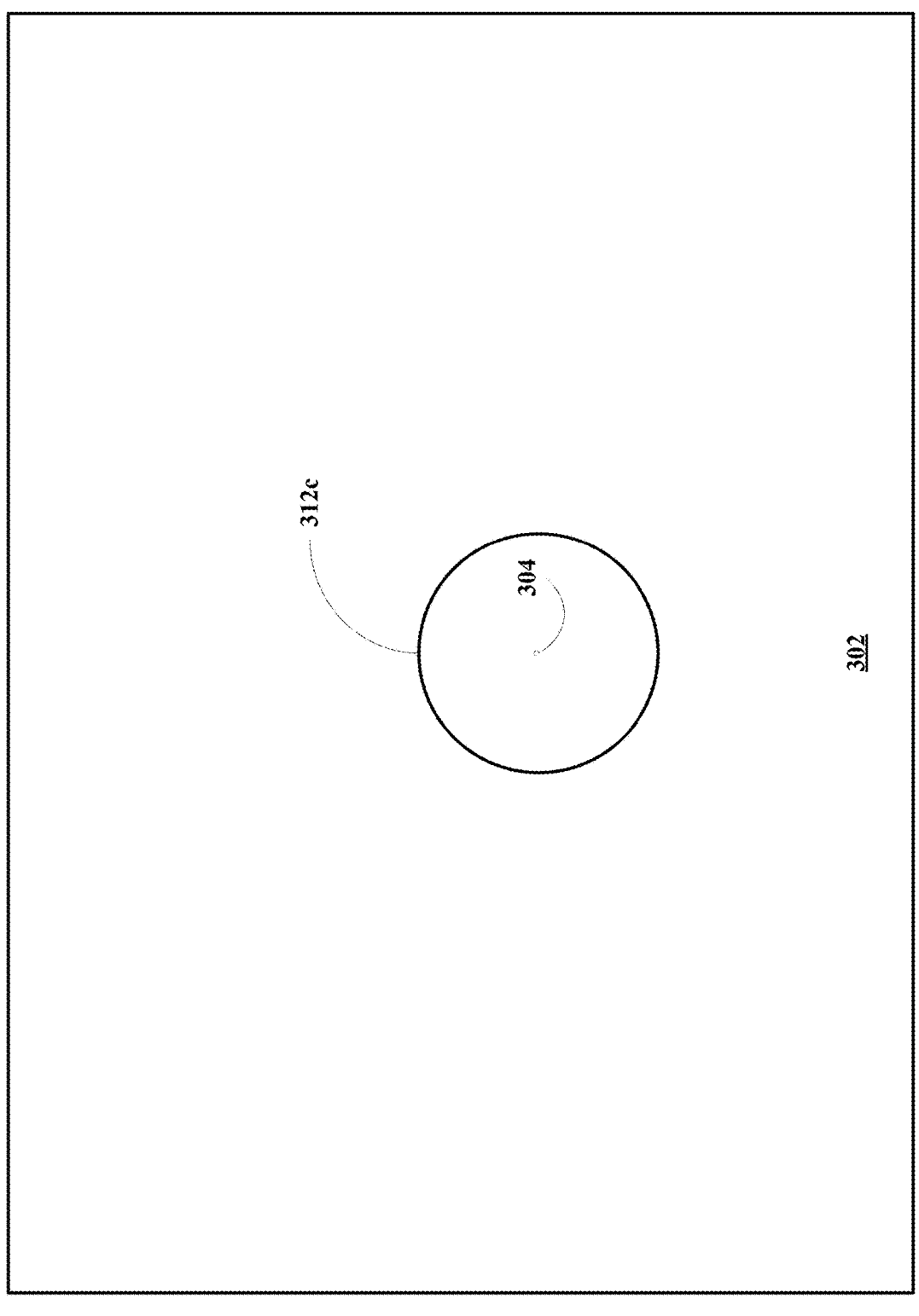
Figure 4A:
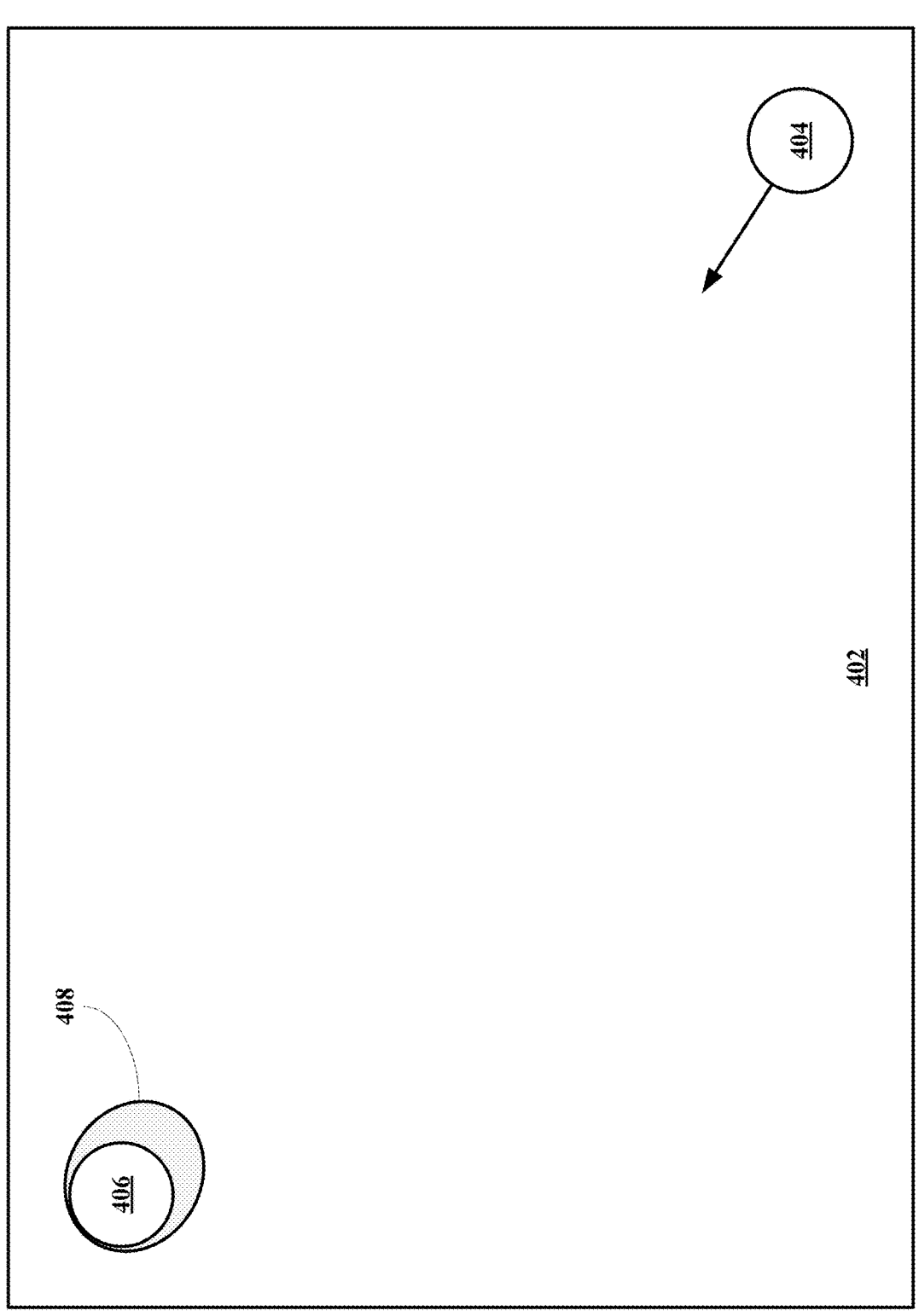
FIGS. 4A-D depict a motion based selection sequence including an objection and a selectable object as motion toward the selectable object increases causing an active area to form in front of the selectable object and increasing in scope as the selection object move closer to the selectable object until selection is within a threshold certainty.
Figure 4B:
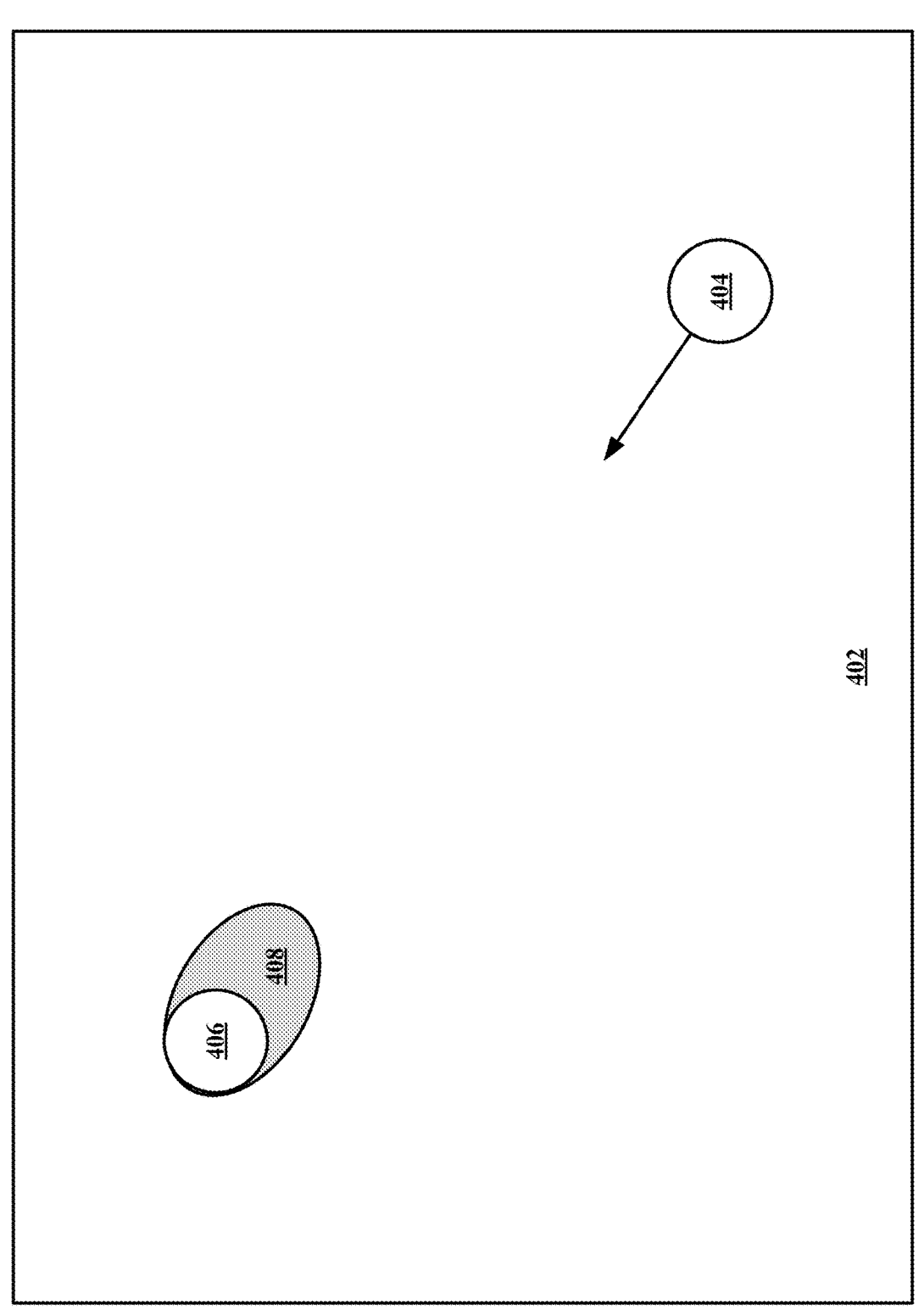
Figure 4C:
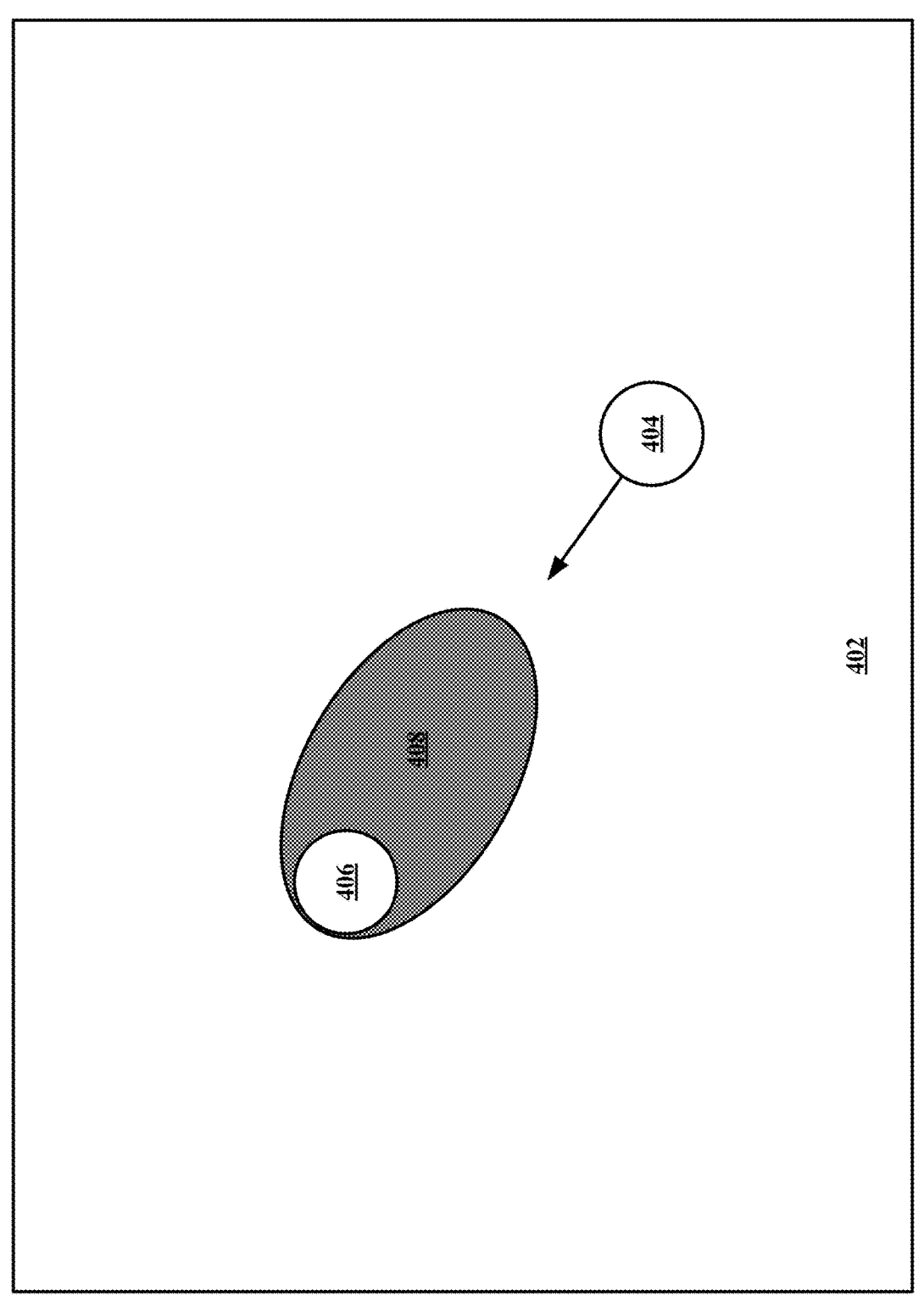
Figure 4D:

Referring now to FIG. 3H, a new augments direction of motion sensed by the motion sensor permits selection, centering of the selected object 312c and activation of the selected object 312c as shown in FIG. 3I.

in the predictive selection of cluster 310 and the eventual selection of the object 312c, these selections may be confirmed by motion of a second body part. Thus, if eye motion is used as the primary motion indicator, then motion of a second body part such as nodding of the head, blinking of the eye, hand movement, or motion of any other body part may be used as confirmation of the selection. Similarly, a hold may be utilized to begin the attractive process of bringing the selectable object or objects toward the user. Just as in the interfaces of FIGS. 1A-M and FIGS. 2A-W, motion away from selectable objects returns the display to the previous selection level. Continued motion away continues this drill up until the display is back to the top level. In certain embodiments, clusters may be selected by certain predetermined gestures that are used to active particular cluster, objects or object groups. In other embodiments, lifting of the finger or moving out of an activating plane, area or volume would reset the objects to a predetermined location and state.

Fourth Method and System Embodiments

Referring now to FIGS. 4A-D, a display, generally 400, is shown to include a display area 402. The display area 402 is shown to include a selection object 404 and a selectable object 406. As the selection object 404 moves toward the selectable object 406, the two objects 404 and 406 move toward each other and an active area 408 is generated in front of the selectable object 406 in the direction of the selection object 404. As movement continues, the size of the active area 408 increases and the certainty of the selection increases as shown by the darkening color of the active area 408. Finally, the selection is confirmed by merging the two objects 404 and 406.

Figure 5A:
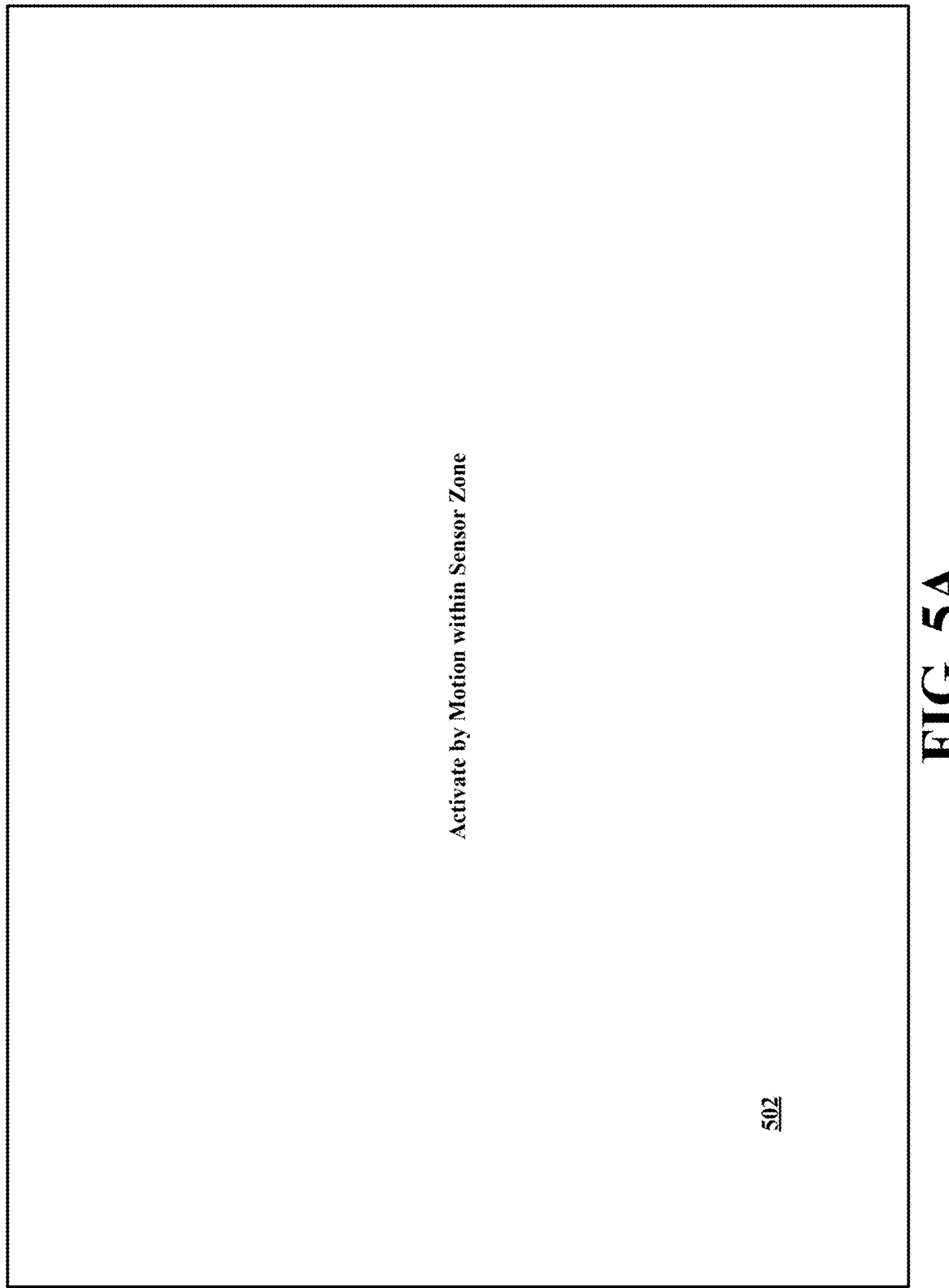
FIG. 5A-P depict another motion-based selection sequence using an attractive interface of this invention: (A) depicts a display prior to activation by motion of a motion sensor in communication with the display; (B) depicts the display after activation to display a selection object and a plurality of selectable objects; (C) depicts the display after the selection object is moved; (D) depicts the display showing further movement of the selection object causing selectable object to move in the direction of motion towards selection object and to expand as other selectable objects decrease and recede; (E) depicts the display showing the selection object further movement causing discrimination of selectable objects; (F) depicts the display after the selection object is moved toward a first selectable subobject; (G) depicts the display merged with a selected subobject and simultaneous activation of the subobject; (H) depicts the display after the selection object is moved toward the other selectable subobject; (I) depicts the display merged with a selected subobject and simultaneous activation of the other subobject; (J) depicts the display with motion of the selec-tion object away from the selected object and away from any subobjects; (K) depicts the display after moving away causing the original selection display to reappear; (L) depicts the display after the selection object is moved toward a second selectable subobject causing the second object to move toward and increase in size and simultaneously dis-play associated subobjects; (M) depicts the display after movement of the selection object into contact with the second selectable object; (N) depicts the display after selec-tion of the second selectable object now merged and cen-tered with the subobjects distributed about the selected second object; (O) depicts the display after the selection object is moved toward a desired subobject; and (P) depicts the display after merger with the subobject simultaneously activating the subobject.
Figure 5B:
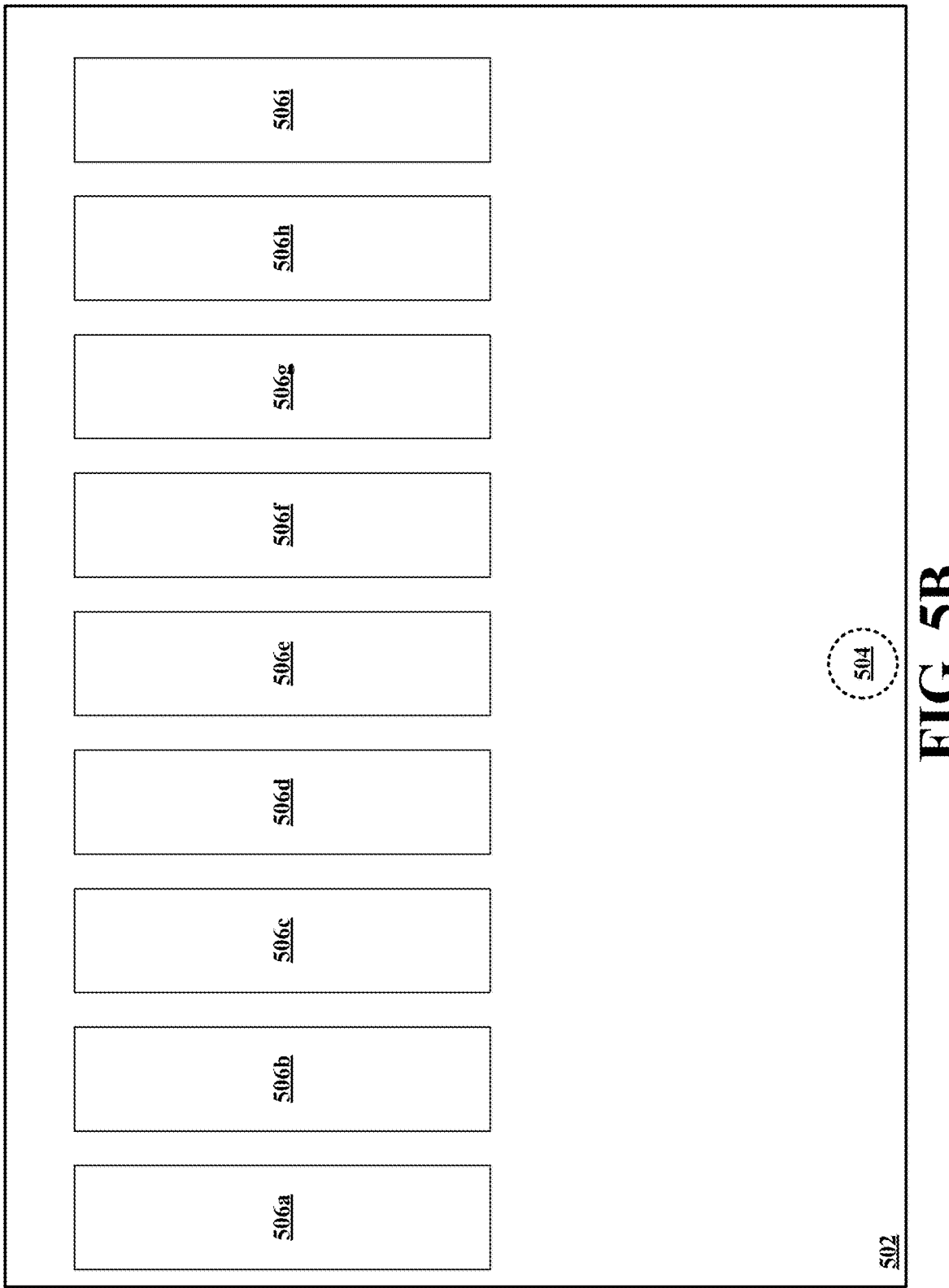

Referring now to FIGS. 5A-Q, a process of this invention is shown to context with a virtual store including primary selectable "isles". While the virtual store is represented in 2D, it should be clear that 3D and higher dimensional analogues are equally enabled, where high dimension would be constructed of object that are 3D in nature but are presented by selectable 2D objects. 4D systems may be presented by 3D selectable objects that change in color or change some other attribute on a continuous or discrete basis.

Fifth Method and System Embodiments

Looking at FIGS. 5A&B, a display, generally 500, is shown to include a display area 502, and is shown in its sleep or inactive state. Once activated by touch, motion within an active zone or by another activation methodology such as sound, voice, claps, or the like, the display area 502 is shown to include a selection object 504 (which may be visible or invisible-invisible here) and a plurality of selectable object or isles 506*a-i*.

Figure 5C:
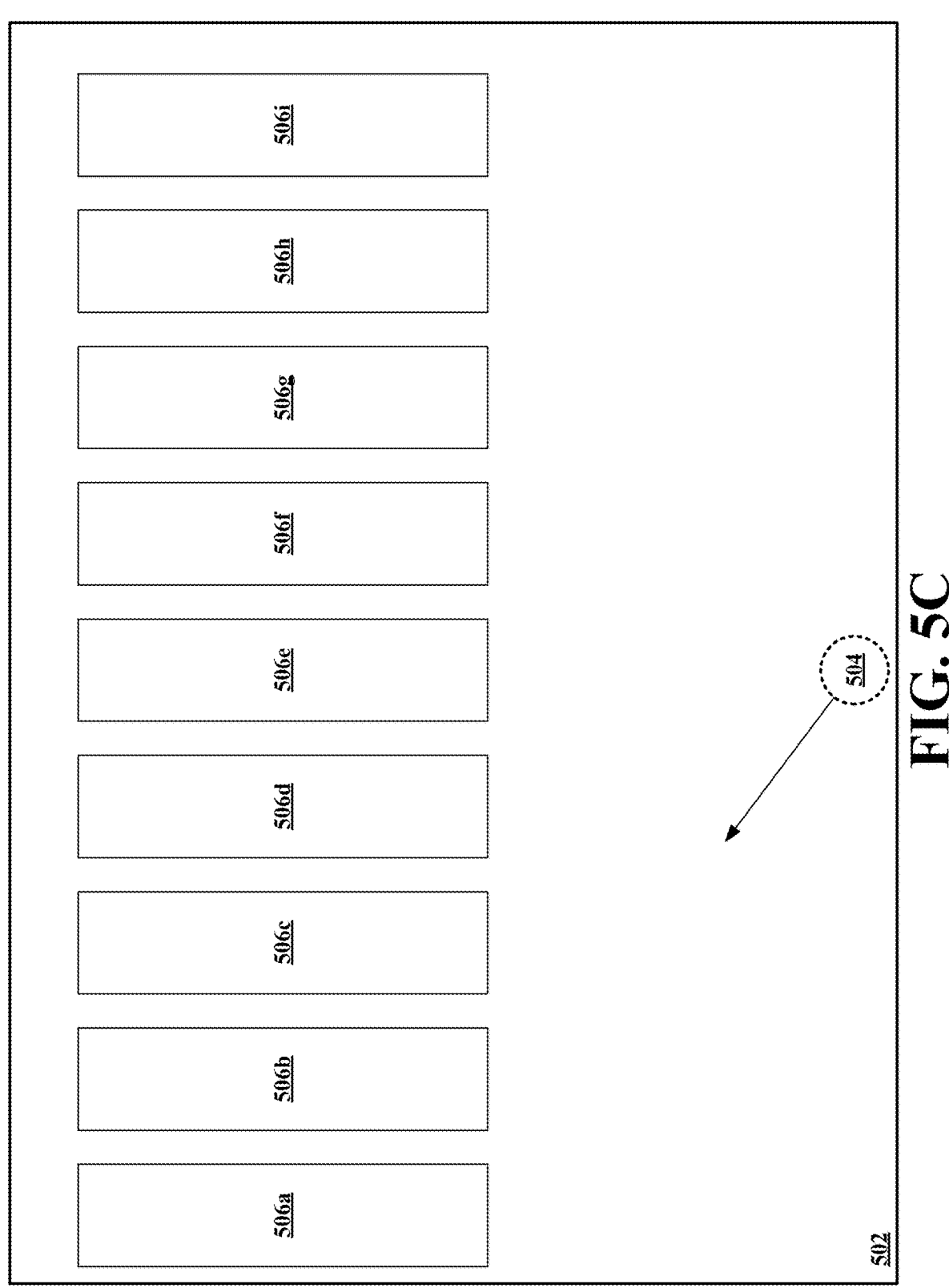
Figure 5D:
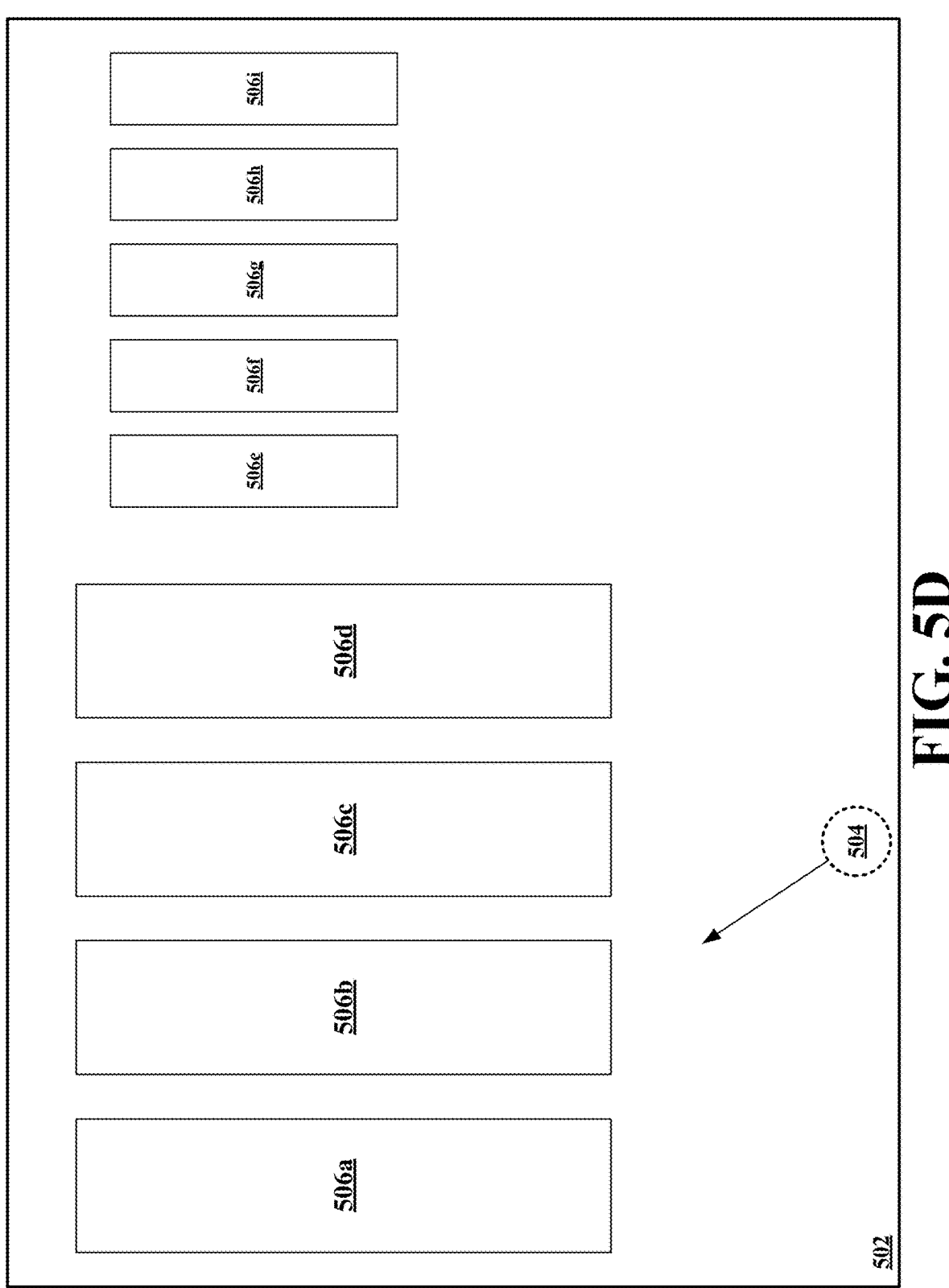
Figure 5E:
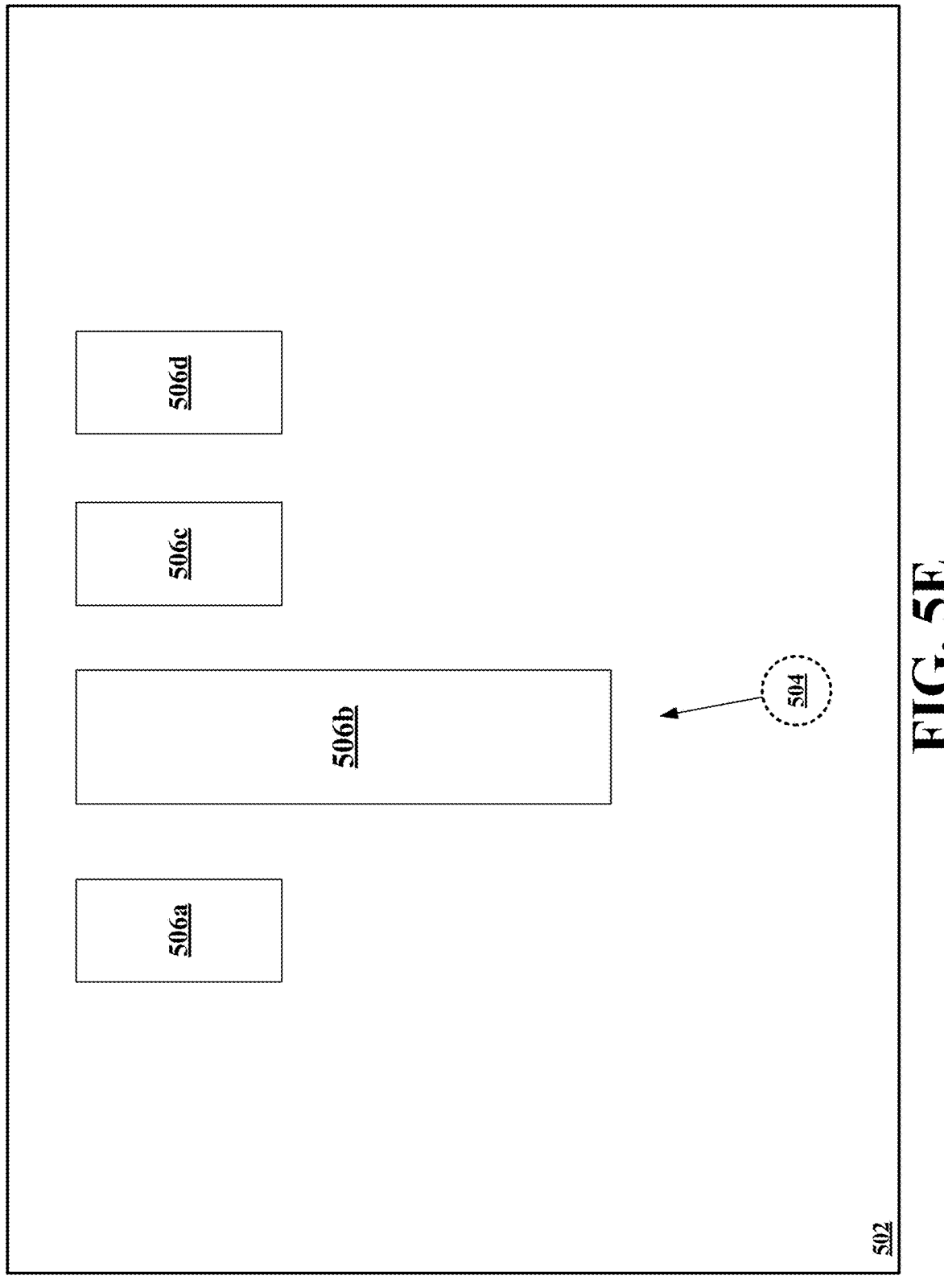

Looking at FIGS. 5C-E, movement of the selection object 504 towards the left side of the display 502 causes isles 506*a-d* to enlarge and move toward the selection object 504, while isles 506*e-i* to shrink and move away from the selection object 504. Although these figures show selectable objects aligned with the direction of movement to enlarge and move toward the selection object 504 and selectable objects not aligned with the direction of movement to shrink and move away from the selection object 504, each set of object may also be highlighted as then enlarge or faded as they recede. Additionally, the speed of the movement may result in the enhancement of the enlargement and movement towards of the aligned objects making them appear to accelerate towards the selection object 504, while simultaneously enhancing the movement away and fading of the non-aligned objects. As the movement continues, discrimination between the aligned isles 506*a-d* clarifies until the movement permits sufficient discrimination to select isle 506*b*, which may move and/or accelerate toward the selection object 504 shown here as being enlarged in size as the non-aligned are reduced in size and move away. Of course, the isles 506*b* may be highlighted as the isles 506*a*, 506*c*, and 506*d*. It should be recognized that all this selection discrimination occurs smoothly and not disjointed as represented in these figures. Moreover, the discrimination may also be predictive both from a mathematical and vector analysis framework and/o based on user specific movement characteristics and prior selection histories. Based on mathematics and vector analysis and user history, the level of predictability may be such that selection is much more immediate. Additionally, as the interface learn more and more about a user's preferences and history, the interface upon activation may bring up less choices or may default to a most probable choices.

Figure 5F:
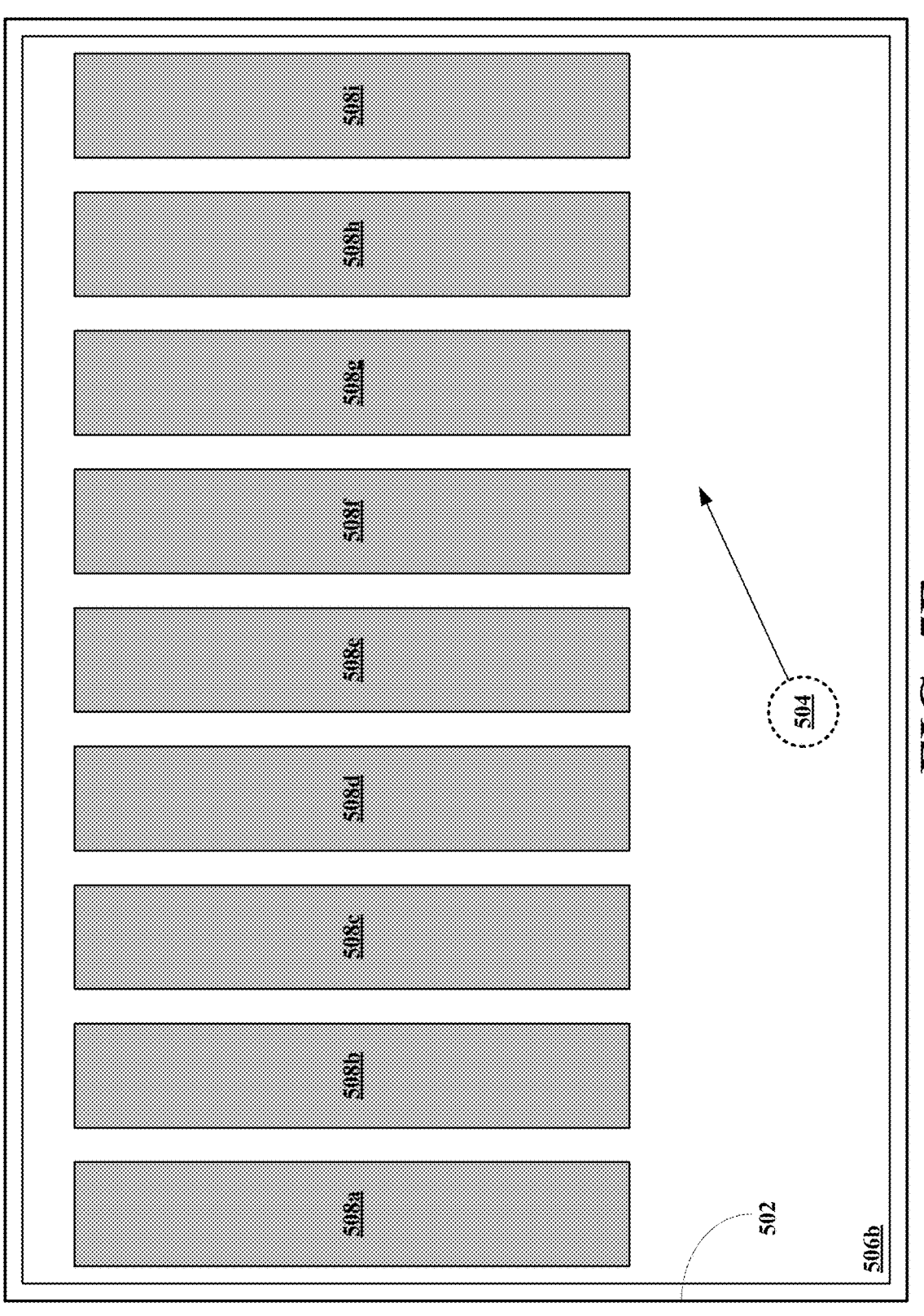
Figure 5G:
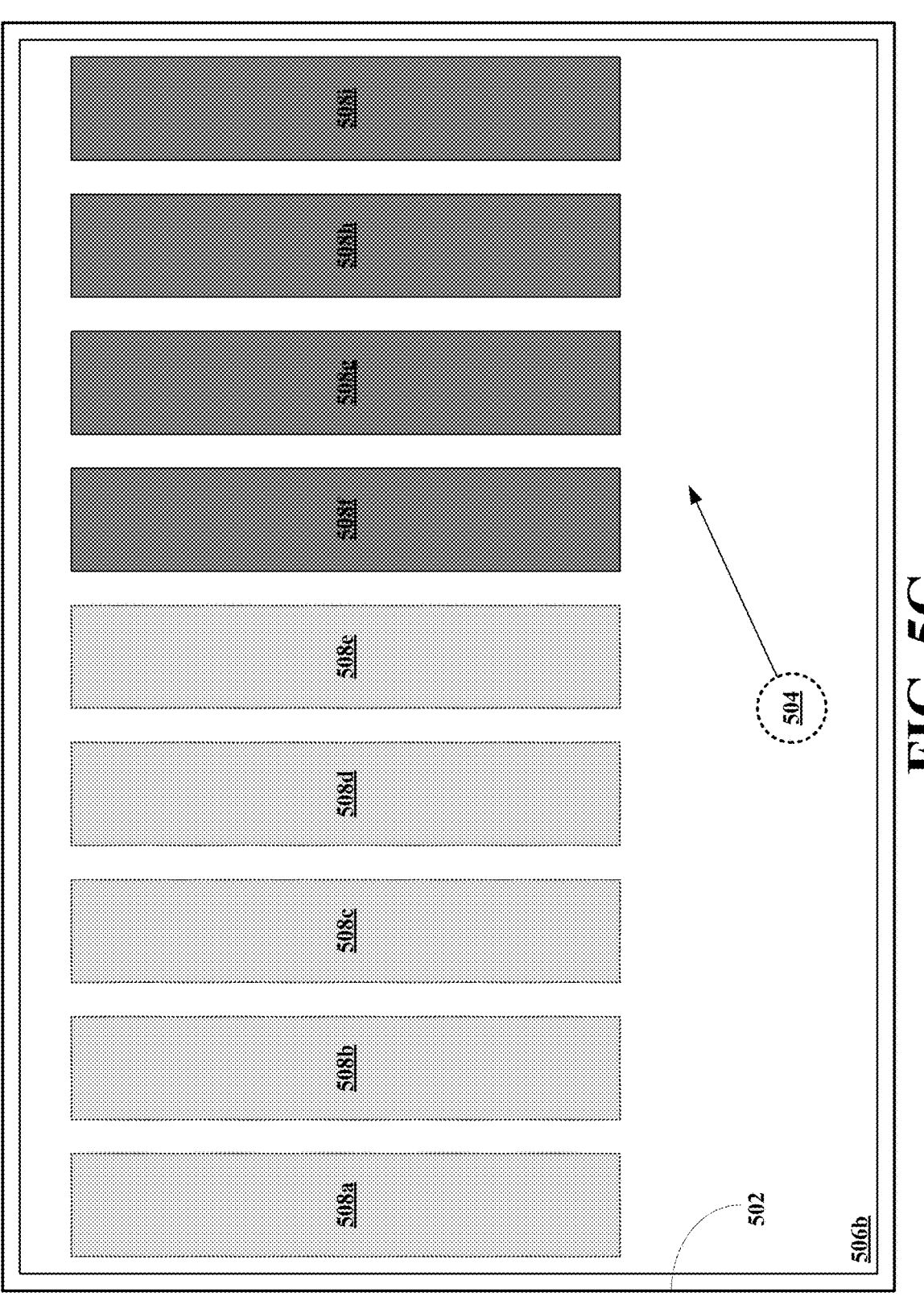
Figure 5H:
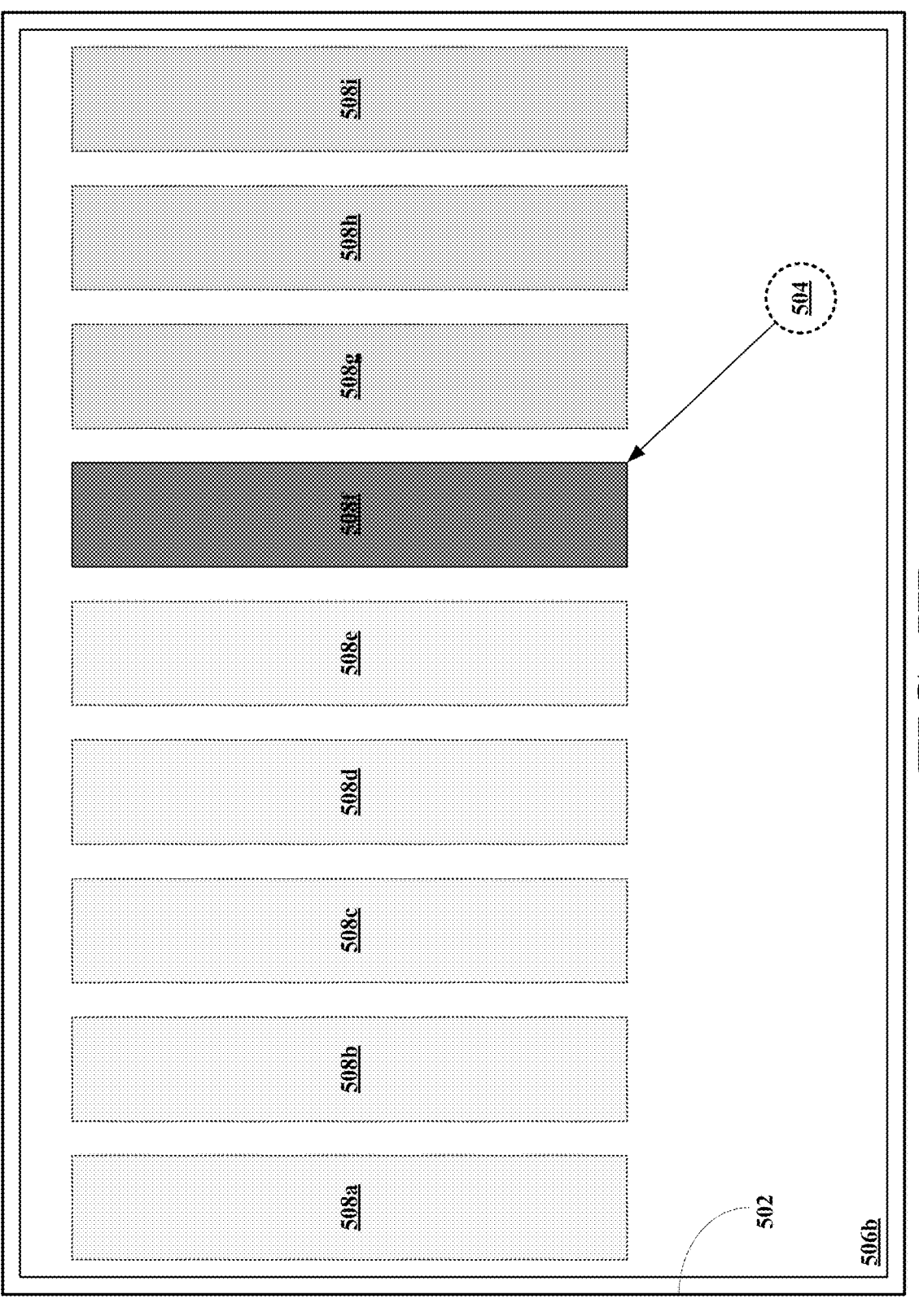
Figure 51:
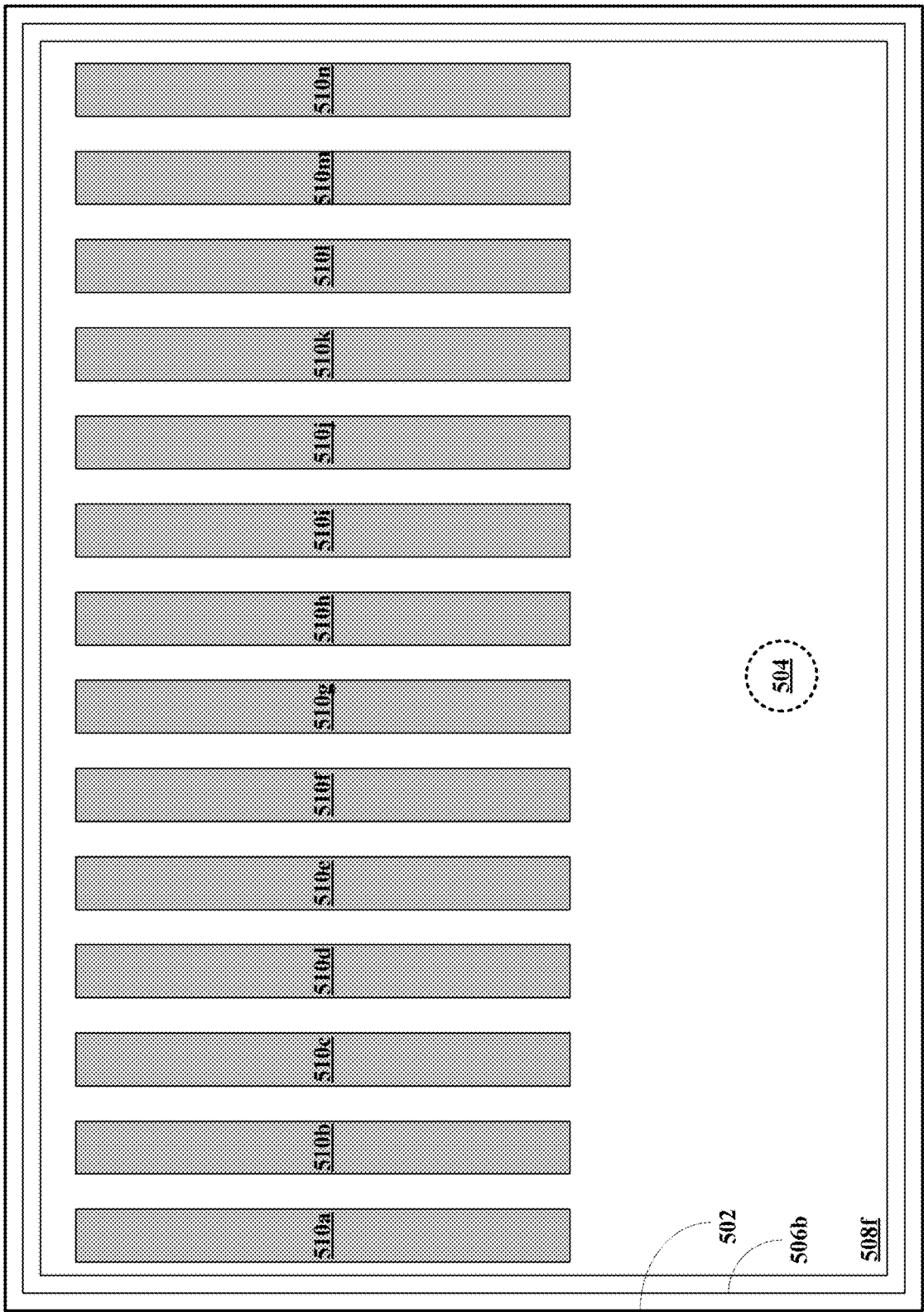

Looking at FIGS. 5F-H, once the interface has determined the target isle, here isle 506*b*, either by direct contact of the selection object 504 with the isle 506*b*, by a proximity contact of the selection object 504 with the isle 506*b*, by a predictive selection of the isle 506*b*, or by a threshold event triggered by the selection object 504 moving toward the isle 506*b*, the display 502 opens up to selectable objects associated with the isle 506*b* including subisles 508*a-i*. In this embodiment, the subisles 508*a-i* do not become visible until and selection of the isle 506*b* was made, however, in other embodiments, as the selection of isle 506*b* becomes more certain and the other isles reduce and fade away, the display 502 may start displaying the subisles 508*a-i* or several layers of subisles (or subobjects or submenus) simultaneously, permitting movement to begin to discriminate between the subisles 508*a-i*. Movement to the right of the display 502 causes subisles 508*f-i* to be highlighted (darkened in this case), but not to move toward the selection object 504 or become enlarged, while subisles 508*a-e* to be dotted and faded instead of moving away from the selection object 504 and fading. Additional movement permits discrimination of 508*f* to be selected as evidence by the continued darkening of 508*f* and the continued fading of 508*a-e* and the start of fading 508*g-i*. In certain embodiments, no gravitational effect is implemented.

Figure 5J:
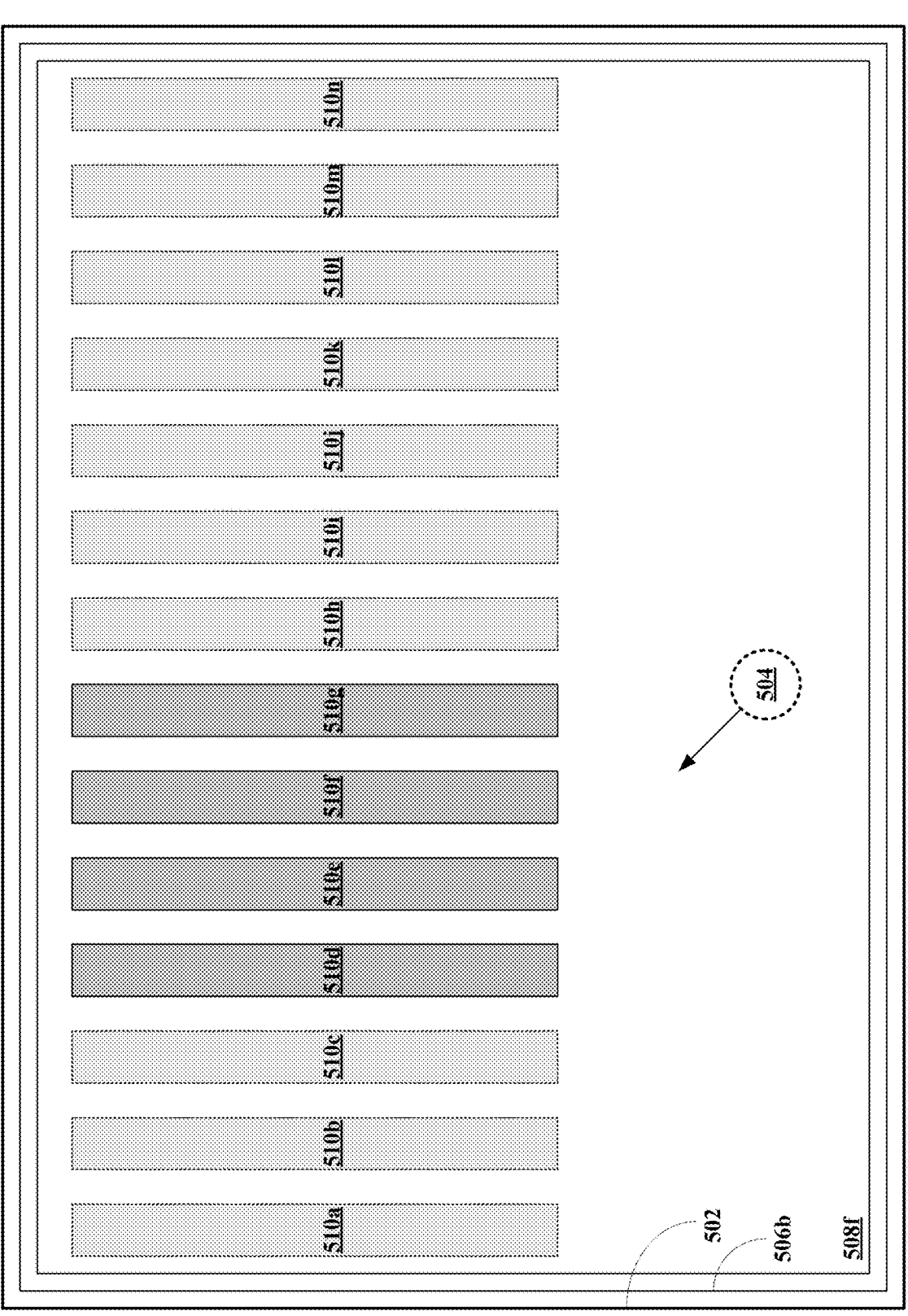
Figure 5K:
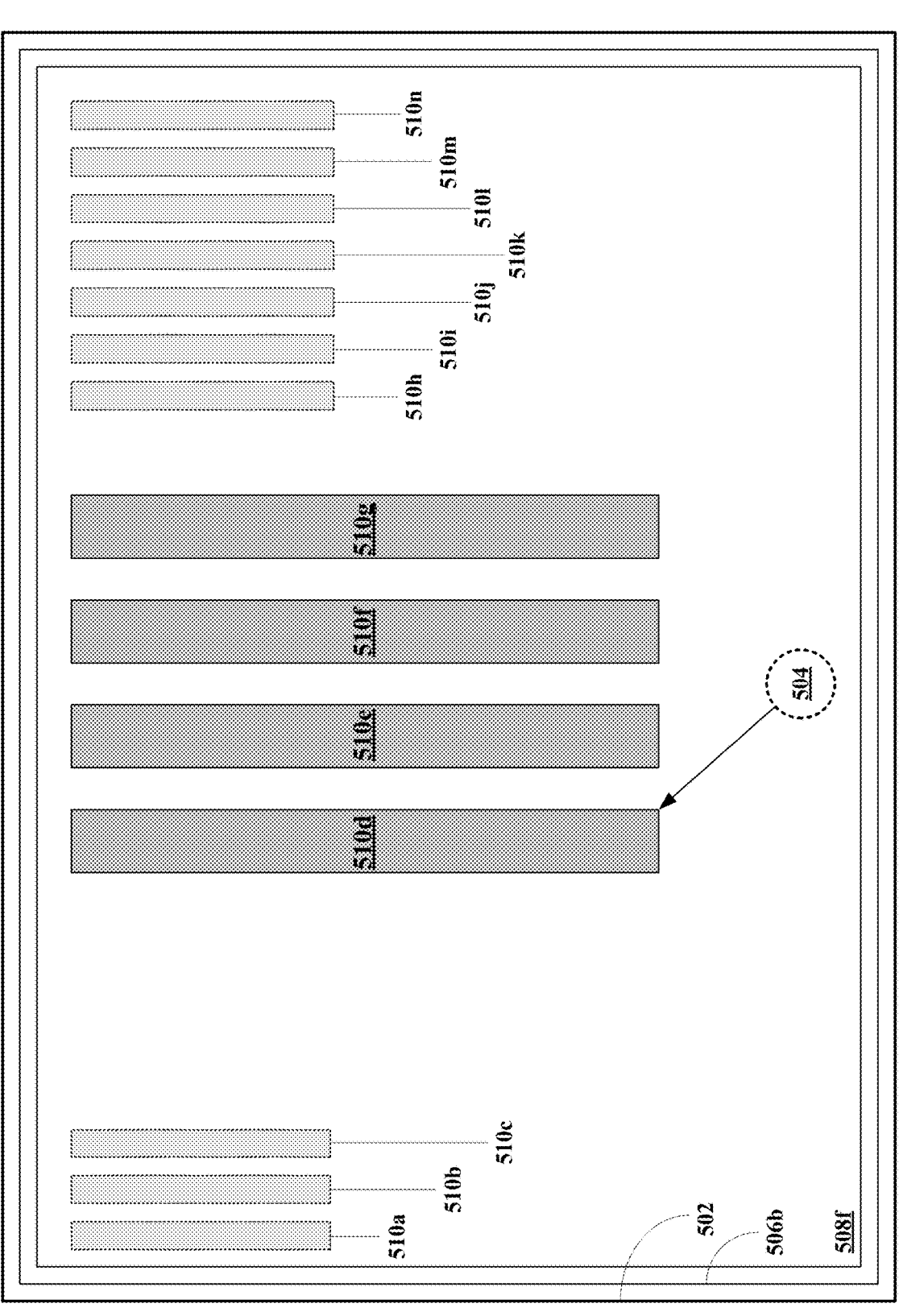
Figure 5L:
Figure 5M:
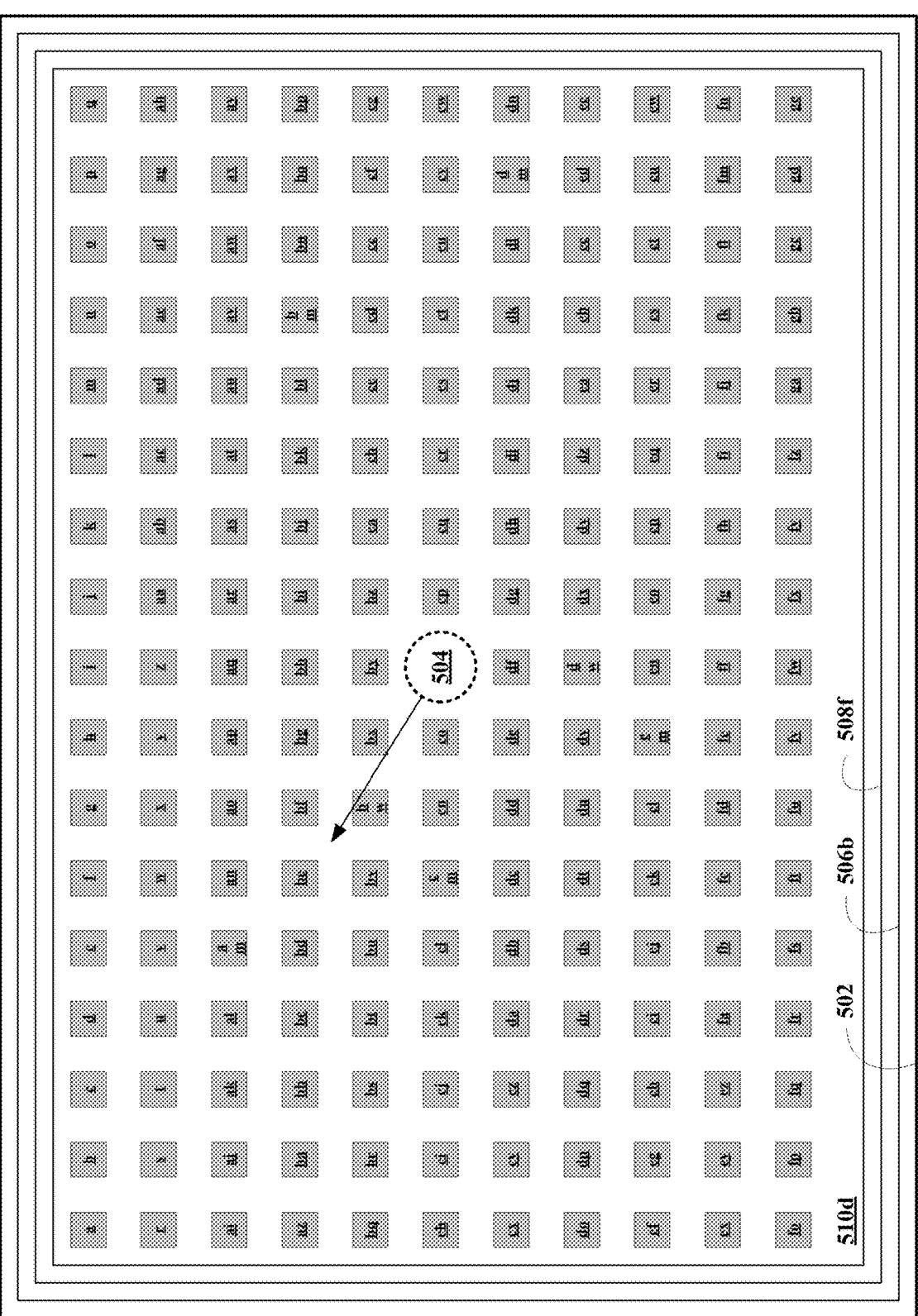
Figure 5N:
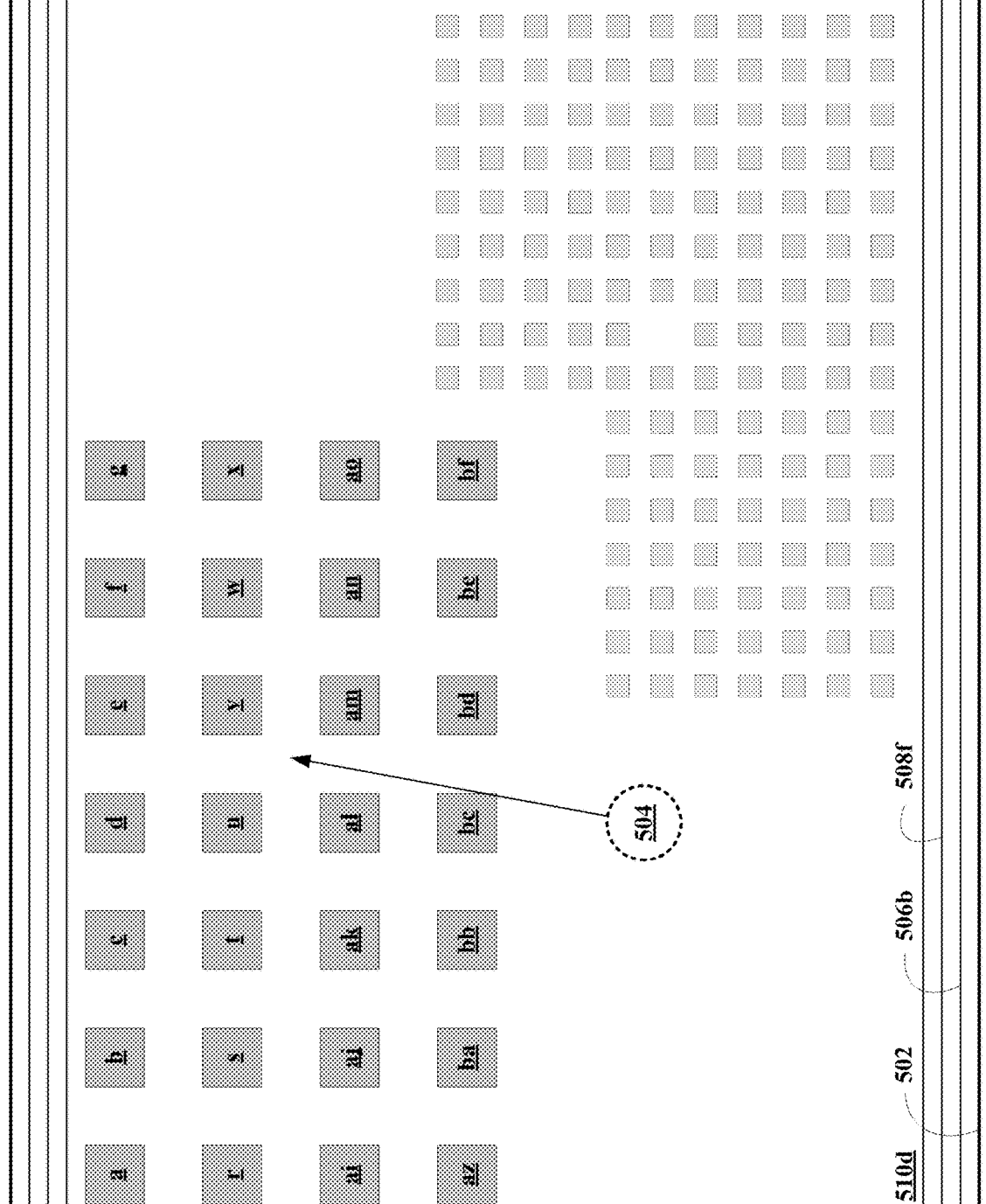
Figure 50:
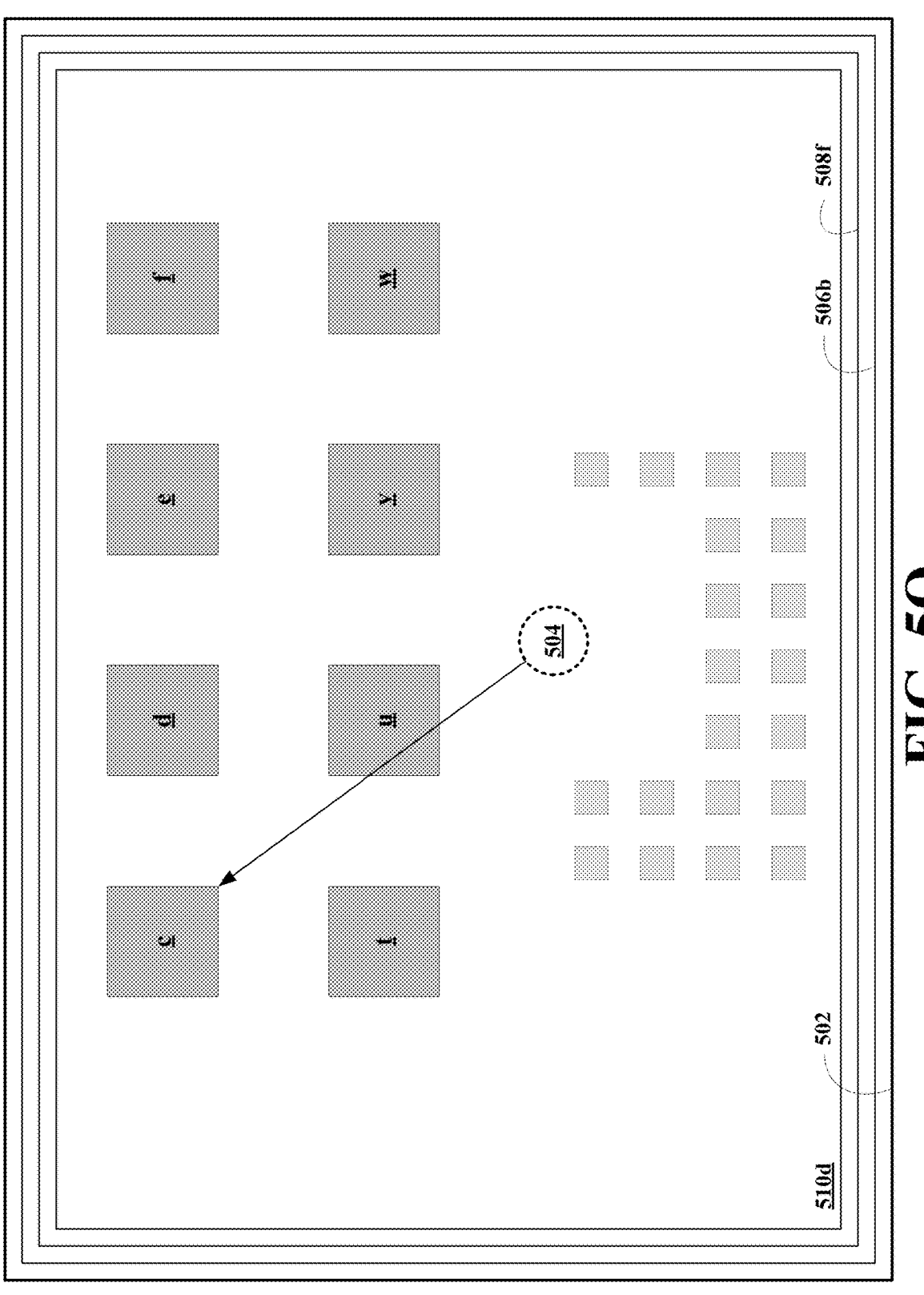

Looking at FIGS. 5I-K, once the interface has determined the target isle, here subisle 508*f*, either by direct contact of the selection object 504 with the subisle 508*f*, by a proximity contact of the selection object 504 with the subisle 508*f*, by a predictive selection of the subisle 508*f*, or by a threshold event triggered by the selection object 504 moving toward the subisle 508*f*, the display 502 opens up to selectable objects associated with the isle 508*f* including subsubisles 510*a-n*. In this embodiment, the subsubisles 510*a-n* do not become visible until the selection of the subisle 508*f* was made, however, in other embodiments, as the selection of subisle 508*f* becomes more certain and the other subisles reduce and fade away, the display 502 may start displaying the subsubisles 510*a-n* permitting movement to begin to discriminate between the subsubisles 510*a-n*. Movement to the left of the display 502 causes subsubisles 510*d-g* to be highlighted (darkened in this case), but not to move toward the selection object 504 or become enlarged, while subsubisles 510*a-c* and 510*h-n* to be dotted and faded instead of moving away from the selection object 504 and fading. Additional movement causes the subsubisles 510*d-g* to be enlarge and move toward the selection object 504, while the subsubisles 510*a-c* and 510*h-n* move away from the selection object 504 and fade. The additional movement also permits discrimination and selection of subsubisle 510*d*.

Figure 5P:
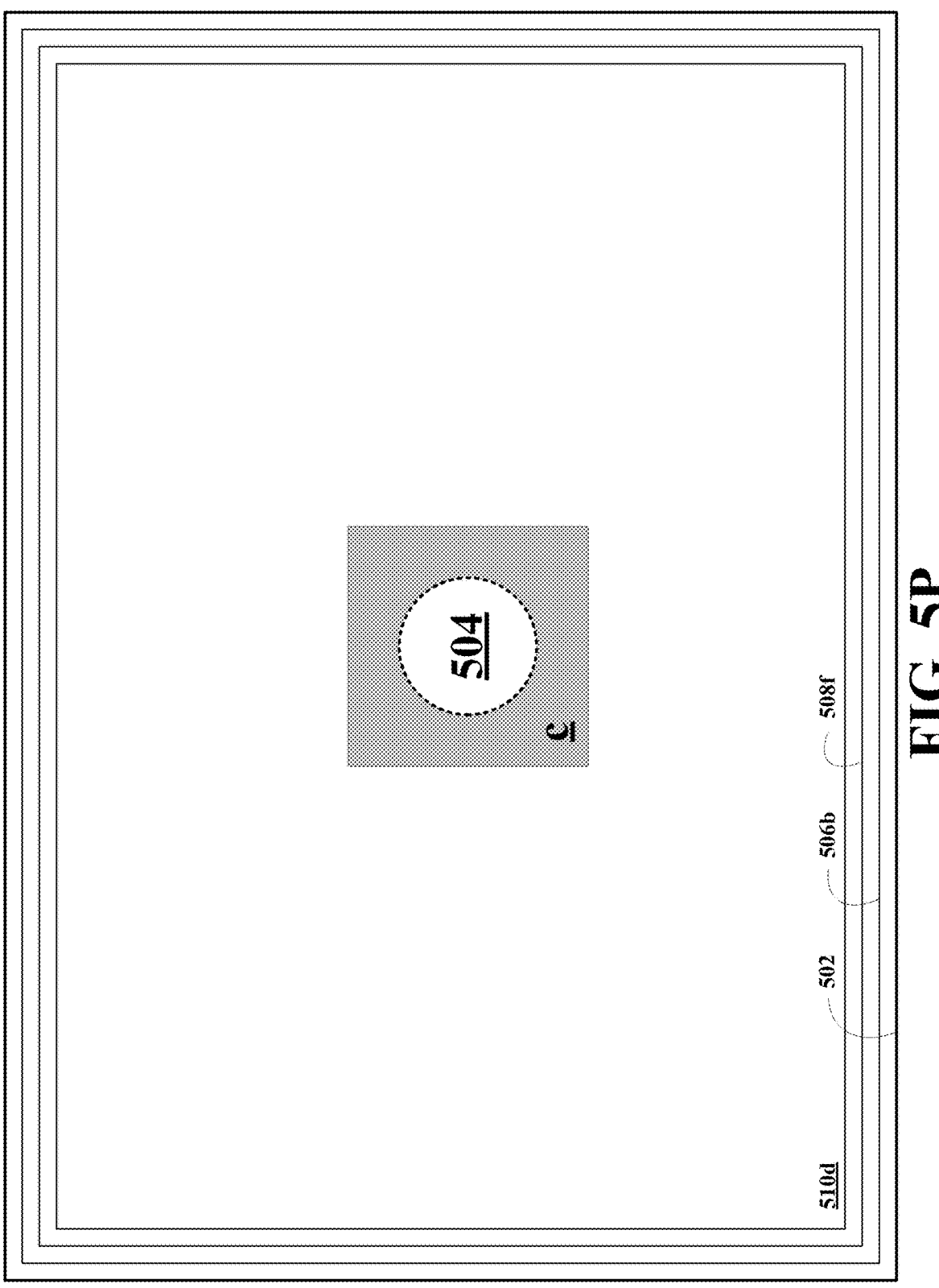

Looking at FIGS. 5L-P, once the interface has determined by the movement, either by direct contact of the selection object 504 with the subsubisle 510*d*, proximity contact of the selection object 504 with the subsubisle 510*d*, or predictive selection of the isle 510*d*, the display 502 opens up to selectable objects associated with the subsubisle 510*d* including items a-ge. In this embodiment, the items a-ge do not become visible until and selection of the subsubisle 510*d* was made, however, in other embodiments, as the selection of subsubisle 510*d* becomes more certain and the other subisles reduce and fade away, the display 502 may start displaying the items a-ge permitting movement to begin to discriminate between the items a-ge. As seen in FIGS. 5M-P, the items a-ge are distributed on a standard grid pattern around the selection object 504. Of course, the items a-ge may be distributed in any pattern in the display 502 such as circularly or arcuately distributed about the selection object 504. Movement to the left of the display 502 causes items a-g, r-x, ai-ao, and az-bf to be highlighted (darkened in this case), enlarged and pulled towards the selection object 504, while the items h-q, y-ah, ap-ay, bg-bp, and bq-ge recede from the selection object 504 are reduced in size and faded. Additional movement permits discrimination of the items a-g, r-x, ai-ao, and az-bf, where the additional movement refines the potential selection to items c-f and t-w. The next movement permits selection of item c, which results in the selection object 504 and the item c merged in the center of the display 502. As is shown in FIGS. 5A-P, each level of selection superimposes onto the display 502, the selection made.

The methodology depicted in FIGS. 5A-P is amenable to use in any setting, where the interface is part of applications associated with stores such as grocery stores, retails stores, libraries, or any other facility that includes large amounts of items or objects cataloged into categories. The applications using the interface is implemented simply by allowing movement to be used to peruse, shop, select, or otherwise select items for purchase or use. The applications may also be associated with computer systems running large number of software programs and large number of databases so that movement only will permit selection and activation of the software programs, selection and activation of databases, and/or the extraction and analysis of data within the databases, and may also be applicable to environmental systems, such as mechanical, electrical, plumbing, oil and gas systems, security systems, gaming systems and any other environment where choices are present.

In an array of objects, say a mobile smart phone, touching directly and lifting off opens the app currently (old technology and not ours), but by touching directly (in a specified way such as a "hold") on an object could cause the surrounding objects to move away and make room for the choices related to that object to appear (radially, arcuately, or in another fashion) with such menu items as "move" and "open", submenus or subobjects to be activated, or to directly control variable attributes, or scroll, etc-whatever is associated with that item. Touching in an area, but not directly on an object, or touching and beginning to move immediately, would invoke the selection process described so well above. In this way, multiple ways of accessing the same information, objects or attributes may be provided to the user.

Moreover, the software may be implemented to use any, some, or all of the above described methods, aspects, techniques, etc. In fact, the interface may be user tailored so that certain selection format used a specific aspect or a set of specific aspects of the invention, while other selections use other aspects or a set of other aspects. Thus, the interface may be tuned to by the user. Additionally, the interface may be equipped with learning algorithms that permit the interface to tune itself to the user's preferred movement and selection modality so that the interface becomes attuned to the user permitting improved selection prediction, improved user conformation, improved user functionality and improved user specific functionality.

Telephone Number Selecting

Figure 6A:
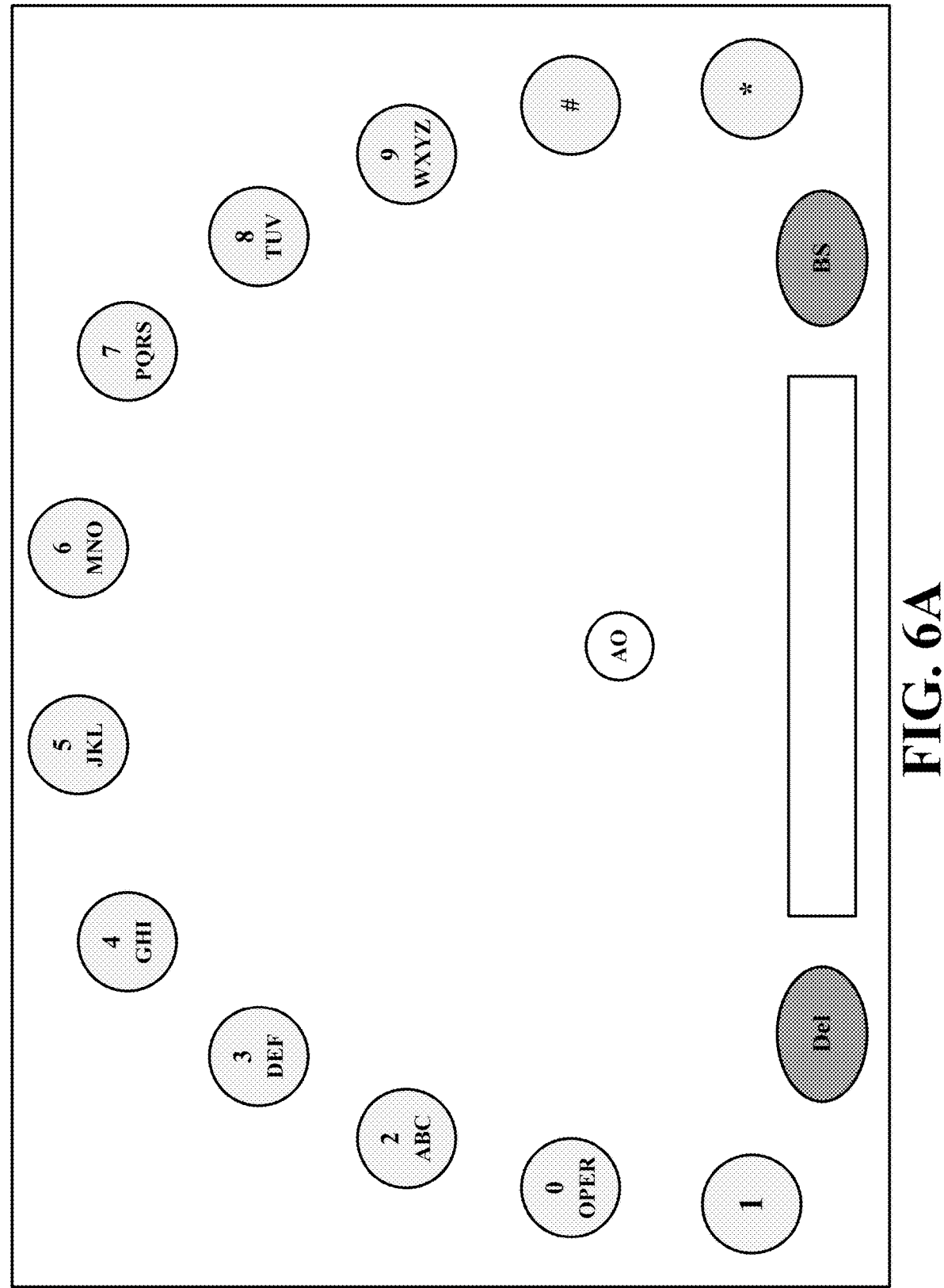
FIG. 6A depict a display prior to activation by motion of a motion sensor in communication with the display including an active object, a set of phone number objects, a backspace object (BS) and a delete object (Del) and a phone number display object.
Figure 6B:
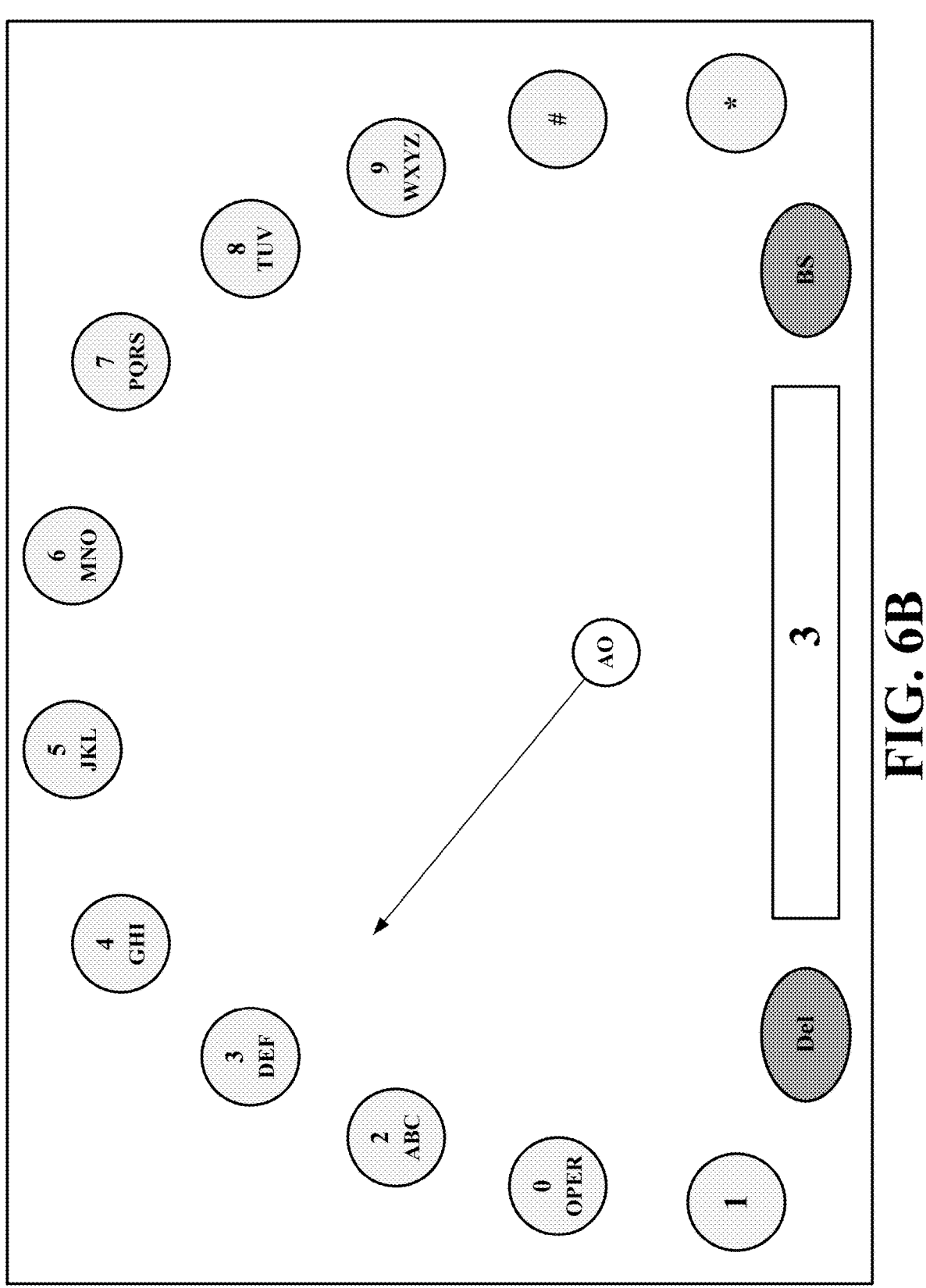
Figure 6C:
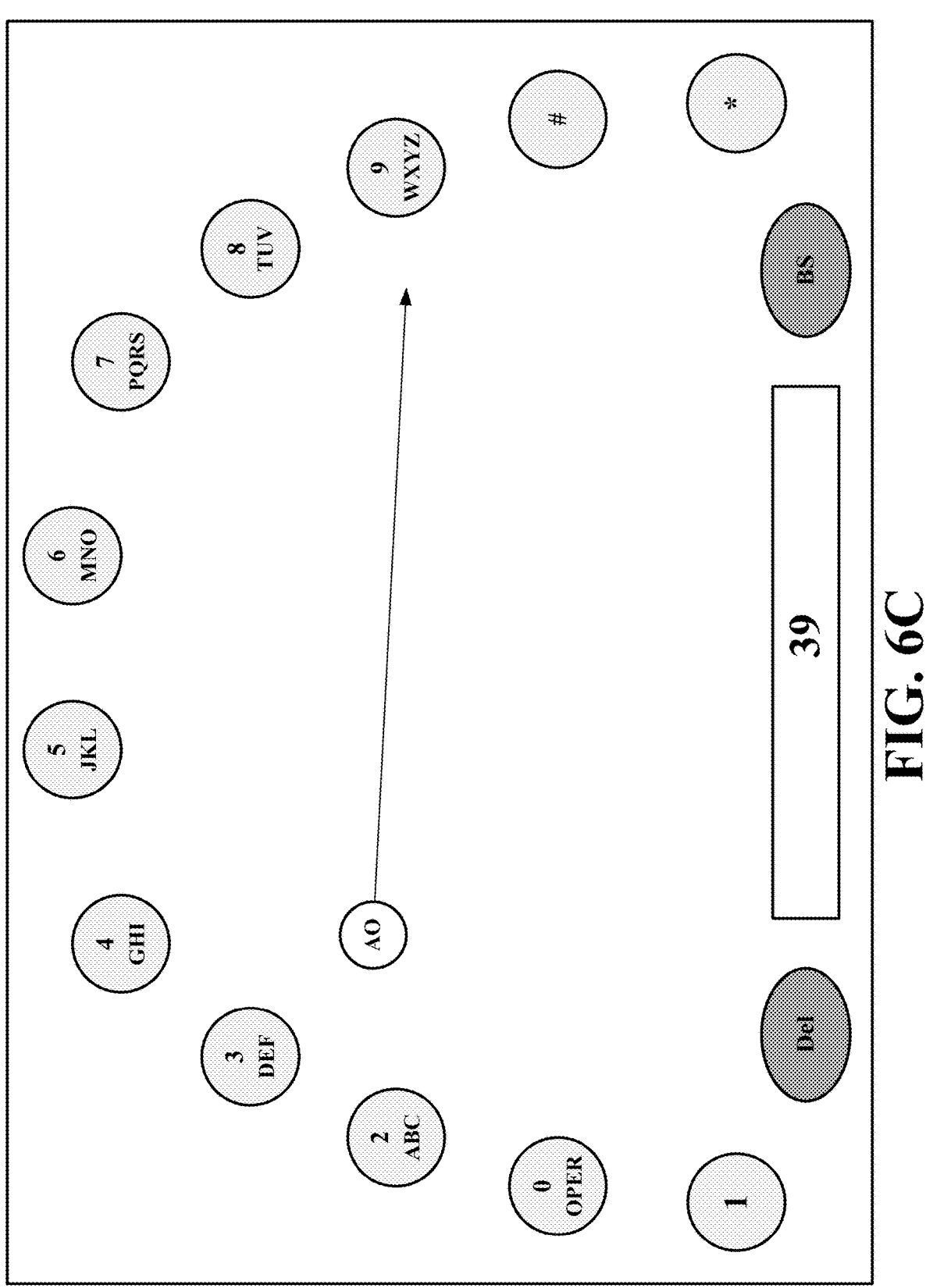
Figure 6D:
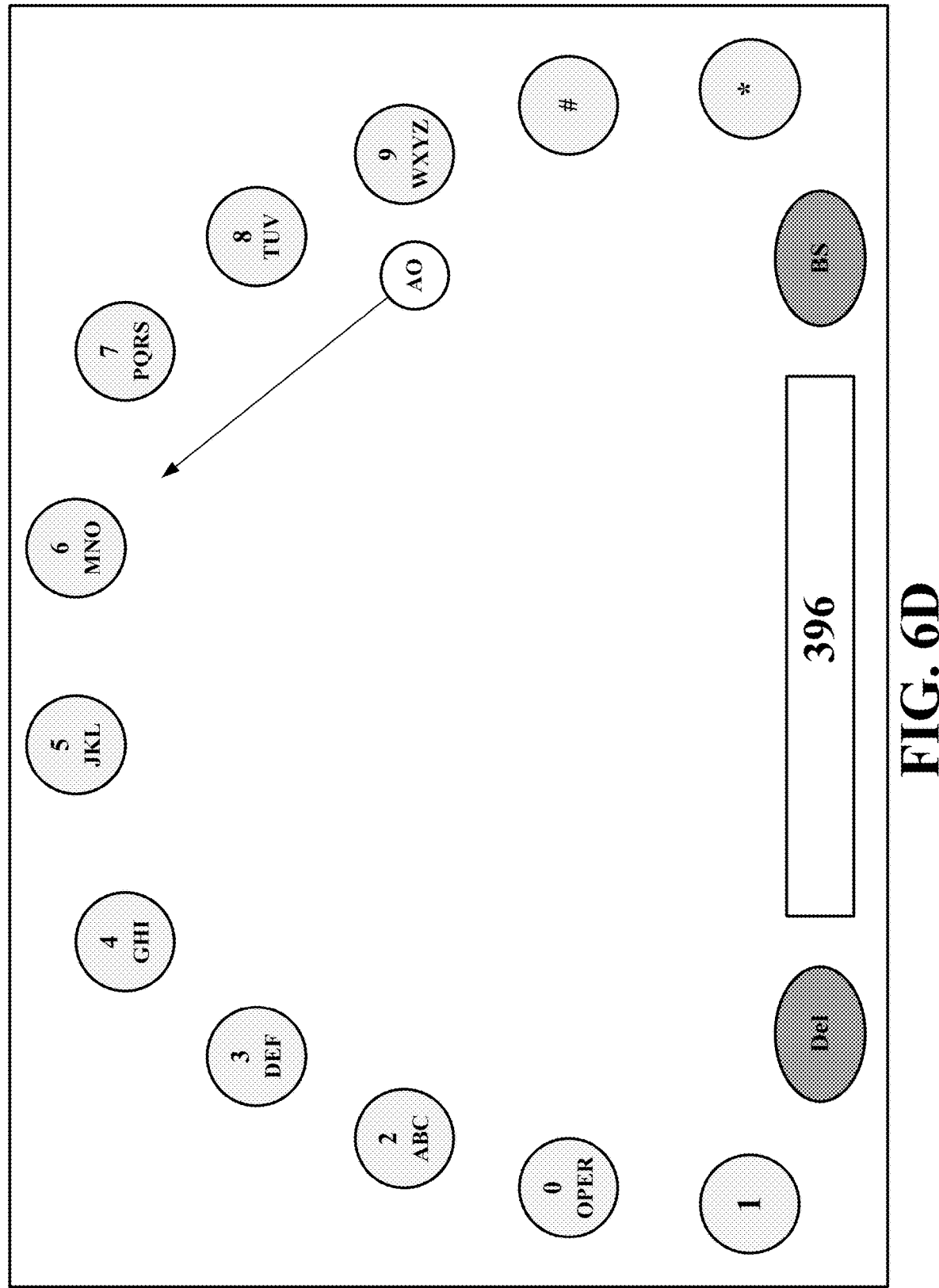
Figure 6E:
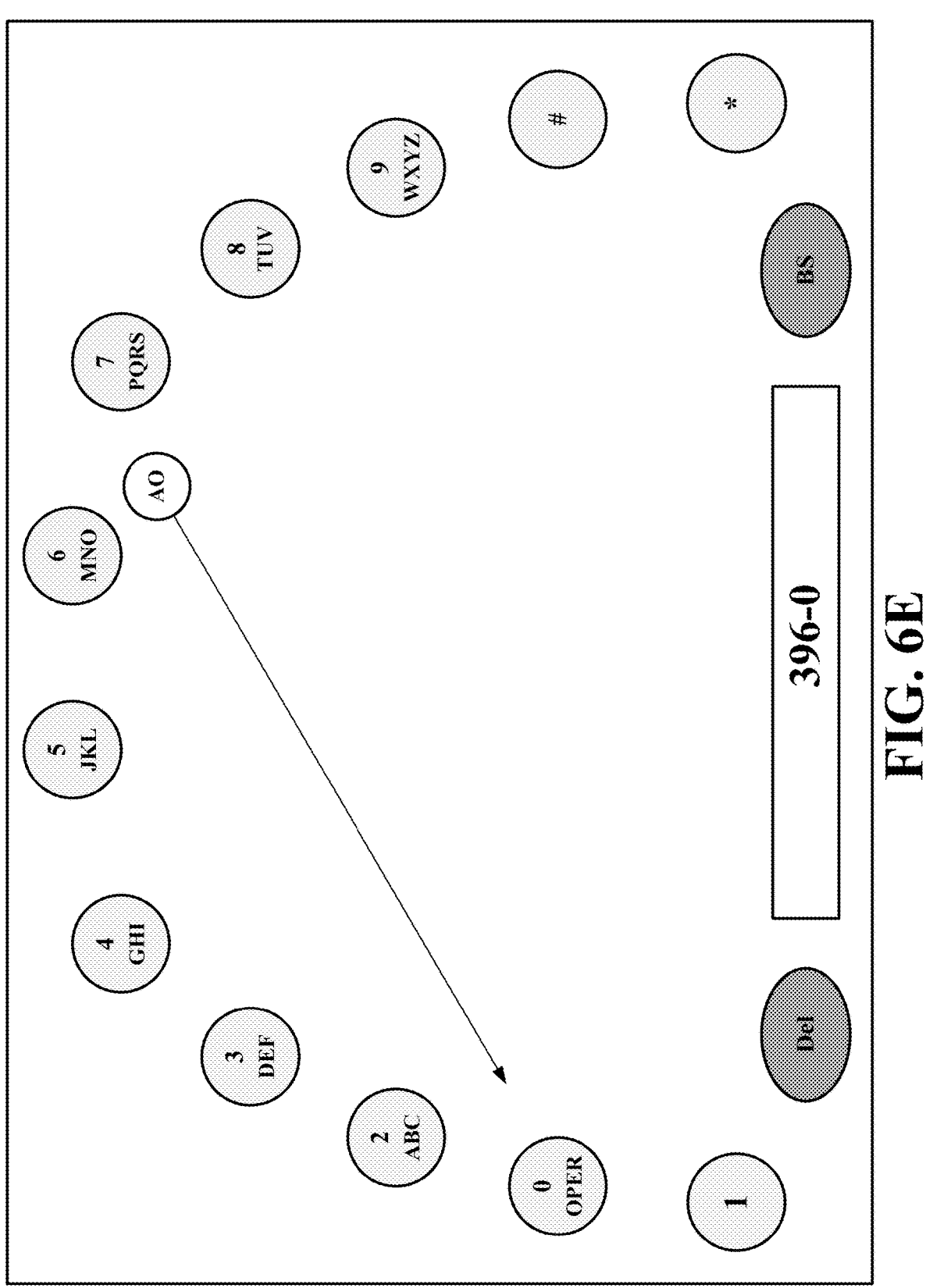
Figure 6F:
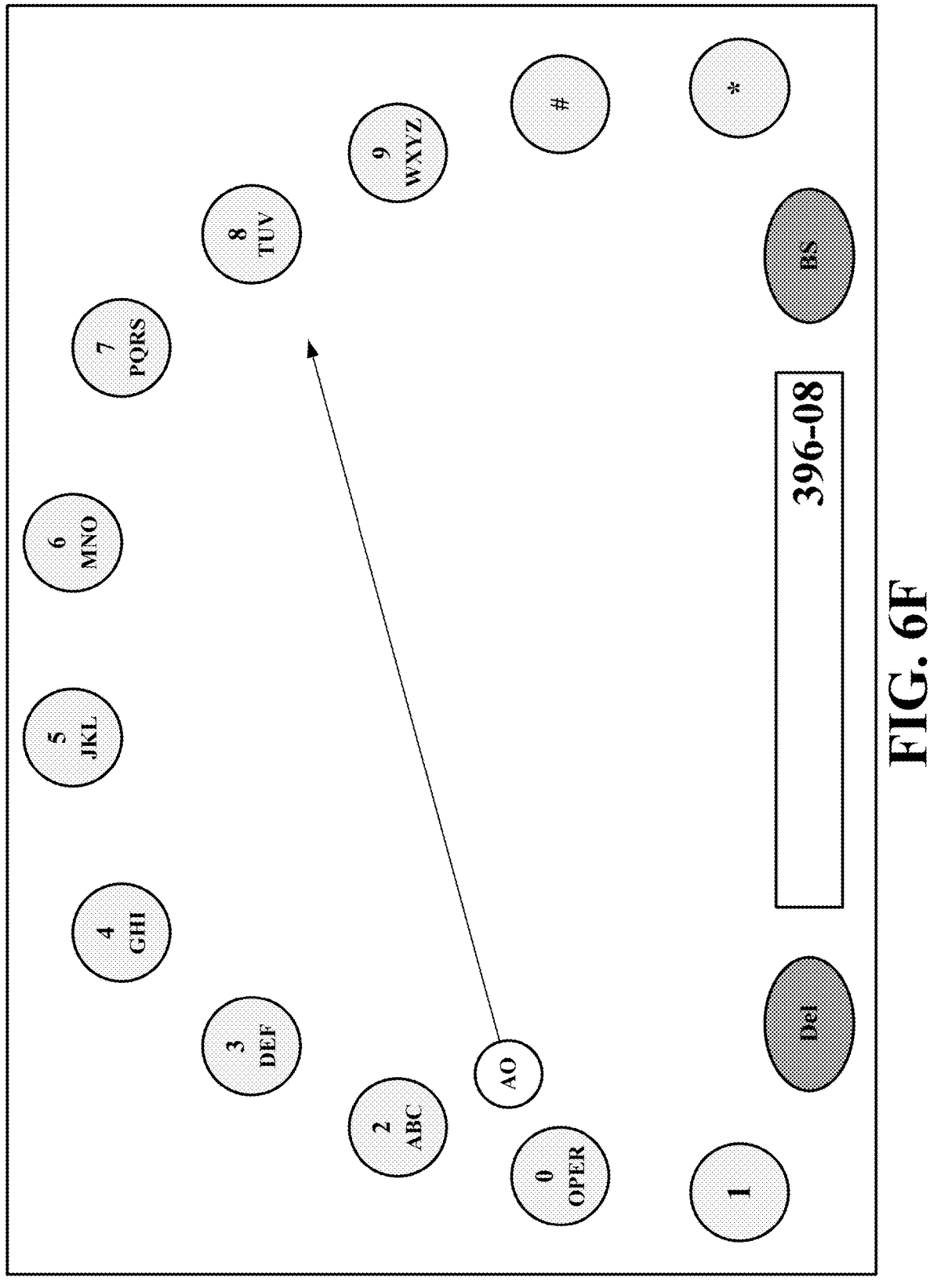
Figure 6G:
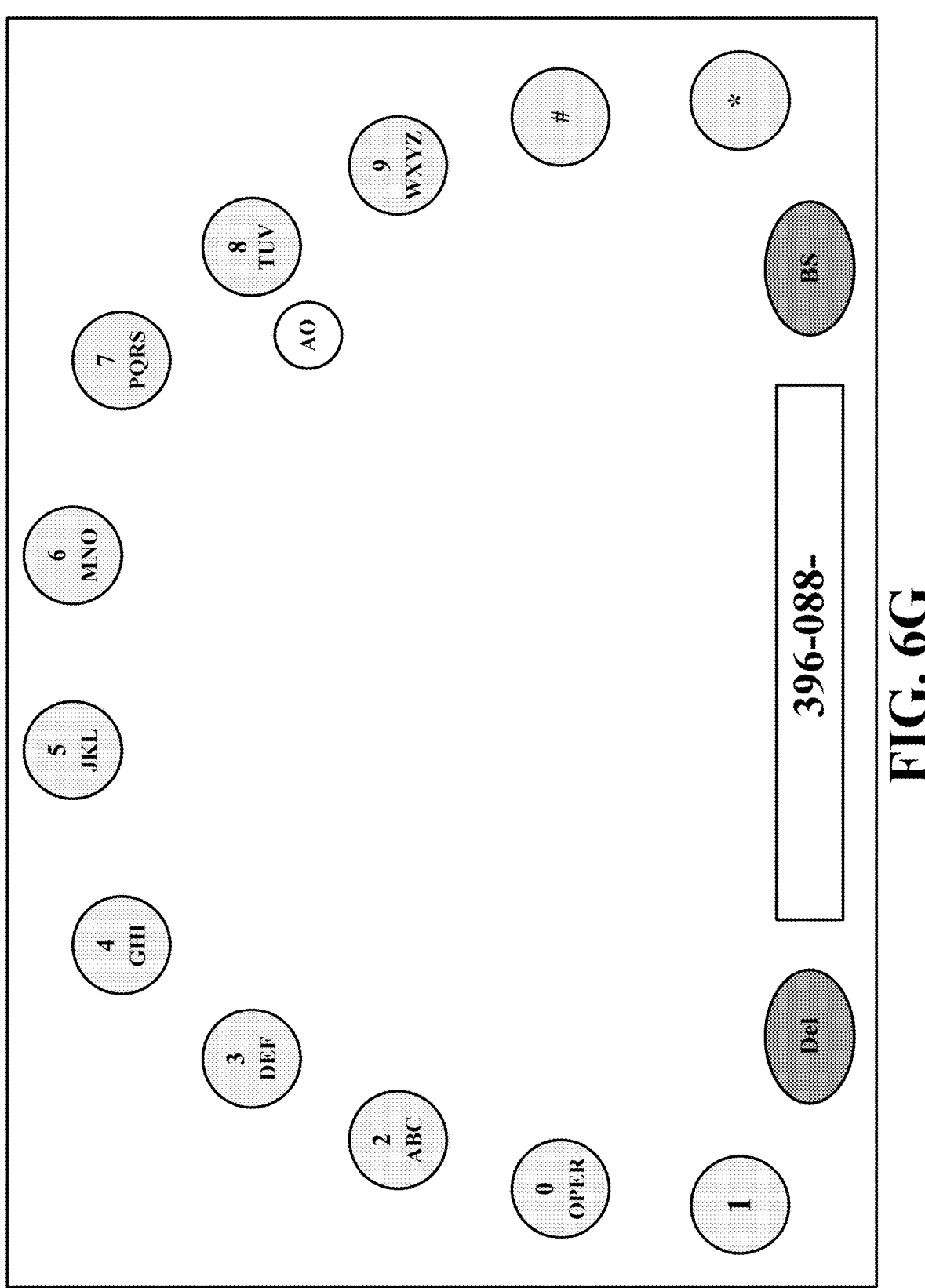

Referring now to FIG. 6A, a display is shown prior to activation by motion of a motion sensor in communication with the display. The display includes an active object AO, a set of phone number objects 0-9, * and #, a backspace object BS and a delete object Del and a phone number display object.

Figure 6H:
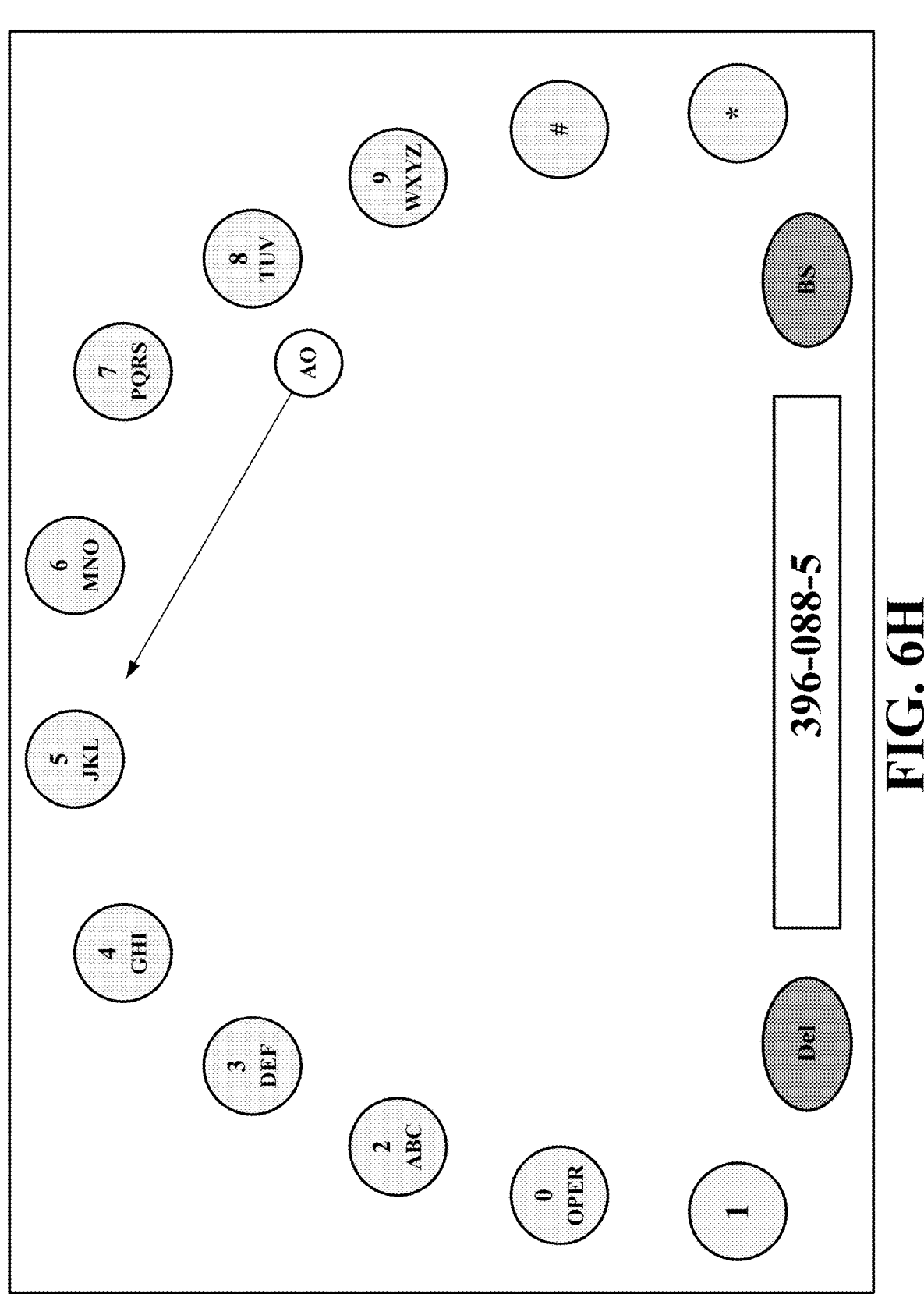
Figure 61:
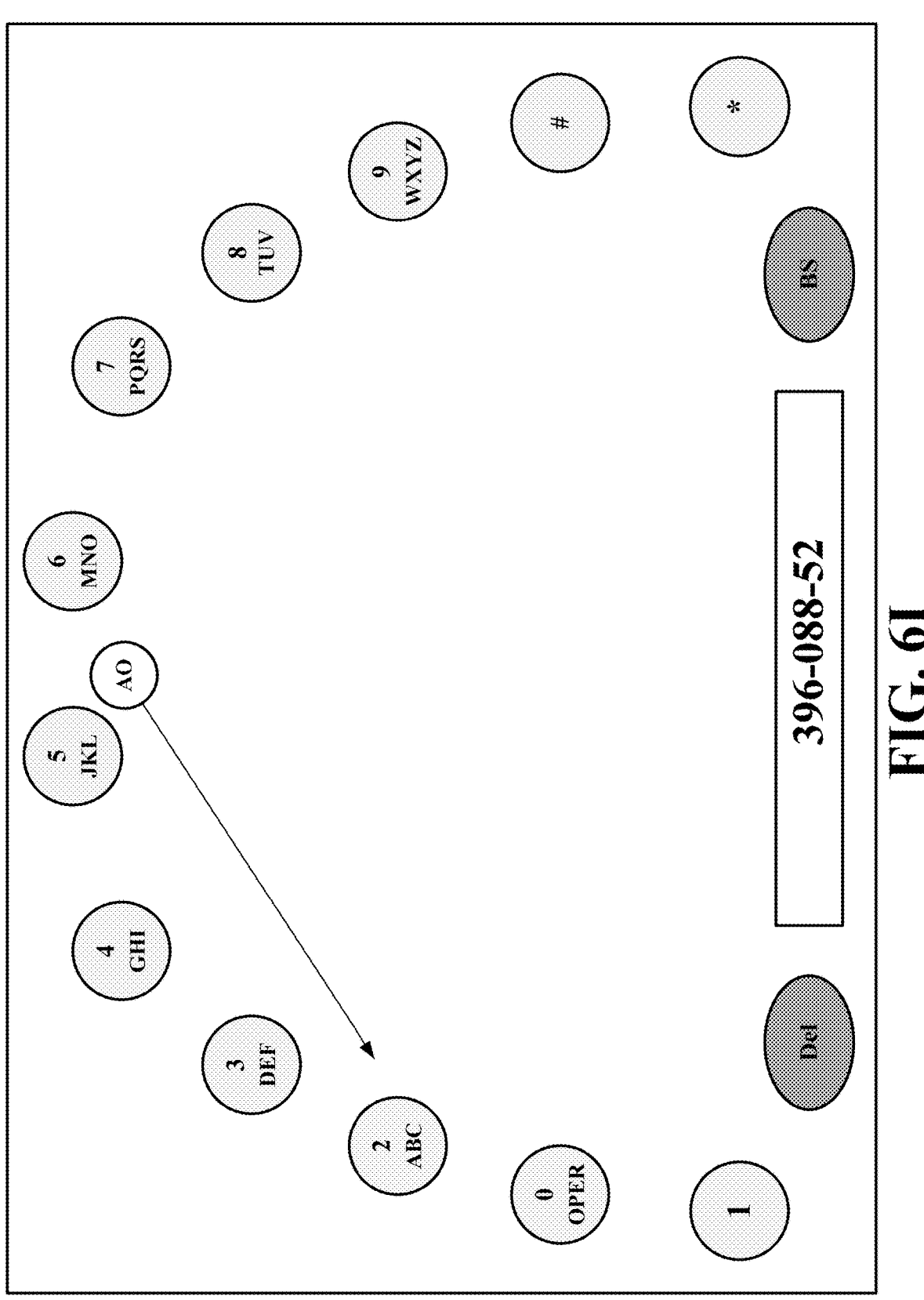
Figure 6J:
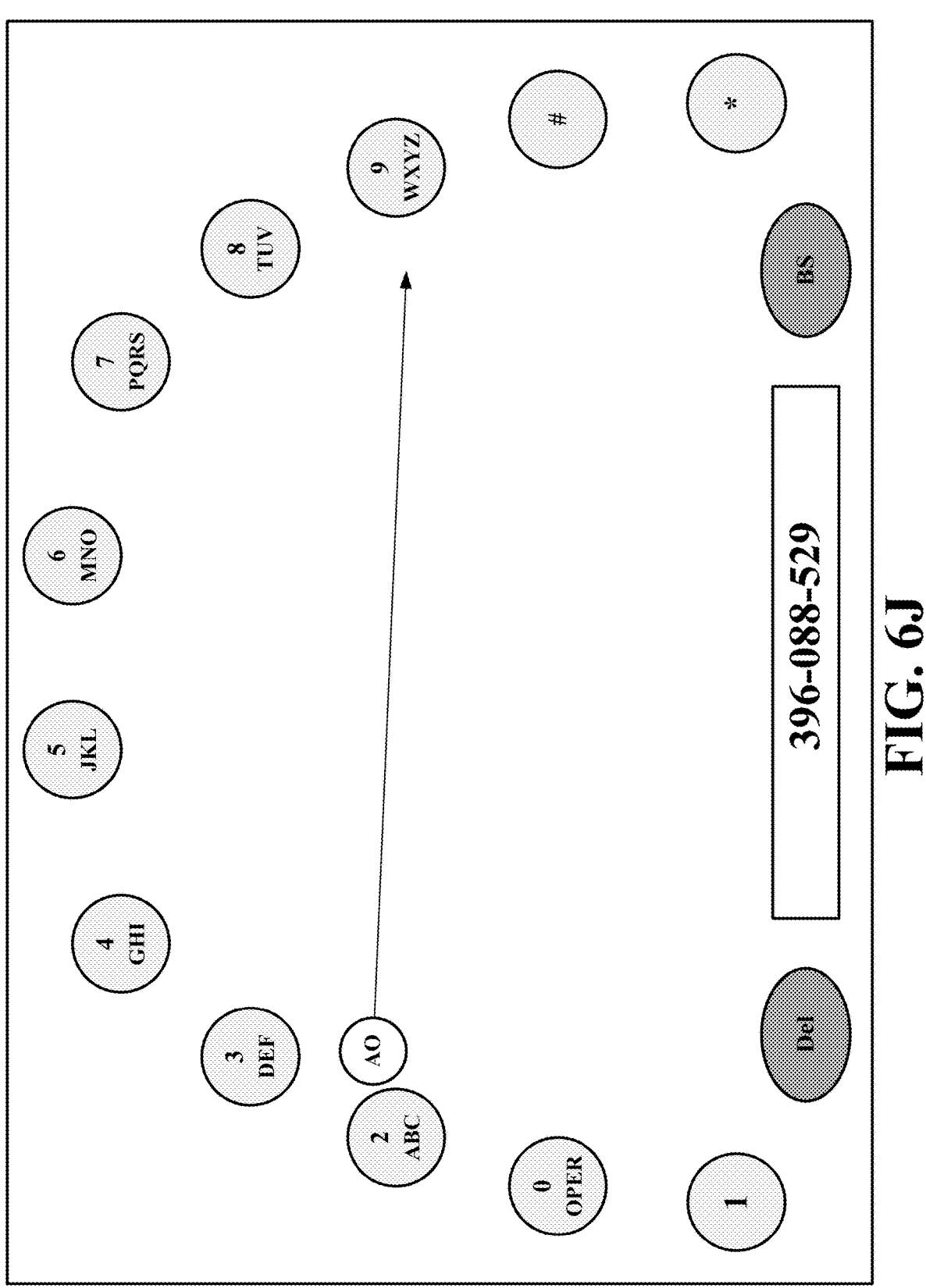
Figure 6K:
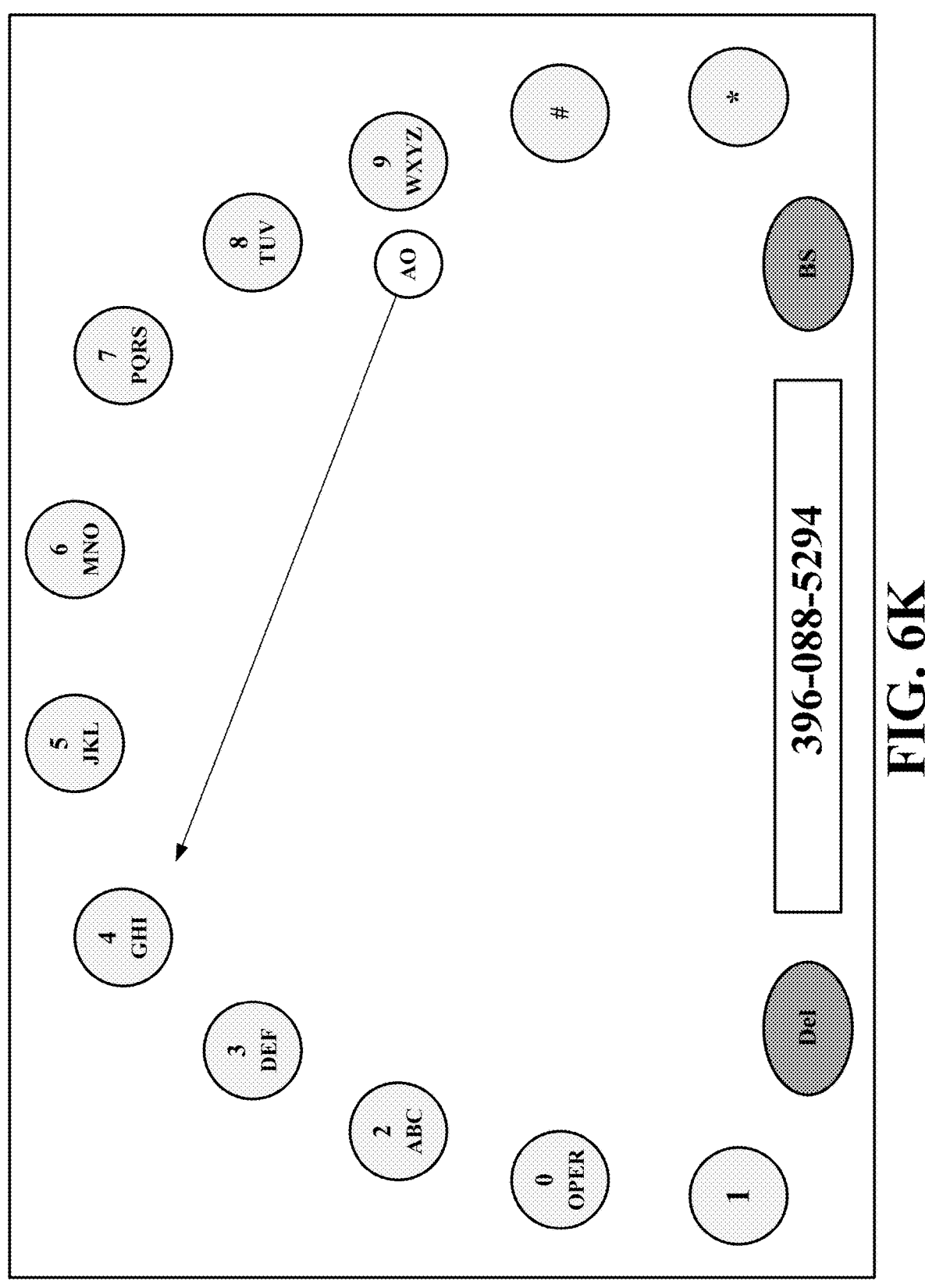
Figure 6L:
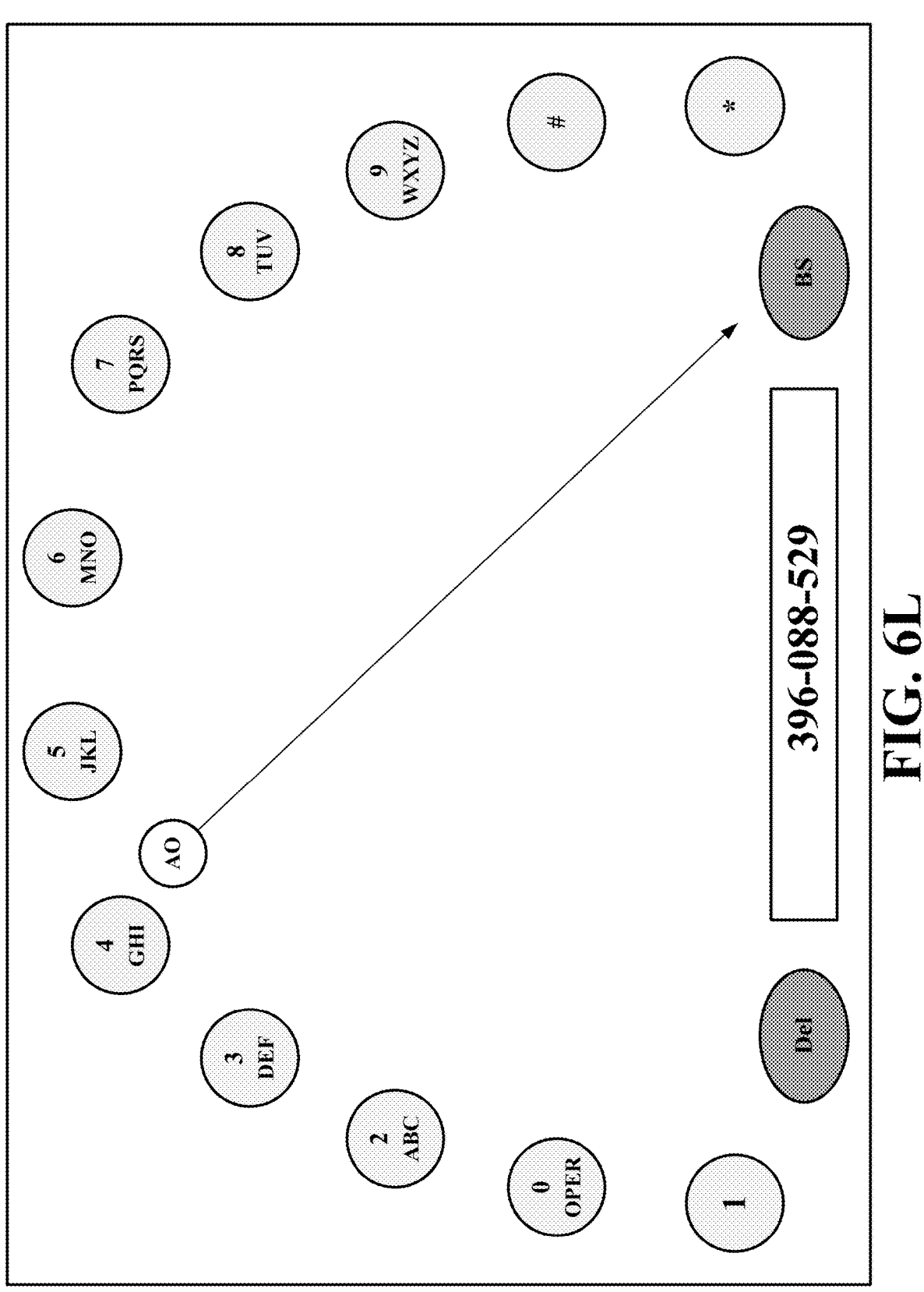
Figure 6M:
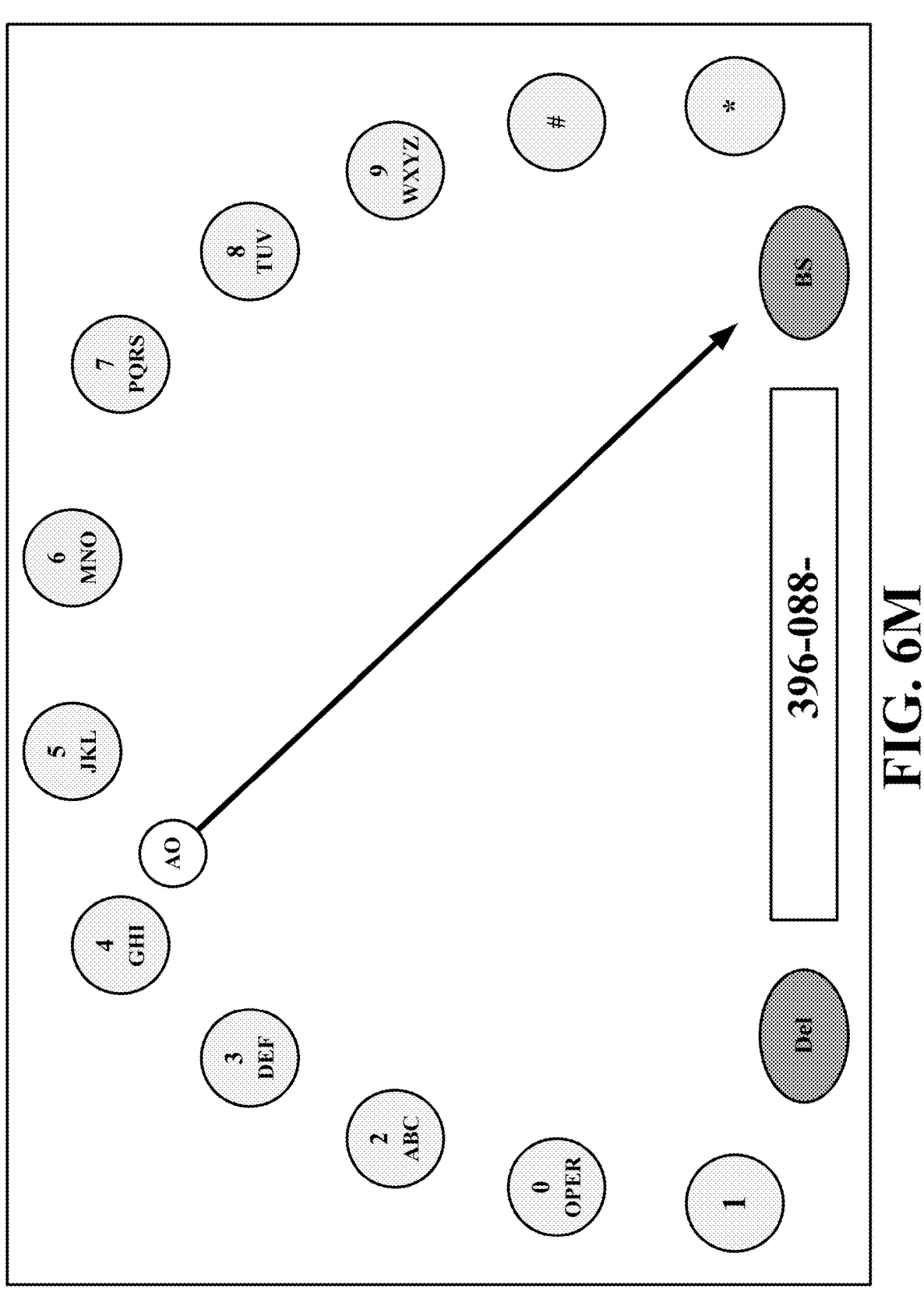
Figure 6N:
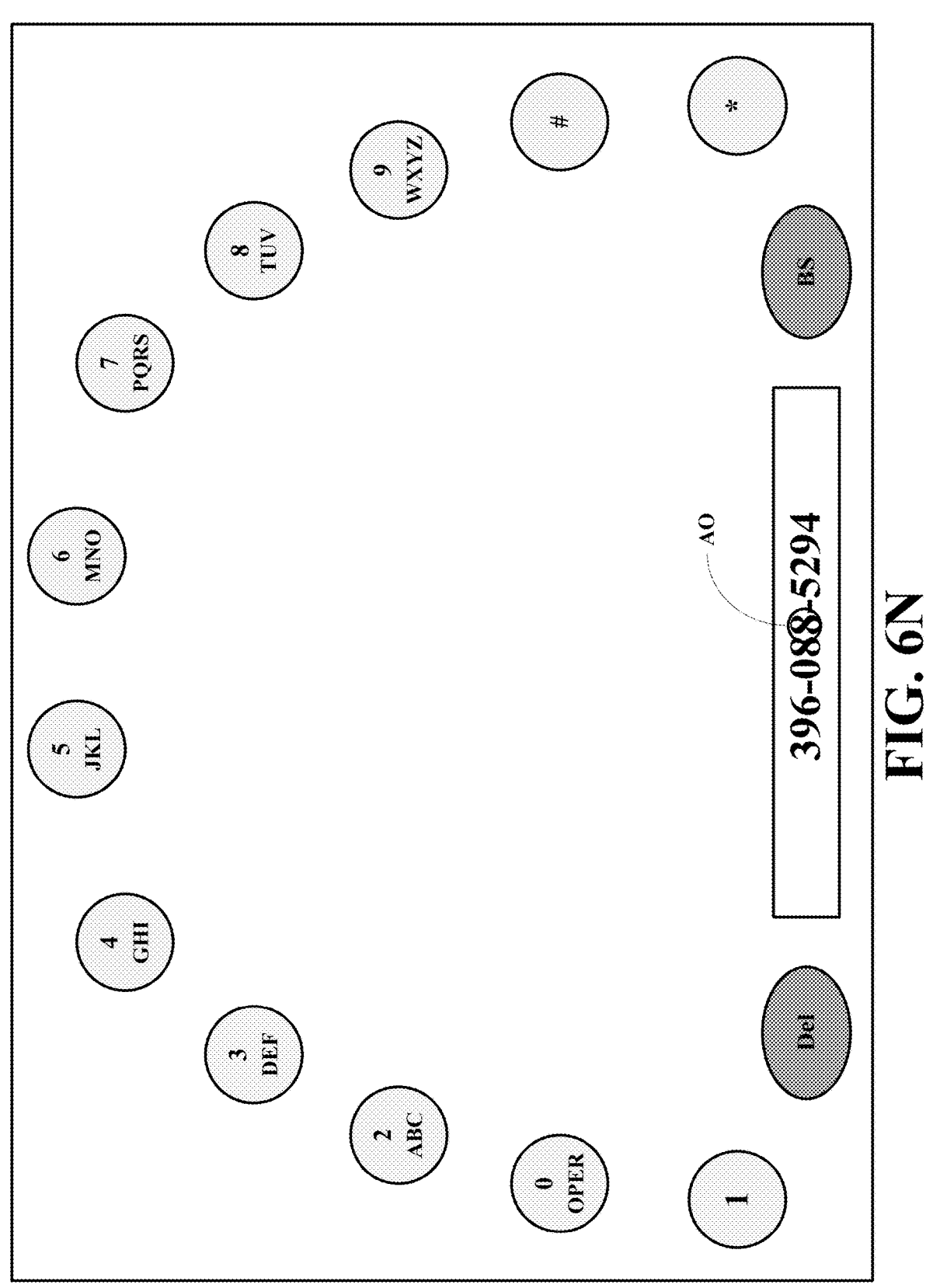
Figure 60:
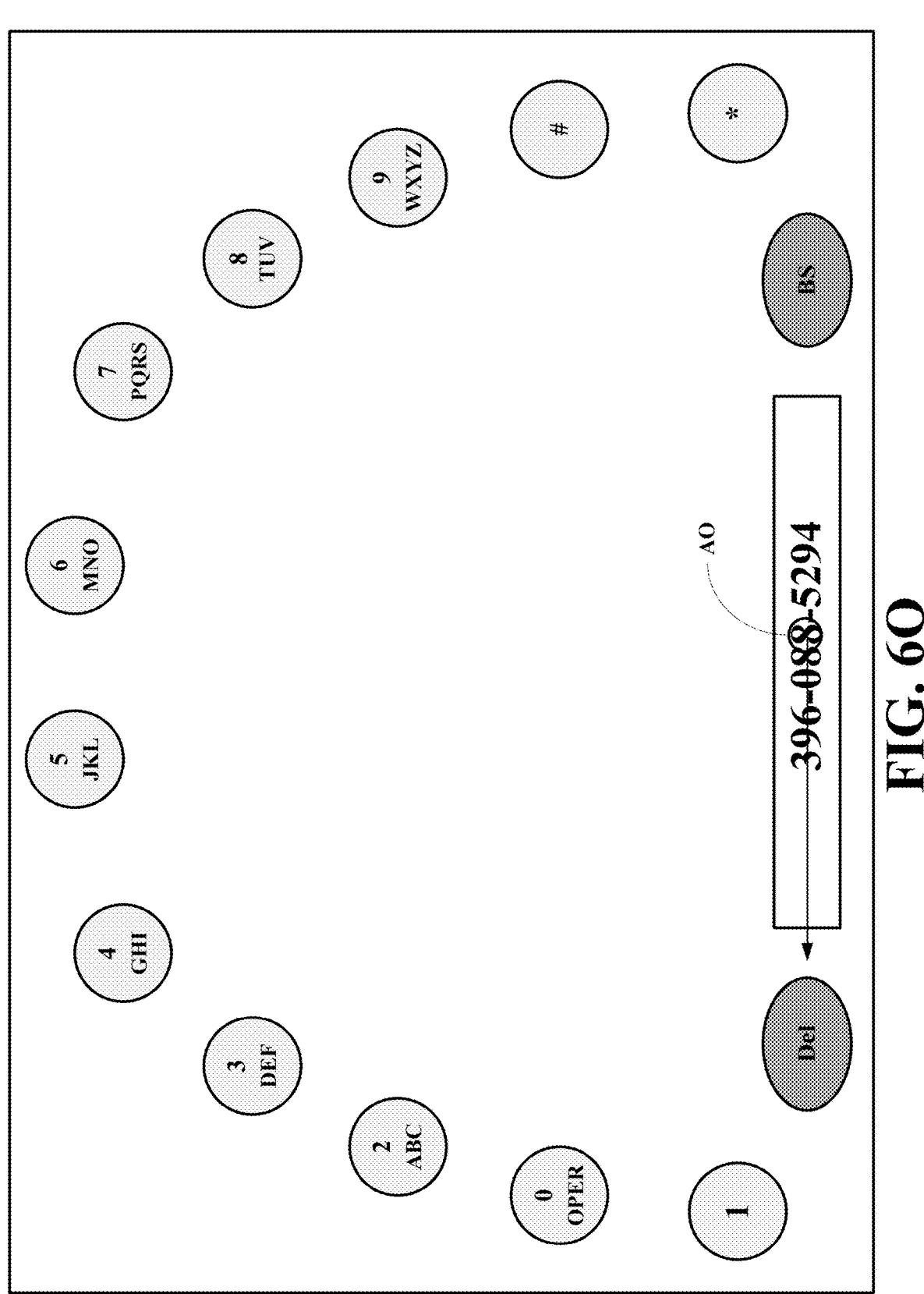
Figure 6P:
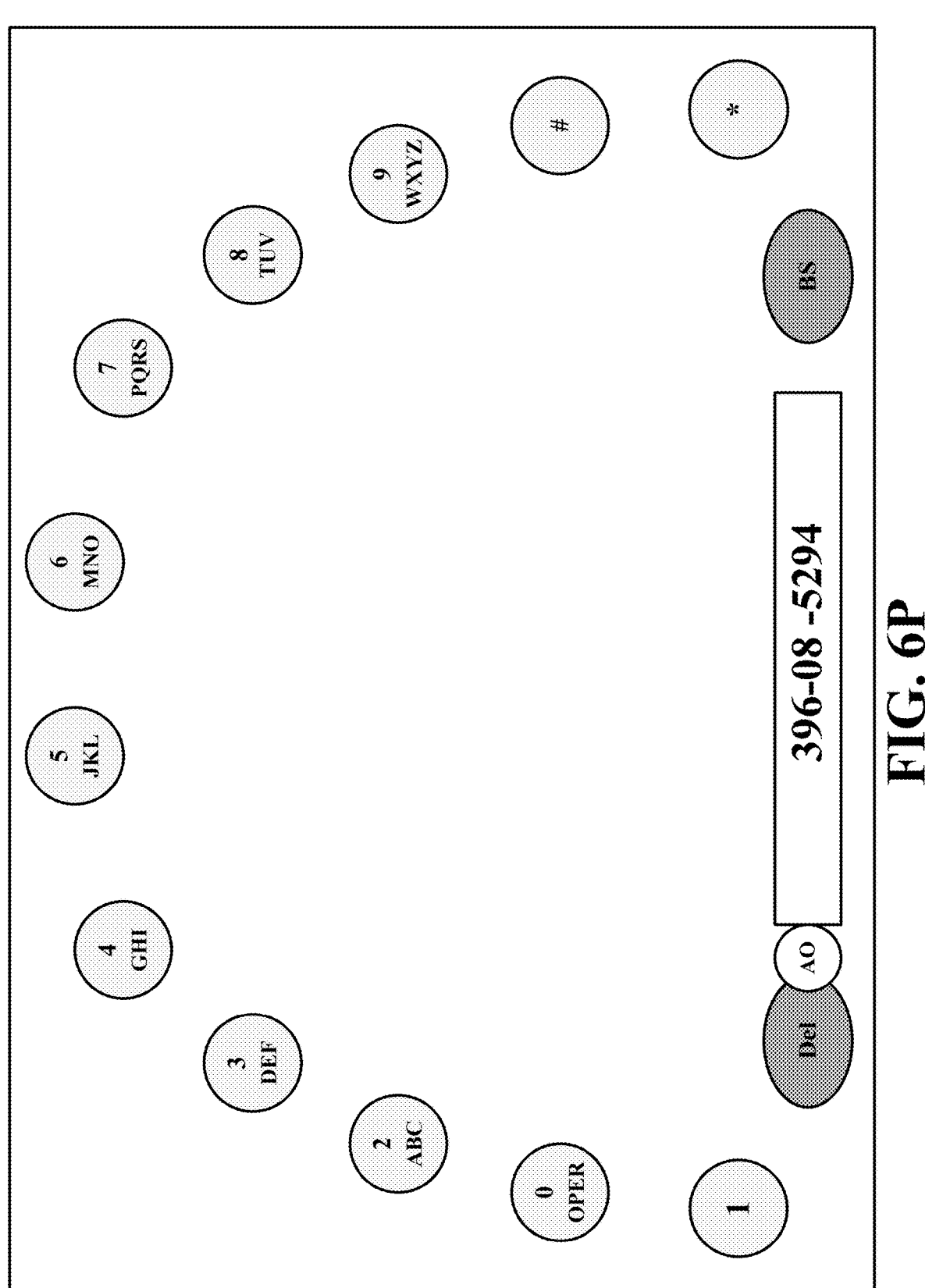
Figure 6Q:
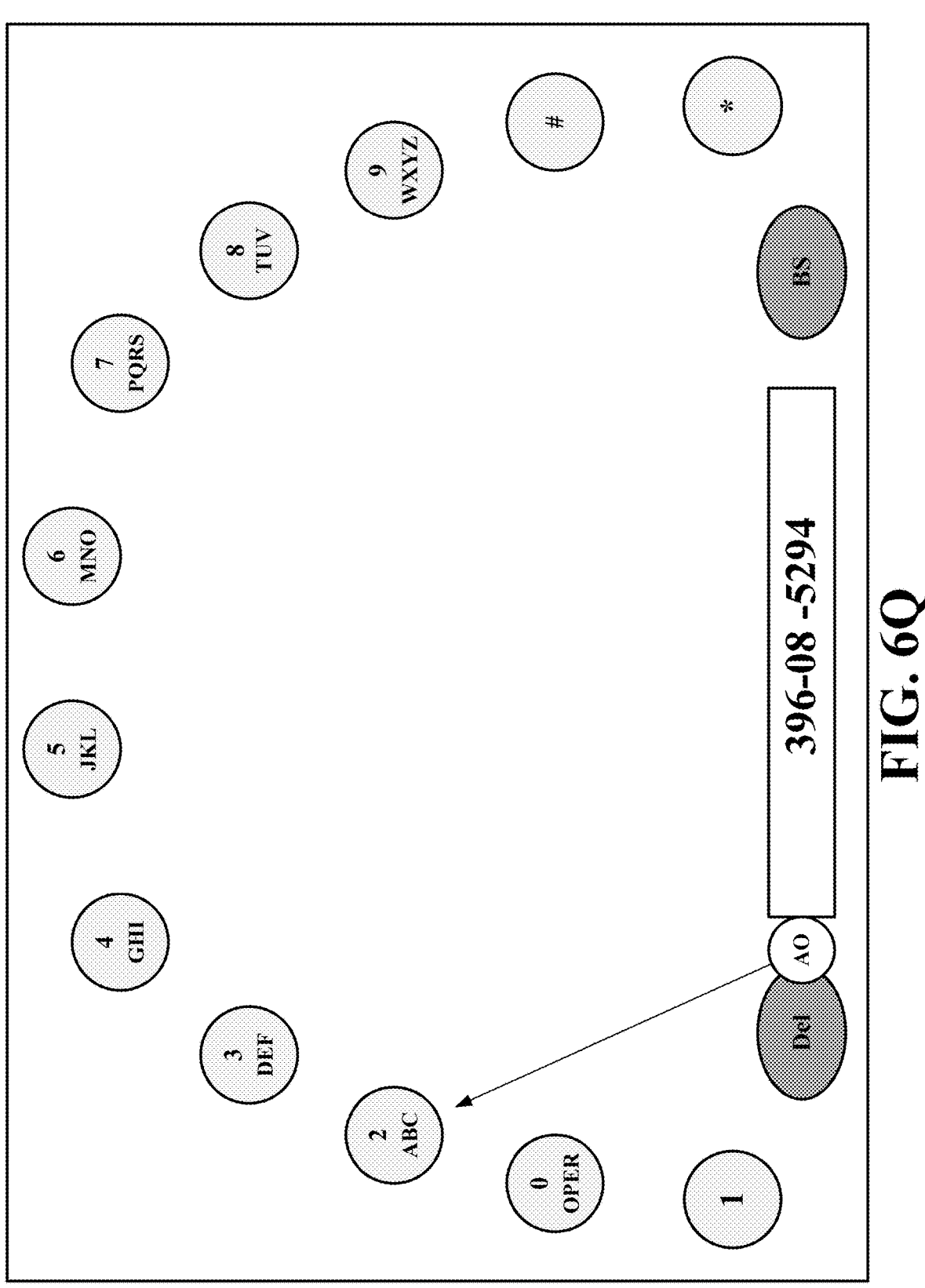
Figure 6R:
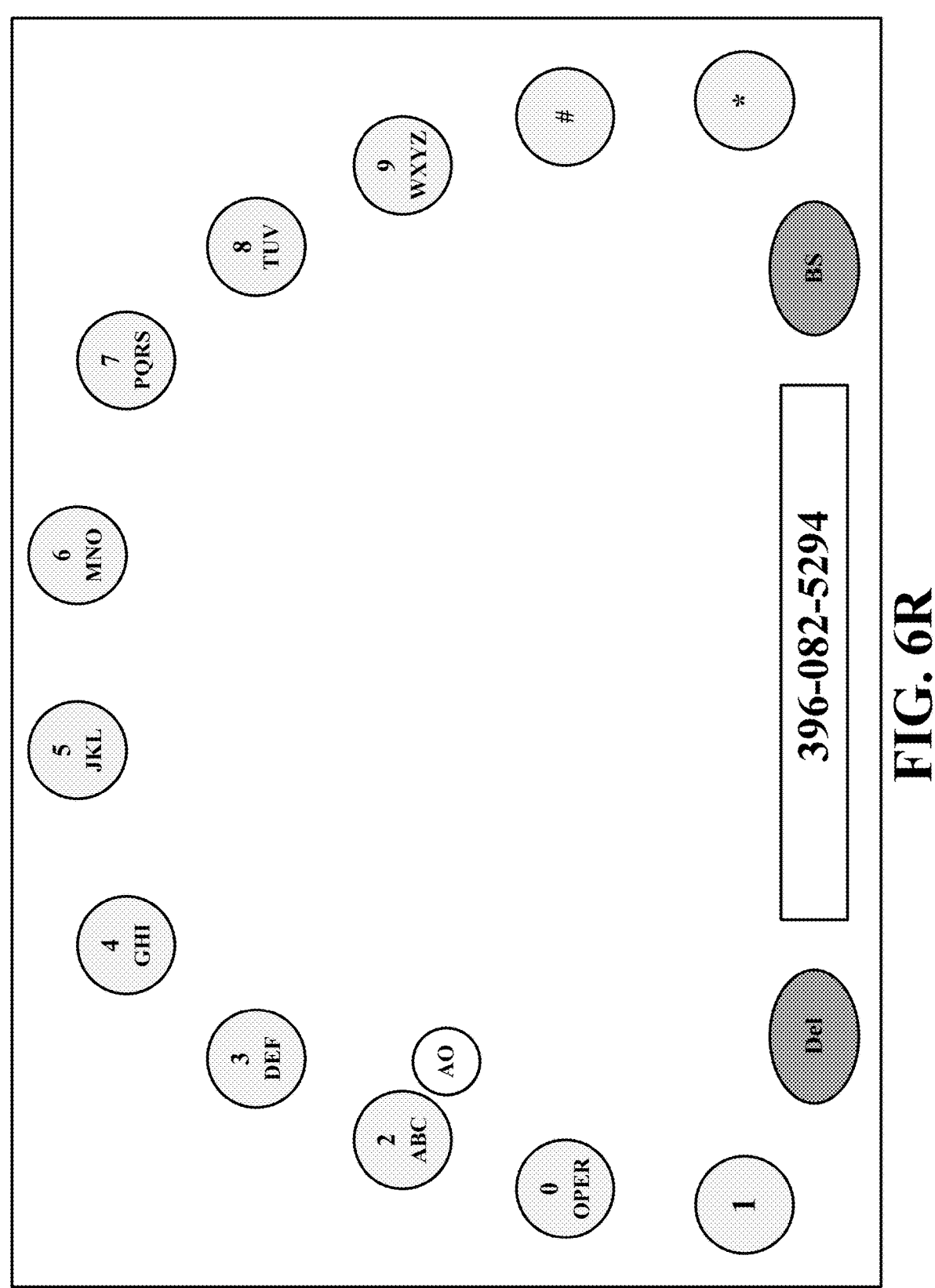

Referring now to FIGS. 6B-K, a series of movement of the active object AO is shown that results in the selection of a specific phone number. In FIGS. 6A-G and FIGS. 6I-K, selection are made by moving the active object AO from one number to another. FIG. 6H depicts a number selection by a time hold in the active area of the phone object 8. It should be recognized, that the selection format could equally well have used attraction of selectable phone objects toward the active object during the selection process. Additionally, the phone objects could be arranged in a different order or configuration. Additionally, for blind uses, the system could say the number as it is selected and if the configuration is fixed, then the user would be able to move the active object around the display with audio messages indicating the selectable object and their relative disposition.

Referring now to FIGS. 6L-R, the system is show for the deletion of selected numbers number. Looking at FIGS. 6L-M, two examples of using the backspace object BS are shown. In the first example, slow movement of the active object AO towards the backspace object BS results in the deletion of one number at a time. Holding the active object AO within the active zone of the backspace object BS, the system will continue to delete number by number until no numbers remain. In the second examples, rapid movement of the active object AO towards the backspace object BS results in the deletion of multiple numbers in the first instance. Holding the active object AO within the active zone of the backspace object BS, the system will continue to delete numbers in blocks until no numbers remain. Alternatively, if the motion is rapid and jerky, the system would delete could delete the entire number. Looking at FIGS. 6N-R, the use of a deletion object is shown. The active object is moved into the number display area to a number to be deleted, motion toward the delete object Del deletes the number. Then movement of the active object toward a new phone number object corrects the number. It should be recognized that this same backspace and deletion procedure can be used for any selection mechanism involving objects to be selected in order and displayed in a display object. If the display object is comprises of text, the motion of towards the backspace object BS will be used to delete works or collections of object one at a time, groups at a time or the entire object list at one time depending totally on the speed, acceleration, smoothness, jerkiness, or other attributes of the motion or mixtures and combinations thereof.

Figure 7:
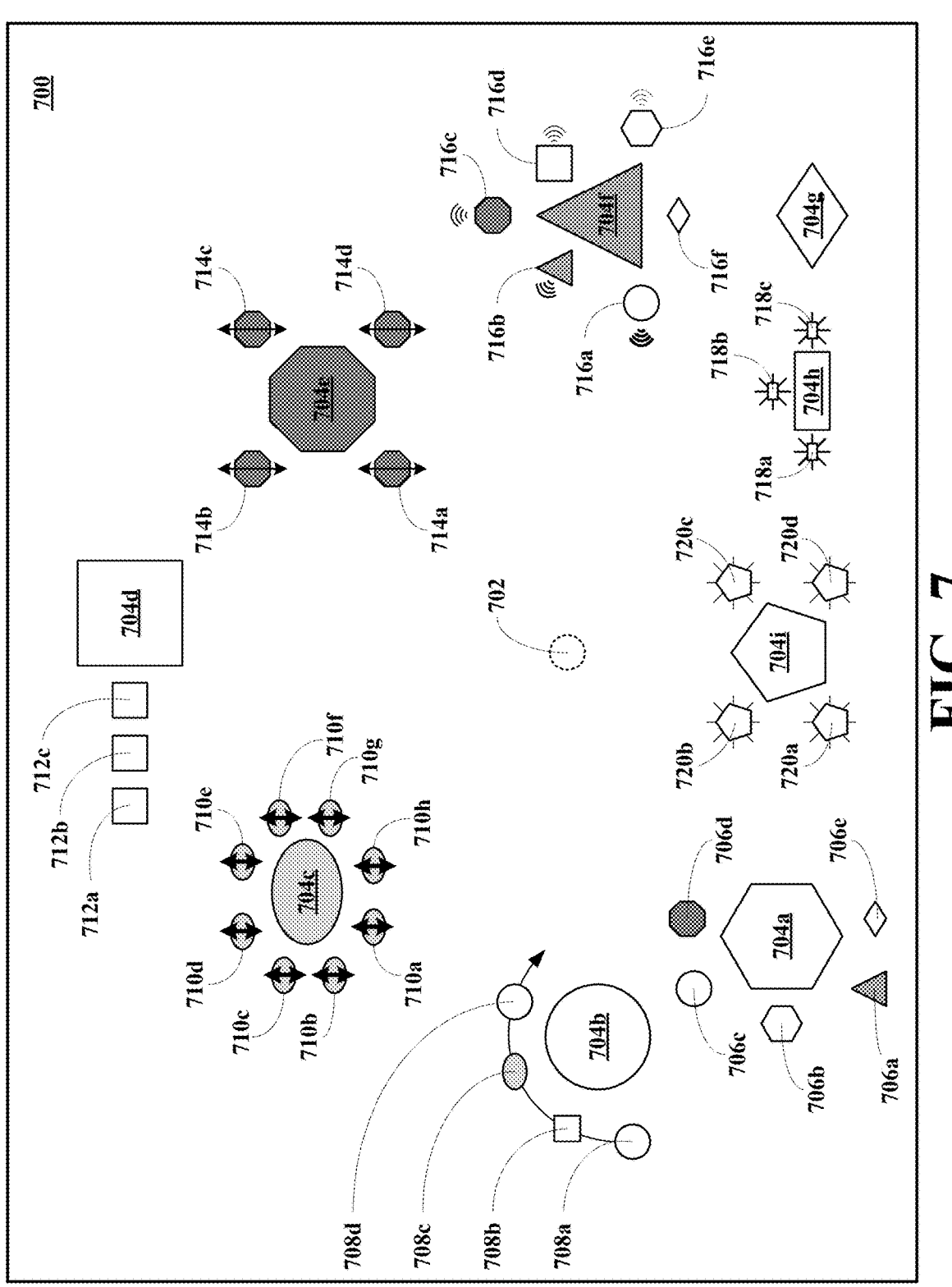
FIG. 7 depicts an embodiment of a dynamic environment of this invention displayed on a display window.

Referring now to FIG. 7, an embodiment of a dynamic environment of this invention displayed on a display window 700 is shown. Displayed within the window 700 is display a cursor or selection object 702 and nine main objects 704a-i. Each of the nine objects 704a-i are depicted differently, where the differences may be pre-defined, user defined, generated based on user interaction knowledge, or dynamically based on the user and sensor locations and sensed sensor motion. In this embodiment, the main object 704a is depicted as a hexagon; the main object 704b is depicted as a circle; the main object 704c is depicted as a ellipse; the main object 704d is depicted as a square; the main object 704e is depicted as a octagon; the main object 704f is depicted as a triangle; the main object 704g is depicted as a diamond; the main object 704h is depicted as a rectangle; and the main object 704i is depicted as a pentagon. In additional to the differences of the shapes of the main objects 704a-i, some of the objects are also highlighted (gray shaded-which may be different colors), with the elliptical objects being light gray, the triangular objects being dark gray, and the octagonal objects being darker gray. This highlighting may notify the user of a type of an object, a priority of an object, or other attribute of an object or any subobjects or attributes associated therewith.

Eight of the nine main objects 704a-f & 704h-i include subobjects displayed about the main objects. The main object 704a has 5 subobjects 706a-e: a diamond 706a, a dark gray triangle 706b, a hexagon 706c, a circle 706d, and a darker gray octagon 706e. The main object 704b has 4 subobjects 708a-d, a first circle 708a, a square 708b, a light gray ellipse 708c, and a second circle 708d, and an octagon 708e. The main object 704c has 8 subobjects 710a-h, all light gray ellipses. The main object 704d has 3 subobjects 712a-c, all squares. The main object 704e has 4 subobjects 714a-d all darker gray octagons. The main object 704f has 6 subobjects 716a-f, a diamond 716a, a circle 716b, a dark triangle 716c, a darker octagon 716d, a square 716e, and a hexagon 716f. The main object 704g has no subobjects and represents an item that may either be directly invoked such as a program or an object with a single attribute, where the object once selected may have this attribute value changed by motion in a direction to increase or decrease the value. The main object 704h has 3 subobjects 718a-c, all rectangles. The main object 704i has 4 subobjects 720a-d, all pentagons.

Besides the shape and color of the main objects and the subobject may have other differentiating features associated therewith. In this figure, the subobjects 708a-d are shown rotating about their main object 704b in a clockwise direction, where the rotation may signify that the subobjects relate to a cyclical feature of real or virtual objects such as lights cycling, sound cycling or any other feature that cycles; of course, the rate of rotation may indicate a priority of the subobjects, e.g., some object rotate about faster than others.

The subobjects 710*a-h* and subobjects 714*a-d* are shown to pulsate in or out (get larger and smaller at a rate), where the subobjects 710*a-h* are shown to pulsate at a faster rate than the subobjects 714*a-d*, which may indicate that the main object 704*c* has a higher priority than the main object 704*e*. The subobjects 712*a-c* are oriented to the left of their main object 704*d* may indicate that the main object 704*d* is to be approached from the right. The subobjects 716*a-f* have audio attributes, such as chirping, where 716*a* chirps at the highest volume and 716*f* does not chirp and the volume of the chirping decreases as in a clockwise direction. The subobjects 718*a-c* and subobjects 720*a-d* are shown to flash at a given rate, with the subobjects 718*a-c* flashing at a faster rate than the subobjects 720*a-d*, which may indicate that the main object 704*h* has a higher priority than the main object 704*i*. Of course, it should be recognized that these differentiating attributes may be associated with any or all of the subobjects so that each subobject may have any one or all of these differentiating features, and may be used to show different states of the objects.

Referring now to FIGS. 8A-E, another embodiment of a dynamic environment of this invention displayed on a display window 800 are shown, where the objects and subobjects are pulsating at different rates evidencing a priority of main objects. Displayed within the window 800 is display a cursor or selection object 802 and eight main objects 804*a-h*. Each of the eighty objects 804*a-h* are depicted differently, where the differences may be pre-defined, user defined, generated based on user interaction knowledge, or dynamically based on the user and sensor locations and sensed sensor motion.

The eight objects 808*a-h* are all of one shape, but are colored different, here shown in gray scale from white to black in a counterclockwise fashion. The color coding may indicate the type of objects such as software programs, games, electronic devices, or other objects that are amend-able to control by the systems and methods of this invention.

The seven of the eight main objects 804*a-h* include subobjects displayed about the main objects; all subobjects are shown as while circles, but may be color coded and or different in shape and size or different in any other visual or auditory manner. The main object 804*a* has no subobjects. The main object 804*b* has 1 subobject 806. The main object 804*c* has 2 subobjects 808*a-b*. The main object 804*d* has 3 subobjects 810*a-c*. The main object 804*e* has 4 subobjects 812*a-d*. The main object 804*f* has 5 subobjects 814*a-e*. The main object 804*g* has 6 subobjects 816*a-f*. The main object 804*g* has 7 subobjects 818*a-g*.

Figure 8A:
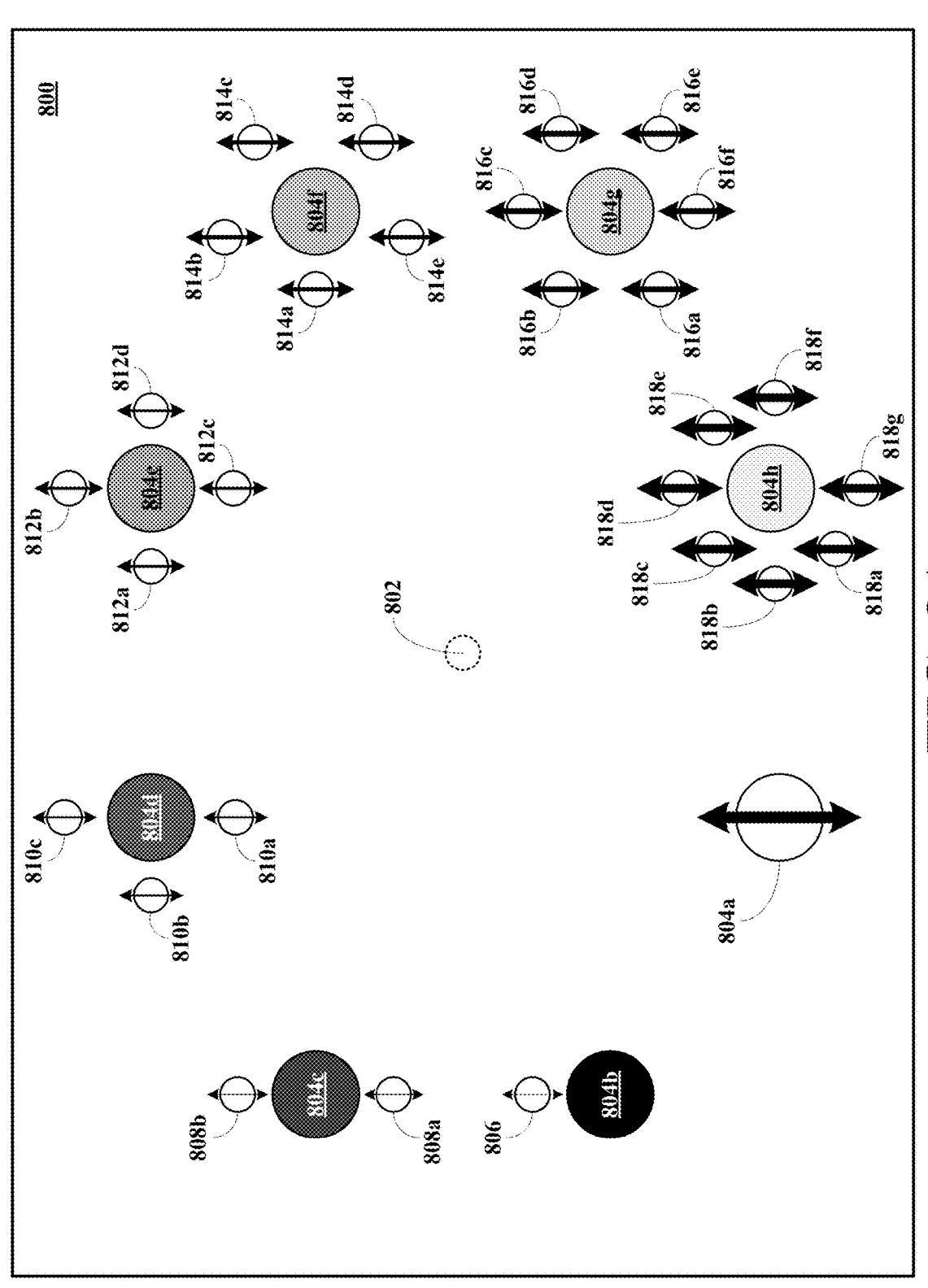
FIGS. 8A-E depict another embodiment of a dynamic environment of this invention displayed on a display window that undergoes changes based on temporal changes.
Figure 8B:
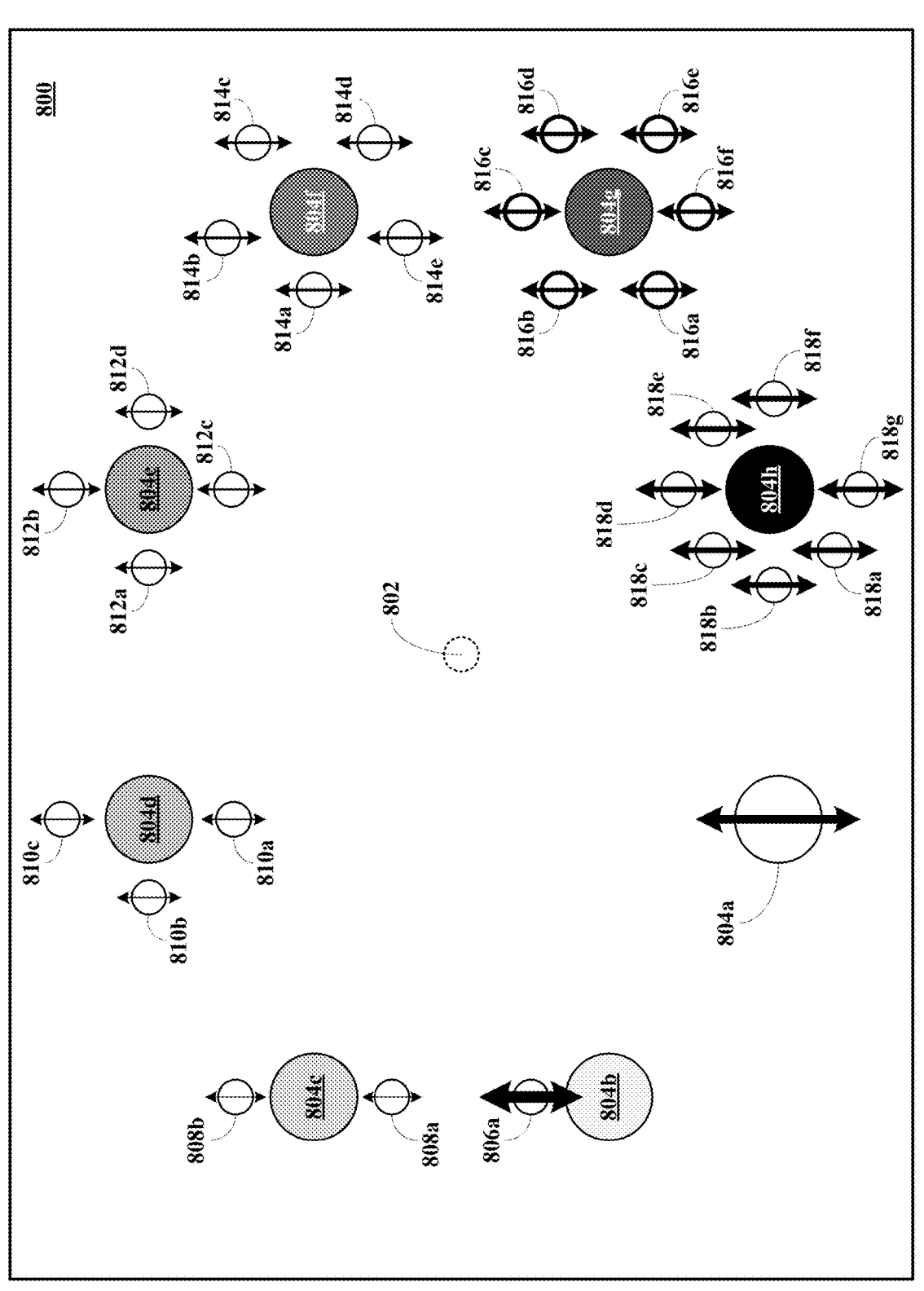
Figure 8C:
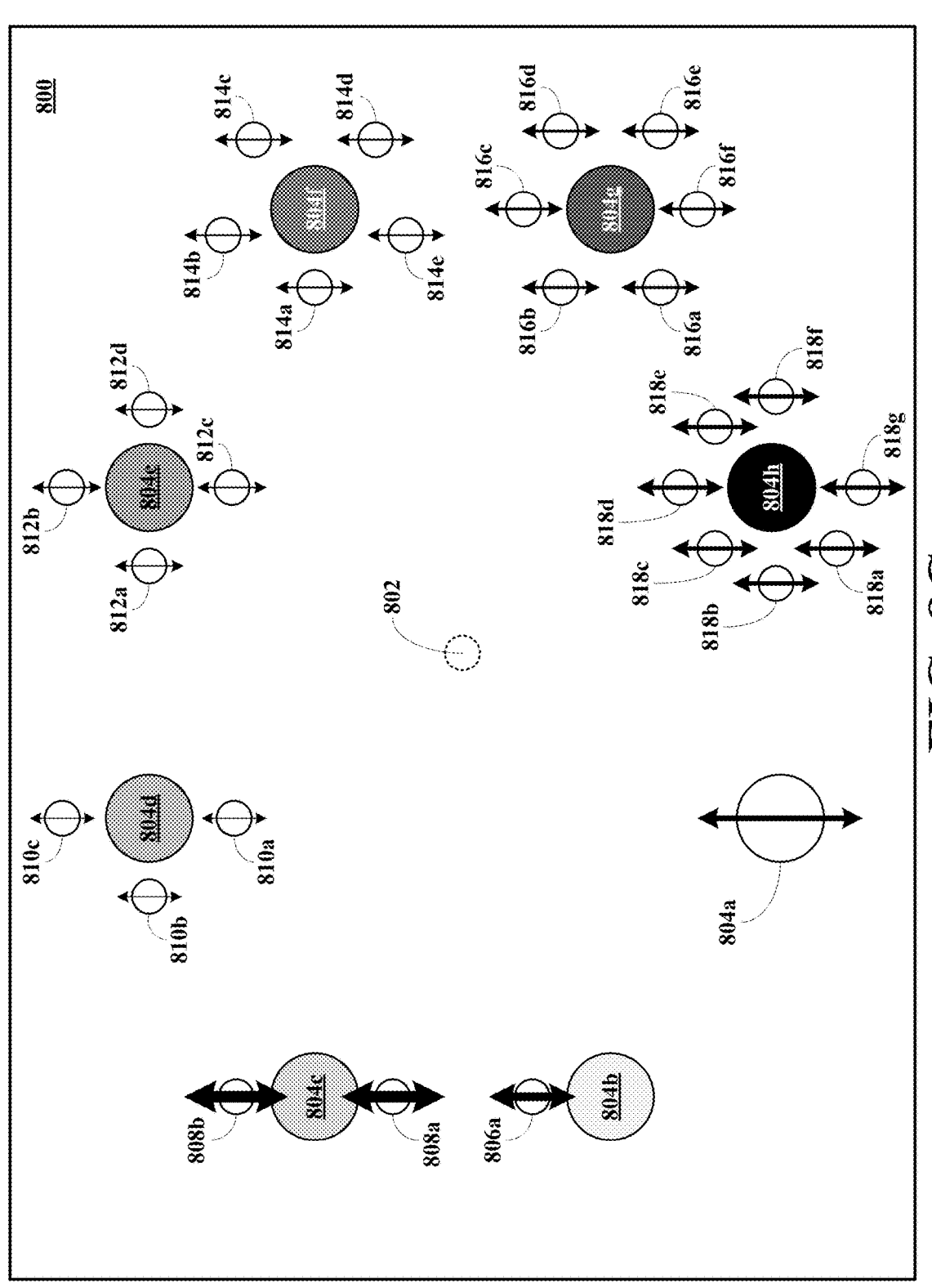
Figure 8D:
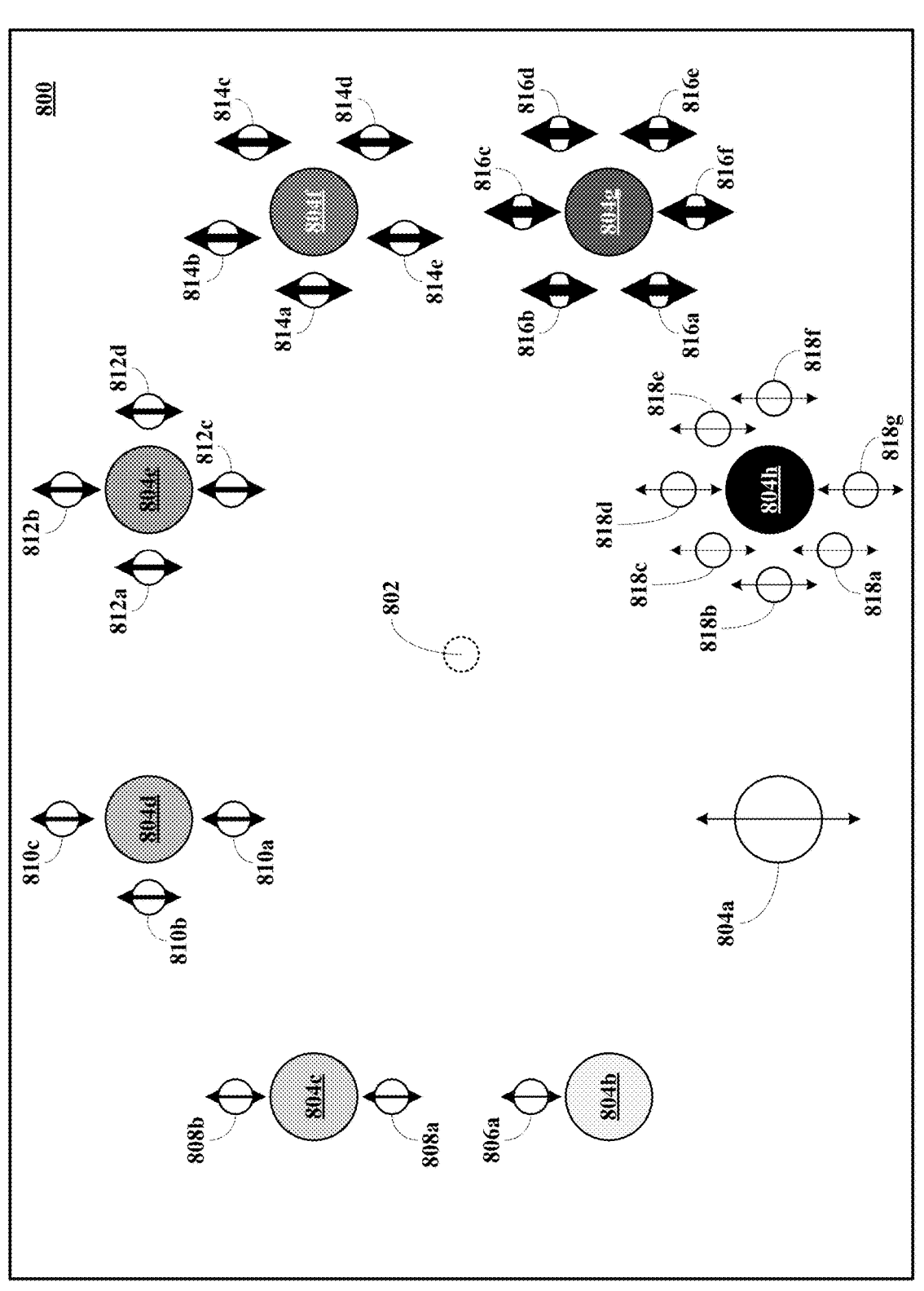
Figure 8E:
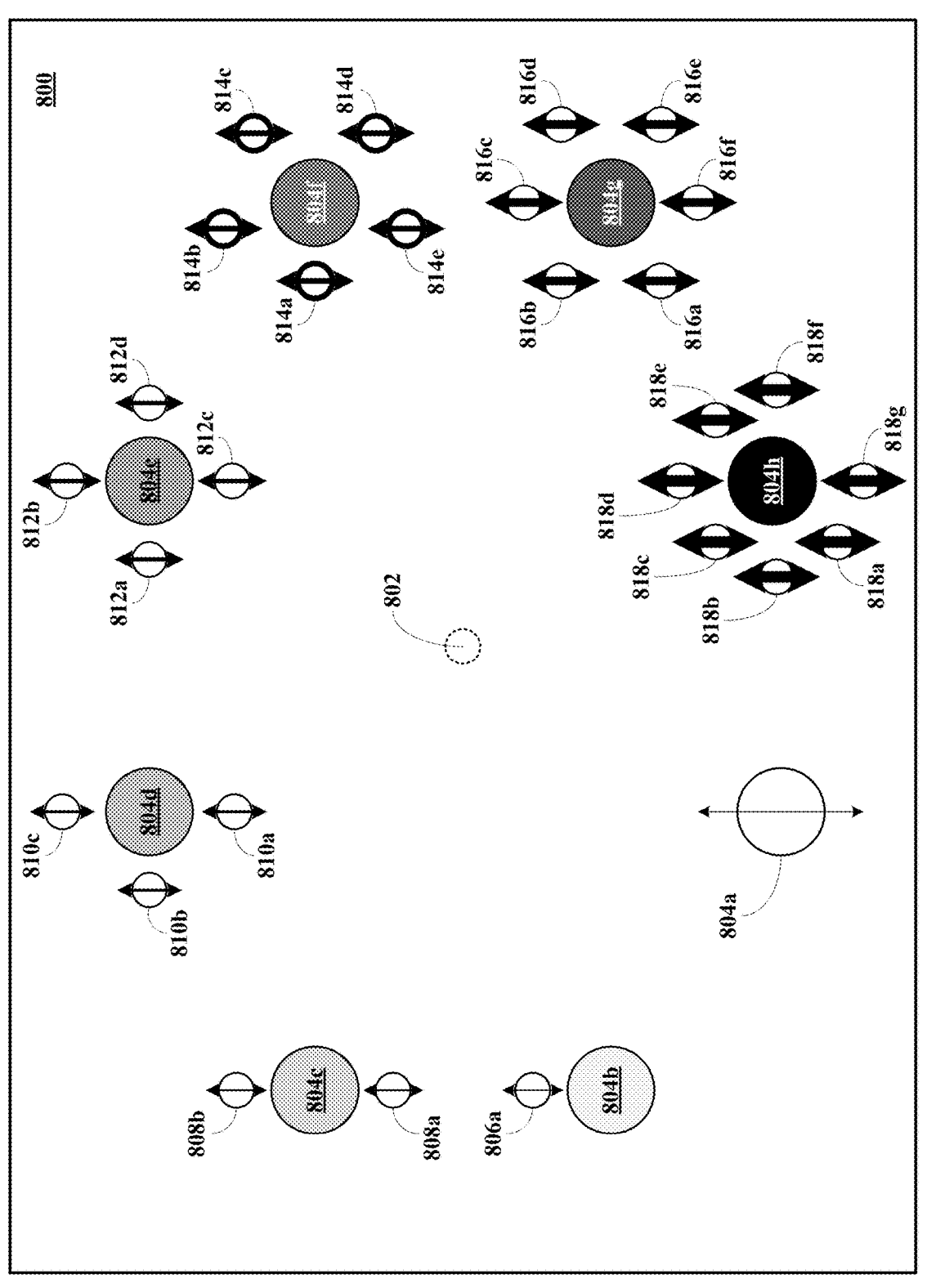

Beside the color of the main objects and the subobject may have other differentiating features associated therewith. In these figures, the all of subobjects 806, 808*a-b*, 810*a-c*, 812*a-d*, 814*a-e*, 816*a-f*, and 818*a-g* are shown at pulsating in and out at different rates as indicated by the thickness of the double headed arrowed lines. Looking at FIG. 8A, the main object 804*a* is pulsating at the fasted rate, while the subobject 806 is pulsating and the slowest rate with the subobjects 808*a-b*, 810*a-c*, 812*a-d*, 814*a-e*, 816*a-f*, and 818*a-g* pulsating at faster rates proceeding in a clockwise direction. FIG. 8A represents a $t_0$ configuration of the main objects 804*a-h* and subobjects 806, 808*a-b*, 810*a-c*, 812*a-d*, 814*a-e*, 816*a-f*, and 818*a-g*. Looking at FIG. 8B, a $t_1$ configuration of the main objects 804*a-h* and subobjects 806, 808*a-b*, 810*a-c*, 812*a-d*, 814*a-e*, 816*a-f*, and 818*a-g* is shown, where the pulsation rates have rotated clockwise one main object. Looking at FIG. 8C, a $t_2$ configuration of the main objects 804*a-h* and subobjects 806, 808*a-b*, 810*a-c*, 812*a-d*, 814*a-e*, 816*a-f*, and 818*a-g* is shown, where the pulsation rates have rotated clockwise one more main object. Looking at FIG. 8D, a $t_6$ configuration of the main objects 804*a-h* and subobjects 806, 808*a-b*, 810*a-c*, 812*a-d*, 814*a-e*, 816*a-f*, and 818*a-g* is shown, where the pulsation rates have rotated clockwise by 6 main object. Looking at FIG. 8E, a $t_7$ configuration of the main objects 804*a-h* and subobjects 806, 808*a-b*, 810*a-c*, 812*a-d*, 814*a-e*, 816*a-f*, and 818*a-g* is shown, where the pulsation rates have rotated clockwise by seven main object.

Clearly, configurations $t_{3-5}$ are not shown, but would be characterized by clockwise movement of priority pulsation rates based on the main objects. These temporal configurations $t_{0-7}$ may represent main object priorities through the course of an eight hour work day or any other time period divided into 8 different configurations of pulsating objects and subobjects. Of course, the number of pulsating configurations and the number of objects and subobjects is unlimited and would depend on the exact application.

For calendar applications, the temporal configuration may represent days, months, years, etc. or combinations thereof. Again, selection would be as set forth in the selection formats described above. In should also be recognized that the progression does not have to be clockwise or counter-clockwise, but main be cyclical, random or according to any given format, which may be user defined, defined by user historical interaction with the systems of this invention or dynamically based on the user, the type of objects and subobjects and the locations of the sensors and/or time of day, month, year, etc.

Referring now to FIGS. 9A-D, another embodiment of a dynamic environment of this invention displayed on a display window 900 is shown. Displayed within the window 900 is display a cursor or selection object 902 and eight main objects 904*a-h*. Each of the eight objects 904*a-h* are depicted differently, where the differences may be pre-defined, user defined, generated based on user interaction knowledge, or dynamically based on the user and sensor locations and sensed sensor motion. In these figures, the objects and subobjects may differ in shape, size, color, pulsation rate, flickering rate, and chirping rate. The figures progress from one configuration to another configuration depending on locations of all of the sensors being sensed, on the nature of the sensors being sensed, on the locations of the fixed sensors being sensed, and/or the locations of mobile sensors being sensed.

Figure 9A:
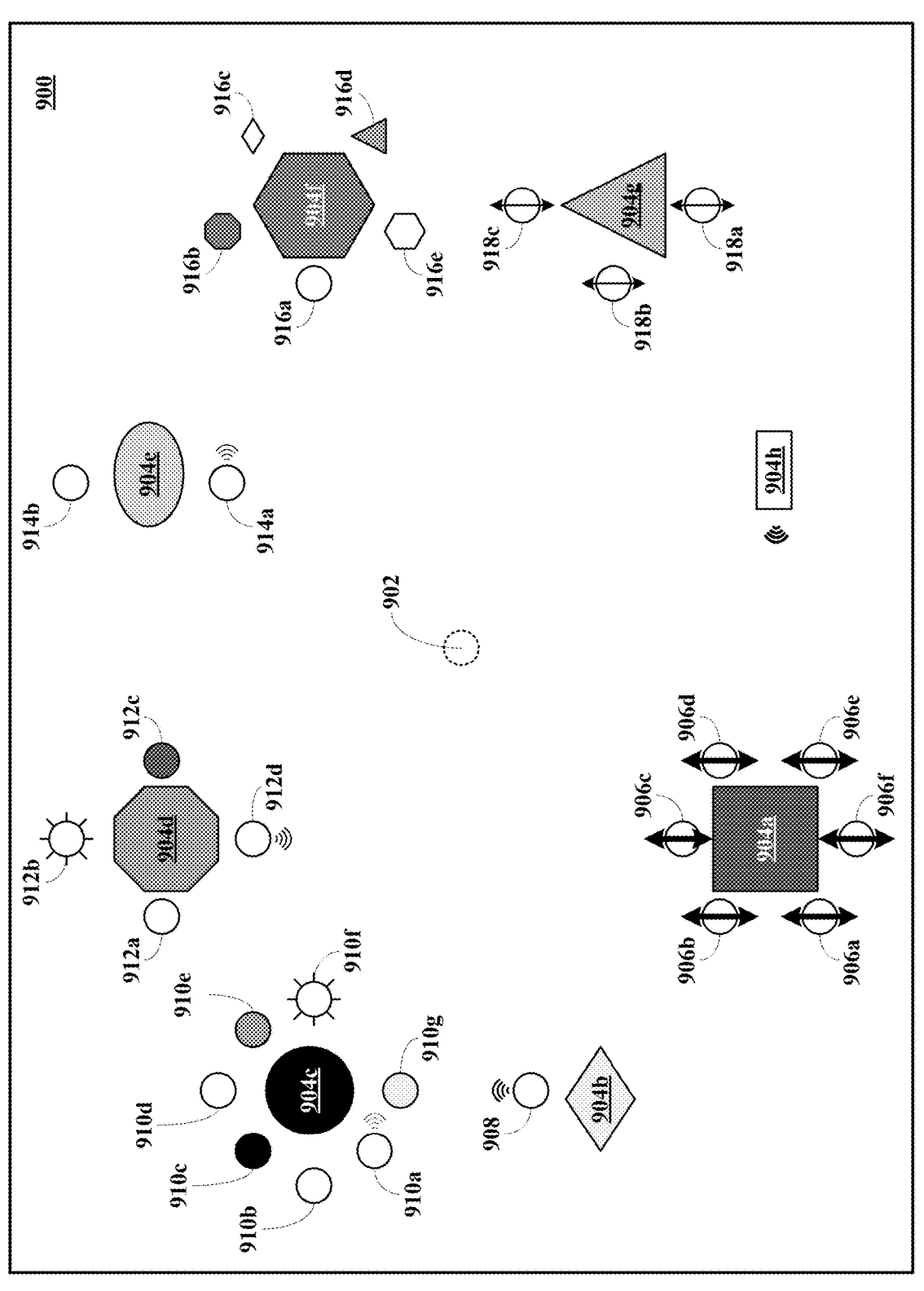
FIGS. 9A-D depict another embodiment of a dynamic environment of this invention displayed on a display window that undergoes changes based on changes in sensor locations.

Looking at FIG. 9A, the main objects 904*a-h* are shown as a square 904*a*, a diamond 904*b*, a circle 904*c*, an octagon 904*d*, an ellipse 904*e*, a hexagon 904*f*, a triangle 904*g*, and a rectangle 904*h*. The main object 904*a* includes 6 subobjects 906*a-f* shown here as circles having the same color or shade and pulsate at a first pulsating rate. The main object 904*b* includes 1 subobject 908 shown here as a circle chirping at a first chirping rate. The main object 904*c* includes 6 subobjects 910*a-f* shown here as circles. Four subobjects 910*a*, 910*b*, 910*d*, and 910*f* have a first color or shade; one subobject 910*g* has a second color or shade; one subobject 910*e* has a third color or shade; one subobject 910*c* has a fourth color or shade; one subobject 910*a* chirps as a second chirping rate; and one subobject 910*f* flickers as a first flickering rate, where the colors or shades are different. The main object 904*d* includes 4 subobjects 912*a-d* shown here as circles. Three subobjects 912*a*, 912*b*, and 912*d* have a first color or shade; one subobject 912*c* has a second color or shade; one subobject 912*b* flickers at a second flickering rate; and one subobject 912*d* chirps at a third chirping rate. The main object 904*e* includes 2 subobjects 914*a-b* shown here as circles having the same color or shade. The subobject 914a chirps are a fourth chirping rate. The main object 904f includes 5 subobjects 916a-e having five different shapes and three different colors or shapes. Three subobjects 916a, 916c, and 916e have a first color or shade; one subobject 916b has a second color or shade; and one subobject 916d has a third color or shade. The main object 904g includes 3 subobjects 918a-c shown here as circles that pulsate at a second pulsating rate. The main object 904h includes no subobjects are represents an object that activates upon selection and if the object as a single adjustable attribute, selection and activation will also provide direct control over a value of the attribute, which is changed by motion.

Figure 9B:
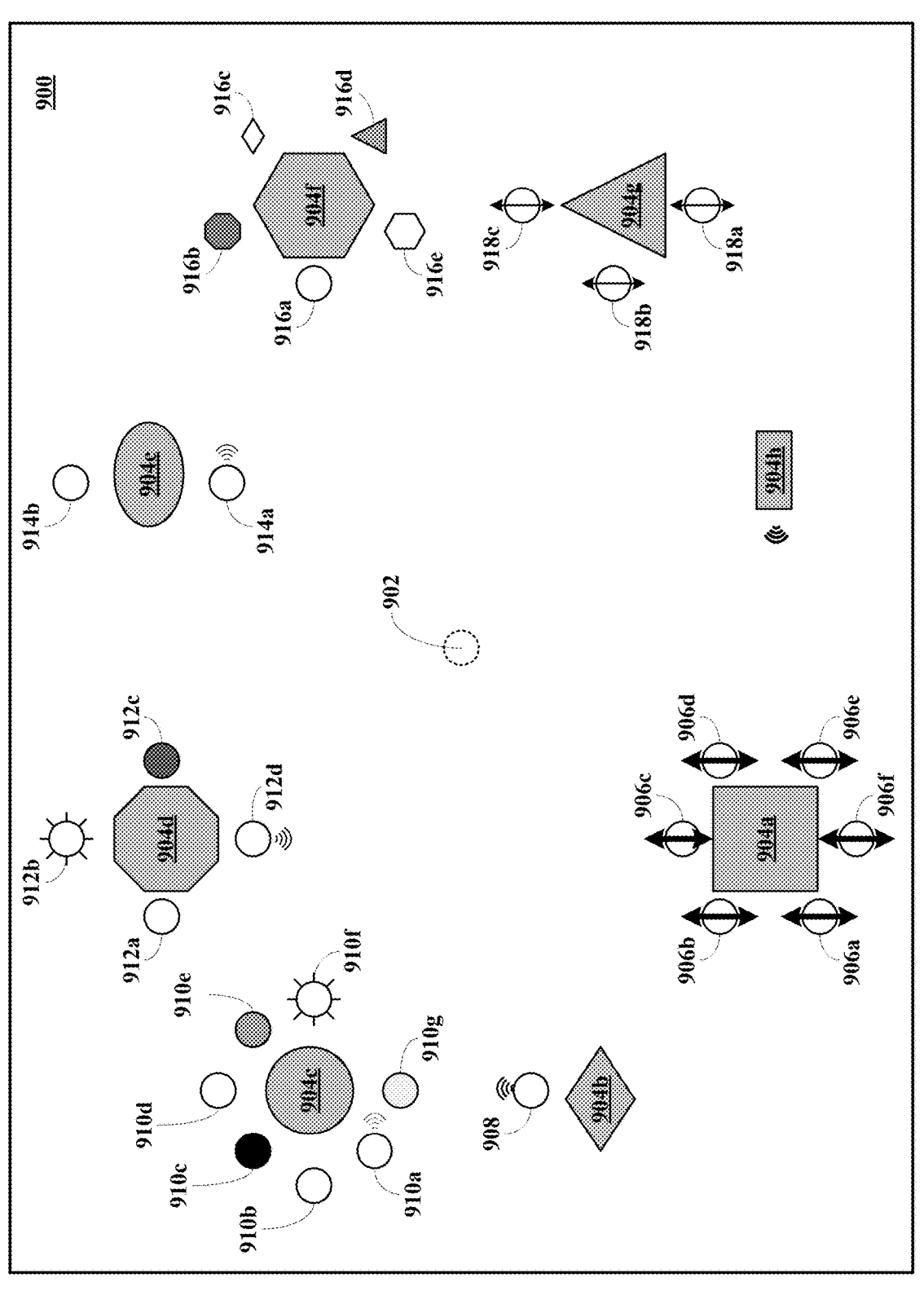

Looking at FIG. 9B, the main objects 904a-h have changed configuration and are now all shown to have the same color or shade caused by a change in location of one or more of the mobile sensors such as moving from one room to another room. Although the subobjects are depicted as the same as in FIG. 9A, the subobjects appearance could have changed as well. A distortion of the space around the objects could have changed also, or an addition of a zone representing the motion of the user could be displayed attached to or integrated with the object(s) representing information as to the state, attribute, or other information being conveyed to the user.

Figure 9C:
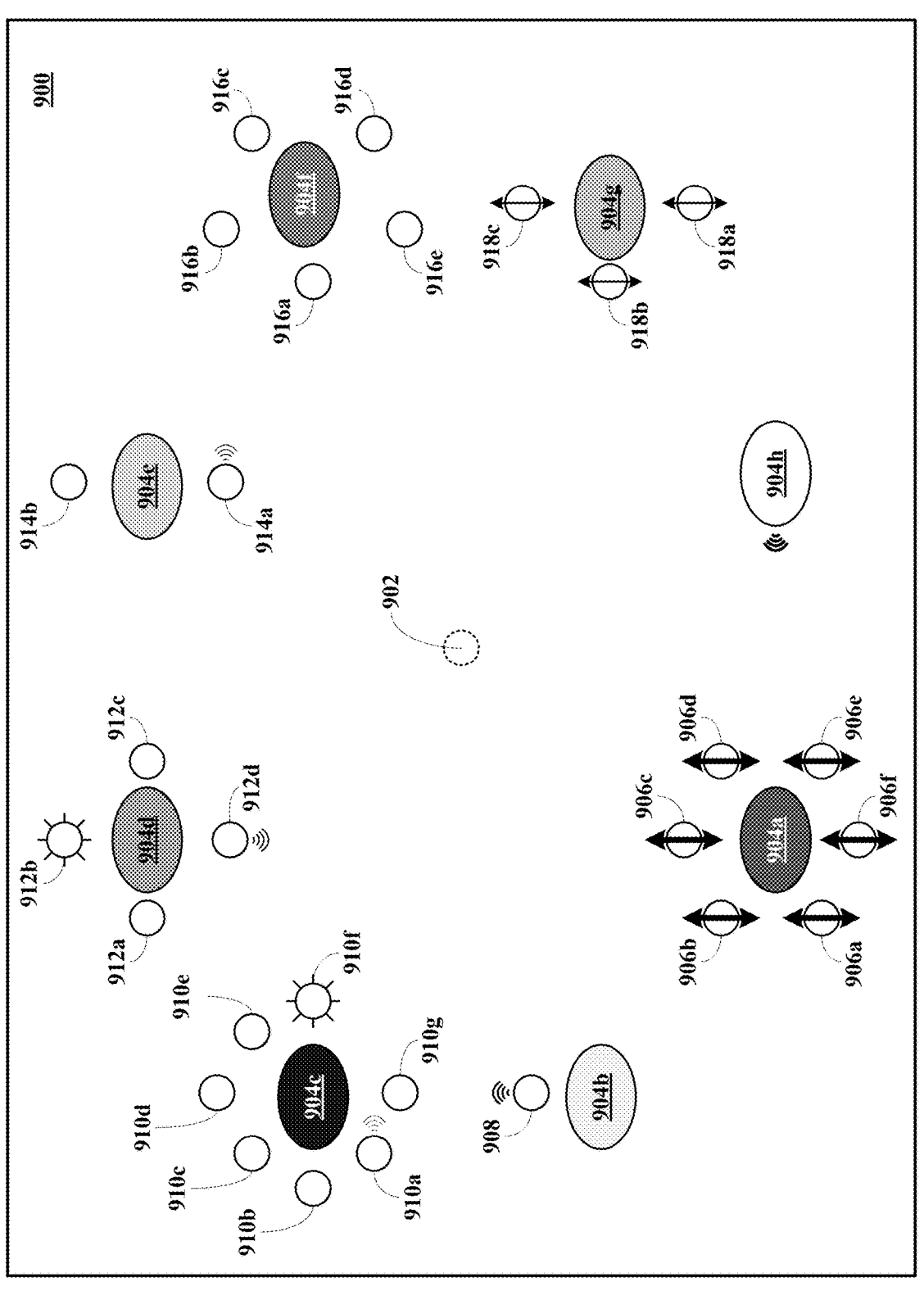

Looking at FIG. 9C, the main objects 904a-h have changed configuration and are now all shown to have the same shape caused by a change in location of one or more of the mobile sensors such as moving from into a location that has a plurality of retail stores. Although the subobjects are depicted as the same as in FIGS. 9A&B, the subobjects appearance could have changed as well.

Figure 9D:
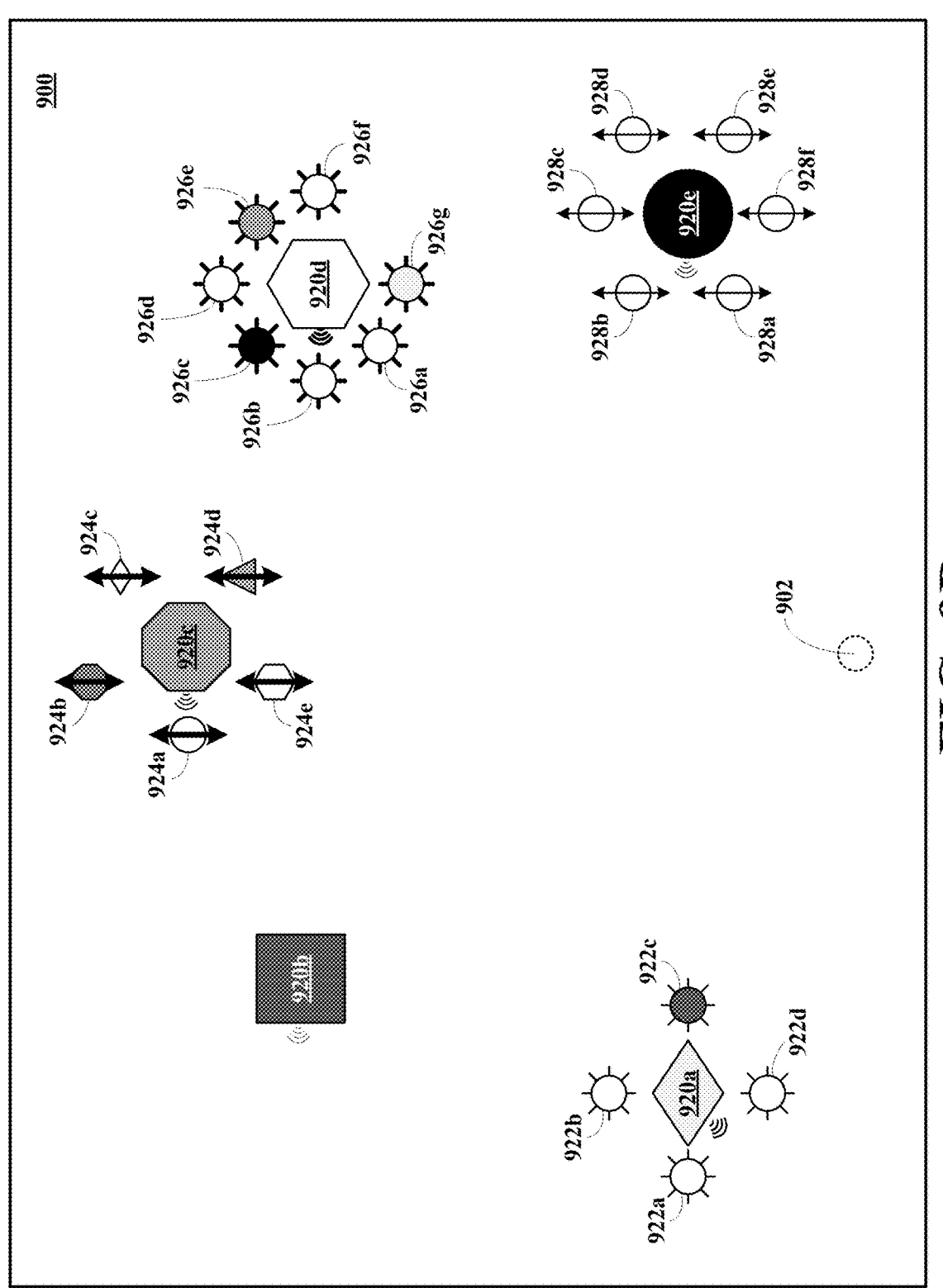

Looking at FIG. 9D, the main objects and the subobjects have changed caused by a change in location of one or more of the mobile sensors. There are now 5 main objects 920a-e shown as a diamond 904a, a square 904b, a octagon 904c, a hexagon 904d, and a circle 904e. Each of the main objects 920a-e chirps at different chirping rates that may indicate a priority based on learned user behavior from using the systems and methods of this invention, dynamically based on locations and types of the sensors or based on location and time of day, week or year, etc. The main object 920a includes 4 subobjects 922a-d shown here as circles that flicker at a first flickering rate. Three subobjects 922a, 922b and 922c have a first color or shade; one subobject 922c has a second color or shade; and all of the subobjects 922a-d flicker at a first flickering rate. The main object 920b has no subobjects and represents an object that once selected is immediately activated and if it has a single attribute, the attribute is directly adjustable by motion. The main object 920c includes 5 subobjects 924a-e having five different shapes and three different colors or shapes. The first subobject 924a is a circle; the second subobject 924b is an octagon; the third subobject 924c is a diamond; the fourth subobject 924d is a triangle; and the fifth subobject 924e is a hexagon. Three subobjects 924a, 924c, and 924e have a first color or shade; one subobject 924b has a second color or shade; and one subobject 924d has a third color or shade. The main object 920d includes 7 subobjects 926a-g shown here as circles. Four subobjects 926a, 926b, 926d, and 926f have a first color or shade; one subobject 926c has a second color or shade; one subobject 926e has a third color or shade; one subobject 926g has a fourth color or shade; and all of the subobject 926a-g flickers as a second flickering rate, where the colors or shades are different. The main object 920e includes 6 subobjects 928a-f shown here as circles that pulsate at a second pulsating rate.

General Depictions of Variable Interface Options

Referring now to FIGS. 10A-K, embodiments of dynamic environments are shown each illustrating different selection and navigation procedures.

Looking at FIG. 10A, a display discernible by the user displaying a cursor x, under user control, and a selectable object A having three associated subobjects B. As the cursor x moves toward the object A, the subsubobject C associated with each subobject B come into view. As motion of the cursor x continues, the user selection process will discriminate between the subobjects B and the subsubobjects C, finally resulting in a definitive selection and activation based solely on motions. This format is called a push format.

Looking at FIG. 10B, a display discernible by the user displaying a cursor x, under user control, and a selectable object A having three associated subobjects B, with the subobjects oriented toward the cursor x. As the cursor x moves toward a particular subobject B, the subobject B spread and differentiate until a given subobject is selected and activated. This format is called a pull format.

Looking at FIG. 10C, a display discernible by the user displaying a selectable object or zone A, which has been selected by the user. Motion up or down from the location of A cause the processing unit to scroll through the list of subobjects B, which are arranged in an arcuate format about the position of A. The greater the motion in a up/down direction, the faster the scrolling action of subobjects B. Moving in the +X direction (towards the shaded area) causes the variable scroll ability to be scaled down, so being at a set +Y value scroll speed will be reduced by moving in a −Y direction, a +X direction, or a combination of the two, and the scroll speed will continue to slow as the user moves more in the +X direction until a threshold event occurs in the angular or vector direction of the B object desired, which selects B. This represents a spatial scroll, and may or may not include a no-scroll zone once enough movement is made in the +X direction. Motion in the −X direction allows a faster scrolling (increase in scaling) of the +Y/−Y scrolling speed. Of course, this effect may occur along any axes and in 2D or 3D space.

Looking at FIG. 10D, a display discernible by the user displaying a cursor x or representing a zone, under user control, and a selectable objects A-E are arranged in a radial or arcuate manner. Object C has three associated subobjects B. As the cursor x moves toward the object A, the object A may be selected, as in FIG. 10A. As the user moves towards object C, the subobjects B come into view, or they may already be in view. As motion of the cursor x or user continues towards C, the user selection process will discriminate between the subobjects A-E and the subsubobjects C, finally resulting in a definitive selection and activation of C, and then the desired B object based solely on motions. This represents the combination of FIGS. 10A and 10C. The second drawing in FIG. 10D represents that the primary list of objects A-E need not be uniform, but an off-set may be used to indicate the user a different function occurs, such as C having the ability to provide a spatial scroll, while the other primary objects might only have a spread attribute associated with selection of them or their subobjects Looking at FIG. 10E, a display discernible by the user displaying a cursor x or indicating an active zone, under user control, and a selectable object A having three associated subobjects B. As the cursor x moves toward the desired specific object A, the associated subobject linear list displays showing a list of B subjects. When the desired specific subobject B is chosen, the associated sub-subobject list C is displayed and the user moves into that list, selecting the specific object C desired by moving in a predetermined direction or zone away from C, or by providing a lift-off event, or by moving in a specified direction while inside of the object area enough to provide a selection threshold event. Finally resulting in a definitive selection and activation based solely on motions. In each case, the selection at each stage may be by moving in a specified direction enough to trigger a threshold event, or moving into the new list zone causes a selection. The lists may be shown before selecting, simultaneously with selection, or after selection.

Looking at FIG. 10F, a display discernible by the user displaying a cursor x or representing an active zone, under user control, and a selectable object A having three associated subobjects B. As the cursor x moves through the lists as in FIG. 10E, the list moves towards the user as the user moves towards the lists, meaning the user moves part way and the list moves the rest. As motion of the cursor x continues, the user selection process will discriminate between the objects and subobjects A, B and C, finally resulting in a definitive selection and activation based solely on motions, where C may be selected by a threshold amount and direction of motion, or where C may move towards the user until a threshold selection event occurs.

Looking at FIG. 10G, a display discernible by the user displaying a cursor x or an active zone under user control, and a six selectable objects positioned randomly in space. As the cursor x, or user, moves toward one of the objects, that object is selected when a change of direction is made on or near the object, enough to discern the direction of motion is different from the first direction, or a stoppage of motion occurs, or a brief hold or pause occurs, any of which may cause a selection of the object to occur, finally resulting in a definitive selection and activation of all desired objects, based solely on motions or a change of motion (change of direction or speed) or time or a combination of these.

Looking at FIG. 10H, a display discernible by the user displaying a cursor x, or an active zone, under user control, where a circular motion in a CW or CCW direction may provide scrolling through a circular, linear or arcuate list, where motion in a non-circular motion causes a selection event of an object associated with the direction of motion of the user, or a stopping of motion ceases the ability to scroll, and then linear motions or radial/arcuate motions may be used to select the sub attributes of the first list, or scrolling may be re-initiated at any time by beginning to move in a circular direction again. Moving inside the circular list area may provide a different attribute than moving in a circular motion through the circular list, and moving faster in the circular direction may provide a different attribute than moving slowly, and any combination of these may be used. Moving from circular to linear or non-circular motion may occur until finally resulting in a definitive selection and activation based solely on motions.

Looking at FIG. 10I, a display discernible by the user displaying a cursor x, or an active zone under user control, and selectable objects A-C where motion towards an object or zone results in the objects in the direction of motion, or objects within the zone identified by the direction of motion to be selected and to show attributes based upon proximity of the cursor x or the user, and where the object is not chosen until motion ceases at the desired object, finally resulting in a definitive selection and activation based solely on motions. This is fully described in FIG. 5O-5Q.

Looking at FIG. 10J, this figure represents any or all, individually or in combination, of FIGS. 10A-10I being implemented in 3D space, or volumes, such as in AR/VR environments, or a domed controller such as described beforehand with all definitive selections and activations based primarily on motions and changes of motion.

Looking at FIG. 10K, this represents the Field interaction described previously, here showing three fields with gradient densities indicated as a back circle, a light gray circle, and a dark gray circle and four interaction zones indicated by left to right hatching, right to left hatching, cross hatching, and dotted hatching. The left to right hatching represents the interaction zone between the black field and the light gray field; the right to left hatching represents the interaction zone between the light gray field and the dark gray field; the cross hatching represents the interaction zone between the black field and the dark gray field; and finally, the dotted hatching represents the interaction zone between all three fields. The fields and interactions zones may be dynamic in the sense that each field or interaction zone may display different objects or collection of objects and as the user moves the cursor toward a field or a zone, the field or zone associated objects come into to view and expand, the other fields and zones would fall away. Further motion would discriminate between object in the selected field or zone as described above. Also, the effect of moving in one or more fields may affect the other fields, so entering one field and moving in that field may affect the other fields, much as EMF fields affect each other when close enough to interact. This also means that entering the whole environment through one filed may provide a different result than entering the environment through a different field.

Small Screen Divided into Zones

Figure 11A:
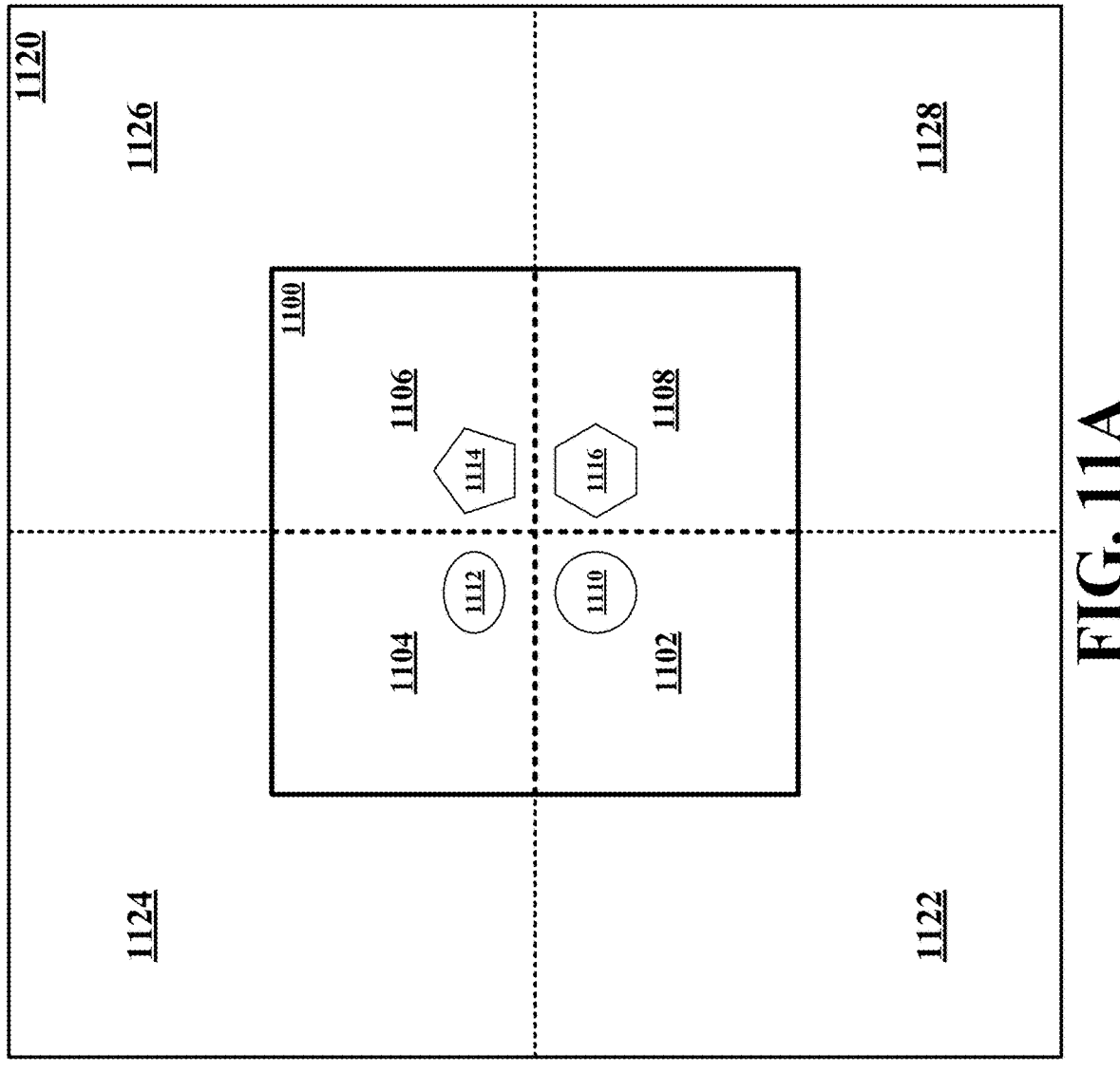
FIGS. 11A-P depict an embodiment of a motion based system of this invention for devices having small screens and associated small viewable display area, where a majority of all objects are not displayed, but reside in a virtual display space.
Figure 11B:
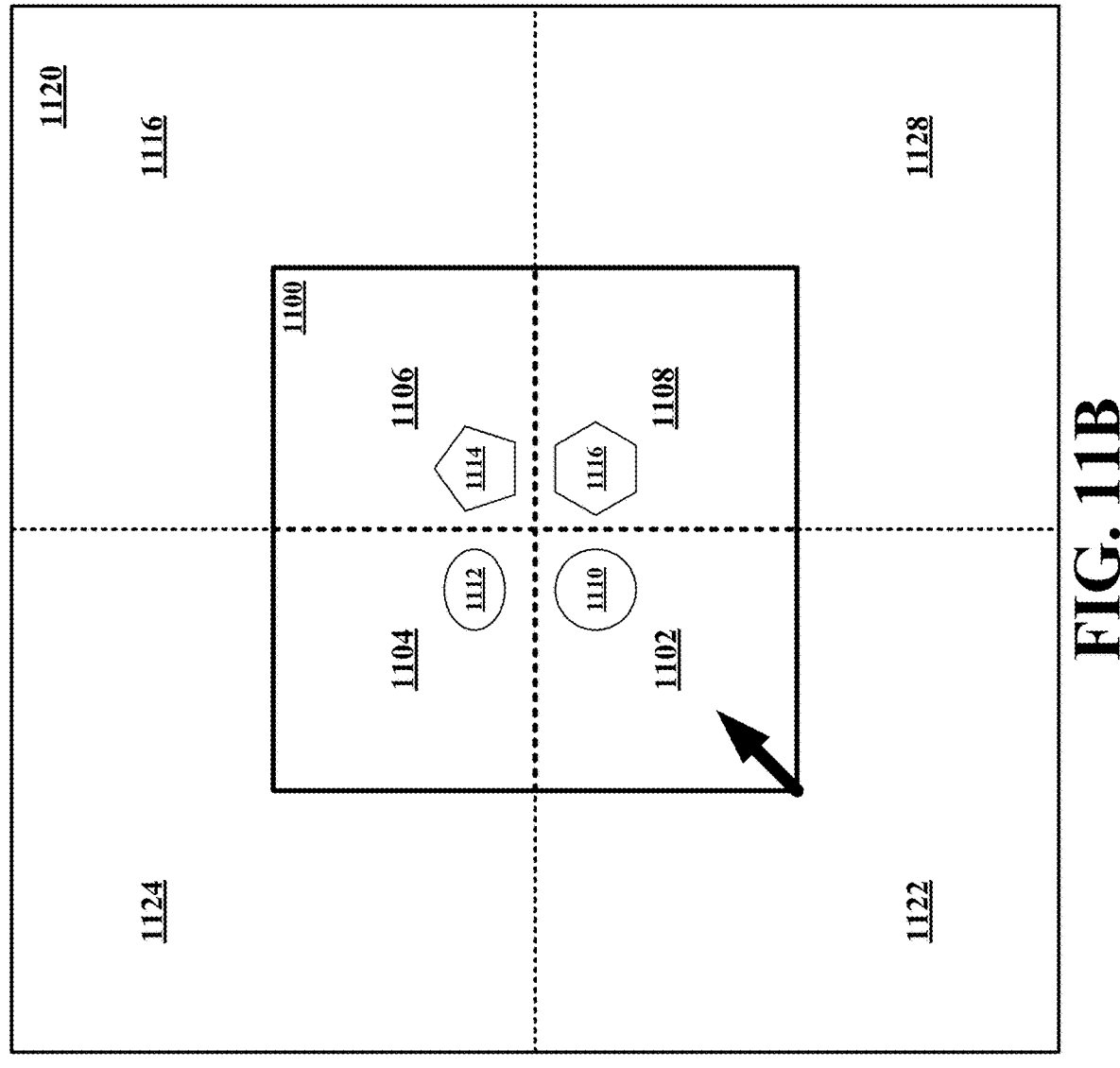
Figure 11C:
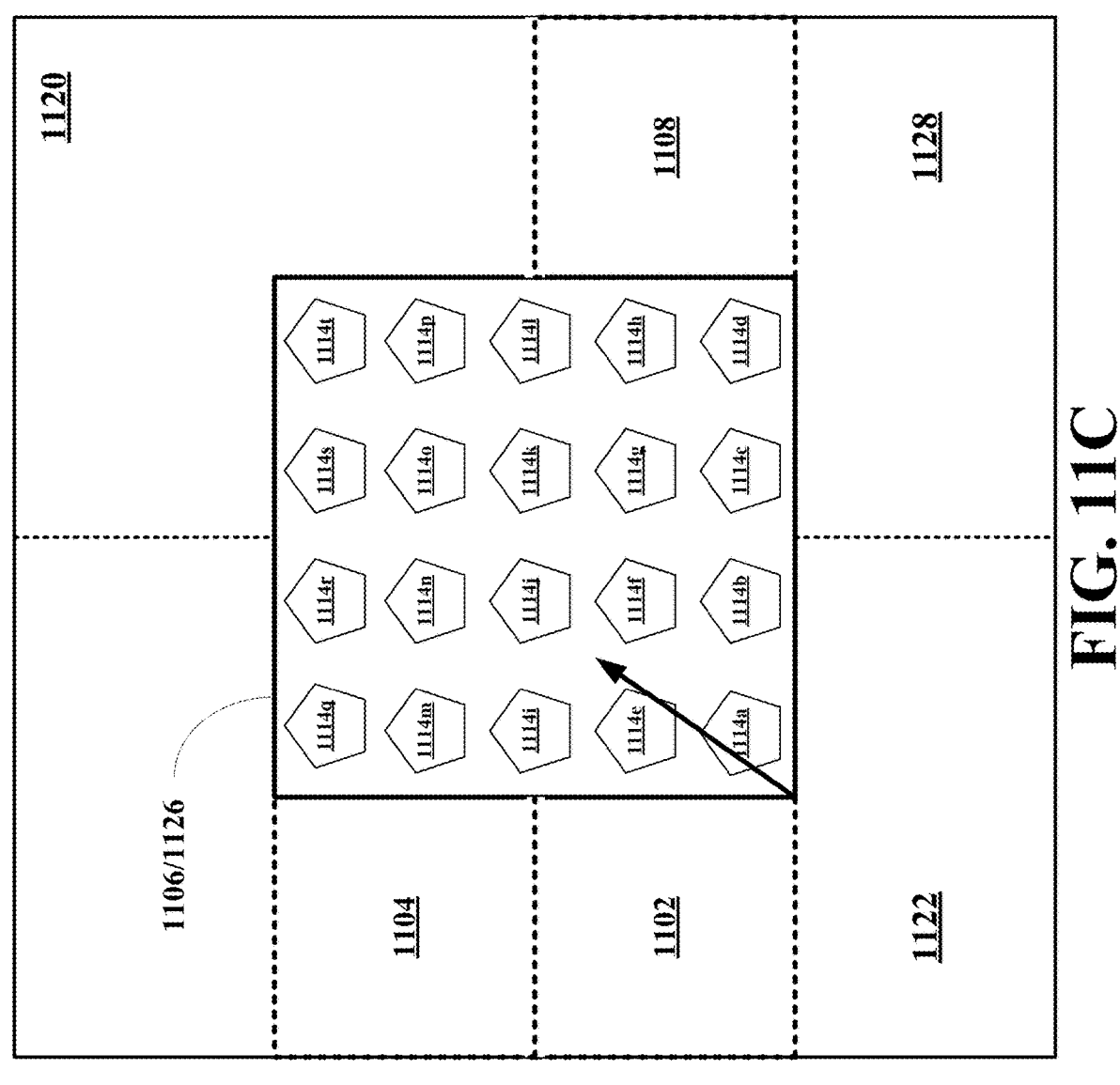
Figure 11D:
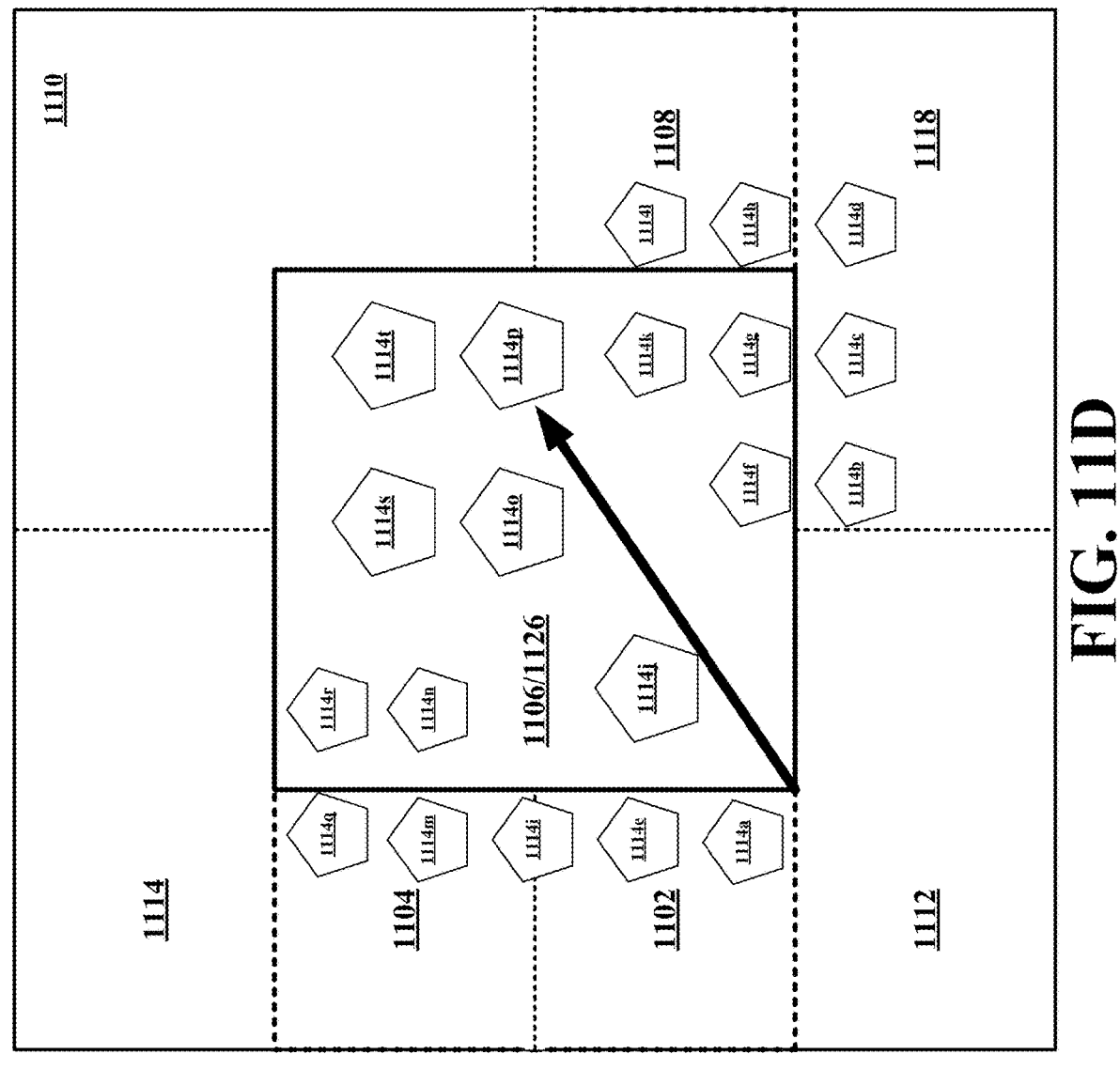
Figure 11E:
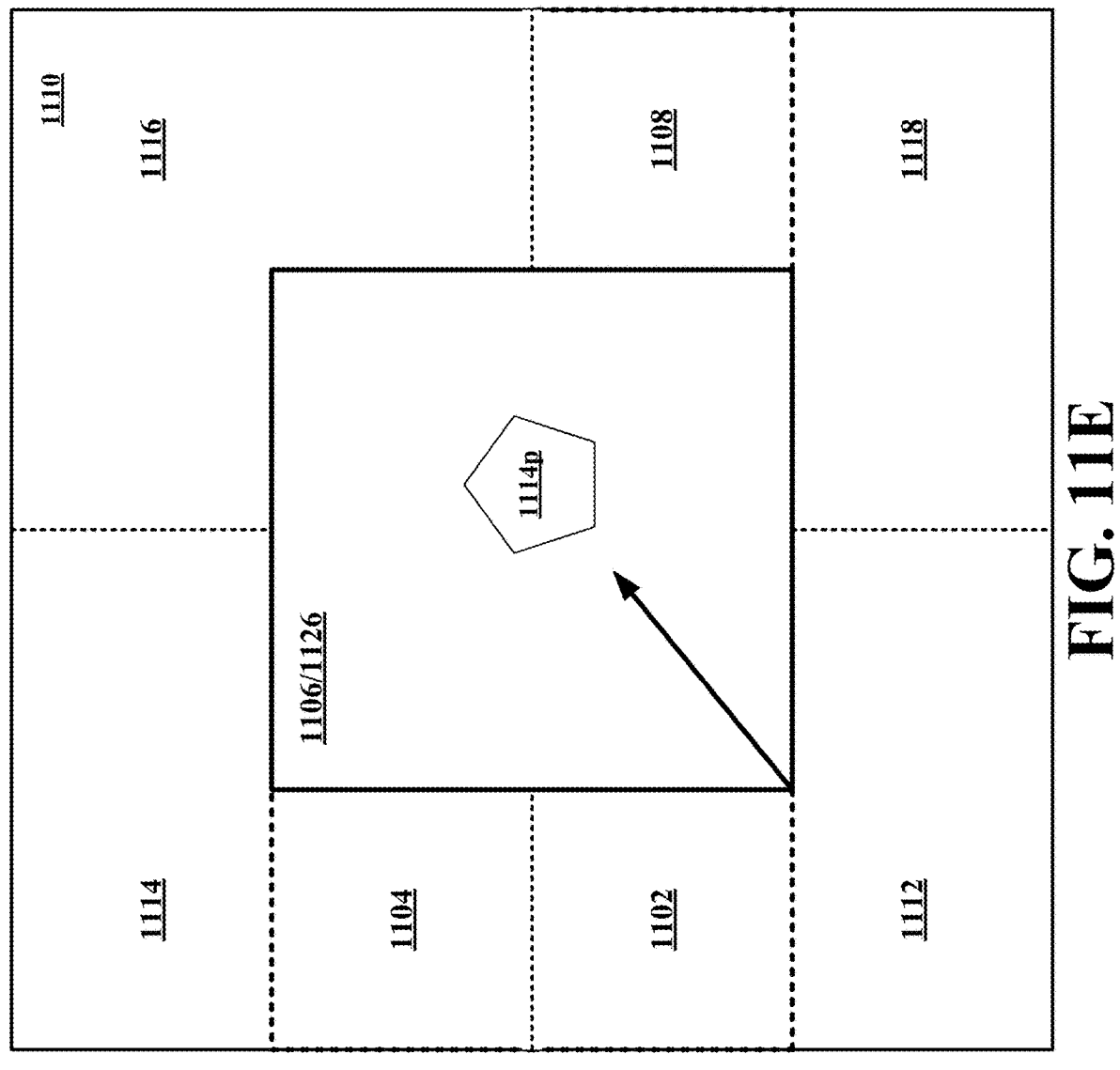
Figure 11F:
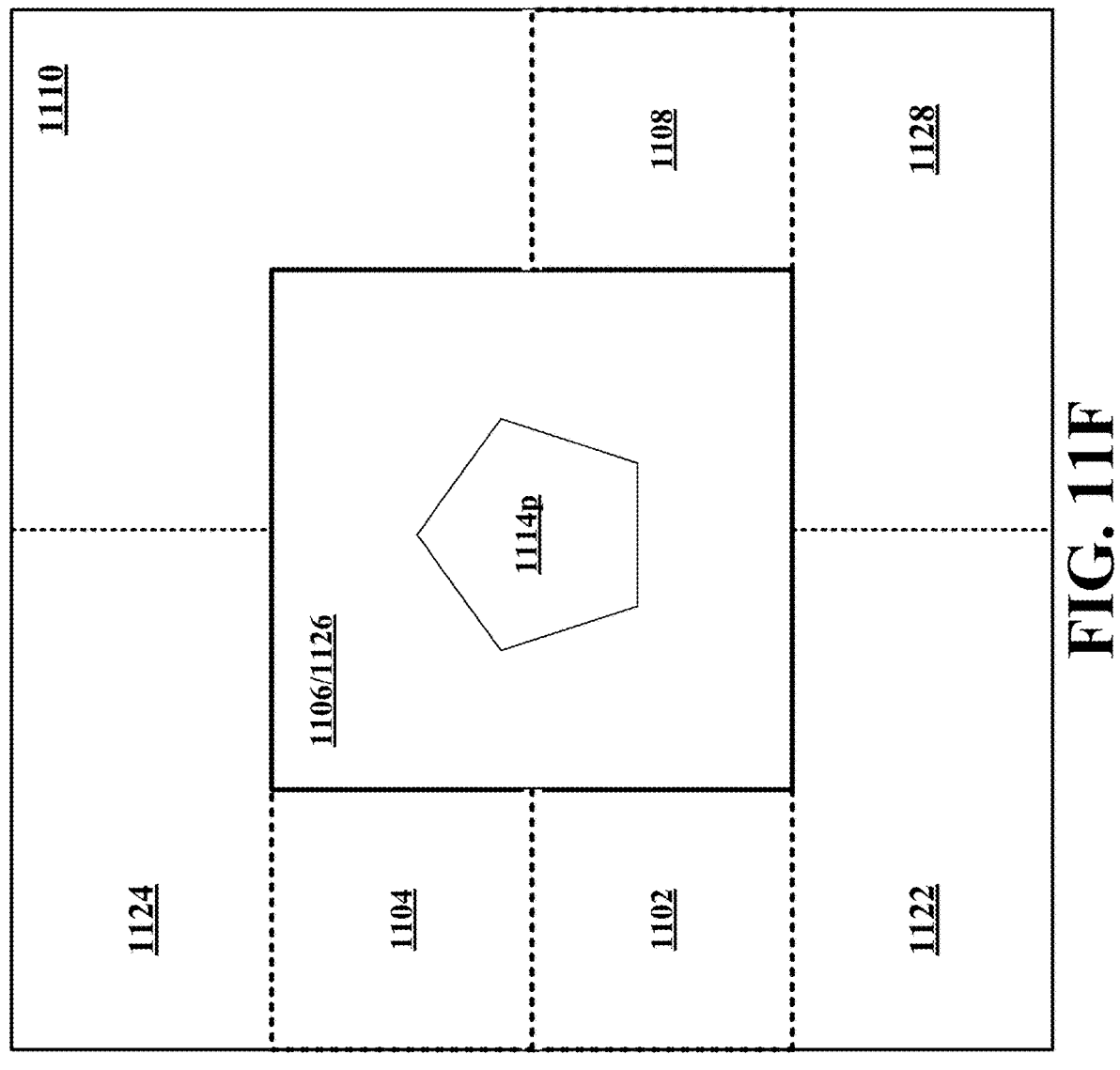
Figure 11G:
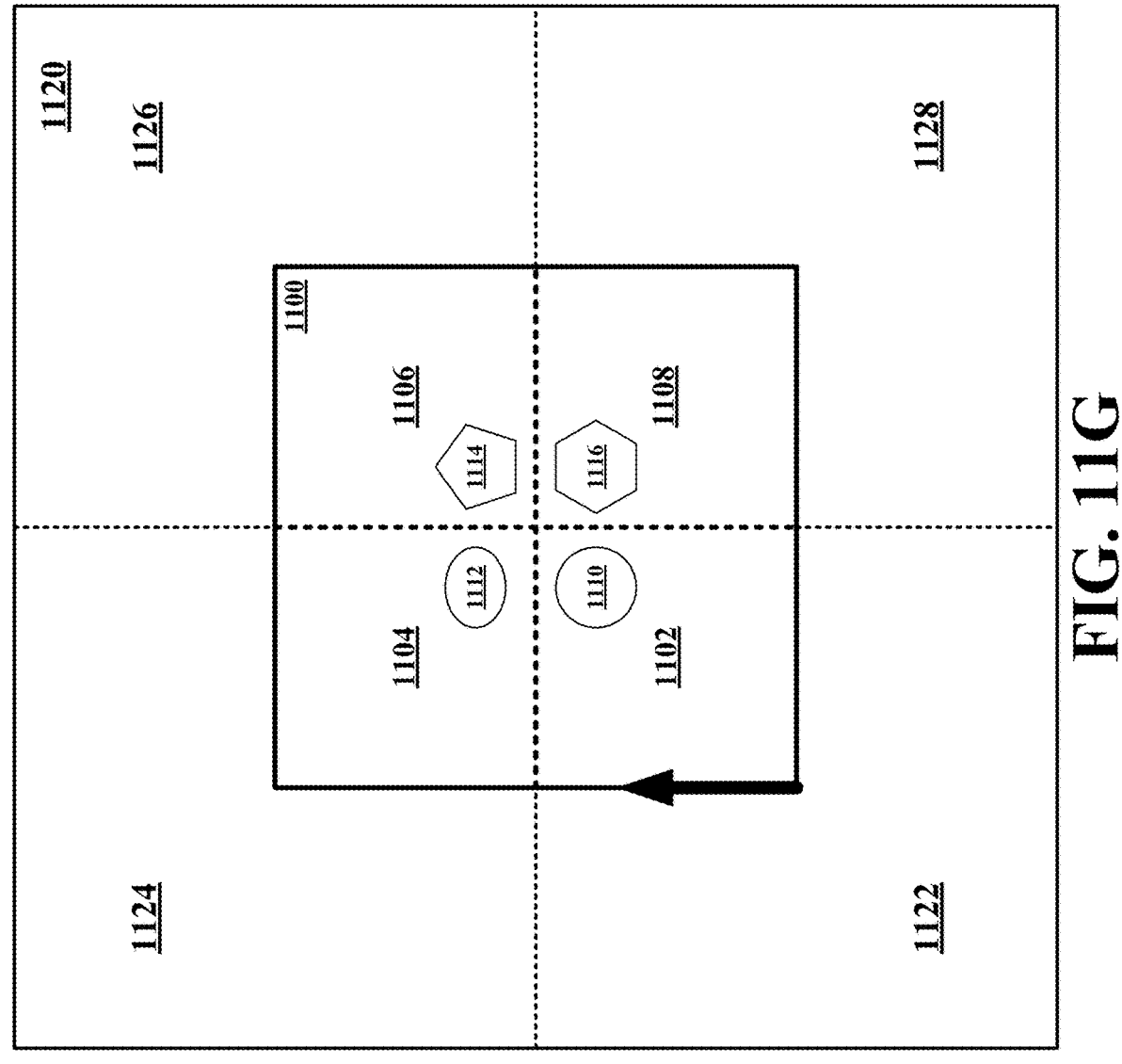
Figure 11H:
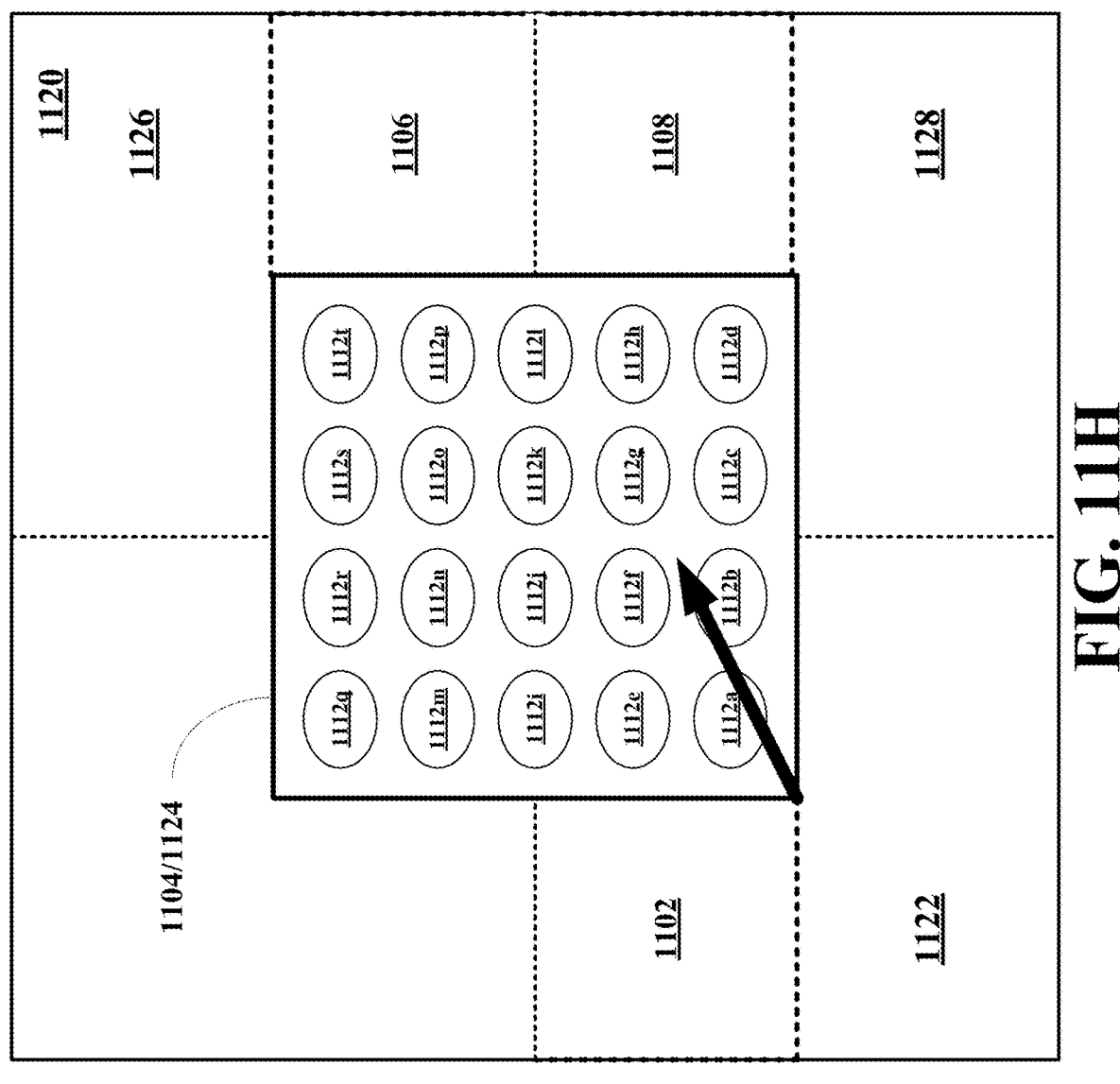
Figure 11I:
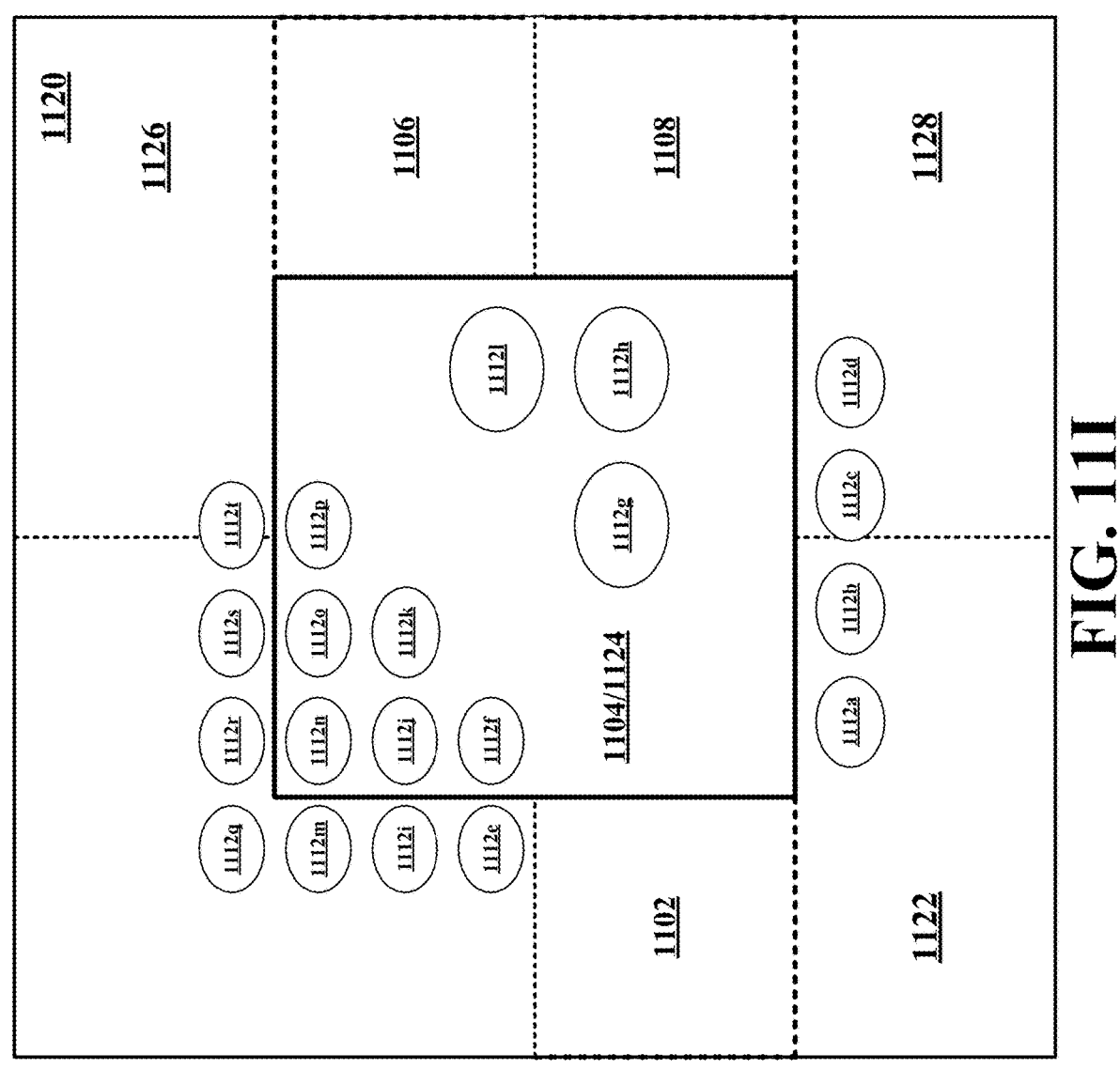
Figure 11J:
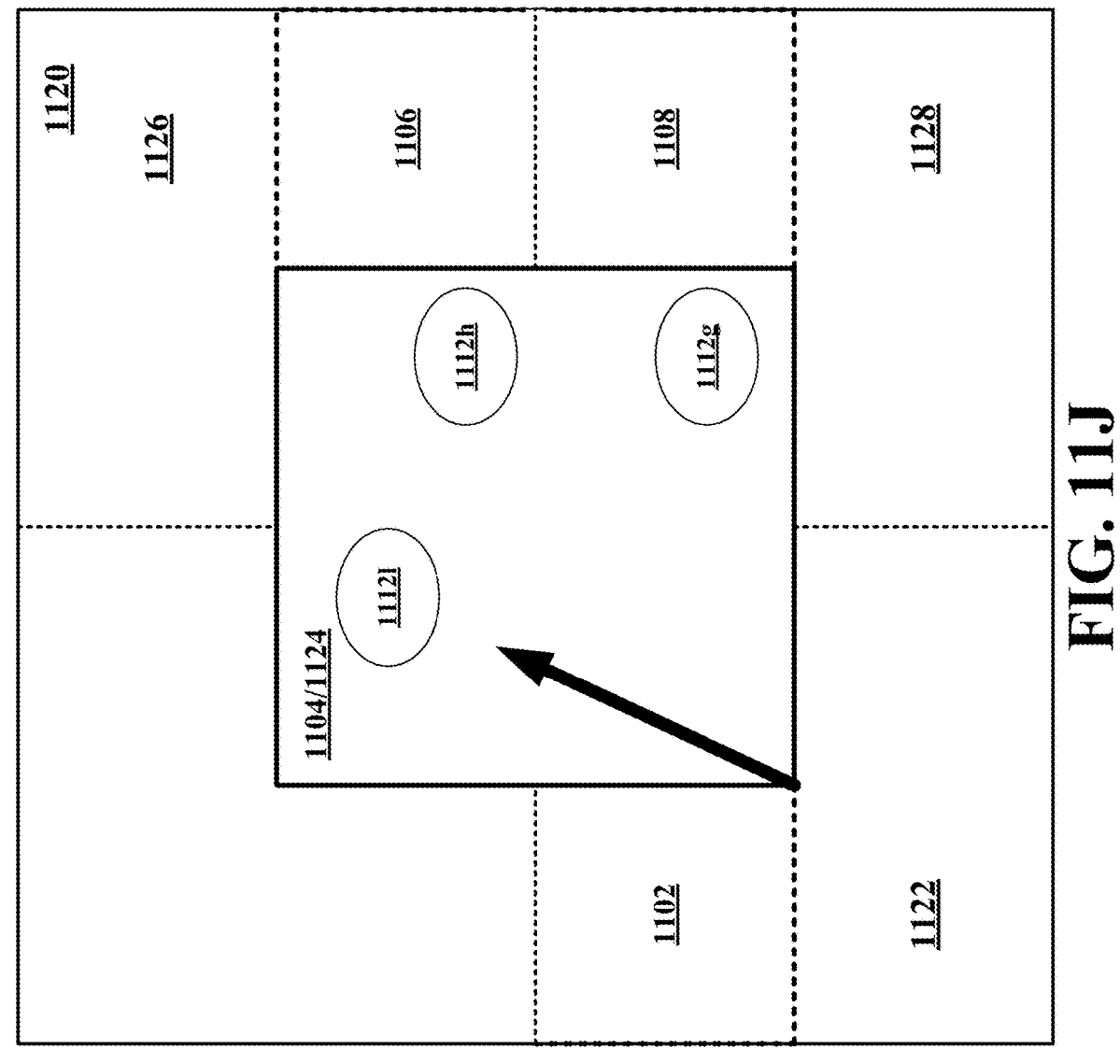
Figure 11K:
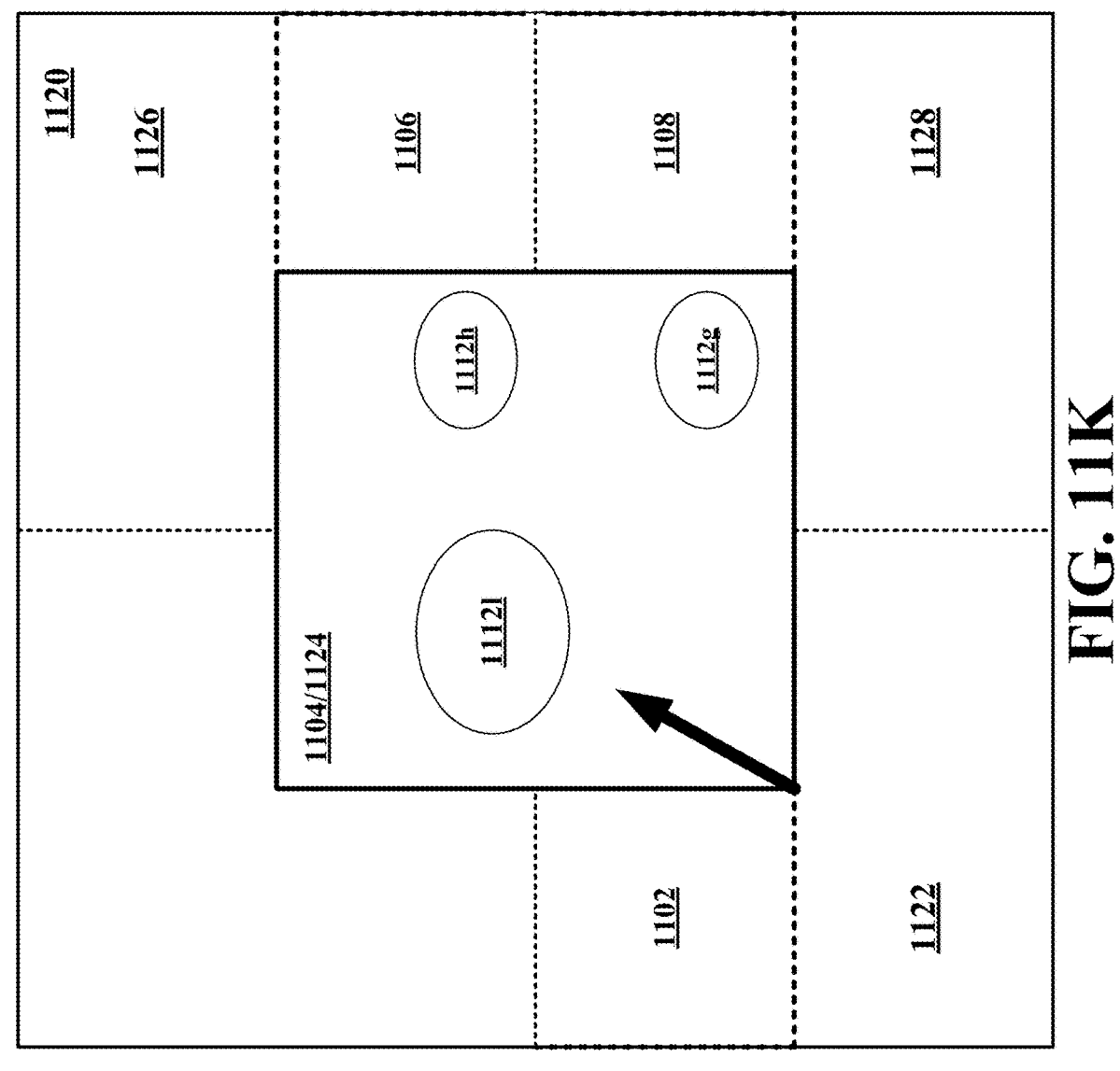
Figure 11L:
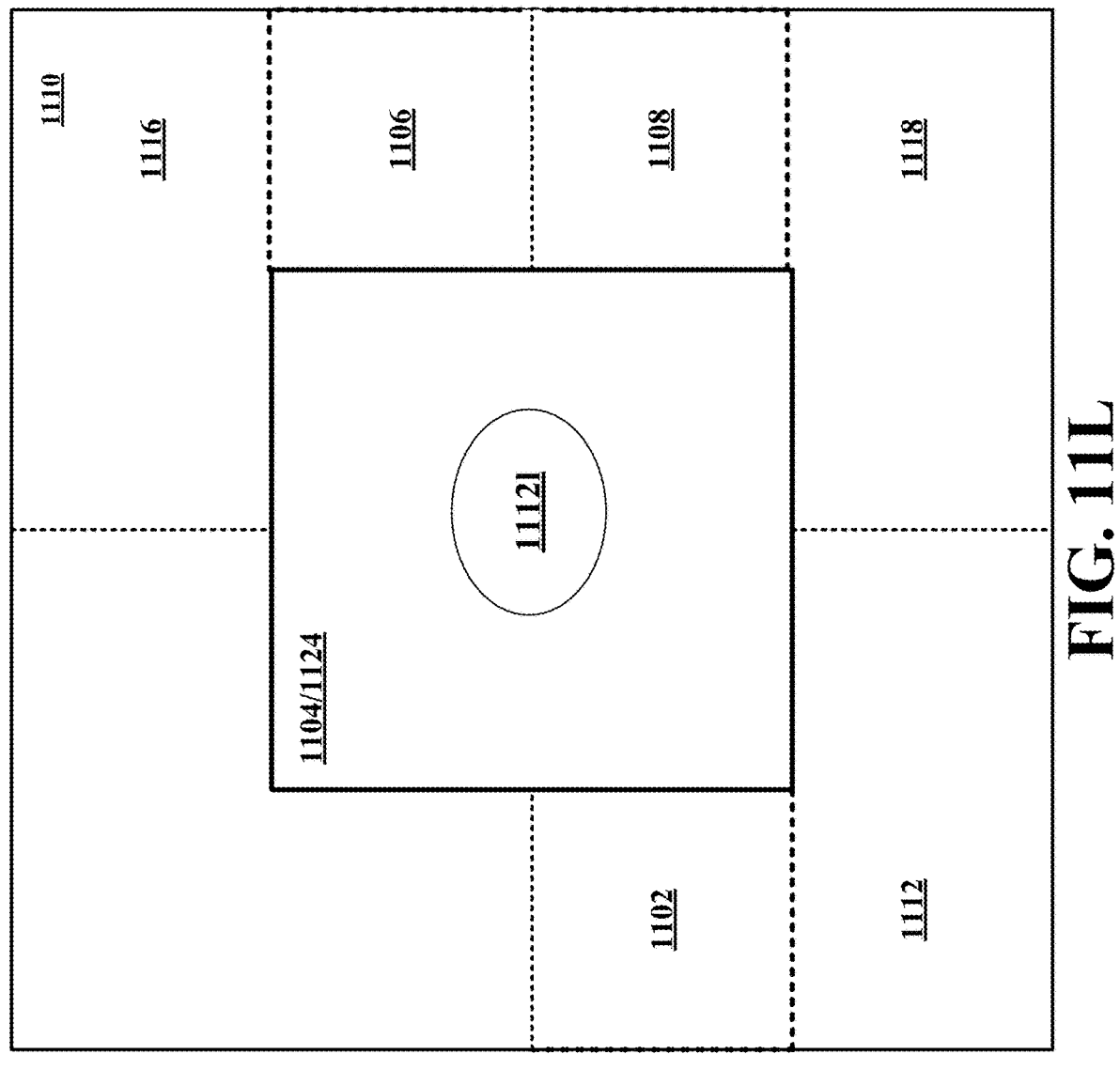
Figure 11M:
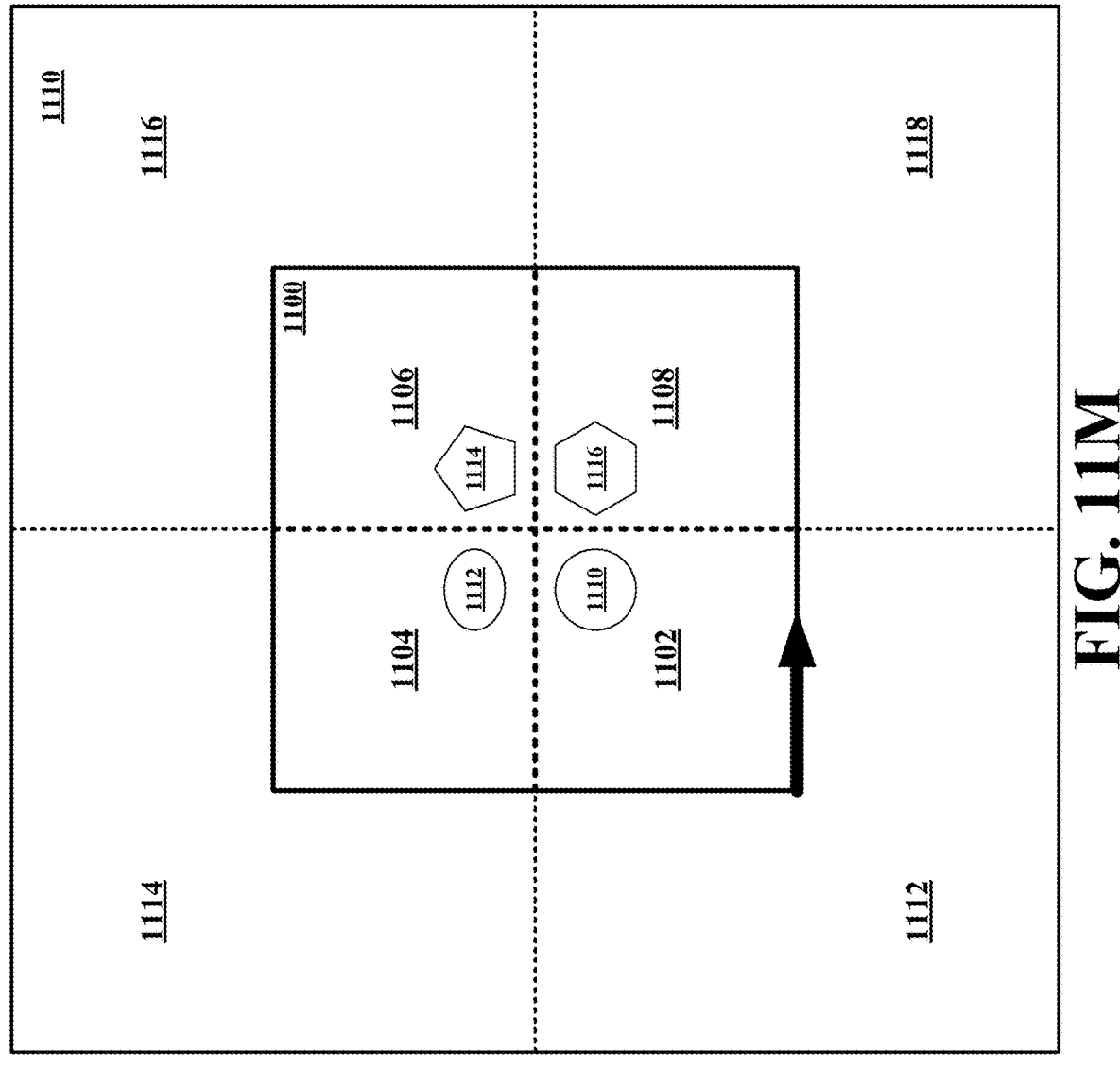
Figure 11N:
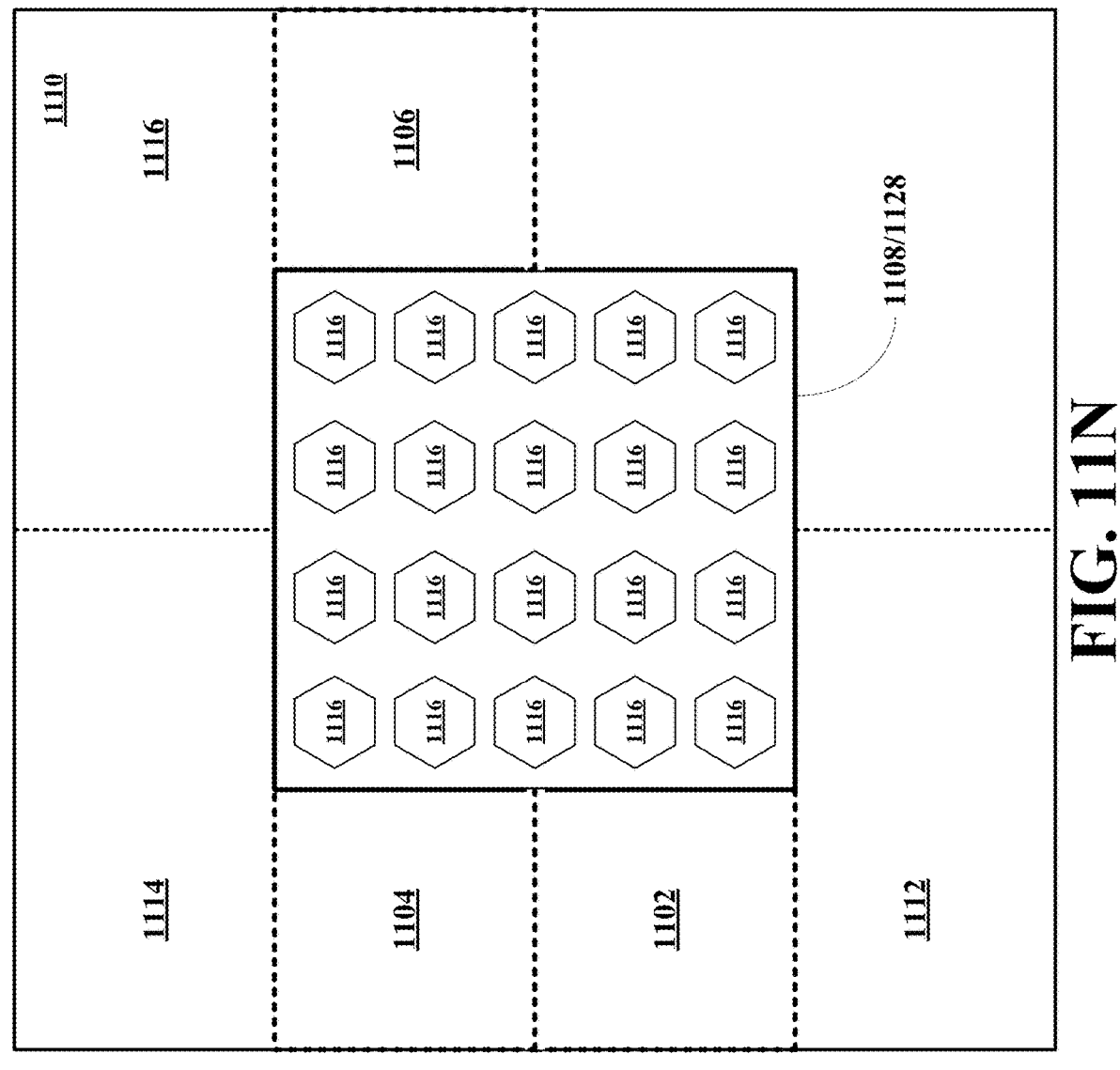
Figure 110:
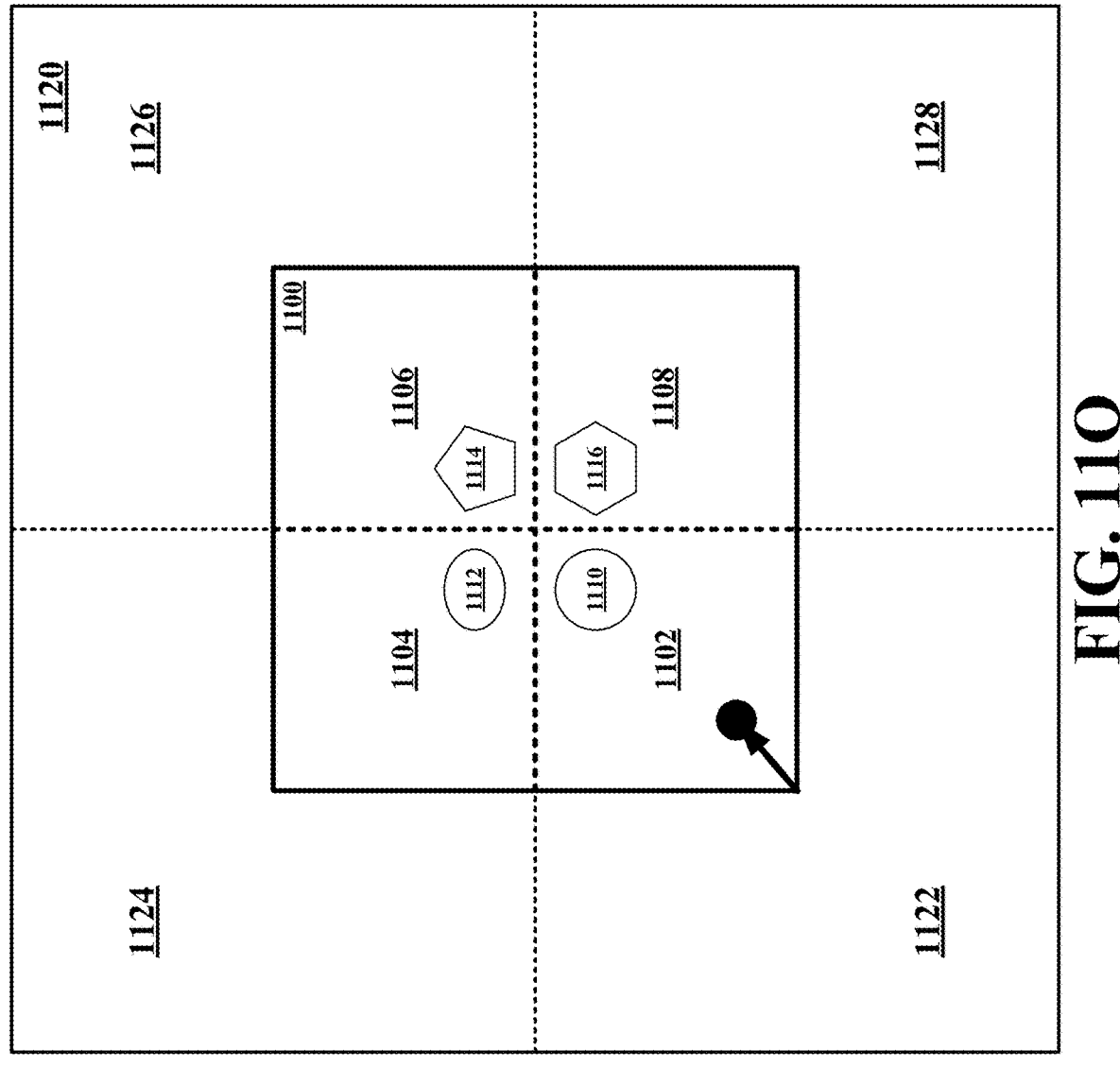
Figure 11P:
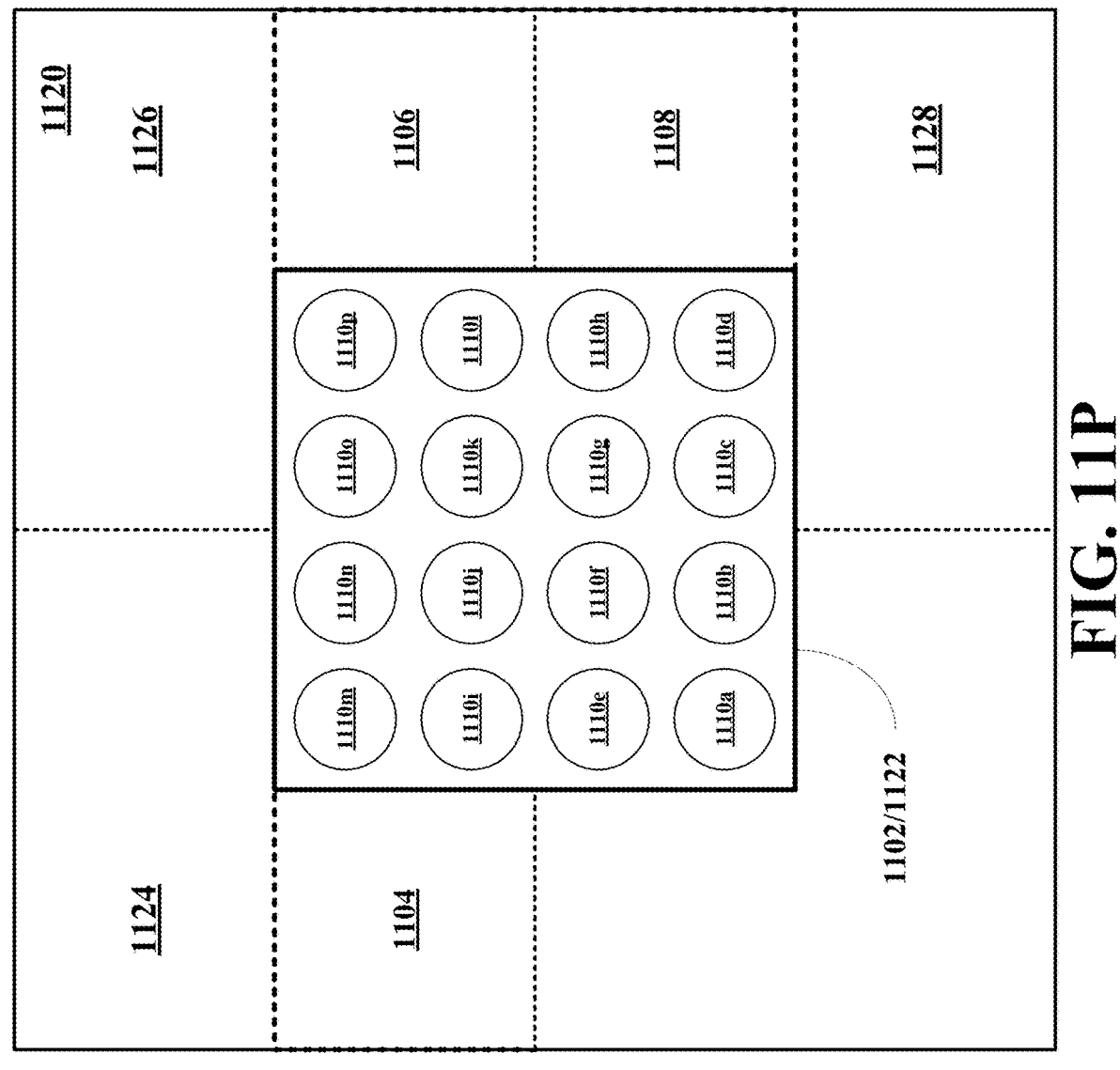

Referring now to FIGS. 11A-P, an embodiment of a system of this invention implemented on a device having a small display and a correspondingly small display window and an associated virtual display space.

Looking at FIG. 11A, a display window 1100 and a virtual display space 1120 associated with a small screen device is shown. The display window 1100 is divided into four zones 1102 (low left quadrant), 1104 (upper left quadrant), 1106 (upper right quadrant), and 1108 (lower right quadrant). The zone 1102 includes a representative object 1110 (circle); the zone 1104 includes a representative object 1112 (ellipse); the zone 1106 includes a representative object 1114 (pentagon); and the zone 1108 includes a representative object 1116 (hexagon). The virtual display space 1120 is also divided into four zones 1118 (low left quadrant), 1120 (upper left quadrant), 1122 (upper right quadrant), and 1124 (lower right quadrant) corresponding to the zones 1102, 1104, 1106, and 1108, respectively and includes all of the objects associated with that quadrant. Of course, it should be recognized that the window and space may be divided into more or less zones determined by the application, user preferences, or dynamic environmental aspects.

Looking at FIGS. 11B-F, illustrate motion to select the zone 1106 by moving across the display surface or above the display surface in a diagonal direction indicated the arrow in FIG. 11B. This motion causes the system to move the virtual space 1126 into the display window 1100 displaying selectable objects 1114$a$-$t$ associated with the zone 1106 as shown in FIG. 11C also showing additional motion indicated by the arrow. As the motion is in the general direction of objects 1114*j*, 11140, 1114*p*, 1114*s*, and 1114*t*, which expand and move toward the motion, while the remaining objects move away and even outside of the window 1100 as shown in FIG. 11D. Further motion permits the discrimination of the objects within the general direction, eventually honing in on object 1114*p*, which move toward the motion as shown in FIG. 11E and finally the system centers the object 1114*p* in the window 1100. Of course, if the object 1114*p* has subobjects, then motion may be used to select one of these subobjects until an actions in indicated. If the object 1114*p* is an activable object, then is activates. If the object 1114*p* include an controllable attributed, then motion in a positive direction or a negative direct with increase or decrease the attribute.

Looking at FIGS. 11G-L, illustrate motion to select the zone 1104 by moving across the display surface or above the display surface in a vertical direction indicated the arrow in FIG. 11G. This motion causes the system to move the virtual space 1124 into the display window 1100 displaying selectable objects 1112*a-t* associated with the zone 1104 as shown in FIG. 11H also showing additional motion indicated by the arrow. As the motion is in the general direction of objects 1112*g*, 1112*h*, and 1112*l*, which expand and move toward the motion, while the remaining objects move away and even outside of the window 1100 as shown in FIG. 11I. The target objects 1112*g*, 1112*h*, and 1112*l* may spread out so that further motion permits the discrimination of the objects within the general direction as shown in FIG. 11J eventually honing in on object 1112*l*, which move toward the motion as shown in FIG. 11K and finally the system centers the object 1112*l* in the window 1100 as shown in FIG. 11L. Of course, if the object 1112*l* has subobjects, then motion may be used to select one of these subobjects until an actions in indicated. If the object 1112*l* is an activable object, then is activates. If the object 1112*l* include an controllable attributed, then motion in a positive direction or a negative direct with increase or decrease the attribute.

Looking at FIGS. 11M-N, illustrate motion to select the zone 1108 by moving across the display surface or above the display surface in a horizontal direction indicated the arrow in FIG. 11M. This motion causes the system to move the virtual space 1128 into the display window 1100 displaying selectable objects 1116*a-t* associated with the zone 1108 as shown in FIG. 11N, object selection may proceed as described above.

Looking at FIGS. 11O-P, illustrate motion to select the zone 1102 by moving across the display surface or above the display surface in a diagonal motion followed by a hold indicated the arrow ending in a solid circle as shown in FIG. 11O. This motion causes the system to move the virtual space 1122 into the display window 1100 displaying selectable objects 1110*a-t* associated with the zone 1102 as shown in FIG. 11P.

It should be recognized that in FIG. 11A, all of the objects for each zone may appear is small format and moving toward one zone would cause those zone objects to move toward the center or center in the window, while the other zones and objects would either move away or fade out. Additionally, once activated, the device may have a single zone and motion within the zone would act in any and all of the methods set forth herein. Moreover, each zone may include groupings of objects or subzones having associated objects so that motion toward a given grouping of subzone would cause that grouping or subzone to move toward the motion in any and all methods described therein. These type of embodiments are especially will suited for watches, cell phones, small tablets, or any other device having a small display space.

Triggers

In certain embodiments, the systems and methods of this invention use a marker or an image/character recognition feature to trigger a menu or metadata that may then be used with menuing systems of this invention or any other menuing system. These markers or features are similar to a 2D or 3D barcode, emoticons, or any object or feature that may be recognized as a trigger. The trigger may be used unlock certain locked menus or lists for special access. The triggers may also be used at tailoring triggers to cause the systems and methods to invoke specific and pre-defined menus, objects, programs, devices, interfaces, attributes, or other specific or pre-defined items under the control of the systems and methods.

Methods for Establishing a Z-Axis for 3D Motion Processing

In certain embodiments, the systems and methods of this invention include using a camera or other distance sensitive sensor or measuring device to establish a 3D coordinate system for processing movement within the active zone of the camera or other type of sensor, where the systems and methods captures data from the camera or sensor to determine a point, points, region or regions that may be used to fix a z-direction for the 3D coordinate system. The systems and methods of this invention use movement towards or away from the point, points, region, or regions to determine z-direction movement, or movement along any axis or path. For example, if the systems and methods are displaying an image of a display device, then movement toward the point, points, region or regions causes a zoom in function, while movement away from the point, points, region or regions causes a zoom out function. For example, the z direction analysis may be based on a distance from a user's head, face, eye, eyes or other object within an active viewing zone of the camera(s) or sensor(s) relative to a wall, floor or hand on the backside of a phone or other device. The z-direction analysis may also provide a mechanism for scrolling through levels of zoom or other attribute control based on the analysis of z movement. At the same time, the systems and methods also respond to movement perpendicular to the z direction and tilt movement. Thus, the systems and methods of this invention may us z movement, perpendicular motion, tilt movement or mixtures and combinations of these movement types to invoke simply, compound or complex functions utilizing one or more of the movements. Thus, the systems and methods may use a give z distance to activate a specific level of a multi-level menu space, object/attribute space, process control space, gaming space or any other multilevel computing or control space, with movement at the z level in a plane intersecting the z-axis at the level (the z-axis is established when the systems or methods select a given point, points, region or regions as the fixed location from which z movement is analyzed) providing control of menus, objects, and/or attributes associated with that level. For example, the z location may correspond to a city map, where movement in the intersection plane would cause panning (right, left, up, down, circular right, circular left, tilt, etc.) and once the z-level is set by either a voice command or some other confirmatory act, zooming in and out may be coupled with the other movements to permit navigating through the map, which may be 3D in nature. Thus, a sensor on a mobile device captures information that the processing unit uses to establish a fixed point, points, region and/or regions (the point or region does not have to be stationary, but must be ascertainable in the environment as a relatively fixed point from which movement in the z-direction may be determined). Thus, if a user is holding a smart phone, then the systems and methods would pick out a point, points, region and/or regions to use to establish a z axis (e.g., a distance from the sensor to a tip of the user's nose), then once the point, points, region and/or regions are established, movement toward the point, points, region and/or regions causes a zoom in function and movement away from the point, points, region and/or regions causes a zoom out function. Holding the phone at a fixed distance from the point, points, region and/or regions and moving in the plane intersecting the z-axis at the location (may be perpendicular) causes panning in the direction of movement. Thus, if the movement is in the x-direction (right), then the system would pan right, left movement would result in a pan left, up in a pan up, down in a pan down, other movement in a compound pan, circular movement would pan in a circular manner, etc., while titling would result in changing other image features. Again, for navigating a multi-leveled environment, the systems and methods allow level selection to occur based on analyzing z movement initially as a scrolling function permitting level navigation, though this may be any attribute or control function, such as select, activate, scroll or attribute control, or any combination of these. Once a level has been identified, movement in a direction discernibly different from z movement or holding at the location for a time sufficient to allow selection of that level, which may be confirmed by some other action like voice confirmation, etc. Once the level is selected, the systems and methods analyze 3D movement to navigate through the menus, objects, and/or attributes associated with that level. Reactivating level navigation may be affected by moving outside of the active zone of the camera and/or sensor, issuing a voice command to exit the level, holding at the level for a time sufficient for the systems or methods to exit the level selection, using a pose gesture or motion event (like a jerk), or turning the device perpendicular so the camera or sensor loses the ability to see the point, points, region and/or regions, or by any other movement that the systems and methods may use to reactive the level selection process using z movement.

Construction of Three Axis Coordinate Systems Using Stationary Points

Embodiments of this invention relate to systems, apparatuses, and methods that use at least one stationary point or relatively stationary point viewable from a camera or other sensor or sensors associated with a mobile devices such as a cell phones, tablets, or other mobile devices from which z-motion may be assessed so that three axes may be associated with the mobile devices. This three axis configuration permits movement to be pure x-movement, pure y-movement, pure z-movement or movement including two or more components of pure x-movement, pure y-movement, or pure z-movement. Additionally, the same or other motion sensors will permit x-tilt movement, y-tilt movement, compound tilt movement, right rotational movement, left rotational movement, rotation perpendicular to the x axis, rotation perpendicular to the y axis, rotation perpendicular to the y axis, compound rotational movement, tilt/rotation movement, or other types of non-pure movement to be detected and processed. A z-axis motion may initiate certain menu selections, and then subsequent x and y motions may provide navigation, selection and activation and attribute controls.

The stationary point is any point viewable by the camera that is not moving or is moving at a rate that is sufficiently slow that movement toward or away from the stationary point will allow the motion sensors and/or processing units to assess and determine z-movement.

Figures 12A, 12B:
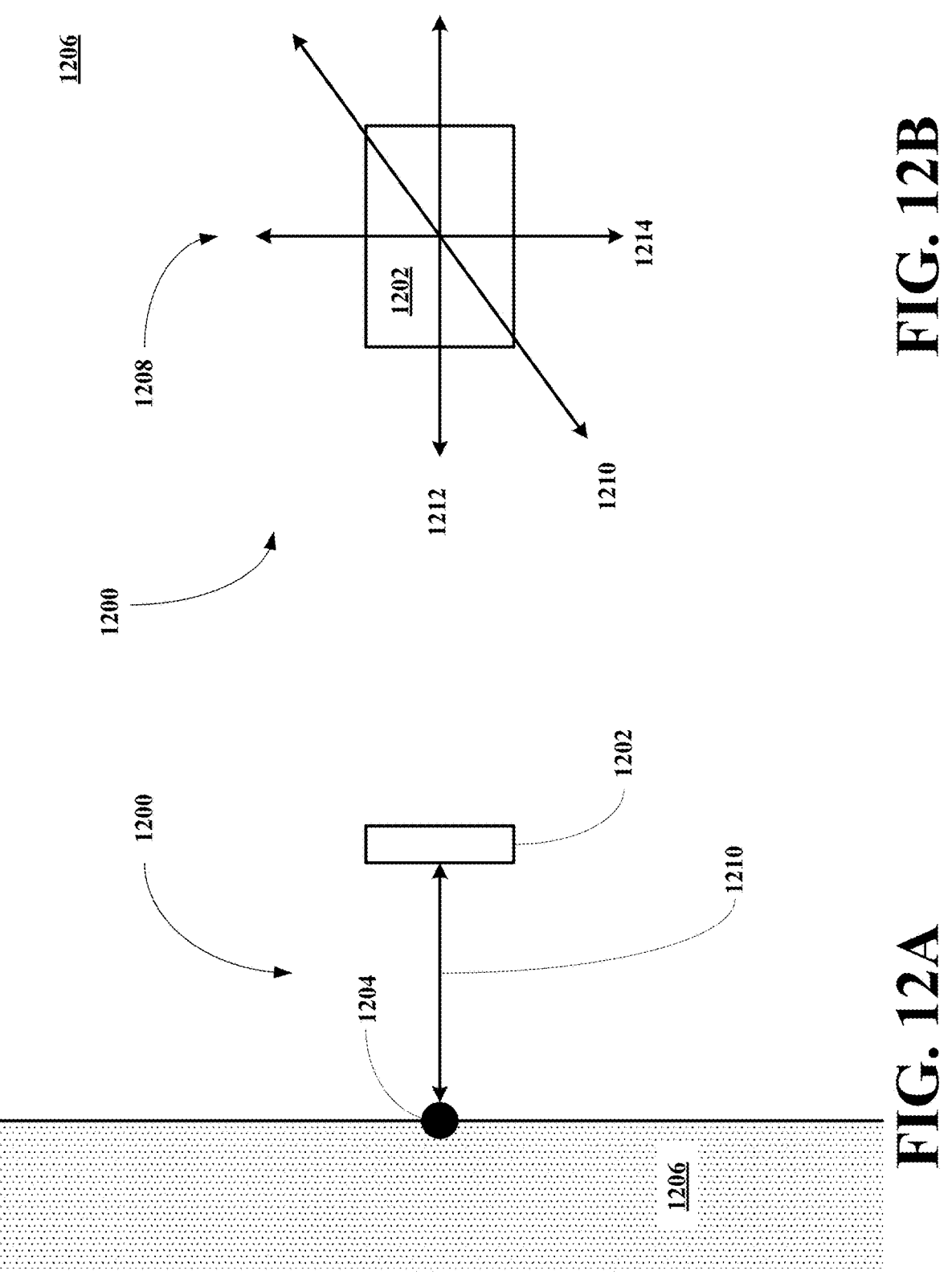
FIGS. 12A&B depict an embodiment of a motion based system of this invention for establishing a usable 3 axis system for decomposing simple and complex motion so that all manners of motion may be used to motion through 2D and 3D object/attributes so that the objects/attributes may be selected and activated solely through motion as set forth above as the motions set forth above are mainly illustrated in 2D, the creation of the three axis system now gives a mechanism for addressing 3D movement.

Referring now to FIGS. 12A&B, a mobile device apparatus, such a headset or wearable AR/VR device, or phone, etc., generally 1200, is shown to include a mobile device 1202 and a stationary point 1204 is shown here associated with a wall 1206. Relative to the stationary point 1204, a three axis system 1208 is configured showing an z-axis 1210 associated with movement toward or away from the stationary point 1204 and an x-axis 1212 and a y-axis 1214 perpendicular to the z-axis 1210. With the establishment of the 3 axis system 1208 configured, movement of the mobile device 1202 in any direction can be decomposed into x, y and z components with the z axis established relative to move to and from the stationary point 1204. Relative to this axis system 1208, linear, rotational and titling movement may be de-constructed and decomposed so that all types of movement may be determined for used in navigating through motion based selection and activation protocols set forth above.

The inventor has found that a 3D axis system may be constructed for a handheld mobile device or any other type of device by selecting a fixed, frame fixed or relatively fixed point for which motion to and from (toward or away from) acts as a changes in a z direction while motion perpendicular to the z direction constitutes x, y or a combined xy motion, rotation, tilting, or other combinational movements.

Embodiments of this invention relate to systems, apparatuses, and methods that use at least one stationary point or relatively stationary point viewable from a camera or other sensor-enabled system associated with a mobile devices such as a cell phones, tablets, head worn devices, other wearable devices or other mobile devices from which z-motion may be assessed so that three axes may be associated with the mobile devices. This three axes configuration permits movement to be pure x-movement, pure y-movement, pure z-movement or movement including two or more components of pure x-movement, pure y-movement, or pure z-movement. Additionally, the same or other motion sensors will permit x-tilt movement, y-tilt movement, compound tilt movement, right rotational movement, left rotational movement, rotation perpendicular to the x axis, rotation perpendicular to the y axis, rotation perpendicular to the y axis, compound rotational movement, tilt/rotation movement, or other types of non-pure movement to be detected and processed.

The stationary point is any point viewable by the camera(s) or other sensors that is not moving or is moving at a rate that is sufficiently slow that movement toward or away from the stationary point will allow the motion sensors and/or processing units to assess and determine z-movement.

Figure 13A:
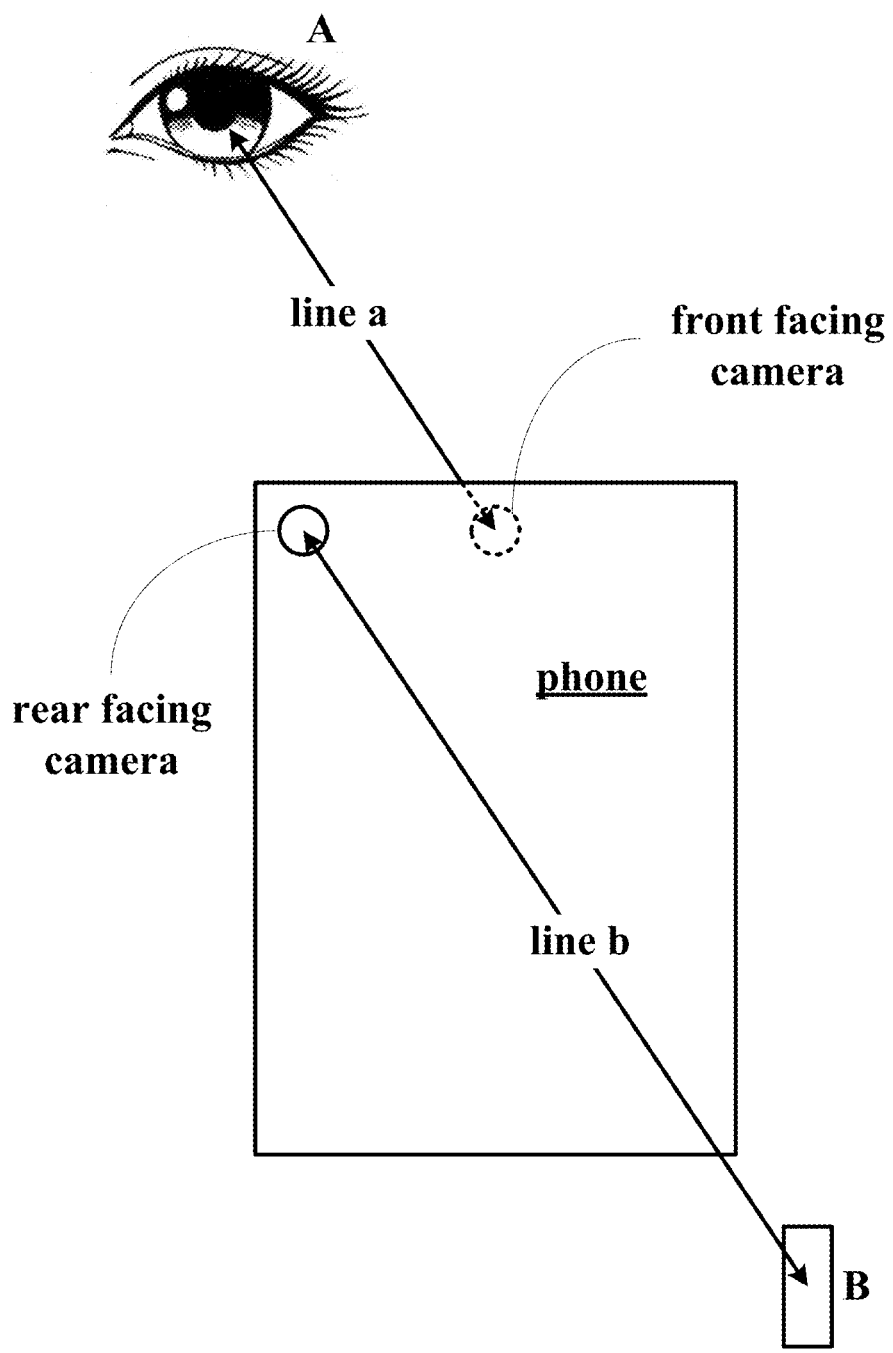
FIGS. 13A&B depict an embodiment of a motion based system of this invention for establishing a usable 3 axis system for decomposing simple and complex motion so that all manners of motion may be used to motion through 2D and 3D object/attributes so that the objects/attributes may be selected and activated solely through motion as set forth above as the motions set forth above are mainly illustrated in 2D, the creation of the three axis system now gives a mechanism for addressing 3D movement.

User sets distance A from eye or face to phone along a line a using a sensor (e.g., camera) in phone as shown in FIGS. 13A&B. User touches screen to set magnification level associated with eye or face for forward facing camera. Upon touch, move right to increase zoom of display image (text, picture, website, etc.), move left to zoom out or decrease image. Of course, any direction in a plane perpendicular to or not co-linear with a line between the eye/face and the phone may be used to cause a zoom in or zoom out action.

Once set, this is the reference point. Moving the phone closer zooms in, moving the phone away zooms out (may be opposite of this as well). A distance B between an object in front of (FIG. 13A) or behind the phone (FIG. 13B) along a line b may be used for some functionality, as may both distances A and B or any combination of sensed objects and/or distances, where each B is a distance from the phone to an object on the other side or same side of the phone as the distance A to the eye/face associated with a line b between the phone and the object B using either the forward or backward camera of the phone.

By moving left or right, up or down or in any xy direction in a plane substantially perpendicular to the line a, system would cause the image to pan in the particular direction of motion. If right, then the system would pan right; if left, the system could pan left; if up, the system would pan up; if down, the system would pan down; if a direction between right, left, up, down, then the system would pan in that direction. For example, moving diagonally between up and right would cause a corresponding pan. These motion could be used in combination so that moving right and closure would pan right and zoom in.

Optionally, the screen (phone display or display of any other device or mobile device) may be rocked or rotated to see the full image or a combination of tilting, rocking, sideways, up/down, or other sensed movement. This may be done via accelerometers, gyroscopes, or by using triangulation from one or more cameras and/or objects for determining eye/face A, line a, objects B and lines b, or combinations thereof.

There should be a buffer zone so movement detected by the sensor does not affect the zoom/pan functions. Moving past the buffer, scrolls to next level of zoom/pan. This same approach may be used for AR/VR environments for panning, zooming, or other attribute controls. This may also be described as a threshold event.

Certain embodiments include text readers for people with presbyopia. Certain embodiments include methods where movement is detected to set a distance from a user eye/facial feature and once set, touching the screen sets a zoom level to a particular setting. To see the image/text not displayed, rotate the phone slightly or move left/right/up/down to bring hidden portions into view. Moving the phone closer to the face or eye or further away, past the buffer zone to scroll through zoom levels—discreet zoom steps or continuous zoom after moving past a threshold z amount, the buffer zone. Returning to the original zone, returns the level originally set. After the user is over, the next time it is desired, touching the screen and moving towards the magnifying glass and do not change settings. Last setting is made active. Alternatively, use forward facing camera to set relative distance for z-axis (zoom control). Rotating or xy movement may be determined by difference between front and rear facing cameras.

Figure 13B:
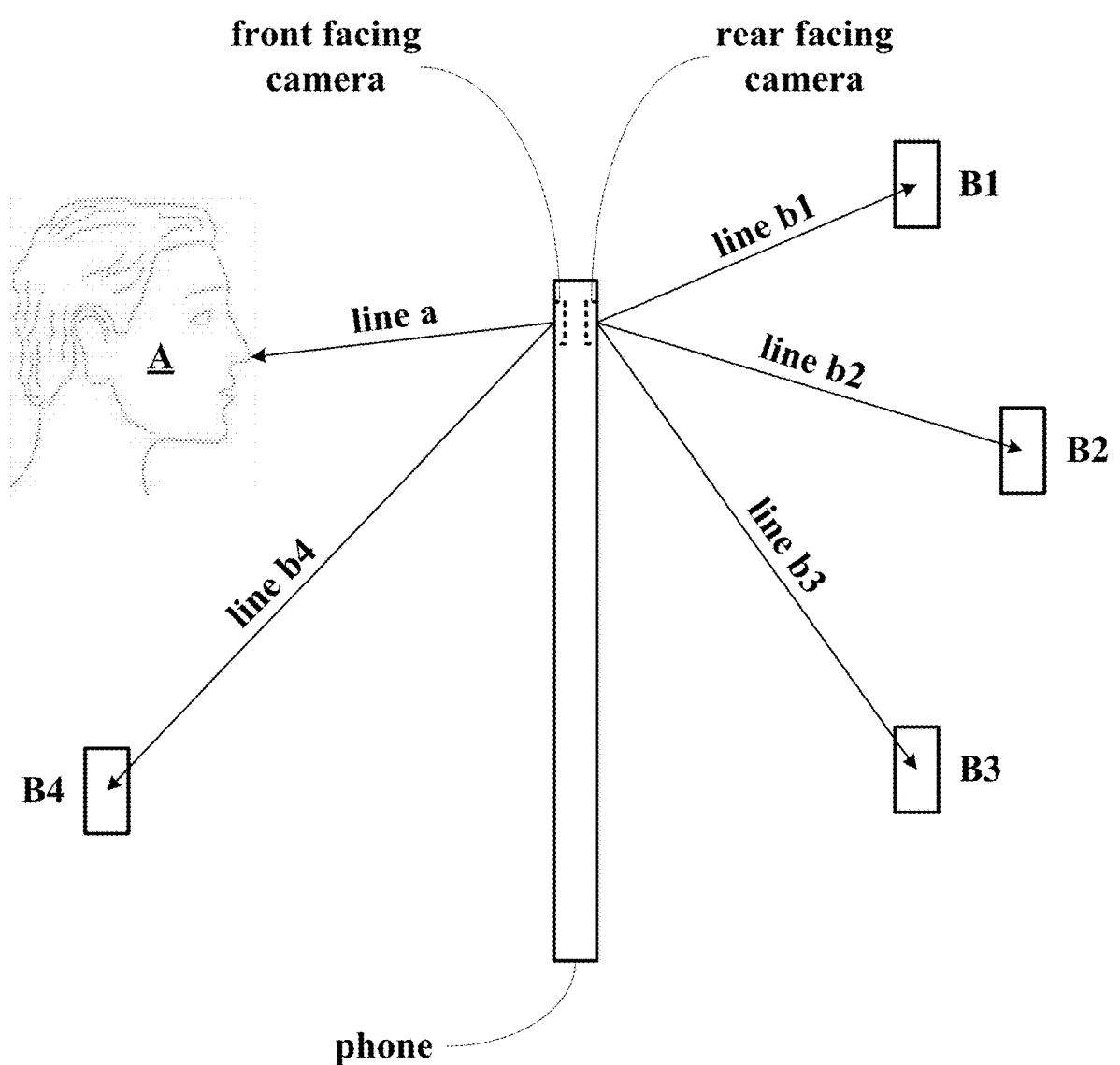

Looking at FIG. 13B, a profile of a human face A is shown with a line a between a fixed point on the face, the tip of the nose and a front facing camera of a phone. The figure also shows four objects B1, B2, B3, and B4 defining line b1, line b2, line b3, and line b4 to the object from the rear facing camera for objects B1, B2, and B3 and the front facing camera for the object B4.

Blob Data

Figure 14A:
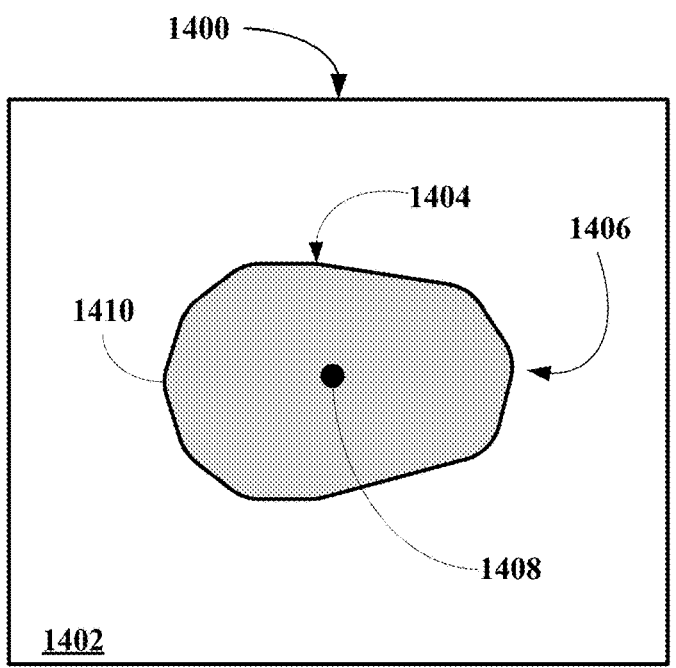
FIGS. 14A-J depict an embodiment of systems, apparatuses, and/or interfaces of this disclosure using blob data to control a real and/or virtual object and/or objects.

Referring now to FIG. 14A, an embodiments of a system, apparatus, and/or interface of this disclosure, generally 1400, is shown to include a touch screen 1402 having an active touch area 1404 corresponding to a user's thumb or finger in contact with the screen 1402 located in a central portion 1406 of the screen 1402. The active touch area 1404 represents blob data associated with all touch screen elements activated within the touch area 1404. The area 1404 is shown to include a centroid 1408, which represent data normally used in processing systems, apparatuses, and or interfaces to determine movement and/or movement properties, and an outer edge 1410. The blob data with or without the centroid data may represent a unique identifier for determining to whom the thumb or finger belongs. Depending on the sensitive of the touch screen (number of elements per unit of area and whether the elements are pressure sensitive-output varies with pressure), the blob data may not only include shape information, but may include pressure distribution information as well as the underlying skeletonal structure of the thumb or finger and or skin surface textural features (fingerprint features) adding further unique identifiers aspects.

Figure 14B:
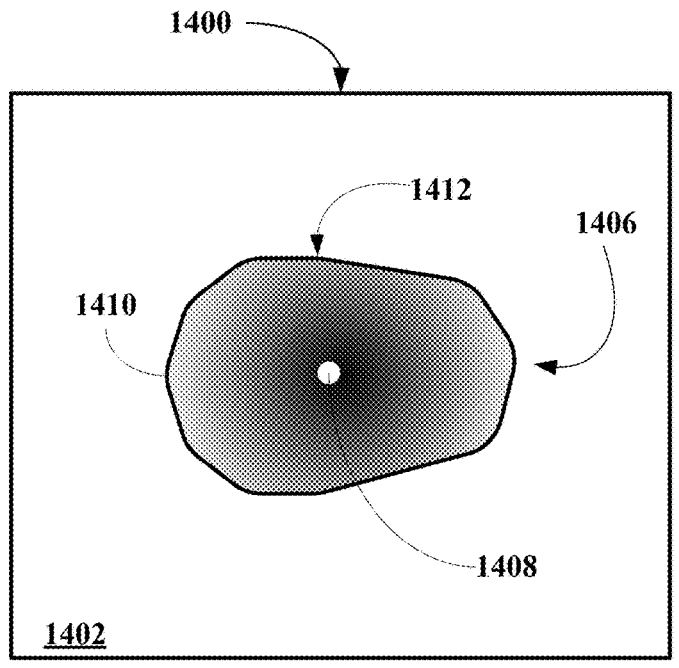
Figure 14C:
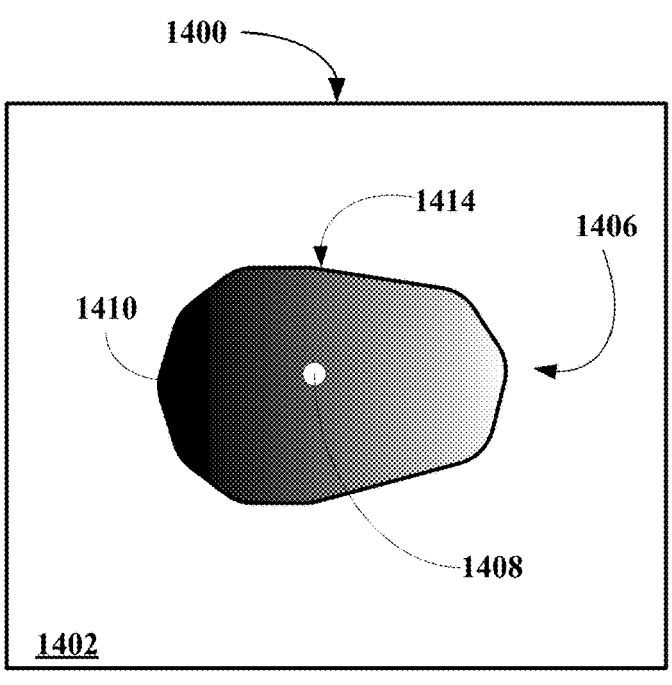
Figure 14D:
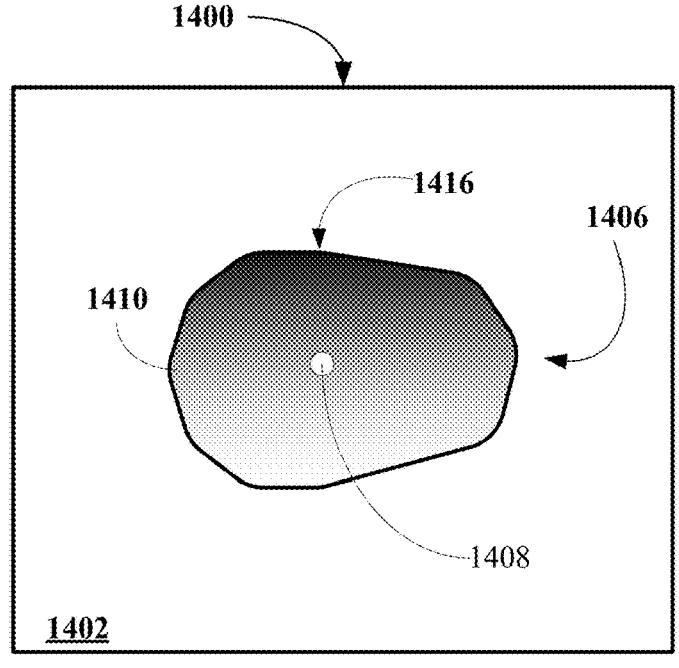

Looking at FIGS. 14B-D, the area 1404 is shown to have three different pressure distributions 1412, 1414, and 1416. Looking at FIG. 14B, a first or central pressure distribution 1412 represents an initial contact pressure distribution of the thumb or finger on the screen 1404, where the first pressure distribution is centered about the centroid 1408 having the greatest pressure or density of a field or number of element of a sensor activated, etc., around the centroid 1408 and decreasing radially towards an outer edge 1410 of the area 1404. Looking at FIG. 14C, a second or left edge pressure distribution 1414 represents a change in the central pressure distribution 1412 from a centroid based distribution to a left edge distribution, i.e., the second or left edge distribution has an increased pressure at the left edge and decreasing towards the right edge of the active area 104. Looking at FIG. 14D, a third pressure distribution 1416 represents a change in the first pressure distribution 1412 from a centroid based distribution or the second or left edge pressure distribution 1414 to a top edge pressure distribution, i.e., the third or top edge distribution has an increased pressure at the top edge and decreasing towards the bottom edge of the active area 1404.

The distribution 1414 of FIG. 14C represents the user changing contact pressure from the center type contact pressure distribution 1412 to the tip type contact pressure distribution 1414. The distribution 1416 of FIG. 14D represents the user changing contact pressure from the center type contact pressure distribution 1412 to the top edge type contact pressure distribution 1416. Each of these contact pressure distributions may cause the systems, apparatuses, and/or interfaces and methods of this disclosure to transition between menu levels, change the orientation of displayed menu items, transition between pre-defined menu levels, etc. Additionally, the transitions from the pressure distribution 1412 to one of the other distributions 1414 and 1416 may be used in the motion based control systems, apparatuses, and/or interfaces of this disclosure.

Figure 14E:
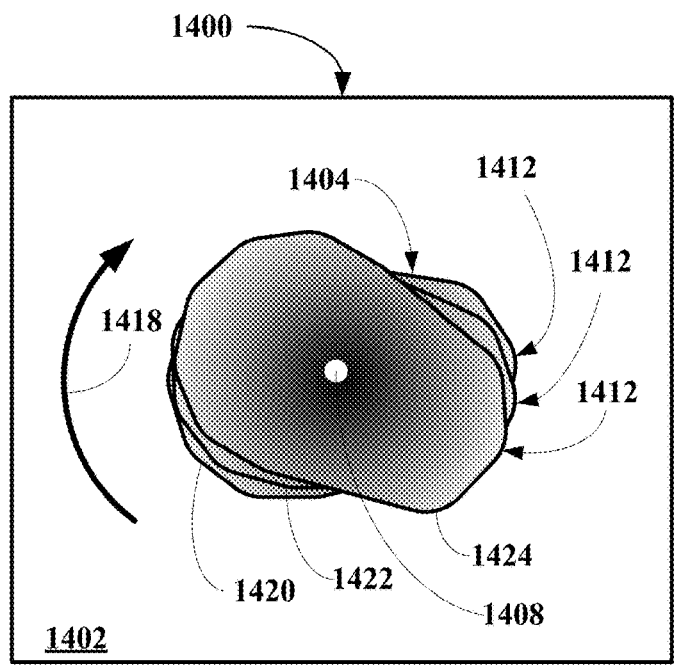

Looking at FIG. 14E, the area 1404 is shown to undergo a clockwise rotationally movement 1418 from an initial rotational orientation 1420 to an intermediate rotational orientation 1422, and to a final rotational orientation 1424. These orientations 1420, 1422, and 1424 have the same or substantially the same pressure distribution as the central pressure distribution 1412. These changes in rotation orientation represented by orientations 1420, 1422 and 1424 may represent very minute movements, i.e., movements sufficiently small and insufficient to result in a change of the centroid data, but may be sufficient from a blob data perspective to determine, analyze, and/or predict movement for use in the motion based control systems, apparatuses, and/or interfaces of this disclosure. Thus, subtle changes in the pressure distributions within the area 1404 may result in movement and/or movement property determination, anticipation, and/or prediction. Again, the blob data with or without the centroid data may be used in the motion based control systems, apparatuses, and/or interfaces of this disclosure.

Figure 14F:
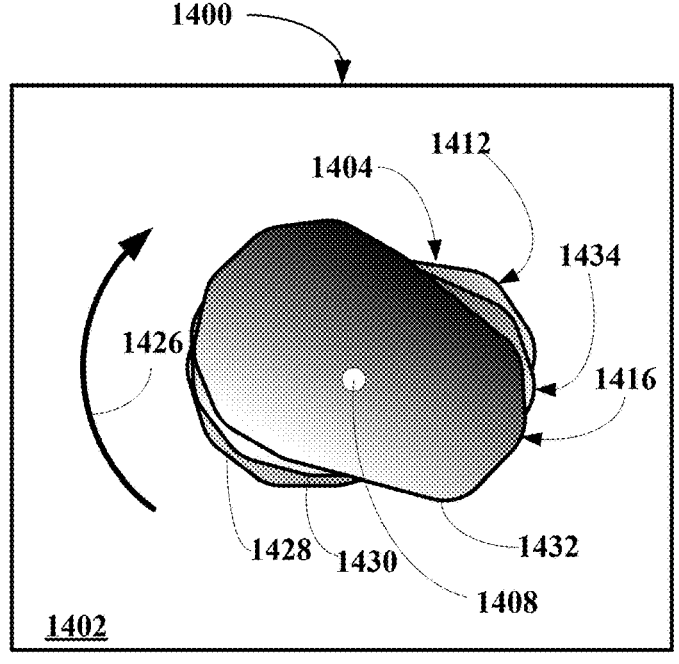

Looking at FIG. 14F, the area 1404 is shown again to undergo a clockwise rotationally movement 1426 from an initial rotational orientation 1428 to an intermediate rotational orientation 1430, and to a final rotational orientation 1432 and simultaneous to undergo changes in pressure or density of activated element distributions from the central pressure or density of activated element or signalo density distribution 1412 to an intermediate pressures distribution 1434, and finally to the top edge pressure distribution 1416. Such compound blob data changes, e.g., rotational movement coupled with changes in the pressure distributions, again may be used with or without the centroid data to analyze, determine and predict the movement and movement properties, especially if the movement is small resulting in insufficient movement of the centroid to indication any movement at all. Thus, subtle changes in the pressure distribution of the area 1404 may result in movement determination, anticipation and/or prediction for use in the motion based control systems, apparatuses, and/or interfaces of this disclosure. Moreover, this compound movement may be used to effect different levels of control within a given environment controlled by the motion based control systems, apparatuses, and/or interfaces of this disclosure. It should be recognized that pressure is used here as an example of a sensor that have elements that are activate when a value of the element exceeds some threshold activation criterion or criteria. The sensors may be field sensors, image sensors, or any other sensor that include a plurality of elements that are activated via interaction with or detection of a body, body part, or member being controlled by a body or body part. Thus, pressure distribution may be replaced by any distribution of an output of property or characteristics of a sensor.

Figure 14G:
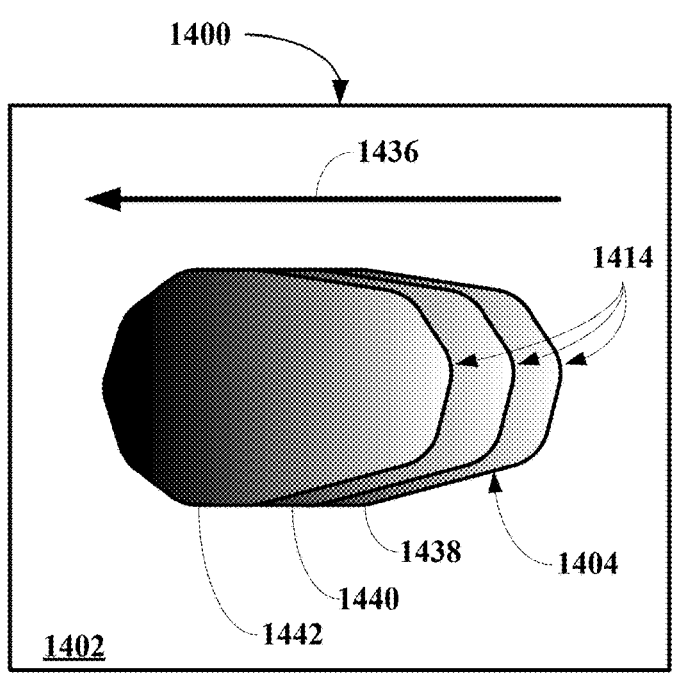

Looking at FIG. 14G, the area 1404 is shown to undergo a left movement 1436 from an initial location 1438 to an intermediate location 1440, and finally to a final location 1442. In this case, all three of the locations 1438, 1440, and 1442 had the same or substantially the same pressure distribution comprising the left edge distribution 1414. These locations 1438, 1440, and 1442 may represent very minute movements, i.e., movement is sufficiently small and insufficient to result in a change of the centroid data, but may be sufficient from a blob data perspective to determine, analyze, and/or predict movement for use in the motion based control systems, apparatuses, and/or interfaces of this disclosure. Thus, subtle changes in the pressure distribution within the area 1404 may result in movement determination, anticipation, and/or prediction for use in the motion based control systems, apparatuses, and/or interfaces of this disclosure. Again, the blob data with or without the centroid data may be used to determine movement and movement properties for control of the systems of this disclosure.

Figure 14H:
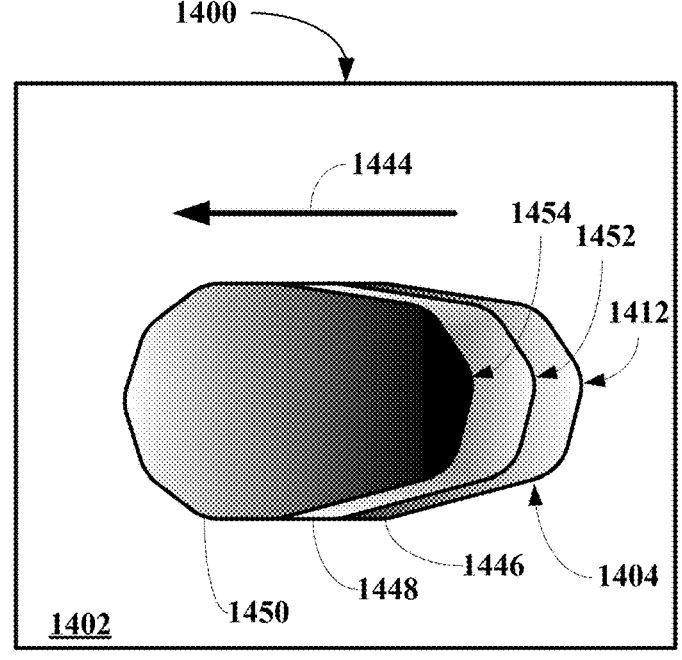

Looking at FIGS. 14H, the area 1404 is shown again to undergo a left movement 1444 from an initial location 1446 to an intermediate location 1448, and finally to a final location 1450 and simultaneous to undergoes changes in pressure distributions from the pressure distribution 1412 to an intermediate pressure distribution 1452, and finally to a backward pressure distribution 1454. Such compound blob data changes, e.g., rotational movement coupled with changes in the pressure distributions, again may be used with or without the centroid data to analyze, determine and predict the movement and movement properties, especially if the movement is small resulting in insufficient movement of the centroid to indication any movement at all. Thus, subtle changes in the pressure distribution of the area 1404 may result in movement determination, anticipation and/or prediction for use in the motion based control systems, apparatuses, and/or interfaces of this disclosure. Moreover, this compound movement may be used to effect different levels of control within a given environment controlled by the motion based control systems, apparatuses, and/or interfaces of this disclosure.

Figure 14I:
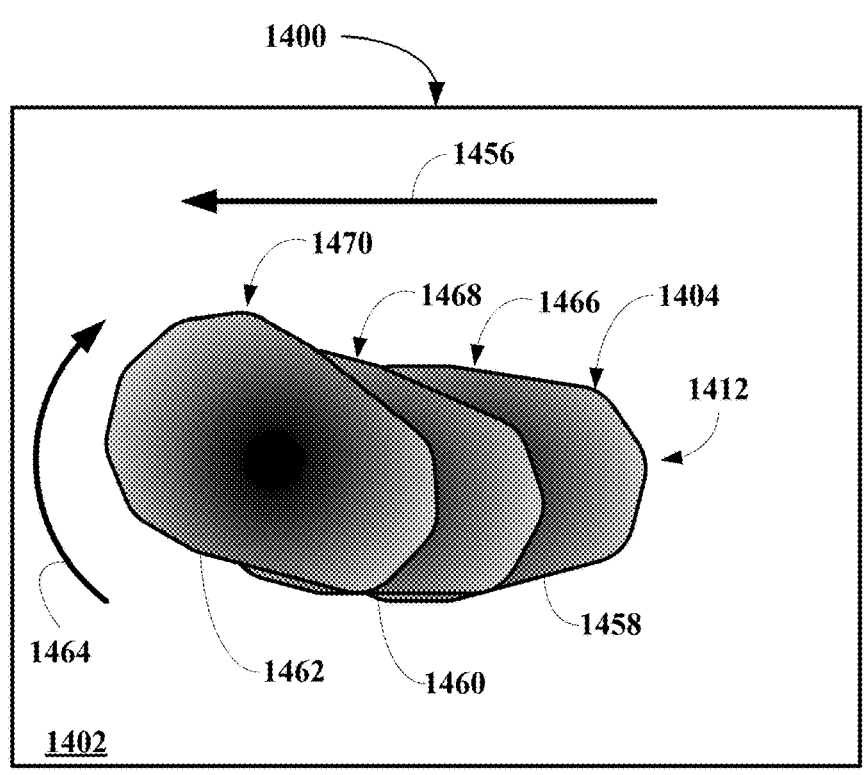

Looking at FIGS. 14I, the area 1404 is shown to undergo a left linear movement 1456 from an initial location 1458 to an intermediate location 1460, and to a final location 1462 and simultaneously to undergo a clockwise rotationally movement 1464 from an initial rotational orientation 1466 to an intermediate rotational orientation 1468, and to a final rotational orientation 1470, while maintaining the same or substantially the same central pressure distribution 1412. Such compound blob data changes, e.g., linear movement coupled with rotational movement, may be used with or without the centroid data to analyze, determine and predict the movement and movement properties, especially if the movement is small resulting in insufficient movement of the centroid to indication any movement at all. Thus, subtle changes in the pressure distribution of the area 1404 may result in movement determination, anticipation and/or prediction for use in the motion based control systems, apparatuses, and/or interfaces of this disclosure. Moreover, this compound movement may be used to effect different levels of control within a given environment controlled by the motion based control systems, apparatuses, and/or interfaces of this disclosure.

Figure 14J:
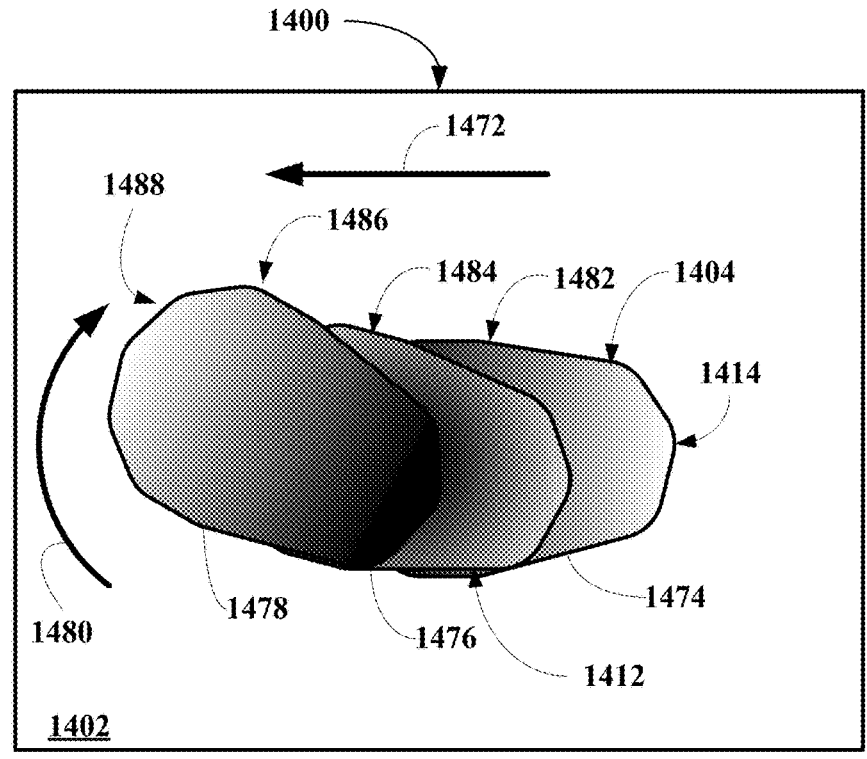

Looking at FIGS. 14J, the area 1404 is shown again to undergo a left linear movement 1472 from an initial location 1474 to an intermediate location 1476, and to a final location 1478, simultaneously to undergo a clockwise rotationally movement 1480 from an initial rotational orientation 1482 to an intermediate rotational orientation 1484, and to a final rotational orientation 1486, and simultaneously to undergo a change in a pressure distribution from the left edge pressure distribution 1414 to the central pressure distribution 1412, and to a right edge pressure distribution 1488. Such compound blob data changes, e.g., linear movement and rotational movement coupled with changes in the pressure distributions, again may be used with or without the centroid data to analyze, determine and predict the movement and movement properties, especially if the movement is small resulting in insufficient movement of the centroid to indication any movement at all. Thus, subtle changes in the pressure distribution of the area 1404 may result in movement determination, anticipation and/or prediction for use in the motion based control systems, apparatuses, and/or interfaces of this disclosure. Moreover, this compound movement may be used to effect different levels of control within a given environment controlled by the motion based control systems, apparatuses, and/or interfaces of this disclosure.

Figure 15A:
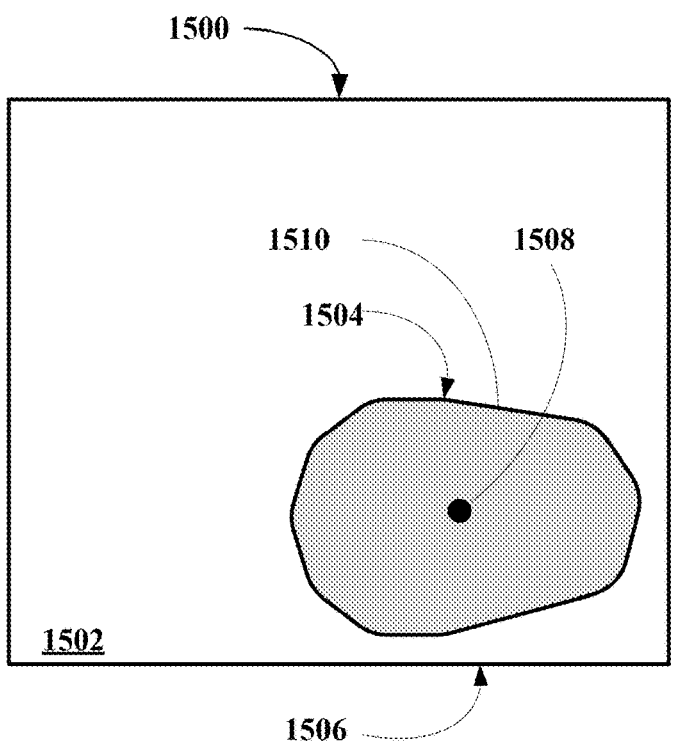
FIGS. 15A-J depict another embodiment of systems, apparatuses, and/or interfaces of this disclosure using blob data to control a real and/or virtual object and/or objects.

Referring now to FIG. 15A, an embodiments of a touch screen interface of this disclosure, generally 1500, is shown to include a touch screen 1502 having a touch area 1504 corresponding to a user's thumb or finger in contact with the screen 1502 located in a lower right portion 1506 of the screen 1502. The touch area 1504 represent blob data associated with all touch screen elements activated (exceeding a threshold pressure value) by the user thumb or finger. The area 1504 is shown to include a centroid 1508, which represent the data normally used in systems to determine movement and an outer edge 1510. The blob data with or without the centroid data may represent a unique identifier to determine user identity. Depending on the sensitive of the touch screen (number of elements per unit area and whether the elements are simply ON or OFF elements or pressure sensitive elements (i.e., output varies with pressure)), the blob data may not only include shape information, but may include pressure distribution information as well as underlying skeletal structure features and/or properties of the thumb or finger and/or a skin surface textural features or properties, which may add further uniqueness aspects for the purposes of user identification.

Figure 15B:
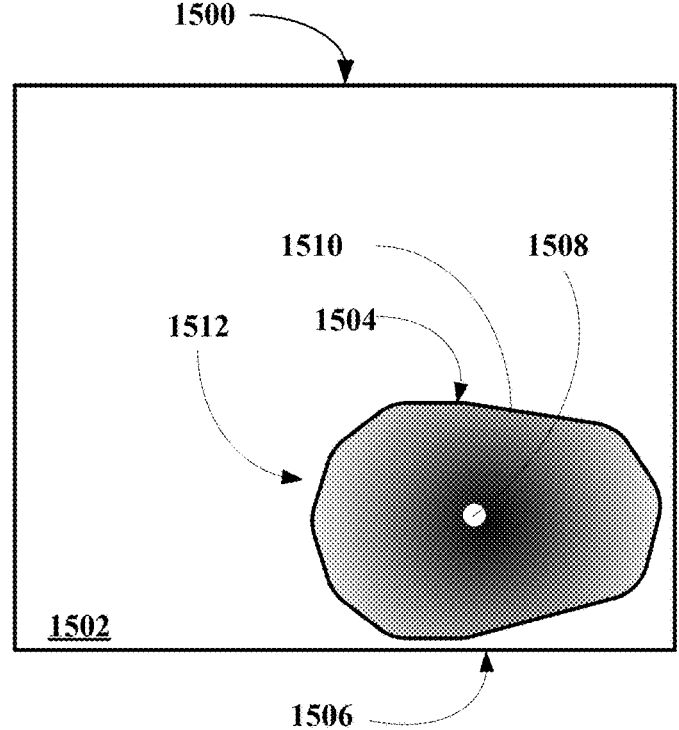
Figure 15C:
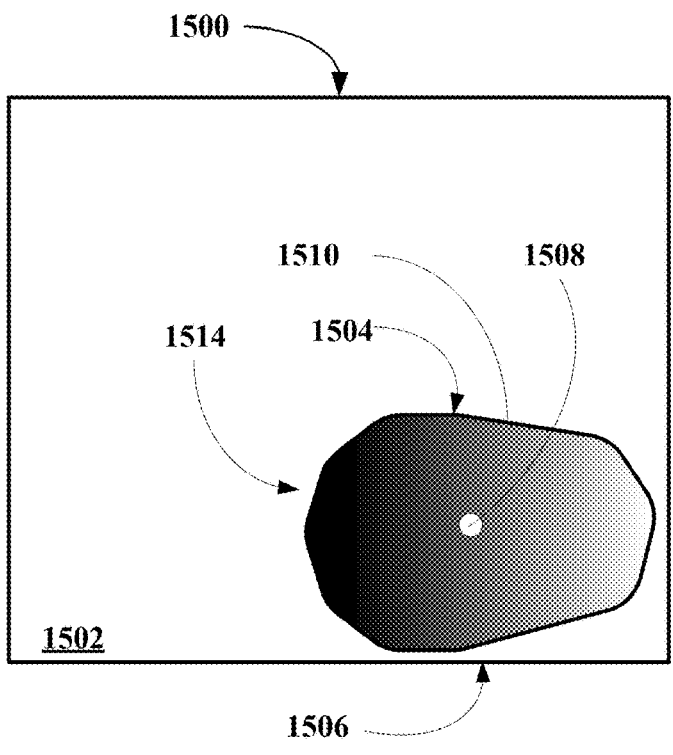
Figure 15D:
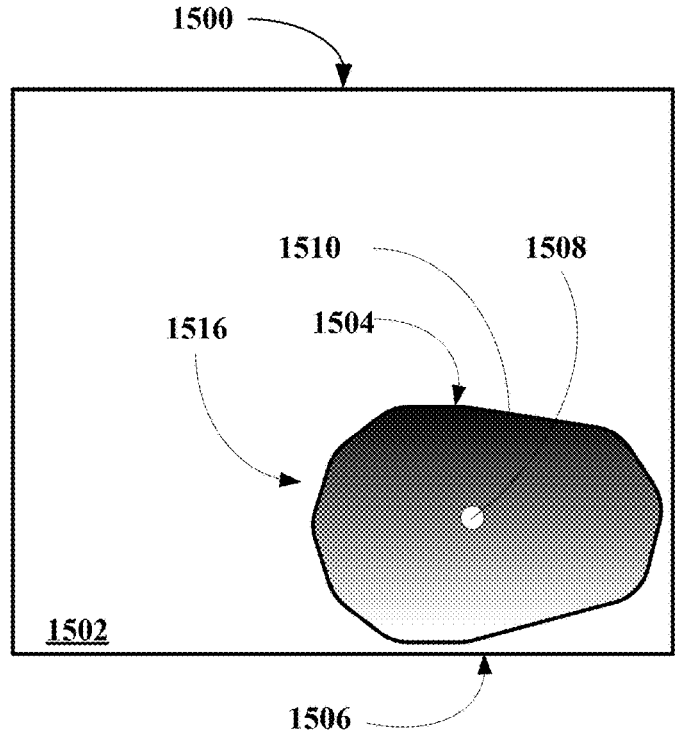

Looking at FIGS. 15B-D, the area 1504 is illustrate having three different pressure distributions 1512, 1514, and 1516. Looking at FIG. 15B, the first or central pressure distribution 1510 represents an initial contact of the thumb or finger with the screen 1502, while the other distributions 1514 and 1516 may represent changes in the pressure distribution over time due to the user changing contact pressure within the area 1504. Looking at FIG. 15C, the central pressure distribution 1512 changes to a left edge pressure distribution 1514. Looking at FIG. 15D, the central pressure distribution 1512 or the left edge pressure distribution 1514 changes to the top edge pressure distribution 1516. Each of these pressure distributions may cause the motion based control systems, apparatuses, and/or interfaces of this disclosure to transition between menu levels, change the orientation of displayed menu items, transition between pre-defined menu levels, etc. Additionally, the transition from the pressure distribution 1512 to one of the other distributions 1514 and 1516 may be used as a movement by the motion based control systems, apparatuses, and/or interfaces of this disclosure.

Figure 15E:
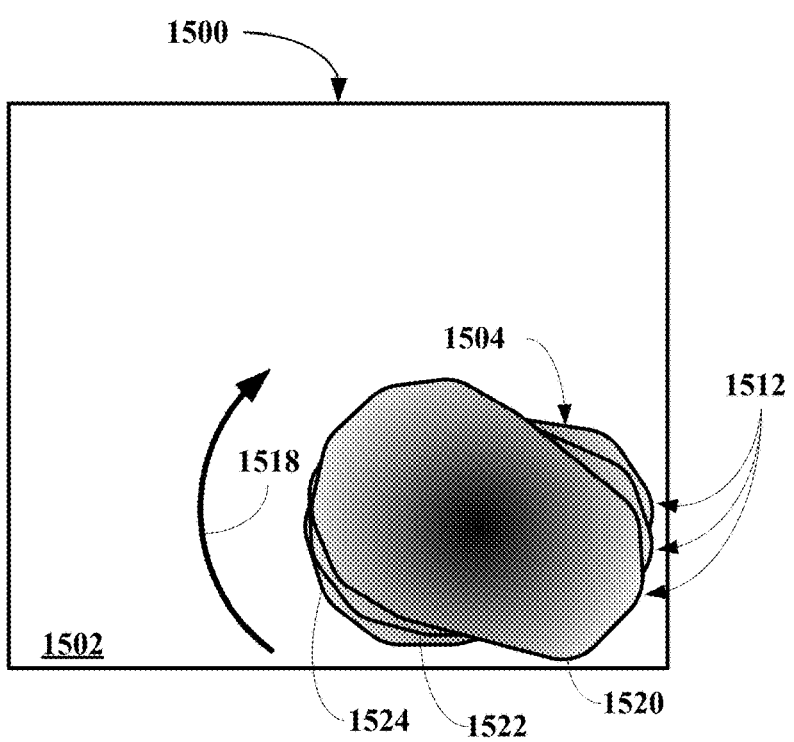

Looking at FIGS. 15E, the area 1504 is shown to undergo a clockwise rotationally movement 1518 from an initial rotational orientation 1520 to an intermediate rotational orientation 1522, and to a final rotational orientation 1524. These orientations 1520, 1522, and 1524 have the same or substantially the same central pressure distribution 1512. These changes in rotation orientation represented by orientations 1520, 1522 and 1524 may represent very minute movements, i.e., movements sufficiently small and insufficient to result in a change of the centroid data, but may be sufficient from a blob data perspective to determine, analyze, and/or predict movement for use in the motion based control systems, apparatuses, and/or interfaces of this disclosure. Thus, subtle changes in the pressure distributions within the area 1504 may result in movement and/or movement property determination, anticipation, and/or prediction. Again, the blob data with or without the centroid data may be used in the motion based control systems, apparatuses, and/or interfaces of this disclosure.

Figure 15F:
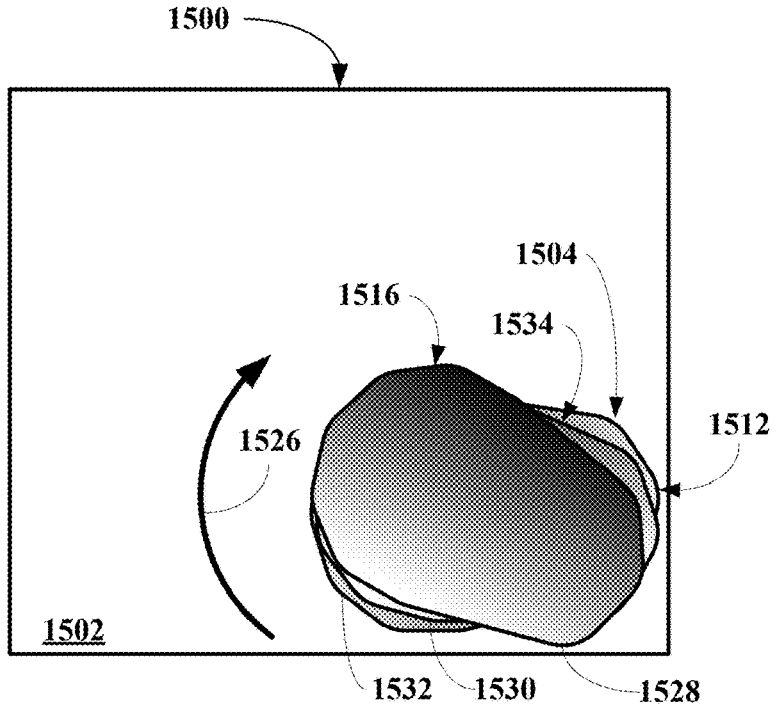

Looking at FIGS. 15F, the area 1504 is shown again to undergo a clockwise rotationally movement 1526 from an initial rotational orientation 1528 to an intermediate rotational orientation 1530, and to a final rotational orientation 1532 and simultaneous to undergo changes in pressure distributions from the central pressure distribution 1512 to an intermediate pressures distribution 1534, and finally to the top edge pressure distribution 1516. Such compound blob data changes, e.g., rotational movement coupled with changes in the pressure distributions, again may be used with or without the centroid data to analyze, determine and predict the movement and movement properties, especially if the movement is small resulting in insufficient movement of the centroid to indication any movement at all. Thus, subtle changes in the pressure distribution of the area 1504 may result in movement determination, anticipation and/or prediction for use in the motion based control systems, apparatuses, and/or interfaces of this disclosure. Moreover, this compound movement may be used to effect different levels of control within a given environment controlled by the motion based control systems, apparatuses, and/or interfaces of this disclosure.

Figure 15G:
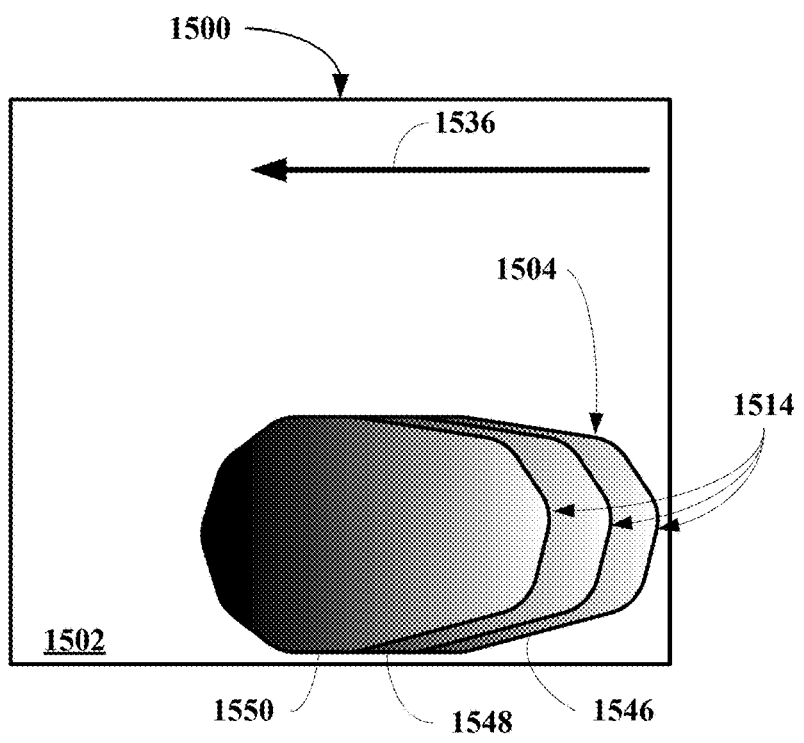

Looking at FIGS. 15G, the area 1504 is shown to undergo a left movement 1536 from an initial location 1538 to an intermediate location 1540, and finally to a final location

1542. In this case, all three of the locations 238, 240, and 242 had the same or substantially the same pressure distribution comprising the left edge distribution 1514. These locations 238, 240, and 242 may represent very minute movements, i.e., movement is sufficiently small and insufficient to result in a change of the centroid data, but may be sufficient from a blob data perspective to determine, analyze, and/or predict movement for use in the motion based control systems, apparatuses, and/or interfaces of this disclosure. Thus, subtle changes in the pressure distribution within the area 1504 may result in movement determination, anticipation, and/or prediction for use in the motion based control systems, apparatuses, and/or interfaces of this disclosure. Again, the blob data with or without the centroid data may be used to determine movement and movement properties for control of the systems of this disclosure.

Figure 15H:
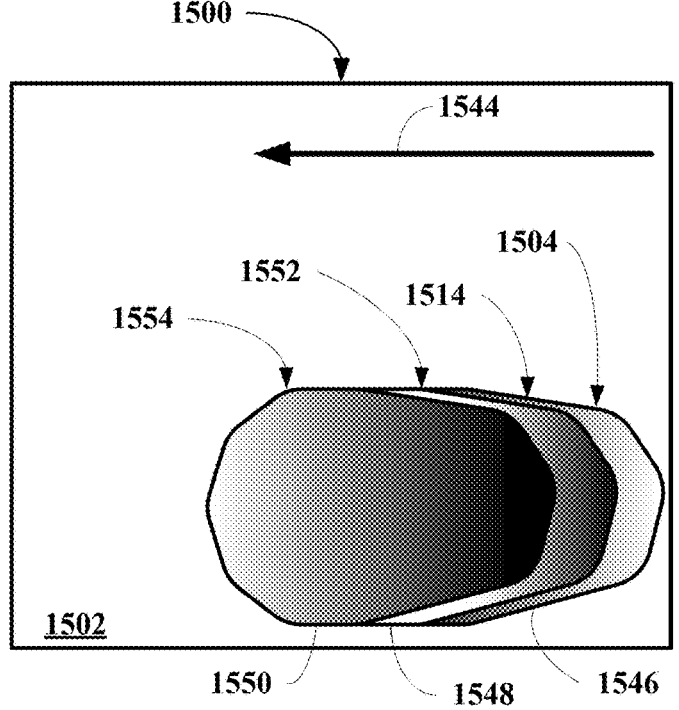

Looking at FIGS. 15H, the area 1504 is shown again to undergo a left movement 1544 from an initial location 1546 to an intermediate location 1548, and finally to a final location 1550 and simultaneous to undergo changes in pressure distributions from the left edge pressure distribution 1514 to an intermediate pressure distribution 1552, and finally to a right edge pressure distribution 1554. Such compound blob data changes, e.g., rotational movement coupled with changes in the pressure distributions, again may be used with or without the centroid data to analyze, determine and predict the movement and movement properties, especially if the movement is small resulting in insufficient movement of the centroid to indication any movement at all. Thus, subtle changes in the pressure distribution of the area 1504 may result in movement determination, anticipation and/or prediction for use in the motion based control systems, apparatuses, and/or interfaces of this disclosure. Moreover, this compound movement may be used to effect different levels of control within a given environment controlled by the motion based control systems, apparatuses, and/or interfaces of this disclosure, including centroid data may then act as a verification of user intent, or to modify the non-centroid results.

Figure 15I:
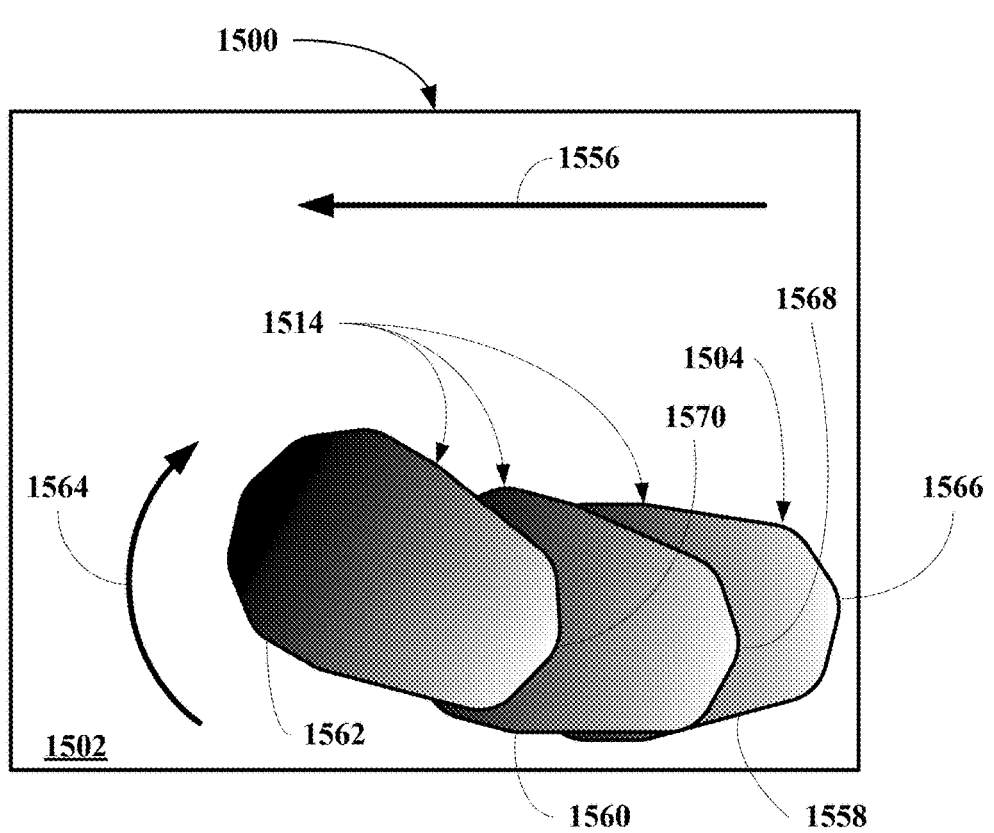

Looking at FIGS. 15I, the area 1504 is shown again to undergo a left movement 1556 from an initial location 1558 to an intermediate location 1560, and finally to a final location 1562 and simultaneously to undergo a clockwise rotationally movement 1564 from an initial rotational orientation 1566 to an intermediate rotational orientation 1568, and to a final rotational orientation 1570, while maintaining the same or substantially the same left edge pressure distribution 1514. Such compound blob data changes, e.g., linear movement and rotational movement coupled with changes in the pressure distributions, again may be used with or without the centroid data to analyze, determine and predict the movement and movement properties, especially if the movement is small resulting in insufficient movement of the centroid to indication any movement at all. Thus, subtle changes in the pressure distribution of the area 1504 may result in movement determination, anticipation and/or prediction for use in the motion based control systems, apparatuses, and/or interfaces of this disclosure. Moreover, this compound movement may be used to effect different levels of control within a given environment controlled by the motion based control systems, apparatuses, and/or interfaces of this disclosure.

Figure 15J:
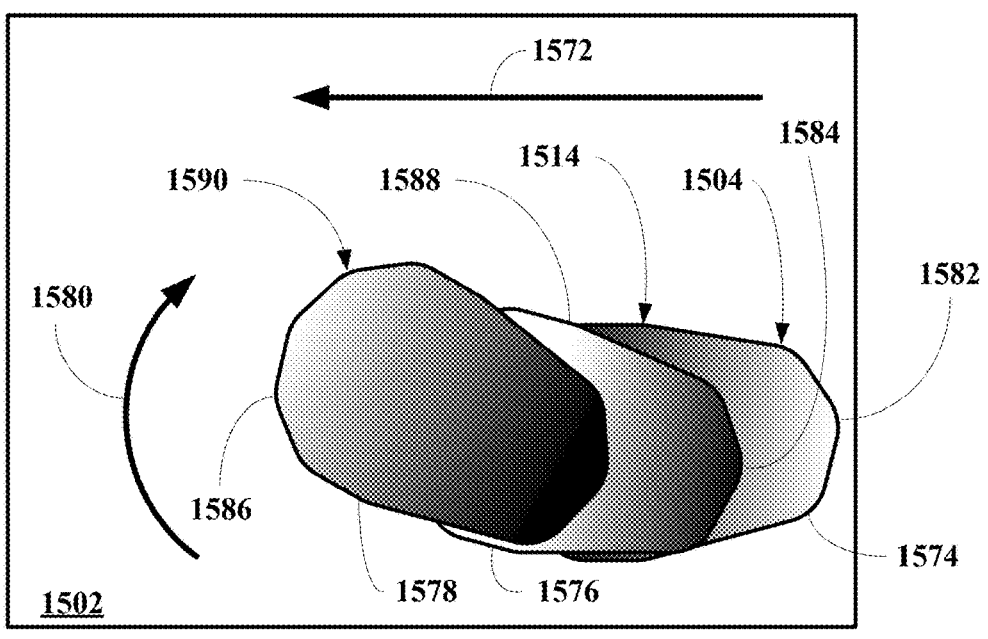

Looking at FIGS. 15J, the area 1504 is shown again to undergo a left movement 1572 from an initial location 1574 to an intermediate location 1576, and to a final location 1578, simultaneously to undergo a clockwise rotationally movement 1580 from an initial rotational orientation 1582 to an intermediate rotational orientation 1584, and to a final rotational orientation 1586, and simultaneously to undergo a change in a pressure distribution from the left edge pressure distribution 1514 to an intermediate pressure distribution 1588, and to a right edge pressure distribution 1590. Such compound blob data changes, e.g., linear movement and rotational movement coupled with changes in the pressure distributions, again may be used with or without the centroid data to analyze, determine and predict the movement and movement properties, especially if the movement is small resulting in insufficient movement of the centroid to indication any movement at all. Thus, subtle changes in the pressure distribution of the area 1504 may result in movement determination, anticipation and or prediction for use in the motion based control systems, apparatuses, and or interfaces of this disclosure. Moreover, this compound movement may be used to effect different levels of control within a given environment controlled by the motion based control systems, apparatuses, and or interfaces of this disclosure.

Use of Finger Tip Blob Data as a Joy Stick Controller

Referring now to FIGS. 16A&B, an embodiments of a touch screen interface of this disclosure, generally 1600, is shown to include a touch screen 1602 having a touch area 1604 having a outer edge 1606 corresponding to a user's finger tip in contact with the screen 1602 located in a central portion 1608 of the screen 1602 and a centroid 1610. Looking at FIG. 16B, an initial or central pressure distribution 1612 of the finger tip is centered about the centroid 1610 with maximum pressure at the centroid 1612 and decreasing radially outward to the outer edge 1606 of the area 1604. This initial pressure contact and distribution is used to activate a joy stick type control form for use in the motion based control systems, apparatuses, and or interfaces of this disclosure.

Referring now to FIGS. 16C-J, a first sequence of pressure distributions are shown using a user's finger tip as a joy stick. Looking at FIG. 16C, the initial central pressure distribution 1610 transitions to a left edge pressure distribution 1614. Looking at FIG. 16D, the pressure distributions 1610 or 1614 transitions to a left top edge pressure distribution 1616. Looking at FIG. 16E, the pressure distributions 1610, 1614 or 1616 transitions to a top edge pressure distribution 1618. Looking at FIG. 16F, the pressure distributions 1610, 1614, 1616, or 1618 transitions to a right top edge pressure distribution 1620. Looking at FIG. 16G, the pressure distributions 1610, 1614, 1616, 1618, or 1620 transitions to a right edge pressure distribution 1622. Looking at FIG. 16H, the pressure distributions 1610, 1614, 1616, 1618, 1620, or 1622 transitions to a right bottom edge pressure distribution 1624. Looking at FIG. 16I, the pressure distributions 1610, 1614, 1616, 1618, 1620, 1622 or 1624 transitions to a bottom edge pressure distribution 1626. Looking at FIG. 16J, the pressure distribution 1610, 1614, 1616, 1618, 1620, 1622, 1624, or 1626 transitions to a left bottom edge pressure distribution 1628.

Referring now to FIGS. 16K-M, a second sequence of pressure distributions are shown using a user's finger tip as a joy stick starting from the bottom pressure distribution 1626 of FIG. 16I. Looking at FIG. 16K, the pressure distribution 1626 transitions to a larger bottom pressure distribution 1630. Looking at FIG. 16L, the pressure distribution 1630 transitions to an even larger bottom pressure distribution 1632. Looking at FIG. 16M, the pressure distribution 1632 transitions to a still larger bottom pressure distribution 1634. These changes in pressure distribution may be used by motion based control systems, apparatuses, and/or interfaces of this disclosure to change a value of an attribute where the larger area corresponds to a higher value of the attribute, or for controls along a different axis. For example, if the motion based control systems, apparatuses, and/or interfaces of this disclosure is controlling light banks, then the second sequence may increase the intensity of the bank of light associated with a "bottom" wall of region of the room, arena, etc., while movement in any other direction would control other walls and movement to a xy direction controls light on two walls and circular motion would control all lights. For example, if the motion based control systems, apparatuses, and/or interfaces of this disclosure to change a speed of a UAV in the −y direction, while pressure distribution changes in the other directions would change a speed of the UAV in any other direction in the xy plane and movement couples with changes in overall pressure may change direction and altitude.

Referring now to FIGS. 16N-P, a third sequence of pressure distributions are shown using a user's finger tip as a joy stick. Looking at FIG. 16N, the third sequence starts from the central pressure distribution 1610. Looking at FIG. 16O, the pressure distribution 1610 transitions to a smaller central pressure distribution 1636. Looking at FIG. 16P, the pressure distribution 1636 transitions to an even smaller pressure distribution 1638. These changes in pressure distribution may be used by motion based control systems, apparatuses, and/or interfaces of this disclosure to change a value of an attribute where the smaller area corresponds to a smaller value of the attribute. For example, if the motion based control systems, apparatuses, and/or interfaces of this disclosure is controlling light banks, then the third sequence may increase the intensity of the bank of light associated with a the ceiling of region of the room, arena, etc., while movement in any other direction coupled with smaller contact area would control other walls and movement to a xy direction controls light on two walls and circular motion would control all lights. For example, if the motion based control systems, apparatuses, and/or interfaces of this disclosure to change a speed of a UAV in the −y direction, while pressure distribution changes in the other directions would change a speed of the UAV in any other direction in the xy plane and movement couples with changes in overall pressure may change direction and altitude.

Alternatively, movement to the right and left may control the xy direction of the drone motion, while up and down movement may control the altitude of the drone. Moreover, rotating the finger one direction may control a combination movement-xy motion and up or down motion. Furthermore, pitch, yaw or roll may be controlled by rotating the finger tip, while moving in a specific direction. Pitch, yaw or roll controlled by a specific combination of rotating and moving in a specific direction.

It should be recognized that each portion of the screen 1402, 1502 or 1602 may correspond to active portions that cause the motion based control systems, apparatuses, and/or interfaces of this disclosure and methods implementing them to transition between different sets of menus, objects, and/or attributes. Thus, if a user contacts the screen in the central portion and then moves into one of the other screen portions, the motion based control systems, apparatuses, and/or interfaces of this disclosure may cause a transition from one set of menus, objects, and/or attributes to another set of menus, objects, and/or attributes or the user my lift off the screen and contact one of the portions causing the transition depending on the configuration of the motion based control systems, apparatuses, and/or interfaces of this disclosure, which may be set and/or changed by the user. It should also be recognized that the changes in pressure distribution may also be accompanied by changes in contact area shape. Thus, the motion based control systems, apparatuses, and/or interfaces of this disclosure and methods implementing them may use blob data in the form of area shape and size, area pressure distribution and area movement (linear or non-linear) to control many different aspects of the motion based control systems, apparatuses, and/or interfaces of this disclosure. Thus, the user may transition between menus, menu levels, objects, and/or attributes simply by contacting the screen and then changing contact pressure, contact shape and/or movement of the contact (especially rotational movement) without ever breaking contact with the screen.

It should also be recognized that two finger may be used as independent, partially coupled, or fully coupled joy stick controllers. It should also be recognized that using the centroid data may provide a better system of determining which zone is intended to be interacted with when zones are close together and blob data may overlap in several zones. By using blob and centroid data, more accurate controls can be provided for the intended zones, and more functionality can be provided in each zone.

Keyboard Embodiments

Referring now to FIGS. 17A-J, a display, generally 1700, associated with a system, an apparatus, and/or an interface of this disclosure is shown to include an active display area 1702. As set forth above, the display area 1702 is in a dormant state or a sleep state or an inactivate state until movement is detected by one or more of the motion sensors associated with the systems, apparatuses, and/or interfaces that meets a threshold value. Looking at FIG. 17A, once activated and a word processor selected according to the motion based processing set forth herein, the systems, apparatuses, and/or interfaces cause a selection or cursor object 1704, a virtual keyboard 1706, and a text box or area 1708 to be displayed within the active display area 1702. The virtual keyboard 1706 comprises a virtual representation of one a host of commercially available keyboards used in word processing and includes letter keys (A-Z), number keys (0-9), symbol keys (~, ', !, @, #, etc.), a number key pad including traditional number pad keys, function keys (F1-F12) and control keys (esc, tab, caps lock, shift, space, etc.). Now that the virtual keyboard is active, movement of the selection object or cursor object 1704 is used to select letters. For example, moving the cursor object 1704 in a smooth motion or movement to the A key, then to the N key, then to the D key and then into an area outside 1710 of the keyboard 1706 results in the word "and" appearing in the text box 1708. The user may also start on a certain key and hold briefly, indicating this is the beginning of selecting keys. Thus, a smooth movement to a particular key followed by a change in direction to another key and so forth and so on and then into the outside area 1710 or lifting off on a touch surface, or moving in a z direction threshold value results in a word appearing in the text box 1708 letter by letter as the user moves, where the selection is made from moving into a particular letter key and then moving toward a different letter key. Thus, changing direction at a key or near enough to a represent a confidence of the desired letter, selects the letter (or key). When we slide from one letter to another, we typically accelerate and decelerate between selections. Using this principle of change of motion and rate of motion, a letter may also be selected by decelerating a threshold amount at or near a key, thus selecting the intended key. With the final movement being to the outside area 1710, or by moving in a ±z-axis, or by moving away from a touch surface, the final movement may also result in a space after the word resulting from the smooth movement pattern, or by moving into the space bar zone or esc key, or alternatively, the smooth movement may end at the scape bar, which terminates the word and adds a space. Thus, in certain embodiments, movement to the space bar or into the outside area 1710 results in a completion of a word and a space so that a subsequent smooth movement will allow additional words to be mapped out. It should be noted that this system may be combined with current touch down and lift off selection actions, so users can mix these with sliding-type actions sequentially or in combination. For instance, on a typical qwerty keyboard, typing letters "l" and "o" requires touching "l", lifting the finger, then touching "o" then liftin the finger. It is much faster and easier to touch the "l" key then slide to the "o" key, then lift off, or continue sliding to the next letter. This combination of using z (lift off/touch down) events and slide (moving in a xy plane) allows the user to move in manners not allowed before. This may also be performed with two or more fingers, exponentially increasing user speeds and case.

Figure 17A:
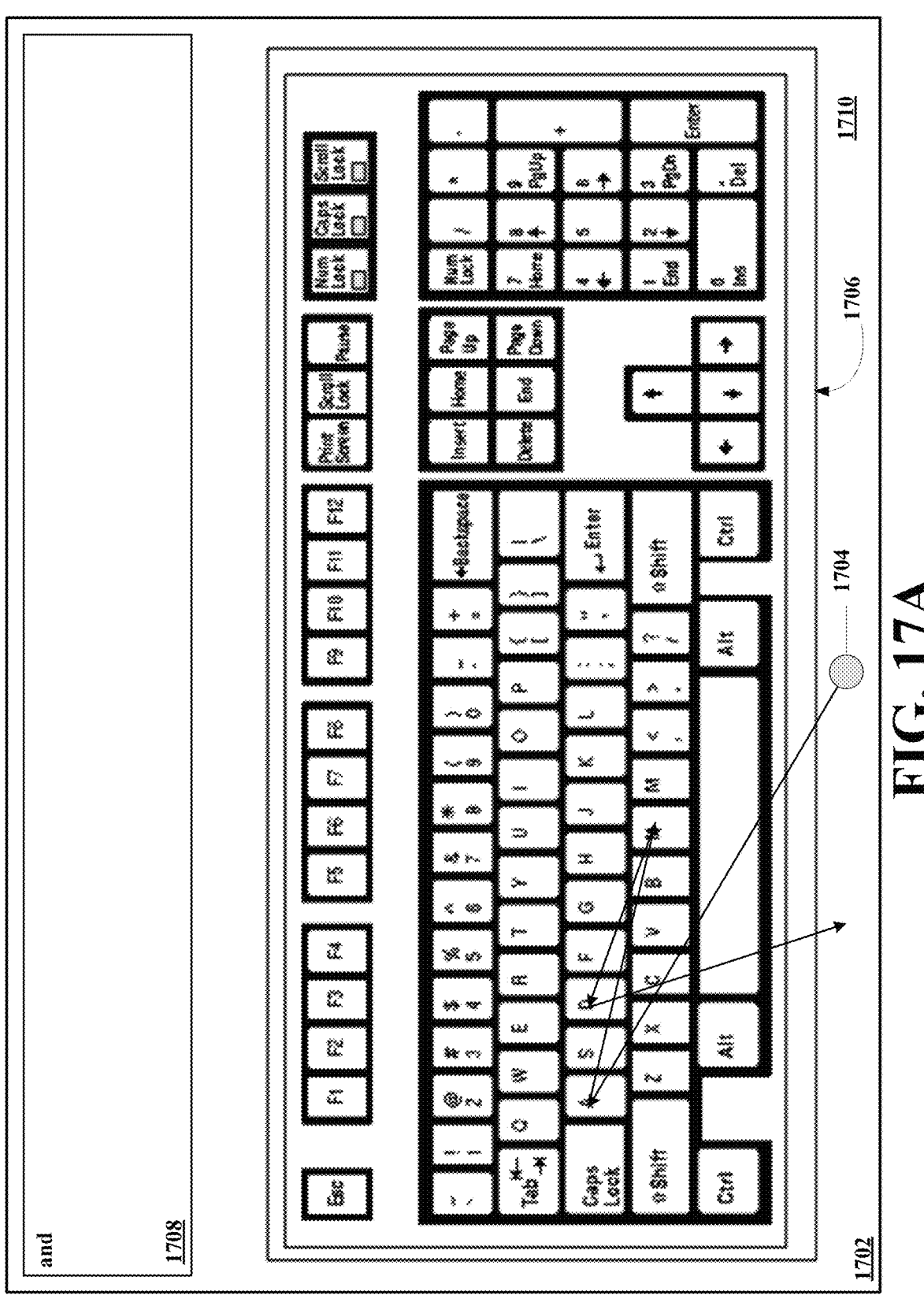
FIGS. 17A-J depict an embodiment of systems, apparatuses, and/or interfaces of this disclosure using an embodiment of a virtual keyboard for text processing.
Figure 17B:
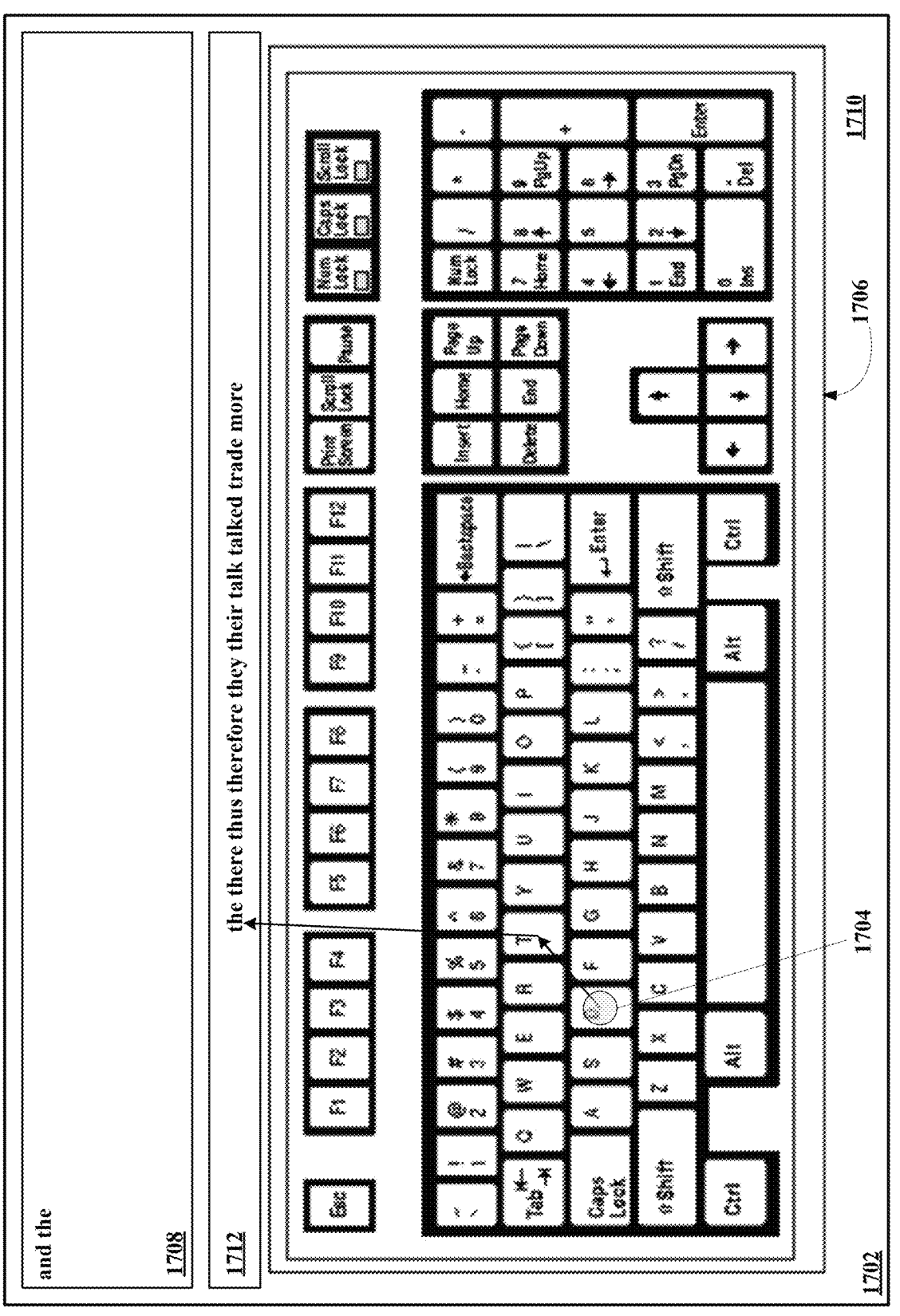

Looking at FIG. 17B, instead of moving to the space bar or to the outside area 1710, if the user moves the object to a new letter, here to the T key, and stops the smooth movement, then the systems, apparatuses, and/or interfaces terminates the letter sequence associated with the smooth movement, adding a space and activates a word selection box or bubble 1712 containing words starting with the letter T. Moving from the T key into the word selection box 1712 will result in the selection of that word, which will appear in the text box 1708. The word list includes the word "more", which if chosen will cause a new list of words starting with T to appear. Of course, the systems, apparatuses, and/or interfaces may require movement out of the word box 1712 to complete the word selection process or the systems, apparatuses, and/or interfaces may require movement of a second body part of confirm the selection as set forth above. It should also be recognized that the word box 1712 may appear at the letter or anywhere else on in the display area 1702 and may have multiple levels of words nested in an hierarchal manner. The systems, apparatuses, and/or interfaces may require that the user move to a location between the letter to activate the word box 1712 if it is over the keys of the keyboard 1706. Of course, the contents of the word box 1712 may be tailored so that the word list or work and phrase list are based on the letters and/or words that already appear in the text box 1708 or may be tailored based on previous usage of a particular user. Additionally, each user may be identified by bio-metric, kinetic, and/or bio-kinetic data captured by the motion sensors of the systems, apparatuses, and/or interfaces and compared to such information saved in a user identification database associated with the systems, apparatuses, and/or interfaces.

Figure 17C:
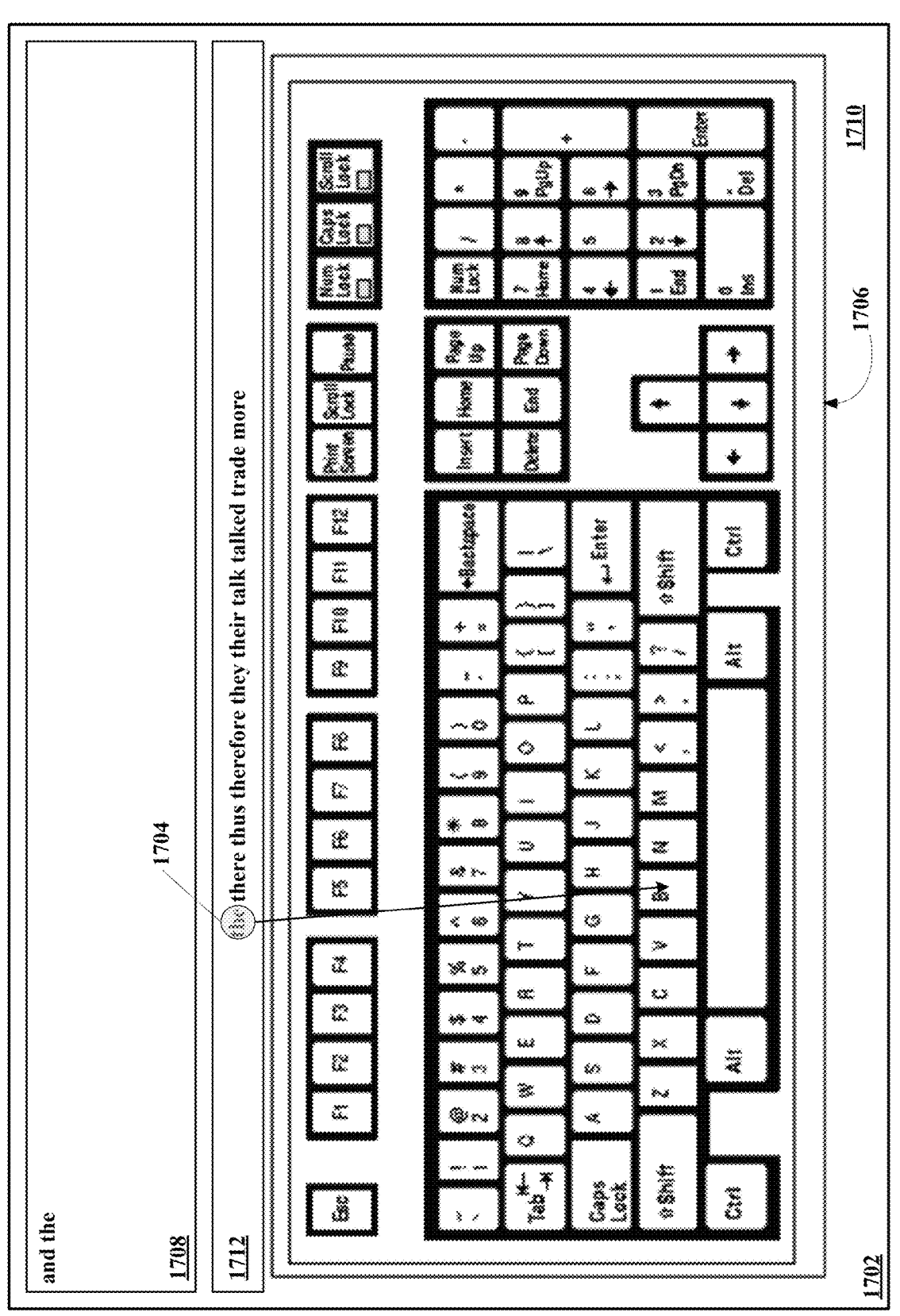
Figure 17D:
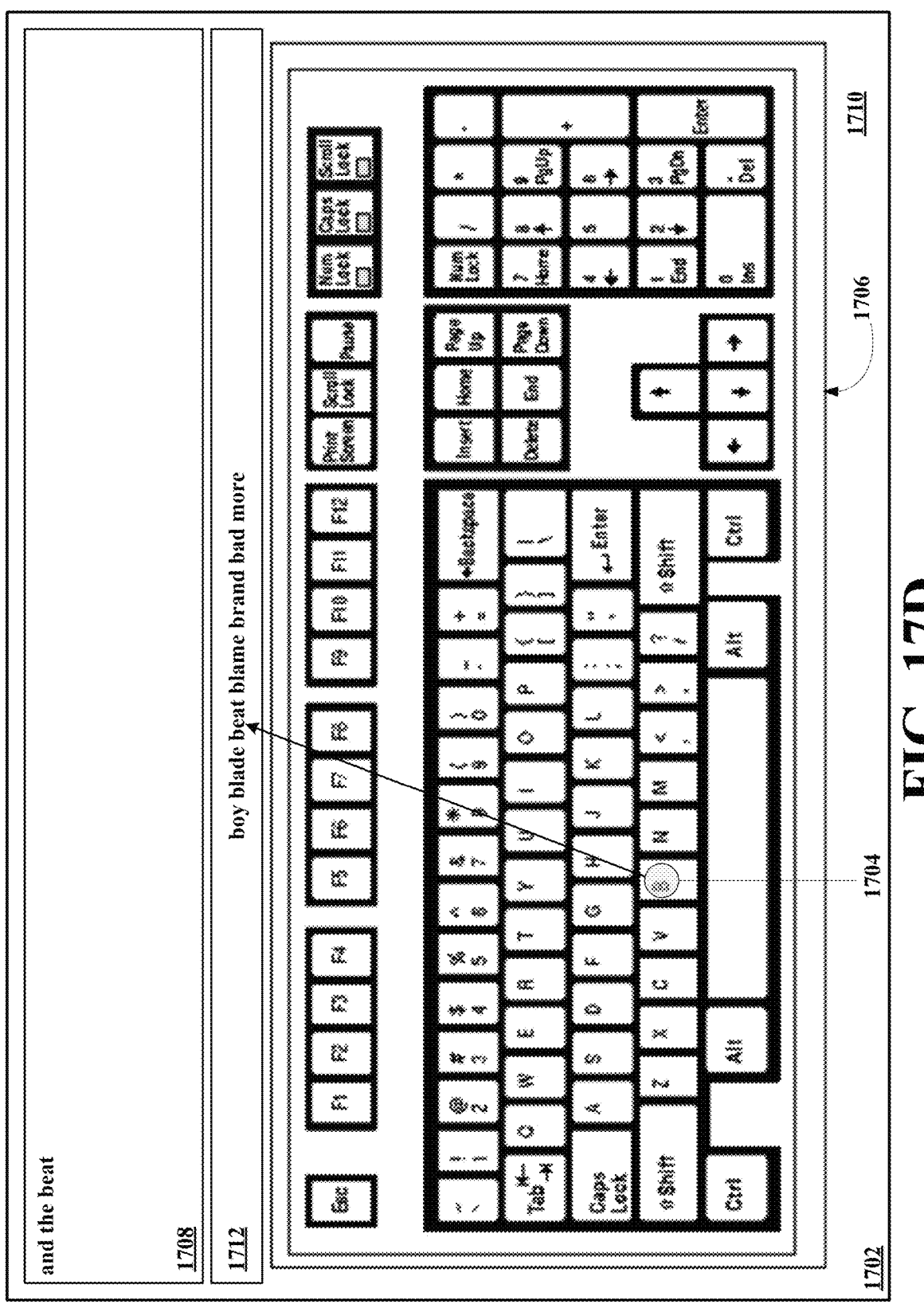

Looking at FIGS. 17C-D, once the word "the" has been selected, moving the cursor 1704 from the "the" toward the B key followed by a stop at the letter or a hold over the letter causes the systems, apparatuses, and/or interfaces to replace the T word list with a B word list. Movement of the object 1704 to a particular word in the word box 1712 again results in the selection that word, here "beat" from the word list, which may be confirmed by subsequent movement out of the word box 1712 or by movement of a second body part or word or other secondary cognizable event. It is not required that the user physically move into the text box of the word list. By holding briefly, a cursor may be placed in the text box, so the user can move through the text box relatively-moving side to side at the letter controls the cursor shown above in the box, where a z-motion selects the word. In this way, a person can just touch the first letter of a word, scroll quickly through multiple predicted words, select, then go to the next letter and start the process again. This can be expanded to move from one letter to a second letter and hold, whereby the list would bring up the words with both of those letters. Moving to a third letter would bring up the next most likely words including those three letters. This would most likely include a slight movement up or in a direction to activate the remote control of the cursor in the word box, to differentiate between selecting another letter and activating the cursor in the word box. Again, the selection process adds a space between words formed by smooth movements or word list selection, or moving into the space bar area with a slide or a touch event.

Figure 17E:
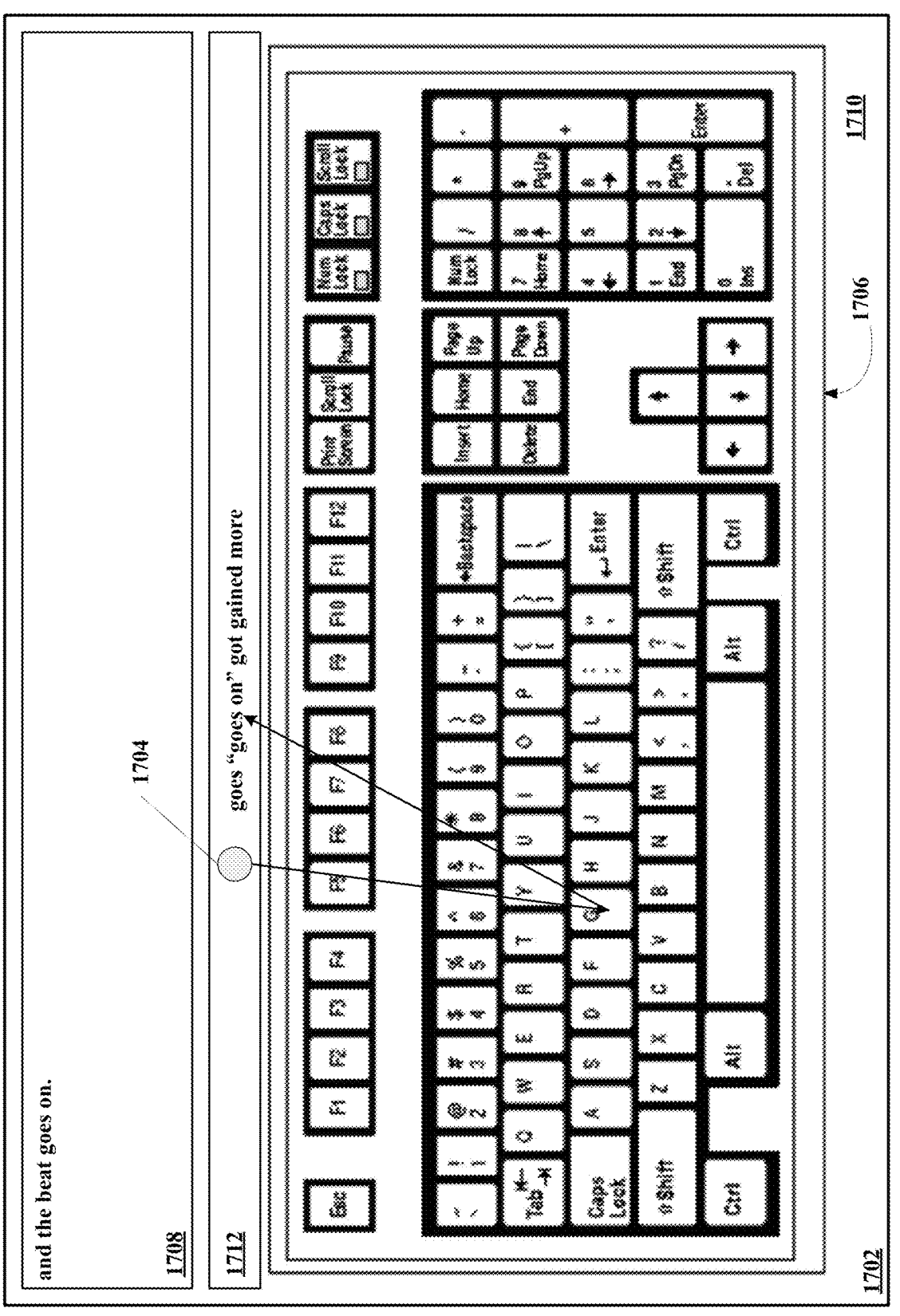
Figure 17F:
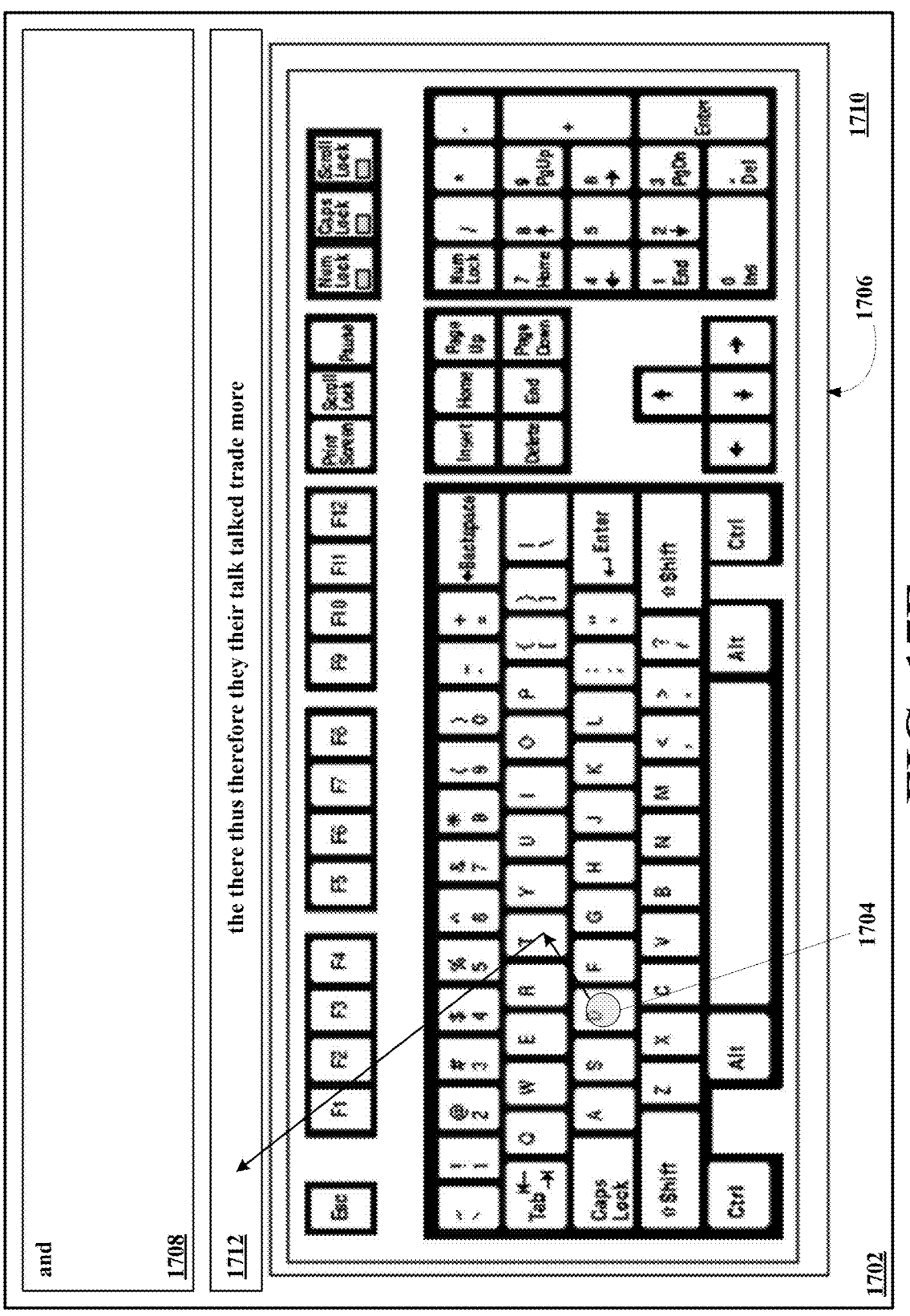
Figure 17G:
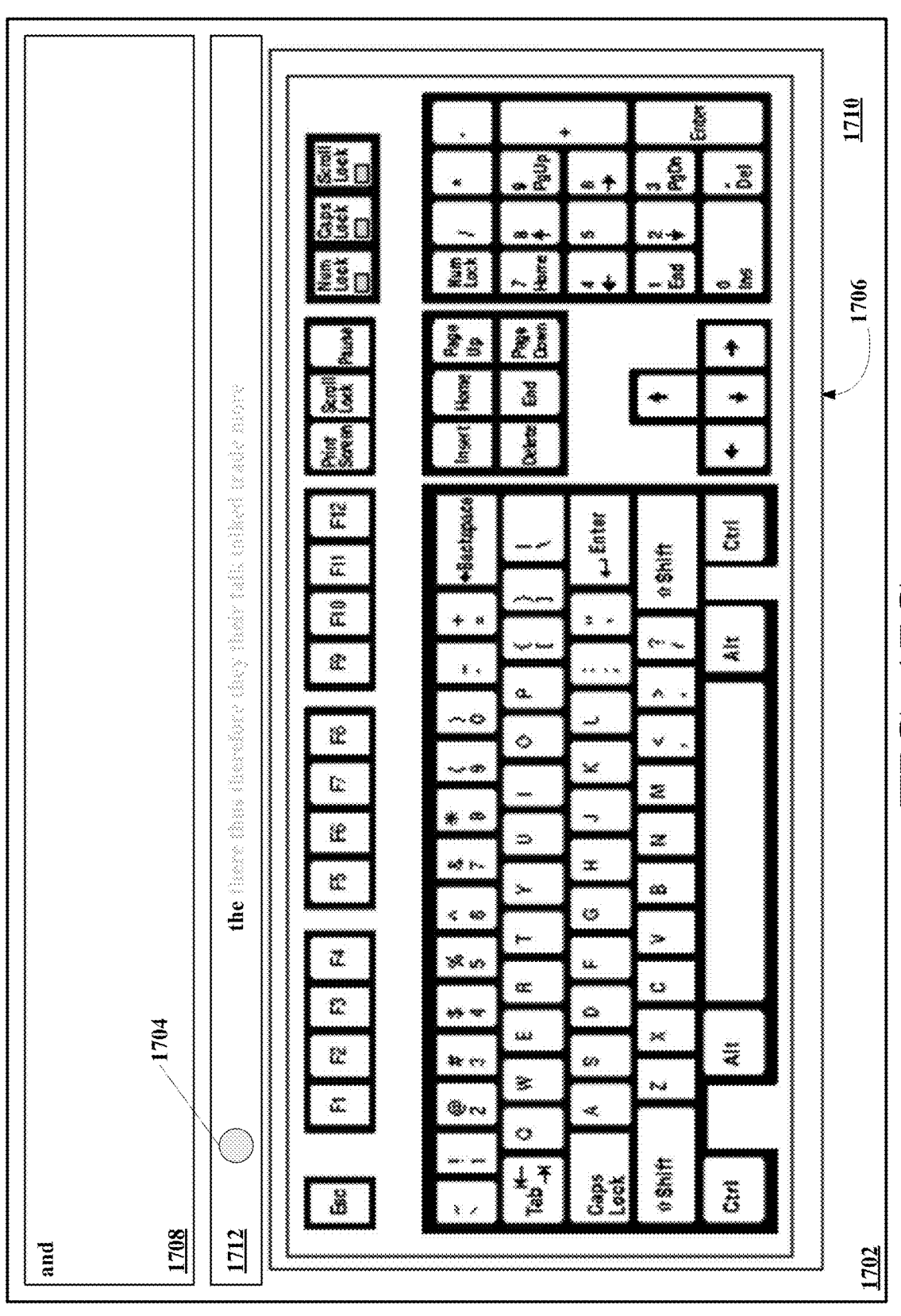
Figure 17H:
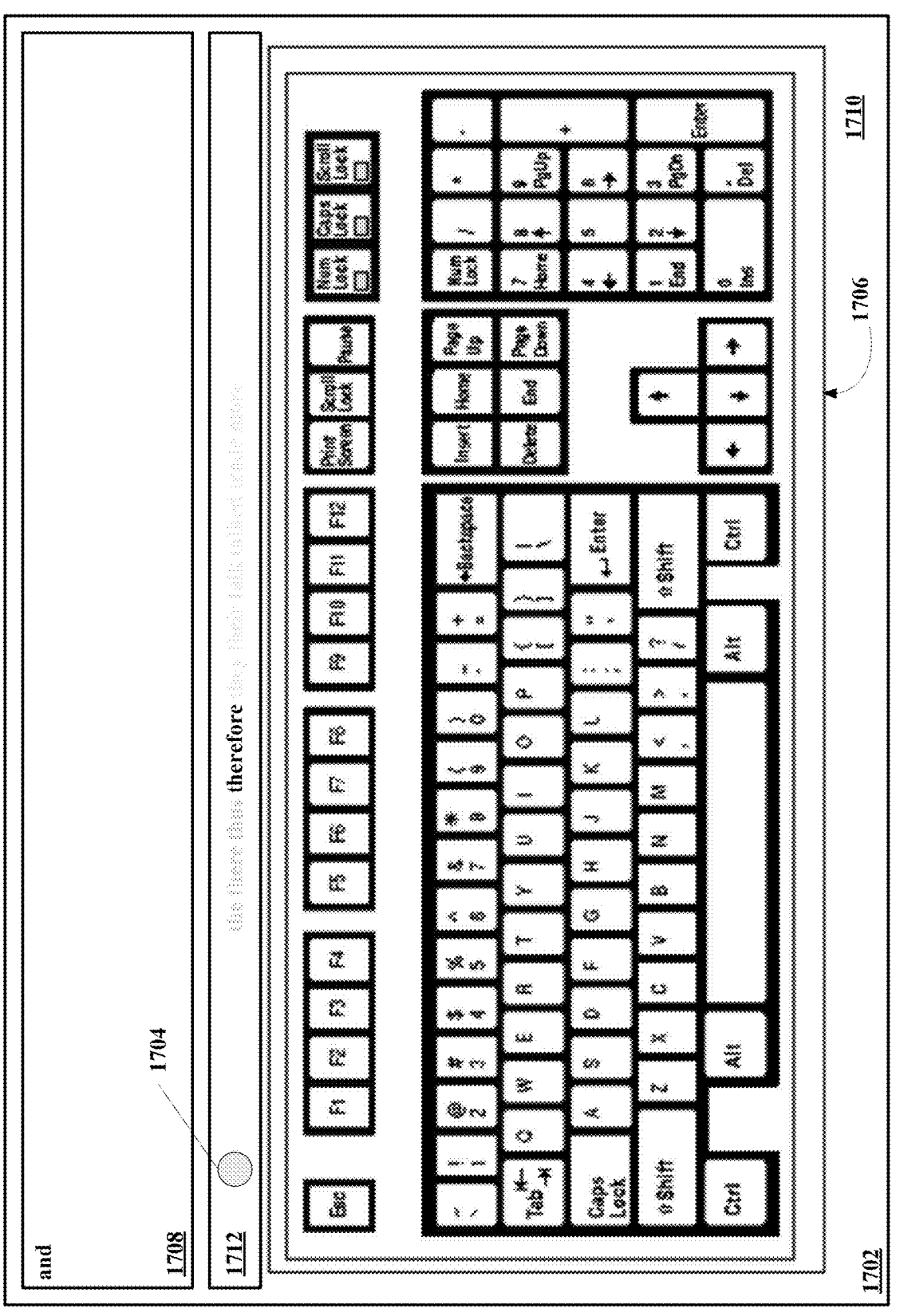
Figure 17I:
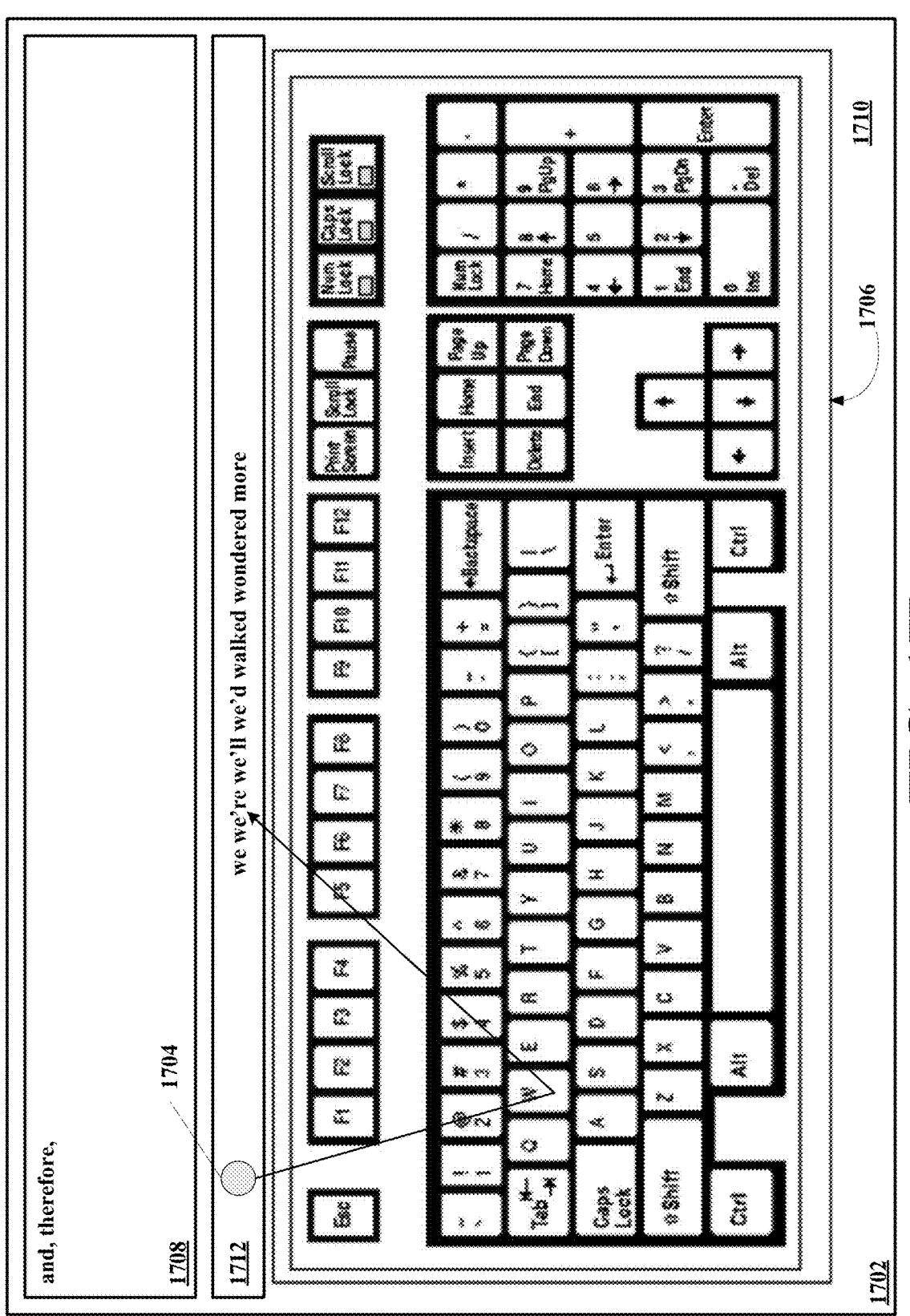
Figure 17J:
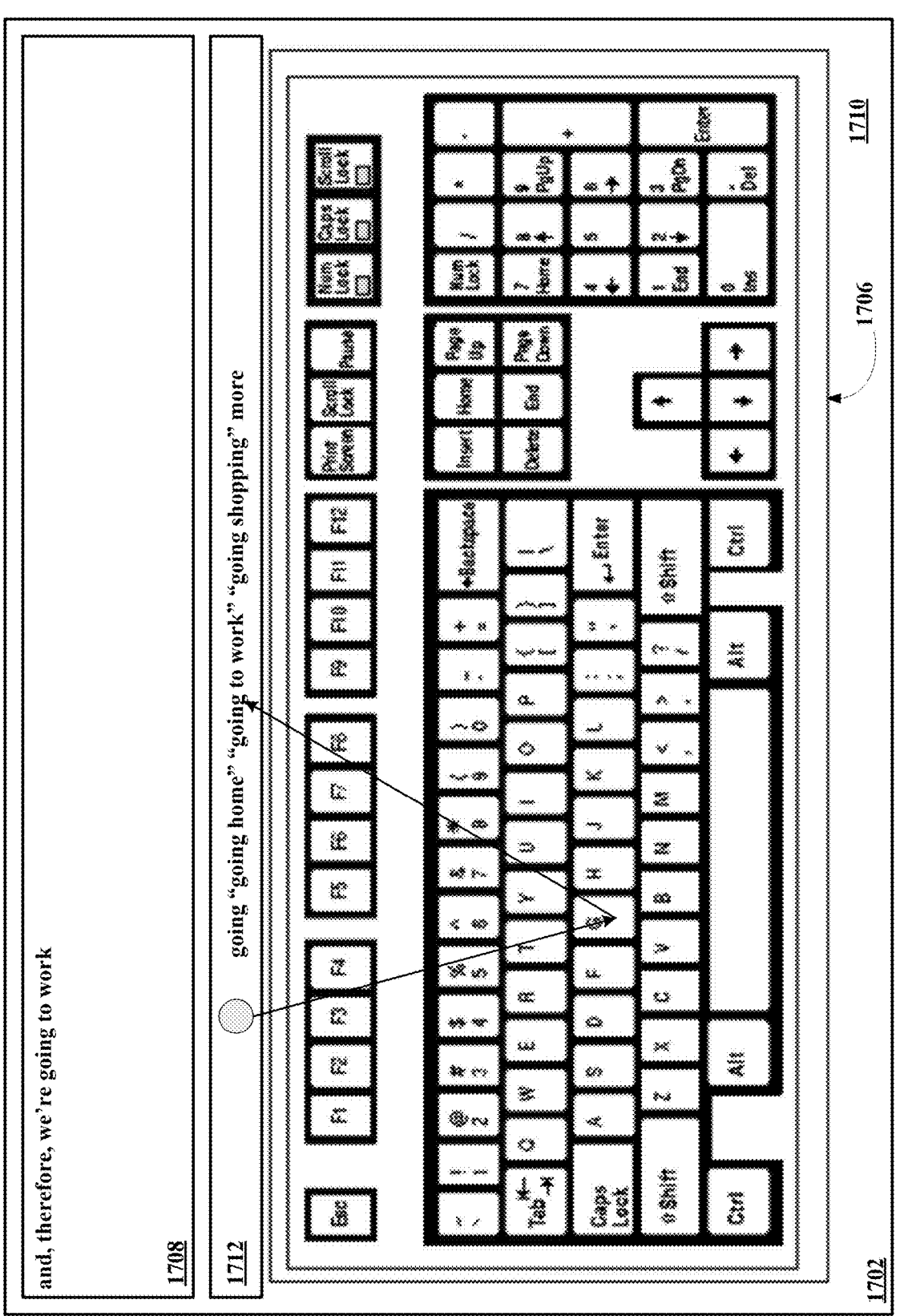

Looking at FIGS. 17D-E, once the word "beat" has been selected or preselected awaiting additional movement, movement away from the "beat" word, or movement to the G key and stopping will results in the selection of the word "beat", if not already selected and confirmed by a secondary event, and the population of the word box 1712 with G words and phrases. Again, the specific words or phrases displayed in the word box 1712 may be letter and/or word driven as explained above. Then, movement from the G key to a particular G word or phrase in the word box 1712 will result in the selection of the particular word or phrase, here "goes on", directly, through a secondary event, or via subsequent movement out of the word box 1712 or to another key.

Looking at FIG. 17A and FIGS. 17F-J, another sequence of selection events are illustrated. Once the word "and" was entered using a smooth movement from the A to the N to the D, movement from the D key to the T key followed by a stop or pause or hold causes the systems, apparatuses, and/or interfaces to display the word box 1712 of FIG. 17B populated with T word and/or phrases. Subsequent movement into the word box 1712 void of words or phrases causes the systems, apparatuses, and/or interfaces to scroll through the list, which results in each word sequentially undergoing some type of highlighting so the user knows which word is selectable, then movement out of the word box 1712 or movement to a key such as the W key selects the highlighted word. Stopping, pausing, or holding over the W key causes the systems, apparatuses, and/or interfaces to populated the word box 1712 with W word and/or phrases. Movement to a particular member of the W words or phrases in the word box 1712 followed by movement to another key such as the G key results in the selection of the particular W word or phrase. Again, stopping, pausing, or holding over the W key causes the systems, apparatuses, and/or interfaces to populated the word box 1712 with G words and/or phrases and movement to a particular G phrase causes the systems, apparatuses, and/or interfaces to select that G phrase, which may be confirmed by a secondary event. It is possible to perform these types of actions with gaze (head, face or eye tracking) where the user moves to a key, and within the key area is an activation area opening the text box at the key or slightly above, so that if it is desired to exit the text box, moving downward to the exit area returns the display to just letters at the letter.

Figure 18:
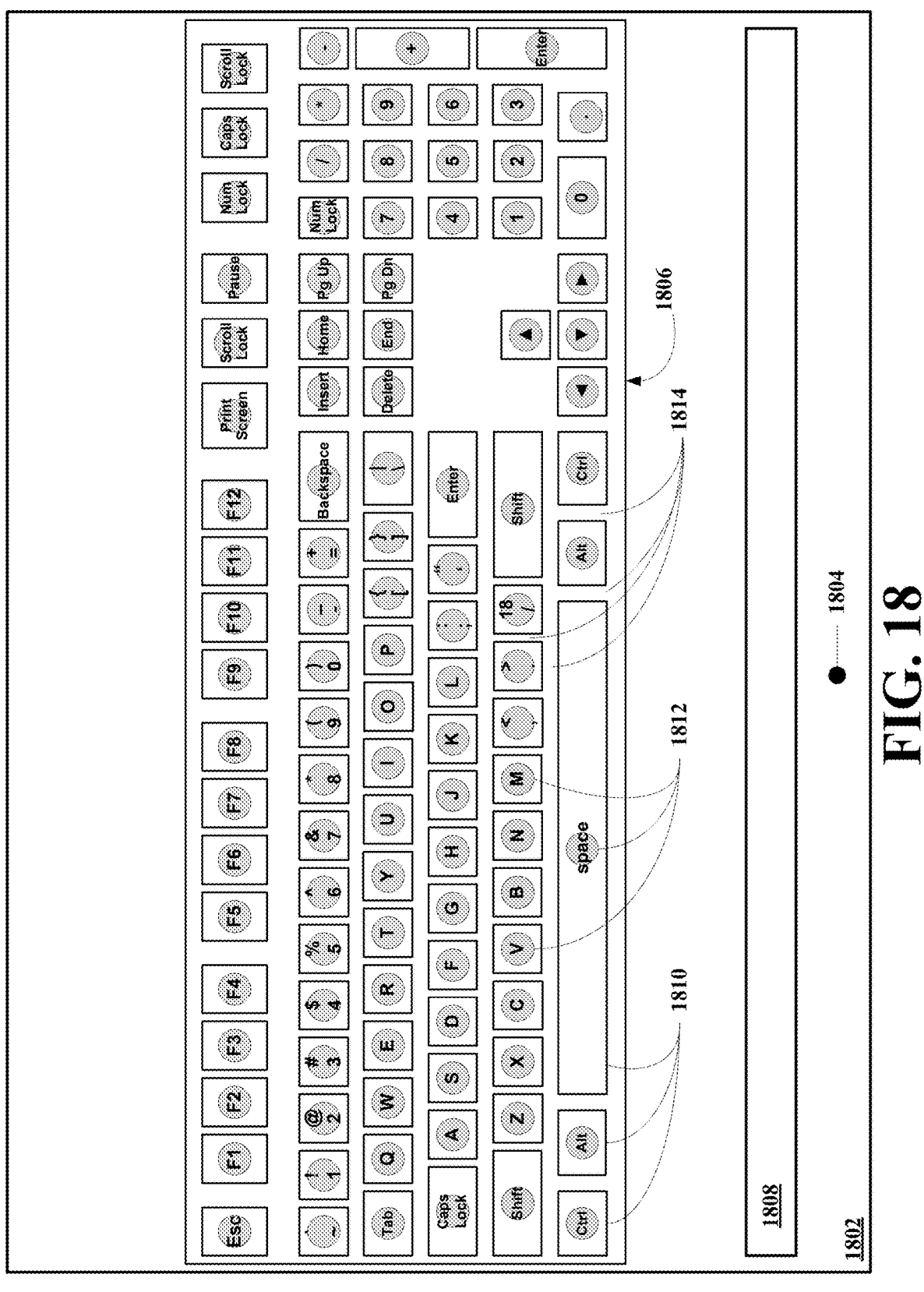
FIG. 18 depicts another embodiment of a virtual keyboard for text processing.

Referring now to FIG. 18, a display, generally 1800, associated with a system, an apparatus, and/or an interface of this disclosure is shown to include an active display area 1802. As set forth above, the display area 1802 is in a dormant state or a sleep state or an inactivate state until movement is detected by one or more of the motion sensors associated with the systems, apparatuses, and/or interfaces that meets a threshold value. Once activated and a word processor selected according to the motion based processing set forth herein, the systems, apparatuses, and/or interfaces cause a selection or cursor object 1804, a virtual keyboard 1806, and a text box or area 1808 to be displayed within the active display area 1802. The virtual keyboard 1806 comprises a virtual representation of one a host of commercially available keyboards used in word processing and includes letter keys (A-Z), number keys (0-9), symbol keys (~, ', !, @, #, etc.), a number key pad including traditional number pad keys, function keys (F1-F12) and control keys (esc, tab, caps lock, shift, space, etc.). Each key includes a rectangular outer area 1810 (may be any shape) and an inner circular area 1812 (may be any shape) shaded as a visual aid to differentiate the two areas 1810 and 1812. Embodiments of this type of a keyboard may or may not include the visual aids, but the areas still exist. For keys that include more than one value, movement to the key will cause the values to appear separated so that further movement may be sufficient to discriminate between the values using the techniques described therein.

The keyboard 1806 may also include open spaces 1814 between the rectangular outer key areas 1810. The open spaces 1814 may be used by the systems, apparatuses, and/or interfaces to transition from a key based selection format to a bubble list or box list selection format. Thus, if a user moves the cursor 1804 to a specific letter and pauses causing a list to appear in a bubble or a box, then moves the cursor 1804 into an open space 1814 adjacent the rectangular area 1810 associated with the particular key. The movement of the cursor 1804 into the open space 1814 causes the systems, apparatuses, and/or interfaces to transition from the key based selection format to the bubble or box based selection format so that further movement results in scrolling and selecting or selecting and activating from the list members in the bubble or box. In certain embodiments, transition back to a key selection format may involve: (a) pausing or holding within the bubble or box for a set period of time, (b) performing a secondary event such as a closing a fist, a touch of a key, a voice command such as exit, or (c) any other secondary event results in the transition from a bubble/box selection format to a key selection format. Alternatively, the list may include an exit such as the word "exit" or some other word to force the transition from the bubble or box format to the key format or the bubble or box may include an exit area or spot, where movement to the area or spot forces the transition from the bubble or box format to the key format. In certain embodiments, movement of the cursor in a given direction that is insufficient to distinguish between two or more keys, the key most aligned with the movement may be move toward the movement and spread apart in such a way that further movement may fully discriminate between the two or more keys as described herein. In other embodiments, the systems, apparatuses, and/or interfaces may utilized predictive techniques described herein so that movement may not have to proceed to a desired key, but when the movement results in a prediction having a threshold certainty, then selection is made, which may be confirmed by a secondary event. In this way, the movement pattern may allow key selection without ever the movement ever actually moving to a given key. If word, phrase, and/or sentence list are desired for a given letter key, then regardless of the technique used to make the selection-movement onto the key, movement in close enough proximity to a desire key to make selection certain to a threshold certainty, or movement results in a key prediction to a certain threshold certainty-stopping movement, pausing movement or hold still will cause the systems, apparatuses, and/or interfaces to open a bubble or box that may include list members that are words, phrases, sentences, etc. and further movement will permit the user to scroll, select, select and activate, select and adjust, select, activate and adjust, or select and scroll through sublists followed by subsequent movement to select, select and activate, select and adjust, or select, activate and adjust. Again, transition between the key based selection format and the bubble/box based selection format may be as described above.

Referring now to FIGS. 19A-G, an embodiment of a word processing system, apparatus, and/or interface is illustrated and is shown to include a display, generally 1900, having an active display area 1902. Looking at FIG. 19A, once activated via movement within an active zone of at least one motion sensor exceeding a threshold movement value, the active display area 1902 will be populated with a cursor or selection object 1904, a text box 1906 and a set of command functions 1908 including a back object, a delete object, an undo object, a redo object, a history object, and a forward object. The active display area 1902 will also be populated with a vowels object, a consonants object, a symbols object, a controls object, and a functions object. The vowels object include subojects a, e, i, o and u (y and w may be included as well). The consonants object includes subobjects b-d, f-h, j-n, p-t, and v-z. The symbols object includes subobjects ', ~, !, @, #, $, %, ^, etc. The controls object includes subobjects tab, space, enter, ctrl, alt, esc, shift, home, insert, backspace, prtscr, etc. The functions object including subobjects F1-F12, etc. Of course, the consonants could be replaced with nouns, vowels with verbs, etc.

Figure 19A:
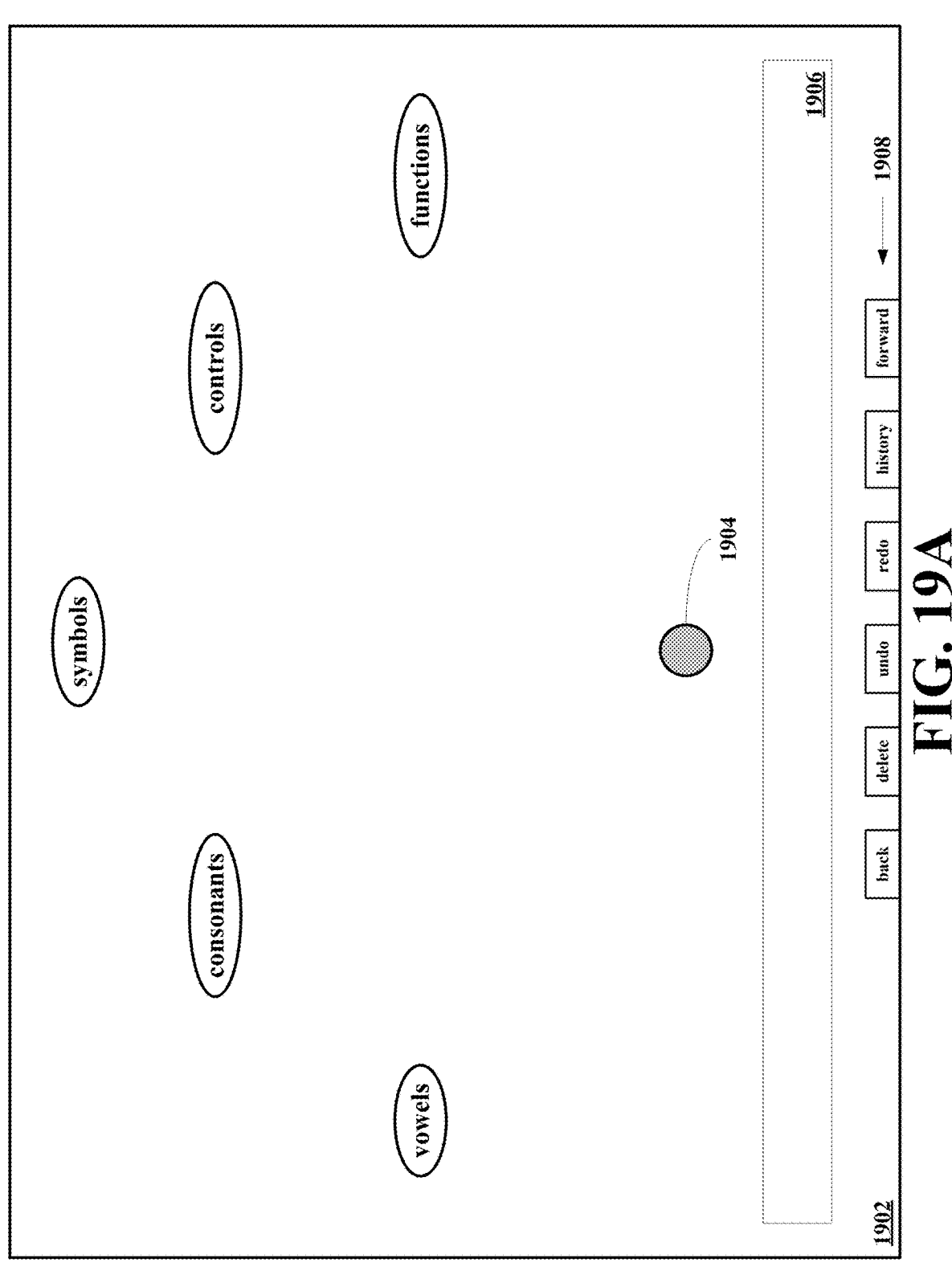
FIGS. 19A-P depict another embodiment of systems, apparatuses, and/or interfaces of this disclosure using another embodiment of a virtual keyboard for text processing.
Figure 19B:
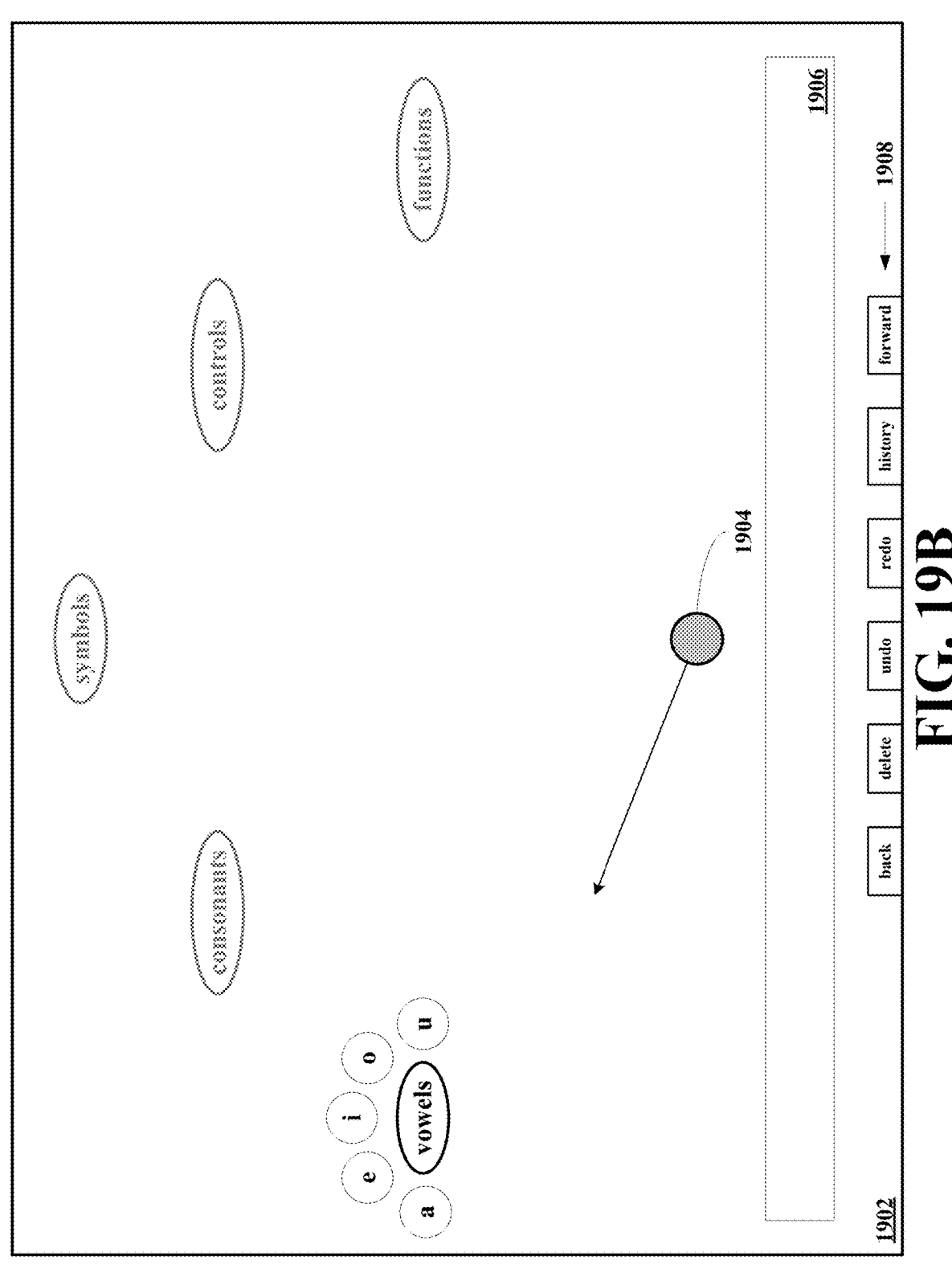
Figure 19C:
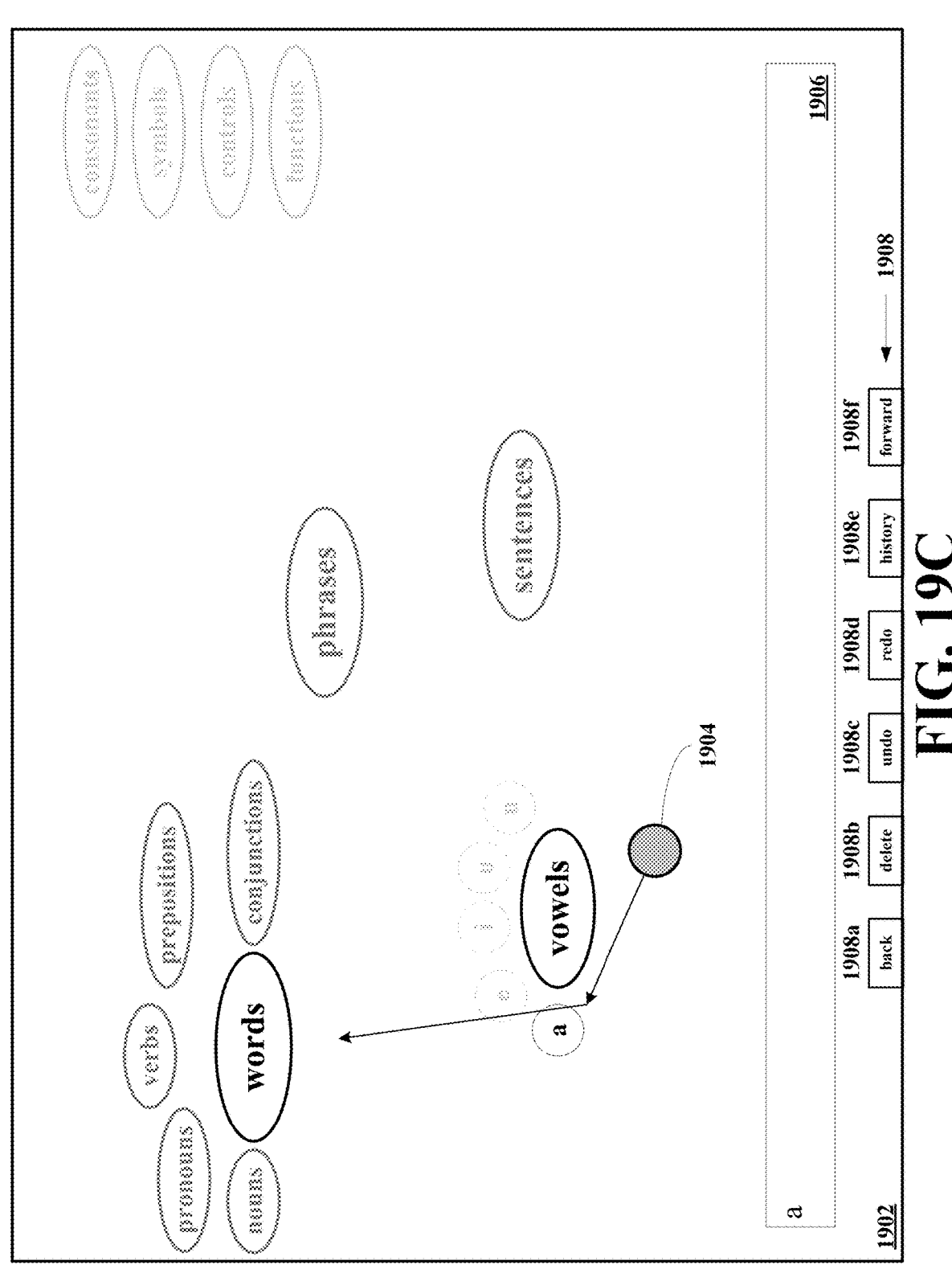
Figure 19D:
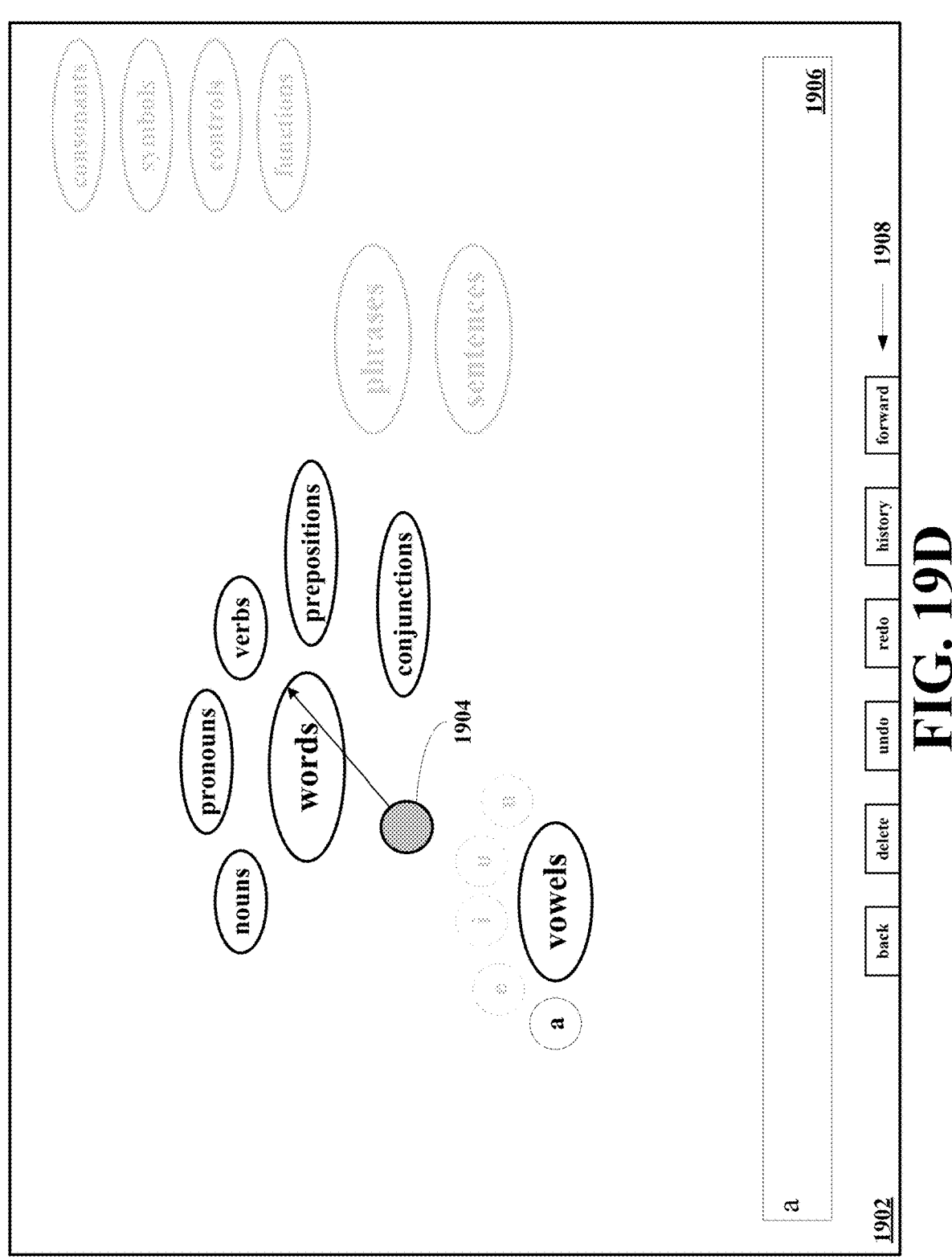
Figure 19E:
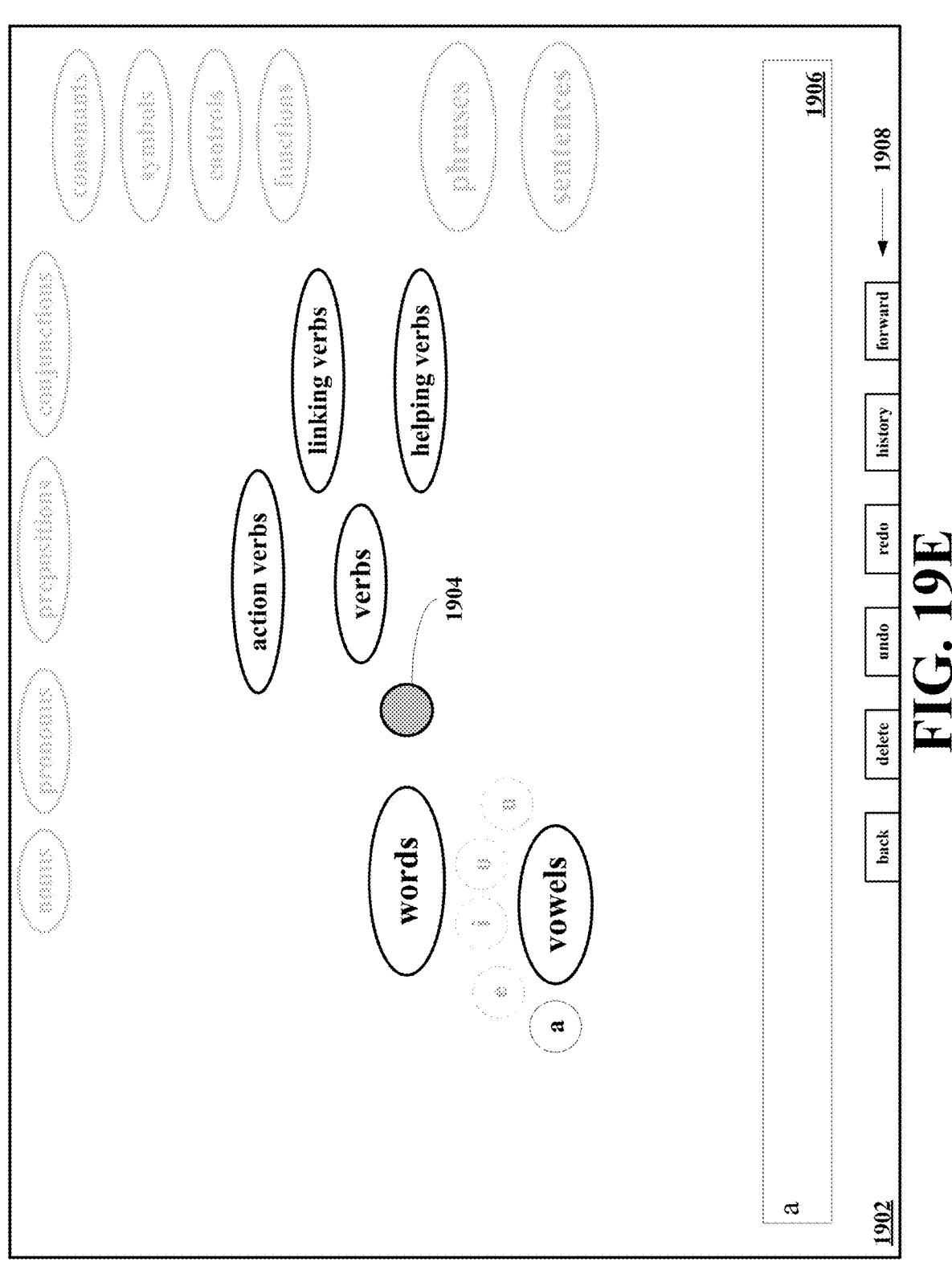
Figure 19F:
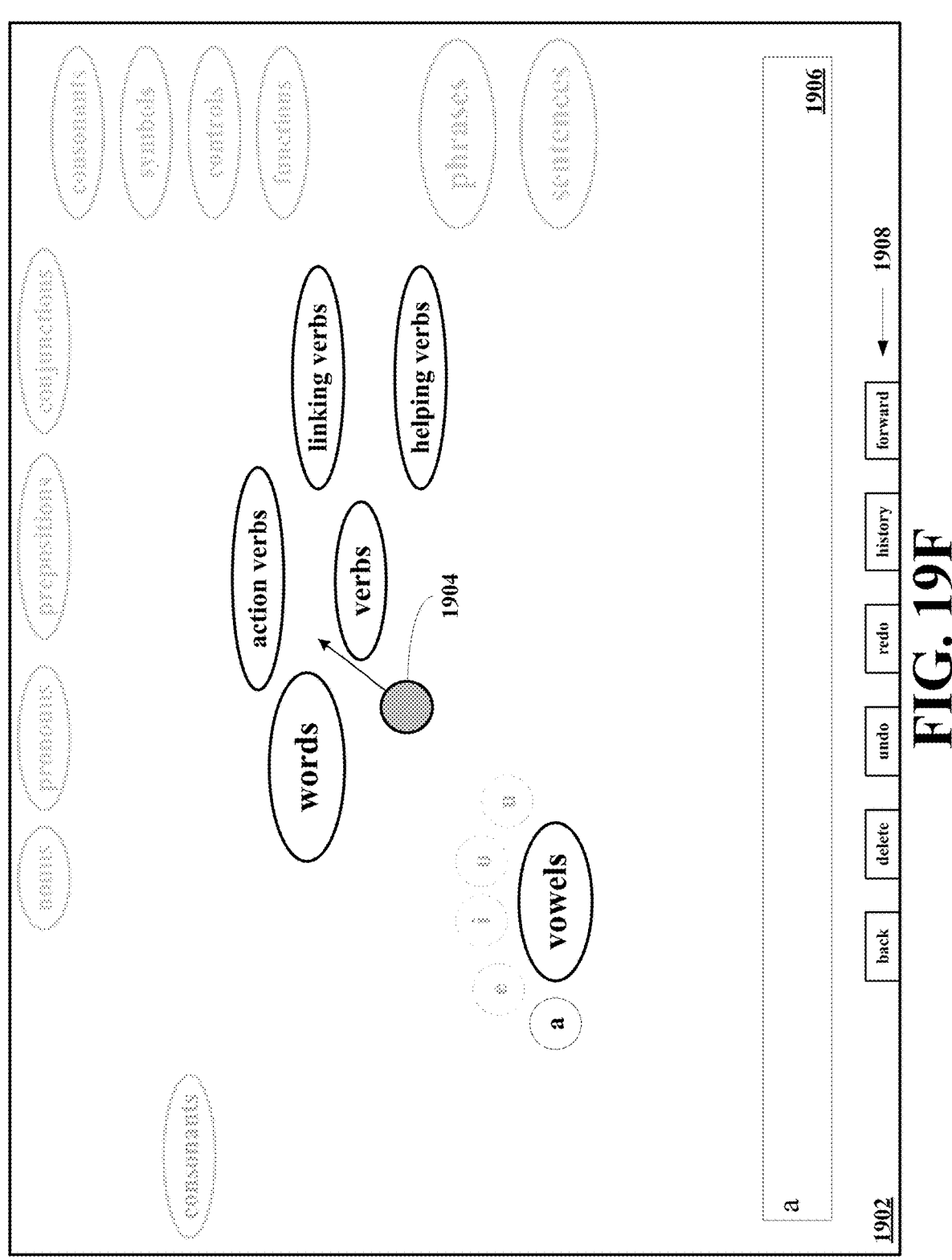
Figure 19G:
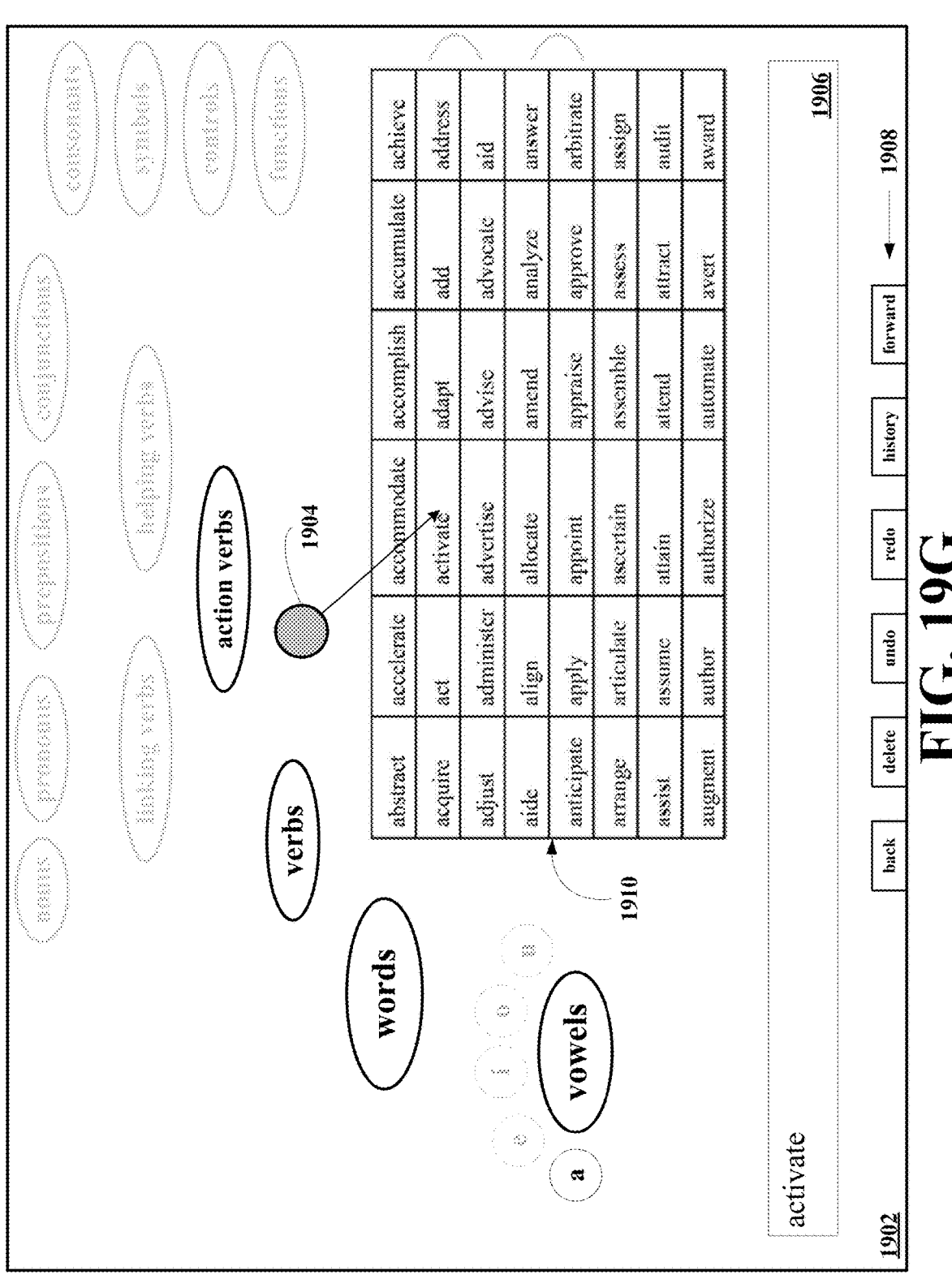
Figure 19H:
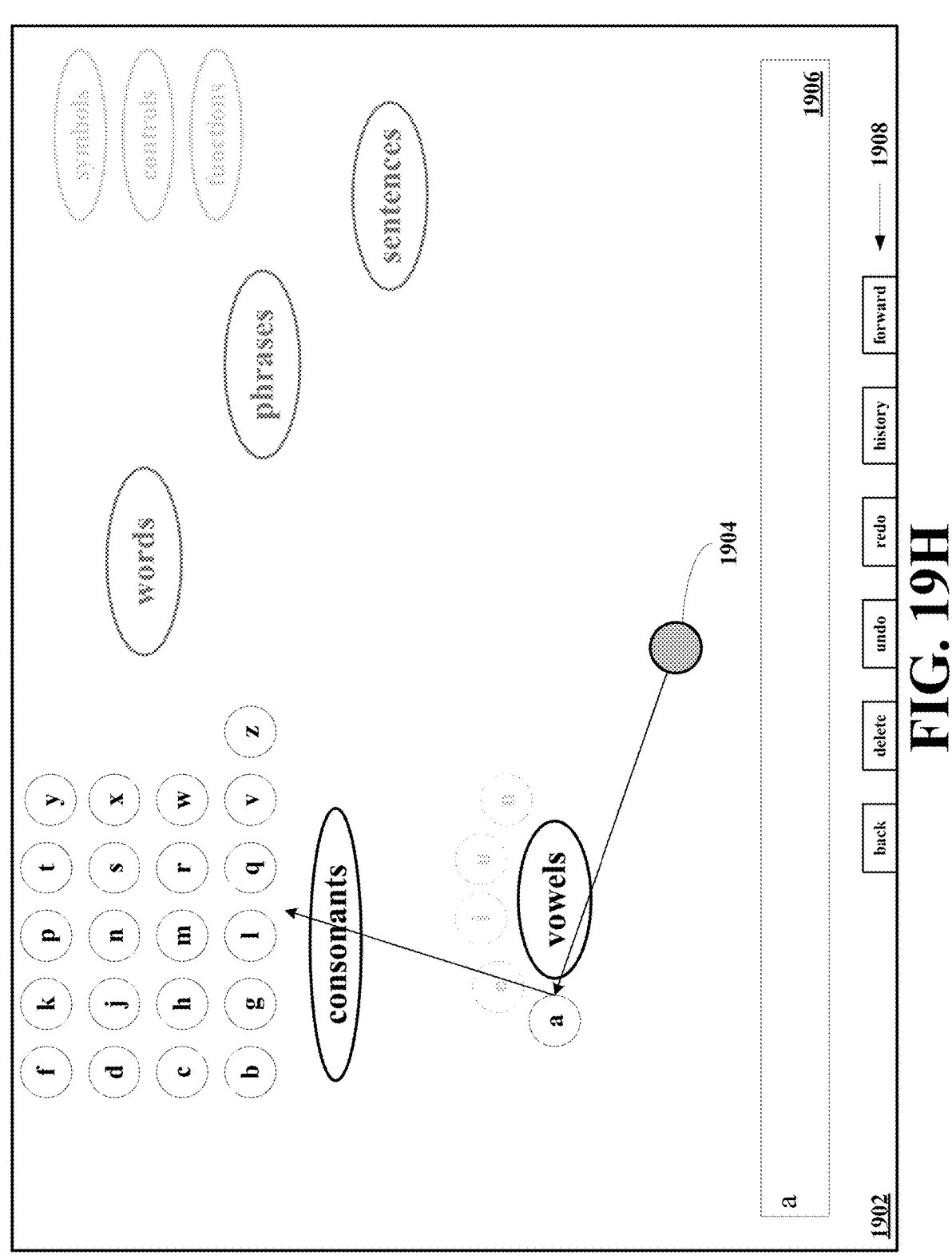
Figure 19I:
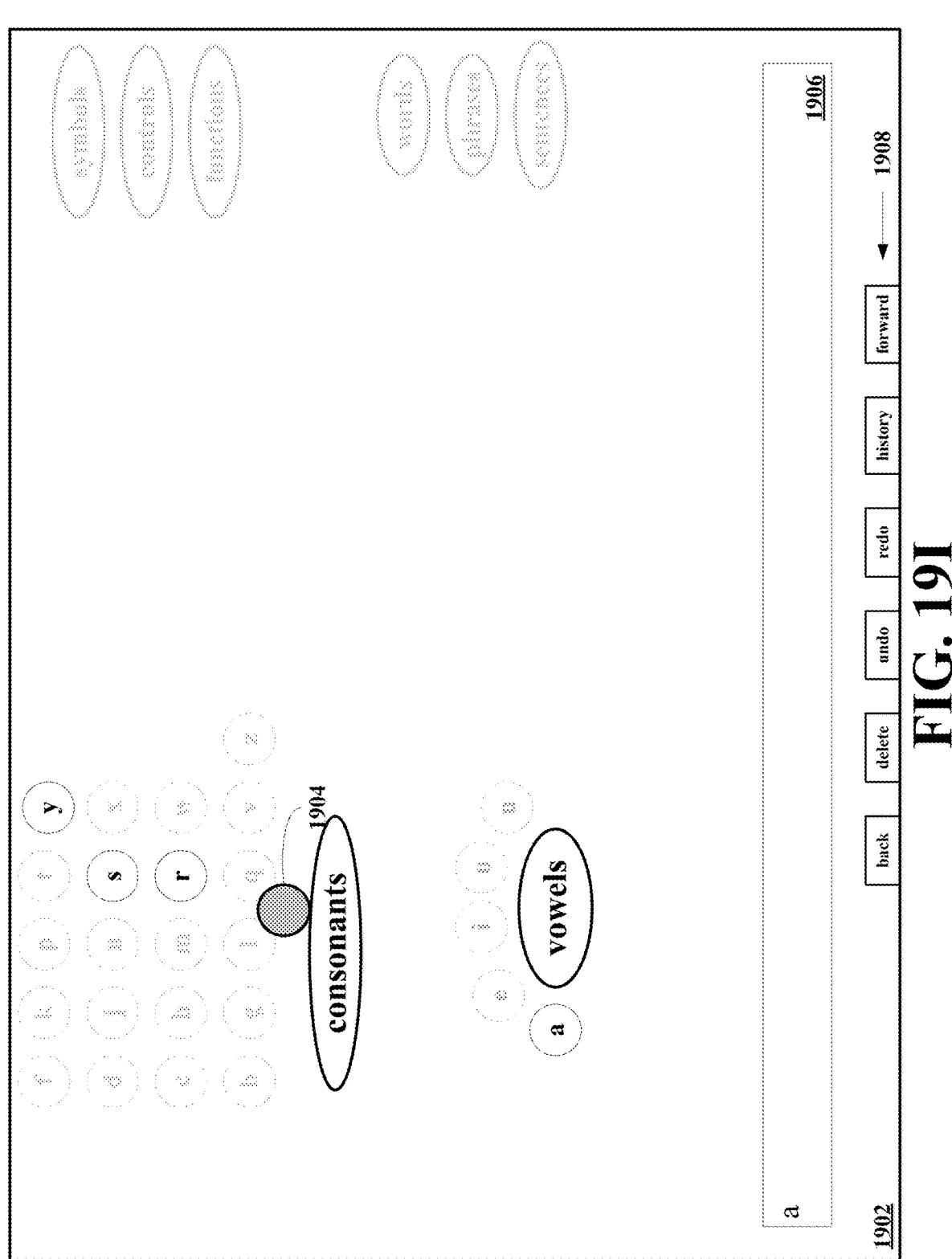
Figure 19J:
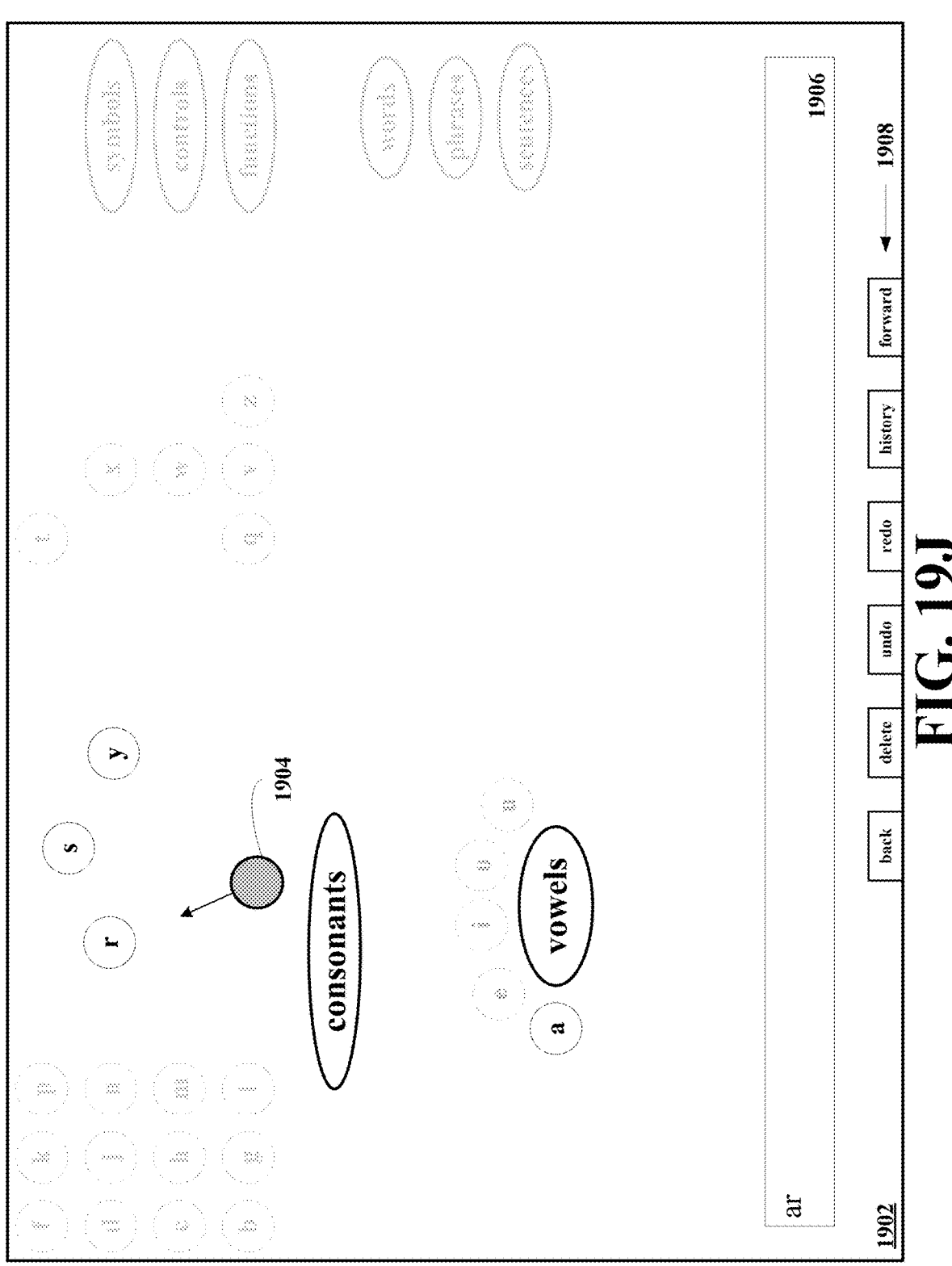

Looking at FIG. 19B, moving the selection object 1904 towards the vowels object results in selection of the vowels object, the display of the vowel object a, e, i, o, and u disposed about the vowels object and may also include a fading of the consonants object, the symbols object, the controls object, and the functions object. Looking at FIG. 19C, moving toward the a object and pausing over or near the a object causes a words object, a phrases object and a sentences object to appear and further movement from the a object towards the words object causes subobjects nouns, pronouns, verbs, prepositions, and conjunctions to appear about the words object and a fading of the phrases and sentences objects. Additionally, the consonant, symbols, controls, and function objects may be further faded and moved to a position in the display area 1902 removed from a center of the display area 1902. Looking at FIG. 19D, the words object and subobjects nouns, pronouns, verbs, prepositions, and conjunctions have been centered, the phrases and sentences objects have been further faded and the selection object 1904 has been moved near to the words object. Movement of the selection object 1904 in the direction of the verbs subobject causes the systems, apparatuses, and or interfaces to display subobjects action verbs, linking verbs, and helping verbs about the verbs object, while fading the nouns, pronouns, prepositions, and conjunctions objects and moving them away from the center of the display area 1902 as shown in FIG. 19E. Looking at FIG. 19F, the selection object 1904 is moved towards the action verbs object causing the systems, apparatuses, and or interfaces to fade the linking verbs object and the helping verbs object and to display a box list 1910 of active verbs starting with the letter a as shown in FIG. 19G, where movement of the selection object 1904 in to the box 1910 to the word "activate" resulting in the selection of the word activate and the display of activate in the text box 1906.

Figure 19K:
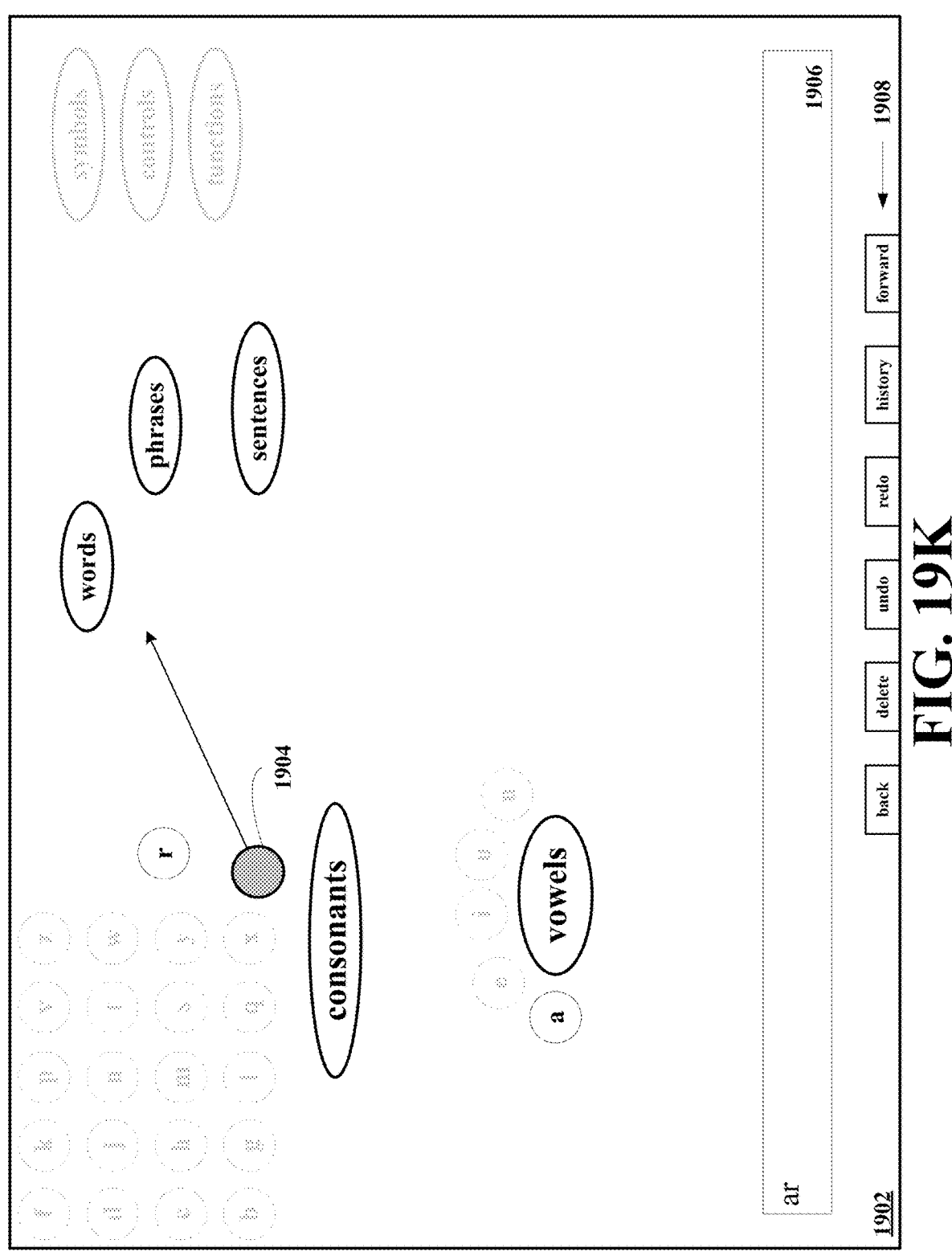
Figure 19L:
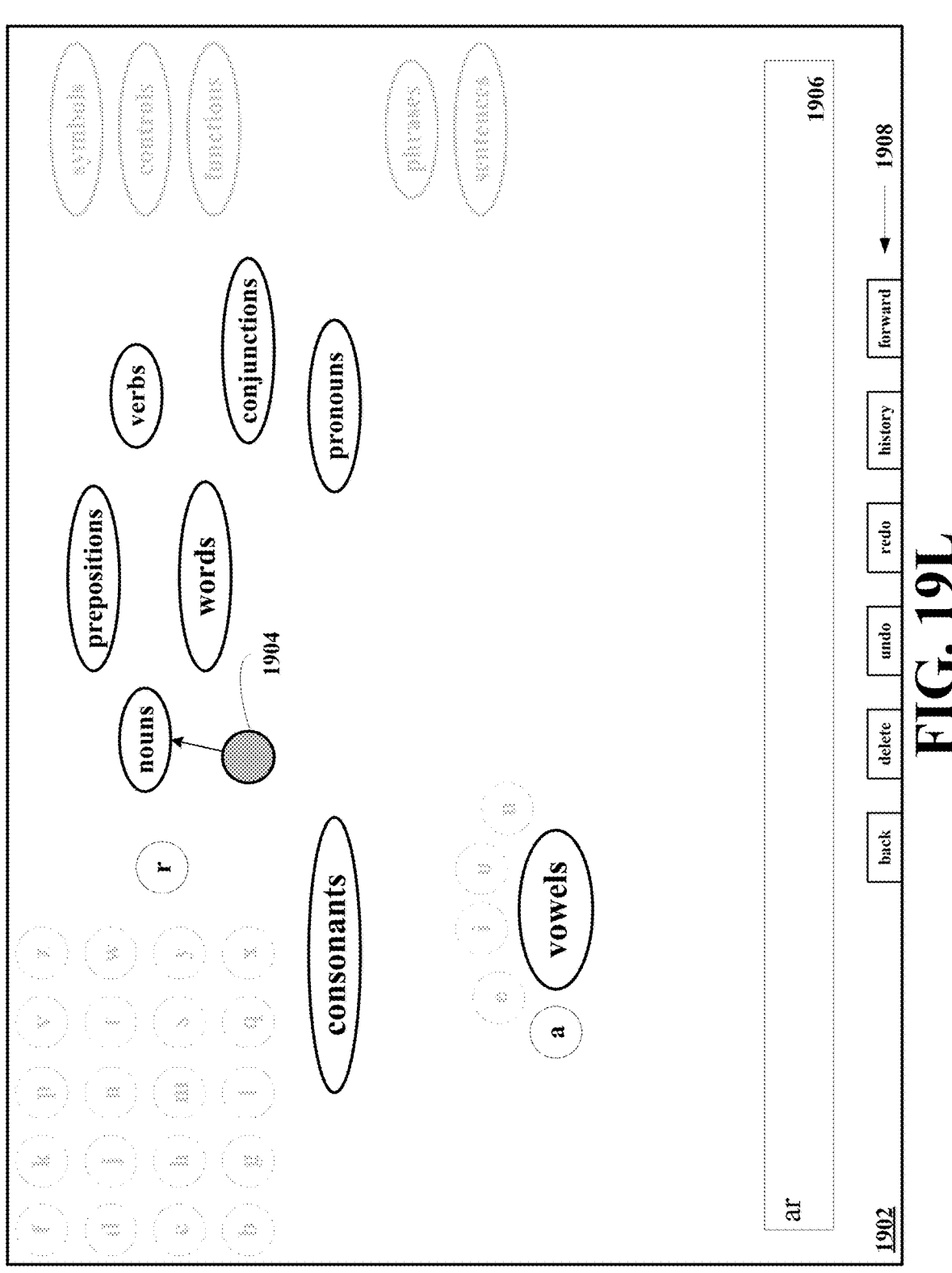
Figure 19M:
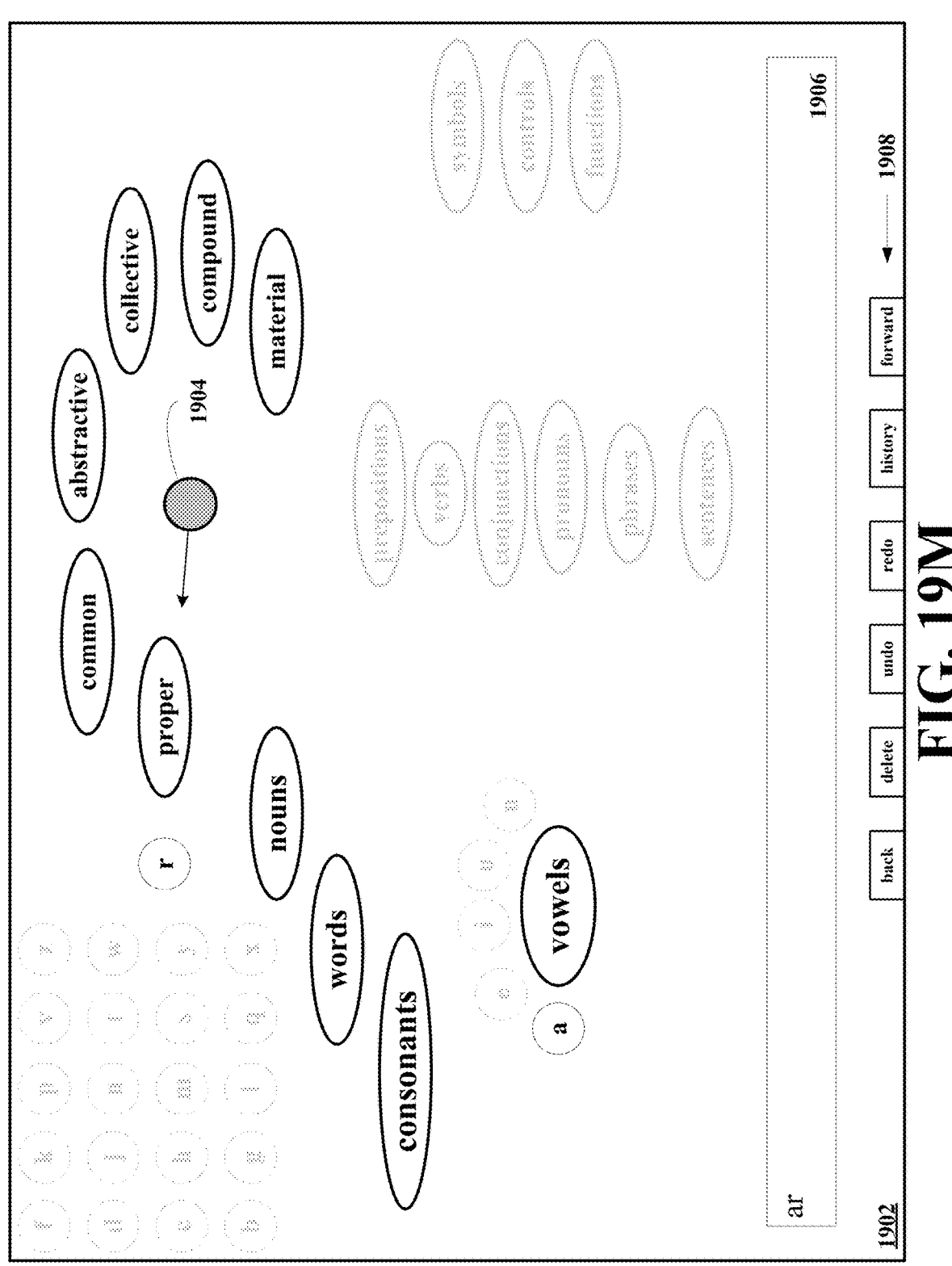
Figure 19N:
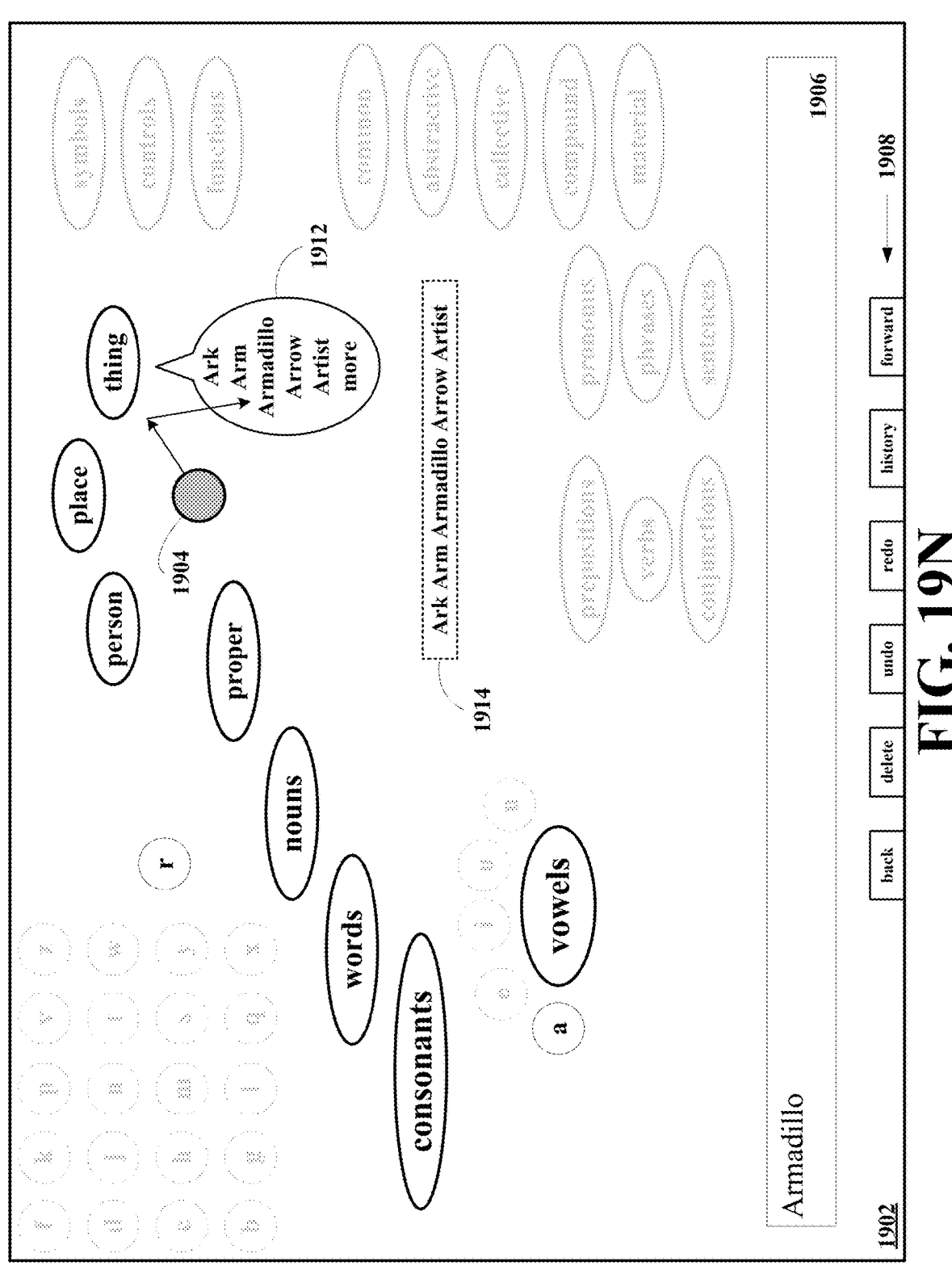
Figure 190:
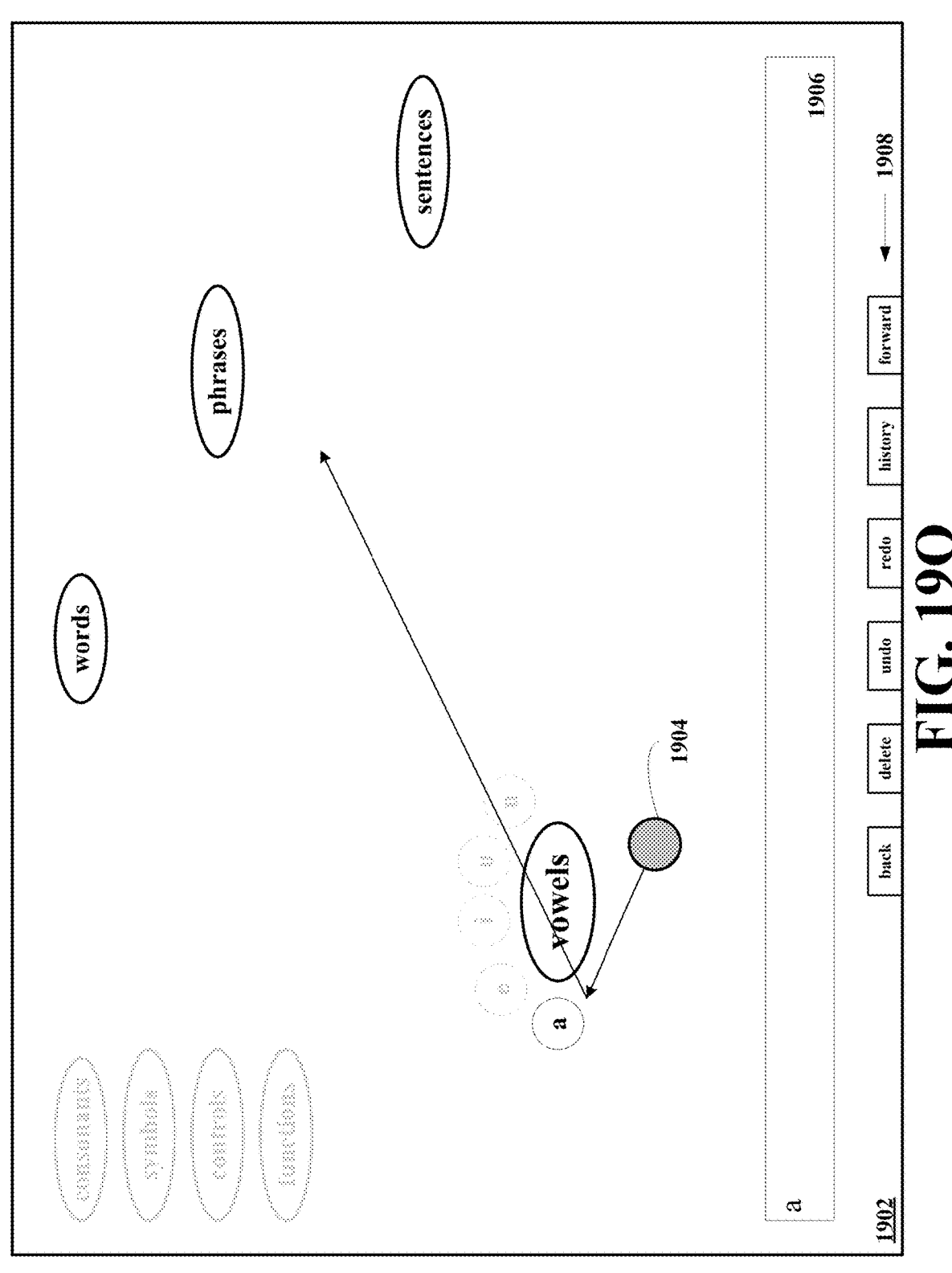

Referring now to FIGS. 19H-N, movement of the selection object 1904 towards the vowels object and further towards the a subobject and further towards the consonants object and finally in the direction aligned with a group of consonants cause the systems, apparatuses, and or interfaces to selected the vowels object, the a subobject and the consonants object, while fading the words, phrases, and sentences objects. Looking at FIG. 19I, the r object, the s object and the y object, which are most aligned with the movement, remain active, while the other consonants are faded and are no longer selectable based on the movement. Looking at FIG. 19J, the r, s, and y objects have been arrayed about the selection object 1904 to make selection carrier, while the other consonants are moved away to facilitate selection of either the r, s, and y objects. Movement of the selection object 1904 towards the r object and pausing at or near it causes the systems, apparatuses, and or interfaces to select the r object and to display the words object, the phrases object and the sentences object in a space apart arrangement to facilitate selection as shown in FIG. 19K. Movement of the selection object 1904 towards the words object causes the systems, apparatuses, and or interfaces to display the subobjects nouns, prepositions, verbs, conjunctions, and pronouns as shown in FIG. 19L. Movement of the selection object 1904 towards the nouns object causes subobjects proper, common, abstractive, collective, compound and material to be displayed about the selection object 1904, while the prepositions, verbs, conjunctions, and pronouns objects are faded and move away from the selection object 1904 and subobjects proper, common, abstractive, collective, compound and material. Movement of the selection object 1904 towards the proper object cause the systems, apparatuses, and or interfaces to display the subobjecs person, place or thing about the selection object 1904 and movement towards the thing object causes the systems, apparatuses, and or interfaces to select the thing object and the appearance of a word selection bubble 1912 containing a list of things starting with the letters "ar" along with a "more" for showing more things starting with the letter "ar". Movement of the selection object 1904 into the bubble 1912 toward the member "Armadillo" selects that word, which appears in the text box 1906. Alternatively, movement toward the thing object may cause the systems, apparatuses, and or interfaces to select the thing object and the appearance of a word selection menu 1914 containing a list of things starting with the letters "ar". Movement into the word selection menu 1914 causes a scrolling through the list and subsequent movement causes the systems, apparatuses, and or interfaces to select a desired "ar" thing, which then appears in the text box 1906.

Figure 19P:
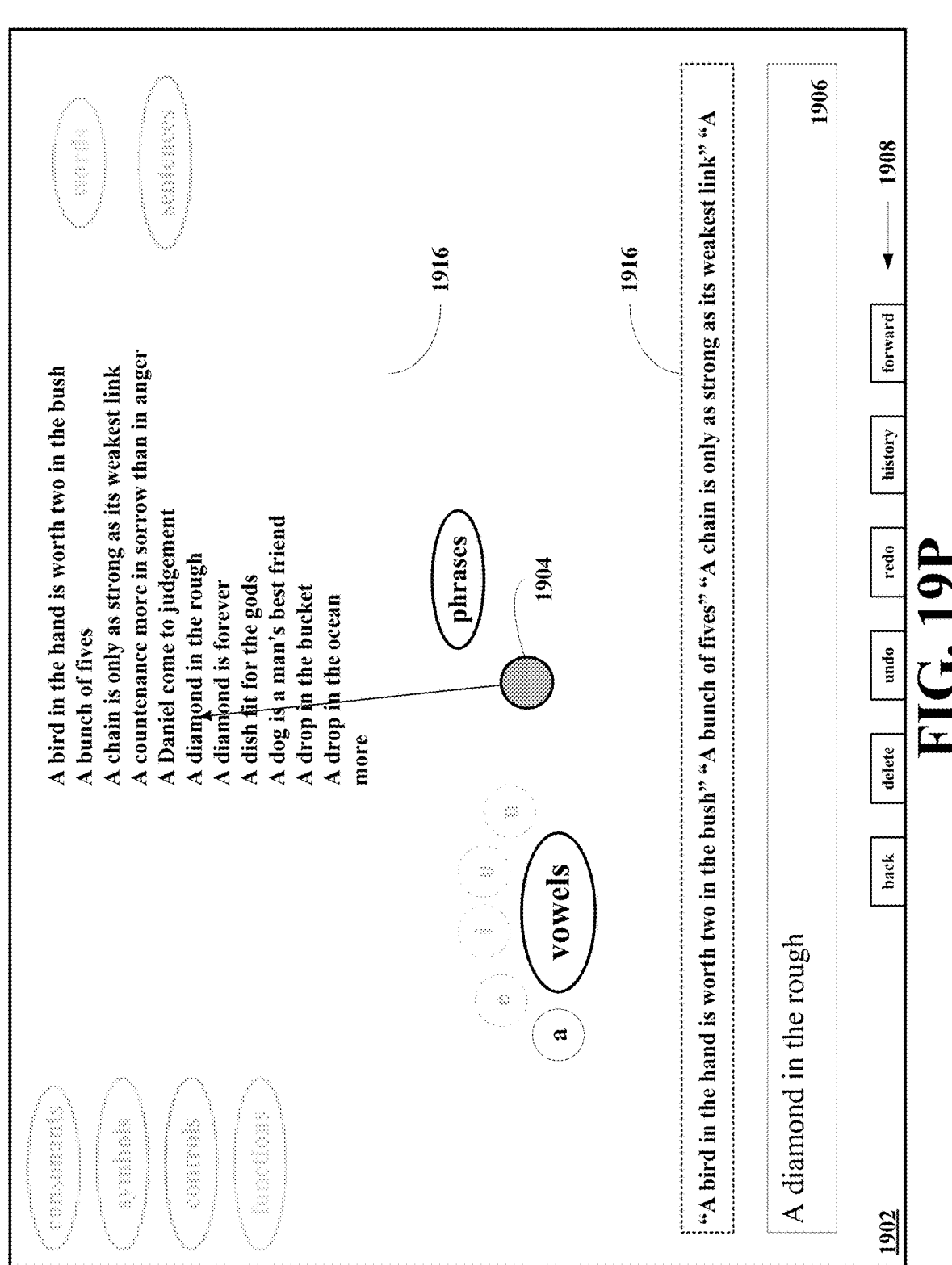

Referring now to FIGS. 19O-P, movement of the selection object 1904 towards the vowels object and further towards the a subobject and further towards the phrases object causes the systems, apparatuses, and or interfaces to select the phrases object. Looking at FIG. 19Q, the movement towards the phrases object results in the selection of the phrases object evidenced by pulling the phrases object toward the selection object 1904 and the fading of the words and sentences objects and the moving of them away from the center of the display area 1902. Currently, the selection of the phrases object causes the systems, apparatuses, and or interfaces to display a phrases box 1916 movement into the box to the phrases "a diamond in the rough", resulting in the selection of that phrase and its appearance in the text box 1906. Alternatively, the selection of the phrases object causes the systems, apparatuses, and or interfaces to display a phrases menu 1918, where movement into the phrase menu 1918 causes the systems, apparatuses, and or interfaces to invoke a scroll command. After the start of scrolling through the list, movement will result in the selection of the member of the list associated with the scroll and the concurrent appearance of the phrase in the text box 1906.

In the embodiments shown in FIGS. 17A-J and FIGS. 19A-P, the display areas show the selection history, in that each selected object remains unfaded, but moved so that further movement may allow further processing. It should be recognized that the history may be displayed in different formats and in different locations in the display areas.

Figure 20A:
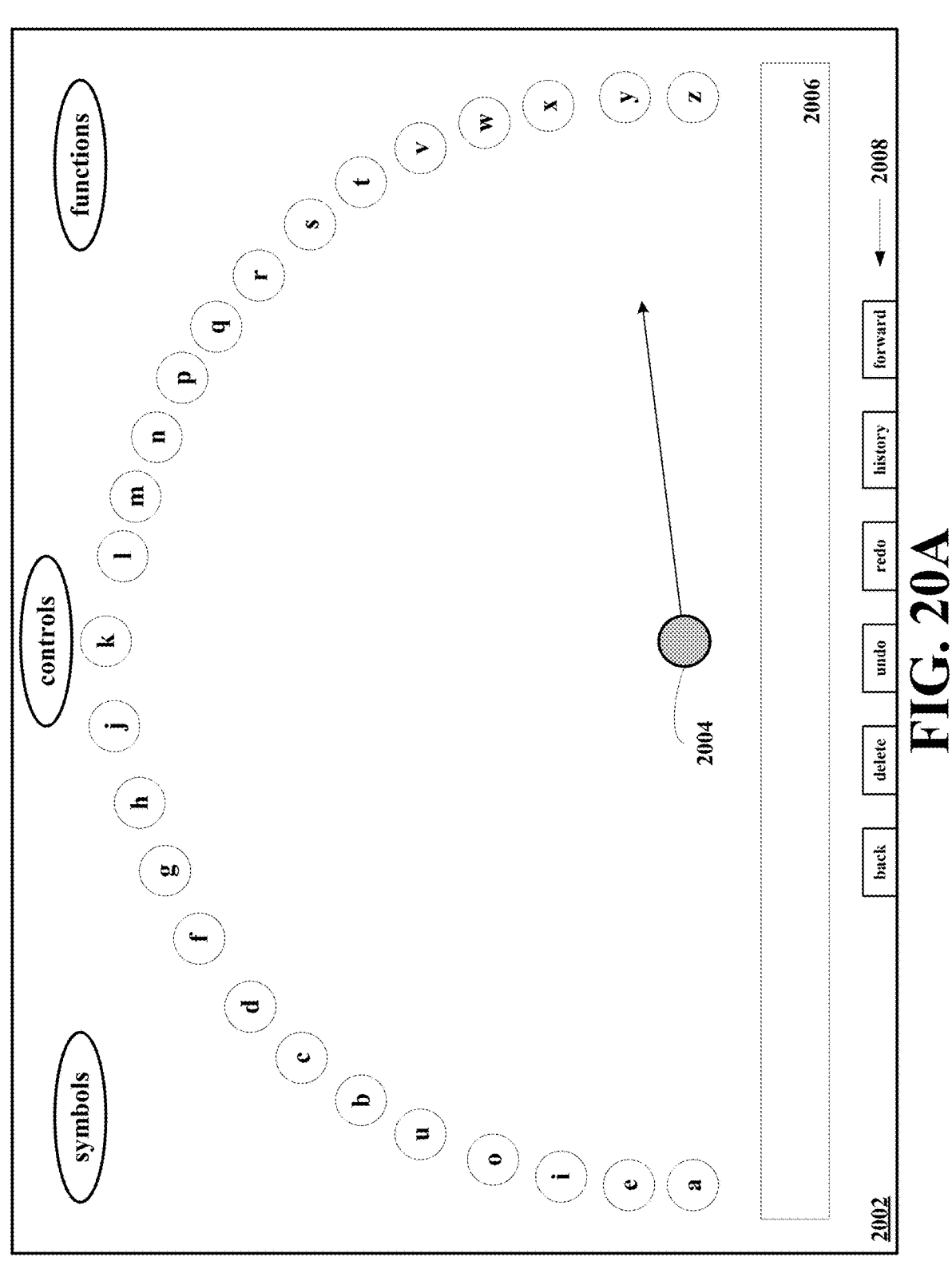
Figure 20B:
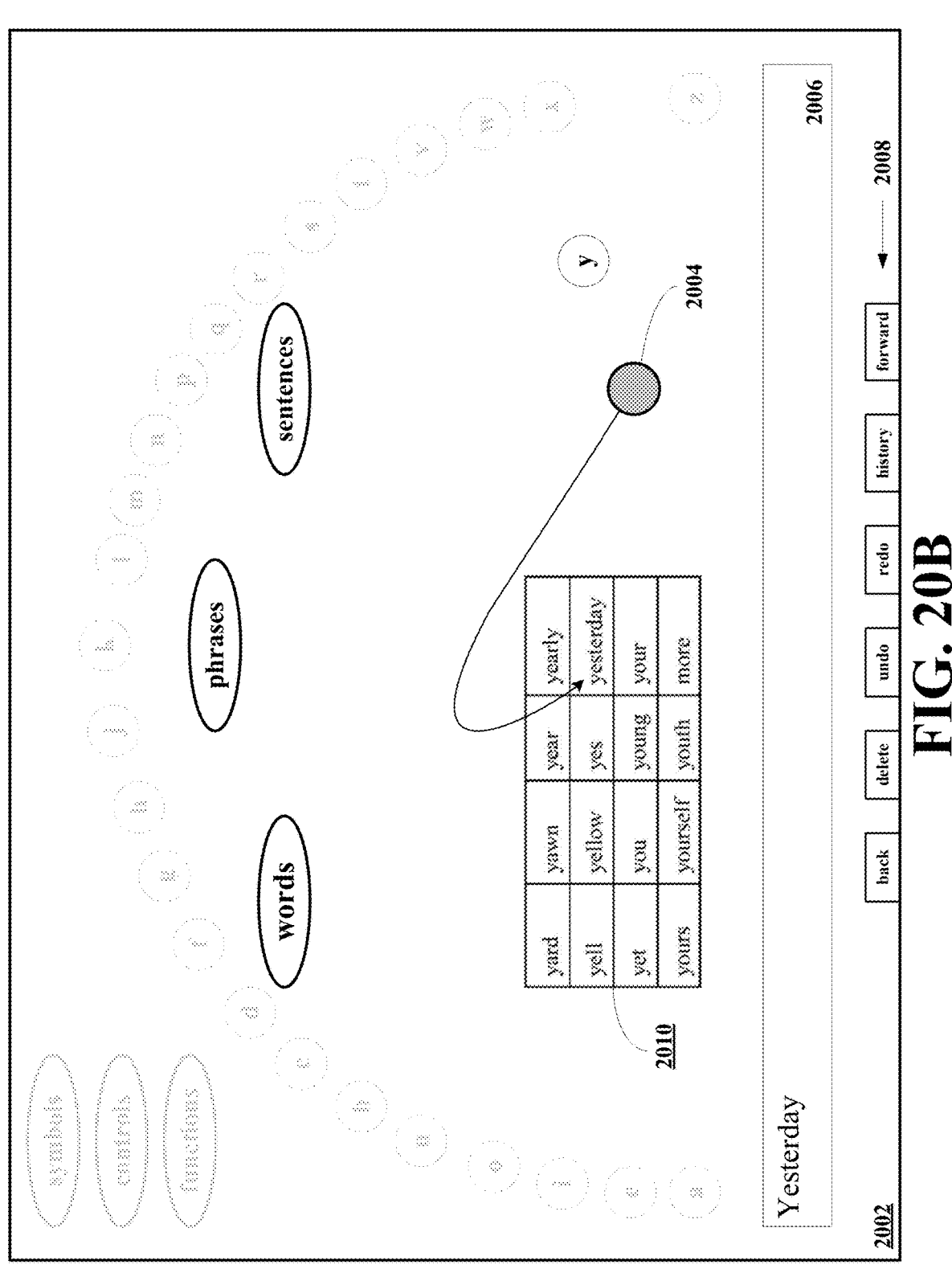
Figure 20C:
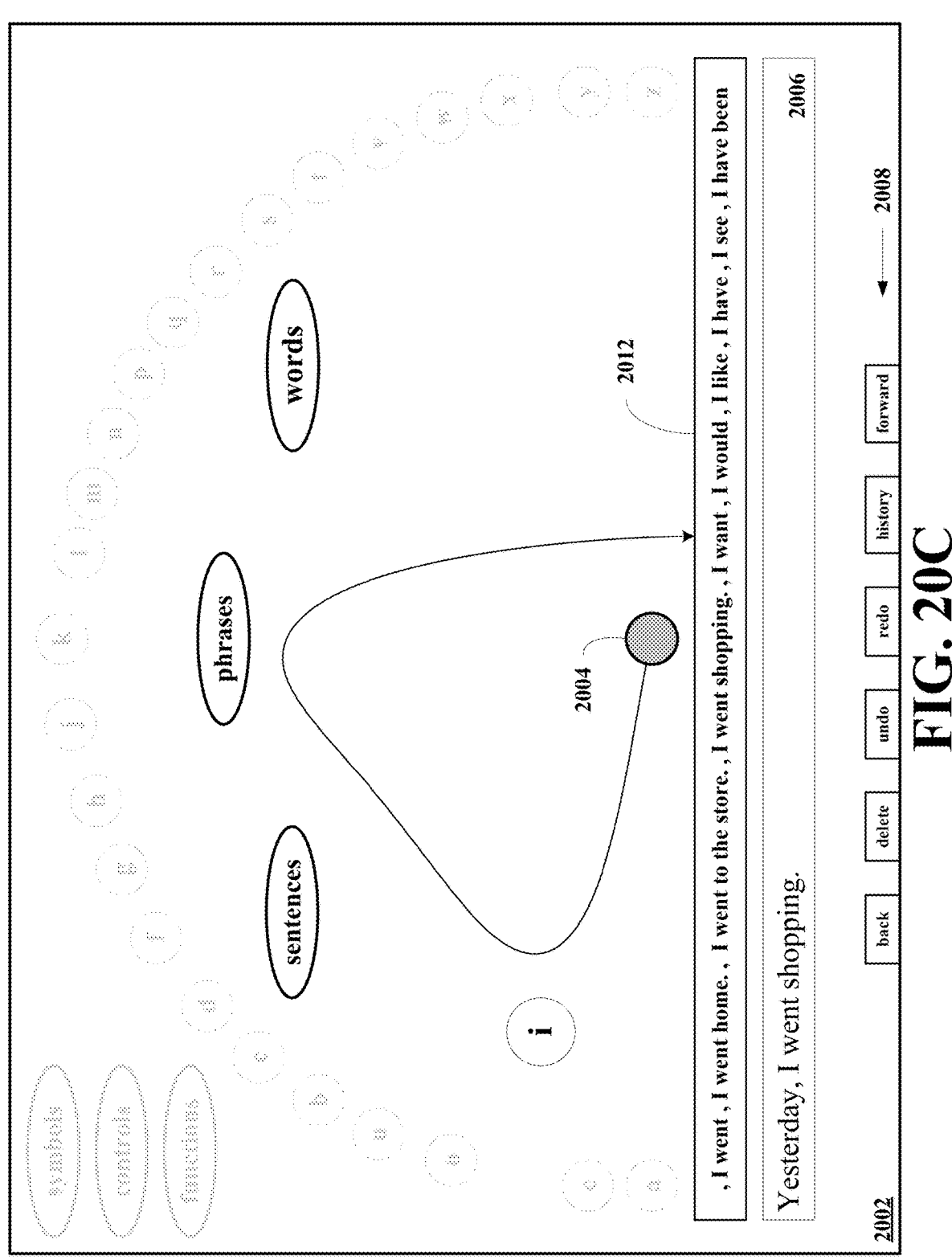

Referring now to FIGS. 20A-C, another embodiment of a word processing system, apparatus, and/or interface is illustrated and is shown to include a display, generally 2000, having an active display area 2002. Looking at FIG. 20A, once activated via movement within an active zone of at least one motion sensor exceeding a threshold movement value, the active display area 2002 will be populated with a cursor or selection object 2004, a text box 2006 and a set of command functions 2008 including a back object, a delete object, an undo object, a redo object, a history object, and a forward object. The active display area 2002 will also be populated with 26 letter objects, one for each letter of the alphabet, disposed in an arcuate manner about the selection object 2004. The active display area 2002 will also be populated with a symbols object, a controls object, and a functions object, if one of these objects were to be selected, then object for each symbol, each control, or each function would replace the arcuate displayed letter object, which would disappear to be replaced by an alphabet object (not shown). Movement of the selection object 2004 towards the y object cause the systems, apparatuses, and/or interfaces to select the y object.

Looking at FIG. 20B, selection of the y object causes the system, apparatus, and/or interface to draw the y object towards the selection object 2004, to fade the other letter objects, but hold the other letter objects in their same relative positions, to fade the symbols, controls, and functions objects and move them away from the center of the display area 2002, and to display a words object, phrases object, and a sentences object. Moving the cursor object 2004 towards the words object a sufficient amount to effect its selection followed by a concurrent display of a word selection list 2010 and a smooth change in direction confirms the selection of the words object and movement to a particular member of the word list 2010, here the word "yesterday" (show capitalized as being the first word of a sentence) cause the system, apparatus, or interface to select "yesterday", which appears in the text box 2006. Once the selection of the word "yesterday", the system, apparatus, or interface returns to a state for selection of another letter.

Looking at FIG. 20C, moving the selection object 2004 towards the i object causes the system, apparatus, or interface to display the words object, phrases object, and a sentences object about the selection object, to pull the i object towards the selection object and to fade the other letter objects, while holding them in their relative locations. Continued smooth movement towards the phrases object causes system, apparatus, or interface to display a phrase selection menu 2012 and continued smooth movement to the menu 2012 will cause the system, apparatus, or interface to scroll through the list. Once scrolling starts, movement once a particular phrase is displayed or highlighted in some way in the menu 2012, the movement causes the system, apparatus or interface to select a particular phrase, here ", I went shopping", which appears in the text box 2006 resulting in the sentence "Yesterday, I went shopping."

Referring now to FIGS. 21A-J, another embodiment of a word processing system, apparatus, and or interface is illustrated and is shown to include a display, generally 2100, having an active display area 2102. Looking at FIG. 21A, once activated via movement within an active zone of at least one motion sensor exceeding a threshold movement value, the active display area 2102 will be populated with a cursor or selection object 2104, a text box 2106 and a set of command functions 2108 including a back object, a delete object, an undo object, a redo object, a history object, and a forward object. The active display area 2102 will also be populated with a letters object, a symbols object, a controls object, and a functions object. Movement of the selection object 2104 towards the letters object causes the system, apparatus, and or interface to fade the a symbols object, a controls object, and a functions object. Looking at FIG. 21B, once the movement is sufficient to meet one or more threshold object selection criteria, the symbols, controls, and functions objects may be further faded and moved furthest from the center of the display area 2102 and a vowels object and a consonants object appear. Movement towards the consonants object causes the system, apparatus, and or interface to fade the vowels object. Looking at FIG. 21C, once movement is sufficient to meet one or more threshold object selection criteria, the consonants object is selected, centered with the selection object 2104 centered within the consonants object and 21 consonant object are distributed about the consonants object in a space apart elliptical configuration (separated by a distance to improve subsequent motion based selection) and the vowels object is further faded. Looking at FIG. 21D, movement towards the f object causes the system, apparatus, and or interface to pull the f object towards the selection object 2104, to display a words object, a phrases object and a sentences object and to fade the other 20 consonant objects, while maintaining there relative positions. A pause and then further movement causes the system, apparatus, and or interface to confirm the selection, to pre-select the sentences object, to fade the words object and phrases object and to display a sentence scroll box 2110 for scrolling through a list of sentence starting with the letter f for further motion based selection. Of course, it should be recognized that the objects may appear in any configuration distributed about the selection object 2104.

Figure 21A:
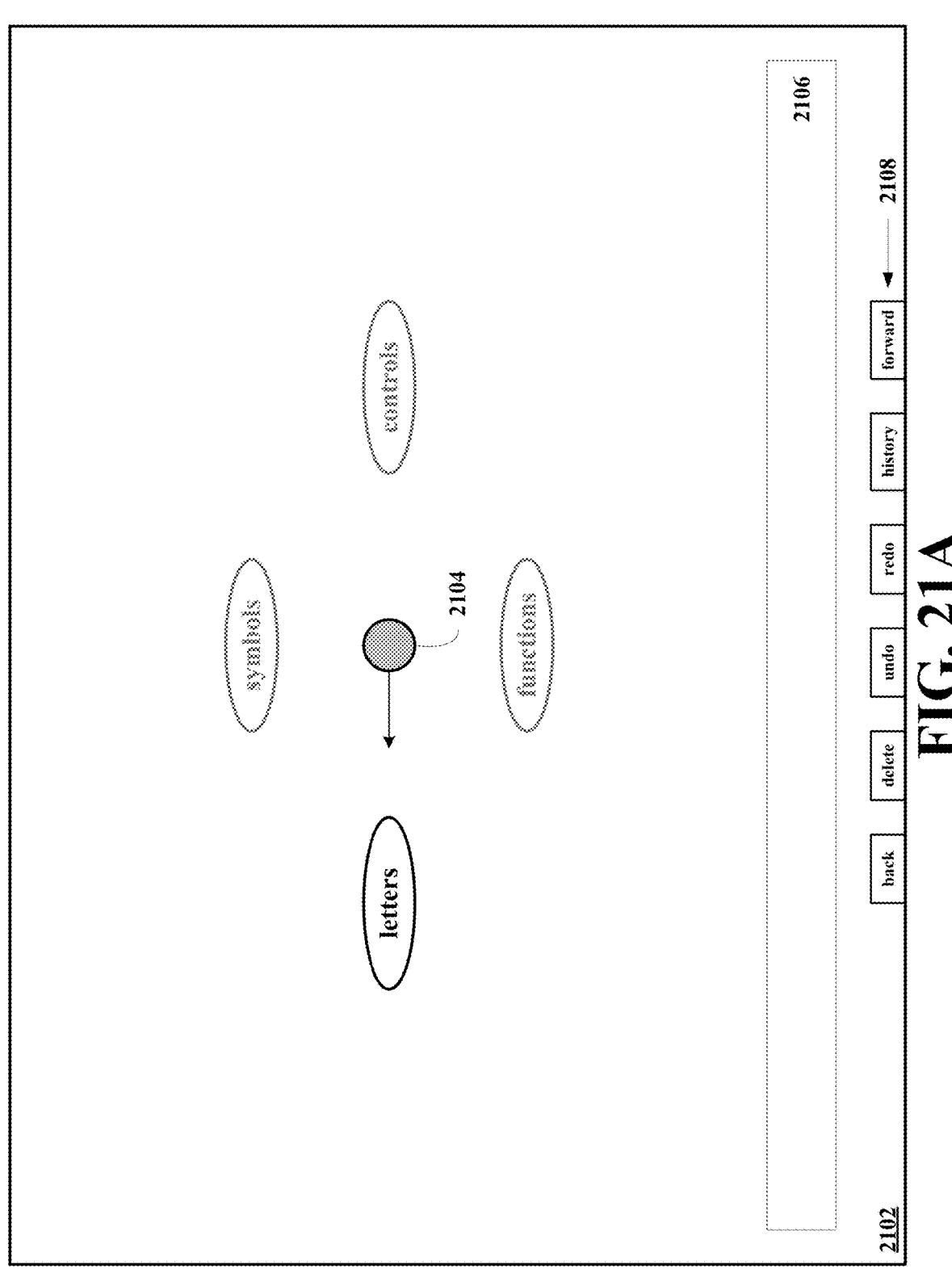
FIGS. 21A-J depict another embodiment of systems, apparatuses, and/or interfaces of this disclosure using another embodiment of a virtual keyboard for text processing.
Figure 21B:
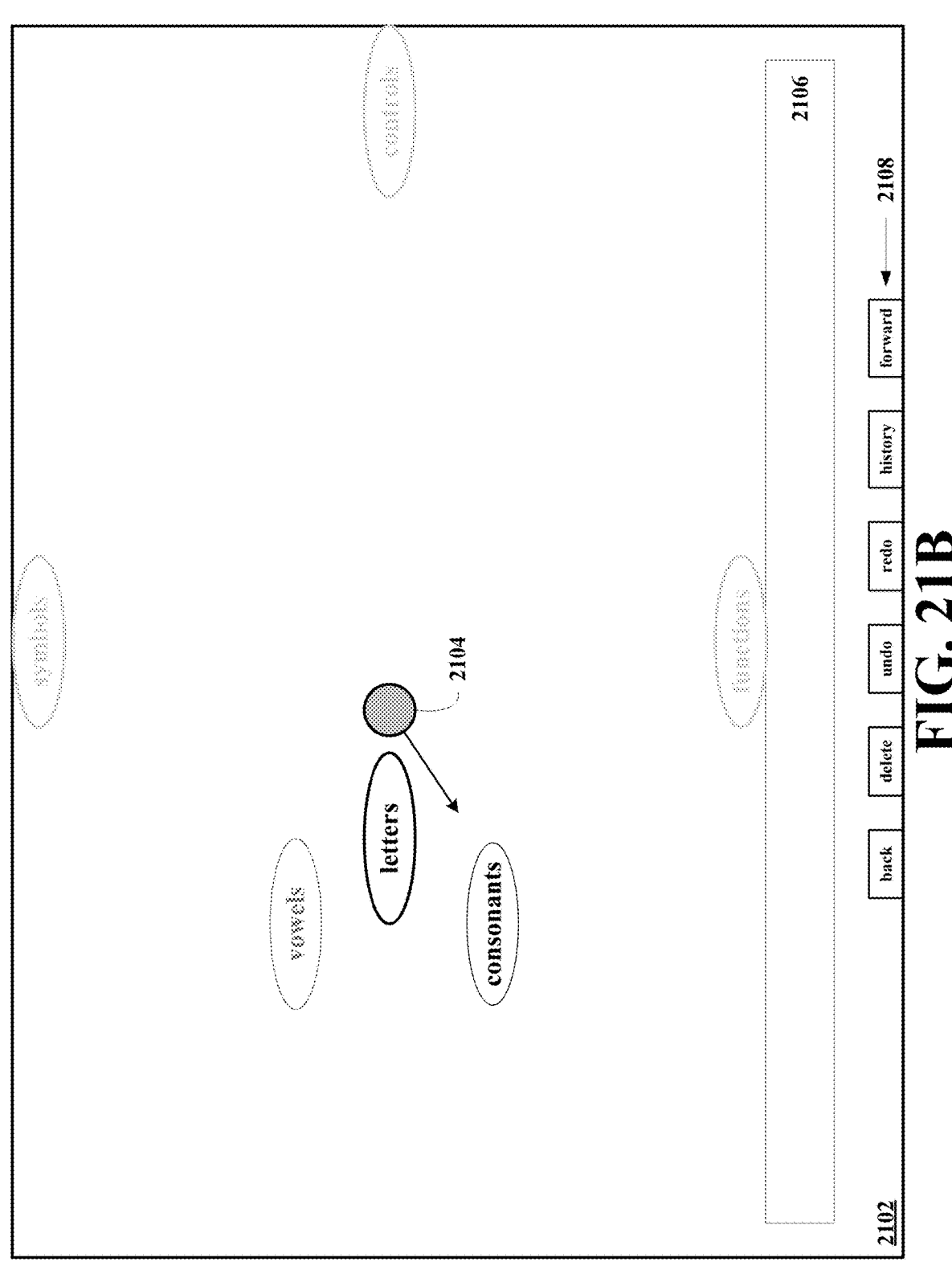
Figure 21C:
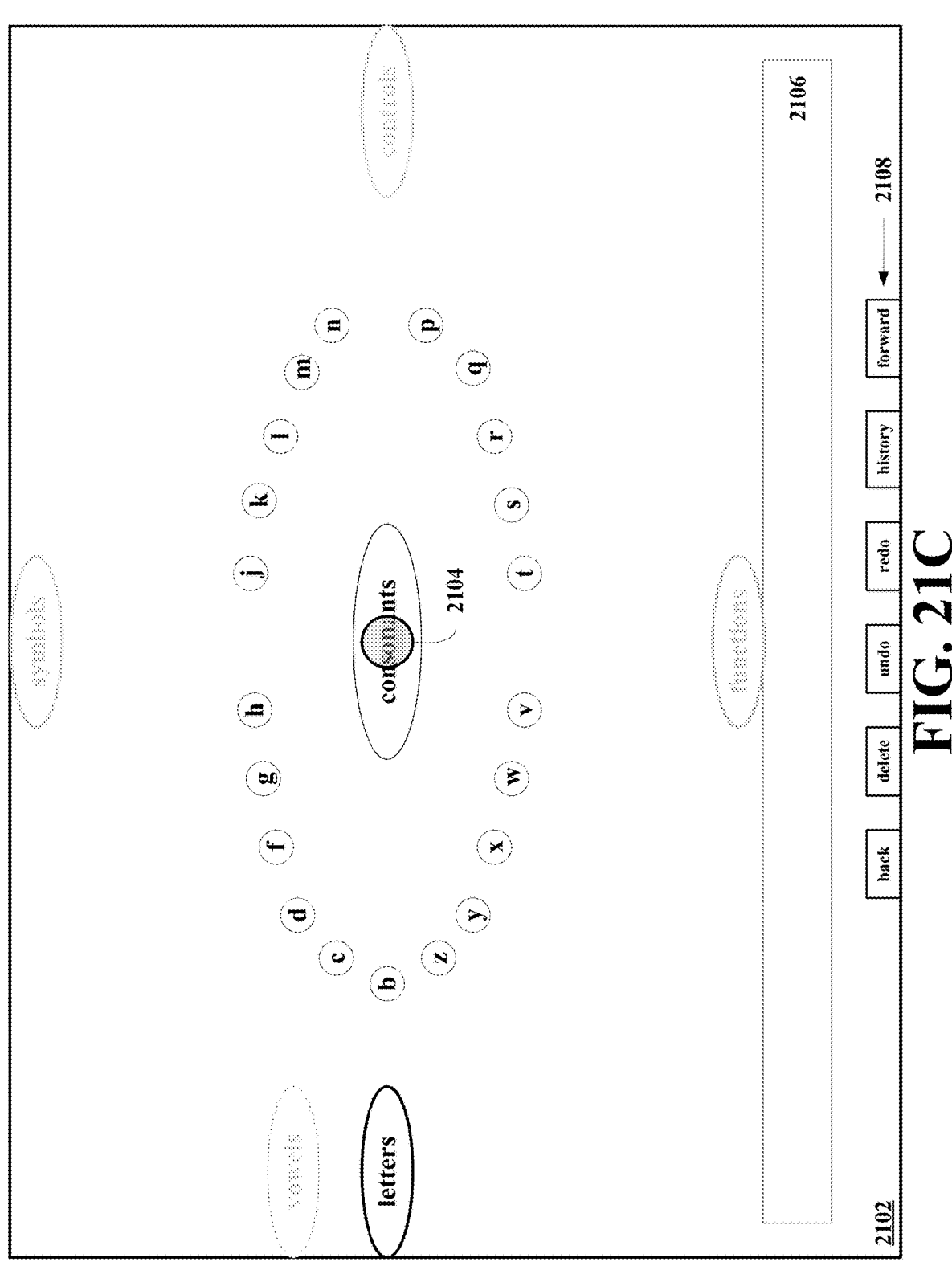
Figure 21D:
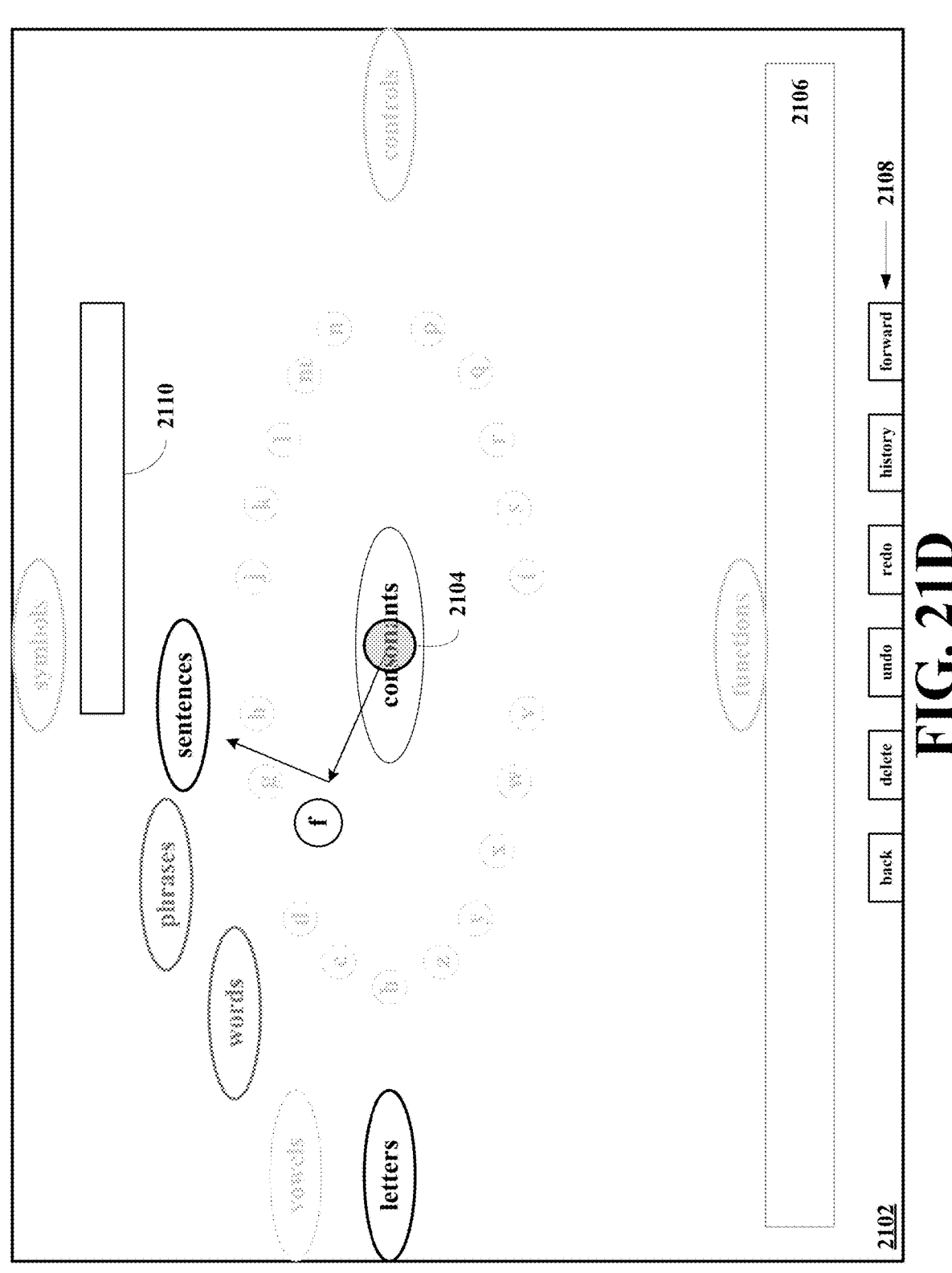
Figure 21E:
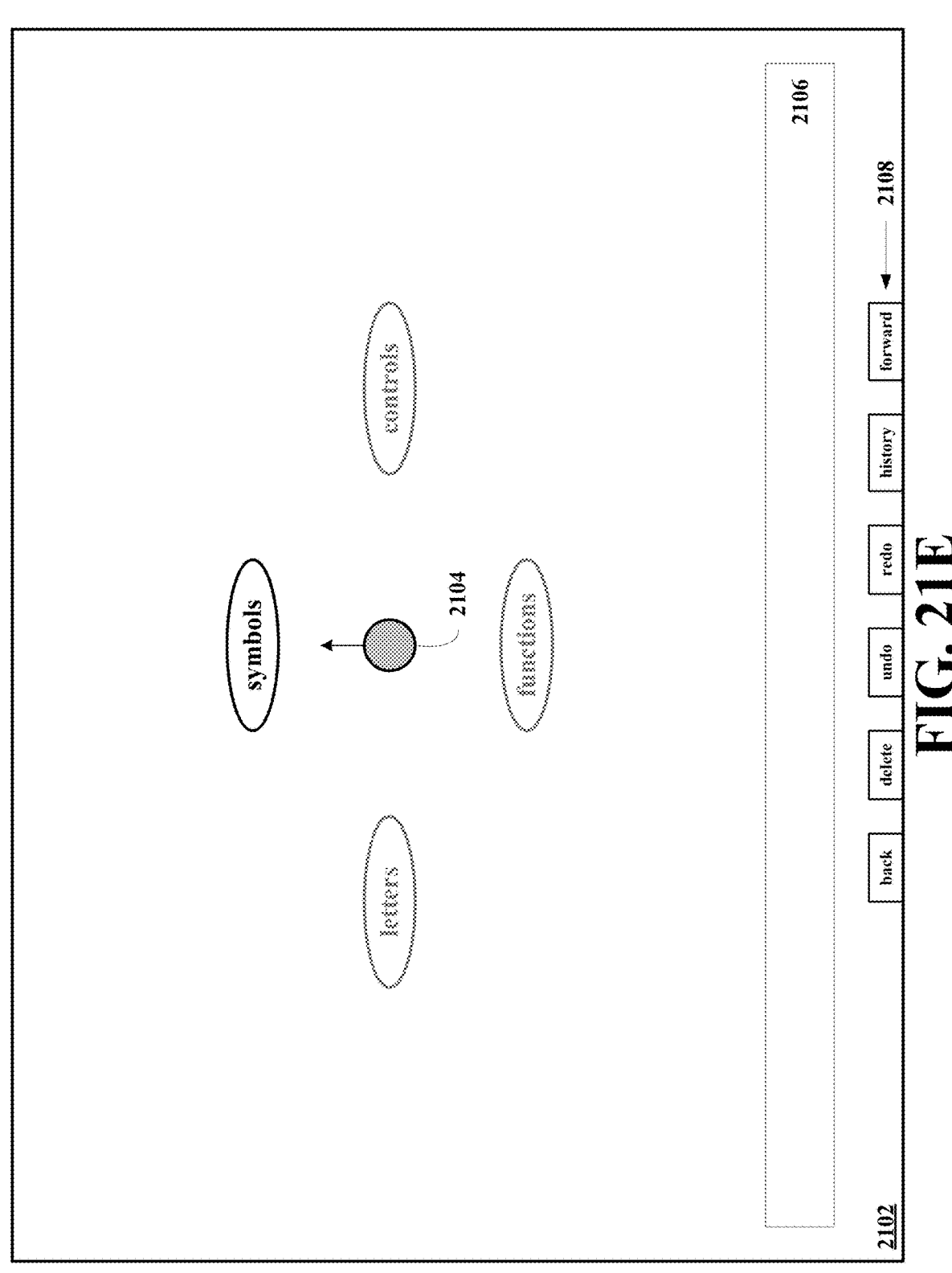
Figure 21F:
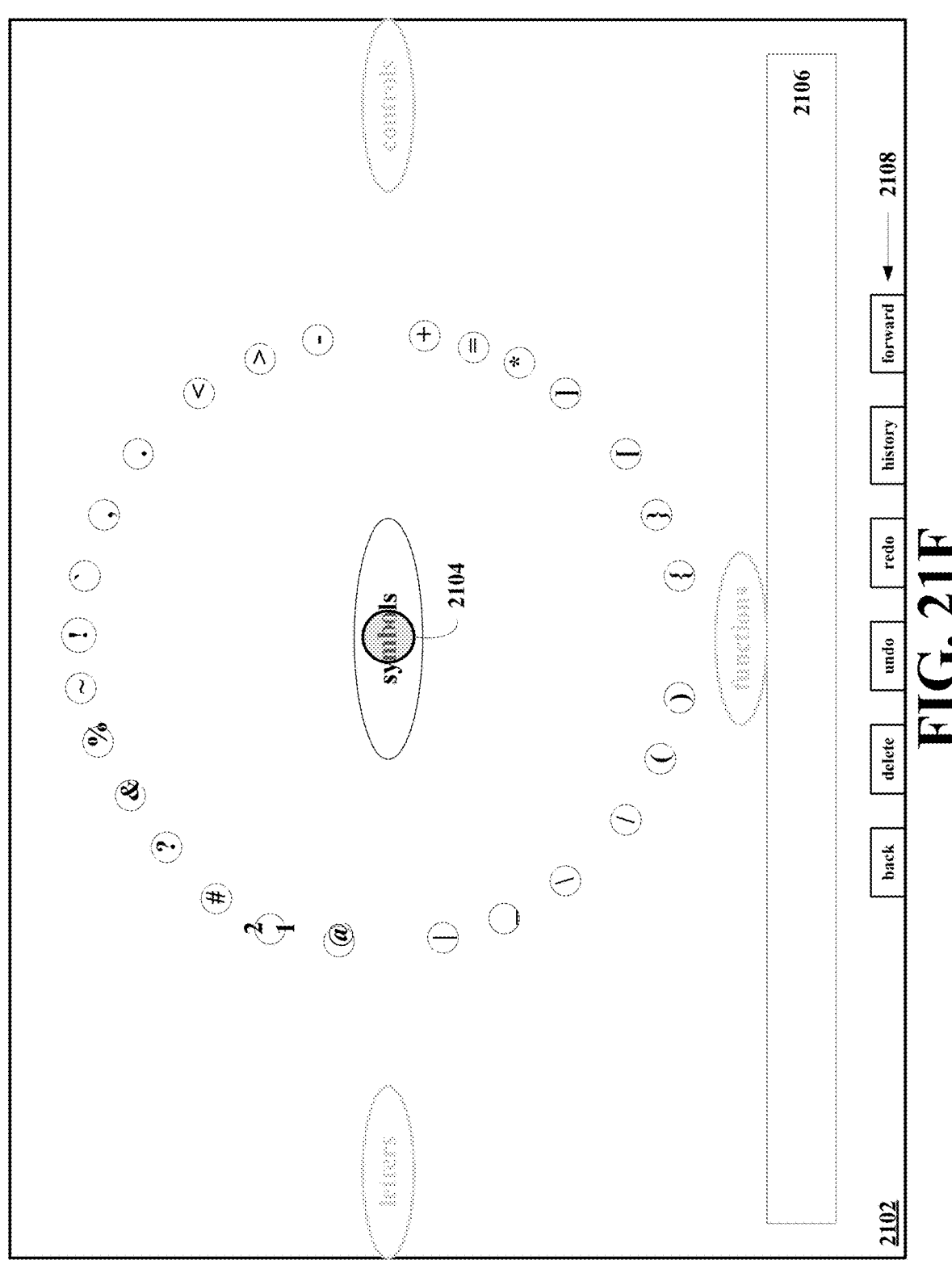

Looking at FIG. 21E, movement of the selection object 2104 towards the symbols object causes the system, apparatus, and or interface to fade the letters, controls, and a functions objects. Looking at FIG. 21F, once the movement is sufficient to meet one or more threshold object selection criteria, the symbols, controls, and functions objects may be further faded and moved furthest from the center of the display area 2102 and 27 symbol objects appear in a spaced apart circular configuration about the selection object 2104. Of course, it should be recognized that the objects may appear in any configuration distributed about the selection object 2104.

Figure 21G:
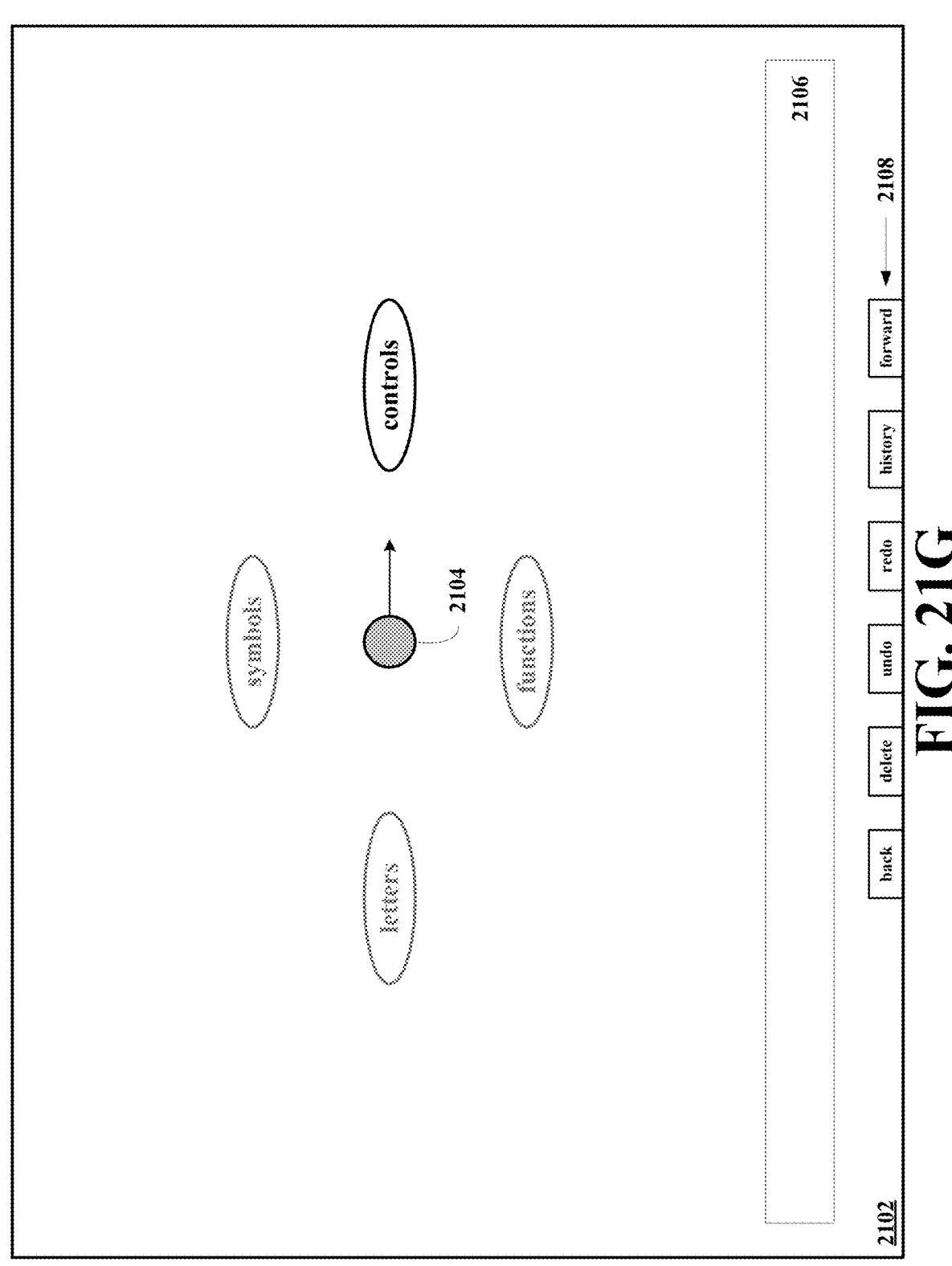
Figure 21H:
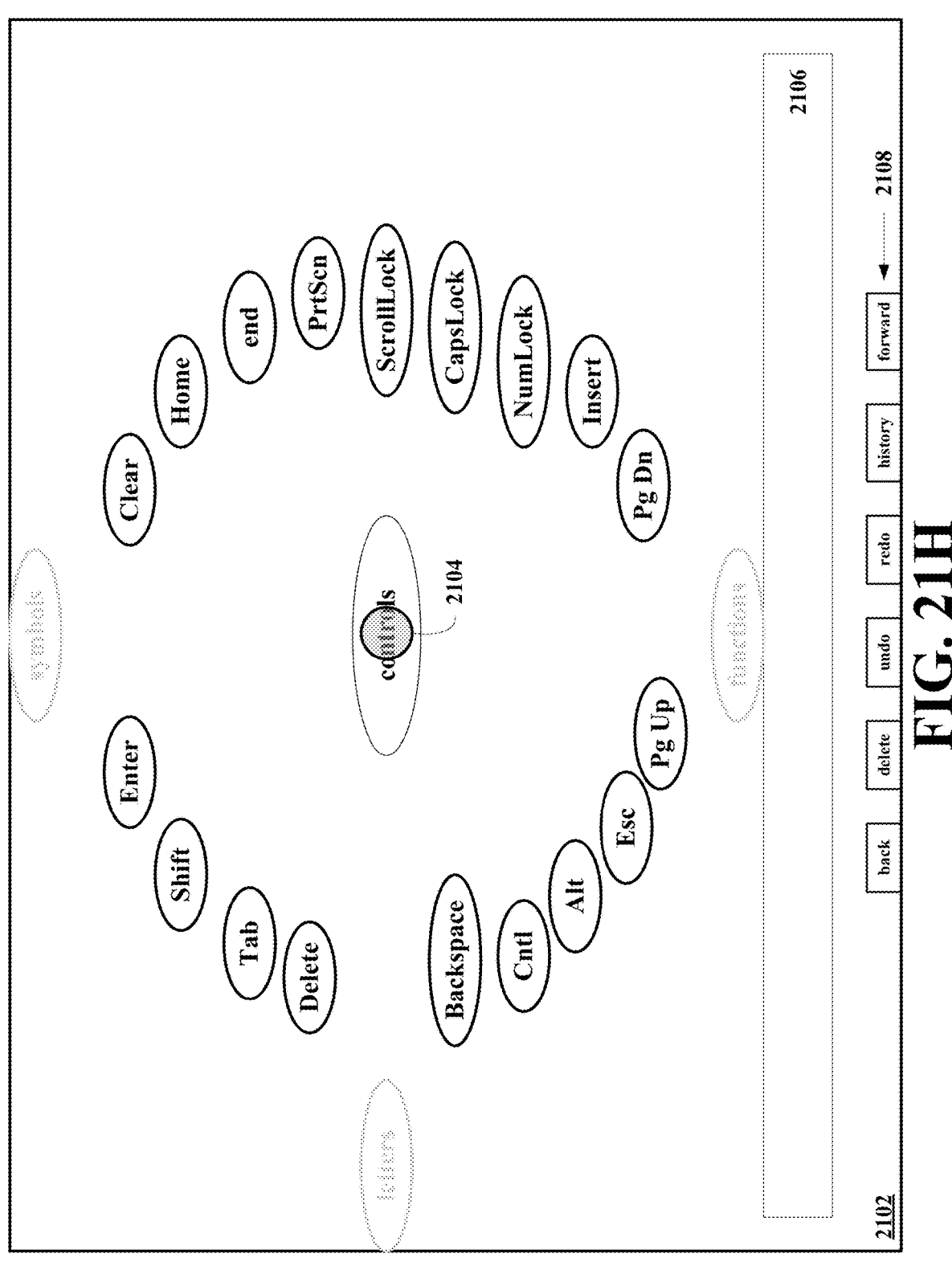

Looking at FIG. 21G, movement of the selection object 2104 towards the controls object causes the system, apparatus, and or interface to fade the letters, symbols, and functions objects. Looking at FIG. 21H, once movement is sufficient to meet one or more threshold object selection criteria, the letters, symbols, and functions objects may be further faded and moved furthest from the center of the display area 2102 and 20 control objects appear in a spaced apart circular elliptical configuration about the selection object 2104. Of course, it should be recognized that the objects may appear in any configuration distributed about the selection object 2104.

Figure 21I:
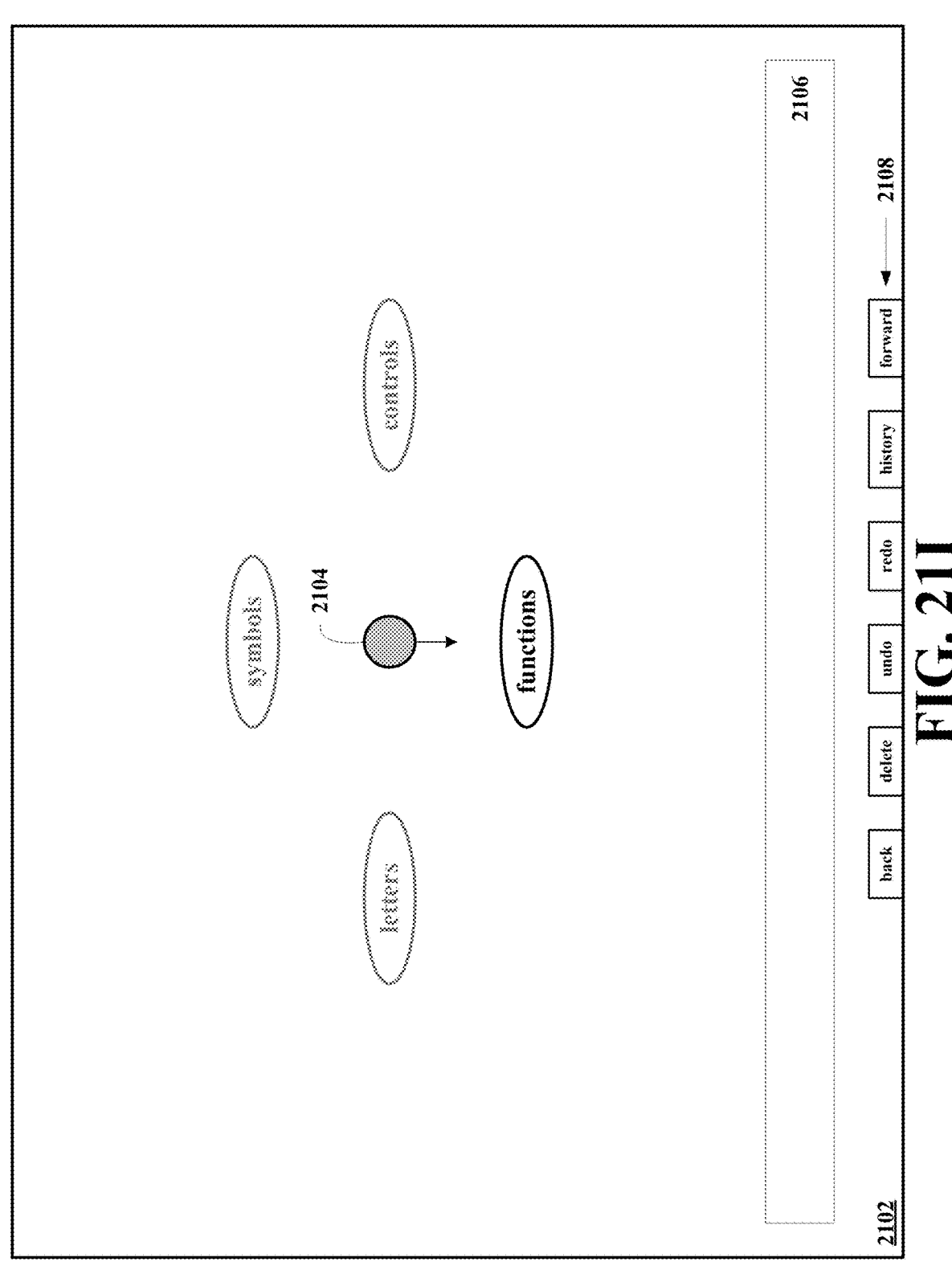
Figure 21J:
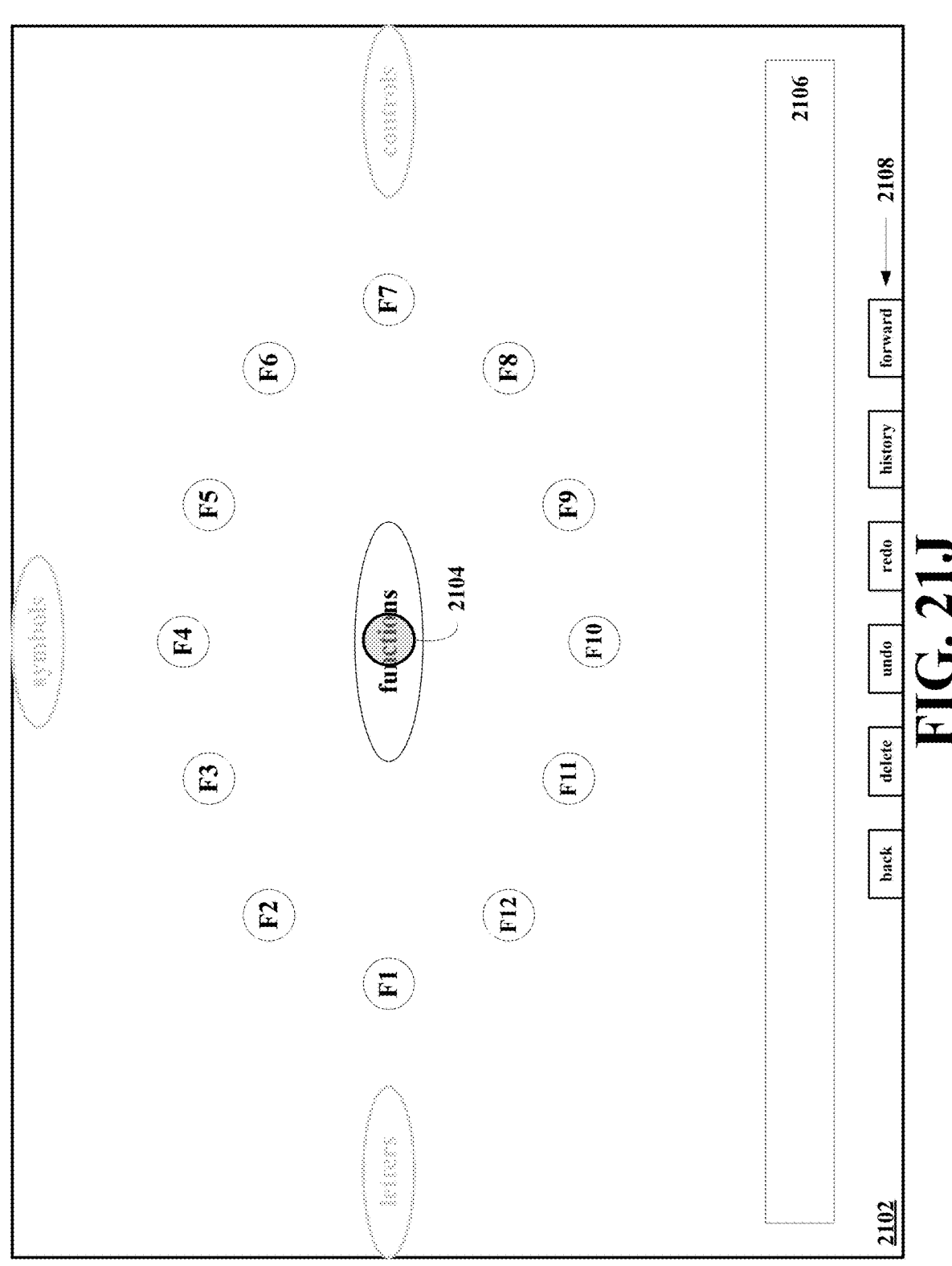

Looking at FIG. 21I, movement of the selection object 2104 towards the functions object causes the system, apparatus, and or interface to fade the letters, symbols, and controls objects. Looking at FIG. 21J, once movement is sufficient to meet one or more threshold object selection criteria, the letters, symbols, and controls objects may be further faded and moved furthest from the center of the display area 2102 and 12 function objects appear in a spaced apart elliptical configuration about the selection object 2104. Of course, it should be recognized that the objects may appear in any configuration distributed about the selection object 2104.

It should be recognized that the motion based word processing systems, apparatuses, and/or interfaces and the methods implementing them may utilize any type of movement such as (a) movement including a set of linear or non-linear movement segments, (b) continuous non-linear movement including a plurality of changes in direction, angle, distance displacement, duration, speed, velocity, and/or acceleration, (c) a set of linear or non-linear movement segments and one or a plurality of pauses, stops, holds, and or timed holds, (d) a set of continuous non-linear movement including a plurality of changes in direction, angle, distance displacement, duration, speed, velocity, and or acceleration and one or a plurality of pauses, stops, holds, and or timed holds, or (e) any other type of movement that including changes in one or more movement properties to permit the motion based word processing systems, apparatuses, and/or interfaces and the methods implementing them to recognize the changes and convert the changes into command and control functions as set forth here in. Moreover, other types of virtual keyboard may be used including other processes for transitioning from a key based selection format to a word, phrase or sentence selection format such alternate keyboard may utilize transition object or pre-defined movements to trigger such as transition. Furthermore, many other types of object based word processors may be envisioned that share one or more aspects or combinations thereof of illustrated embodiments of the object based formats, while other embodiments may combine one or more aspects of a keyboard format and an object format.

CLOSING PARAGRAPH

All references cited herein are incorporated by reference. Although the invention has been disclosed with reference to its preferred embodiments, from reading this description those of skill in the art may appreciate changes and modification that may be made which do not depart from the scope and spirit of the invention as described above and claimed hereafter.

We claim:

1. An apparatus comprising:
a digital processing device including at least one processing unit, an operating system, memory, at least one mass storage device, at least on motion sensor, a display device, one or more input devices, one or more output devices, communication hardware and software, and executable instruction for implementing the apparatus,
the digital processing device configured to:
(a) display, on the display device, a contactless, virtual character entry construct, the construct, including: a character selection area having character key including letter keys, number keys, and symbol keys; function keys; control keys; a text output area; and a static word or phrase display area or a transient word or phrase display bubble;

(b) receive, via the at least one processing unit from the at least one motion sensor, a motion within the construct;
(c) select, via the at least one processing unit, a particular letter key contracted by the motion, contacting an active area around the particular letter key, or the motion is towards the particular letter key,
(d) display, on the display device, a set of words, phrases, or any combination thereof in the static word or phrase display area or the transient word or phrase display bubble;
(e) receive, via the at least one processing unit from the at least one motion sensor, another motion within the construct;
(f) select, via the at least one processing unit based on the another motion, a particular word or phrase; and
(g) output, on the display device, a text string comprising the particular word or phrase in the text output area.

2. The apparatus of claim 1, wherein digital processing device configured to:
repeat steps (c) through (g) and add each word or phrase to the end of the text until the text is complete.

3. The apparatus of claim 2, wherein digital processing device configured to:
use user preferences to aid in each of the selections.

4. The apparatus of claim 1, wherein digital processing device configured to:
(h) receive, via the at least one processing unit from the at least one motion sensor, a word motion within the construct, wherein the word motion comprising as a word;
(i) output, on the display device, the word in the text output area at the end of the text;
(j) receive, via the at least one processing unit from the at least one motion sensor, a function or control motion within the construct; and
(k) select, via the at least one processing unit based on the function or control motion, a particular function key or control key; and
(l) execute, via the at least one processing unit, the function or control associated with the particular function key or control key.

5. The apparatus of claim 4, wherein digital processing device configured to:
repeat steps (c) through (l) until the text is complete.

6. The apparatus of claim 5, wherein digital processing device configured to:
use user preferences to aid in each of the selections.

7. An apparatus comprising:
a digital processing device including at least one processing unit, an operating system, memory, at least one mass storage device, at least on motion sensor, a display device, one or more input devices, one or more output devices, communication hardware and software, and executable instruction for implementing the apparatus,
the digital processing device configured to:
(a) display, on the display device, a contactless, virtual character entry construct, the construct, including character objects, a symbols object, a controls object, a functions object, a text box, a back object, a forward object, a delete object, an undo object, a redo object, and a history object;
(b) receive, via the at least one processing unit from the at least one motion sensor, a motion within the construct;

(c) select, via the at least one processing unit, a particular character object contracted by the motion, contacting an active area around the particular character object, or the motion is towards the particular character object;

(d) display, on the display device, a set of words, phrases, or any combination thereof in the text box;

(e) receive, via the at least one processing unit from the at least one motion sensor, another motion within the construct;

(f) select, via the at least one processing unit based on the another motion, a particular word or phrase; and (g) output, on the display device, a text string comprising the particular word or phrase in the text box.

8. The apparatus of claim 7, wherein digital processing device configured to:

repeat actions (c) through (g) adding each word or phrase to the end of the text until the text is complete.

9. The apparatus of claim 7, wherein digital processing device configured to:

(h) receive, via the at least one processing unit from the at least one motion sensor, a word motion within the construct, wherein the word motion comprising as a word; and (i) output, on the display device, the word in the text output area at the end of the text.

10. The apparatus of claim 9, wherein digital processing device configured to:

repeat steps (c) through (i) until the text is complete.

11. The apparatus of claim 7, wherein digital processing device configured to:

use user preferences to aid in each of the selections.

12. The apparatus of claim 11, wherein digital processing device configured to:

use user preferences to aid in each of the selections.

13. The apparatus of claim 7, wherein digital processing device configured to:

(j) receive, via the at least one processing unit from the at least one motion sensor, a function or control motion within the construct; and (k) select, via the at least one processing unit based on the function or control motion, a particular function key or control key;

(l) execute, via the at least one processing unit, the function or control associated with the particular function key or control key; and (m) repeat steps (c) through (l) until the text is complete.

14. An apparatus comprising:

a digital processing device including at least one processing unit, an operating system, memory, at least one mass storage device, at least on motion sensor, a display device, one or more input devices, one or more output devices, communication hardware and software, and executable instruction for implementing the apparatus;

the digital processing device configured to:

(a) display, on the display device, a contactless, virtual character entry construct, the construct, including a vowels object, a consonants object, a symbols object, a controls object, a functions object, a text box, a back object, a forward object, a delete object, an undo object, a redo object, and a history object;

(b) receive, via the at least one processing unit from the at least one motion sensor, a motion within the construct;

(c) select, via the at least one processing unit, a particular character object contracted by the motion, contacting an active area around the particular character object, or the motion is towards the particular character object and no other character object of in the construct;

(d) display, on the display device, a set of words, phrases, or any combination thereof in the text box;

(e) receive, via the at least one processing unit from the at least one motion sensor, another motion within the construct;

(f) select, via the at least one processing unit based on the another motion, a particular word or phrase; and (g) output, on the display device, a text string comprising the particular word or phrase in the text box.

15. The apparatus of claim 14, wherein digital processing device configured to:

repeat actions (c) through (g) and add each word or phrase to the end of the text until the text is complete.

16. The apparatus of claim 14, wherein digital processing device configured to:

(h) receive, via the at least one processing unit from the at least one motion sensor, a word motion within the construct, wherein the word motion comprising as a word; and (i) output, on the display device, the word in the text box at the end of the text.

17. The apparatus of claim 16, wherein digital processing device configured to:

repeat steps (c) through (i) until the text is complete.

18. The apparatus of claim 14, wherein digital processing device configured to:

use user preferences to aid in each of the selections.

19. The apparatus of claim 18, wherein digital processing device configured to:

use user preferences to aid in each of the selections.

20. The apparatus of claim 14, wherein digital processing device configured to:

(j) receive, via the at least one processing unit from the at least one motion sensor, a function or control motion within the construct; and (k) select, via the at least one processing unit based on the function or control motion, a particular function key or control key;

(l) execute, via the at least one processing unit, the function or control associated with the particular function key or control key; and (m) repeat steps (c) through (l) until the text is complete.

* * * * *